US005517668A

United States Patent [19]

Szwerinski et al.

[11] Patent Number: 5,517,668

[45] Date of Patent: May 14, 1996

[54] DISTRIBUTED PROTOCOL FRAMEWORK

[75] Inventors: Helge Szwerinski, Cupertino; Gajjar Yatin, Fremont; Ashvin Sanghvi, San Jose, all of Calif.

[73] Assignee: Amdahl Corporation, Sunnyvale, Calif.

[21] Appl. No.: 179,580

[22] Filed: Jan. 10, 1994

[51] Int. Cl.[6] .......... G06F 13/00

[52] U.S. Cl. .......... 395/800; 395/200.14; 395/831; 364/DIG. 1; 364/238.3; 364/240.8

[58] Field of Search .......... 395/200, 800, 395/600, 650, 250, 275, 700, 831, 200.14

[56] References Cited

U.S. PATENT DOCUMENTS

| | | | |
|---|---|---|---|
| 5,150,464 | 9/1992 | Sidhu et al. | 395/200 |
| 5,165,021 | 11/1992 | Wu et al. | 395/250 |
| 5,265,239 | 11/1993 | Ardolino | 395/500 |
| 5,317,568 | 5/1994 | Bixby et al. | 370/85.6 |

OTHER PUBLICATIONS

D. M. Ritchie, "A Stream Input–Output System", AT&T Bell Labs Tech Journal, vol. 63, No. 8, Oct. 1984, pp. 1897–1910.

David R. Cheriton, "The V Distributed System", Communications of the ACM, Mar. 1988, vol. 31, No. 3, pp. 314–333.

*Primary Examiner*—Mehmet Geckil
*Attorney, Agent, or Firm*—Flieseler, Dubb, Meyer & Lovejoy

[57] ABSTRACT

A distributed computing system having a distributed protocol stack. In a system including one or more general purpose computers or other application processors for running applications, the distributed protocol stack off-loads communication or other I/O processing from the application processor to dedicated I/O processors using a STREAMS environment thereby enhancing the performance/capacity of the system. The distributed protocol stack is formed of a STREAMS stack top and a stack bottom so that together the stack top and stack bottom comprise a full stack functionally equivalent to a non-distributed stack running on an application processor. Both the application processors and the I/O processors together appear to execute the full protocol stack, but the application processor only executes the stack top while the I/O processor only executes the stack bottom.

8 Claims, 4 Drawing Sheets

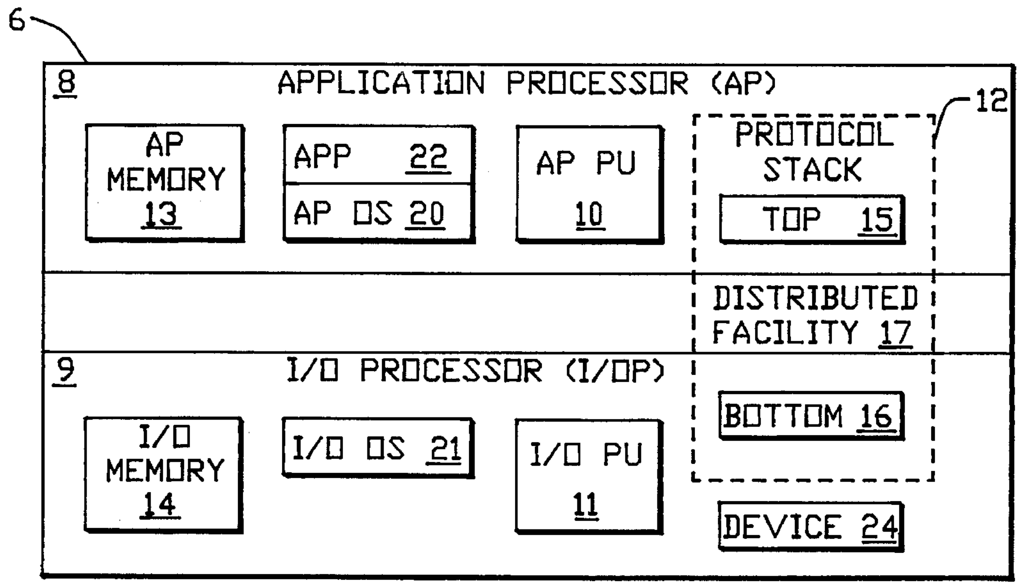
FIG.—1
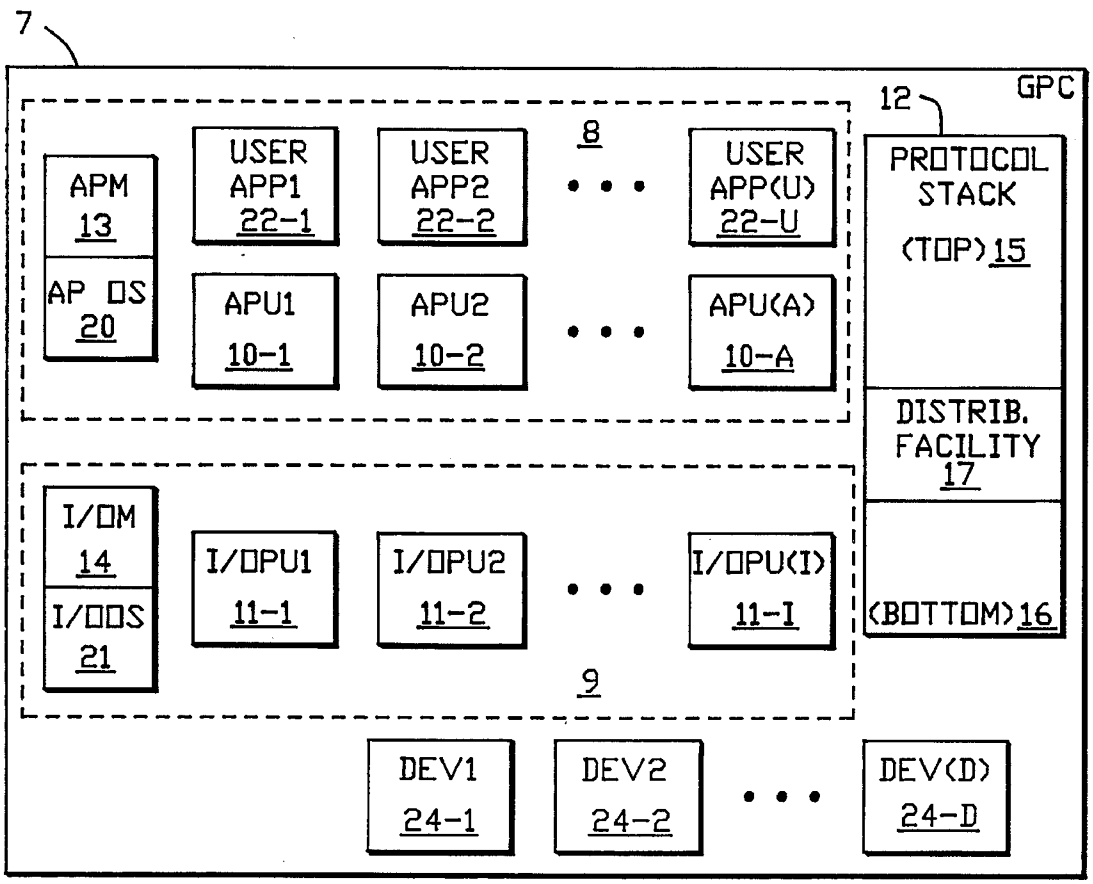
FIG.—2

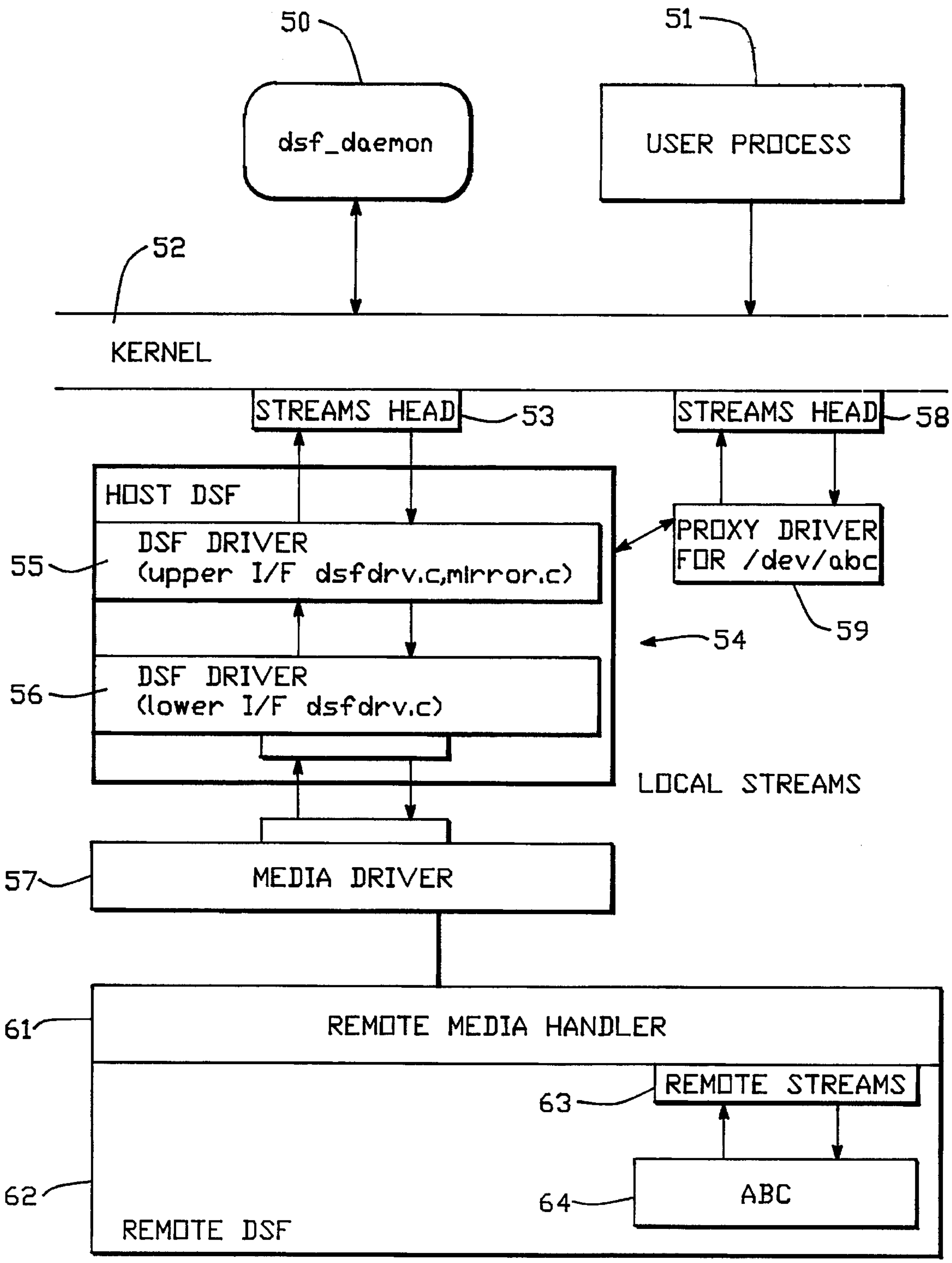
FIG.—3

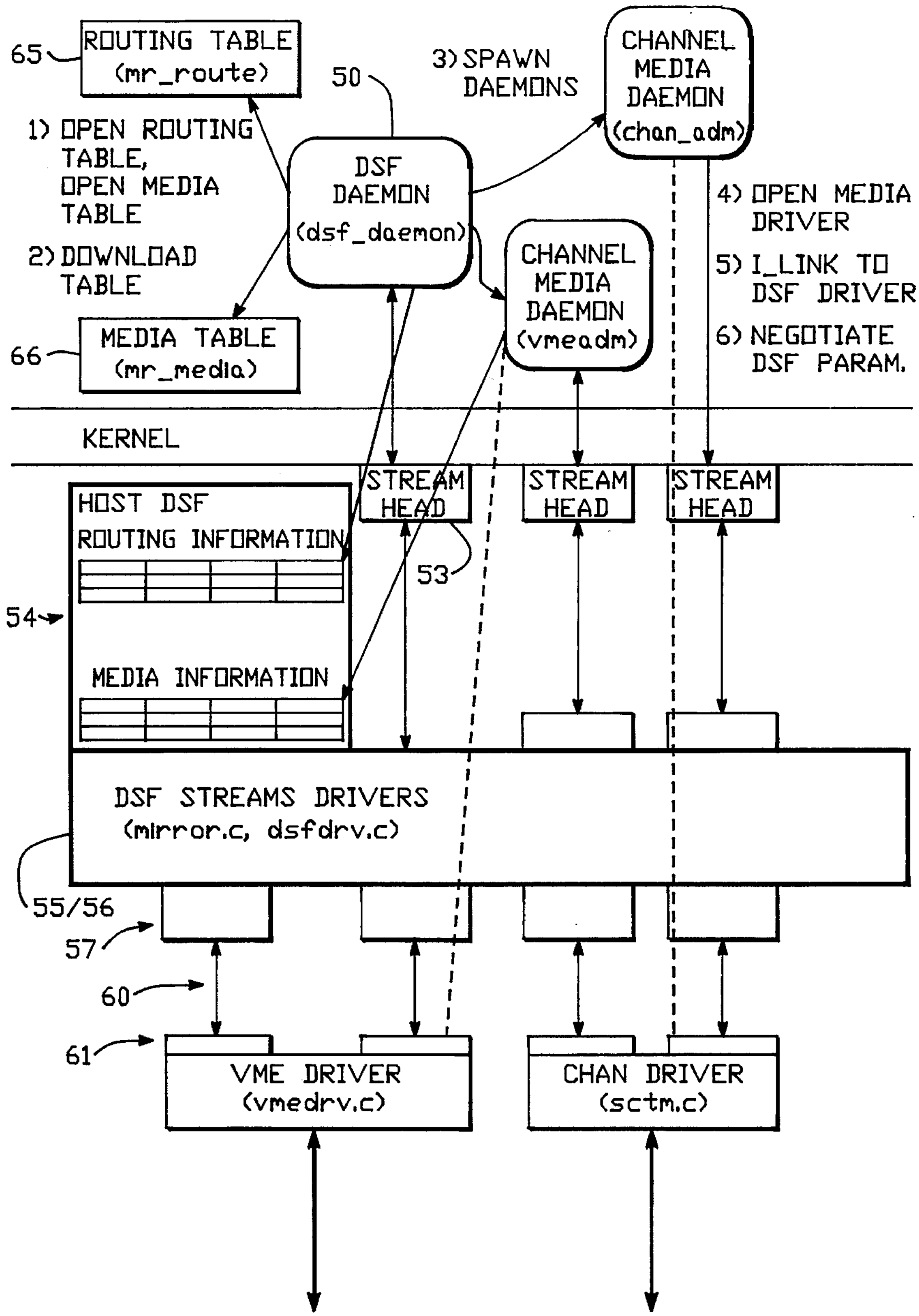
FIG.—4

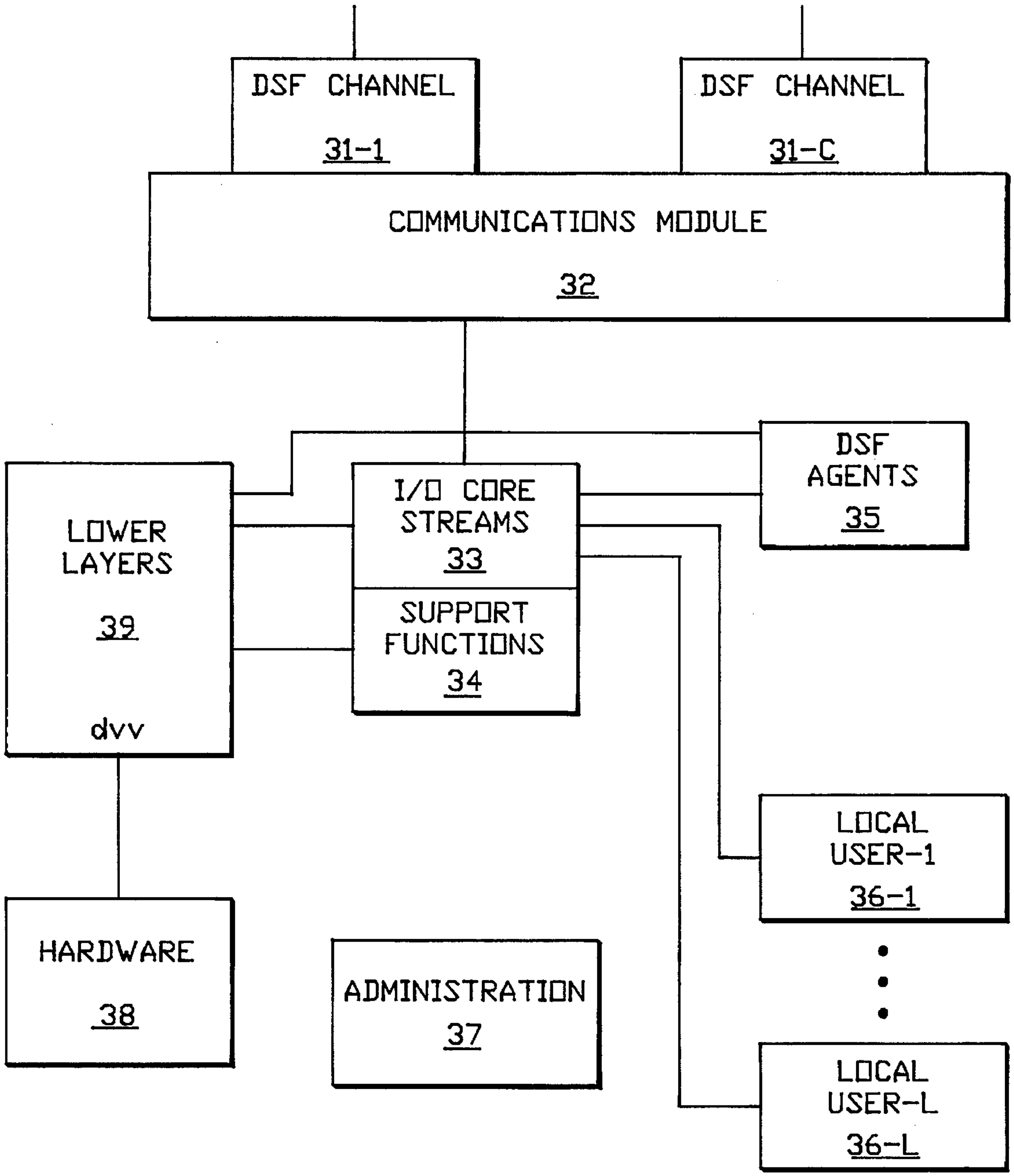
FIG.—5

DISTRIBUTED PROTOCOL FRAMEWORK

BACKGROUND OF THE INVENTION

The present invention relates to the field of distributing protocol stacks to multiple operating systems.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Many general purpose computers (GPC) that have an operating system (such as UNIX, NT, UTS and so on) have a STREAMS framework for implementing a protocol stack. The protocol stack communicates with input/output (I/O) drivers (especially communications drivers).

The expansion of client-server computing with demands for increased performance has presented problems. Although client work station power has increased, system performance has been constrained by server I/O limitations since dramatic jumps in microprocessor performance have not been matched by similar boosts in server I/O performance.

Many multiprocessor based systems have employed a Symmetric Multiple Processing architecture (SMP). In a SMP architecture, each of a plurality of central processing units, including processors CPU1, CPU2, . . . , CPUn, executes all tasks, including kernel I/O processing tasks. The goal of the operating system is to enable the n processors to deliver close to n-times the performance of one processor. Although it is relatively easy to achieve this n-times multiplier effect for pure computing jobs internal to the processor, it is relatively difficult to achieve this n-times multiplier effect for overall system performance including general I/O processing. I/O processing tends to cause frequent interrupts that invalidate the cache of the interrupted processor thereby slowing down the system. Because of this I/O processing problem with SMP architectures, better performance is predicted when some processors are dedicated to I/O processing (off-loading) in an asymmetrical multiprocessing (AMP) architecture.

However, asymmetrical multiprocessing architectures which have been proposed have been system specific without interfaces that permit a standard I/O framework and these proposed systems therefore have not provided transportability from system to system.

In view of the above background, there is a need for improved distributed computing systems and particularly protocol stacks for distributed computing.

SUMMARY

The present invention is a distributed computing system having a distributed protocol stack. In a system including one or more general purpose computers or other application processors for running applications, the distributed protocol stack off-loads communication or other I/O processing from the application processor to dedicated I/O processors thereby enhancing the performance/capacity of the system.

The distributed protocol stack is formed of a stack top and a stack bottom so that together the stack top and stack bottom comprise a full stack functionally equivalent to a non-distributed stack running on an application processor. Both the application processors and the I/O processors together appear to execute the full protocol stack, but the application processor only executes the stack top while the I/O processor only executes the stack bottom.

The distributed protocol stack overcomes the problem of performance-limiting I/O functions running on the application processor by delegating those I/O functions to multiple dedicated I/O processors which do not have the full overhead of the application processor and efficiently run the stack bottom.

The distributed protocol stack improves the overall throughput of the system both in the application processors which have fewer interruptions and in the I/O processors which are not burdened with the complexity of the application processors and hence are more efficient. The distributed protocol stack uses drivers having a system call interface that preserves compatibility with the source and binary software of existing user applications designed to execute on a system with a non-distributed protocol stack.

Also, the distributed protocol stack is flexible and portable and thereby shortens the time to market for new products.

The distributed protocol stack is, for example, a distribution of the UNIX STREAMS environment to dedicated I/O processors. The system call interface is unchanged regardless of the location of the remote STREAMS environment.

The foregoing and other objects, features and advantages of the invention will be apparent from the following detailed description in conjunction with the drawings.

BRIEF DESCRIPTION OF THE DRAWINGS

FIG. 1 is a block diagram representation of a computer system having a distributed communication facility.

FIG. 2 is a block diagram representation of a general purpose computer (GPC) system having multiple application processing units (APU) and multiple I/O processing units (I/OPU) using the distributed communication facility of the FIG. 1 type.

FIG. 3 is a block diagram representation of the distributed communication facility of FIG. 1 for a device abc.

FIG. 4 is a block diagram representation of the distributed communication facility indicating certain states of execution during operation.

FIG. 5 is a block diagram representation of the bottom portion of the distributed communication facility of FIG. 3.

DETAILED DESCRIPTION

Distributed Protocol Stack—FIG. 1

In FIG. 1, a distributed computer system 6 is formed with a protocol stack 12 distributed between a stack top 15 and a bottom stack 16. The computer system 6 includes one or more application processors 8 having an application processing unit (AP PU) 10 for running applications, such as application (APP) 22, under control of an application processor operating system (AP OS) 20. The application processor 8 also includes application memory 13 which is within the address space of the processor 8 under control of the AP operating system 20.

The computer system 6 includes one or more I/O processors 9 having an I/O processing unit (I/O PU) 11 for running under control of an I/O processor operating system (I/O OS) 21. The I/O processor 9 also includes I/O memory 14 which is within the address space of the processor 9 under control of the I/O operating system 21. The I/O processor 9 additionally includes at least one I/O device 24 communicating through protocol stack 12 with the other parts of the communication system 6. Device 24 is a terminal, a network or other I/O device.

In the FIG. 1 computer system 6, the operating system 20 is typical of most general-purpose computer operating systems (such as UNIX, NT, UTS and so forth) that have a STREAMS framework for which most drivers (especially communications drivers) are written.

In the FIG. 1 system, the distributed protocol stack 12 off-loads communication or other I/O processing from the application processor 8 to a dedicated I/O processors 9 thereby enhancing the performance/capacity of the computer system 6.

The distributed protocol stack 12 is formed of a stack top 15 and a stack bottom 16 so that together the stack top 15 and stack bottom 16 are functionally equivalent to a conventional non-distributed full protocol stack running only on an application processor 8. The distributed protocol stack 12 includes a distributed facility 14 logically between the stack top 15 and the stack bottom 16 whereby stack references made in the stack top 15 to the stack bottom 16 are transferred to the stack bottom 16. Both the application processor 8 and the I/O processor 9 each appear to execute the full protocol stack 12, but the application processor 8 only executes the stack top while the I/O processor 9 only executes the stack bottom 16.

The distributed protocol stack 12 overcomes the problem of performance-limiting I/O functions running on the application processor 8 by delegating those I/O functions to an I/O processor 9. The I/O processor 9 is designed not to have the full overhead of the application processor 8 so that the I/O processor 9 is able to efficiently run the stack bottom 16.

The distributed protocol stack 12 improves the overall throughput of the system since the application processor 8 has fewer I/O interruptions and the I/O processor 9 is not burdened with the complexity of the application processor 8.

The distributed protocol stack 12 uses drivers having a system call interface that preserves compatibility with the source and binary software of existing user applications designed to execute on a system with a non-distributed protocol stack. The application 22 is, for example, a user application designed to execute on a system with a non-distributed protocol stack.

Also, the distributed protocol stack 12 is flexible and portable and thereby can shorten the time to market for newly developed products.

The distributed protocol stack 12 is, for example, a distribution of the UNIX STREAMS environment to one or more dedicated I/O processors, such as processor 9. The system call interface of computer system 6 that would otherwise exist for a non-distributed environment is unchanged regardless of the distribution of the STREAMS environment to the remote I/O processor 9.

In the I/O processor 9, the I/O operating system 21 is a real-time operating system which executes efficiently with high speed and, in such case, the stack bottom 16 is fine-tuned to run with the real-time operating system.

In the FIG. 1 system, the distributed protocol stack 12 transparently extends the STREAMS definition to the real-time environment of I/O processor 9. Specifically, applications such as application 22 in FIG. 1 and the STREAMS environment on the application processor 8 are not aware that part of the communication stack has been off-loaded to I/O processor 9. The drivers and modules written to run on the native operating system, like AP operating system 20 prior to any distribution, also can run on the faster environment of the dedicated high-speed I/O processor 9.

The distributed environment of the FIG. 1 system not only helps to promote software-reusability, but also leads to greater system throughput with minimum effort by system developers.

AMP Architecture With Distributed Protocol Stack—FIG. 2

2.0 General

FIG. 2 depicts a multiprocessing system that employs an asymmetrical multiprocessing (AMP) architecture. In the FIG. 2 architecture, each of a plurality of application processing units 10, including application processing units APU1, APU2, . . . , APU(A) designated 10-1, 10-2, . . . , 10-A, executes less than all tasks, delegating kernel I/O processing tasks to the I/O processing units 11, including I/O processing units I/OPU1, I/OPU2, . . . , I/OPU(I) designated 11-1, 11-2, . . . , 11-I. Communication is with each of the I/O devices 24, including devices 24-1, 24-2, . . . , 24-D.

In FIG. 2, the number U of users, the number A of application processing units, the number I of I/O processing units, and the number D of devices generally are all different numbers.

In FIG. 2, the computing system includes a distributed protocol stack 12 having a stack top 15 and a stack bottom 15.

In FIG. 2, a distributed computing system is formed by the general purpose computer system (GPC) 7 with a distributed protocol stack 12. In the system 7, the application processors 10 run applications 22 and the distributed protocol stack 12 off-loads communication or other I/O processing from the application processors 10 to dedicated I/O processors 11 thereby enhancing the performance/capacity of the system 7.

The AMP architecture of the FIG. 2 system could readily be modified to a symmetrical multi-processor architecture (SMP) if the distributed protocol stack 12 were formed of a single non-distributed stack executing entirely in the application processor 8.

However, in the AMP architecture, the application processor 8 appears to execute the full protocol stack, but the application processor 8 only executes the stack top 15. Similarly, the I/O processor 9 only executes the stack bottom 16, but makes the slack top 15 and application 22 appear to be executed locally on the application processor 8.

Since many general purpose computer operating systems have a STREAMS framework for which I/O drivers (especially communications drivers) are written, the distributed protocol stack 12 permits those pre-existing drivers to be used in the FIG. 2 system unaware that part of the communication stack has been off-loaded. The drivers and modules written to run on a non-distributed native operating system run more efficiently on the dedicated high speed I/O processing units 11 in a faster environment. The drivers and other modules that are pre-existing, therefore, can still be used in the FIG. 2 system.

In the embodiment described, the Distributed STREAMS Framework Drivers (dsfdrv.c and mirror.c) are used for UNIX SVR3.2/UNIX SVR4 host-based operating system software. These STREAMS drivers(dsfdrv.c, mirror.c) provide the necessary support to propagate the STREAMS environment of the UNIX native and non-distributed SVR3.2/UNIX SVR4 kernel to a real-time environment on a dedicated I/O processor 9. The drivers transparently interconnect a multiple STREAMS environment. Also the system call interface of the Distributed STREAMS Framework (DSF) drivers (dsfdrv.c, mirror.c) preserves the source and binary compatibility of the existing base of user applications. The system call interface is unchanged regardless of the location of the remote STREAMS environment.

Each remote driver and remote module that is accessible by the local user process is associated with an independent instantiation of this driver/module in the local environment. This instantiation of this driver/module is called a proxy driver/module.

In the embodiment described, application processor 8 STREAMS based DSF drivers are present for a UNIX SVR4 or any UNIX SVR3.2 kernel. The functions necessary to achieve a connection between the DSF drivers in the local environment (UNIX SVR4 or UNIX SVR3.2) of processor 8 and the DSF drivers in the remote environment of I/O processor 9 are provided.

The remote DSF environment 62 enables the normally local STREAMS environment in AP processor 8 to be extended to an environment that facilitates the execution of STREAMS drivers and modules remotely in I/O processor 9 of FIGS. 1 and 2. The drivers and modules which run on a native local operating system also run on I/O processor 9 which can have a non-UNIX environment.

In a conventional communication protocol, a processor including one or more processing units, memory, local peripheral devices supporting a STREAMS framework is typically. However in the Distributed STREAMS framework (DSF) more than one STREAMS environment exists. All STREAMS based components (system calls, libraries, etc.) which expect a single STREAM environment transparently access the resources of DSF. However, because two different operating systems are running (AP OS 20 and I/O OS 21), the STREAMS driver/modules executing in the remote STREAMS environment of I/O processor 9 are not able to share data via memory 13 with STREAMS driver/modules in the host STREAMS environment. Data can be shared by sending STREAMS based messages. The STREAMS framework defined for a single native operating system expects such messages.

Although the STREAMS environment is normally limited to a mono-processor or Symmetrical Multiple Processor (SMP) UNIX kernel, the present invention extends the STREAMS environment to a Asymmetrical Multiple Processor (AMP) architecture. All software developed for use in the SMP UNIX kernel is transparently migrated to remote I/O processors 9 running real-time operating systems such as I/O OS 21. The architecture extension can be distributed over any combination of the STREAMS environments. In one example described, the DSF of the present embodiment is a host-controller environment.

In the present embodiment, Drivers/Modules which are ported to the remote environment 62 comply with the SVR4 STREAMS environment. Drivers and Modules running in the remote environment 62 of I/O processor 9 run in that local environment concurrently without modification to the applications 22 running in the environment of AP processor 8.

For example in the present embodiment, it is possible for the ioctl link(I_LINK or I_PLINK) request to time out on the host application processor 8 STREAMS environment while the remote STREAMS environment on the I/O processor 9 is still processing. After this time out, the remote I/O processor 9 and the host application processor 8 do not agree on the link state. Therefore, the stream has to be closed after a link timeout failure. The situation is similar to a timeout of the link request for a non-distributed STREAMS environment. However, the timeout is more likely to happen in a distributed environment where the connection to the remote I/O processor 9 might temporarily be down, where due to high traffic volume, the request does not get out in time, or where the response is delayed.

2.1 Distributed Protocol Stack on General Purpose Computer

The distributed protocol stack has components which reside on the general purpose computer and the distributed protocol stack depends on the AP processor 8 in the general purpose computer 7 to provide a STREAMS environment. One STREAMS is on an UNIX system in AP processor 8 while the other is on a real-time instantiation of STREAMS in I/O processor 9.

2.1.1 Distributed Protocol Stack Driver (Media Independent)

Distributed protocol stack drivers in stack 12, running in the UNIX environment of AP processor 8, are responsible for establishing a connection with the remote real time environment of I/O processor 9. The AP processor 8 stack drivers link the media driver, exchanges some distributed protocol stack related protocol information with the remote side of I/O processor 9 and monitors the state of the media driver. The media driver is any reliable medium. The proxy driver establishes a bridge between the local STREAMS environments and the remote STREAMS environment. Its also coordinates the actions of the two STREAMS environments. The component also handles the translation of messages to formats which are understood by the remote and local environment.

2.1.2 Routing and Media Tables

The distributed protocol stack environment requires an internal table from which it can route user open request to remote environment. The routing information may specify an address pointing to a remote driver.

The media tables has all the important properties regarding the medium used to connect the two distributed protocol stack environments. These tables are ASCII files. Each individual media daemon process will configure the medium according to the parameter specified in this table.

2.1.3 Proxy Drivers

Each remote driver and remote module that is accessible by the local user process is associated with a proxy of this driver/module in the local environment. This component is called a proxy driver/module.

2.1.4 Porting

The porting of existing STREAMS I/O drivers from non-distributed streams environments is based upon the functions that the drivers provide in the general purpose non-distributed computer environment. I/O functions which could reduce AP processor usage (by not interrupting frequently) are the type of functions that are ported. Protocol processing which requires immediate acknowledgments, also benefits from being ported to the I/O processor.

In FIG. 2, an X.25 communication protocol stack running on a general purpose computer 7 is typical. The X.25 drivers and LAPB drivers do most of the protocol processing, error checking, etc. To improve the overall performance of the general purpose computer the X.25 drivers and the LAPB drivers that normally run in AP processor 8 are off-loaded to a specialized I/O processor 9. The distributed protocol stack allows the X.25 module along with the LAPB module to be moved transparently to the dedicated I/O processor 9. The processes running on the AP processor 8 continue to function in the normal manner.

2.1.5 Media Drivers

The distributed protocol stack environments need a reliable media to exchange data. A reliable media is one that guarantees that data transmitted reaches the remote side without any error. A media can be shared memory, VME bus, or an X.25 connection. The distributed protocol stack has no dependency on the media, except that it should be reliable. The media driver automatically reconnects when the media path breaks.

2.1.6 Multiple Media Support

The General Purpose Computer 7 can support multiple media concurrently. There is no limitation on the amount or type of media that can be active at a given time. The remote distributed protocol stack also supports the media.

2.1.7 Multiple I/O Processor Support

The distributed protocol stack can connect to multiple I/O processors via different media drivers concurrently. There is no restriction on the number of I/O processors it can support.

2.2 Distributed Protocol Stack Files on General Purpose Computer

The distributed protocol stack drivers on the AP processor 8 side include the following files:

dsfdrv.c

Links the media driver and sends all distributed protocol stack exchanges to the remote distributed protocol stack. This link is prior to the media being declared up and running. The media daemon links the media driver underneath the dsfdriver. The routing and media table are downloaded by the dsf_daemon and the respective media daemon(s).

mirror.c

Implements the distributed protocol stack protocol and acts as a proxy for the actual driver which is running on the remote distributed protocol stack.

mirror.h

Has the definition of all the private data structures used to operate the distributed protocol stack locally.

dsf_daemon.c

Brings up the distributed protocol stack STREAMS stack and downloads routing tables.

media_daemon.c

Downloads the media parameter and links the media to the distributed protocol stack driver.

dsf_trace.c

Trace program which captures all distributed protocol stack related messages sent over the media. The data is captured in binary format.

dsf_format.c

The binary data captured by dsf_trace is formatted to ASCII by this program.

mr_route

An ASCII file which has the routing information for each driver/module which run on the remote distributed protocol stack.

mr_media

An ASCII file which has important media related information. The AP processor distributed protocol stack uses this media STREAMS driver to communicate with the Remote distributed protocol stack.

2.3 Distributed Protocol Stack on I/O Processor

Distributed protocol stack provides the illusion of a STREAMS environment on top of a real-time operating system, allowing STREAMS drivers to be ported. A communications module links the STREAMS environment on the I/O processor with the STREAMS environment on the general purpose computer to give the impression of one unified STREAMS environment. Application programs on the general purpose computer do not realize the distributed nature of distributed protocol stack.

2.3.1 Hardware Dependent Environment

The distributed protocol stack on the I/O processor depends on a real time operating system providing s preemptive scheduling. Other functions like timer interrupt should also be available for distributed protocol stack to run.

2.3.2 Core Streams

The STREAMS scheduler runs in one task (the STREAMS task). The STREAMS heads (either for a stream or an distributed protocol stack stream) run in separate tasks. They can also cause the STREAMS queues to be executed.

2.3.3 Distributed Protocol Stack Agents (User Process)

Most of the processing in STREAMS takes place without the context of a user process. However some system calls like the opening or closing of STREAMS require this context. This code can contain a call to sleep() which stops this thread of execution for some time. As the main STREAMS processing takes place in one VRTX task, it cannot sleep. Therefore all the processing that potentially sleeps has to execute in the context of a separate task. These tasks are controlled by the distributed protocol stack agent.

2.3.4 Distributed Protocol Stack Protocol

Distributed protocol stack protocol consists of administrative and data messages. Administrative messages are used for opening, closing, pushing, popping, linking, unlinking STREAMS driver/modules.

Remote Open
: Allows a remote user to open a STREAMS driver.

Remote Push
: Allows a remote user to push a STREAMS module.

Remote Close
: Allows a remote user to close a STREAMS driver.

Remote Pop
: Allows a remote user to pop a STREAMS module.

Remote Link
: Allows a remote user to link a STREAMS driver.

Remote Unlink
: Allows a remote user to unlink a STREAMS driver.

Flow Control
: Back pressure remote distributed protocol stack from sending data messages. This concept is similar to the caput function provided by STREAMS framework. The flow control protocol has the goal to reliably deliver messages from one stream component to the other, provide high throughput and little overhead. The reliability is based on sequence numbers and acknowledgments, the high throughput is achieved through the windowing scheme, and the protocol is parsimonious with ACK and NAK messages as well as window updates and does not require timers to ensure low overhead.

Error recovery
: If the distributed protocol stack environment does not have enough memory it can throw out a data message. A nak administrator message is send to the remote side along with the sequence number. The remote side retransmits the dropped message again.

Priorities
: Set the priority of a connection to a higher value than the base value.

Synchronization and Recovery
: When a media reports an recoverable error, the communication module and the media driver try to reconnect and recover gracefully in a transparent manner.

Negotiation
: The distributed protocol stack negotiate the version number, the data representation, the amount of active connection still pending, during initial bring up phase of distributed protocol stack.

Reconnection Message Exchange

After the open exchange is complete, an exchange of reconnect messages follows (if there are already open streams). Each side sends the ids of its open streams and the stored partner ids as well as the sequence number of the last messages received for each priority and the available window to the remote. Each reconnect request can only contain a limited number of ids, thus multiple reconnect requests might be necessary. Each reconnect request is responded to with a reconnect response that contains the list of streams that have no partner. This list can be empty. Only after this exchange is complete can other messages be sent. Every request has to get an response. Streams with no partner will be closed.

Send ahead partial message

When memory congestion level is reached partial data messages can be send to the remote side to store. The remote side will not send the message to the user until the complete message has been assembled.

Dynamic Window Adjustment

The window size allows the remote distributed protocol stack environment to send distributed protocol stack data messages. However, the value of the window size gets adjusted according to its use. If resources run out, the window sizes of all streams will be reduced (cut in half). If after some time (one second or so) resources are still not enough further reductions can be imposed up to a limit of one eighth of the original window size. If more resources become available the window size is increased again.

Communication module

Allows the connectivity between the partners of a distributed stream.

Keep a live messages

Sent by distributed protocol stack to check if the remote environment is active.

Fragmentation

In order to be independent of the maximum message size, a medium large messages can be fragmented. Fragmentation is only supported for data messages. It is assumed that the maximum message size of a medium is always larger than the largest possible administration message.

2.3.5 Multiple Media Drivers

The I/O processor 9 can support multiple media concurrently. There is no limitation on the amount of media that could be active at a given time.

2.3.6 Multiple General Purpose Computer Support

Each media path can be to different general purpose computer or to the same general purpose computer.

2.4 Distributed Protocol Stack Files On I/O Processor adm55.h

Distributed protocol stack specific file, administration driver.

agent.h

Distributed protocol stack specific file.

calloc.h

No modifications.

clock.h

Modified file. Contains lbolt declaration and function prototypes for timeout and delay functions.

cmn_err.h

Removed definitions that are not used from SVR4 file.

conf.h

Removed line discipline and terminal related stuff, modified the type struct cdevsw and struct fmodsw (see chapter on configuration).

cred.h

Removed crhold macro and the function prototypes that are not supported.

debug.h

No modifications.

ddi.h

Modified file. Contains only supported things.

devlist.h

Special file used for configuring devices.

dsf.h

Contains distributed protocol stack type definitions that are shared between the AP processor and the I/O processor.

dsf_obj.h

Contains distributed protocol stack type definitions that are I/O processor specific.errno.h Standard SVR4 defines of error codes.

file.h

Contains defines and function prototypes that are used for streams that originate on the I/O processor.

ioccom.h

No modifications.

kmem.h

Additional defines, types and prototypes.

log.h

No modifications.

lstream.h

Definitions for streams originating on the I/O processor.

mkdev.h

Contents unmodified.

param.h

Unnecessary code removed.

privilege.h

No modifications.

proc.h

Distributed protocol stack specific file. Not to be used by drivers or modules.

sad.h

No modifications.

secsys.h

Removed not needed definitions.

signal.h

Kept only the definitions of the signals (for use by STREAMS drivers).

stream.h

Removed struct str_evmsg and included the GPC's link id in the last element of l_pad[]. No other modifications.

strlog.h

No modifications except that NLOGARGS is increased to 4 from 3.

strmdep.h

No modifications.

stropts.h

Removed event and file descriptor passing related definitions. No modifications.

strstat.h

No modifications.

strsubr.h

Modifications to struct stdata to remove non-supported features like event and signal processing. Added a distributed protocol stack specific field to the struct. No other modifications in the file.

syslog.h

No modifications.

sysmacros.h

Macros retain the same meanings. No modifications a driver or module writer needs to worry about.

termio.h

No modifications.

termios.h

Removed definitions not used by STREAMS implementation.

told.h

Removed definitions not used by STREAMS implementation.

types.h

No modifications.

var.h

Removed all definitions not needed by distributed protocol stack.

vmedrv.h

Not used by distributed protocol stack, SVR3.2 specific driver.

vmedrvshr.h distributed protocol stack specific Erie to communicate with the SVR3.2 base VME driver.

vnode.h

Distributed protocol stack specific header file. Not to be used by drivers or modules.

2.5 Library Functions

Besides the functions that make up the intrinsic STREAMS environment, STREAMS drivers can call other functions that are supplied by the UNIX kernel and therefore have to be supplied by the distributed protocol stack environment as well to make STREAMS drivers and modules portable. There are two groups of functions: library functions like strcpy(), bcopy(), or sprintf(), and secondly UNIX functions like sleep(), wakeup() and timeout(). The first group is supplied as a library together with the C-compiler.

2.6 Standard Drivers

Some STREAMS drivers come as part of the environment. If they are to be used, they need to be configured explicitly. The clone driver (necessary to define clone devices) functions in the same way as under SVR4.

Log\ driver

The log driver supports the strlog() function. A special trace command needs to be used that will talk to this remote log driver but otherwise works just the same as the standard trace.

STREAMS Admin Driver

Standard driver to do autopush and module name verification. The admin driver responds to admin requests. It also functions as a loopback driver that echoes the data sent to it on one stream to another.

STREAMS Pass through module

The pass through module is an example module that just passes data through unchanged.

Specific Embodiment—FIG. 3 and FIG. 4

3.1 Overview

In FIG. 3, a block diagram representation of the distributed communication facility of FIGS. 1 and 2 for a device 64 (abc) is shown. In FIG. 3, the local streams environment 54 runs on the application processor 8 of FIGS. 1 and 2 and the remote STREAMS environment 62 runs on dedicated I/O processor 9 of FIGS. 1 and 2. Two STREAMS media drivers 57 and 58 are provided to communicate over a physical channel 60 between the two DSF environments. The sctm.c STREAMS driver for application processor 8 is, in the embodiment described, for a UNIX SVR4/AMDAHL 390 Architecture processor. The vmedrv.c STREAMS driver for I/O processor 9 is, in the embodiment described, for a UNIX SVR3.2/AMDAHL 4655 I/O processor connected to a VME bus.

The major components of the distributed streams facility (DSF) are represented along with some user proxy driver/modules and actual drivers/modules in FIG. 3.

The DSF upper driver (dsfdrv.c) 55 is responsible for establishing a connection with the remote DSF environment 62. The DSF driver 55 links the media driver (sctm.c) 57 and the media driver (vmedrv.c) 61, exchanges DSF related protocol information with the remote environment 62 and monitors the state of the media drivers 57 and remote media handler 61.

The DSF driver 55 (mirror.c) establishes a bridge between the local UNIX STREAMS environment 54 and the remote STREAMS environment 62 and also co-ordinates the actions of the two STREAMS environments. The mirror.c component also handles the translation of messages to formats which are understood by the remote and local environments.

In FIG. 3, the proxy driver 59 represents the driver, actually located in the remote environment 62, in the local DSF environment 54. Proxy driver 59 is a stub and uses all the functions provided by the local (Host) DSF.

The dsf_daemon 50 is a daemon process which brings up the Host DSF in AP processor 8. It downloads a routing table 65 (see FIG. 4) into the Host DSF and spawns off the media daemons. These media daemons (chan_adm, vmeadm) link the STREAMS media driver underneath the DSF driver(dsfdrv.c).

3.2 Driver Routing Table(mr_route). The DSF environment requires an internal routing table 65 from which it can route user open request to the remote environment 62. The routing information may specify an address pointing to a remote driver. This file(mr_route) resides in a well known directory (/etc/opt/dsf). The table set up phase consist of loading some routing information into the DSF drivers. This is done by the DSF daemon (dsf_daemon).

The routing table consists of the following information:

TABLE 1

| Host DSF STREAMS driver routing table | | | |
|---|---|---|---|
| Device type | Host device name | Media value | Remote referral |
| c | /dev/dk/tty | OEMI 0f02 | tty |
| s | /dev/ad55 | OEMI 0f12 | adm55 |
| c | /dev/dlog | OEMI 0f22 | log |

The Device type identifies to the DSF drivers that the remote device referred in the host environment is either clone(c) or a normal(n) device. At system configuration time, the kernel 52 reserves a user-specified number of major numbers. Each major number is associated to a separate proxy driver 59. The remote reference consist of the actual driver name used by the remote configuration manager. This information is sent to the remote environment during an open request.

The Host device name is the name of the driver in the host environment. A full path is defined to access the driver and get relevant information.

The media value helps the DSF driver(mirror.c) 55 to bind with the remote environment 62. It's value type depends upon the media channel 60. The media daemon for each media makes up this value. The media value is a string, containing the media name followed by a space followed by a well differentiated parameter. This parameter is the first argument to the media daemon. The media value is also entered in the routing table field. Each driver, running in the remote environment, has to have a media value. This value helps the DSF drivers to locate the remote driver.

In the embodiment described, for example, an OEMI channel and VME bus are the media available on the DSF for channel 60.

The remote reference identifies the remote driver. The remote driver runs in a remote STREAMS environment 62 providing most of the functionality.

The table is down loaded into the DSF drivers by the DSF admin daemon (dsf_daemon).

3.3 Host Media Table (mr_media)

The media table 66 (see FIG. 4) is an ASCII file consisting of the following fields:

TABLE 2

| Host media table (mr_media) | | | |
|---|---|---|---|
| State | Admin Name | Media value | Parameter |
| a | /etc/chan_adm | 1a12 | <ppa> <blk> <command chaining> <data streaming> |
| a | /etc/vmeadm | 0 | <bsize> <no of blocks> |

The State defines if the media is to be linked under the DSF drivers. If the field state is active ("a"), then the dsf_daemon will spawn the corresponding media daemon. If the field is deactivated ("d"), then the DSF daemon(dsf_daemon) continues looking at other records in the table.

The Admin Name identifies the path and the name of the communication administrative driver. The DSF daemon spawns this program, passing the Media value as the first argument to the program.

The Media value helps the DSF driver(mirror.c) to identify the path to the remote DSF environment. It's value depends upon the media type. This value is passed to the media daemon as the first argument. This is important, since the routing by the DSF driver depends on it.

More information is stored in the field Parameter. The value stored in this field is media dependent. For the channel driver(sctm.c), the value identifies the read channel address to which it is attached and the channel block size. The OEMI channel driver(sctm.c) also allows command chaining and data streaming options. These values are also passed to the media administrative daemon as arguments.

The values in the media table 66 can be changed at any instant. If a new daemon needs to be started, then a script file restart_media is invoked. This only applies for activating a particular media. For deactivating a given media simply send a SIGTERM to the appropriate media daemon. This will cause a graceful closing of the media to take place.

The media daemon(chan_adm.c, vmeadm.c) is responsible for downloading this table into the DSF driver(dsfdrv.c).

3.4 System Operations

The following components makeup the Host DSF.

3.4.1. The DSF daemon (dsf_daemon) will help in building the stack. This stack helps a user to run their STREAMS based drivers in a remote environment. The daemon will load the routing table from "/etc/opt/dsf/mr_route" into the DSF drivers(dsfdrv.c). The DSF daemon will spawn all the communication daemons that will link the respective medium under the DSF drivers(dsfdrv.c). It does that, by opening a database file (/etc/opt/dsf/mr_media). This database file will contain a list of all the active communication daemons and its pertaining media parameter.

3.4.2. The communication media daemons (chan_adm and vmeadm) are responsible for successfully opening the communication media driver (sctm.c and vmedrv.c) and linking it under the DSF drivers(dsfdrv.c). The communication media daemons will load all media related parameters to the DSF drivers(dsfdrv.c). If the parameters are successfully loaded, the DSF drivers(dsfdrv.c) negotiate the DSF parameters with the remote environment. At this stage, the DSF drivers is ready to service the users on the local side.

All media related parameters are send by the DSF daemon(dsf_daemon.c) as arguments when the communication media daemon(chan_adm, vmeadm) is spawned.

Another function of the communication media daemons(chan_adm and vmeadm) is to monitor the media for critical failures. On critical failures, the communication media daemons(chan_adm, vmeadm) will try to relink the media driver(sctm.c, vmedrv.c) to the DSF drivers(dsfdrv.c).

3.4.3. The DSF functionality is implemented in the dsfdrv.c and mirror.c files. The DSF administrative and routing functionality is provided by a multiplexing driver (dsfdrv.c) which has a clone interface. It is responsible for maintaining the routing table (mr_route)information as well as maintaining the media related parameters. It talks with all the media daemons(chanadm, vmeadm). Multiple communication media daemons can connect to this driver and monitor the state of the media. In case of a media failure, this part of the DSF driver(dsfdrv.c) will pass a message up stream to the daemon(chan_adm, vmeadm).

3.4.4. The other part of the DSF functionality is provided by mirror.c. The DSF driver(mirror.c) establishes a bridge between two STREAMS environments and co-ordinate their respective actions. The component also handles the translation of the messages to formats which are understood by the remote environment. It provides a reliable mode of transportation of data. If the media breaks or the remote environment fails, the DSF driver(mirror.c) will try to recover the connections previously established. It coordinated with the dsfdrv.c for sending data to the remote side.

3.5 Trace Functions

The host DSF provides a means by which messages sent to the media driver(sctm.c, vmedrv.c) and received by the media driver can be captured and stored in file(s). A trace program(dsf_trace) invokes the trace functionality of the DSF drivers.

The syntax for invoking the trace functions is as follows:

```
dsf_strace –m<media name>–f<filename>
```

The "media name" is the value of the media whose trace functionality is to be invoked. The value is defined in the mr_media table.

The "filename" is the path name and the name of the file where the raw data gets stored. The default value is "/etc/opt/dsf/dsf_trace".

Once the raw data is available, a format program(dsf_format) will convert the data into a format which will be able to be easily analyzed.

3.6 DSF Driver(mirror.c)

Each remote STREAMS driver that is accessible by a local user process is associated with the proxy driver. The DSF driver(mirror.c) along with the proxy driver, which is being remotely executed is configured in the local environment.

3.6.1 Data Structures

The DSF driver(mirror.c) keeps track of each instance of an active connection via the following data structure.

```
struct mrr_element {
    int mrr_major;                        /*Corresponds to the major */
    queue_t *urqptr;                      /*upper queue. */
    mrr_route_info_t *route;              /*hash table pointer for this conn */
    int med;                              /* index into media table */
    int mrr_minor;                        /* Minor number assigned */
    int state;                            /*Conn Stage,Data Tx,Comp Stage */
    int status;                           /* Status of media */
    int pri;                              /*DSF_NORMAL or DSF_BAND_PRI */
    toid t bid;                           /* bufcall id for dupb failure */
    toid_t cbid;                          /* bufcall id for open close, pop */
    toid-t ctid;                          /* timeout id push and allocb failure */
    mblk_t *hi_pri_msg;                   /* Save allocb fail messages */
    mrr_act_admin_t *info;                /* store active admin info */
    int error_code;                       /* Error code returned by admin resp */
    mrr_element_t *mrr_next;              /* Next on a given media */
    mrr_stats_t stats;                    /* Statistic for a given connection */
    struct r_queue_info remote;           /* remote queue information */
    int ack_nak_being_snd;                /* Flag that an acknak msg is send */
    mblk_t *ack_nak_msg;                  /* Ack/Nak message being saved */
    toid_t tout_snd_ack_nak;              /* Ack nak messages need to be send */
    int msg_being_send;                   /* Flag to indicate msg being send */
    toid_t tout_msg_being_snd;            /* Wait timeout when msg being send */
    int msg_being_rcv;                    /* Flag to say mssg being send to user */
    int wait_on_close;                    /* Flag to indicate close routine to wait */
    cred_t *io_cr;                        /* value of cred ptrs for ioctls */
    sv_t *svp;                            /* unit structure synchronization - eg. close */
    lock_t *lkp;                          /* unit structure basic lock for read-write */
    pl_t oldpl;                           /* priority level held by lock */
};
```

3.6.2 STREAMS Processing Procedures 3.6.2.1 Open Function(mrr_open)

The open system call is directed to the DSF driver(mirror.c) open routine. The open routine will extract the information referenced by its major number from its routing table. In FIG. 3, a remote open system call occurs as follows. An open on a remote module is identified locally by the parameter sflag send during open. When the user process issues an I_PUSH ioctl, the stream head calls the modules open function with the sflag set to MODOPEN. The routing information specifies an address pointing to the remote driver environment 62. The open routine in the DSF driver (mirror.c) then makes an R_OPEN_REQ message for the remote environment 62 and sends it to the media driver 57. It then sleeps, waiting for the remote side environment 62 to respond. When the remote side sends an R_OPEN_RESP, the DSF driver(mirror.c) is notified. The DSF driver(mirror.c) then sends the response to the user process 51.

3.6.2.2 Close Function (mrr_close)

The close system call is directed to the DSF driver(mirror.c) close routine.

Referring to FIG. 3, the close routine in DSF driver (mirror.c) makes an R_CLOSE_REQ message for the remote side and sends it to the media driver 57. It then sleeps, waiting for the remote side to respond. When the remote side sends an R_CLOSE_RES, the DSF driver(mirror.c) is notified. The DSF driver(mirror.c) then sends the response to the user process 51.

The stream head 53 calls the close routine of the DSF driver(mirror.c) when a user issues a I_POP ioctl. The close routine identifies, that the close is for a module and issues a R_POP_REQ to the remote side. When the remote side sends a R_POP_RESP, the DSF driver(mirror.c) is notified. The DSF driver(mirror.c) then sends the response to the user process.

3.6.2.3 Upper Write Put Function(mrr_uwput)

The upper put function does standard processing for M_FLUSH messages, however for other message types it takes different action. If the message is an M_IOCTL type and of type I_LINK, I_UNLINK, I_PLINK or I_PUNLINK, then it sends an R_LINK_REQ/R_UNLINK_REQ message. Other types of messages are sent as "data messages" to the remote environment. The messages are however converted into the format defined. The DSF driver's put function queues the message if the media is down temporarily or the remote queue has asserted flow control.

3.6.2.4 Upper Write Service Function (mrr_uwsrv)

The upper write service function of the mirror does standard service routine processing. If the remote queue is blocked, or the media is blocked then the messages are not processed. Otherwise the same processing as in mrr_uwput is done.

3.6.2.5 Lower Read Put Function (mrr_lrput)

This function accepts data messages from the media driver 56 and parses it for all types of messages. Messages received are either DSF_ADMIN or DSF_DATA. On data messages of type DSF_DATA, the function allocates a message block, copies the data into the message block and sends it immediately to the user. In case of allocation failure, the data is discarded and the remote side is informed.

The function also interacts with the DSF admin driver. All DSF related messages are sent to the admin stream.

3.6.2.6 Lower Read Service Function(mrr_lrsrv)

The lower write service function forwards all queued message, if the queue is not blocked to the upper stream.

3.7 DSF Administration and Configuration Driver (dsfdrv.c).

3.7.1 Data Structures

The DSF driver maintains a media structure for all active media. The data structure is as follows.

```
struct media_obj {
    int status;                          /* Status of the media, left by the admin */
    int index;                           /* Minor Number associated with admin stream */
    toid_t bid;                          /* bufcall id */
    toid_t xrsbid;                       /* id for bufcall on xchange resp */
    int xch_resp;                        /* how many exchange to be send */
    unsigned short open_strms;           /* remote STREAM count,send during reconnect */
    unsigned short error_code;           /* Error code if Failure */
    int dsf_reconn_count;                /* DSF request count received */
    short activator;                     /* ACTIVE OR PASSIVE */
    short xch_index;                     /* Index into mrrcon when sending xch mssg */
    mrr_element_t *xch_con;              /* Next xch_con to send during xchange */
    queue_t *urq;                        /* Store the admin Read processes queue. */
    queue_t *urtrq;                      /* Read queue of logging trace */
    unsigned int version;                /* DSF version number */
    unsigned int trc_count[2];           /* Trace counter number */
    unsigned char conv_flags[4];         /* Data representation */
    toid_t keepalive;                    /* Keep alive timeout with remote DSF */
    int missed_keepalive;                /* How many to miss before giving up */
    med_stats_t stats;                   /* Stats info */
    com_med_obj_t media;                 /* Information about media from admin */
    mrr_element_t *mrrcon[64];           /* Connection active on this media */
};
```

3.7.2 Processing Functions

The DSF driver(mirror.c) can only be used once the DSF environment is brought up. The user brings up the DSF environment with the help of the DSF daemon(dsf_daemon.c), the media daemon(chan_adm.c and vmeadm.c) and the routing(mr_route) and media(mr_media) tables.

The DSF driver(dsfdrv.c) provides a clone interface. This allows multiple media daemons to open connections and download appropriate information.

The functions offered by the DSF driver(dsfdrv.c) pertain to activating the proxy driver. All proxy drivers are considered "activated" after the following functions are successfully performed.

The functions are:

Downloading the routing table;

Opening a connection with the media driver (sctm.c, vmedrv.c, etc.);

Linking the media driver underneath the DSF driver(dsfdrv.c);

Downloading the media information(mr_media);

Exchanging DSF protocol related information(dsfdrv,.c).

Once these operation are done, the proxy drivers are available to communicate with the remote environment.

3.7.2.1 Downloading the Routing Table

The program responsible for downloading the routing table 65 is the DSF daemon. The DSF daemon (dsf_daemon) 50 first gets the routing information from the routing table(mr_route). The routing table (mr_route) exists in the/etc/opt/dsf/sub-directory in memory 13 of FIGS. 1 and 2. The DSF daemon opens a connection to the DSF driver(dsfdrv.c) 55 and issues an MR_ROUTE ioctl to the driver. If the download is successful then the DSF driver 55 will send a positive reply(M_IOCACK).

```
struct mrr_route {
    int mrid;                                  */ The Major number */
    char media_value[MED_VALUE_SZ];            /* additional routing info/
    char dev_name[DRV_NAME_LENGTH];
    };
```

The "mrid" indicates the major number of the device supported in the DSF environment.

The "media_value" indicates the media type. The media type identifies the reliable protocol to be used from a local host environment 54 to a remote environment 62.

The "dev_name" identifies the media name to the remote streams environment 62. This value is sent during the exchange of information between the local and the remote environments.

3.7.2.2 Opening a Connection With the Media Driver

The DSF daemon(dsf_daemon) 50 will spawn media daemons(chan_adm, vmeadm) which have been activated. To activate an OEMI channel media, an entry in the/opt/dsf/mrr_media file is created and marked as active. If the channel has been activated, then the channel media daemon(/opt/dsf/sbin/chan_adm) process will be spawned by the DSF daemon(dsf_daemon).

The DSF daemon will pass all related parameters to the channel admin daemon via command line arguments. The channel media daemon will open a connection with the actual media driver(in this case the sctm STREAMS driver). Each media driver(sctm.c) will have its own interface. To bind with the channel at a given media value, an attach request is sent, before a LINK can be issued on the mirror administrative driver.

3.7.2.3 Linking the Media Driver Underneath the DSF Driver

Once the media driver has been successfully opened and bound to a given media value, the next step is to issue an I_LINK to the DSF driver(dsfdrv.c). On a successful I_LINK the DSF driver will send an M_IOCACK to the daemon(dsf_daemon).

3.7.2.4 Downloading the Media Information

The media daemon(chan_adm) is responsible for loading the media related information to the DSF driver(dsf_drv.c).

```
struct usr_Media_obj {
    char id[MAX_ID_LEN]; /* Send during DSF_OPEN , to identify the media*/
    char media_value[MED_VALUE_SZ];
    A string indicating media information */
    };
```

The "id" contains the id of the media. It has to be unique. In case a connection breaks the id is used to reconnect the remote stream components. It is an ASCII string consisting of the name of the media used (like "OEMI channel", "tcp", etc.) followed by a space and a media specific address like the (sub)channel number or the internet address of the originator.

The "media_value" gives more information about the media. For the OEMI channel it identifies the channel address, the board no and the block size to use.

3.7.2.5 Exchanging DSF Protocol Information

Once the media related parameters are downloaded, the DSF driver(dsf_drv.c) issues a DSF open request to the remote environment. This is only if the host side is to be the activator of the media. If the host is responsible for bringing up the media, the DSF driver(dsfdrv.c) will pass a open request to the remote side.

The response to this open response is another open response message so that both sides agree about the state of the connection.

After the open exchange is complete, an exchange of reconnect messages might follow. Each side sends the ids of all its open streams and stores the partner ids as well as the sequence number of the last message received for each priority and the available window to the remote. Each reconnect request can only contain a limited number of ids, thus multiple reconnect requests might be necessary. Each reconnect request is responded to with a reconnect response that contains the list of streams that have no partner. This list can be empty. Only after this exchange is complete can other messages or data be sent. After this operation is successful, the media is put in a state where messages between the two remote STREAMS environments can take place.

This section covers the UNIX SVR 3.2 DSF driver (dsfdrv.c, mirror.c) and master configuration only.

The facilities provided by the DSF environment can be utilized after the configuration of the DSF drivers has been done correctly. This configuration has two steps. The first is the configuration on the I/O processor 9. The second part consists of configuration on the UNIX SVR 3.2 side in AP processor 8.

3.8.1.1 UNIX SVR 3.2 Driver Configuration

On the UNIX SVR 3.2 side the DSF drivers and the media driver(vine, ctm STREAMS based) need to be included in the UNIX SVR 3.2 kernel 52.

In UNIX SVR3.2 a devicelist(4) file exists in the/etc/ directory. This devicelist(4) defines the device types and the system configuration specification.

The DSF drivers manage the device type dsf. The syntax for describing the device is defined in the devicelist file:

[device-type][address(es) and/or other information]

The dsfdrv.c, dsf.h, mirror.c, dsf.h and the mirror.h files are stored in the /usr/src/uts/uts/io/dsf directory.

For a SVR 3.2, there is only one file in configuring the DSF and mirror driver:

Master(4) format

This master(4) files are in the master.d directory under the name of DSF and mirror. The master configuration file for DSF and mirror are maintained in the directory /usr/src/uts/tpix/32/master.d/. There formats are as follows:

[1] DSF Driver Description Section

```
#FLAG   VECS   PREFIX   SOFT   #DEV   IPL   DEPENDENCIES/VARIABLES
f60     -      dsf      -      1      -     clone
@
        # register routing table and media table size
        mrr_mediahp[MRARSZ] (%0×00)= {0}
        mrrhastbl[MRARSZ] (%0×00)= {0}
        nmrr_media(%0×00) = {MRARSZ}
        nmrr_route(%0×00) = {MRARSZ}
        $$$
        MRHARSZ = 64
```

3.7.2.6 Closing the Media Driver

The media driver(sctm.c, vmedrv.c) can be closed either from the host side or the remote side. In case the remote side encounters a fatal error, it sends a DSF close request message. The DSF STREAMS driver(dsfdrv.c) responds by sending a DSF close response to the remote side. The DSF driver(dsfdrv.c) send an M_HANGUP STREAMS message up the media daemon(chan_adm.c) queue. The media daemon(chan_adm, vmeadm) will then close all the file descriptors. This will cause the media driver underneath to be unlinked. However, before unlinking, the DSF STREAMS driver will issue an M_HANGUP STREAMS messages to all the active connections on the given media.

3.8 Configuring the DSF Drivers(dsfdrv.c mirror.c).

3.8.1 Configuring the DSF Drivers for UNIX SVR 3.2

FLAG—"f" specifies that DSF is a STREAMS driver. 60 is some arbitrary major number assigned, it can be any major number.

PREFIX—"dsf" uniquely identifies the DSF driver and is propounded to the DSF driver routines and variables.

DEPENDENCIES—The DSF driver interfaces with the clone driver.

The Proxy driver interfaces with the DSF driver.

[2] Device Information Section

The above example shows the variable definitions for the DSF driver:

```
# DSF driver variable definitions section
mrr_mediahp[MRARSZ] (0×00)
mrrhastbl[MRARSZ] (%0×00)
where MRARSZ defines the size of the array.
```

The DSF driver(mirror.c) has no variable dependencies.

3.8.2 Configuring the DSF Drivers For UNIX SVR4

This section covers the UNIX SVR4 DSF driver(dsfdrv.c) and the mirror(mirror.c) configuration only.

The facilities provided by the DSF drivers and proxy driver can be utilized after the configuration of the DSF drivers and proxy drivers has been done correctly. The second part consists of configuration on the UNIX side, the AP processor 8.

3.8.2.1 UNIX SVR4 Driver Configuration

On the UNIX side for the AP processor 8, the DSF drivers and the base STREAMS based sctm.c driver need to be included in the UNIX SVR4 kernel 52.

In order to overcome the major drawbacks of the UNIX SVR3.2 config(1M), UNIX SVR4 configuration tools provide an extensible and flexible mechanism for configuring device drivers and software modules.

In addition to devicelist(4) which defines the device types and the system configuration specification, a configuration database master(4) file which contains the relevant configuration information for the associated driver or modules is also included in the system.

This section contains all of the device-specific information, such as device types managed by the driver as well as the special device ties to be created for each device type.

The following is an example of the master file for the DSF driver:

```
dsf:0644:0
_CLONE_FMT ={ "dsf" }
@
```

"@" is the symbol that ends this section.

[3] Driver Variable Definitions Section

This section replaces UNIX SVR3.2's space.h and it generates all non-static external variables required by the driver. The following is an example of variable definitions for the DSF driver:

```
# DSF driver variable definitions section
# -- #C1 is the total number of media configured for /dev/dsf
entries
#
mrr_mediahp□ (%1)
mrrhastbl□ (%1)
#
# more information may be added in here for
# non-static data used by DSF driver
```

3.8.3 DSF Driver Source Directory

In UNIX SVR4, the kernel source and header files have to reside in the same directory.

```
Master(4) format
This master(4) is a master.d file
The master configuration file (dsf.cf) is maintained in the DSF drivers directory
/usr/src/uts/uts/io/dsf
Two configuration sections are implemented for the DSF and mirror master files
which are driver description, device information and driver variable definitions
```

[1] Driver Description Section

```
#FLAG PREFIX MAJOR #DEV SYSTEM_FMT ADDR_FMT DEPENDENCIES
Cf     dsf    -     1                        CLONE
```

FLAG—"C" specifies that the DSF is a clone driver. It will generate a special file as specified in the _CLONE_FMT for clone driver related operations to the DSF driver. "f" specifies that DSF and mirror are STREAMS drivers.

PREFIX—"dsf" and "mrr" uniquely identifies the DSF driver and proxy driver and is propounded to the driver routines and variables.

MAJOR—"–" defines that the DSF driver will be assigned an unused major number by UNIX SVR4 drvinstall(1M) command.

#DEV—"1" indicates that one minor is to be created for each device entry.

DEPENDENCIES—DSF driver interfaces with SCTM driver and thus SCTM must be included for configuring the DSF driver.

Since the DSF driver is also a CLONE driver, "clone" also needs to be present. The proxy driver interfaces with the DSF driver and thus must be included for configuration.

[2] Device Information Section

The directory /usr/src/uts/uts/dsf will contain the DSF driver source and related header files.

All the DSF driver related header files will be installed in /usr/include/dsf.

3.8.4 DSF Driver Source Directory

In UNIX SVR4, the kernel source and header files have to reside in the same directory.

The directory /usr/src/uts/uts/dsf will contain the DSF driver source and related header files.

All the DSF driver related header files will be installed in /usr/include/dsf.

3.9 Performance

The host based DSF STREAMS driver presents a high level of performance and allocates minimal overhead in processing all messages from the remote environment 62. The inter-processor message passing mechanism is reliable with a high throughput with minimum overhead. In the multiprocessor embodiment, "put" is avoided if the message can be directly "put" on the next queue.

3.10 Create a Proxy Ddriver in the Host DSF Environment

The purpose of the DSF environment is to allow the STREAMS driver/module to run in a remote STREAMS environment without major modifications to the driver/module code. This is a two step procedure. The first step is to configure your driver/module in the remote STREAMS environment.

The second step is to configure your driver in the native environment. The STREAMS driver/module has to be configured in the way defined into the native operating system.

3.10.1 Creating the Source File

The proxy driver will emulate your driver. However you have to create a source file which has the stream tab structure defined in it. This file replaces your driver/module file in the native environment.

An example of a proxy driver for the "tty driver" is explained below:

```
#include < dsf/mirror.h >
int ttydevflag = D_MP;        /* Used for UNIX SVR4 new open close interface */
extern int mrr_open(), mrr_close();
extern int mrr_urput(), mrr_ursrv(), mrr_uwput(), mrr_uwsrv();
static struct module_info linfo = {0, "tty", O, -1, 512, 128};
static struct qinitt tty_urinit = {mrr_urput,mrr_ursrv,mrr_open,mrr_close,NULL,&linfo,
NULL};
static struct qinit tty_unwinit = {mrr_uwput, mrr_uwsrv, NULL, NULL, NULL, &linfo,
NULL};
struct streamtab ttyinfo = {
    &tty_urinit,
    &tty_uwinit,
    NULL,
    NULL
};
```

All the mirror functions are defined as external functions. The module_info has to be defined according to your driver/module requirements. The elements of the qinit structure are filled with the appropriate DSF driver(mirror.c) functions.

This file then replaces the driver file in the appropriate directory.

The kernel is build and the driver is configured and ready to run.

DSF On I/O Processor—FIG. 5

In FIG. 5, the major new components of the I/O processor 9 with the DSF facility implemented on top of a Real-Time OS are shown. The components include the communication module 32, the DSF agents 35, the I/O core STREAMS 33, the standard drivers 40, the standard header files 41, the support functions 34, the local STREAMS interface 42, the configuration files 43, the administration 37, and the hardware 38.

The communication module 32 provides the connectivity to remote STREAMS environment including error recovery. The DSF Agents 35 handle requests like open, close, push, etc. that in the UNIX STREAMS environment have a user process context. Core STREAMS 33 is an implementation of all SVR4 STREAMS functions in I/O processor 9. Standard header files 41 are little modified UNIX header files to be included by DSF and STREAMS drivers. Standard Drivers 40 consists of the clone, autopush, and log driver. Support functions 34 are implementations of non-STREAMS functions commonly used by STREAMS drivers like (kmem_alloc(), timeout(), sleep(), etc.).

It is possible to have streams originate on the I/O processor using the local STREAMS interface 44 which contains functions like open(), read(), getmsg(), etc.

The configuration component 43 consists of tables to define drivers and modules, a vnode table and a simple file table for the local STREAMS interface.

The administrative component 37 is not directly a part of the STREAMS environment. It allows an administrator to intervene in the running of the DSF or look at statistics and change tuning parameters.

5.1 I/O Core Streams

The STREAMS scheduler runs in one task (the STREAMS task)—implemented in strsubr.c. The STREAMS heads 53 or 63 (either for a local stream—implemented in lstreamio.c—or a remote DSF stream—implemented in streamio.c, respectively) run in separate tasks. They can also cause the STREAMS queues to be executed. There is no concurrency problem, however, as there is no preemption of one task by another task. Only interrupts can preempt the execution of a task. The task can protect itself against interrupts during critical regions by disallowing interrupts. After an interrupt is serviced the same task will continue executing. All tasks (STREAMS task, agent tasks, the DSF read tasks and user tasks) except for the admin task run at the same priority in a round robin fashion. The admin task has highest priority.

All SVR4 STREAMS functions are supported and work in the same way as defined in UNIX SYSTEM V RELEASE 4: Programmers Guide: STREAMS (implemented in stream.c and strsubr.c).

The following difference exists however: It is possible for the link request to time out on the host side, while the remote side (I/O processor 9) is still processing it (and might even complete it successfully). After such a time out, the remote and the host side do not agree on the link state. The stream has to be closed after a link timeout failure. The situation is similar to a timeout of the link request for a non-distributed STREAMS environment. However, it is more likely to happen in a distributed environment (the connection to the remote might temporarily be down, or due to high traffic volume the request does not get out in time, or the response is delayed).

5.2 DSF Agents

Most of the processing in STREAMS takes place without the context of a user process. However some system calls, for example, the opening or closing of Streams, require this context. This code can contain a call to sleep() which stops this thread of execution for some time. The STREAMS scheduler and the communications modules are shared between all users and therefore cannot sleep. All the processing that potentially sleeps has to execute in the context of a separate task. These tasks are called the DSF Agents or just agents and are implemented in agent.c.

Whenever a request that requires user context is received, an available agent task will execute it, or if none is available, a new one will be forked as long as the maximum number of agents is not exceeded. If no more agents can be forked, the request will be queued. After an agent task is done (including the sending of a response), it is available for the next request (the task does not die unless more than half the maximum number of tasks are idle). The maximum number of agent tasks is a configurable variable. One current value is 10.

A synchronization mechanism ensures that requests for one stream will be processed in the order in which they were received, one after another.

5.2.1 Details of Agent Processing

A request for an agent (open, close, push, pop, link or unlink) is submitted to the agents in form of a struct proc_req as defined in the following section. The function msg_to_agent (in chanhead.c) takes care of this. After allocating a proc_req structure and filing in the appropriate information the function submit_proc_req (in chahead.c) is called which looks for an agent to process the request. First the function checks whether an agent already works on a request for the same stream, and in that case appends the new request to the its requests. Otherwise the first idle agent will process this request. Idle agents are contained in the idle_list. If the list is empty, a new agent may be forked. If no agent is available and no new agent can be forked the request is queued in delayed_proc_req.

5.2.2 The Format of the Requests

Each request that is passed to an agent is of type struct proc_req defined in agent.h.

```
struct proc_req {
struct dsf_chan_obj *dsf_chan_obj_ptr;                    /* dsf channel object */
int dest_id;
int src_id;
int int_sig;
union dsf_admin_msg dsf_admin_msg;                        /* Admin message sent */
struct proc_req *next_req;                          /* To make a list of proc_req */
};
```

| | |
|---|---|
| dsf_chan_obj_ptr | points to the DSF Channel Object that is used to communicate to the remote STREAMS environment |
| dest_id | is the id of the stream this admin message refers to (if relevant for the message). |
| src_id | is the id of the stream that sent the message and waits for a response. |
| int_sig | a flag that is set to 1 when an R_INTERRUPT message was received. This will cause the task that executes the request to return with 1 from the sleep() call. |
| dsf admin_msg | is the message as it came from the remote. This union is discussed in the following. |
| next_req | enables the construction of lists of requests. |

Note that the proc_req structure is allocated using alloc_proc_req() (implemented in agent.c) and has to be freed by the task that services the request with free_proc_req() (also in agent.c).

```
union dsf_admin msg }
        int type;
        struct user_ctxt_msg user_ctxt_msg;
        struct r_open_req r_open_req;
        struct r_cmc_resp r_close_resp;
        struct r_open_resp r_open_resp;
        struct r_close_req r close_req;
        struct r_push_req r_push_req;
        struct r_pop_req r_pop_req;
        struct r_link_req r_link_req;
        struct r_link_resp r_link_resp;
        struct r_unlink_req r_unlink_req;
        struct r_unlink_resp r_unlink_resp;
        struct r_ack_msg r_ack_msg;
        struct r_nak_msg r_nak_msg;
```

-continued

```
        struct r_no_partner r_no_partner;
        struct dsf_close_msg dsf_close_msg;
        struct dsf_reconn_req dsf_reconn_req;
        struct dsf_reconn_resp dsf_reconn_resp;
        struct r_interrupt r_interrupt;
        struct dsf_keepalive dsf_keepalive;
        struct r_set_prio r_set_prio;
};
```

This structure and all its sub-structures explained below are all defined in dsf.h. The admin message begins with a type field that is shared between all members of the union. The agents only process r_open_req, r_close_req, r_push_req, r_pop_req, r_link_req and r_unlink_req. Admin messages of another type are ignored by it. All agent-processed request messages have sequence numbers. All response messages except for the r_close_resp have also sequence numbers.

These request messages also all contain user context information (struct dsf_cred user_cred—defined in dsf.h). This struct has maximum size of possible sizes of a struct cred (as defined in the standard cred.h) that is locally used for user credentials, i.e. struct dsf_cred is identical to struct cred except for the size of the last element (the array cr_groups[]) that contains one element in struct cred and 32 (NGROUPS_UMAX) elements in struct dsf_cred.

```
#define DRV_NAME_LENGTH 12
struct r_open_req {
    int type;                                   /* R_OPEN_REQ */
    struct dsf_cred user_cred;
    int orig_window_size;
    char dev_name[DRV_NAME_LENGTH];
    int minor_dev;
    int flag;
    int sflag;
};
```

"orig_window_size" is the receive window size of the remote queue.

"dev_name" is the name of the device driver to be opened.

"minor_dev" is the minor device number.

"flag" is the value of the flag of the fopen() call.

"sflag" is the STREAMS open call flag potentially containing CLONEOPEN or MODOPEN as values.

"struct r_open_req" is defined in dsf.h.

The processing of the open request is implemented in the file agent.c. As part of the open processing, the standard function stropen gets called (file streamio.c).

The response to the open request (implemented in agent.c) is of type

```
struct r_open_resp {
    int type;                         /* R_OPEN_RESP */
    int lower_window_size;
    int uerror;
    int minor_dev;
};
```

"lower_window_size" is the window size of the local queue.

"uerror" is the error code (0 means no error).

"minor_dev" is the minor device number assigned to this stream.

The close processing is implemented in agent.c with a call to closevp in close.c which in turn calls delete_vnode in vnode.c.

```
struct r_close_req {
    int type;                         /* R_CLOSE_REQ */
    struct dsf_cred user_cred;
};
```

The response to a close request is sent in a struct r_cmd_resp that only contains the error code of the operation:

```
struct r_cmd_resp {
    int type;
    int uerror;
};
struct r_push_req {
    int type;                                   /* R_PUSH_REQ */
    struct dsf_cred user_cred;
    char mod_name[DRV_NAME_LENGTH];
};
```

The push request contains mod_name (the name of the module to be pushed). The response to the push request is of type struct r_cmd_resp. The implementation is in the files agent.c and module.c.

```
struct r_pop_req {
    int type;                         /* R_POP_REQ */
    struct dsf_cred user_cred;
};
```

The pop request results in the top module to be popped. The response to the pop request is of type struct r_cmd_resp. The implementation is in the files agent.c and module.c.

```
struct r_link_req {
    int type;
    struct dsf_cred user_cred;        */ R_LINK_REQ */
    int cmd;                          /* I_LINK or I_PLINK */
    int lower_fd;
    int upper_linkid;
};
```

The link request contains the id of the lower queue (lower_fd) to be linked, cmd which contains the information whether it is a permanent link or not, and the link id on the host (upper_linkid). This link id will be passed to the driver for identification (rather than the I/O processor 9's link id).

As link ids have to be unique in a given environment, the I/O processor 9's STREAMS environment cannot use the AP processor 8's link id, because there could be multiple hosts talking to the same I/O processor 9. But user programs and drivers have to use the same id, so the host 8's link id is passed to the driver, but internally the I/O processor 9's STREAMS environment uses its own link id. In case an unlink gets generated locally (by a strclose() for example), the local STREAMS environment needs to send the remote link id to the driver in the I_UNLINK message. Therefore, the host's link id is stored in the linkblk data structure. This structure is a modification to the standard SVR4 linkblk data structure.

The link processing is done in the files agent.c and driver.c

The response to a link request is a link response:

```
struct r_link_resp {
        int type;
        int uerror;
        int upper_linkid;
        int lower_linkid;
};
```

The link response contains uerror (the error code), upper_linkid (the link id sent from the host) for identification, and if it was successful, the id of the link on the I/O processor 9 (lower_linkid) to be used with the unlink request.

```
struct r_unlink_req {
    int type;                          /* R_UNLINK_REQ */
    struct dsf_cred user_cred;
    int cmd;                           /* I_LINK or I_PLINK */
    int upper_linkid;
    int lower_linkid;
};
```

The unlink request contains the indication whether it was a permanent link (cmd), the upper_linkid (link id on the host) that will be returned in the r_unlink_resp for identification, and the lower_linkid that was returned by the link response. The response to an unlink request is of type struct r_unlink_resp.

```
struct r_unlink_resp {
    int type;                    /* R_UNLINK_RESP */
    int uerror;
    int upper_linkid;
};
```

The unlink response contains the error code for the request (uerror) and for identification the link id of the host (upper_linkid).

The unlink processing is done in the files agent.c and driver.c 5.3. COMMUNICATION MODULE 5.3.1 Overview The communication module provides the underlying connectivity between the AP processor 8 and the I/O processor 9, the partners of a distributed stream. The media of communication can be any reliable data medium type like an OEMI channel, shared memory, TCP, X25, etc. The media appears as an object called DSF channel object. The communication module does not have to know what kind of media is used.

This module is implemented in the file chanhead.c and chanadmin.c.

A task is assigned to each channel. It reads the messages and routes them to the DSF Agents, if they require user context, or to the right stream, if it is a normal STREAMS message. Some administrative messages (like the close channel or an ACK message) are handled by the task itself.

If a connection breaks, it reconnects. Distributed streams over a broken channel can be reconnected after the underlying DSF channel gets reestablished.

The communication module also handles flow control, and in the future will translate between different data representations on both sides of the channel.

5.3.2 Definition of the DSF Channel Object

The following data structure defines a DSF Channel Object (in file dsf_obj.h):

```
#define DSF_UP 0
#define DSF_OPENING 1
#define DSF_CLOSING 2
#define DSF_DOWN 3
#define DSF_RESET 4
#define DSF_DEAD 5
#define DSF_THRU 0
#define DSF_RESP 1
struct dsf_chan_obj {
        short status_flag;
        short perf_flag;
        uint open_retry_time;
        int conv_flags;
        char id[MAX_ID_LEN];
        int fct_arg;
        int (*open_fct)(struct dsf_open_parm *open_args, struct
        dsf_chan_obj
        *dsf_chan_obj_ptr);
        int (*read_fct)(void *m_desc, struct bio_buff
        **buff_ptr_ptr);
        int (*write_fct)(void *m_desc, mblk_t *mp, mblk_t
        **ret_mp);
        int (*close_fct)(void *m_desc, int sleep_flg);
        struct dsf_element *str_list;
        struct dsf_io_state io_state;
        struct dsf_stats dsf_stats;
};
struct dsf_io_state {
        int part_id;                 /* Memory partition id */
        void *m_desc;                /* Medium descriptor */
        int max_msg_size;            /* Maximum message accepted
                                        by medium */
        mblk_t *first_msg;
        mblk_t *last_msg;
        mblk_t *last_band_msg;
};
struct dsf_stats {
        int n_opn_strms;             /* Number of open streams */
        int n_nacks;                 /* Number of NAKs received */
        int seq_errors;              /* Sequence number errors */
        int dup_errs;                /* Number of times dupb() failed */
        int alloc_errs;              /* Number of times receive buffers
                                        allocation failed */
        int inv_ids;                 /* Number of times invalid ids re-
                                        ceived */
        int last_msg_time;           /* lbolt value of last packet re-
                                        ceived */
        int tot_msg;                 /* Number of packets received */
        int tot_bytes;               /* Number of bytes received */
        };
```

"status_flag" is the status of the medium (DSF_UP, DSF_OPENING, DSF_CLOSING, DSF_DOWN, DSF_RESET or DSF_DEAD).

"DSF_UP" means the medium is open (the open message exchange may not have completed though).

"DSF_OPENING" means the open function is pending, "DSF_CLOSING" indicates that a close request has been sent (or received). "DSF_DOWN" means that temporarily the connection to the remote has been broken. "DSF_RESET" means the media has been closed locally, but will be coming up again. "DSF_DEAD" means the object no longer exists. It will be deallocated, when all its streams have been closed.

"perf_flag" used to indicate whether throughput is favored over response time (DSF_THRU) or the other way around (DSF_RESP).

"open_retry_time" is the number of seconds of delay between a failed open and a retry. This value is set locally depending on the medium.

"conv_flags" are the data conversion flags for partners of the medium that have a different data representation (not defined yet).

"id" is a string that contains the unique identification for a channel. It is sent in the first message by the side that does the active open after the connection is established (among other things). It is used for reconnection after a temporary disconnect "fct_arg" is an identifying argument for the I/O routines.

"open_fct" is used to establish a connection. This can be done in an active or passive way. Active means to connect to the other side which is listening, passive means to wait for the other side to connect. The type struct dsf_open_parm is defined in the next section. If the open function returns with failure, one should retry if it was an active open. If it was a passive open the failure is fatal, and no retries will succeed.

"open_args" are the media dependent arguments of the open function. The return value of the open_fct will become fct_arg, if it is not −1.

"read_fct" reads data into a buffer it allocates and returns the number of bytes read. This buffer should be deallocated as soon as possible, as usually only few large buffers to read from a medium exist. To allocate the buffer the function free_mem_block is used. It is allocated with get_mem_block.

The argument m_desc is the second field in the struct dsf_io_state (m_desc a pointer to a medium specific structure).

A return value of −1 indicates a failure of the connection.

"write_fct" is used to write data to the channel.

The argument "m_desc" is the second field in the struct dsf_io_state (m_desc a pointer to a medium specific structure).

"mp" is a list of STREAMS messages linked by the b_next field.

In "ret_mp" the messages that could not be sent will be returned.

A return value of −1 means a fatal error has occurred, 0 means the write was successful.

"close_fct" will close a channel. This can be called after a write error in order to make the read to fail and stimulate the recovery. In can also be used after an exchange of close messages that signal an orderly close. There will be no reconnecting in this case, all streams across this channel will close too.

"conv_flags" determine the necessary conversions in data representation. They are not defined at this time.

"str_list" is the list of streams that are currently using this channel. This list is used to stop the streams in case the underlying connection breaks, and to restart them once the channel has been reopened.

"dsf_stats" collects statistics for an object.

5.3.3 DSF Channel Object Administration 5.3.3.1 DSF Channel Object Table

The supported DSF channel object types are defined in conf.c (along with the supported STREAMS drivers and modules). A specific instance of an DSF channel object is activated using dsf_channel_open(). A deactivation of a channel is done by dsf_channel_close() (in chanadmin.c). The status and the parameters of an instance are kept in the DSF channel object ruble. Each entry is of the following type (file dsf_obj.h):

```
struct dsf_chan_assoc {
        int tid;
        int status;
        struct dsf_chan_obj *dsf_chan_obj_ptr;
        int dsf_chan_obj_type;
        struct dsf_open_parm dsf_open_parm;
};
```

"tid" is the task id of the task responsible for this instance. If tid is 0, no task is currently associated with the instance.

"status" has one of the following values: CHAN_INACTIVE (the channel is closed and no open (active or passive) is currently posted), CHAN_OPENING (the channel is being opened), CHAN_ACTIVE (a connection is established), CHAN_DATAREP_MISMATCH (an open failed because of incompatible data representation), and CHAN_VERSION_MISMATCH (an open failed because of DSF version mismatch).

dsf_chan_obj_ptr points to the specific instance of the DSF channel object.

dsf_chan_obj_type is an index into an array of supported media.

dsf_open_parm contains the parameters that are passed to the open routine. They are saved here, to be used again for reopening.

The structure that contains the open parameters has the following type:

```
#define MAX_ADDR_LEN 60
struct dsf_open_parm {
        int mode;
        char address[MAX_ADDR_LEN];
};
```

"mode" is DSF_ACTIVE_OPEN if this side actively tries to open a channel, otherwise it waits for the other side to connect to it (mode=DSF_PASSIVE_OPEN).

"address" contains the address string of the remote partner.

5.3.3.2 DSF Channel Open Procedure

The open function (chanadmin.c) is as follows:

```
int dsf_channel_open(media, mode, address)
        char *media;
        int mode;
        char *address;
```

"media" is the name of the media to be used ("ipif", "shmem", "tcp", etc.).

"mode" is set to DSF_ACTIVE_OPEN if this side actively tries to open a channel, otherwise it waits for the other side to connect to it (mode=DSF_PASSIVE_OPEN).

"address" is the string that describes the address to be used (the length is media dependent).

"dsf_channel_open" forks off a separate task passing to it the parameters in a structure (struct dsf_open_parm). This task is responsible to set up the connection with the remote, read and process all the messages it receives, and in case the connection breaks, it will try to reopen it (unless it was a passive open with no address specified).

If this task receives a close request or a close response message, it will close all the remaining open streams, release all the resources, and then die (after responding to a close request with a close response).

"dsf_channel_open" returns −1, when the media is not supported, the fork failed, or not enough resources are available, otherwise it returns 0. dsf_channel_open does not wait until a connection is established.

The side that does the active open sends an open request message of the following type (note this message is not encapsulated by a dsf message):

```
#define MAX_ID_LEN 64
struct dsf_open_req {
        u_char conv_flags[4];
        uint version;
        char id[MAX_ID_LEN];
};
```

"conv_flags" define the data representation on the remote host. This message is sent in that data representation and might have to be converted. If the conversion of this data representation is not supported, the connection is rejected.

"version" is the version of DSF. If the version is not supported, the connection is rejected.

"id" contains the id of this connection. It has to be unique. In case a connection breaks the id is used to reconnect the remote stream components. It has to be a printable string consisting of the name of the name of the media used (like "OEMI_channel", "tcp", etc.) followed by a space and a media specific address like the (sub)channel number or the internet address of the originator.

The response message to the open request is the open response:

```
struct dsf_open_resp {
        u_char conv_flags[4];
        uint version;
        ushort open_strms;
        u_char error_code;
        u_char pad;
};
```

"conv_flags" contain the data representation.

"version" is the version of DSF.

"open_strms" is the number of streams that are already open on this side. This number is used to announce the number of reconnect messages that will follow. Each reconnect message contains a list of stream id pairs to be reconnected.

"error_code" is 0, if the connection is accepted, otherwise it indicates the kind of error (version mismatch or data representation problem).

"pad" fills the data structure to 8 bytes.

The response to this open response is another open response message so that both sides agree about the state the connection is in. In case of error, the task reports the status, closes the connection, and deletes itself.

5.3.3.3 Reconnection Message Exchange

After the open exchange is complete, an exchange of reconnect messages follows (if there are already open streams). This is implemented in chanhead.c. Each side sends the ids of its open streams and the stored partner ids as well as the sequence number of the last messages received for each priority and the available window to the remote. Each reconnect request can only contain a limited number of ids, thus multiple reconnect requests might be necessary. Each reconnect request is responded to with a reconnect response that contains the list of streams that have no partner. This list can be empty. Only after this exchange is complete can other messages be sent. Every request has to get an response. Streams with no partner will be closed.

Both the reconnect request and reconnect response messages are admin messages, i.e. they begin with an dsf message header (as described below). They should be sent with highest priority to avoid being passed by data messages.

The body of the reconnect messages is as follows (see dsf.h):

```
#define DSF_PRIO_NUM (DSF_HI_PRI + 1)
struct strm_assoc {
        int loc_id;                     /* Id of local stream */
        int rem_id;                     /* Id of remote partner */
uint last_seq_rec[DSF_PRIO_NUM];
int window;                             /* Current window size */
};
#define ASSOC_LIST_LEN 64
```

-continued

```
struct dsf_reconn_req {
        int type;                       /* DSF_RECONN_REQ */
        int str_num;                    /* Number of stream pairs in following
                                           array */
        struct strm_assoc assoc_list[ASSOC_LIST_LEN];
};
struct dsf_reconn_resp {
        int type;                       /* DSF_RECONN_RESP */
        int str_num;                    /* Number of stream ids in the follow-
                                           ing array */
        int no_partner_list[ASSOC_LIST_LEN];    /* Ids of
                                                   streams
                                                   without
                                                   partner
                                                   */
};
```

The task now reads all the messages from the remote and in case the connection breaks it is responsible for reconnection. If the task did an active open or a passive open with a specified address it goes into the open loop again after a short delay, otherwise it exits but leaves the instance entry in the DSF channel object table. This entry might still contain references to open streams that could be reconnected.

A timeout is started that will close those streams to preserve resources, if a reconnection cannot be achieved soon. If the connection is reestablished, the same protocol as after the initial open is followed.

5.3.3.4 Orderly Close of DSF Channel

```
dsf_channel close() causes a channel to close (chanadmin.c).
int dsf_channel_close(media, address)
int media;
char *address;
```

The arguments "media" and "address" are the same as those that were given to the dsf_channel_open() function. dsf_channel_close uses these to locate the right DSF channel object and then sends a close request message to the other side. At the same time, all streams on this channel are blocked. dsf_channel_close returns 0, if it can locate the DSF channel object and −1 otherwise.

A close request is a DSF admin message with the type field set to DSF_CHAN_CLOSE_REQ. A close response is the same except that the type field is set to DSF_CHAN_CLOSE_RESP.

After the close response message is received, the task monitoring this channel will flush all streams still active on this channel and then close those that are on the device side and send an M_HANGUP message to those on the user process side. Then the task marks the channel inactive and deletes itself.

5.3.4 Message Format

After the open message and the reconnect message exchange, all messages have the following format (see dsf.h):

```
struct dsf_msg {
        struct dsf_msg_header header;
        union {
        struct msg_buff data_msg;
         union dsf_admin_msg admin_msg;
        } body;
};
```

Each message consists of a header and a body.

```
#define DSF_DATA 0          /* Frame contains STREAMS message */
#define DSF_ADMIN   1       /* Frame contains admin message */
struct dsf_msg_header {
        u_char type; /* DSF_DATA or DSF_ADMIN */
        u_char priority;
        u_char ack_req;
        u_char fragm;
        uint len;
        int dest_id;
        int src_id;
        uint seq;
};
```

"type" is the type of the message (either an admin or a data message).

"priority" is the priority of the message (0 to 2).

"ack_req" if 1 requests the other side to acknowledge this message.

"fragm" is the id of a fragment, 0 if the message is not fragmented.

Only data messages can be fragmented (if they are longer than the maximum message length for a medium).

"len", the number of bytes in the message (including the header).

"dest_id" tells the communications module to which queue this message belongs.

Destination id 0 is reserved for admin messages that should be processed by an agent.

"src_id" is the id of the queue that sent the message.

"seq" is the sequence number of the message.

For each priority there is a different sequence number space.

In case dest_id does not contain a valid id, or the queue it refers to does not think of as src_id as its partner queue, an admin message of type R_NO_PARTNER will be sent back:

```
struct r_no_partner {
        int type;        /* R_NO_PARTNER */
        int src_id;      /* Id of stream whose remote partner has been lost */
        int dest_id;     /* No longer existing or matching dest_id */
        };
```

"src_id" and "dest_id" identify that there is no longer a matching queue pair.

The structure of the body of a data message is defined as follows:

```
struct msg_buff {
        int length;               /* Length of data part of message */
        ushort offset;            /* db_base - b_rptr */
        ushort cont;              /* If 1, there is another part following */
        unsigned short flag;
        unsigned char band;       /* Priority */
        unsigned char type;       /* Message type */
        int dataoffset;           /* Offset of data from beginning of this structure */
        };
```

Each struct msg_buff represents one message block of a STREAMS message. A complete message consists of possibly multiple message buffers.

"length" contains the number of data bytes.

"offset" is the offset of the data from the beginning of the data buffer. This should be preserved across the channel, as other drivers or modules might want to prepend some data.

"cont" is set to 1, when another message block follows this one.

"flag" is the b_flag field of the message structure.

"band" is message priority (the b_band) field of the message structure.

"type" is the db_type field defining the type of a message.

"dataoffset" is the location of the data in the message buffer starting from the beginning of the struct msg_buff. Note: each message buffer starts on a four byte boundary. If necessary, there is padding after one block.

The translation of DSF messages into streams messages and the other way round are implemented in rstrsubr.c.

5.3.5 Miscellaneous Admin Messages

The following messages are processed by the communication module (see dsf.h):

```
struct r_interrupt {
        int type;        /* R_INTERRUPT */
};
```

The interrupt message is only related to the stream identified by the src and dest field of the message header. It is sent with the normal priority of that stream (so it can not pass the message it is supposed to interrupt). It will cause a sleep() of this stream to terminate prematurely. If this stream is not sleeping yet, the interrupt will be delivered once it does. There is no response to the interrupt message except for the normal ack message. This processing is implemented in chanhead.c.

```
struct dsf_keepalive {
        int type;        /* DSF_KEEPALIVE_REQ or DSF_KEEPALIVE_RESP */
};
```

If for some time no message was received on a medium, a DSF_KEEPALIVE_REQ message is sent to the remote. The response is a DSF_KEEPALIVE_RESP. If no response is received after a period of time, it is assumed that the medium is down. This mechanism is implemented in rstrsubr.c.

```
struct r_set_prio {
        int type;        /* R_SET_PRIO */
};
```

This message will set the stream (identified by the src and dest field of the header) to a higher priority stream. Normal data messages will now be assigned DSF_BAND_PRI priority to travel faster through the medium. There is no message to undo this effect. This message is the result of a call to the support function dsf_set_prio() called by a STREAMS driver or module for streams that require fast response times (implemented in supmisc.c).

5.3.6 Flow Control 5.3.6.1 Principle

This feature is implemented in chanhead.c and rstrsubr.c. In the single host STREAMS environment, each module or driver inspects the next queue on the stream with canput (or bcanput) in order to find out whether another message can be put on that queue. This functionality is simulated across the DSF channel using a windowing scheme. This windowing scheme guarantees data integrity at the same time, as messages that did not get ACKed are retransmitted.

The size of a window is defined in bytes. It is related to the high water mark of the driver. Sequence numbers are assigned to each message. Messages of different priority classes use a different sequence number space. There are three priority classes:

0—normal messages

1—priority band messages

2—high priority messages

The base priority for a stream (normally 0) by can be set to priority one, letting normal messages be transmitted with higher priority. This is intended to improve response time for streams carrying interactive traffic. To keep things simple the available window is the same for all. It is assumed that one priority class will be dominant for a given stream, so the window does not have to be shared between all of them. High priority messages are sent even when the window is closed.

Not all admin messages have sequence numbers. An admin message needs to be associated with two stream components in order for the ack mechanism to work properly, and some admin messages are just informational messages that do not have to be acked. For example the RACK, R_NAK, R_NO_PARTNER, DSF_CLOSE_REQ, DSF_CLOSE_RESP, DSF_RECONN_REQ, DSF_RECONN_RESP and DSF_KEEPALIVE have no sequence numbers. The R_OPEN_REQ has always sequence number 0, but has only one stream associated with it (the other one is requested to be opened). Therefore the open request message is not acknowledged with an ACK message but with the R_OPEN_RESP message. It is possible to receive a duplicate R_OPEN_REQ. The second one has to be recognized as a duplicate and ignored. If the R_OPEN_RESP contains an error code, it is not associated with a stream, therefore it will not be acked. If it is lost the open request will be repeated, and because it failed the first time it will not be recognized as a duplicate and therefore processed again. R_OPEN_RESP that report successful opens will be acknowledged (they also carry sequence number 0).

The R_CLOSE_REQ can be acked, but the R_CLOSE_RESP is not acked, because one of the two stream components went away. The R_CLOSE_RESP also acks the R_CLOSE_REQ (plus all previous messages).

Admin messages with sequence numbers are added into the stream of normal data messages, but they do not consume window space. Admin messages are transmitted at base priority, so for example a close message cannot pass data sent at base priority on the same queue.

An ACK message is an admin message that informs the communications module of received messages. ACK messages do not have sequence numbers and are neither ACKed or retransmitted. They have the following structure (see dsf.h):

```
#define DSF_NORMAL_PRI     0     /* For nominal messages */
#define DSF_BAND_PRI       1     /* Priority messages */
#define DSF_HI_PRI         2     /* High priority messages */

struct r_ack_msg {
        int type;                /* R_ACK_MSG */
        int priority;            /* Priority queue this ACK refers to */
        unsigned int ack_seq;    /* Last seq number received plus one */
        int window_size;         /* Window accepted beyond acked messages */
};
```

Each ACK message only refers to one priority queue (out of the three possible ones). Priority defines which one.

Back_seq is the sequence number of the last acked packet plus one. It acknowledges all previous packets as well.

"window_size" is the number of bytes that can be accepted beyond the last acked data. It is allowed to shrink the window, i.e. to advertize a smaller window in a later message than was previous communicated. This way data flow can be stopped when memory resources run low. On the other hand data sent into a closed window will still be accepted when resources are available.

In order to decrease the number of ACK messages sent, ACKs may be delayed. Admin messages however are ACKed immediately.

In case there are no resources to copy a message out of the communications buffer into a streams message, a NAK message is sent. It has to be ensured that this NAK message is sent eventually, even when no resources are available at the moment. NAK messages do not have sequence numbers either.

Another event that can trigger a NAK message is the reception of a packet with a sequence number that is larger than expected. A NAK message conveying the next expected sequence number will be sent (if no such NAK message was sent before).

A NAK message has the following format (see dsf.h):

```
struct r_nak_msg {
        int type;                /* R_NAK_MSG */
        int priority;            /* Priority of queue this NAK refers to */
        unsigned int nak_seq;    /* Seq number of message to be retransmitted */
        int window_size;         /* Window accepted beyond acked message */
        };
```

5.3.6.2 Flow Control Protocol

The flow control protocol has the goal to reliably deliver messages from one stream component to the other, provide high throughput and little overhead.

The reliability is based on sequence numbers and acknowledgements, the high throughput is achieved through the windowing scheme, and the protocol is parsimonious with ACK and NAK messages as well as window updates and does not require timers to ensure low overhead.

Before the rules of the protocol are listed, these are some definitions:

"communicated window" is the window size communicated to the remote side available window is the window size that would be communicated, if an ACK/NAK message would be sent at this time—it reflects the real available space and is always greater or equal to the communicated window.

"maximum window" is two times the higher water mark of the top driver of a stream. It is always greater or equal to the available window.

The following are the general rules of the protocol (assume n was the last sequence number received in rules that use sequence numbers):

The original window size (in bytes) is contained in the r_open_req and r_open_resp message (it can be smaller than maximum window).

Admin messages have sequence numbers as part of the base priority data stream, but use up no window.

Admin messages and higher priority messages should be sent with the ack_req flag set.

Messages with ack_req set flag have to be acked.

Higher priority data messages do not use up window.

High priority messages can be sent into a closed window.

The first sequence number is 0 (there is no random selection of the initial sequence number).

It is allowed (and sometimes necessary to avoid hung connections) to send a data message that is larger than the window, as long as the window is open. The receiver of a message that is larger than the communicated window will respond with an ACK or NAK (depending on the resource situation) to communicate the currently available window size (which could be 0).

If an ACK or NAK message is to be sent, but there are no resources available at this time to do it, it has to be ensured that they will be sent later. The only valid reason for an ACK or NAK not to be transmitted is a fatal media error!

After receiving a data message of base priority with sequence number n+1 of k bytes and being able to transfer it to a STREAMS message the available window and communicated window size are reduced by k bytes. If the communicated window shrinks below x% of the available window size or if more than m received messages have not been ACKed, an ACK message is generated with the new window size (for example, x could be 50 and m 10).

If not enough resources are available to copy the data message of base priority with sequence number n+1, the message is dropped and a NAK (n+1) message is generated telling the remote that this message needs to be retransmitted. This NAK message could be delayed until the required resources are available. Another policy is to send a NAK with available window size 0 right away and send an ACK with the correct window size after a short delay.

When a data message with sequence number n+k (k>1) is received, the remote side is informed with an NAK (n+1) message that the sequence number n+1 was missing. This NAK message is not sent, if NAK (n+1) was sent before. The received message will be dropped. The reason is that because the communication is put on top of a reliable data stream, missed packets indicate that resources were lacking to service a previous packet. In this situation it is not advisable to use up more resources by storing packets that cannot be processed immediately.

When a data message with sequence number n−k (k>1) is received, an ACK message is sent to tell the remote side of the state of the connection. This can be used by the remote side to trigger an ACK to free up resources.

Whenever the communicated window shrinks below x% of the available window size (due to processing), an ACK message is sent communicating the currently available window size.

Whenever the available window size becomes smaller than the communicated one, (due to lack of resources), an ACK message is sent communicating the new (reduced) window size.

After receiving a NAK m message, retransmit all packets with sequence number greater or equal to m.

After a channel reconnect, retransmit all non-ACKed messages and send an ACK message containing information about the last received sequence number an the currently available window.

This protocol assumes that it runs on top of a reliable data stream like TCP or the OEMI channel. Taking this into account it can avoid a high overhead but can still provide reliability. Packets can only get lost due to fatal error of the connection, and packets can get lost, when not enough memory exists to copy them from the receive buffer into a STREAMS buffer. NAK and ACK packets do not get lost due to resource problems on the receiver side, because they are not copied out of the buffer. If the sender does not have the resources to send an ACK that contains a larger window size it gets sent later in order not to block the stream.

Timeouts are not needed (and much overhead is saved) by this operation. Assume a packet is lost due to fatal channel error: After the channel is reconnected, all non-acked messages are retransmitted, and the current window size is communicated. This makes sure all the data gets delivered and no stream stays blocked.

Assume a packet gets lost because of lack of memory, the NAK informs the other side of this, and the message can get retransmitted. The NAK message might also contain a reduced window size to put back pressure on the other side.

The ack_req flag has the purpose to enable the transmitter to free up resources. Usually one would like to send as few ACKs as possible to reduce overhead. From the receiver's point of view ACKs are only necessary to update the window and keep the data flowing, but the transmitter has to keep the data in buffers until it is ACKed using up resources. Asking the receiver explicitly for an ACK can solve that problem. ACK requests can be part of ACK messages, thus allowing a transmitter to send them at any time (even in duplicate ACK messages).

The criterium to send an ack_req should be resource dependent. If a lot of resources are available, the transmitter can wait longer for ACKs. When resources are tight, ACKs are eagerly awaited for each sent message. This threshold to set the ack_req flag is implemented similarly to the "dynamic window adjustment".

5.3.6.3 Dynamic Window Adjustment

Initially the window size is set to two times the high water mark of the top driver. As more and more streams are opened, memory resources might be getting scarce. One policy is to adjust the window size according to the number of open streams. However some streams might only have light traffic and not be using as many resources. The window size therefore is changed according to use. If resources run out, the window sizes of all streams will be reduced (cut in half). If after some time (one second or so) resources are still not enough, further reductions can be imposed up to a limit of one eighth of the original window size.

If more resources become available, the window size is increased again. This operation is implemented in chanhead.c.

5.3.7 Fragmentation

In order to be independent of the maximum message size a medium large messages can be fragmented. Fragmentation is only supported for data messages. It is assumed that the maximum message size of a medium is always larger than the largest possible admin message.

If fragmentation needs to occur, the message is broken up into maximum length fragments (except for the last fragment). The message contents is not changed, only the message headers for each fragment are slightly different. The len field contains the length of the fragment rather than the total length of the message. Secondly the fragm field is (naturally) different for all fragments. The first fragment has the BEGIN_FRAGMENT bit set plus the number of fragments this message consists of. The following fragments' fragm field is one less that the previous fragment's. The last fragment has fragm set to 1. All other fields of the message headers are identical.

If for some reason one of the fragments of a message does not get received by the remote system, all fragments have to be retransmitted. This operation is implemented in chanhead.c.

5.3.8 Message Send-Ahead

If memory resources become tight for the lower part of a stream, parts of messages can already be sent to the upper remote partner before a message is completely constructed. This is done by oring the b_flag field of a message with 0×8000 and calling putnext. The DSF implementation on the remote host will not send this message upstream until a message without this bit in the b_flag field set arrives. All such messages are concatenated using the b_cont field. This feature is supported for M_DATA messages only. However a single M_PROTO message can be part of the sequence. If an M_PROTO message is sent, its control part will be put in front of the accumulated message parts and its data part will be appended at the end.

Message Send-Ahead has to be implemented by the driver of the lower part of the stream. The driver next up on the remote host does not have to change as the DSF on the remote host waits with sending the message to it until it is complete.

5.4. SUPPORT FUNCTIONS 5.4.1 Header Files

All header files used by DSF are contained in the sys sub-directory of the include directory. Most of these files are derived from SVR4 header files with no modification except for the directory where they reside and the dependency on KERNEL is removed (it is assumed to be defined). These files can be used by STREAMS drivers and modules that run on the I/O processor 9. The DSF specific files are not needed by STREAMS drivers or modules.

| | |
|---|---|
| adm55.h | DSF specific file was admin driver. |
| agent.h | DSF specific file. |
| callo.h | No modifications. |
| clock.h | Modified file. Contains lbolt declaration and function prototypes for timeout and delay functions. |
| cmn_errh | Removed definitions that are not used from SVR4 file. |
| conf.h | Removed line discipline and terminal related stuff, modified the type struct cdevsw and struct fmodsw (see chapter on configuration). |
| cred. h | Removed crhold macro and the function prototypes that are not supported. |
| debug.h | No modifications. |
| ddi.h | Modified file. Contains only supported things. |
| devlist.h | Special file used for configuring devices on the I/O processor 9. |
| dsf.h | Contains DSF type definitions that are shared between the host and the I/O processor 9 side. |
| dsf_obj.h | Contains DSF type definitions that are I/O processor 9 specific. |
| errno.h | Standard SVR4 defines of error codes. |
| file.h | Contains defines and function prototypes that are used for streams that originate on the I/O processor 9. |
| ioccom.h | No modifications. |
| kmem.h | Additional defines, types and prototypes. |
| log.h | No modifications. |
| lstream.h | Definitions for streams originating on the I/O processor 9. |
| mkdev.h | Contents unmodified. |
| param.h | Some unnecessary stuff removed. |
| privilege.h | No modifications. |
| proc.h | DSF specific file. Not to be used by drivers or modules. |
| sad.h | No modifications. |
| secsys.h | Removed not needed definitions. |
| signal.h | Kept only the definitions of the signals (for use by STREAMS drivers). |
| stream. h | Removed struct str_evmsg and included the host's link id in the last element of l_pad[]. No other modifications. |

-continued

| | |
|---|---|
| strlog.h | No modifications except that NLOGARGS is increased to 4 from 3. |
| strmdep.h | No modifications. |
| stropts.h | Removed event and file descriptor passing related definitions. No modifications otherwise. |
| strstat.h | No modifications. |
| strsubr.h | Modifications to struct stdata to remove non-supported features like event and signal processing. Added a DSF specific field to the struct. No other modifications in the file. |
| syslog.h | No modifications. |
| sysmacros.h | Macros retain the same meanings. No modifications a driver or module writer needs to worry about. |
| termio.h | No modifications. |
| termios.h | Removed definitions not used by STREAMS implementation. |
| ttold.h | Removed definitions not used by STREAMS implementation. |
| types.h | No modifications. |
| var.h | Removed all definitions not needed by DSF. |
| vnode.h | DSF specific header file. Not to be used by drivers or modules. |

5.4.2 Library Functions

Besides the functions that make up the intrinsic STREAMS environment, STREAMS drivers can call other functions that are supplied by the UNIX kernel and therefore have to be supplied by the DSF environment as well to make STREAMS drivers and modules portable.

There are two groups of functions: library functions like strcpy(), bcopy(), or sprintf(), and secondly UNIX functions like sleep(), wakeup() and timeout(). The first group is supplied as a library together with the C-compiler and is not covered in this document. The other functions had to be implemented especially for DSF and are described here. A third group of functions are user-style functions needed for streams originating on the I/O processor 9. They are covered in the section on local streams.

All functions have the same interface as under SVR4. The interface is not repeated here.

| | |
|---|---|
| Time related functions | timeout(), untimeout(), and delay() (clock.c). |
| Diagnostic functions | strlog() - log.c - (needs a configured log driver and a special strace command that will talk to this log driver rather than the local one on the host), cmn_err() and assfail() - cmn_err.c. In case of panic a message will be printed on the console of the Shelf Controller, otherwise cmn_err() messages are appended to the trace file. |
| DDI functions | drv_getparm(), set_uerror(), get_uerror() and etoimajor() - ddi.c. |
| Memory management | kmem_alloc(), kmem_zalloc(), kmem_fast_alloc(), kmem_fast_zalloc(), kmem_free(), kmem_fast_free() and kmem_avail() - kma.c. |
| Privilege functions | pm_denied() - lpm.c - and suser() - suser.c. |
| sleep functions | sleep, wakeprocs() and wakeup() - slp.c. |
| Auxiliary functions | atox() - Translate a hex string to a number - supmisc.c. |
| DSF functions | dsf_set_prio() - set stream to priority DSF_BAND_PRIO. The argument of dsf_set_prio() has to be the read queue of the stream - supmisc.c. |

All these functions are derived from SVR4 source. sleep() might have the most modifications. kmem_alloc() has a modification to allow merging of smaller blocks to larger ones more easily than the original implementation. This helps in tight resource situations.

5.5. STANDARD DRIVERS

Some STREAMS drivers come as part of the environment. If they are to be used, they need to be configured explicitly (see section on configuration).

Clone driver

The clone driver (necessary to define clone devices) functions in the same way as under SVR4 (implemented in clone.c).

Log driver

The log driver supports the strlog() function. A special strace command needs to be used that will talk to this remote log driver but otherwise works just the same as the standard strace implemented in log.c.

STREAMS Admin Driver

Standard driver to do autopush and module name verification—sad.c.

admin\ driver

The admin driver responds to admin requests—adm55.c. It also functions as a loopback driver that echoes the data sent to it on one stream to another.

5.6. LOCAL STREAMS

The DSF allows streams to start on the I/O processor by simulating a user environment. Currently those streams also have to end on the I/O processor 9, no support for distributed streams originating on the I/O processor 9 is given.

Local streams have to be processed by separate tasks (similar to UNIX user processes). These tasks have to be created using the fork_utask() function (implemented in fork.c). Otherwise the sleep()-wakeup() mechanism will not work.

```
proc_t *fork_utask(void (*func)(), int tid, int pri, caddr_t arg)
```

"func" is the main function of the user task (it has no argument).

"tid" is the requested task id. If tid is 0, a task id is automatically chosen.

"pri" is the priority of the task (0 being the highest and 255 the lowest).

"arg" is an argument that can be passed to the task. The task can retrieve this argument using the get_proc_arg() function described below.

If fork_utask() was successful, it returns the proc structure of the child task otherwise NULL. When a task is killed (by sc_tdelete()) this proc structure is automatically freed.

The created user task gets a default SVR4 credential associated with it that does not restrict any privileges. On the I/O processor 9 there is no protection anyway. The issue of protection will have to be addressed on the host side, if distributed streams originating on the I/O processor 9 will be supported.

```
int get_proc_arg(caddr_t *arg_ptr)
```

This function retrieves the argument that was passed to the current task—fork.c where "arg_ptr" is the address of a variable to take the argument.

If the task was not created by fork_utask() get_proc_arg returns 0, and *arg_ptr is undefined, otherwise the function returns 1.

The following functions simulate the I/O interface of a UNIX user task. It consists of the standard open() (open.c), close() (close.c), read() (read.c), write() (write.c) and ioctl() (ioctl.c) functions as well as the STREAMS functions putmsg() (write.c), putpmsg (write.c), getmsg() (read.c) and getpmsg() (read.c). There is no poll() function.

All these functions have the same interface as the standard UNIX version including the error code return in the variable errno. The open() function has slight modification, int open(char *path, int oflag) where "path" is the name of the device to be opened. This name will be translated into he minor and major device number. In UNIX "path" refers to a file name, here we only have a rudimentary file system. "oflag" contains the flags as in the UNIX open system call.

In case of success, the return value is the file descriptor to be used for the other I/O system calls. In case of failure, the return value is –1 and errno contains the error code.

5.7. CONFIGURATION 5.7.1 Introduction

There are three kinds of configurations required. The supported communication channels have to be defined, the STREAMS drivers and modules have to be configured to assign major numbers to the drivers and register their interrupt handlers and make the module names known, and thirdly a rudimentary file system defines the accepted minor numbers for each driver including the clone driver.

The first two parts are static and have to be done before creating the hex file to be downloaded. The last part can be dynamic, i.e. more nodes can be defined during runtime to supplement those that are compiled in.

5.7.2 Configuration of Communication Channels

The configuration is done in the application specific file conf.c that resides in a sub-directory of ROOT/str/support. The array dsfchosw contains all entries of supported DSF channel objects. An entry has the type:

```
#define MEDIA_NAMELENGTH 12
struct dsfchosw {
      char media_name[MEDIA_NAMELENGTH];
      struct dsf_chan_obj *template_obj; /* Contains the
      media dependent values */
};
```

"media_name" is a string that is used as a parameter to dsf_channel_open().

"template_obj" is a DSF channel object template that contains the I/O functions of the object plus default values for the other parameters. Each instance of an DSF channel object of this kind is a modified copy of the template.

5.7.3 Configuration of STREAMS Drivers and Modules

The drivers and modules are also configured in the file conf.c. Drivers are listed in the array cdevsw. The position in this array corresponds to the major device number. The type is:

```
#define DRIVER_NAME_LENGTH 12
struct cdevsw {
      char driver_name[DRIVER_NAME_LENGTH];
      struct streamtab *d_str;
      int *d_flag;
      void (*drvinit)();
      int (*drvstart)();
};
```

"driver_name" is the name of the driver. This string is used by an r_open request to identify the driver.

"d_str" points to the standard structure to define the driver.

"d_flag" is the address of the flag indicating whether the driver obeys the SVR4 conventions (last bit of *d_flag is 0) or the old System V Release 3 conventions (last bit of *d_flag is 1).

"drvinit" the driver init routine that will be called at boot time (if it exists).

"drvstart" the driver start routine that will be called at boot time (if it exists) after the init routines of all drivers and modules have been called.

If an interrupt handler is associated with a driver it would normally have to be registered with the its interrupt vector. This can be done as part of the open or initialization routine of the driver.

Modules are declared in the army fmodsw whose entries have the type:

```
#define            FMNAMESZ            8
struct fmodsw {
        char f_name[FMNAMESZ + 1];
        struct streamtab *f_str;
        int *f_flag;
        void (*modinit)();
        int (*modstart)();
};
```

"f_name" is the name that identifies the module and has to be passed to the I_LINK ioctl call or the R_LINK request.

"f_str" points the standard structure to define the module.

"f_flag" is the same as d_flag in the driver configuration structure.

"modinit" is the initialization routine for the module to be called at boot-time (if it exists).

"modstart" is the start routine of the module to be called at boot-time (if it exists) after the initialization routines of all drivers and modules have been called.

5.7.4 Device Configuration

The rudimentary file system consists of two types of nodes, fnodes and vnodes. Fnodes associate names with devices (a device being a major plus a minor number). They are only used by local streams mapping the path argument of the open() to a device number. Vnodes represent a major and minor number and contain other information associated with an open stream. This is implemented in vnode.c and fdesc.c. A vnode structure is defined as follows (see vnode.h):

```
typedef struct vnode {
    u_short v_count;          /* reference count */
    u_short v_type;                              */ VTEMP or VPERM */
    struct stdata *v_stream;      /* associated stream */
    int flag;                                    /* Saved open flag */
    struct streamtab *strhinfo;
    dev_t dev;
    struct vnode *next_node;              /* Link for free list or hash
                                                          table */
} vnode_t;
```

"v_count" is the number of times this stream was opened. If v_count changes from 1 to 0 the stream close routine is called.

"v_type" indicates whether the vnode is temporary or permanent. Permanent vnodes are the configured vnodes, temporary ones get created whenever a clonable driver gets opened. Temporary vnodes are deleted when the associated stream is closed.

"v_stream" points to the structure of the stream head of the associated stream. flag is the saved flag of the open call.

"strhinfo" is the structure that contains the put and service routines of the associated stream head (this can be a local or a remote one).

"dev" is the complete device number of the device associated with this vnode.

"next_node" is a pointer to another vnode in a list of vnodes.

For each minor number of a non-clone device there has to exist a vnode, and for each clonable driver there has to be a vnode with the major number being the major number of the clone driver and the minor number being the major number of the clonable driver.

This configuration is done by calling the function configure().

As fnodes are only used for local streams; they need not exist, if no local streams are to be opened for a device.

int configure(struct devicelist *devicelist, int length);

"devicelist" is an array of entries of type devicelist defined below.

"length" is the number of entries in devicelist.

configure() returns the number of entries processed. If that number is smaller than length, as error occurred during processing of that entry.

The struct devicelist is defined as:

```
struct devicelist {
      char *dev_name;                   /* Base name of device */
      char *directive;
                                 /* Clone or non-clone and minor device
                                                      number range */
};
```

"dev_name" is the name of the device driver as in struct cdevsw.

"directive" contains a string that describes the vnodes and fnodes to be created.

The string has the format "n [–m][f]", where n is an integer greater or equal to –1, m is an integer greater or equal to 0, and f is the letter 'f'. If n is –1, the device is a clonable device and m is not present. If 'f' is present an fnode gets created besides the vnode. If n is a number greater or equal to 0, n and m define the range of minor numbers for a device. If m is not present only one device with minor number n gets created. If 'f' is present fnodes are created with the name consisting of the name of the driver with the minor number as a suffix. For example "tcp", "–1 f" would create a vnode with the major number of the clone device and as minor number the major number of the device "tcp" (assumed it exists), and an fnode with the name "tcp" and the same device number; "enet" "0 3 f" would create vnodes and fnodes with the major number of the enet driver and the minor numbers 0 to 3. The names of the fnodes would be "enet0" to "enet3".

FILE LISTINGS

File listing of code for the present invention appear in the attached APPENDIX where the new files added to a UNIX system running on the AP processor 8 are identified below under AP PROCESSOR, where the new ties added to a UNIX system running on the I/O processor 9 are identified below under I/O PROCESSOR NEW, where the modified files from a UNIX system running on the I/O processor 9 are identified below under I/O PROCESSOR MODIFIED, where the new INCLUDE files for a system are identified below under INCLUDE NEW, and where the modified INCLUDE files for a system are identified below under INCLUDE MODIFIED.

AP PROCESSOR NEW chan_adm.c
dsf_daemon.c
dsf_format.c
dsf_trace.c
dsfdrv.c
med_support.c
mirror.c
mirror.h
reload_route
restart_media
rstrace.c
vme_adm.c
vmedrv.c

I/O PROCESSOR MODIFIED clock.c.diff
lstreamio.c.diff
slp.c.diff
streamio.c.diff
strsubr.c.diff

I/O PROCESSOR NEW adm55.c
agent.c
chanadmin.c
chanhead.c
close.c
confmgr.c
driver.c
dsfmisc.c
fdesc.c
fork.c
octl.c
mem.c
module.c
open.c
read.c
rstrsubr.c
supmisc.c
vnode.c
write.c

INCLUDE NEW adm55.h
agent.h
clock.h
devlist.h
dsf.h
dsf_obj.h
lstream.h
proc.h
vnode.h
vrtx.h

INCLUDE MODIFIED cmn_err.h.diff
conf.h.diff
cred.h.diff
ddi.h.diff
dif
file.h.diff
kmem.h.diff
log.h.diff
param.h.diff
secsys.h
signal.h.diff
stream.h.diff
strlog.h.diff
stropts.h.diff
strsubr.h.diff
sysmacros.h.diff
ttold.h.diff
var.h.diff While the invention has been particularly shown and described with reference to preferred embodiments thereof it will be understood by those skilled in the art that various changes in form and details may be made therein without departing from the spirit and scope of the invention.

© COPYRIGHT 1994 AMDAHL CORPORATION

```
#ident "%W% %G% %U% %n%"

/* File: dsfmisc.c - last edit:
 * helge        Thu Mar  4 10:37:02 1993
 *
 * Copyright (c) 1991 by Amdahl Corporation. All rights reserved.
 * Copyright (c) 1992 by Amdahl Corporation. All rights reserved.
 * Copyright (c) 1993 by Amdahl Corporation. All rights reserved.
 */

#include <sys/cmn_err.h>
#include <sys/conf.h>
#include <sys/errno.h>
#include <sys/kmem.h>
#include <sys/param.h>
#include <sys/dsf_obj.h>
#include <sys/stream.h>
#include <sys/strsubr.h>
#include <sys/sysmacros.h>
#include <sys/vnode.h>

#include "spl.h"

#define HASHTBLSIZE 128

#define R_SHFT 6

struct id_entry {
        int id;
        struct id_entry *next_id;
};

static struct id_entry *id_tbl[HASHTBLSIZE] = {NULL};

#define HASH_ID(id) (((id) >> R_SHFT) & (HASHTBLSIZE-1))

/*
 * enter_dsf_id - enter a new DSF id into the table of valid ids.
 *              NOTE: This routine may sleep.
 */

void enter_dsf_id(id)
        int id;
{
        register struct id_entry *new_id_entry;
```

© COPYRIGHT 1994 AMDAHL CORPORATION

```
        register int index;
        register int s;

        new_id_entry = kmem_alloc(sizeof(struct id_entry), KM_SLEEP);
        new_id_entry->id = id;
        index = HASH_ID(id);
        s = splstr();
        new_id_entry->next_id = id_tbl[index];
        id_tbl[index] = new_id_entry;
        splx(s);
}

/*
 * delete_dsf_id - Remove id from table of valid DSF ids.
 */

void delete_dsf_id(id)
        int id;
{
        register struct id_entry *id_entry, *prev_id_entry;
        int s;
        register int index = HASH_ID(id);

        prev_id_entry = NULL;
        s = splstr();
        for (id_entry = id_tbl[index]; id_entry != NULL;
             id_entry = id_entry->next_id) {
                if (id_entry->id == id) {
                        if (prev_id_entry == NULL)
                                id_tbl[index] = id_entry->next_id;
                        else
                                prev_id_entry->next_id = id_entry->next_id;
                        splx(s);
                        kmem_free((char *) id_entry, sizeof(struct id_entry));
                        return;
                }
                prev_id_entry = id_entry;
        }
        splx(s);
        cmn_err(CE_NOTE, "delete_dsf_id: DSF id not found");
}

/*
 * valid_dsf_id - Checks whether id is contained in list of valid DSF ids.
 */
```

© COPYRIGHT 1994 AMDAHL CORPORATION

```
int valid_dsf_id(id)
        int id;
{
        register int s = splstr();
        register struct id_entry *id_entry = id_tbl[HASH_ID(id)];

        while (id_entry != NULL) {
                if (id_entry->id == id) {
                        splx(s);
                        return 1;
                }
                id_entry = id_entry->next_id;
        }
        splx(s);
        return 0;
}
```

© COPYRIGHT 1994 AMDAHL CORPORATION

```
#ident "%W% %G% %U% %n%"

/* File: fdesc.c - last edit:
 * helge        Tue Mar  2 17:54:17 1993
 *
 * Copyright (c) 1991 by Amdahl Corporation. All rights reserved.
 * Copyright (c) 1993 by Amdahl Corporation. All rights reserved.
 */

#include <sys/ddi.h>
#include <sys/errno.h>
#include <sys/lstream.h>
#include <sys/strsubr.h>
#include <sys/file.h>

struct file_desc lstr_fd[MAX_FD] = {0};

/*
 * get_fd - Find an open spot in the file descriptor table, and fill it.
 *          Return the index of the spot.
 */

int get_fd(stp)
   struct stdata *stp;
{
   register int i;

   for (i = 0; i < MAX_FD; i++)
      if (lstr_fd[i].stp == 0) {
         lstr_fd[i].stp = stp;
         return i;
      }
   /* Failure */
   set_uerror(ENFILE);
   return -1;
}
```

© COPYRIGHT 1994 AMDAHL CORPORATION

```
#ident "%W% %G% %U% %n%"
/* %N% */
/* File: fork.c - last edit:
 * helge        Tue Apr  6 17:01:43 1993
 *
 * Copyright (c) 1992 by Amdahl Corporation. All rights reserved.

 * Copyright (c) 1993 by Amdahl Corporation. All rights reserved.
 */

#include <compiler.h>
#include <vrtxil.h>
#include <vrtxvisi.h>
#include <sys/cmn_err.h>
#include <sys/kmem.h>
#include <sys/lstream.h>
#include <sys/param.h>
#include <sys/proc.h>
#include <sys/stream.h>

#define STATIC
#define MIN_TID 7  /* Lower numbers reserved for special tasks */
#define MAX_TID 250 /* Higher numbers used by VRTX */

unsigned char tid_table[MAX_TID+1] = {0}; /* Table for tids */

proc_t *proc_tbl[PROC_TBL_SIZE] = {NULL}; /* Hash table for process pids */
proc_t *preadyq = NULL; /* List of processes ready to run */
proc_t *preadyq_last = NULL; /* Last process in ready queue */
proc_t *run_pp = NULL; /* Currently running process */

/*
 * enter_task - Enter new task into proc_tbl[]
 */

STATIC void enter_task(tid, pp)
    int tid;
    proc_t *pp;
{
    register proc_t **p_first;
    register int s;

    s = splstr();
    p_first = PT_HASH(tid);
    pp->p_plink = *p_first;
```

© COPYRIGHT 1994 AMDAHL CORPORATION

```
    *p_first = pp;
    splx(s);
}

/*
 * delete_task - Remove task from proc_tbl[]
 */

STATIC void delete_task(tid)
{
    register proc_t **pp, *p, *p_tmp;
    register int s;

    s = splstr();
    pp = PT_HASH(tid);
    while (*pp != NULL && (*pp)->p_tid != tid)
        pp = &((*pp)->p_plink);

    if (*pp == NULL) {
        splx(s);
        return;
    }
    p = *pp;
    if (tid >= MIN_TID && tid <= MAX_TID)
        tid_table[tid] = 0;
    *pp = (*pp)->p_plink; /* Remove task from proc_tbl list */
    /*
     * Remove task from ready list, if it is there and schedule
     * next task, if it is suicide.
     */
    if (run_pp == p) {
        /* Suicide */
        SCHED_PROC;
    } else if (p == preadyq) {
        if ((preadyq = preadyq->p_link) == NULL)
            preadyq_last = NULL;
    } else if (preadyq != NULL) {
        p_tmp = preadyq;
        while (p_tmp->p_link != NULL && p_tmp->p_link != p)
            p_tmp = p_tmp->p_link;
        if (p_tmp->p_link != NULL) {
            if ((p_tmp->p_link = p->p_link) == NULL)
                preadyq_last = p_tmp;
        }
    }
```

© COPYRIGHT 1994 AMDAHL CORPORATION

```
   splx(s);
}

/*
 * start_task_func - Initialization of every process goes through this
 *            function, which initializes the A6 frame pointer chain and
 *            coordinates the execution of the function with the STREAM
 *            scheduler.
 */
STATIC void start_task_func()
{
   register proc_t *pp;
   register int s;
   int err;

   rts_strace(); /* Initialize A6 frame pointer chain */
   pp = init_task_procp();
   s = splstr();
   /* If run_pp == NULL; no process is running, schedule the first one */
   if (run_pp == NULL) {
        if (preadyq == pp) {
                /* Mark this one as running */
                run_pp = pp;
                if ((preadyq = preadyq->p_link) == NULL)
                        preadyq_last = NULL;
                splx(s);
                (*pp->p_func)(); /* Run the real task routine */
                return;
        } else {
                /* Schedule someone else */
              SCHED_PROC;
            }
   } else if (run_pp == pp) {
        /* We are scheduled already */
        splx(s);
        (*pp->p_func)(); /* Run the real task routine */
        return;
        }
   splx(s);
   /* Wait our turn */
   sc_tsuspend(0, 0, &err);
   (*pp->p_func)(); /* Run the real task routine */
}

/*
```

© COPYRIGHT 1994 AMDAHL CORPORATION

```
 * Create a new task and enter it into the proc table to be able to sleep().
 * If the passed task id is 0, an available task id is chosen.
 */

proc_t *fork_utask(func, tid, pri, arg)
    void (*func)();
    int tid, pri;
    caddr_t arg;
{
    proc_t *pp;
    int err;
    int s = splstr();

    /* Find available task id */
    if (tid != 0) {
        /* Check whether desired tid is available */
        if (tid < MIN_TID || tid > MAX_TID || tid_table[tid] != 0)
            return NULL;
    } else {
        /* Pick the next available tid */
        register int i;
        for (i = MIN_TID; i <= MAX_TID; i++)
            if (tid_table[i] == 0) {
                tid = i;
                goto CONT;
            }
        return NULL; /* No tid available */
    }

CONT:
    /* Allocate a proc_t for task first */
    if ((pp = (proc_t *)kmem_zalloc(sizeof(proc_t), KM_NOSLEEP)) == NULL) {
            splx(s);
        return NULL; /* No heap space available */
    }
    pp->p_tid = tid;
    pp->priority = pri; /* Only used for admin task (pri == -1) */
    pp->p_cred = &loc_cred;
    pp->p_func = func;
    pp->p_param = arg; /* Pass the parameter */
    tid_table[tid] = 1; /* Mark tid as used */
    splx(s);
    enter_task(tid, pp); /* Enter into proc_tbl[] */

    pp->p_stat = SRUN;
```

© COPYRIGHT 1994 AMDAHL CORPORATION

```
    (void)splstr();
    ACTIVATE_PROC(pp); /* Put into ready list */

    /* Create VRTX task */

    sys_sc_tcreates(start_task_func, tid, NORM_PROC_PRIO, &err);
    if (err != 0) {
        delete_task(tid);
            splx(s);
        kmem_free((_VOID *)pp, sizeof(proc_t));
        return NULL;
    }
    splx(s);
    return pp;
}

STATIC void kill(tid)
    int tid;
{
    register proc_t *pp;

    pp = *(PT_HASH(tid));

    while (pp != NULL) {
        if (pp->p_tid == tid)
            break;
        pp = pp->p_plink;
    }

    if (pp == NULL) {
         SCHED_PROC
        return;
    }
    if (pp->p_stat & SSLEEP)
        unsleep(pp);
    pp->p_stat = SIDLE;
    delete_task(tid);
    kmem_free((_VOID *)pp, sizeof(proc_t));
}

STATIC void post_mortem()
{
    register struct TCB *tcb;

    asm("        movem.l d0-d1/a0-a1,-(sp)"); /* Save registers */
```

© COPYRIGHT 1994 AMDAHL CORPORATION

```
   tcb = asm(struct TCB *, "  move.l a1,d0");
   kill(tcb->tbid);
   asm("        movem.l (sp)+,d0-d1/a0-a1"); /* Restore registers */
}

void init_cleanup()
{
   sys_insert_hooks(NULL, post_mortem, NULL);
}
```

© COPYRIGHT 1994 AMDAHL CORPORATION

```
/* File: ioctl.c - last edit:
 * helge        Tue May 12 16:32:21 1992
 *
 * Copyright (c) 1991 by Amdahl Corporation. All rights reserved.

 * Copyright (c) 1992 by Amdahl Corporation. All rights reserved.
 */

#include <sys/debug.h>
#include <sys/errno.h>
#include <sys/file.h>
#include <sys/filio.h>
#include <sys/kmem.h>
#include <sys/lstream.h>
#include <sys/param.h>
#include <sys/stropts.h>
#include <sys/strsubr.h>
#include <sys/sysmacros.h>
#include <sys/termio.h>
#include <sys/ttold.h>

#define STATIC

STATIC int strioctl(vp, cmd, arg, flag, crp, rvalp)
    struct vnode *vp;
    int cmd;
    int arg;
    int flag;
    cred_t *crp;
    int *rvalp;

{
    register struct stdata *stp;
    register int s;
    struct strioctl strioc;
    mblk_t *mp;
    int error = 0;
    int done = 0;
    char *fmt = NULL;

    stp = vp->v_stream;

    /*
     * if a message is being "held" awaiting possible consolidation, send it
     * downstream before processing ioctl.
```

© COPYRIGHT 1994 AMDAHL CORPORATION

```
 */
{
     register queue_t *q = stp->sd_wrq;

     s = splstr();
     if (mp = q->q_first) {
         q->q_first = NULL;
         splx(s);
         putnext(q, mp);
     } else
         splx(s);
}

if (stp->sd_flag & (STRDERR | STWRERR | STPLEX))
     return ((stp->sd_flag & STPLEX) ? EINVAL :
          (stp->sd_werror ? stp->sd_werror : stp->sd_rerror));

switch (cmd) {

default:
     if (((cmd & IOCTYPE) == LDIOC) ||
          ((cmd & IOCTYPE) == tIOC) ||
          ((cmd & IOCTYPE) == TIOC)) {

          /*
           * The ioctl is a tty ioctl - set up strioc buffer and call
           * strdoioctl() to do the work.
           */
          if (stp->sd_flag & STRHUP)
               return (ENXIO);
          strioc.ic_cmd = cmd;
          strioc.ic_timout = INFTIM;

          switch (cmd) {
          case TCXONC:
          case TCSBRK:
          case TCFLSH:
          case TCDSET:
               strioc.ic_len = sizeof(int);
               strioc.ic_dp = (char *) &arg;
               return (strdoioctl(stp, &strioc, NULL, STRINT, crp, rvalp));

          case TCSETA:
          case TCSETAW:
          case TCSETAF:
```

© COPYRIGHT 1994 AMDAHL CORPORATION

```
        strioc.ic_len = sizeof(struct termio);
        strioc.ic_dp = (char *) arg;
        return (strdoioctl(stp, &strioc, NULL, STRTERMIO, crp, rvalp));

    case TCSETS:
    case TCSETSW:
    case TCSETSF:
        strioc.ic_len = sizeof(struct termios);
        strioc.ic_dp = (char *) arg;
        return (strdoioctl(stp, &strioc, NULL, STRTERMIOS, crp, rvalp));

    case LDSETT:
        strioc.ic_len = sizeof(struct termcb);
        strioc.ic_dp = (char *) arg;
        return (strdoioctl(stp, &strioc, NULL, STRTERMCB, crp, rvalp));

    case TIOCSETP:
        strioc.ic_len = sizeof(struct sgttyb);
        strioc.ic_dp = (char *) arg;
        return (strdoioctl(stp, &strioc, NULL, STRSGTTYB, crp, rvalp));

    case TIOCSTI:
        if (pm_denied(crp, P_DACREAD)) {
            if ((flag & FREAD) == 0)
                return (EPERM);
        }
        strioc.ic_len = sizeof(char);
        strioc.ic_dp = (char *) arg;
        return (strdoioctl(stp, &strioc, NULL, "c", crp, rvalp));

    case TCGETA:
        fmt = STRTERMIO;

    case TCGETS:
        if (fmt == NULL)
            fmt = STRTERMIOS;

    case LDGETT:
        if (fmt == NULL)
            fmt = STRTERMCB;

    case TIOCGETP:
        if (fmt == NULL)
            fmt = STRSGTTYB;
        strioc.ic_len = 0;
```

© COPYRIGHT 1994 AMDAHL CORPORATION

```
            strioc.ic_dp = (char *) arg;
            return (strdoioctl(stp, &strioc, NULL, fmt, crp, rvalp));
        }
    }

    /*
     * Unknown cmd - send down request to support transparent ioctls.
     */

    strioc.ic_cmd = cmd;
    strioc.ic_timout = INFTIM;
    strioc.ic_len = TRANSPARENT;
    strioc.ic_dp = (char *) &arg;
    return (strdoioctl(stp, &strioc, NULL, (char *) NULL, crp, rvalp));

case I_STR:

    /*
     * Stream ioctl. Read in an strioctl buffer from the user along with
     * any data specified and send it downstream. Strdoioctl will wait
     * allow only one ioctl message at a time, and waits for the
     * acknowledgement.
     */

    if (stp->sd_flag & STRHUP)
        return (ENXIO);
    bcopy((caddr_t) arg, (caddr_t) & strioc, sizeof(struct strioctl));
    if ((strioc.ic_len < 0) || (strioc.ic_timout < -1))
        return (EINVAL);
    error = strdoioctl(stp, &strioc, NULL, (char *) NULL, crp, rvalp);
    if (error == 0)
        bcopy((caddr_t) & strioc, arg, sizeof(struct strioctl));
    return (error);

case I_NREAD:
case FIONREAD:

    /*
     * Return number of bytes of data in first message in queue in "arg"
     * and return the number of messages in queue in return value.
     */
    {
        int count = 0;

        s = splstr();
```

© COPYRIGHT 1994 AMDAHL CORPORATION

```
        *((int *) arg) = 0;
        mp = RD(stp->sd_wrq)->q_first;
        while (mp) {
            if (!(mp->b_flag & MSGNOGET))
                break;
            mp = mp->b_next;
        }
        if (mp)
            *((int *) arg) = msgdsize(mp);
        if (cmd == FIONREAD) {
            splx(s);
            return (0);
        }
        for (; mp; mp = mp->b_next)
            if (!(mp->b_flag & MSGNOGET))
                count++;
        *rvalp = count;
        splx(s);
        return (0);
    }
case FIORDCHK:

    /*
     * FIORDCHK does not use arg value (like FIONREAD), instead a count
     * is returned. I_NREAD value may not be accurate but safe. The real
     * thing to do is to add the msgdsizes of all data messages until a
     * non-data message.
     */
    {
        int size = 0;

        s = splstr();
        mp = RD(stp->sd_wrq)->q_first;
        while (mp) {
            if (!(mp->b_flag & MSGNOGET))
                break;
            mp = mp->b_next;
        }
        if (mp)
            size = msgdsize(mp);
        *rvalp = size;
        splx(s);
        return (0);
    }
```

© COPYRIGHT 1994 AMDAHL CORPORATION

```
case I_FIND:

    /*
     * Get module name.
     */
    {
        queue_t *q;
        int i;

        /*
         * Find module in fmodsw.
         */
        if ((i = findmod((caddr_t) arg)) < 0)
            return (EINVAL);

        *rvalp = 0;

        /* Look downstream to see if module is there. */
        for (q = stp->sd_wrq->q_next; q &&
                (fmodsw[i].f_str->st_wrinit != q->q_qinfo); q = q->q_next);

        *rvalp = (q ? 1 : 0);
        return 0;
    }

case I_PUSH:

    /*
     * Push a module.
     */

    {
        register int i;
        register queue_t *q;
        register queue_t *tq;
        register qband_t *qbp;
        int idx;
        dev_t dummydev;
        uchar_t *rqbf, *wqbf;
        int renab, wenab;
        int nrband, nwband;

        if (stp->sd_flag & STRHUP)
            return (ENXIO);
        if (stp->sd_pushcnt >= nstrpush)
```

© COPYRIGHT 1994 AMDAHL CORPORATION

```
        return (EINVAL);

    /*
     * Look up module name in fmodsw.
     */
    if ((idx = findmod((caddr_t) arg)) < 0)
        return (EINVAL);

    rqbf = kmem_zalloc(NBAND, KM_SLEEP);
    wqbf = kmem_zalloc(NBAND, KM_SLEEP);
    while (stp->sd_flag & STWOPEN) {
        if (flag & (FNDELAY | FNONBLOCK)) {
            kmem_free(rqbf, NBAND);
            kmem_free(wqbf, NBAND);
            return (EAGAIN);
        }
        if (sleep((caddr_t) stp, STOPRI | PCATCH)) {
            kmem_free(rqbf, NBAND);
            kmem_free(wqbf, NBAND);
            return (EINTR);
        }
        if (stp->sd_flag & (STRDERR | STWRERR | STRHUP | STPLEX)) {
            kmem_free(rqbf, NBAND);
            kmem_free(wqbf, NBAND);
            return ((stp->sd_flag & STPLEX) ? EINVAL :
                    (stp->sd_werror ? stp->sd_werror :
                        stp->sd_rerror));
        }
    }
    s = splstr();
    stp->sd_flag |= STWOPEN;
    q = RD(stp->sd_wrq);
    renab = 0;
    if (q->q_flag & QWANTW) {
        renab = 1;
        rqbf[0] = 1;
    }
    nrband = (int) q->q_nband;
    for (i = 1, qbp = q->q_bandp; i <= nrband; i++) {
        if (qbp->qb_flag & QB_WANTW) {
            renab = 1;
            rqbf[i] = 1;
        }
        qbp = qbp->qb_next;
    }
```

© COPYRIGHT 1994 AMDAHL CORPORATION

```
for (q = stp->sd_wrq->q_next; q && !q->q_qinfo->qi_srvp;
      q = q->q_next);
wenab = 0;
nwband = 0;
if (q) {
     if (q->q_flag & QWANTW) {
          wenab = 1;
          wqbf[0] = 1;
     }
     nwband = (int) q->q_nband;
     for (i = 1, qbp = q->q_bandp; i <= nwband; i++) {
          if (qbp->qb_flag & QB_WANTW) {
               wenab = 1;
               wqbf[i] = 1;
          }
          qbp = qbp->qb_next;
     }
}
splx(s);

/*
 * Push new module and call its open routine via qattach().
 * Modules don't change device numbers, so just ignore dummydev
 * here.
 */
dummydev = vp->dev;
if ((error = qattach(RD(stp->sd_wrq), &dummydev, 0, FMODSW, idx, crp)) == 0)
     stp->sd_pushcnt++;
else {
     s = splstr();
     tq = RD(stp->sd_wrq);
     for (q = backq(tq); q && !q->q_qinfo->qi_srvp;
           q = backq(q));
     if (q) {
          done = 0;
          if (rqbf[0] && !(tq->q_flag & QWANTW))
               done = 1;
          else
               rqbf[0] = 0;
          qbp = tq->q_bandp;
          for (i = 1; i <= nrband; i++) {
               if (rqbf[i] && !(qbp->qb_flag & QB_WANTW))
                    done = 1;
               else
                    rqbf[i] = 0;
```

© COPYRIGHT 1994 AMDAHL CORPORATION

```
                qbp = qbp->qb_next;
            }
            if (done) {
                qenable(q);
                for (i = 0; i <= nrband; i++) {
                    if (rqbf[i])
                        setqback(q, i);
                }
            }
        }
        for (q = stp->sd_wrq->q_next; q && !q->q_qinfo->qi_srvp;
            q = q->q_next);
        if (q) {
            done = 0;
            if (wqbf[0] && !(q->q_flag & QWANTW))
                done = 1;
            else
                wqbf[0] = 0;
            qbp = q->q_bandp;
            for (i = 1; i <= nwband; i++) {
                if (wqbf[i] && !(qbp->qb_flag & QB_WANTW))
                    done = 1;
                else
                    wqbf[i] = 0;
                qbp = qbp->qb_next;
            }
            if (done) {
                qenable(stp->sd_wrq);
                for (i = 0; i <= nwband; i++) {
                    if (wqbf[i])
                        setqback(stp->sd_wrq, i);
                }
            }
        }
        goto pushdone;
    }

    /*
     * If flow control is on, don't break it - enable first back
     * queue with svc procedure.
     */
    s = splstr();
    q = RD(stp->sd_wrq->q_next);
    if (q->q_qinfo->qi_srvp) {
        for (q = backq(q); q && !q->q_qinfo->qi_srvp;
```

© COPYRIGHT 1994 AMDAHL CORPORATION

```
                q = backq(q));
            if (q && renab) {
                qenable(q);
                for (i = 0; i <= nrband; i++) {
                    if (rqbf[i])
                        setqback(q, i);
                }
            }
        }
        q = stp->sd_wrq->q_next;
        if (q->q_qinfo->qi_srvp) {
            if (wenab) {
                qenable(stp->sd_wrq);
                for (i = 0; i <= nwband; i++) {
                    if (wqbf[i])
                        setqback(stp->sd_wrq, i);
                }
            }
        }
pushdone:
        stp->sd_flag &= ~STWOPEN;
        splx(s);
        kmem_free((caddr_t) rqbf, NBAND);
        kmem_free((caddr_t) wqbf, NBAND);
        wakeprocs((caddr_t) stp, PRMPT);
        return (error);
    }

case I_POP:

    /*
     * Pop module (if module exists).
     */

    if (stp->sd_flag & STRHUP)
        return (ENXIO);
    if (!stp->sd_wrq->q_next)      /* for broken pipes */
        return (EINVAL);
    if (stp->sd_wrq->q_next->q_next &&
        !(stp->sd_wrq->q_next->q_flag & QREADR)) {
        qdetach(RD(stp->sd_wrq->q_next), 1, flag, crp);
        stp->sd_pushcnt--;
        return (0);
    }
    return (EINVAL);
```

© COPYRIGHT 1994 AMDAHL CORPORATION

```
case I_LOOK:

     /*
      * Get name of first module downstream. If no module, return an
      * error.
      */
     {
        int i;

        for (i = 0; i < fmodcnt; i++)
             if (fmodsw[i].f_str->st_wrinit == stp->sd_wrq->q_next->q_qinfo) {
                bcopy(fmodsw[i].f_name, (char *) arg, FMNAMESZ + 1);
                return 0;
             }
        return (EINVAL);
     }

case I_LINK:
case I_PLINK:

     /*
      * Link a multiplexor.
      */

     {
        struct linkinfo *linkp, *alloclink();
        struct stdata *stpdown;
        queue_t *rq;

        /*
         * Test for invalid upper stream
         */
        if (stp->sd_flag & STRHUP)
             return (ENXIO);
        if (!stp->sd_strtab->st_muxwinit)
             return (EINVAL);

        /* Get lower stream */
        if (arg < 0 || arg >= MAX_FD ||
             (stpdown = lstr_fd[arg].stp) == NULL)
           return EINVAL;

        /*
         * Test for invalid lower stream.
         */
```

© COPYRIGHT 1994 AMDAHL CORPORATION

```
if (stpdown == stp || (stpdown->sd_flag &
        (STPLEX | STRHUP | STRDERR | STWRERR | IOCWAIT)) ||
        linkcycle(stp, stpdown))
    return (EINVAL);
if (cmd == I_PLINK)
    rq = NULL;
else
    rq = getendq(stp->sd_wrq);
if (!(linkp = alloclink(rq, stpdown->sd_wrq, stpdown->sd_vnode)))
    return (EAGAIN);
strioc.ic_cmd = cmd;
strioc.ic_timout = 0;
strioc.ic_len = sizeof(struct linkblk);
strioc.ic_dp = (char *) &linkp->li_lblk;

/* Set up queues for link */
rq = RD(stpdown->sd_wrq);
setq(rq, stp->sd_strtab->st_muxrinit, stp->sd_strtab->st_muxwinit);
rq->q_ptr = WR(rq)->q_ptr = NULL;
rq->q_flag |= QWANTR;
WR(rq)->q_flag |= QWANTR;

if (error = strdoioctl(stp, &strioc, NULL, STRLINK, crp, rvalp)) {
    lbfree(linkp);
    setq(rq, loc_strhinfo.st_rdinit, loc_strhinfo.st_wrinit);
    rq->q_ptr = WR(rq)->q_ptr = (caddr_t) stpdown;
    return (error);
}
s = splstr();
stpdown->sd_flag |= STPLEX;
stpdown->sd_vnode->v_count++;
if (error = mux_addedge(stp, stpdown, linkp->li_lblk.l_index)) {
    int type;

    if (cmd == I_LINK) {
        type = LINKIOCTL | LINKNORMAL;
        strioc.ic_cmd = I_UNLINK;
    } else {        /* I_PLINK */
        type = LINKIOCTL | LINKPERSIST;
        strioc.ic_cmd = I_PUNLINK;
    }
    splx(s);
    (void) munlink(stp, linkp, type, crp, rvalp);
    return (error);
}
```

© COPYRIGHT 1994 AMDAHL CORPORATION

```
            splx(s);

            /*
             * Wake up any other processes that may have been waiting on the
             * lower stream.  These will all error out.
             */
            wakeprocs((caddr_t) rq, PRMPT);
            wakeprocs((caddr_t) WR(rq), PRMPT);
            wakeprocs((caddr_t) stpdown, PRMPT);
            *rvalp = linkp->li_lblk.l_index;
            return (0);
        }

    case I_UNLINK:
    case I_PUNLINK:

        /*
         * Unlink a multiplexor. If arg is -1, unlink all links for which
         * this is the controlling stream.  Otherwise, arg is a index number
         * for a link to be removed.
         */

        {
            struct linkinfo *linkp;
            int type;

            if (cmd == I_UNLINK)
                type = LINKIOCTL | LINKNORMAL;
            else /* I_PUNLINK */
                type = LINKIOCTL | LINKPERSIST;
            if (arg == 0)
                return (EINVAL);
            if (arg == MUXID_ALL)
                error = munlinkall(stp, type, crp, rvalp);
            else {
                if (!(linkp = findlinks(stp, arg, type))) {
                    /* invalid user supplied index number */
                    return (EINVAL);
                }
                error = munlink(stp, linkp, type, crp, rvalp);
            }
            return (error);
        }

    case I_FLUSH:
```

© COPYRIGHT 1994 AMDAHL CORPORATION

```
        /*
         * send a flush message downstream flush message can indicate FLUSHR
         * - flush read queue FLUSHW - flush write queue FLUSHRW - flush
         * read/write queue
         */
        if (stp->sd_flag & STRHUP)
            return (ENXIO);
        if (arg & ~FLUSHRW)
            return (EINVAL);
        while (!putctl1(stp->sd_wrq->q_next, M_FLUSH, arg))
            if (error = strwaitbuf(1, BPRI_HI))
                return (error);

        if (qready())
            runqueues();
        return (0);

    case I_FLUSHBAND:
        {
            struct bandinfo binfo;

            bcopy((caddr_t) arg, (caddr_t) & binfo, sizeof(struct bandinfo));
            if (stp->sd_flag & STRHUP)
                return (ENXIO);
            if (binfo.bi_flag & ~FLUSHRW)
                return (EINVAL);
            while (!(mp = allocb(2, BPRI_HI))) {
                if (error = strwaitbuf(2, BPRI_HI))
                    return (error);
            }
            mp->b_datap->db_type = M_FLUSH;
            *mp->b_wptr++ = binfo.bi_flag | FLUSHBAND;
            *mp->b_wptr++ = binfo.bi_pri;
            putnext(stp->sd_wrq, mp);
            if (qready())
                runqueues();
            return (0);
        }

    case I_SRDOPT:

        /*
         * Set read options
         *
         * RNORM - default stream mode RMSGN - message no discard RMSGD -
```

© COPYRIGHT 1994 AMDAHL CORPORATION

```
    * message discard RPROTNORM - fail read with EBADMSG for
    * M_[PC]PROTOs RPROTDAT - convert M_[PC]PROTOs to M_DATAs RPROTDIS -
    * discard M_[PC]PROTOs and retain M_DATAs
    */
   if (arg & ~(RMODEMASK | RPROTMASK))
      return (EINVAL);

   s = splstr();
   switch (arg & RMODEMASK) {
   case RNORM:
      stp->sd_flag &= ~(RMSGDIS | RMSGNODIS);
      break;
   case RMSGD:
      stp->sd_flag = (stp->sd_flag & ~RMSGNODIS) | RMSGDIS;
      break;
   case RMSGN:
      stp->sd_flag = (stp->sd_flag & ~RMSGDIS) | RMSGNODIS;
      break;
   }

   switch (arg & RPROTMASK) {
   case RPROTNORM:
      stp->sd_flag &= ~(RDPROTDAT | RDPROTDIS);
      break;

   case RPROTDAT:
      stp->sd_flag = ((stp->sd_flag & ~RDPROTDIS) |
            RDPROTDAT);
      break;

   case RPROTDIS:
      stp->sd_flag = ((stp->sd_flag & ~RDPROTDAT) |
            RDPROTDIS);
      break;
   }
   splx(s);
   return (0);

case I_GRDOPT:

    /*
     * Get read option and return the value to spot pointed to by arg
     */
    {
       *((int *) arg) = ((stp->sd_flag & RMSGDIS) ? RMSGD :
```

© COPYRIGHT 1994 AMDAHL CORPORATION

```
            ((stp->sd_flag & RMSGNODIS) ? RMSGN : RNORM));
        *((int *) arg) |= ((stp->sd_flag & RDPROTDAT) ? RPROTDAT :
            ((stp->sd_flag & RDPROTDIS) ? RPROTDIS : RPROTNORM));

        return (0);
    }

case I_PEEK:
    {
        struct strpeek *strpeek = (struct strpeek *)arg;
        int n;
        char *buff;
        int rem_space;

        s = splstr();
        mp = RD(stp->sd_wrq)->q_first;
        while (mp) {
            if (!(mp->b_flag & MSGNOGET))
                break;
            mp = mp->b_next;
        }
        splx(s);
        if (!mp || ((strpeek->flags & RS_HIPRI) && queclass(mp) == QNORM)) {
            *rvalp = 0;
            return (0);
        }
        if (mp->b_datap->db_type == M_PCPROTO)
            strpeek->flags = RS_HIPRI;
        else
            strpeek->flags = 0;

        /*
         * First process PROTO blocks, if any.
         */
        buff = strpeek->ctlbuf.buf;
        rem_space = strpeek->ctlbuf.maxlen;
        while (mp && mp->b_datap->db_type != M_DATA && rem_space >= 0) {
            n = MIN(rem_space, mp->b_wptr - mp->b_rptr);
            bcopy(mp->b_rptr, buff, n);
            buff += n;
            rem_space -= n;
            mp = mp->b_cont;
        }
        strpeek->ctlbuf.len = strpeek->ctlbuf.maxlen - rem_space;
```

© COPYRIGHT 1994 AMDAHL CORPORATION

```
        /*
         * Now process DATA blocks, if any.
         */
        while (mp && mp->b_datap->db_type != M_DATA)
            mp = mp->b_cont;
        buff = strpeek->databuf.buf;
        rem_space = strpeek->databuf.maxlen;
        while (mp && rem_space >= 0) {
            n = MIN(rem_space, mp->b_wptr - mp->b_rptr);
            bcopy(mp->b_rptr, buff, n);
            buff += n;
            rem_space -= n;
            mp = mp->b_cont;
        }

        strpeek->databuf.len = strpeek->databuf.maxlen - rem_space;
        *rvalp = 1;
        return 0;
    }

case I_FDINSERT:
    {
        struct strfdinsert *strfdinsert = (struct strfdinsert *) arg;
        struct stdata *resstp;
        queue_t *q;
        register long msgsize;
        long rmin, rmax;
        int strmakemsg();

        if (stp->sd_flag & STRHUP)
            return (ENXIO);
        if (stp->sd_flag & (STRDERR | STWRERR | STPLEX))
            return ((stp->sd_flag & STPLEX) ? EINVAL :
                (stp->sd_werror ? stp->sd_werror : stp->sd_rerror));
        if (strfdinsert->offset < 0 ||
              (strfdinsert->offset % sizeof(queue_t *)) != 0)
            return (EINVAL);
        if (strfdinsert->fildes < 0 || strfdinsert->fildes >= MAX_FD ||
              (resstp = lstr_fd[strfdinsert->fildes].stp) == NULL)
            return (EINVAL);

        if (resstp->sd_flag & (STRDERR | STWRERR | STRHUP | STPLEX))
            return ((resstp->sd_flag & STPLEX) ? EINVAL :
                (resstp->sd_werror ? resstp->sd_werror :
                    resstp->sd_rerror));
```

© COPYRIGHT 1994 AMDAHL CORPORATION

```
/* get read queue of stream terminus */
for (q = resstp->sd_wrq->q_next; q->q_next; q = q->q_next);
q = RD(q);

if (strfdinsert->ctlbuf.len < strfdinsert->offset + sizeof(queue_t *))
    return (EINVAL);

/*
 * Check for legal flag value.
 */
if (strfdinsert->flags & ~RS_HIPRI)
    return (EINVAL);

/*
 * Make sure ctl and data sizes together fall within the limits
 * of the max and min receive packet sizes and do not exceed
 * system limit.  A negative data length means that no data part
 * is to be sent.
 */
rmin = stp->sd_wrq->q_next->q_minpsz;
rmax = stp->sd_wrq->q_next->q_maxpsz;
ASSERT((rmax >= 0) || (rmax == INFPSZ));
if (rmax == 0)
    return (ERANGE);
if (strmsgsz != 0) {
    if (rmax == INFPSZ)
        rmax = strmsgsz;
    else
        rmax = MIN(strmsgsz, rmax);
}
if ((msgsize = strfdinsert->databuf.len) < 0)
    msgsize = 0;
if ((msgsize < rmin) ||
     ((msgsize > rmax) && (rmax != INFPSZ)) ||
     (strfdinsert->ctlbuf.len > strctlsz))
    return (ERANGE);

s = splstr();
while (!(strfdinsert->flags & RS_HIPRI) &&
       !bcanput(stp->sd_wrq->q_next, 0)) {
    if ((error = strwaitq(stp, WRITEWAIT, (off_t) 0,
                     flag, &done)) || done) {
        splx(s);
        return (error);
    }
```

© COPYRIGHT 1994 AMDAHL CORPORATION

```
            }
            splx(s);

            if ((error = strmakemsg(&strfdinsert->ctlbuf,
                        strfdinsert->databuf.len, strfdinsert->databuf.buf, stp,
                        strfdinsert->flags, &mp)) || !mp)
                return (error);

            /*
             * Place pointer to queue 'offset' bytes from the start of the
             * control portion of the message.
             */

            *((queue_t **) (mp->b_rptr + strfdinsert->offset)) = q;

            /*
             * Put message downstream.
             */
            (*stp->sd_wrq->q_next->q_qinfo->qi_putp) (stp->sd_wrq->q_next, mp);

            if (qready())
                runqueues();
            return (error);
        }
    case I_SWROPT:

        /*
         * Set/clear the write options. arg is a bit mask with any of the
         * following bits set... SNDZERO - send zero length message. The new
         * stream head write options should reflect what is in arg.
         */
        if (arg & ~(SNDZERO | SNDPIPE))
            return (EINVAL);

        s = splstr();
        stp->sd_flag &= ~STRSNDZERO;
        if (arg & SNDZERO)
            stp->sd_flag |= STRSNDZERO;
        splx(s);
        return (0);

    case I_GWROPT:
        {
            if (stp->sd_flag & STRSNDZERO)
                *((int *) arg) = SNDZERO;
```

© COPYRIGHT 1994 AMDAHL CORPORATION

```
            else
                *((int *) arg) = 0;
            return (0);
        }

    case I_LIST:

        /*
         * Returns all the modules found on this stream, upto the driver. If
         * argument is NULL, return the number of modules (including driver).
         * If argument is not NULL, copy the names into the structure
         * provided.
         */

        {
            queue_t *q;
            int space_allocated;
            struct str_list *strlist;
            struct str_mlist *strmlist;

            if (arg == NULL) {          /* Return number of modules plus driver */
                q = stp->sd_wrq;
                *rvalp = stp->sd_pushcnt + 1;
            } else {
                strlist = (struct str_list *) arg;
                strmlist = strlist->sl_modlist;
                if ((space_allocated = strlist->sl_nmods) <= 0)
                    return (EINVAL);
                q = stp->sd_wrq;
                strlist->sl_nmods = 0;
                while (SAMESTR(q) && (space_allocated != 0)) {
                    bcopy(q->q_next->q_qinfo->qi_minfo->mi_idname,
                          strmlist->l_name, (FMNAMESZ + 1));
                    q = q->q_next;
                    space_allocated--;
                    strlist->sl_nmods++;
                    strmlist++;
                }
                if (SAMESTR(q))         /* Space ran out */
                    return (ENOSPC);
            }
            return (0);
        }

    case I_CKBAND:
```

© COPYRIGHT 1994 AMDAHL CORPORATION

```
        {
            queue_t *q = RD(stp->sd_wrq);
            qband_t *qbp;

            /*
             * Ignores MSGNOGET.
             */
            if ((arg < 0) || (arg >= NBAND))
                return (EINVAL);
            if (arg > (int) q->q_nband) {
                *rvalp = 0;
            } else {
                if (arg == 0) {
                    if (q->q_first)
                        *rvalp = 1;
                    else
                        *rvalp = 0;
                } else {
                    qbp = q->q_bandp;
                    while (--arg > 0)
                        qbp = qbp->qb_next;
                    if (qbp->qb_first)
                        *rvalp = 1;
                    else
                        *rvalp = 0;
                }
            }
            return (0);
        }

    case I_GETBAND:

        /*
         * Ignores MSGNOGET.
         */
        mp = RD(stp->sd_wrq)->q_first;
        if (!mp)
            return (ENODATA);
        *((int *) arg) = (int) mp->b_band;
        return (0);

    case I_ATMARK:
        {
            queue_t *q = RD(stp->sd_wrq);
```

© COPYRIGHT 1994 AMDAHL CORPORATION

```
            if (arg & ~(ANYMARK | LASTMARK))
                return (EINVAL);
            s = splstr();
            mp = q->q_first;

            /*
             * Hack for sockets compatibility.  We need to ignore any
             * messages at the stream head that are marked MSGNOGET and are
             * not marked MSGMARK.
             */
            while (mp && ((mp->b_flag & (MSGNOGET | MSGMARK)) == MSGNOGET))
                mp = mp->b_next;

            if (!mp)
                *rvalp = 0;
            else if ((arg == ANYMARK) && (mp->b_flag & MSGMARK))
                *rvalp = 1;
            else if ((arg == LASTMARK) && (mp == stp->sd_mark))
                *rvalp = 1;
            else
                *rvalp = 0;
            splx(s);
            return (0);
        }

    case I_CANPUT:
        {
            char band;

            if ((arg < 0) || (arg >= NBAND))
                return (EINVAL);
            band = (char) arg;
            *rvalp = bcanput(stp->sd_wrq->q_next, band);
            return (0);
        }

    case I_SETCLTIME:
        if (*((int *) arg) < 0)
            return (EINVAL);

        /*
         * Convert between milliseconds and clock ticks.
         */
        stp->sd_closetime = ((*((int *) arg) / 1000) * HZ) +
            ((((*((int *) arg) % 1000) * HZ) + 999) / 1000);
```

© COPYRIGHT 1994 AMDAHL CORPORATION

```
        return (0);

    case I_GETCLTIME:

        /*
         * Convert between clock ticks and milliseconds.
         */
        *((int *) arg) = ((stp->sd_closetime / HZ) * 1000) +
            (((stp->sd_closetime % HZ) * 1000) / HZ);
        return (0);

    case FIONBIO:
    case FIOASYNC:
        return (0);     /* handled by the upper layer (not yet) */
    }
}

/* Ioctl handling for local streams */

int ioctl(fd, request, arg)
    int fd;
    int request;
    caddr_t arg;
{
    int rval = 0;
    register struct stdata *stp;
    register int status;

    if (fd < 0 || fd >= MAX_FD || (stp = lstr_fd[fd].stp) == NULL) {
        set_uerror(EINVAL);
        return -1;
    }
    if ((status = strioctl(stp->sd_vnode, request, (int) arg,
                    stp->sd_vnode->flag, &loc_cred, &rval)) != 0) {
        set_uerror(status);
        return -1;
    } else
        return rval;
}
```

© COPYRIGHT 1994 AMDAHL CORPORATION

```
#ident "%W% %G% %U% %n%"

/* File: mem.c - last edit:
 * helge        Wed Dec  2 17:46:50 1992
 *
 * Copyright (c) 1991 by Amdahl Corporation. All rights reserved.
 * Copyright (c) 1992 by Amdahl Corporation. All rights reserved.
 */

/*
 * The memory available for kmem is allocated in pages. The size of a
 * page is defined param.h. An array of bits indicates which pages are
 * available.
 */

#include <sys/cmn_err.h>
#include <sys/kmem.h>
#include <sys/param.h>

#define STATIC
int availrmem;  /* Total available memory in pages */

typedef struct {
        char c[PAGESIZE]
}       page;

#define FREE_MAP_SIZE 128           /* Enough for 16M when PAGESIZE == 4k */
STATIC unsigned long free_map[FREE_MAP_SIZE];
STATIC int map_element_num;
STATIC page *heap_begin;
STATIC int first_small_index; /* First element in free_map to look at for
                               * one page requests */
STATIC int first_small_bit;   /* First bit to look at in that element */
STATIC int first_4_index;     /* First element in free_map to look at for 4
                               * page requests */
STATIC int first_4_bit;       /* First bit to look at in that element */
STATIC int first_large_index; /* First element in free_map to look at for
                               * multiple page requests */
STATIC int first_large_bit;   /* First bit to look at in that element */

/* Positions to indicate start of search during allocation */
STATIC int small_srch_beg_index, small_srch_beg_bit, fr_srch_beg_index,
        fr_srch_beg_bit, large_srch_beg_index, large_srch_beg_bit;

/*
```

© COPYRIGHT 1994 AMDAHL CORPORATION

```
 * dump_free_map - Report free_map status through ki.
 */

int dump_free_map(buffer, ki_data, out_len, ip)
        char *buffer;
        void *ki_data;
        int *out_len;
        char *ip;        /* Ignored */
{
        register char *b_ptr = buffer;
        register int i;

        sprintf(b_ptr, "availrmem %d", availrmem);
        b_ptr += strlen(b_ptr) + 1;
        for (i = 0; i < map_element_num; i++) {
                sprintf(b_ptr, "%x ", free_map[i]);
                b_ptr += strlen(b_ptr);
        }
        *out_len = (b_ptr - buffer) + 1;
        return 0;
}

/*
 * init_str_mem - Initializes data structures for kmem_alloc() memory
 *                allocation. Calls kmem_init() at the end.
 */

int init_str_mem(kmem_heap_begin, size)
        char *kmem_heap_begin;
        unsigned long size;      /* Size in bytes */
{
        register int i;
        int extra_bits;

        /* Make sure heap starts on 4k boundary */
        if (((unsigned int) kmem_heap_begin & 0xfff) != 0) {
                /* Not on 4k boundary */
                unsigned long diff = 0x1000 - ((unsigned int) kmem_heap_begin & 0xfff);

                kmem_heap_begin += diff;
                size -= diff;
        }
        heap_begin = (page *) kmem_heap_begin;
        availrmem = btop(size);         /* Get number of available pages */
        extra_bits = availrmem & 31;
```

© COPYRIGHT 1994 AMDAHL CORPORATION

```
        map_element_num = (availrmem >> 5) + (extra_bits > 0);          /* Number of map
                                                                         * elements needed */
        if (map_element_num > FREE_MAP_SIZE) {
                cmn_err(CE_WARN, "init_str_mem: more pages than bit map space\n");
                map_element_num = FREE_MAP_SIZE;
        }
        for (i = 0; i < map_element_num; i++)
                free_map[i] = 0xffffffff;
        if (extra_bits > 0) {
                unsigned long mask = 0;
                unsigned long one = 1;

                for (i = 0; i < 32 - extra_bits; i++) {
                        mask |= one;
                        one <<= 1;
                }
                free_map[map_element_num - 1] &= ~mask;
        }
        first_small_index = 0;
        first_small_bit = 0;
        /* Allocate half of the pages for one page allocation */
        first_large_index = (availrmem >> 6);
        first_large_bit = ((availrmem >> 5) & 1) * 16 + extra_bits / 2;
        /* Four page allocation starts from the end */
        first_4_index = map_element_num - 1;
        first_4_bit = extra_bits;
        small_srch_beg_index = first_small_index;
        small_srch_beg_bit = first_small_bit;
        fr_srch_beg_index = first_4_index;
        fr_srch_beg_bit = first_4_bit;
        large_srch_beg_index = first_large_index;
        large_srch_beg_bit = first_large_bit;
        kmem_init();
}

/*
 * palloc4 - Allocates chunks of four page memory starting from the end of
 *           the heap. Interrupts are disabled on entry.
 */

STATIC int palloc4(s)
        int s;
{
        register int index;
        register int bit;
```

© COPYRIGHT 1994 AMDAHL CORPORATION

```
        register unsigned long m;
        int second_time = 0;
        register int end_index = 0;
        register int n;

        index = fr_srch_beg_index;
        bit = fr_srch_beg_bit;
        m = 1 << (31 - bit);

AGAIN:
        while ((free_map[index] & m) == 0) {
                if ((m <<= 1) == 0) {
                        if (--index < end_index) {
                                if (second_time) {
                                        splx(s);
                                        return 0;
                                }
                                second_time = 1;
                                bit = first_4_bit;
                                index = first_4_index;
                                end_index = fr_srch_beg_index;
                                m = 1 << (31 - bit);
                                goto AGAIN;
                        }
                        bit = 31;
                        m = 1;
                } else
                        --bit;
        }
        for (n = 3; n > 0; --n) {
                if ((m <<= 1) == 0) {
                        if (--index < end_index) {
                                if (second_time) {
                                        splx(s);
                                        return 0;
                                }
                                second_time = 1;
                                bit = first_4_bit;
                                index = first_4_index;
                                end_index = fr_srch_beg_index;
                                m = 1 << (31 - bit);
                                goto AGAIN;
                        }
                        bit = 31;
                        m = 1;
```

© COPYRIGHT 1994 AMDAHL CORPORATION

```
            } else
                    --bit;
            if ((free_map[index] & m) == 0)
                    goto AGAIN;
        }
        /* Success */
        availrmem -= 4;
        free_map[index] &= ~m;
        if (m == 1) {
                free_map[index + 1] &= 0x1fffffff;
        } else if (m == 2) {
                free_map[index] &= ~1;
                free_map[index + 1] &= 0x3fffffff;
        } else if (m == 4) {
                free_map[index] &= ~3;
                free_map[index + 1] &= 0x7fffffff;
        } else {
                free_map[index] &= ~(7 << (28 - bit));
        }
        fr_srch_beg_index = index;
        fr_srch_beg_bit = bit;
        splx(s);
        return (int) &heap_begin[bit + (index << 5)];
}

/*
 * pagealloc - Allocate pages of consecutive memory
 */

int pagealloc(page_num)
        int page_num;
{
        register int index;
        register int bit;
        register unsigned long m;
        register int n;
        register int end_index;
        int second_time = 0;
        int s;

        if (page_num < 1)
                return 0;
        s = splhi();

        if (page_num == 1) {
```

© COPYRIGHT 1994 AMDAHL CORPORATION

```
                index = small_srch_beg_index;
                bit = small_srch_beg_bit;
        } else if (page_num == 4) {
                return palloc4(s);
        } else {
                index = large_srch_beg_index;
                bit = large_srch_beg_bit;
        }

        end_index = map_element_num;
        m = 1 << (31 - bit);
AGAIN:
        while ((free_map[index] & m) == 0) {
                if ((m >>= 1) == 0) {
                        if (++index >= end_index) {
                                if (second_time) {
                                        splx(s);
                                        return 0;
                                }
                                second_time = 1;
                                end_index = (page_num == 1 ? small_srch_beg_index + 1 :
                                      large_srch_beg_index + 1);
                                index = 0;
                                bit = 0;
                                m = 0x80000000;
                                continue;
                        }
                        m = 0x80000000;
                        bit = 0;
                } else
                        ++bit;
        }
        for (n = page_num - 1; n > 0; --n) {
                if ((m >>= 1) == 0) {
                        if (++index >= end_index) {
                                if (second_time) {
                                        splx(s);
                                        return 0;
                                }
                                second_time = 1;
                                end_index = large_srch_beg_index + 1;
                                index = 0;
                                bit = 0;
                                m = 0x80000000;
                                goto AGAIN;
```

© COPYRIGHT 1994 AMDAHL CORPORATION

```
                        }
                        m = 0x80000000;
                        bit = 0;
                } else
                        bit++;
                if ((free_map[index] & m) == 0)
                        goto AGAIN;
        }
        /* Success */
        if (page_num == 1) {
                free_map[index] &= ~m;
                availrmem--;
                small_srch_beg_index = index;
                small_srch_beg_bit = bit;
        } else {
                large_srch_beg_index = index;
                large_srch_beg_bit = bit;
                free_map[index] &= ~m;
                availrmem -= page_num;
                /* Clear the remaining bits */
                for (n = page_num - 1; n > 0; n--) {
                        if (m == 0x80000000) {
                                index--;
                                m = 1;
                                bit = 31;
                        } else {
                                m <<= 1;
                                bit--;
                        }
                        free_map[index] &= ~m;
                }
        }
        splx(s);
        return (int) &heap_begin[bit + (index << 5)];
}

/*
 * pagefree - free some pages of memory.
 */

void pagefree(pageptr, page_num)
        caddr_t pageptr;
        int page_num;
{
        int page_index, index;
```

40

© COPYRIGHT 1994 AMDAHL CORPORATION

```
register int bit;
register unsigned long m;
register int n;
int s;

if (page_num <= 0)
        return;
s = splhi();
page_index = (page *) pageptr - heap_begin;
index = page_index >> 5;
bit = page_index & 31;
m = 1 << (31 - bit);
if (page_num == 1) {
        if (free_map[index] & m) {
                cmn_err(CE_PANIC, "pagefree: Page deallocated more than once");
                splx(s);        /* Not reached */
        }
        availrmem++;
        free_map[index] |= m;
        if (index < small_srch_beg_index ||
            (index == small_srch_beg_index && bit < small_srch_beg_bit)) {
                small_srch_beg_index = index;
                small_srch_beg_bit = bit;
        }
        splx(s);
} else {
        if (page_num == 4) {
                if (index > fr_srch_beg_index ||
                    (index == fr_srch_beg_index && bit > fr_srch_beg_bit)) {
                        fr_srch_beg_index = index;
                        fr_srch_beg_bit = bit;
                }
        } else if (index >= first_large_index && bit >= first_large_bit) {
                if (index < large_srch_beg_index ||
                    (index == large_srch_beg_index && bit < large_srch_beg_bit)) {
                        large_srch_beg_index = index;
                        large_srch_beg_bit = bit;
                }
        }
        for (n = page_num;;) {
                if (free_map[index] & m) {
                        splx(s);
                        cmn_err(CE_PANIC,
                            "pagefree: Page deallocated more than once %d %x (%d %d)",
                            index, m, page_index >> 5, page_index % 32);
```

© COPYRIGHT 1994 AMDAHL CORPORATION

```
                        } else
                                availrmem++;
                        free_map[index] |= m;
                        if (--n == 0) {
                                splx(s);
                                return;
                        }
                        if ((m >>= 1) == 0) {
                                m = 0x80000000;
                                index++;
                        }
                }
        }
}
```

© COPYRIGHT 1994 AMDAHL CORPORATION

```
/* File: open.c - last edit:
 * helge        Fri Jan 31 18:42:24 1992
 *
 * Copyright (c) 1991 by Amdahl Corporation. All rights reserved.
 */

#include <sys/cmn_err.h>
#include <sys/errno.h>
#include <sys/lstream.h>
#include <sys/param.h>
#include <sys/vnode.h>

/*
 * openf - Open locally a device referred by dev_name.
 */

int open(path, oflag)
    char *path;
    int oflag;
{
    int sflag;
    register struct vnode *vp;
    dev_t dev;
    register int status;
    register int s;

    if ((dev = get_dev(path)) == NODEV) {
        /* Device does not exist */
        set_uerror(ENOENT);
        return -1;
    }

    if ((vp = find_vnode(dev)) == NULL) {
        set_uerror(ENOENT);
        return -1;
    }
    s = splhi();
    vp->v_count++;
    splx(s);

    status = stropen(vp, &dev, oflag, &loc_cred, &loc_strhinfo, 0);
    if (status != 0) {
        set_uerror(status);
        s = splhi();
        vp->v_count--;
```

© COPYRIGHT 1994 AMDAHL CORPORATION

```
        splx(s);
        return -1;
    }
    if ((vp = find_vnode(dev)) != NULL) {
        register int fd;
        vp->flag = oflag;
        vp->strhinfo = &loc_strhinfo;
        if ((fd = get_fd(vp->v_stream)) < 0)
            closevp(vp, &loc_cred);
        return fd;
    } else {
        cmn_err(CE_WARN, "inconsistent data structs after stropen");
        set_uerror(EINVAL);
        return -1;
    }
}
```

© COPYRIGHT 1994 AMDAHL CORPORATION

```
#ident "%W% %G% %U% %n%"
/* %N% */
/* File: module.c - last edit:
 * helge        Wed Mar 10 13:17:44 1993
 *
 * Copyright (c) 1991 by Amdahl Corporation. All rights reserved.
 * Copyright (c) 1993 by Amdahl Corporation. All rights reserved.
 */

#include <sys/cred.h>
#include <sys/dsf.h>
#include <sys/errno.h>
#include <sys/file.h>
#include <sys/kmem.h>
#include <sys/param.h>
#include <sys/stream.h>
#include <sys/strsubr.h>
#include <sys/vnode.h>
#include <spl.h>


/*
 * push_mod - Push a module on top of (open) driver.
 */

int push_mod(vp, mod_name, cred)
    struct vnode *vp;
    char *mod_name;
    struct cred *cred;
{
    register stdata_t *stp;
    register int i;
    register queue_t *q;
    register queue_t *tq;
    register qband_t *qbp;
    int idx;
    uchar_t *rqbf, *wqbf;
    int renab, wenab;
    int nrband, nwband;
    int error;
    dev_t dummydev;
    register int s;

    if (vp == NULL || (vp->v_type & VNODE_MARK) != VNODE_MARK
          || vp->v_count == 0 || (stp = vp->v_stream) == NULL) {
```

© COPYRIGHT 1994 AMDAHL CORPORATION

```
        return (EINVAL);
    }
    if (stp->sd_flag & STRHUP)
        return (ENXIO);
    if (stp->sd_pushcnt >= nstrpush)
        return (EINVAL);

    /*
     * firewall - don't use too much memory
     */

    if (strthresh && (Strcount > strthresh) && !suser(cred))
        return (ENOSR);

    /* Find module */

    if ((idx = findmod(mod_name)) < 0)
        return (EINVAL);

    rqbf = kmem_zalloc(NBAND, KM_SLEEP);
    wqbf = kmem_zalloc(NBAND, KM_SLEEP);
    while (stp->sd_flag & STWOPEN) {
        if (vp->flag & (FNDELAY | FNONBLOCK)) {
            /*
             * Note: If flag was changed on host after open, we don't know
             * about it.
             */
            kmem_free(rqbf, NBAND);
            kmem_free(wqbf, NBAND);
            return (EAGAIN);
        }
        if (sleep((caddr_t) stp, STOPRI | PCATCH)) {
            kmem_free(rqbf, NBAND);
            kmem_free(wqbf, NBAND);

            return (EINTR);
        }
        if (stp->sd_flag & (STRDERR | STWRERR | STRHUP | STPLEX)) {
            kmem_free(rqbf, NBAND);
            kmem_free(wqbf, NBAND);
            return ((stp->sd_flag & STPLEX) ? EINVAL :
                    (stp->sd_werror ? stp->sd_werror :
                            stp->sd_rerror));
        }
    }
```

© COPYRIGHT 1994 AMDAHL CORPORATION

```
s = splstr();
stp->sd_flag |= STWOPEN;
q = RD(stp->sd_wrq);
renab = 0;
if (q->q_flag & QWANTW) {
     renab = 1;
     rqbf[0] = 1;
}
nrband = (int) q->q_nband;
for (i = 1, qbp = q->q_bandp; i <= nrband; i++) {
     if (qbp->qb_flag & QB_WANTW) {
         renab = 1;
         rqbf[i] = 1;
     }
     qbp = qbp->qb_next;
}
for (q = stp->sd_wrq->q_next; q && !q->q_qinfo->qi_srvp;
       q = q->q_next);
wenab = 0;
nwband = 0;
if (q) {
     if (q->q_flag & QWANTW) {
         wenab = 1;
         wqbf[0] = 1;
     }
     nwband = (int) q->q_nband;
     for (i = 1, qbp = q->q_bandp; i <= nwband; i++) {
         if (qbp->qb_flag & QB_WANTW) {
              wenab = 1;
              wqbf[i] = 1;
         }
         qbp = qbp->qb_next;
     }
}
splx(s);

/*
 * Push new module and call its open routine via qattach(). Modules don't
 * change device numbers, so just ignore dummydev here.
 */
dummydev = vp->dev;
if ((error = qattach(RD(stp->sd_wrq), &dummydev, 0, FMODSW, idx, cred)) == 0)
      stp->sd_pushcnt++;
else {
    register int done;
```

© COPYRIGHT 1994 AMDAHL CORPORATION

```
s = splstr();
tq = RD(stp->sd_wrq);
for (q = backq(tq); q && !q->q_qinfo->qi_srvp;
     q = backq(q));
if (q) {
    done = 0;
    if (rqbf[0] && !(tq->q_flag & QWANTW))
         done = 1;
    else
         rqbf[0] = 0;
    qbp = tq->q_bandp;
    for (i = 1; i <= nrband; i++) {
         if (rqbf[i] && !(qbp->qb_flag & QB_WANTW))
             done = 1;
         else
             rqbf[i] = 0;
         qbp = qbp->qb_next;
    }
    if (done) {
         qenable(q);
         for (i = 0; i <= nrband; i++) {
             if (rqbf[i])
                  setqback(q, i);
         }
    }
}
for (q = stp->sd_wrq->q_next; q && !q->q_qinfo->qi_srvp;
     q = q->q_next);
if (q) {
    done = 0;
    if (wqbf[0] && !(q->q_flag & QWANTW))
         done = 1;
    else
         wqbf[0] = 0;
    qbp = q->q_bandp;
    for (i = 1; i <= nwband; i++) {
         if (wqbf[i] && !(qbp->qb_flag & QB_WANTW))
             done = 1;
         else
             wqbf[i] = 0;
         qbp = qbp->qb_next;
    }
    if (done) {
         qenable(stp->sd_wrq);
         for (i = 0; i <= nwband; i++) {
```

© COPYRIGHT 1994 AMDAHL CORPORATION

```
                    if (wqbf[i])
                        setqback(stp->sd_wrq, i);
                }
            }
        }
        goto pushdone;
    }

    /*
     * If flow control is on, don't break it - enable first back queue with
     * svc procedure.
     */
    s = splstr();
    q = RD(stp->sd_wrq->q_next);
    if (q->q_qinfo->qi_srvp) {
        for (q = backq(q); q && !q->q_qinfo->qi_srvp;
            q = backq(q));
        if (q && renab) {
            qenable(q);
            for (i = 0; i <= nrband; i++) {
                if (rqbf[i])
                    setqback(q, i);
            }
        }
    }
    q = stp->sd_wrq->q_next;
    if (q->q_qinfo->qi_srvp) {
        if (wenab) {
            qenable(stp->sd_wrq);
            for (i = 0; i <= nwband; i++) {
                if (wqbf[i])
                    setqback(stp->sd_wrq, i);
            }
        }
    }
pushdone:
    stp->sd_flag &= ~STWOPEN;
    splx(s);
    kmem_free((caddr_t) rqbf, NBAND);
    kmem_free((caddr_t) wqbf, NBAND);
    wakeprocs((caddr_t) stp, PRMPT);
    return (error);
}

/*
```

© COPYRIGHT 1994 AMDAHL CORPORATION

```
 * pop_mod - Pop top-module off a STREAM.
 */

int pop_mod(vp, cred)
    struct vnode *vp;
    struct cred *cred;
{
    register stdata_t *stp;

    if (vp == NULL || (vp->v_type & VNODE_MARK) != VNODE_MARK
          || vp->v_count == 0 || (stp = vp->v_stream) == NULL) {
          return (EINVAL);
    }
    if (stp->sd_flag & STRHUP)
          return (ENXIO);
    if (!stp->sd_wrq->q_next)          /* for broken pipes */
          return (EINVAL);
    if (stp->sd_wrq->q_next->q_next &&
            !(stp->sd_wrq->q_next->q_flag & QREADR)) {
          qdetach(RD(stp->sd_wrq->q_next), 1, vp->flag, cred);
          stp->sd_pushcnt--;
          return (0);
    }
    return (EINVAL);
}
```

© COPYRIGHT 1994 AMDAHL CORPORATION

```
/* File: read.c - last edit:
 * helge        Wed Jan 22 20:41:22 1992
 *
 * Copyright (c) 1991 by Amdahl Corporation. All rights reserved.
 */

/*
 * Contains routines to do local reads and getmsg on a stream.
 */

#include <sys/debug.h>
#include <sys/errno.h>
#include <sys/file.h>
#include <sys/lstream.h>
#include <sys/param.h>
#include <sys/stream.h>
#include <sys/stropts.h>
#include <sys/strsubr.h>
#include <sys/sysmacros.h>
#include <sys/vnode.h>


/*
 * Read a stream according to the mode flags in sd_flag:
 *
 * (default mode)            - Byte stream, msg boundries are ignored
 * RMSGDIS (msg discard)     - Read on msg boundries and throw away
 *                             any data remaining in msg
 * RMSGNODIS (msg non-discard) - Read on msg boundries and put back
 *                             any remaining data on head of read queue
 *
 * Consume readable messages on the front of the queue until count
 * is satisfied, the readable messages are exhausted, or a message
 * boundary is reached in a message mode. If no data was read and
 * the stream was not opened with the NDELAY flag, block until data arrives.
 * Otherwise return the data read and update the count.
 *
 * In default mode a 0 length message signifies end-of-file and terminates
 * a read in progress. The 0 length message is removed from the queue
 * only if it is the only message read (no data is read).
 *
 * An attempt to read an M_PROTO or M_PCPROTO message results in an
 * EBADMSG error return, unless either RDPROTDAT or RDPROTDIS are set.
 * If RDPROTDAT is set, M_PROTO and M_PCPROTO messages are read as data.
 * If RDPROTDIS is set, the M_PROTO and M_PCPROTO parts of the message
```

© COPYRIGHT 1994 AMDAHL CORPORATION

```
 * are unlinked from and M_DATA blocks in the message, the protos are
 * thrown away, and the data is read.
 */
/* ARGSUSED */
int read(fd, buff, nbytes) /* Returns number of bytes read */
   int fd;
   char *buff;
   int nbytes; /* Number of bytes to be read */
{
   struct vnode *vp;
   register s;
   register struct stdata *stp;
   register mblk_t *bp, *nbp;
   int n;
   int done = 0;
   int error;
   register int bytes_remain = nbytes;
   char rflg;
   short mark;
   short delim;
   unsigned char pri;

   if (fd < 0 || fd >= MAX_FD || (stp = lstr_fd[fd].stp) == NULL) {
      set_uerror(EINVAL);
      return -1;
   }

   if (stp->sd_flag & (STRDERR | STPLEX)) {
        set_uerror((stp->sd_flag & STPLEX) ? EINVAL : stp->sd_rerror);
        return -1;
   }

   /*
    * Loop terminates when bytes_remain == 0.
    */
   rflg = 0;
   for (;;) {
        s = splstr();
        mark = 0;
        delim = 0;
        while (!(bp = getq(RD(stp->sd_wrq)))) {
           if (stp->sd_flag & STRHUP) {
                splx(s);
                return 0;
           }
```

© COPYRIGHT 1994 AMDAHL CORPORATION

```
        if (rflg && !(stp->sd_flag & STRDELIM)) {
            splx(s);
            return nbytes - bytes_remain;
        }

        if ((error = strwaitq(stp, READWAIT, bytes_remain,
                        stp->sd_vnode->flag, &done)) || done) {
            if ((stp->sd_vnode->flag & FNDELAY) &&
                (stp->sd_flag & OLDNDELAY) && (error == EAGAIN)) {
                splx(s);
                return nbytes - bytes_remain;
            }
            splx(s);
            set_uerror(error);
            return -1;
        }
    } /* while */

    if (stp->sd_mark == bp) {
        if (rflg) {
            putbq(RD(stp->sd_wrq), bp);
            splx(s);
            return nbytes - bytes_remain;
        }
        mark = 1;
        stp->sd_mark = NULL;
    }
    if ((stp->sd_flag & STRDELIM) && (bp->b_flag & MSGDELIM))
        delim = 1;
    splx(s);

    pri = bp->b_band;
    if (qready())
        runqueues();

    switch (bp->b_datap->db_type) {
    case M_DATA:
ismdata:
        if (msgdsize(bp) == 0) {
            if (mark || delim) {
                freemsg(bp);
            } else if (rflg) {
                /*
                 * If already read data put zero length message back on
                 * queue else free msg and return 0.
```

© COPYRIGHT 1994 AMDAHL CORPORATION

```
            */
            bp->b_band = pri;
            putbq(RD(stp->sd_wrq), bp);
        } else {
            freemsg(bp);
        }
        return (nbytes - bytes_remain);
    }
    rflg = 1;
    while (bp && bytes_remain) {
        if (n = MIN(bytes_remain, bp->b_wptr - bp->b_rptr)) {
            bcopy(bp->b_rptr, buff, n);
            bytes_remain -= n;
            buff += n;
        }

        bp->b_rptr += n;
        while (bp && (bp->b_rptr >= bp->b_wptr)) {
            nbp = bp;
            bp = bp->b_cont;
            freeb(nbp);
        }
    }

    /*
     * The data may have been the leftover of a PCPROTO, so if none
     * is left reset the STRPRI flag just in case.
     */
    if (bp) {
        /*
         * Have remaining data in message. Free msg if in discard
         * mode.
         */
        if (stp->sd_flag & RMSGDIS) {
            freemsg(bp);
            s = splstr();
            stp->sd_flag &= ~STRPRI;
            splx(s);
        } else {
            s = splstr();
            bp->b_band = pri;
            if (mark && !stp->sd_mark) {
                stp->sd_mark = bp;
                bp->b_flag |= MSGMARK;
            }
```

© COPYRIGHT 1994 AMDAHL CORPORATION

```
                if (delim)
                    bp->b_flag |= MSGDELIM;
                putbq(RD(stp->sd_wrq), bp);
                splx(s);
            }
        } else {
            s = splstr();
            stp->sd_flag &= ~STRPRI;
            splx(s);
        }

        if ((bytes_remain == 0) || mark || delim ||
            (stp->sd_flag & (RMSGDIS | RMSGNODIS)))
            return nbytes - bytes_remain;
        continue;

    case M_PROTO:
    case M_PCPROTO:

        /*
         * Only data messages are readable. Any others generate an
         * error, unless RDPROTDIS or RDPROTDAT is set.
         */
        if (stp->sd_flag & RDPROTDAT) {
            for (nbp = bp; nbp; nbp = bp->b_next)
                nbp->b_datap->db_type = M_DATA;
            s = splstr();
            stp->sd_flag &= ~STRPRI;
            splx(s);
            goto ismdata;
        } else if (stp->sd_flag & RDPROTDIS) {
            while (bp &&
                ((bp->b_datap->db_type == M_PROTO) ||
                    (bp->b_datap->db_type == M_PCPROTO))) {
                nbp = unlinkb(bp);
                freeb(bp);
                bp = nbp;
            }
            s = splstr();
            stp->sd_flag &= ~STRPRI;
            splx(s);
            if (bp) {
                bp->b_band = pri;
                goto ismdata;
            } else
```

© COPYRIGHT 1994 AMDAHL CORPORATION

```
                break;
            }

            putbq(RD(stp->sd_wrq), bp);
            set_uerror(EBADMSG);
            return -1;

        default:

            /*
             * Garbage on stream head read queue.
             */
            ASSERT(0);
            freemsg(bp);
            break;
        }
    }

    /* NOTREACHED */
}

static struct strbuf null_buff = {0, 0, NULL};

int getmsg(fd, ctlptr, dataptr, flagsp)
     int fd;
     struct strbuf *ctlptr;
     struct strbuf *dataptr;
     int *flagsp;
{
    register struct stdata *stp;
    unsigned char band = 0;
    register int status;
    int flag;
    int rval;

    if (*flagsp == 0)
        flag = MSG_ANY;
    else if (*flagsp == RS_HIPRI)
        flag = MSG_HIPRI;
    else {
        set_uerror(EINVAL);
        return -1;
    }
    if (fd < 0 || fd >= MAX_FD || (stp = lstr_fd[fd].stp) == NULL) {
        set_uerror(EINVAL);
```

© COPYRIGHT 1994 AMDAHL CORPORATION

```
        return -1;
    }
    if ((status = strgetmsg(stp->sd_vnode,
          (ctlptr == NULL ? &null_buff : ctlptr),
          (dataptr == NULL ? &null_buff : dataptr), &band, &flag,
          stp->sd_vnode->flag, &rval)) != 0) {
        set_uerror(status);
        return -1;
    }
    if (flag == MSG_HIPRI)
        *flagsp = RS_HIPRI;
    return rval;
}

int getpmsg(fd, ctlptr, dataptr, bandp, flagsp)
    int fd;
    struct strbuf *ctlptr;
    struct strbuf *dataptr;
    unsigned char *bandp;
    int *flagsp;
{
    register struct stdata *stp;
    register int status;
    int rval;

    if (fd < 0 || fd >= MAX_FD || (stp = lstr_fd[fd].stp) == NULL) {
        set_uerror(EINVAL);
        return -1;
    }
    if ((status = strgetmsg(stp->sd_vnode,
          (ctlptr == NULL ? &null_buff : ctlptr),
          (dataptr == NULL ? &null_buff : dataptr), bandp, flagsp,
          stp->sd_vnode->flag, &rval)) != 0) {
        set_uerror(status);
        return -1;
    }
    return rval;
}


/*
 * Get the next message from the read queue. If the message is
 * priority, STRPRI will have been set by strrput(). This flag
 * should be reset only when the entire message at the front of the
 * queue as been consumed.
```

© COPYRIGHT 1994 AMDAHL CORPORATION

```
 */
static int strgetmsg(vp, mctl, mdata, prip, flagsp, fmode, rvalp)
    register struct vnode *vp;
    register struct strbuf *mctl;
    register struct strbuf *mdata;
    unsigned char *prip;
    int *flagsp;
    int fmode;
    int *rvalp;
{
    register s;
    register struct stdata *stp;
    register mblk_t *bp, *nbp;
    mblk_t *savemp = NULL;
    mblk_t *savemptail = NULL;
    int n, bcnt;
    int done = 0;
    int flg = 0;
    int more = 0;
    int error = 0;
    char *ubuf;
    int mark;
    unsigned char pri;
    queue_t *q;

    ASSERT(vp->v_stream);
    stp = vp->v_stream;

    if (stp->sd_flag & (STRDERR | STPLEX))
        return ((stp->sd_flag & STPLEX) ? EINVAL : stp->sd_rerror);

    q = RD(stp->sd_wrq);
    *rvalp = 0;

    switch (*flagsp) {
    case MSG_HIPRI:
        if (*prip != 0)
            return (EINVAL);
        break;

    case MSG_ANY:
    case MSG_BAND:
        break;

    default:
```

© COPYRIGHT 1994 AMDAHL CORPORATION

```
        return (EINVAL);
    }

    s = splstr();
    mark = 0;
    while (((*flagsp & MSG_HIPRI) && !(stp->sd_flag & STRPRI)) ||
           ((*flagsp & MSG_BAND) && (!q->q_first ||
                   ((q->q_first->b_band < *prip) && !(stp->sd_flag & STRPRI)))) ||
           !(bp = getq(q))) {

        /*
         * If STRHUP, return 0 length control and data.
         */
        if (stp->sd_flag & STRHUP) {
            mctl->len = mdata->len = 0;
            *flagsp = flg;
            splx(s);
            return (error);
        }
        if ((error = strwaitq(stp, GETWAIT, (off_t) 0, fmode, &done)) || done) {
            splx(s);
            return (error);
        }
    }
    if (bp == stp->sd_mark) {
        mark = 1;
        stp->sd_mark = NULL;
    }
    splx(s);

    pri = bp->b_band;
    if (qready())
        runqueues();

    /*
     * Set HIPRI flag if message is priority.
     */
    if (stp->sd_flag & STRPRI)
        flg = MSG_HIPRI;
    else
        flg = MSG_BAND;

    /*
     * First process PROTO or PCPROTO blocks, if any.
     */
```

© COPYRIGHT 1994 AMDAHL CORPORATION

```
if (mctl->maxlen >= 0 && bp && bp->b_datap->db_type != M_DATA) {
      bcnt = mctl->maxlen;
      ubuf = mctl->buf;
      while (bp && bp->b_datap->db_type != M_DATA && bcnt >= 0) {
         n = MIN(bcnt, bp->b_wptr - bp->b_rptr);
         bcopy((caddr_t) bp->b_rptr, ubuf, n);
         ubuf += n;
         bp->b_rptr += n;
         if (bp->b_rptr >= bp->b_wptr) {
               nbp = bp;
               bp = bp->b_cont;
               freeb(nbp);
         }
         if ((bcnt -= n) <= 0)
               break;
      }
      mctl->len = mctl->maxlen - bcnt;
} else
      mctl->len = -1;

if (bp && bp->b_datap->db_type != M_DATA) {
      /*
       * More PROTO blocks in msg.
       */
      more |= MORECTL;
      savemp = bp;
      while (bp && bp->b_datap->db_type != M_DATA) {
         savemptail = bp;
         bp = bp->b_cont;
      }
      savemptail->b_cont = NULL;
}

/*
 * Now process DATA blocks, if any.
 */
if (mdata->maxlen >= 0 && bp) {
      bcnt = mdata->maxlen;
      ubuf = mdata->buf;
      while (bp && bcnt >= 0) {
         n = MIN(bcnt, bp->b_wptr - bp->b_rptr);
         bcopy((caddr_t) bp->b_rptr, ubuf, n);
         ubuf += n;
         bp->b_rptr += n;
         if (bp->b_rptr >= bp->b_wptr) {
```

© COPYRIGHT 1994 AMDAHL CORPORATION

```
            nbp = bp;
            bp = bp->b_cont;
            freeb(nbp);
        }
        if ((bcnt -= n) <= 0)
            break;
    }
    mdata->len = mdata->maxlen - bcnt;
} else
    mdata->len = -1;

if (bp) {       /* more data blocks in msg */
    more |= MOREDATA;
    if (savemp)
        savemptail->b_cont = bp;
    else
        savemp = bp;
}
s = splstr();
if (savemp) {
    savemp->b_band = pri;
    if (mark && !stp->sd_mark) {
        savemp->b_flag |= MSGMARK;
        stp->sd_mark = savemp;
    }
    putbq(q, savemp);
} else {
    stp->sd_flag &= ~STRPRI;
}
splx(s);

*flagsp = flg;
*prip = pri;

/*
 * Getmsg cleanup processing - if the state of the queue has changed some
 * signals may need to be sent and/or poll awakened.
 */
while ((bp = q->q_first) && (bp->b_datap->db_type == M_SIG)) {
    bp = getq(q);
    freemsg(bp);
}
if (qready())
    runqueues();
```

© COPYRIGHT 1994 AMDAHL CORPORATION

```
    *rvalp = more;
    return (error);
}
```

© COPYRIGHT 1994 AMDAHL CORPORATION

```
#ident "%W% %G% %U% %n%"

/* File: rstrsubr.c - last edit:
 * helge        Tue Jun  8 17:57:11 1993
 *
 * Copyright (c) 1991 by Amdahl Corporation. All rights reserved
 * Copyright (c) 1992 by Amdahl Corporation. All rights reserved.
 * Copyright (c) 1993 by Amdahl Corporation. All rights reserved.
 */

#include <bio.h>
#include <sys/clock.h>
#include <sys/cmn_err.h>
#include <sys/dsf.h>
#include <sys/dsf_obj.h>
#include <sys/param.h>
#include <sys/stream.h>
#include <sys/strsubr.h>
#include <spl.h>

#ifdef ITRACE
#include "itrace.h"
#endif

#define STATIC

void resend_ack_naks();
extern volatile int receive_stopped;

static uint pow2[] = {512, 1024, 2048, 4096, 8192, 16384, 2*16384, 4*16384};

STATIC mblk_t *alloc_split_buffs(length, offset)
        uint length;
        uint offset;
{
        register int i;
        register uint total_size = length + offset;
        register uint alloc_size;
        register int rem_len;
        int stage = 0;
        register mblk_t *ret_mp, **cur_mp;
        register uint cur_alloc_size;

        for (i = 1; i < sizeof(pow2)/sizeof(uint); ++i) {
                if (total_size <= pow2[i]) {
```

© COPYRIGHT 1994 AMDAHL CORPORATION

```
                        alloc_size = pow2[i-1];
                        goto GOT_IT;
                }
        }
        alloc_size = 8*16384;
        while (total_size > alloc_size)
                alloc_size <<= 1;
        alloc_size >>= 1;
GOT_IT:
        if ((ret_mp = allocb(alloc_size, BPRI_MED)) == NULL) {
                alloc_size >>= 1;
                stage = 1;
                if ((ret_mp = allocb(alloc_size, BPRI_MED)) == NULL)
                        return NULL;
        }
        ret_mp->b_rptr += offset;
        ret_mp->b_wptr += alloc_size;
        rem_len = total_size - alloc_size;
        cur_mp = &ret_mp->b_cont;
        while (rem_len > 0) {
                cur_alloc_size = (alloc_size > rem_len ? rem_len : alloc_size);
                if ((*cur_mp = allocb(cur_alloc_size, BPRI_MED)) == NULL) {
                        if (stage > 0) {
                                /* failure */
                                freemsg(ret_mp);
                                return NULL;
                        }
                        stage = 1;
                        alloc_size >>= 1;
                        continue;
                }
                (*cur_mp)->b_wptr += cur_alloc_size;
                cur_mp = &((*cur_mp)->b_cont);
                rem_len -= cur_alloc_size;
        }
        return ret_mp;
}

/*
 * build_msg - Construct a STREAMS message out of a flat buffer.
 *              It returns the total length of the message (non-negative int),
 *                or in case of allocation failure -1
 *                mpp points to the created STREAMS message.
 */
```

© COPYRIGHT 1994 AMDAHL CORPORATION

```
int build_msg(buff_ptr, mpp)
        register struct msg_buff *buff_ptr;
        mblk_t **mpp;
{
        register mblk_t *new_mp, **cur_mpp;
        register int processed_len = 0;

        *mpp = NULL;
        cur_mpp = mpp;
        if (receive_stopped && (buff_ptr->type == M_DATA ||
                  buff_ptr->type == M_PROTO))
                /* if 1, no allocation of M_DATA and M_PROTO
                 * messages because of lack of resources
                 */
                return -1;
        for (;;) {
                if ((new_mp = allocb(buff_ptr->length + buff_ptr->offset, BPRI_MED)) ==
                     NULL) {
                   /* Try splitting up if data message */
                   if (buff_ptr->type == M_DATA && buff_ptr->length > 1023 &&
                         buff_ptr->offset <= 128 &&
                         (new_mp = alloc_split_buffs(buff_ptr->length,
                                 buff_ptr->offset)) != NULL) {
                        register int sub_len;
                        register char *data_ptr = (char *) buff_ptr +
                                buff_ptr->dataoffset;
                        *cur_mpp = new_mp;
                        for (;;) {
                                sub_len = new_mp->b_wptr - new_mp->b_rptr;
                                new_mp->b_band = buff_ptr->band;
                                        new_mp->b_flag = buff_ptr->flag;
                                        new_mp->b_datap->db_type = buff_ptr->type;
                                bcopy(data_ptr, new_mp->b_rptr, sub_len);
                                if (new_mp->b_cont == NULL)
                                        goto NEXT;
                                data_ptr += sub_len;
                                new_mp = new_mp->b_cont;
                        }
                        }

                        /*
                         * Allocation failed, free already allocated part and
                         * return -1
                         */
                        *cur_mpp = NULL;
```

© COPYRIGHT 1994 AMDAHL CORPORATION

```
                freemsg(*mpp);
                return -1;
            }
            new_mp->b_rptr += buff_ptr->offset;
            new_mp->b_wptr = new_mp->b_rptr + buff_ptr->length;
            new_mp->b_band = buff_ptr->band;
            new_mp->b_flag = buff_ptr->flag;
            new_mp->b_datap->db_type = buff_ptr->type;
            bcopy((char *) buff_ptr + buff_ptr->dataoffset, new_mp->b_rptr,
                buff_ptr->length);
            *cur_mpp = new_mp;
    NEXT:
            cur_mpp = &new_mp->b_cont;
            processed_len += buff_ptr->length;
            if (buff_ptr->cont == 0) {
                *cur_mpp = NULL;
                return processed_len;
            }
            buff_ptr++;    /* Goto next message block */
    }
}

/*
 * send_ack - Send an acknowledgement about received data and communicate the
 *          current window. It updates the number of last ack sent,
 *          if it was successful. If write_fct() fails, it calls
 *          transport_err().
 */

void send_ack(dsfep, priority)
    struct dsf_element *dsfep;
    int priority;
{
    register struct dsf_msg *ack_msg_ptr;
    register mblk_t *ack_mp = allocb(sizeof(struct dsf_msg_header)
        + sizeof(struct r_ack_msg), BPRI_MED);
    register struct rcv_info *rcv_infop;

    if (ack_mp == NULL) {
            /* Could not allocate message buffer */
            if (dsfep->dsf_rinfo.rec_info.ack_nak_bid == 0 &&
                (dsfep->dsf_rinfo.rec_info.ack_nak_bid = bufcall(
                        sizeof(struct dsf_msg_header) + sizeof(struct r_ack_msg),
                        BPRI_MED, resend_ack_naks, (long) dsfep)) == 0) {
                /*
```

© COPYRIGHT 1994 AMDAHL CORPORATION

```
                 * bufcall() failed, let global routine retry.
                 */
                dsfep->dsf_rinfo.rec_info.ack_nak_bid = 0xffffffff;
                dsf_reg_chk_bufcalls(dsfep->dsf_chan_obj_ptr);
            }
            return;
        }
        ack_msg_ptr = (struct dsf_msg *) ack_mp->b_rptr;
        ack_mp->b_wptr += (sizeof(struct dsf_msg_header)
            + sizeof(struct r_ack_msg));
        ack_msg_ptr->header.type = DSF_ADMIN;
        ack_msg_ptr->header.priority = DSF_HI_PRI;
        ack_msg_ptr->header.ack_req = 0;
        ack_msg_ptr->header.fragm = 0;
        ack_msg_ptr->header.len = sizeof(struct dsf_msg_header)
            + sizeof(struct r_ack_msg);
        ack_msg_ptr->header.src_id = (int) dsfep;
        ack_msg_ptr->header.dest_id = dsfep->dsf_rinfo.remote_queue_id;
        ack_msg_ptr->body.admin_msg.type = R_ACK_MSG;
        ack_msg_ptr->body.admin_msg.r_ack_msg.priority = priority;
        rcv_infop = &dsfep->dsf_rinfo.rec_info.rcv_info[priority];
        ack_msg_ptr->body.admin_msg.r_ack_msg.ack_seq = rcv_infop->rec_seq;
        rcv_infop->ack_seq = rcv_infop->rec_seq;

#ifdef ITRACE
        if (itrace_on)
            ENTER_ITRACE_EVENT(dsfep, rcv_infop->rec_seq, ACK, 1, priority,
                dsfep->dsf_rinfo.rec_info.avail_win, 0)
#endif

        ack_msg_ptr->body.admin_msg.r_ack_msg.window_size = dsfep->
                dsf_rinfo.rec_info.avail_win;
        if (dsfep->priority == priority)
            dsfep->dsf_rinfo.rec_info.comm_win = dsfep->dsf_rinfo.rec_info.avail_win;
        if (m_write_msg(dsfep->dsf_chan_obj_ptr, ack_mp, DSF_HI_PRI,
                sizeof(struct dsf_msg_header) + sizeof(struct r_ack_msg)) < 0) {
            freeb(ack_mp);
            transport_err(dsfep->dsf_chan_obj_ptr);
        }
}

void resend_ack_naks(dsfep)
        struct dsf_element *dsfep;
{
        register int i;
```

© COPYRIGHT 1994 AMDAHL CORPORATION

```
        register struct rcv_info *rcv_infop;

        dsfep->dsf_rinfo.rec_info.ack_nak_bid = 0;   /* Clear bufcall field */
        for (i = DSF_PRIO_NUM - 1; i >= 0; i--) {
                rcv_infop = &dsfep->dsf_rinfo.rec_info.rcv_info[i];
                if (rcv_infop->rec_seq == rcv_infop->nak_seq)
                        /* NAK needs to be sent for this priority */
                        send_nak(dsfep, i);
                else if (rcv_infop->rec_seq != rcv_infop->ack_seq ||
                            (i == dsfep->priority && dsfep->dsf_rinfo.rec_info.comm_win <= 0
                          && dsfep->dsf_rinfo.rec_info.avail_win > 0))
                        send_ack(dsfep, i);
        }
}

/*
 * send_nak - Tell the remote the next expected sequence number and the
 *            current window. If due to resource problems the message can
 *            not be sent, make a bufcall to guarantee later delivery.
 *            Make a note about the nak message so it won't be duplicated.
 *            In case of success, it updates the number of last ack sent
 *            and the comm_win field. If write_fct() fails, it calls
 *            transport_err().
 */

void send_nak(dsfep, priority)
        struct dsf_element *dsfep;
        int priority;
{
        register struct dsf_msg *nak_msg_ptr;
        register mblk_t *nak_mp = allocb(sizeof(struct dsf_msg_header)
             + sizeof(struct r_nak_msg), BPRI_MED);
        register struct rcv_info *rcv_infop;

        rcv_infop = &dsfep->dsf_rinfo.rec_info.rcv_info[priority];
        rcv_infop->nak_seq = rcv_infop->rec_seq;
        if (nak_mp == NULL) {
                /* Could not allocate message buffer */
                if (dsfep->dsf_rinfo.rec_info.ack_nak_bid == 0)
                        if ((dsfep->dsf_rinfo.rec_info.ack_nak_bid = bufcall(
                                        sizeof(struct dsf_msg_header) + sizeof(struct r_nak_msg),
                                        BPRI_MED, resend_ack_naks, (long) dsfep)) == 0) {

                                /*
                                 * bufcall() failed, let global routine retry.
```

© COPYRIGHT 1994 AMDAHL CORPORATION

```
                        */
                        dsfep->dsf_rinfo.rec_info.ack_nak_bid = 0xffffffff;
                        dsf_reg_chk_bufcalls(dsfep->dsf_chan_obj_ptr);
                }
        return;
    }
    rcv_infop->ack_seq = rcv_infop->rec_seq;

#ifdef ITRACE
    if (itrace_on)
        ENTER_ITRACE_EVENT(dsfep, rcv_infop->nak_seq, NAK, 1, priority,
            dsfep->dsf_rinfo.rec_info.avail_win, 0)
#endif

    nak_msg_ptr = (struct dsf_msg *) nak_mp->b_rptr;
    nak_mp->b_wptr += (sizeof(struct dsf_msg_header)
        + sizeof(struct r_nak_msg));
    nak_msg_ptr->header.type = DSF_ADMIN;
    nak_msg_ptr->header.priority = DSF_HI_PRI;
    nak_msg_ptr->header.fragm = 0;
    nak_msg_ptr->header.len = sizeof(struct dsf_msg_header)
        + sizeof(struct r_nak_msg);
    nak_msg_ptr->header.src_id = (int) dsfep;
    nak_msg_ptr->header.dest_id = dsfep->dsf_rinfo.remote_queue_id;
    nak_msg_ptr->body.admin_msg.type = R_NAK_MSG;
    nak_msg_ptr->body.admin_msg.r_nak_msg.priority = priority;
    nak_msg_ptr->body.admin_msg.r_nak_msg.nak_seq = rcv_infop->nak_seq;

    nak_msg_ptr->body.admin_msg.r_nak_msg.window_size =
        dsfep->dsf_rinfo.rec_info.avail_win;
    if (dsfep->priority == priority) {
        dsfep->dsf_rinfo.rec_info.comm_win = dsfep->dsf_rinfo.rec_info.avail_win;
        if (dsfep->dsf_rinfo.send_info.non_acked_bytes > 0)
            nak_msg_ptr->header.ack_req = 1;
        else
            nak_msg_ptr->header.ack_req = 0;
    }

    if (m_write_msg(dsfep->dsf_chan_obj_ptr, nak_mp, DSF_HI_PRI,
            sizeof(struct dsf_msg_header) + sizeof(struct r_nak_msg)) < 0) {
        freeb(nak_mp);
        transport_err(dsfep->dsf_chan_obj_ptr);
    }
}
```

© COPYRIGHT 1994 AMDAHL CORPORATION

```
/*
 * send_keepalive - Send a keepalive request or response.
 */

void send_keepalive(dsf_chan_obj_ptr, msg_type)
        struct dsf_chan_obj *dsf_chan_obj_ptr;
        int msg_type;
{
        register struct dsf_msg *kp_alv_msg_ptr;
        register mblk_t *kp_alv_mp = allocb(sizeof(struct dsf_msg_header)
              + sizeof(struct dsf_keepalive), BPRI_MED);

        if (kp_alv_mp == NULL) {
                /* Could not allocate message buffer */
                /* May be next time we have better luck */
                cmn_err(CE_NOTE, "Allocating keepalive message failed");
                return;
        }
        kp_alv_msg_ptr = (struct dsf_msg *) kp_alv_mp->b_rptr;
        kp_alv_mp->b_wptr += (sizeof(struct dsf_msg_header)
              + sizeof(struct dsf_keepalive));
        kp_alv_msg_ptr->header.type = DSF_ADMIN;
        kp_alv_msg_ptr->header.priority = DSF_HI_PRI;
        kp_alv_msg_ptr->header.ack_req = 0;
        kp_alv_msg_ptr->header.fragm = 0;
        kp_alv_msg_ptr->header.len = sizeof(struct dsf_msg_header)
              + sizeof(struct dsf_keepalive);
        kp_alv_msg_ptr->header.src_id = 0;
        kp_alv_msg_ptr->header.dest_id = 0;
        kp_alv_msg_ptr->body.admin_msg.type = msg_type;

        if (m_write_msg(dsf_chan_obj_ptr, kp_alv_mp, DSF_HI_PRI,
                    sizeof(struct dsf_msg_header) + sizeof(struct dsf_keepalive)) < 0) {
                freemsg(kp_alv_mp);
                transport_err(dsf_chan_obj_ptr);
        }
}

/*
 * dsf_check_alive - Check wether media is still alive.
 *              If no message has been received in the last time interval
 *              send out a keep alive message to demand a response. If no
 *              message has been received in the last three time intervals
 *              assume medium is dead and call transport_err().
 *              This routine also checks whether channel got stuck due to depletion
```

© COPYRIGHT 1994 AMDAHL CORPORATION

```
 *              of read buffers. All kept fragments will be freed in that case.
 */

void dsf_check_alive(dsf_chan_obj_ptr)
        struct dsf_chan_obj *dsf_chan_obj_ptr;
{
        register int i;
        register struct dsf_element *dsfep;

        if (dsf_chan_obj_ptr->status_flag != DSF_UP)
                return;
        if (lbolt - dsf_chan_obj_ptr->dsf_stats.last_msg_time > KEEPALIVE_INTERVAL) {
                if (lbolt - dsf_chan_obj_ptr->dsf_stats.last_msg_time >
                    2 * KEEPALIVE_INTERVAL) {
                        if (dsf_chan_obj_ptr->dsf_stats.missed_keepalive > 1) {
                                cmn_err(CE_NOTE, "keepalive failure %x %x", lbolt,
                                        dsf_chan_obj_ptr->dsf_stats.last_msg_time);
                                transport_err(dsf_chan_obj_ptr);
                                m_close(dsf_chan_obj_ptr, 0);
                                return;
                        }
                        dsf_chan_obj_ptr->dsf_stats.missed_keepalive++;
                } else
                        dsf_chan_obj_ptr->dsf_stats.missed_keepalive = 0;
                send_keepalive(dsf_chan_obj_ptr, DSF_KEEPALIVE_REQ);
        } else
                dsf_chan_obj_ptr->dsf_stats.missed_keepalive = 0;
        if (mem_shortage(dsf_chan_obj_ptr->io_state.part_id)) {
                /* We were out of memory already last time */
                /* Free all partially received fragments */
                int s = splstr();       /* To make sure there are no interrupts */

                for (dsfep = dsf_chan_obj_ptr->str_list; dsfep != NULL;
                     dsfep = dsfep->dsf_next_el) {
                        for (i = 0; i < DSF_HI_PRI; i++) {
                                free_frags(dsf_chan_obj_ptr,
                                        &dsfep->dsf_rinfo.rec_info.rcv_info[i]);
                        }
                }
                splx(s);
        }
        timeout(dsf_check_alive, (caddr_t) dsf_chan_obj_ptr, KEEPALIVE_INTERVAL);

        /*
         * We do not have to save the timeout id, because dsf_chan_obj_ptr
```

© COPYRIGHT 1994 AMDAHL CORPORATION

```
        * will not be deallocated immediately after a close.
        */
}

/*
 * append_mp - Append message at the end of a list.
 */

void append_mp(mlp, mp)
        mblk_t **mlp;
        mblk_t *mp;
{
        register mblk_t **tmp_mpp;

        for (tmp_mpp = mlp; *tmp_mpp != NULL; tmp_mpp = &(*tmp_mpp)->b_next);
        *tmp_mpp = mp;
}

/*
 * free_mp_list - Frees a list of messages
 */

void free_mp_list(mp)
        register mblk_t *mp;
{
        register mblk_t *tmp_msg;

        while (mp != NULL) {
                tmp_msg = mp;
                mp = mp->b_next;
                freemsg(tmp_msg);
        }
}

STATIC void resend_set_prio(dsfep)
        struct dsf_element *dsfep;
{
        dsfep->dsf_hbid = 0;
        if (dsfep->dsf_rhipri_ml != NULL)
                qenable(RD(dsfep->dsf_wrq));
        send_set_prio(dsfep);
}

/*
 * send_set_prio - Send a R_SET_PRIO message to the remote.
```

© COPYRIGHT 1994 AMDAHL CORPORATION

```
*/

void send_set_prio(dsfep)
        struct dsf_element *dsfep;
{
        mblk_t *ssp_mp;

        if ((ssp_mp = allocb(sizeof(struct dsf_msg_header) +
                        sizeof(struct r_set_prio), BPRI_MED)) == NULL) {
                register int s = splstr();          /* Let us not lose the
                                                     * bufcall event */

                if (dsfep->dsf_hbid != 0)
                        /* reuse this bufcall id */
                        unbufcall(dsfep->dsf_hbid);
                dsfep->dsf_hbid = bufcall(sizeof(struct dsf_msg_header) +
                     sizeof(struct r_set_prio), BPRI_MED, resend_set_prio,
                     (long) dsfep);
                splx(s);

                /*
                 * If bufcall fails, the other side would not make this
                 * stream a high priority stream, but it would still work
                 */
                return;
        }
        ssp_mp->b_wptr += sizeof(struct dsf_msg_header) + sizeof(struct r_set_prio);
        ((struct dsf_msg *) ssp_mp->b_rptr)->body.admin_msg.type = R_SET_PRIO;
        ((struct dsf_msg *) ssp_mp->b_rptr)->header.dest_id =
             dsfep->dsf_rinfo.remote_queue_id;
        ((struct dsf_msg *) ssp_mp->b_rptr)->header.priority = dsfep->priority;
        write_admin_msg(dsfep, ssp_mp);
}

/*
 * write_admin_msg - Completes the information in the header, duplicates
 *                   the message to save in list of non-acked messages
 *                   and then calls the write_fct of the object.
 */

void write_admin_msg(dsfep, admin_msg)
        struct dsf_element *dsfep;
        mblk_t *admin_msg;
{
        register mblk_t *send_msg;
```

© COPYRIGHT 1994 AMDAHL CORPORATION

```
	register struct dsf_msg_header *dsf_msg_header = (struct dsf_msg_header *)
			admin_msg->b_rptr;
	register int s;
	struct xmit_info *xmit_infop;
	int priority = dsf_msg_header->priority;

	dsf_msg_header->type = DSF_ADMIN;
	dsf_msg_header->ack_req = 1;
	dsf_msg_header->fragm = 0;
	dsf_msg_header->src_id = (int) dsfep;
	admin_msg->b_pad2 = 0;
	dsf_msg_header->len = admin_msg->b_wptr - admin_msg->b_rptr;
	xmit_infop = &dsfep->dsf_rinfo.send_info.xmit_info[priority];
	s = splstr();
	dsf_msg_header->seq = xmit_infop->cur_seq++;
	if (xmit_infop->to_send_list != NULL) {
		append_mp(&dsfep->dsf_rinfo.send_info.xmit_info[priority].to_send_list,
			admin_msg);
		splx(s);
		return;
	}
	if ((send_msg = dupb(admin_msg)) == NULL) {
		xmit_infop->to_send_list = admin_msg;
		admin_msg->b_next = NULL;
		dsf_dup_bufcall(dsfep);
		splx(s);
		return;
	}
	send_msg->b_cont = admin_msg->b_cont;
	*xmit_infop->last_msg = admin_msg;
	xmit_infop->last_msg = &admin_msg->b_next;
	splx(s);
	if (m_write_msg(dsfep->dsf_chan_obj_ptr, send_msg, priority,
			admin_msg->b_wptr - admin_msg->b_rptr) < 0) {
		freeb(send_msg);
		transport_err(dsfep->dsf_chan_obj_ptr);
	}
}

/*
 * transport_err - This routine is called, when a fatal I/O error occured
 *		on a dsf channel. This routine sets the flag to DSF_DOWN,
 *		sets the send states in all dsf_elements using this dsf
 *		channel to BLOCKED, and stops all bufcall events.
 */
```

© COPYRIGHT 1994 AMDAHL CORPORATION

```
void transport_err(dsf_chan_obj_ptr)
        struct dsf_chan_obj *dsf_chan_obj_ptr;
{
        register struct dsf_element *dsfep;
        register int i;
        register int s = splstr();

        if (dsf_chan_obj_ptr->status_flag == DSF_UP) {
                dsf_chan_obj_ptr->status_flag = DSF_DOWN;
                for (dsfep = dsf_chan_obj_ptr->str_list; dsfep != NULL;
                     dsfep = dsfep->dsf_next_el) {
                        dsfep->dsf_rinfo.send_info.state = BLOCKED;
                        noenable(RD(dsfep->dsf_wrq));
                        if (dsfep->dsf_bid != 0) {
                                unbufcall(dsfep->dsf_bid);
                                dsfep->dsf_bid = 0;
                        }
                        if (dsfep->dsf_rinfo.rec_info.ack_nak_bid != 0) {
                                unbufcall(dsfep->dsf_rinfo.rec_info.ack_nak_bid);
                                dsfep->dsf_rinfo.rec_info.ack_nak_bid = 0;
                        }
                        /* Free all received fragments */
                        for (i = 0; i < DSF_HI_PRI; i++) {
                                free_frags(dsf_chan_obj_ptr,
                                     &dsfep->dsf_rinfo.rec_info.rcv_info[i]);
                        }
                }
                /* Send interrupt signal to all opening streams of this media */
                stop_opening_strs(dsf_chan_obj_ptr);
        }
        splx(s);
}

/*
 * build_frag_msg - Build a STREAMS message out of fragment buffers.
 *                  We assume that the struct msg_buffs are all contained in the
 *                  first fragment. This code would fail, if there are too many
 *                  message blocks. In case of a 4k buffer this means, we can
 *                  handle 254 message blocks in one message.
 */

STATIC int build_frag_msg(frag_list, last_msg, mpp)
        struct bio_buff *frag_list;
        struct dsf_msg *last_msg;
        mblk_t **mpp;
```

© COPYRIGHT 1994 AMDAHL CORPORATION

```
{
        register mblk_t *new_mp, **cur_mpp;
        register int processed_len = 0;
        register int adj_offs;    /* Adjust dataoffset with this number */
        register int pack_adj;   /* Adjustment when moving to next fragment */
        struct msg_buff *buff_ptr;
        unsigned char *rptr;
        register int beg_copy, bytes_to_copy, copy_len;
        char *cur_data;
        int max_msg_size;

        *mpp = NULL;
        cur_mpp = mpp;
        cur_data = frag_list->buffer;
        buff_ptr = &((struct dsf_msg *) cur_data)->body.data_msg;
        max_msg_size = ((struct dsf_msg_header *) cur_data)->len;
        adj_offs = sizeof(struct dsf_msg_header);
        pack_adj = max_msg_size - sizeof(struct dsf_msg_header);
        if (receive_stopped && (buff_ptr->type == M_DATA ||
                    buff_ptr->type == M_PROTO))
                /* if 1, no allocation of M_DATA and M_PROTO
                 * messages because of lack of resources
                 */
                return -1;

        for (;;) {
                if ((new_mp = allocb(buff_ptr->length + buff_ptr->offset, BPRI_MED)) ==
                      NULL) {
                    /* Try splitting up if data message */
                    if (buff_ptr->type == M_DATA && buff_ptr->length > 1023 &&
                          buff_ptr->offset <= 128 &&
                          (new_mp = alloc_split_buffs(buff_ptr->length,
                                buff_ptr->offset)) != NULL) {
                                register int sub_len;
                                *cur_mpp = new_mp;
                                beg_copy = adj_offs + buff_ptr->dataoffset;
                                        bytes_to_copy = buff_ptr->length;
                                NEW_SEG:
                                sub_len = new_mp->b_wptr - new_mp->b_rptr;
                                new_mp->b_band = buff_ptr->band;
                                        new_mp->b_flag = buff_ptr->flag;
                                        new_mp->b_datap->db_type = buff_ptr->type;
                                        rptr = new_mp->b_rptr;

                                        for (;;) {
```

© COPYRIGHT 1994 AMDAHL CORPORATION

```
                                        if (beg_copy + sub_len > max_msg_size)
                                                copy_len = max_msg_size - beg_copy;
                                        else
                                                copy_len = sub_len;
                                        bcopy(cur_data + beg_copy, rptr, copy_len);
                                        bytes_to_copy -= copy_len;
                                        if ((sub_len -= copy_len) <= 0) {
                                                if (new_mp->b_cont == NULL) {
                                                        cur_mpp = &new_mp->b_cont;
                                                        goto NEXT;
                                                }
                                                new_mp = new_mp->b_cont;
                                                beg_copy += copy_len;
                                                goto NEW_SEG;
                                        }
                                        rptr += copy_len;
                                        if (last_msg == NULL) {
                                                cmn_err(CE_WARN,    "Invalid    fragment
structure");

                                                goto MSG_ERROR;
                                        }
                                        if ((frag_list = frag_list->next_buff) == NULL) {
                                                cur_data = (char *) last_msg;
                                                last_msg = NULL;
                                        } else
                                                cur_data = frag_list->buffer;
                                        adj_offs -= pack_adj;
                                        beg_copy = sizeof(struct dsf_msg_header);
                                }
                        }
                goto MSG_ERROR;
        }
        *cur_mpp = new_mp;
        new_mp->b_rptr += buff_ptr->offset;
        new_mp->b_wptr = new_mp->b_rptr + buff_ptr->length;
        new_mp->b_band = buff_ptr->band;
        new_mp->b_flag = buff_ptr->flag;
        new_mp->b_datap->db_type = buff_ptr->type;
        cur_mpp = &new_mp->b_cont;
        beg_copy = adj_offs + buff_ptr->dataoffset;
        bytes_to_copy = buff_ptr->length;
        rptr = new_mp->b_rptr;
        for (;;) {
                if (beg_copy + bytes_to_copy > max_msg_size)
                        copy_len = max_msg_size - beg_copy;
```

© COPYRIGHT 1994 AMDAHL CORPORATION

```
                        else
                                copy_len = bytes_to_copy;
                        bcopy(cur_data + beg_copy, rptr, copy_len);
                        if ((bytes_to_copy -= copy_len) <= 0)
                                break;
                        rptr += copy_len;
                        if (last_msg == NULL) {
                                cmn_err(CE_WARN, "Invalid fragment structure");
                                goto MSG_ERROR;
                        }
                        if ((frag_list = frag_list->next_buff) == NULL) {
                                cur_data = (char *) last_msg;
                                last_msg = NULL;
                        } else
                                cur_data = frag_list->buffer;
                        adj_offs -= pack_adj;
                        beg_copy = sizeof(struct dsf_msg_header);
                }
        NEXT:
                processed_len += buff_ptr->length;
                if (buff_ptr->cont == 0) {
                        return processed_len;
                }
                buff_ptr++;    /* Goto next message block */
                adj_offs += sizeof(struct msg_buff);
        }
MSG_ERROR:
        /* Allocation failed, free already allocated part and return -1 */
        freemsg(*mpp);
        return -1;
}

/*
 * free_frags - free a list of fragments. Interrupts have to be disabled
 */

void free_frags(dsf_chan_obj_ptr, rcv_infop)
        register struct dsf_chan_obj *dsf_chan_obj_ptr;
        struct rcv_info *rcv_infop;
{
        register struct bio_buff *fl = (struct bio_buff *) rcv_infop->rcv_frags;
        register struct bio_buff *tfl;

        while (fl != NULL) {
                tfl = fl;
```

© COPYRIGHT 1994 AMDAHL CORPORATION

```
                fl = fl->next_buff;
                free_mem_block(tfl);
        }
        rcv_infop->rcv_frags = NULL;
}

/*
 * rcv_fragment - Add a new fragment to the list of received fragments. If it
 *                was the last one create a message and return 1, 0 otherwise.
 *                Any error results in freeing all already received
 *                fragments and sending a NAK to the remote side.
 */
int rcv_fragment(dsfep, buff_ptr, cur_msg_ptr, mpp)
        struct dsf_element *dsfep;
        struct bio_buff *buff_ptr;
        struct dsf_msg *cur_msg_ptr;
        mblk_t **mpp;
{
        register int priority;
        register struct rcv_info *rcv_infop;
        register struct bio_buff *last_frag;
        register int last_frag_no;
        register struct dsf_chan_obj *dsf_chan_obj_ptr;
        register mblk_t *fp;
        register int msg_len;

        priority = cur_msg_ptr->header.priority;
        rcv_infop = &dsfep->dsf_rinfo.rec_info.rcv_info[priority];
        rcv_infop->rec_seq--;
        dsf_chan_obj_ptr = dsfep->dsf_chan_obj_ptr;
        if ((last_frag = (struct bio_buff *) rcv_infop->rcv_frags) == NULL) {
                /* No fragment on record */
                if ((cur_msg_ptr->header.fragm & BEGIN_FRAGMENT) == 0)
                        /* Invalid fragment */
                        goto SEND_NAK;
                rcv_infop->rcv_frags = (mblk_t *) buff_ptr;
                goto GOOD_EXIT;
        } else {
                register u_char next_fno;

                while (last_frag->next_buff != NULL)
                        last_frag = last_frag->next_buff;
                next_fno = (((struct dsf_msg_header *) last_frag->buffer)->fragm & 0x7f) - 1;
                if (next_fno > cur_msg_ptr->header.fragm) {
                        /* Hole in received fragments - Unexpected */
```

© COPYRIGHT 1994 AMDAHL CORPORATION

```
                        cmn_err(CE_WARN, "Fragment number out of sequence");
                        free_frags(dsf_chan_obj_ptr, rcv_infop);
                        goto SEND_NAK;
                } else if (next_fno < cur_msg_ptr->header.fragm) {
                        /* duplicate sent */
                        return -1;
                }
                /* Expected fragment received */
                if (cur_msg_ptr->header.fragm != 1) {
                        last_frag->next_buff = buff_ptr;
                        goto GOOD_EXIT;
                }
                /* All fragments received */
                rcv_infop->rec_seq++;        /* Accept this sequence number */
                if ((msg_len = build_frag_msg((struct bio_buff *) rcv_infop->rcv_frags,
                                cur_msg_ptr, mpp)) < 0) {

                        /*
                         * Allocation error - free all fragments except for
                         * last
                         */
                        free_frags(dsf_chan_obj_ptr, rcv_infop);
                        dsf_alloc_error(dsfep, cur_msg_ptr);
                        return -1;
                }
                /* Successful */
                free_frags(dsf_chan_obj_ptr, rcv_infop);
                return msg_len;
        }
SEND_NAK:
        buff_ptr->next_buff = NULL;
        send_nak(dsfep, priority);
        return -1;
GOOD_EXIT:
        buff_ptr->next_buff = NULL;
        return 0;
}
```

80

© COPYRIGHT 1994 AMDAHL CORPORATION

```
#ident "@(#)/usr/src/amdahl/cmd/4655/vcs4/dsf/daemon/chan/chan_adm.c     11.8 11/20/92 10:31:32
- (c) Copyright 1988, 1993 Amdahl Corporation"
/* */

#include <stdio.h>
#include <sys/types.h>
#include <sys/fcntl.h>
#include <poll.h>
#include <errno.h>
#include <string.h>
#include <signal.h>
#include <stropts.h>
#include <sys/ioctl.h>
#include <sys/sysctl.h>
#include <sys/ios_sysctl.h>
#include <sys/sctmif.h>
#include <dsf/dsf.h>
#include <dsf/mirror.h>

#define DSFDEV "/dev/dsf"
#define CTMCHANNEL "/dev/sctm/clone"
#define MRRAD_IBM "OEMI "
#define CHN_CON_MSG      "OEMI Channel %x is not functioning.\n"
#define POLLTRY          2
#define NO_FLDS     4
#define LINESIZE 400
#define CTLSIZE 128
#define DATSIZE       1024
#define TTIME 240
#define DEBUG1(s,a1) if (debug) printf(s,a1)
#define ERR0(s) { logtime(logf); fprintf(logf,s); fflush(logf); }
#define ERR1(s,a1) { logtime(logf); fprintf(logf,s,a1);fflush(logf); }
#define ERR2(s,a1,a2) { logtime(logf); fprintf(logf,s,a1,a2); fflush(logf);}
#define CHANLOGFILE "/etc/opt/dsf/chanadmlog"
int debug = 0;
FILE *logf;
extern int errno;
extern void logtime();
static char line[LINESIZE];
static char *cmd_name;
int fd = -1;     /* Required  Global for terminating the program via signal */

/* Channel related stuff */
static PPA_ATTACH_REQ_T ppa_req;
```

© COPYRIGHT 1994 AMDAHL CORPORATION

```
int link_channel();
static int monitor(), send_attach(), check_attach_resp(), unlink_media();
static void loadmediavalue(), lbzero();

main(argc, argv)
        int argc;
        char *argv[];
{
        void loadmediavalue();
        usr_media_obj_t lowercomm;
        static int mux_id = -1;
        int mntr_result = 0;
        extern int send_media_type();
        extern void terminate();
        int trytime = TTIME;
        static char logfile[64];

        (void)strcpy(logfile,CHANLOGFILE);
        (void)strcat(logfile,argv[1]);

        if ((logf = fopen(logfile, "a")) == NULL) {
                (void) fprintf(stderr, "%s: Cannot open \"%s\" as log file\n",
                        argv[0], logfile);
                exit(0);
        }

        /* do a setpgrp() to separate  from parent process */
        setpgrp();
        cmd_name = argv[0];
        loadmediavalue((argc - 1), argv, &lowercomm);
        (void) signal(SIGTERM, terminate);
        /* send mrroute to admin driver in kernel */

        do {
                if (mntr_result == DSF_MED_DOWN || mntr_result == DSF_MED_HANGUP) {
                        if (unlink_media(fd, mux_id))
                                goto linkchan;
                }
                if (fd != -1) {
                        close(fd);
                        sleep(MRR_SLEEPTIME);
                }
                while ((fd = open(DSFDEV, O_RDWR)) < 0) {
                        ERR1("Opened Failed on %s ... Trying again\n",DSFDEV);
                        sleep(MRR_SLEEPTIME);
```

© COPYRIGHT 1994 AMDAHL CORPORATION

```
                    if (--trytime == 0) {
                            ERR1("Exiting could not open %s\n",DSFDEV);
                            fclose(logf);
                            exit(1);
                    }
            }
linkchan:
            trytime = TTIME;
            while ((mux_id = link_channel(fd)) < 0) {
                ERR1(" OEMI channel %x did not link under DSF driver.\n",
                    ppa_req.raddr);
                    ERR0("Trying again.\n");
                    sleep(MRR_SLEEPTIME);
                    if (--trytime == 0) {
                        ERR1("Exiting could not connect OEMI channel %x \n",
                        ppa_req.raddr);
                            fclose(logf);
                            exit(1);
                    }
            }
            trytime = TTIME;
            while (send_media_type(fd, &lowercomm) < 0) {
                    sleep(MRR_SLEEPTIME);
                    if (--trytime == 0) {
                            ERR0("Exiting could not send media information\n");
                            fclose(logf);
                            exit(1);
                    }
            }
    } while ((mntr_result = monitor(fd, mux_id)));

    fclose(logf);

}

int link_channel(dsf)
    int dsf;
{

        int chn;
        int check_attach_resp();
        int mux_id;

        if ((chn = open(CTMCHANNEL, O_RDWR)) < 0) {
                ERR1("%s Channel Open failed\n",CTMCHANNEL);
```

© COPYRIGHT 1994 AMDAHL CORPORATION

```
                return (-1);
        }
        if (send_attach(chn) < 0) {
                ERR1("Attach failed on %x.\n",ppa_req.raddr);
                close(chn);
                return (-1);
        }
        /* Wait for ever for response */
        if (waitfor_ack(chn, check_attach_resp, -1) < 0) {
                ERR1("Channel %x did Not attach\n",ppa_req.raddr);
                close(chn);
                return (-1);
        }
        if ((mux_id = ioctl(dsf, I_LINK, chn)) == -1) {
                ERR1("ioctl, I_LINK failed  for %x\n",ppa_req.raddr);
                close(chn);
                return (-1);
        }
        close(chn);
        ERR1("Channel %x linked successfully under DSF driver\n",ppa_req.raddr);
        return (mux_id);
}


/* Poll for a M_HANGUP or an M_PROTO message from the dsf driver.
 * If it is an M_HANGUP message then try to open and link sctm  again .
 * If the message is an MPC_PROTO then a graceful exit is called for.
 * This is done by just exiting.
 */

static int monitor(dsf, mux_id)
        int dsf;
        int mux_id;
{

        struct pollfd pollfds[1];
        int result;
        extern void sndmsg_console();

        pollfds[0].fd = dsf;
        pollfds[0].events = (POLLHUP | POLLIN);
        pollfds[0].revents = 0;


        while ((result = poll(pollfds, 1, -1)) < 0) {
```

© COPYRIGHT 1994 AMDAHL CORPORATION

```
			if (errno == EAGAIN)
				continue;
			else {
				ERR2("Poll failed on Channel %x errno:%d\n",
				   ppa_req.raddr, errno);
				return (0);	/* Maybe continue */
			}
		}


		/* check returned events on the admin */

		/* quit if we receive POLLERR or POLLNVAL messages */
		if (pollfds[0].revents & (POLLERR | POLLNVAL)) {
			ERR1("POLLERR or POLLNVAL message received on admin \
			pollval = 0x%x\n", pollfds[result].revents);
			ERR1("Exiting monitoring %x\n", ppa_req.raddr);
			return (0);	/* Maybe continue */
		}
		if (pollfds[0].revents & POLLHUP) {
			ERR1("Hangup received on admin channel=%x\n",ppa_req.raddr);

			/*
			 * Issue an I_UNLINK and try again. Send message on console
			 * signifying to admin that the media underneath is down
			 */
			sndmsg_console(CHN_CON_MSG, ppa_req.raddr);
			return (unlink_media(dsf, mux_id));
		}
		if (pollfds[0].revents & POLLIN)
			return (chk_admin_msgs(dsf, CHN_CON_MSG, ppa_req.raddr, logf));
		/* End of monitor */
		return (0);
}


static int send_attach(fd)
		int fd;
{
		struct strbuf ctlbuf;


		ppa_req.type = PPA_ATTACH_REQ;
		ctlbuf.len = sizeof(PPA_ATTACH_REQ_T);
```

© COPYRIGHT 1994 AMDAHL CORPORATION

```
	ctlbuf.buf = (char *) &ppa_req;
	if (putmsg(fd, &ctlbuf, (char *) 0, 0) < 0) {
		ERR1("Error in sending attach request to Channel %x\n", ppa_req.ppa);
		return (-1);
	}
	return (0);
}


/* loadmediavalue: First stores the default value and then puts in
 *                 user options.
 */

static void loadmediavalue(argn, argv, lowercomm)
	int argn;
	char *argv[];
	register usr_media_obj_t *lowercomm;
{


	(void) strcpy(lowercomm->id, MRRAD_IBM);
	(void) strcat(lowercomm->id, argv[1]);
	(void) strcpy(lowercomm->media_value, lowercomm->id);
	DEBUG1("ID value =%s\n", lowercomm->id);

	lbzero(&ppa_req, sizeof(PPA_ATTACH_REQ_T));
	/* default values initialized in PPA_ATTACH_REQ_T */

	if (argn--) {
		int raddr;	/* since raddr is short in sctm */

		sscanf(argv[1], "%x", &raddr);
		ppa_req.raddr = raddr;
		DEBUG1("raddr=%x\n", ppa_req.raddr);
	} else
		return;
	/* end of routing information */
	if (argn--) {
		ppa_req.ppa = atoi(argv[2]);
		DEBUG1("ppa=%d\n", ppa_req.ppa);
	} else
		return;
	if (argn--) {
		lowercomm->max_msg_size = ppa_req.bsize = atoi(argv[3]);
		DEBUG1("bsize=%d\n", ppa_req.bsize);
```

© COPYRIGHT 1994 AMDAHL CORPORATION

```
	} else
		return;
	if (argn--) {
		ppa_req.num_rbufs = atoi(argv[4]);
		DEBUG1("no_of_rd_buf=%d\n", ppa_req.num_rbufs);
	} else
		return;
	if (argn-- && argv[5][0] == 'c') {
		ppa_req.options = (SCTM_CC_WRITE | SCTM_MRG_WRITE);
		ppa_req.hw_mark = (2 * ppa_req.bsize);
		DEBUG1("cmd_chan_on=%x\n", ppa_req.options);
	}
	if (argn--) {
		ppa_req.min_ds = atoi(argv[6]);
		DEBUG1("min_ds=%d\n", ppa_req.min_ds);
	}

}



static int check_attach_resp(fd)
	int fd;
{
	struct strbuf ctlbuf;
	PPA_ATTACH_RES_T chn_resp;
	int flag = 0;

	ctlbuf.maxlen = sizeof(PPA_ATTACH_RES_T);
	ctlbuf.len = 0;
	ctlbuf.buf = (char *) &chn_resp;

	if (getmsg(fd, &ctlbuf, (char *) 0, &flag) >= 0) {
		if (chn_resp.type == PPA_ATTACH_RES &&
		     chn_resp.ppa == ppa_req.ppa &&
		     chn_resp.status == 0)
			return (0);
		else
		   ERR2("PPA_ATTACH_RESP_FAILURE= %d on channel %x\n",
		   chn_resp.status,ppa_req.raddr);
	}
	return (-1);
```

© COPYRIGHT 1994 AMDAHL CORPORATION

```
}

static void lbzero(s, size)
        register char *s;
        register int size;
{
        while (size--)
                *s++ = 0;

}

static int unlink_media(fd, mux_id)
        register int fd;
        register int mux_id;
{
        int unlink_ret;

        ERR1("Unlinking media driver mux id=%d\n",mux_id);
        if (mux_id == -1 || fd == -1)
                return (0);
        else {
                if ((unlink_ret = ioctl(fd, I_UNLINK, mux_id)) == -1) {
                        ERR1("Could not unlink media driver for OEMI %x \n",
                             ppa_req.raddr);
                        ERR1("Unlink Error =%d\n",unlink_ret);
                        if (unlink_ret == ETIME || unlink_ret == ENOSR)
                                return (0);
                }
        }
        sleep(MRR_SLEEPTIME);        /* Wait some time before trying again */
        ERR0("Unlink successfull on media driver \n");
        return (1);

}
```

© COPYRIGHT 1994 AMDAHL CORPORATION

```
#ident "@(#)/usr/src/amdahl/cmd/4655/vcs4/dsf/daemon/dsf_daemon/dsf_daemon.c     11.5     4/14/93
16:11:26"
/* */

#include <stdio.h>
#include <sys/fcntl.h>
#include <sys/stropts.h>
#include <poll.h>
#include <errno.h>
#include <string.h>
#include <signal.h>
#include <sys/ioctl.h>
#include <sys/types.h>
#include <sys/stat.h>

#ifndef _UTS
#include <sys/sysmacros.h>
#endif

#include <dsf/dsf.h>
#include <dsf/mirror.h>

#define         LOCK_FLAGS          O_EXCL | O_CREAT | O_RDWR
#define         MODE          0400
#define DSF_DAEMON_LOCK "/tmp/dsfdaemon_lock"
#define MRROUTE "/etc/opt/dsf/mr_route"
#define MRMEDIA "/etc/opt/dsf/mr_media"
#define NO_FLDS     4
#define MAXARGS 8
#define LINESIZE 400
#define CSIZE 128

#ifndef TRUE
#define TRUE 1
#endif

#ifndef FALSE
#define FALSE 0
#endif

#define ACTIVE 'a'
#define HEX 1
#define DEC 2
#define MAXENTRY 32        /* Maximum media admin process to spawn */
#define DEBUG0(s) if (debug) printf(s)
```

© COPYRIGHT 1994 AMDAHL CORPORATION

```
#define DEBUG1(s,a1) if (debug) printf(s,a1)
#define DEBUG2(s,a1,a2) if (debug) printf(s,a1,a2)
#define DEBUG3(s,a1,a2,a3) if (debug) printf(s,a1,a2,a3)
#define ERR0(s)  fprintf(stderr,s)
#define ERR1(s,a1)  fprintf(stderr,s,a1)
#define ERR2(s,a1,a2)  fprintf(stderr,s,a1,a2)
#define ERR3(s,a1,a2,a3)  fprintf(stderr,s,a1,a2,a3)

/* All the  pid's of the childs of dsf_daemon are stored in this structure */
struct demns {

#if _UTS
        pid_t pid;
#else
        int pid;
#endif
        char media_value[CSIZE];        /* Media value  */
};

static struct demns daems[MAXENTRY];        /* Could be done with kmalloc & LL */
int fd;  /* admin file desc */
int debug = 0;
extern int errno;
char line[LINESIZE];
char program[LINESIZE];
char *cmd_name;

int dsf_lock(), dsf_unlock();
static void shutdown(), frk_media_again(), load_route_again(), removeentry();
static void snd_route(), forkcomm(), spawnoff(), lbzero();
static int sendioctl(), get_major_no();
static char *getfield();

/* shutdown sends a SIGTERM signal to all the media administrative to
 * terminate. This will cause a graceful termination with the remote
 * side.
 */
static void shutdown(sig)
        int sig;
{
        register int i;

        DEBUG1("Got a signal=%d\n", sig);
        signal(SIGCLD, SIG_IGN); /* Disable signal handler */
        for (i = 0; i < MAXENTRY; i++)
```

© COPYRIGHT 1994 AMDAHL CORPORATION

```
            if (daems[i].pid) {
                    kill(daems[i].pid, SIGTERM);
            }
        dsf_unlock(DSF_DAEMON_LOCK);
        /*sleep(2);       *//* Wait for all children */
        exit(0);
}

/* frk_media_again: Used to restart a media administrative. Looks at the
 * media table to find out the active admin programs.
 */
static void frk_media_again(signal)
        int signal;
{

        register FILE *mediafp;
        void forkcomm();

        DEBUG1("Got a signal=%d\n", signal);
        if ((mediafp = fopen(MRMEDIA, "r")) == NULL)
                ERR2("%s: Cannot open media file <%s>\n",
                        cmd_name, MRMEDIA);
        forkcomm(mediafp);
        (void) fclose(mediafp);
}

/* load_route_again: Will load the route table(mr_route) into the DSF
 * driver. This is through SIGUSR1.
 */
static void load_route_again(signal)
        int signal;
{
        register FILE *routefp;

        DEBUG1("Got a signal=%d\n", signal);
        if ((routefp = fopen(MRROUTE, "r"))) {
                snd_route(fd, routefp);
                (void) fclose(routefp);
                fprintf(stdout, "Loading of routing table complete.\n");
                return;
        }
        ERR2("%s: cannot open routing file <%s>\n", cmd_name, MRROUTE);
}

/* removeentry: Waits for the child media administrative program to die.
```

© COPYRIGHT 1994 AMDAHL CORPORATION

```
 * It catches SIGCHLD and removes its entry from the structure daems.
 */
static void removeentry(signal)
	int signal;
{

#if _UTS
	pid_t pid;

#else
	int pid;

#endif
	int stat_loc, i;

	pid = wait(&stat_loc);
	DEBUG1("Got a signal=%d\n", signal);
	if (pid == -1) {
		ERR1("Got a SIGCHLD but pid == -1. errno =%d\n", errno);
		return;
	}
	for (i = 0; i < MAXENTRY; i++) {
		if (daems[i].pid == pid) {
			daems[i].pid = 0;
			return;
		}
	}

}

/* Main program
*/

main(argc, argv)
	int argc;
	char *argv[];
{
	register FILE *routefp, *mediafp;
	char orgline[132];
	int error = 0;
	int opt;
	char *getnextline(), *getfield();
	int atox();
	ushort hexval();
	void forkcomm(), snd_route();
```

© COPYRIGHT 1994 AMDAHL CORPORATION

```
	ushort loadroute = 0, loadmedia = 0, contin = 0;


	cmd_name = argv[0];
	while ((opt = getopt(argc, argv, "vmrc")) != EOF) {
		switch (opt) {
		case 'v':
			debug++;
			break;
		case 'm':
			loadmedia = 1;
			break;
		case 'r':
			loadroute = 1;
			break;
		case 'c':
			contin = 1;
			break;
		default:
			error = 1;
		}
	}

	if (error) {
		ERR2("%s: usage: %s [-c] [-m] [-r] [-v]\n", cmd_name, cmd_name);
		exit(1);
	}
	/* check if already running */

	if (dsf_lock(DSF_DAEMON_LOCK, 2) < 0) {
		ERR1("\n%s: already running\n", argv[0]);
		exit(1);
	}

	/*
	 * fork() so we don't have to worry about putting a '&' after
	 * dsf_daemon to put it into the background
	 */
/*
 *	if (fork())
 *		exit(0);
 */
	/* child process continues while parent dies */
```

© COPYRIGHT 1994 AMDAHL CORPORATION

```
/* do a setpgrp() to separate dsf_daemon from parent shell */
setpgrp();



if (loadroute) {
        /* open mirror routing file */
        if ((routefp = fopen(MRROUTE, "r")) == NULL) {
                ERR2("%s: cannot open DSF routing table <%s>\n", cmd_name, MRROUTE);
                loadroute = 0;
        }
}
if (loadmedia) {
        /* open communication routing file */
        if ((mediafp = fopen(MRMEDIA, "r")) == NULL) {
                ERR2("%s: cannot open DSF media table <%s>\n",
                     cmd_name, MRMEDIA);
                loadmedia = 0;
        }
}
if (!loadroute && !loadmedia) {
        dsf_unlock(DSF_DAEMON_LOCK);
        exit(1);
}
/* send mrroute to admin driver in kernel */
if ((fd = open(DSFDEV, O_RDWR)) < 0) {
        perror("open");
        dsf_unlock(DSF_DAEMON_LOCK);
        exit(1);
}
(void) signal(SIGHUP, shutdown);
(void) signal(SIGINT, shutdown);
(void) signal(SIGQUIT, shutdown);
(void) signal(SIGTERM, shutdown);
(void) signal(SIGCLD, removeentry);

if (loadroute) {
        snd_route(fd, routefp);
        (void) fclose(routefp);
}
if (loadmedia) {
        forkcomm(mediafp);
        (void) fclose(mediafp);
}
```

© COPYRIGHT 1994 AMDAHL CORPORATION

```
        (void) signal(SIGUSR1, load_route_again);
        (void) signal(SIGUSR2, frk_media_again);
        while (contin) {
                pause();        /* Wait for a SIGNAL */
                (void) signal(SIGUSR1, load_route_again);       /* Maybe not needed */
                (void) signal(SIGUSR2, frk_media_again);        /* Maybe not needed */
                (void) signal(SIGCLD, removeentry);  /* Maybe not needed */
        }


}


/*getnextline: Will get the next line from the mr_route or mr_media table
 */

char *getnextline(fd, linep)
        FILE *fd;
        char *linep;
{
        char *cp;

        if (fgets(linep, LINESIZE, fd) == NULL)
                return ((char *) 0);
        cp = strchr(linep, '\n');
        if (cp)
                *cp = '\0';
        while (*linep == ' ' || *linep == '\t') {
                linep++;
        }
        return (linep);
}

/* getfield: Will get a field between : : fro a given line.
 */
static char *getfield(ptr, fs)
        char *ptr;
        char *fs;
{
        char *c, *lastc;

        while (*ptr == ' ' || *ptr == '\t') {
                ptr++;
        }
        c = ptr;
```

© COPYRIGHT 1994 AMDAHL CORPORATION

```
        if ((lastc = strchr(ptr, *fs)) == (char *) NULL)
                return ((char *) 0);
        *lastc = '\0';
        ptr = ++lastc;
        return (c);
}

/* snd_route: Will send the routing table to the DSF driver. It will first
 * open the dsfdrvier open the mr_route table and every entry is send via an
 * M_IOCTL message.
 */
static void snd_route(fd, routefp)
        int fd;
        register FILE *routefp;
{
        mrr_route_t mrroute;
        char *lineptr, *c, orgline[132];
        int error = 0, fields;
        char *fld, device, *dev_name[64];
        char *getnextline(), *getfield();
        ushort hexval();
        void lbzero();

        ushort okflag, prtline;

        while ((lineptr = (char *) getnextline(routefp, line)) != (char *) NULL) {
                if (*lineptr == '#' || *lineptr == '\0')
                        continue;
                okflag = 1;
                prtline = 1;
                lbzero((char *) &mrroute, sizeof(mrr_route_t));
                DEBUG0("------------------------------------------------------------------------------\n\n");
                DEBUG1("line=%s\n", lineptr);
                strcpy(orgline, lineptr);
                /* check if the line has correct number of fields */
                fields = 0;
                for (c = lineptr; *c; c++) {
                        if (*c == ':') {
                                fields++;
                        }
                }
                DEBUG1("number of fields = %d\n", fields);
                if (fields != NO_FLDS) {
                        ERR2("%s: incorrect fileds in line:\n [%s]\n", cmd_name, orgline);
                        continue;
```

© COPYRIGHT 1994 AMDAHL CORPORATION

```
		}

		/*
		 * Get the major Number. This field tells if it is a clone
		 * device
		 */
		if (fld = (char *) getfield(lineptr, ":")) {
			lineptr = fld + (int) strlen(fld) + 1;
			device = *fld;
		}
		if (fld = (char *) getfield(lineptr, ":")) {
			lineptr = fld + (int) strlen(fld) + 1;
			mrroute.mrid = get_major_no(fld, device);
			DEBUG1("major No=%d\n", mrroute.mrid);
		}
		if (fld = (char *) getfield(lineptr, ":")) {
			strncpy(mrroute.media_value, fld, (int) strlen(fld) + 1);
			DEBUG1("media_value=%s\n", mrroute.media_value);
			lineptr = fld + (int) strlen(fld) + 1;
		}
		if (fld = (char *) getfield(lineptr, ":")) {
			strncpy(mrroute.dev_name, fld, (int) strlen(fld) + 1);
			DEBUG1("dev_name=%s\n", mrroute.dev_name);
			lineptr = fld + (int) strlen(fld) + 1;
		}
		if (okflag)
			if ((sendioctl(fd, MR_ROUTE,
					(char *) &mrroute, sizeof(mrr_route_t)) < 0)) {
				DEBUG0("Error in loading routing record\n");
			}
	}
}

/* forkcomm: Will spawn of each media administrative programs which are marked
 * active in the mr_route table.
 */
static void forkcomm(mediafp)
	register FILE *mediafp;
{
	char *lineptr;
	static char orgline[LINESIZE];
	char opt;
	char *fld, *nxtfld;
	char *getnextline(), *getfield();
	int atox();
```

© COPYRIGHT 1994 AMDAHL CORPORATION

```
        ushort hexval();
        void spawnoff();

        while ((lineptr = (char *) getnextline(mediafp, line)) != (char *) NULL) {
                if (*lineptr == '#' || *lineptr == '\0')
                        continue;
                DEBUG0("-------------------------------------\n\n");
                DEBUG1("line=%s\n", lineptr);
                if (fld = (char *) getfield(lineptr, ":")) {
                        lineptr = fld + (int) strlen(fld) + 1;
                        if ((opt = *fld) != ACTIVE)
                                continue;

                }
                DEBUG1("opt=%c\n", opt);
                strcpy(orgline, lineptr);
                lineptr = orgline;
                if (fld = (char *) getfield(orgline, ":")) {
                        nxtfld = fld + (int) strlen(fld) + 1;
                        spawnoff(fld, nxtfld);
                        sleep(5);
                }
        }
}

/* sendioctl: Will send an M_IOCTL message to the dsf driver.
 */

static int sendioctl(s, cmd, arg, size)
        int s;
        int cmd;
        char *arg;
        int size;
{
        struct strioctl ioc;

        ioc.ic_cmd = cmd;
        ioc.ic_timout = -1;
        ioc.ic_len = size;
        DEBUG1("size=%d\n", ioc.ic_len);
        ioc.ic_dp = arg;
        return (ioctl(s, I_STR, (char *) &ioc));
}
```

© COPYRIGHT 1994 AMDAHL CORPORATION

```
/* dsf_lock: Will create a lock file. If it exists then it returns an error.
 * If not then it create an entry in the /tmp directory.
 */


int dsf_lock(file, retries)
        char *file;
        int retries;
{
        register int i, fd;
        int pid = getpid();
        char pid_string[100];

        for (i = 0; i < retries; i++) {
                if ((fd = open(file, LOCK_FLAGS, MODE)) < 0) {
                        if (errno != EEXIST) {
                                ERR2("\n%s: error in open of lock file %s\n", cmd_name, file);
                                return -1;
                        }

                        /*
                         * errno =EEXIST, so someone else has the lock, sleep
                         * a while before trying again
                         */

                        sleep(5);
                } else {
                        /* open successful, so we got the lock */
                        break;
                }
        }       /* for */

        if (i == retries) {
                ERR3("\n%s: cannot open lock file %s after %d retries\n",
                     cmd_name, file, retries);
                return -1;
        }
        sprintf(pid_string, "%d\n", pid);
        if (write(fd, pid_string, strlen(pid_string)) < 0) {
                ERR3("\n%s: cannot write pid =%d to lock file %s\n",
                     cmd_name, pid, file);
                close(fd);
                return -1;
        }
        close(fd);
```

© COPYRIGHT 1994 AMDAHL CORPORATION

```
	return 0;

}/* dsf_lock() */

/* dsf_unlock: Will remove the lock file from the tmp directory signifying
 * that the dsf_daemon can now be started again.
 */
int dsf_unlock(file)
	char *file;
{
	register int fd, i, pid;
	char pid_string[100];

	if ((fd = open(file, O_RDONLY)) < 0) {
		printf("\n%s: cannot open lock file %s\n",
			cmd_name, file);
		perror("open");
		return -1;
	}
	if (read(fd, pid_string, 100) < 0) {
		printf("\n%s: cannot read pid from lock file %s\n",
			cmd_name, file);
		close(fd);
		return -1;
	}
	i = 0;
	while (pid_string[i] && (pid_string[i] != '\n'))
		i++;
	pid_string[i] = 0;
	pid = atoi(pid_string);
	if (pid != getpid()) {
		printf("\n%s: pid =%d does not own lock file %s (lockid =%d)\n",
			cmd_name, getpid(), file, pid);
		close(fd);
		return -1;
	}
	close(fd);

	if (unlink(file) < 0) {
		printf("\n%s: unlink failed for lock file %s\n",
			cmd_name, file);
		perror("unlink");
		return -1;
	}
	return 0;
```

© COPYRIGHT 1994 AMDAHL CORPORATION

```
}

/* spawnoff: Will spawn off the media admin program. It will check if one
 * is already started off, if it has then it will return without
 * forking it off. All the parameters from the mr_media table are passed
 * as a arguments to the admin programs.
 */
static void spawnoff(path, option)
	char *path, *option;
{
	char *tmptr = path;
	char *tmptr0, *c;
	char *prgptr = program;
	int fields, amount, i;
	static char *spargv[MAXARGS];
	int lineno = 0;
	char cmp_buff[CSIZE];

	tmptr0 = option;
	spargv[0] = path;
	fields = amount = 0;
	for (i = 1, c = tmptr0; *c && i < MAXARGS; amount++, c++) {
		if (*c == ':') {
			fields++;
			*c = '\0';
			spargv[i] = tmptr0;
			i++;
			tmptr0 = c + 1;
		}
	}
	/* copy the last argument */
	spargv[i] = tmptr0;
	spargv[i + 1] = (char *) 0;

	/* Creates address stored or will be stored in media_value */
	strcpy(cmp_buff, spargv[0]);
	strcat(cmp_buff, " ");
	strcat(cmp_buff, spargv[1]);

	/*
	 * Since entries can be fragmented in the daems we have to compare
	 * till the end
	 */
	for (; lineno < MAXENTRY; lineno++) {
		if (daems[lineno].pid) {
```

© COPYRIGHT 1994 AMDAHL CORPORATION

```
                        if (strcmp(daems[lineno].media_value, cmp_buff) == 0) {
                                fprintf(stderr, "Media admin already spawned=%s\n",
                                     cmp_buff);
                                return;
                        }
                }
        }
        for (lineno = 0; lineno < MAXENTRY && daems[lineno].pid; lineno++);

        if (lineno < MAXENTRY) {
                if ((daems[lineno].pid) = fork()) {      /* parent */
                        strcpy(daems[lineno].media_value, cmp_buff);
                        return; /* parent */
                } else {         /* child */
                        /* Close DSFDEV open file descriptor */
                        close(fd);
                        if (execv(path, spargv) == -1)
                                perror("execv failed"); /* child */
                }
        } else {
                /* We have run out of entries Might as well exec */
                if (fork())
                        return; /* parent returning */
                if (execv(path, spargv) == -1)
                        perror("execv failed"); /* child */
        }

}

static void lbzero(s, size)
        register char *s;
        register int size;
{
        while (size--)
                *s++ = 0;

}

#if _UTS
#define major(x)        (x >> 18)
#define minor(x)        (x & 0x3ffff)
#endif

static int get_major_no(dev, flag)
        register *dev;
```

© COPYRIGHT 1994 AMDAHL CORPORATION

```
        register char flag;
{
        struct stat buf;

        if (stat(dev, &buf) == -1) {
                return (0);
        }
        if (buf.st_mode & 0020000) {   /* char device */
                if (flag == 'c' || flag == 'C')
                        return (minor(buf.st_rdev));
                else
                        return (major(buf.st_rdev));
        }
        return (0);

}
```

© COPYRIGHT 1994 AMDAHL CORPORATION

```
#ident "@(#)/usr/src/amdahl/cmd/4655/vcs4/dsf/admin/dsf_format/dsf_format.c     11.7   2/26/93
16:08:56"
/* */
#include <stdio.h>
#include <sys/types.h>
#include <sys/fcntl.h>
#include <poll.h>
#include <errno.h>
#include <string.h>
#include <signal.h>
#include <sys/ioctl.h>
#include <sys/stropts.h>
#include <dsf/dsf.h>
#include <dsf/mirror.h>

#define DSFTRACE "/etc/opt/dsf/dsftrace"
#define ERR0(s) fprintf(stderr,s)
#define ERR1(s,a1)  fprintf(stderr,s,a1)
#define ERR2(s,a1,a2)  fprintf(stderr,s,a1,a2)
#define MAXDSFMSG         8192 *2
static char *dsfadminmsg[] = {"Unknown",
   "R_OPEN_REQ",
   "R_OPEN_RESP",
   "R_CLOSE_REQ",
   "R_CLOSE_RESP",
   "R_PUSH_REQ",
   "R_PUSH_RESP",
   "R_POP_REQ",
   "R_POP_RESP",
   "R_LINK_REQ",
   "R_LINK_RESP",
   "R_UNLINK_REQ",
   "R_UNLINK_RESP",
   "R_ACK_MSG",
   "R_NAK_MSG",
   "R_NO_PARTNER",
   "DSF_CHAN_CLOSE_REQ",
   "DSF_CHAN_CLOSE_RESP",
   "DSF_RECONN_REQ",
   "DSF_RECONN_RESP",
   "R_INTERRUPT",
   "DSF_KEEPALIVE_REQ",
   "DSF_KEEPALIVE_RESP",
   "R_SET_PRIO"
};
```

© COPYRIGHT 1994 AMDAHL CORPORATION

```
static char *streamsflag[] = {"NORMAL",
   "MODOPEN",
   "CLONEOPEN"
};

int pr_cred = 0;

static void dsf_trace_info();
static void dsf_trace_admin(), dsf_frm_dsf_hdr(), shutdown();
static void dsf_r_open_req(), dsf_r_open_resp(), dsf_r_close_req();
static void dsf_r_cmd_resp(), dsf_r_push_req(), dsf_r_link_req();
static void dsf_r_link_resp(), dsf_r_unlink_req(), dsf_r_unlink_resp();
static void dsf_r_ack_msg(), dsf_r_nak_msg(), dsf_r_no_partner();
static void dsf_close_msg(), dsf_reconn_req(), dsf_reconn_resp();
static void dsf_frm_admin_mssg(), dsf_frm_data_msg();
static char *dsf_get_msg_type(), *dsf_admin_type(), *dsf_sflag_conv();
static int check_src_dest();

#define MAX_ADDR 32

uint src_addr[MAX_ADDR], dest_addr[MAX_ADDR];

int n_src_addr = -1;   /* Number of elements in src_addr[] */
int n_dest_addr = -1;  /* Number of elements in dest_addr[] */
int data_amount = 0;   /* No of data bytes to be displayed */

static int check_src_dest(src, dest)
   unsigned int src, dest;
{
   register int i;

   if (n_src_addr == -1)
        return 1;
   for (i = 0; i < n_src_addr; i++)
        if (src_addr[i] == src)
          return 1;
   for (i = 0; i < n_dest_addr; i++)
        if (dest_addr[i] == dest)
          return 1;
   return 0;
}

static void dsf_frm_dsf_hdr(fd, media, trc, data)
   FILE *fd;
   char *media;
```

© COPYRIGHT 1994 AMDAHL CORPORATION

```
    struct dsf_media_trace *trc;
    char *data;
{
    struct dsf_msg_header *dsf_msg;
    int bodylen;
    int len = trc->len;

    while (len > sizeof(struct dsf_msg_header)) {
        dsf_msg = (struct dsf_msg_header *) data;
        if (check_src_dest(dsf_msg->src_id, dsf_msg->dest_id)) {
            dsf_trace_admin(fd, media, trc);
            fprintf(fd, "\tDSF_MSG_HEADER for %s\n", media);
            if (dsf_msg->type == DSF_ADMIN)
                fprintf(fd, "\t\t DSF_ADMIN message\n");
            else {
                if (dsf_msg->type != DSF_DATA)
                    return;
                else
                    fprintf(fd, "\t\t DSF_DATA message\n");
            }
            fprintf(fd, "\t\t Priority=%d:ack_req=%d:len=%d:frag=%x:seq=%d\n",
                    dsf_msg->priority, dsf_msg->ack_req, dsf_msg->len,
                    dsf_msg->fragm, dsf_msg->seq);
            fprintf(fd, "\t\t SRC_ID=%x:DEST_ID=%x\n",
                    dsf_msg->src_id, dsf_msg->dest_id);
            if (dsf_msg->type == DSF_ADMIN)
                dsf_frm_admin_mssg(fd, data + sizeof(struct dsf_msg_header));
            else
                dsf_frm_data_msg(fd, dsf_msg, data + sizeof(struct dsf_msg_header));
        }
        bodylen = dsf_msg->len;
        bodylen = (bodylen + 3) - (bodylen + 3) % 4;
        data += bodylen;
        len -= bodylen;
        if (*(int *) data == 0xffffffff) {
            break;
        }
    }

}

static char *dsf_sflag_conv(type)
    int type;
{
    if (type < 0 || type > CLONEOPEN)
```

© COPYRIGHT 1994 AMDAHL CORPORATION

```
        type = 0;
    return (streamsflag[type]);
}

static char *dsf_get_msg_type(type)
    int type;
{
    switch (type) {
    case M_DATA:
        return ("M_DATA");
    case M_PROTO:
        return ("M_PROTO");
    case M_BREAK:
        return ("M_BREAK");
    case M_PASSFP:
        return ("M_PASSFP");
    case M_SIG:
        return ("M_SIG");
    case M_DELAY:
        return ("M_DELAY");
    case M_CTL:
        return ("M_CTL");
    case M_IOCTL:
        return ("M_IOCTL");
    case M_SETOPTS:
        return ("M_SETOPTS");
    case M_RSE:
        return ("M_RSE");
    case M_IOCACK:
        return ("M_IOCACK");
    case M_IOCNAK:
        return ("M_IOCNAK");
    case M_PCPROTO:
        return ("M_PCPROTO");
    case M_PCSIG:
        return ("M_PCSIG");
    case M_READ:
        return ("M_READ");
    case M_FLUSH:
        return ("M_FLUSH");
    case M_STOP:
        return ("M_STOP");
    case M_START:
        return ("M_START");
    case M_HANGUP:
```

© COPYRIGHT 1994 AMDAHL CORPORATION

```
        return ("M_HANGUP");
    case M_ERROR:
        return ("M_ERROR");
    case M_COPYIN:
        return ("M_COPYIN");
    case M_COPYOUT:
        return ("M_COPYOUT");
    case M_IOCDATA:
        return ("M_IOCDATA");
    case M_PCRSE:
        return ("M_PCRSE");
    default:
        return ("Type undefined");
    }

}


static char *dsf_admin_type(type)
    int type;
{
    if (type < 0 || type > R_SET_PRIO)
        type = 0;
    return (dsfadminmsg[type]);
}

static void print_cred(fd, cred)
    FILE *fd;
    struct dsf_cred *cred;
{
    fprintf(fd,
        "\t\t\tcred:cr_ref=%d,cr_ngroups=%d,cr_uid=%d,cr_gid=%d,cr_ruid=%d\n",
        cred->cr_ref, cred->cr_ngroups, cred->cr_uid, cred->cr_gid,
        cred->cr_ruid);
    fprintf(fd, "\t\t\t    cr_rgid=%d,cr_suid=%d,cr_sgid=%d,cr_wkgpriv=%x\n",
        cred->cr_rgid, cred->cr_suid, cred->cr_sgid, cred->cr_wkgpriv);
    fprintf(fd,
        "\t\t\t    cr_maxpriv=%x,cr_lid=%x,cr_cmwlid=%x,cr_flags=%x\n",
        cred->cr_maxpriv, cred->cr_lid, cred->cr_cmwlid, cred->cr_flags);
}

static void dsf_frm_data_msg(fd, dsf_msg, msg)
    FILE *fd;
    struct dsf_msg_header *dsf_msg;
```

© COPYRIGHT 1994 AMDAHL CORPORATION

```
   struct msg_buff *msg;
{
   int len = 0;
   struct msg_buff *tmp_msg = msg;
   int msgblkcnt = 0;

   if ((dsf_msg->fragm & BEGIN_FRAGMENT) || dsf_msg->fragm == 0) {
DSFDATAHDR:
        len += sizeof(struct msg_buff);
        fprintf(fd, "\t\t\tLen=%d:OFF=%d:Cont=%d:Flag=%x:Band=%d:Msg type=%s \n",
             tmp_msg->length, tmp_msg->offset, tmp_msg->cont, tmp_msg->flag,
             tmp_msg->band, dsf_get_msg_type(tmp_msg->type));
        len += tmp_msg->length;
        if (tmp_msg->cont) {
           msgblkcnt++;
           tmp_msg = tmp_msg + 1;
           goto DSFDATAHDR;
        }
        if (data_amount > 0) {
           int min_amount = data_amount < tmp_msg->length ? data_amount :
           tmp_msg->length;
           char *data = ((char *) tmp_msg + tmp_msg->dataoffset);

           tmp_msg = msg;
           /* Adjust for 1st fragment (by dsfmsg_header PLUS ALL msg_buff */
           if (dsf_msg->fragm & BEGIN_FRAGMENT)
                min_amount = dsf_msg->len - (sizeof(struct dsf_msg_header) +
                     ((1 + msgblkcnt) * sizeof(struct msg_buff)));

           fprintf(fd, "\n\t\t\tUser Data-");
           while (min_amount--)
                fprintf(fd, "%2x ", *data++);
           fprintf(fd, "\n");
        }
   } else {     /* Second to LAST-1 part of a fragmented message */
        if (data_amount > 0) {
           int min_amount = data_amount < (dsf_msg->len -
                 sizeof(struct dsf_msg_header)) ? data_amount : dsf_msg->len -
           sizeof(struct dsf_msg_header);
           char *data = (char *) msg;

           fprintf(fd, "\n\t\t\tUser Data-");
           while (min_amount--)
                fprintf(fd, "%2x ", *data++);
           fprintf(fd, "\n");
```

© COPYRIGHT 1994 AMDAHL CORPORATION

```
        }
    }

    return;

}

static void dsf_frm_admin_mssg(fd, admin_msg)
    FILE *fd;
    union dsf_admin_msg *admin_msg;
{
    int len = 0;

    fprintf(fd, "\t\t\tDSF_ADMIN_MSG = %s\n", dsf_admin_type(admin_msg->type));
    switch (admin_msg->type) {
    case R_OPEN_REQ:
        dsf_r_open_req(fd, admin_msg);
        len = sizeof(struct r_open_req);
        break;
    case R_OPEN_RESP:
        dsf_r_open_resp(fd, admin_msg);
        len = sizeof(struct r_open_resp);
        break;
    case R_CLOSE_REQ:
        dsf_r_close_req(fd, admin_msg);
        len = sizeof(struct r_close_req);
        break;
    case R_CLOSE_RESP:
    case R_PUSH_RESP:
    case R_POP_RESP:
        dsf_r_cmd_resp(fd, admin_msg);
        len = sizeof(struct r_cmd_resp);
        break;
    case R_PUSH_REQ:
        dsf_r_push_req(fd, admin_msg);
        len = sizeof(struct r_push_req);
        break;
    case R_POP_REQ:
        dsf_r_close_req(fd, admin_msg);
        len = sizeof(struct r_pop_req);
        break;
    case R_LINK_REQ:
        dsf_r_link_req(fd, admin_msg);
        len = sizeof(struct r_link_req);
        break;
```

© COPYRIGHT 1994 AMDAHL CORPORATION

```
case R_LINK_RESP:
    dsf_r_link_resp(fd, admin_msg);
    len = sizeof(struct r_link_resp);
    break;
case R_UNLINK_REQ:
    dsf_r_unlink_req(fd, admin_msg);
    len = sizeof(struct r_unlink_req);
    break;
case R_UNLINK_RESP:
    dsf_r_unlink_resp(fd, admin_msg);
    len = sizeof(struct r_unlink_resp);
    break;
case R_ACK_MSG:
    dsf_r_ack_msg(fd, admin_msg);
    len = sizeof(struct r_ack_msg);
    break;
case R_NAK_MSG:
    dsf_r_nak_msg(fd, admin_msg);
    len = sizeof(struct r_nak_msg);
    break;
case R_NO_PARTNER:
    dsf_r_no_partner(fd, admin_msg);
    len = sizeof(struct r_no_partner);
    break;
case DSF_CHAN_CLOSE_REQ:
case DSF_CHAN_CLOSE_RESP:
    dsf_close_msg(fd, admin_msg);
    len = sizeof(struct dsf_close_msg);
    break;
case DSF_RECONN_REQ:
    dsf_reconn_req(fd, admin_msg);
    len = sizeof(struct dsf_reconn_req);
    break;
case DSF_RECONN_RESP:
    dsf_reconn_resp(fd, admin_msg);
    len = sizeof(struct dsf_reconn_resp);
    break;
case R_INTERRUPT:
case DSF_KEEPALIVE_REQ:
case DSF_KEEPALIVE_RESP:
case R_SET_PRIO:
    /* No message body */
    break;
case 0xffffffff:
    fprintf(fd, "End of message................\n");
```

© COPYRIGHT 1994 AMDAHL CORPORATION

```
        break;
    default:
        fprintf(fd, "Unknown ADMIN Message type =%d\n", admin_msg->type);
        break;

    }
    return;

}

static void dsf_trace_admin(fd, media, trc)
    FILE *fd;
    char *media;
    struct dsf_media_trace *trc;
{
    /* Convert time before printing */
    fprintf(fd, "%s", ctime(&trc->time));
    fprintf(fd, " %d: ", trc->count);
    fprintf(fd, " %s: ", media);
    if (trc->direc == DSFFROMMEDIA)
        fprintf(fd, "<---- ");
    else
        fprintf(fd, "---->");
    fprintf(fd, "\n\tLength of Message %d:", trc->len);
    fprintf(fd, "\n");


}
static void shutdown()
{
    printf("Exiting dsf_format....\n");
    exit(1);
}


static void dsf_trace_info(filename)
    char *filename;
{
    int fd;
    int size = 0;
    struct strbuf ctlbuf, databuf;
    char dsfmsg[MAXDSFMSG + sizeof(dsf_media_trace_t)];
    char media[MED_VALUE_SZ];
    char dsfdata[MAXDSFMSG];        /* Should be size of channel buffer size */
    struct dsf_media_trace dsftrace;
```

© COPYRIGHT 1994 AMDAHL CORPORATION

```
    int flag = 0;

    if ((fd = open(filename, O_RDONLY)) == NULL) {
        ERR1("Could not open file  =%s\n", filename);
        return;
    }
    if (read(fd, media, MED_VALUE_SZ) < 0) {
        ERR1("Error in reading  media name from <%s> \n", filename);
        close(fd);
        return;
    }
    (void) lseek(fd, (off_t) (strlen(media) + 1), 0);

    while (1) {
        if ((size = read(fd, (char *) &dsftrace, sizeof(dsf_media_trace_t)))
            != sizeof(dsf_media_trace_t)) {
            if (!size) {
                ERR0("That's all folks....\n");
                close(fd);
                exit(0);
            }
            ERR1("Error in reading dsf_media_trace from <%s> trace file\n",
                filename);
            close(fd);
            return;
        }
        if (read(fd, dsfdata, dsftrace.len) != dsftrace.len) {
            ERR1("Error in reading data from <%s> trace file\n", filename);
            close(fd);
            return;
        }
        dsf_frm_dsf_hdr(stdout, media, &dsftrace, dsfdata);

    }

}

main(argc, argv)
    int argc;
    char *argv[];
{

    int error = 0, opt;
    static char file[64] = DSFTRACE;
    extern char *optarg;
```

© COPYRIGHT 1994 AMDAHL CORPORATION

```
extern int optind;

pr_cred = 0;
while ((opt = getopt(argc, argv, "x:d:s:h:c")) != EOF) {
    switch (opt) {
    case 'x':
        data_amount = atoi(optarg);
        break;
    case 'd':
        if (n_dest_addr == MAX_ADDR) {
            ERR0("Too many destination addresses\n");
            break;
        }
        if (n_src_addr == -1)
            n_src_addr = 0;
        if (n_dest_addr == -1)
            n_dest_addr = 1;
        else
            n_dest_addr++;
        sscanf(optarg, "%x", &dest_addr[n_dest_addr - 1]);
        break;
    case 's':
        if (n_src_addr == MAX_ADDR) {
            ERR0("Too many source addresses\n");
            break;
        }
        if (n_dest_addr == -1)
            n_dest_addr = 0;
        if (n_src_addr == -1)
            n_src_addr = 1;
        else
            n_src_addr++;
        sscanf(optarg, "%x", &src_addr[n_src_addr - 1]);
        break;
    case 'c':
        pr_cred = 1;
        break;
    default:
        error = 1;
        break;

    }

}
if (error) {
```

© COPYRIGHT 1994 AMDAHL CORPORATION

```
        ERR2("%s:usage:%s [-xsdc]  file \n", argv[0], argv[0]);
        ERR0("Where x: Dump <n> data in hex along with the DSF messages\n");
        ERR0("Where s: Print out packets for a given source \n");
        ERR0("Where d: Print out packets for a given destination\n");
        ERR0("Where c: Print out credentials\n");
        exit(1);
    }
    if (optind < argc)
        strcpy(file, argv[optind]);


    dsf_trace_info(file);
}

static void dsf_r_open_req(fd, r_open_req)
    FILE *fd;
    struct r_open_req *r_open_req;
{

    fprintf(fd, "\t\t\tWindow=%d:DEV=%s:Minor=%d:flag:%x:sflag:%s\n",
            r_open_req->orig_window_size, r_open_req->dev_name,
            r_open_req->minor_dev, r_open_req->flag,
            dsf_sflag_conv(r_open_req->sflag));
    if (pr_cred)
        print_cred(fd, &r_open_req->user_cred);
}

static void dsf_r_open_resp(fd, r_open_res)
    FILE *fd;
    struct r_open_resp *r_open_res;
{

    fprintf(fd, "\t\t\tLower Window=%d:Uerror=%d:Minor=%d:\n",
            r_open_res->lower_window_size, r_open_res->uerror,
            r_open_res->minor_dev);
}

static void dsf_r_close_req(fd, r_close_req)
    FILE *fd;
    struct r_close_req *r_close_req;
{
    if (pr_cred)
        print_cred(fd, &r_close_req->user_cred);
}
```

© COPYRIGHT 1994 AMDAHL CORPORATION

```
static void dsf_r_cmd_resp(fd, r_cmd_resp)
   FILE *fd;
   struct r_cmd_resp *r_cmd_resp;
{

   fprintf(fd, "\t\t\tUerror=%d\n", r_cmd_resp->uerror);
}

static void dsf_r_push_req(fd, r_push_req)
   FILE *fd;
   struct r_push_req *r_push_req;
{

   fprintf(fd, "\t\t\tModule Name=%s:\n",
         r_push_req->mod_name);
}

static void dsf_r_link_req(fd, r_link_req)
   FILE *fd;
   struct r_link_req *r_link_req;
{

   fprintf(fd, "\t\t\tCmd=%d:Lower fd=%x:Upper_linkid=%x\n",
         r_link_req->cmd, r_link_req->lower_fd, r_link_req->upper_linkid);
}

static void dsf_r_link_resp(fd, r_link_resp)
   FILE *fd;
   struct r_link_resp *r_link_resp;
{

   fprintf(fd, "\t\t\tUerror=%d:Upper_linkid=%x:Lower_linkid=%x\n",
         r_link_resp->uerror, r_link_resp->upper_linkid,
         r_link_resp->lower_linkid);
}

static void dsf_r_unlink_req(fd, r_unlink_req)
   FILE *fd;
   struct r_unlink_req *r_unlink_req;
{

   fprintf(fd, "\t\t\tCmd=%d:upper_linkid=%x:Lower_linkid=%x\n",
         r_unlink_req->upper_linkid, r_unlink_req->lower_linkid);
}
```

© COPYRIGHT 1994 AMDAHL CORPORATION

```
static void dsf_r_unlink_resp(fd, r_unlink_resp)
   FILE *fd;
   struct r_unlink_resp *r_unlink_resp;
{

   fprintf(fd, "\t\t\tUerror=%d:upper_linkid=%x\n",
         r_unlink_resp->uerror, r_unlink_resp->upper_linkid);
}

static void dsf_r_ack_msg(fd, r_ack_msg)
   FILE *fd;
   struct r_ack_msg *r_ack_msg;
{

   fprintf(fd, "\t\t\tPrio=%d:Ack_seq=%d:Win Size=%d\n",
         r_ack_msg->priority, r_ack_msg->ack_seq, r_ack_msg->window_size);
}

static void dsf_r_nak_msg(fd, r_nak_msg)
   FILE *fd;
   struct r_nak_msg *r_nak_msg;
{

   fprintf(fd, "\t\t\tPrio=%d:Nak_seq=%d:Win Size=%d\n",
         r_nak_msg->priority, r_nak_msg->nak_seq, r_nak_msg->window_size);
}

static void dsf_r_no_partner(fd, r_no_partner)
   FILE *fd;
   struct r_no_partner *r_no_partner;
{

   fprintf(fd, "\t\t\tSrc_ID=%x:dest_id=%x\n",
         r_no_partner->src_id, r_no_partner->dest_id);
}

static void dsf_close_msg(fd, dsf_close_msg)
   FILE *fd;
   struct dsf_close_msg *dsf_close_msg;
{
   fprintf(fd, "\n", dsf_close_msg->type);

}

static void dsf_reconn_resp(fd, dsf_reconn_resp)
```

© COPYRIGHT 1994 AMDAHL CORPORATION

```
   FILE *fd;
   struct dsf_reconn_resp *dsf_reconn_resp;
{
   int num = dsf_reconn_resp->str_num;
   int i = 0;

   fprintf(fd, "\t\t\tStr_num=%d:\n", num);
   while (num--)
        fprintf(fd, "\t\t\tNo Partner=%x\n",
             dsf_reconn_resp->no_partner_list[i++]);

}

static void dsf_reconn_req(fd, dsf_reconn_req)
   FILE *fd;
   struct dsf_reconn_req *dsf_reconn_req;
{
   int i, j;

   fprintf(fd, "\t\t\tNo of Streams pair =%d\n", dsf_reconn_req->str_num);
   for (i=0; i < dsf_reconn_req->str_num; i++) {
      fprintf(fd, "\t\t\tLocal ID=%x\t Remode ID=%x\n",
           dsf_reconn_req->assoc_list[i].loc_id,
            dsf_reconn_req->assoc_list[i].rem_id);
        for(j=0; j < DSF_PRIO_NUM; j++)
          fprintf(fd,"\t\t\tLast Seq received for PRI %d is %d\n",
             j, dsf_reconn_req->assoc_list[i].last_seq_rec[j]);
       fprintf(fd,"\t\t\t Available window is =%d\n",
           dsf_reconn_req->assoc_list[i].window);
    }


}
```

© COPYRIGHT 1994 AMDAHL CORPORATION

```
#ident "@(#)/usr/src/amdahl/cmd/4655/vcs4/dsf/admin/dsf_trace/dsf_trace.c     11.4 12/14/92 15:53:24"
/* */
#include <stdio.h>
#include <sys/types.h>
#include <sys/fcntl.h>
#include <poll.h>
#include <errno.h>
#include <string.h>
#include <signal.h>
#include <sys/ioctl.h>
#include <sys/stropts.h>
#include <dsf/dsf.h>
#include <dsf/mirror.h>

#define DSFTRACE "/etc/opt/dsf/dsftrace"
#define ERR1(s,a1)  fprintf(stderr,s,a1)
#define ERR2(s,a1,a2)  fprintf(stderr,s,a1,a2)
#define MAXDSFMSG          4094 *4
static void send_media_trace(), rmv_quotes(), dsf_trace_info();
static void lbzero(), shutdown();
static int getdsfheader(), dsf_trc_admin_mssg();


static void shutdown()
{
   fprintf(stdout,"Exiting dsf_trace....\n");
   exit(1);
}

static int getdsfheader(data, act_len)
   char *data;
   int act_len;
{
   char *dataptr = data;
   char *dataptr1 = data;
   int len = 0;
   char dsfary[MAXDSFMSG];
   char *dsfhdr = dsfary;
   struct dsf_msg_header *dsf_msg;
   int bodylen;

   while (act_len > sizeof(struct dsf_msg_header)) {
      dsf_msg = (struct dsf_msg_header *) dataptr;
      dataptr1 = dataptr;
      bodylen = dsf_msg->len;
```

© COPYRIGHT 1994 AMDAHL CORPORATION

```
        memcpy(dsfhdr, dataptr, sizeof(struct dsf_msg_header));
        len += sizeof(struct dsf_msg_header);
        dsfhdr += sizeof(struct dsf_msg_header);
        dsf_msg->len = sizeof(struct dsf_msg_header);
        dataptr += sizeof(struct dsf_msg_header);
        if (dsf_msg->type == DSF_ADMIN) {
            register int sz;

            sz = dsf_trc_admin_mssg(dataptr);
            dsf_msg->len += sz;
            len += sz;
            memcpy(dsfhdr, dataptr, sz);
            dataptr += sz;
            dsfhdr += sz;
        }else {
            register int sz;

            sz = dsf_trc_data_msg(dsf_msg, dataptr);
            memcpy(dsfhdr, dataptr, sz);
            len += sz;
            dsfhdr += sz;
            dataptr += sz;
            dsf_msg->len += sz;
        }
        bodylen = (bodylen + 3) - (bodylen + 3) % 4;
        dataptr1 += bodylen;
        dataptr = dataptr1;
        act_len -=bodylen;
        if (*(int *) dataptr == 0xffffffff) {
            memcpy(dsfhdr, dataptr, 4);
            len += 4;
            break;
        }
    }
    memcpy(data, dsfary, len);
    return len;
}

static void send_media_trace(fd, media, filename, headeronly)
    int fd;
    char *media;
    char *filename;
    int headeronly;
{
    struct strioctl ioc;
```

© COPYRIGHT 1994 AMDAHL CORPORATION

```
    ioc.ic_cmd = DSF_TRACE_ON;
    ioc.ic_timout = -1;
    /* Now send the media value */
    ioc.ic_len = strlen(media) + 1;
    ioc.ic_dp = media;
    if (ioctl(fd, I_STR, (char *) &ioc) < 0) {
        fprintf(stderr, "Failure in starting trace\n");
        exit(0);
    }
    dsf_trace_info(fd, media, filename, headeronly);

}

static void dsf_trace_info(fd, media, filename, headeronly)
    int fd;
    char *media;
    char *filename;
    int headeronly;
{
    int fd1;
    struct strbuf ctlbuf, databuf;
    static char dsfmsg[MAXDSFMSG + sizeof(dsf_media_trace_t)];

    int flag = 0;

    if ((fd1 = open(filename, (O_CREAT | O_WRONLY | O_TRUNC))) == NULL) {
        ERR1("Could not open file  =%s\n", filename);
        return;
    }
    (void) chmod(filename, (00200 | 00400 | 00004));
    if (write(fd1, media, (strlen(media) + 1)) != (strlen(media) + 1)) {
        ERR1("Error in writing to %s trace file=%s\n", filename);
        close(fd1);
        return;
    }
    while (1) {
        int err;

        ctlbuf.maxlen = sizeof(dsf_media_trace_t);
        ctlbuf.len = 0;
        ctlbuf.buf = (char *) dsfmsg;
        databuf.maxlen = MAXDSFMSG;
        databuf.len = 0;
        databuf.buf = &dsfmsg[sizeof(dsf_media_trace_t)];
        flag = 0;
```

© COPYRIGHT 1994 AMDAHL CORPORATION

```
        if ((err = getmsg(fd, &ctlbuf, &databuf, &flag)) < 0) {
            perror("DSF_TRACE: Error in receiving message");
            close(fd1);
            break;
        }
        if (headeronly) {
            struct dsf_media_trace *trc = (struct dsf_media_trace *)dsfmsg;

            databuf.len = getdsfheader(&dsfmsg[sizeof(dsf_media_trace_t)],
                trc->len);
            trc->len = databuf.len;
        }
        if (write(fd1, (char *) dsfmsg,
                    sizeof(dsf_media_trace_t) + databuf.len) !=
              sizeof(dsf_media_trace_t) + databuf.len) {
            ERR1("Error in writing to %s trace file=%s\n", filename);
            close(fd1);
            break;
        }
    }

}

main(argc, argv)
    int argc;
    char *argv[];
{

    int error = 0, opt, fd;
    int headeronly = 0;
    static char media[MED_VALUE_SZ];
    static char media_value[16];
    static char filename[] = DSFTRACE;
    extern char *optarg;

    while ((opt = getopt(argc, argv, "hm:f:")) != EOF) {
        switch (opt) {
        case 'm':
            lbzero(media, MED_VALUE_SZ);
            strcpy(media, optarg);
            break;
        case 'f':
            strcpy(filename, optarg);
            break;
        case 'h':
```

© COPYRIGHT 1994 AMDAHL CORPORATION

```
            headeronly++;
            break;
        default:
            error = 1;
            break;
        }
    }

    if (error) {
        ERR2("usage: %s [-h -m<media name(in double quotes)>] [-f<filename>]\n",
            argv[0], argv[0]);
        exit(1);
    }
    /* send DSF_DEBUG to admin driver in kernel */
    if ((fd = open(DSFDEV, O_RDWR)) < 0) {
        perror("open failure on DSF driver");
        exit(1);
    }
    (void) signal(SIGQUIT, shutdown);
    (void) signal(SIGTERM, shutdown);
    rmv_quotes(media);
    send_media_trace(fd, media, filename, headeronly);
    fprintf(stdout,"Exiting...wait");


}

/*
 * add_space(): Adds a space to the media string so that  addititonal
 *              info follows  will be after a space. Requirement for identifying
 *                media.
 */

static void rmv_quotes(media)
    char media[];
{
    int i = 0;

    while (i < MED_VALUE_SZ && media[i] != '"')
        i++;
    if (i >= (MED_VALUE_SZ - 1))
        return;
    media[i] = '\0';
}
```

© COPYRIGHT 1994 AMDAHL CORPORATION

```
static void lbzero(s, size)
   register char *s;
   register int size;
{
   while (size--)
        *s++ = 0;

}

static int dsf_trc_admin_mssg(admin_msg)
   union dsf_admin_msg *admin_msg;
{
   int len = 0;

   switch (admin_msg->type) {
   case R_OPEN_REQ:
        len = sizeof(struct r_open_req);
        break;
   case R_OPEN_RESP:
        len = sizeof(struct r_open_resp);
        break;
   case R_CLOSE_REQ:
        len = sizeof(struct r_close_req);
        break;
   case R_CLOSE_RESP:
   case R_PUSH_RESP:
   case R_POP_RESP:
        len = sizeof(struct r_cmd_resp);
        break;
   case R_PUSH_REQ:
        len = sizeof(struct r_push_req);
        break;
   case R_POP_REQ:
        len = sizeof(struct r_pop_req);
        break;
   case R_LINK_REQ:
        len = sizeof(struct r_link_req);
        break;
   case R_LINK_RESP:
        len = sizeof(struct r_link_resp);
        break;
   case R_UNLINK_REQ:
        len = sizeof(struct r_unlink_req);
        break;
   case R_UNLINK_RESP:
```

© COPYRIGHT 1994 AMDAHL CORPORATION

```
            len = sizeof(struct r_unlink_resp);
            break;
      case R_ACK_MSG:
            len = sizeof(struct r_ack_msg);
            break;
      case R_NAK_MSG:
            len = sizeof(struct r_nak_msg);
            break;
      case R_NO_PARTNER:
            len = sizeof(struct r_no_partner);
            break;
      case DSF_CHAN_CLOSE_REQ:
      case DSF_CHAN_CLOSE_RESP:
            len = sizeof(struct dsf_close_msg);
            break;
      case DSF_RECONN_REQ:
            len = sizeof(struct dsf_reconn_req);
            break;
      case DSF_RECONN_RESP:
            len = sizeof(struct dsf_reconn_resp);
            break;
      case R_INTERRUPT:
          len = sizeof(struct r_interrupt);
          break;
      case DSF_KEEPALIVE_REQ:
      case DSF_KEEPALIVE_RESP:
          len = sizeof(struct dsf_keepalive);
          break;
      case R_SET_PRIO:
          len = sizeof(struct dsf_keepalive);
            break;
      case 0xffffffff:
          len = 4;
            break;
      default:
            break;

      }
      return len;

}

static dsf_trc_data_msg(dsf_msg, msg)
    struct dsf_msg_header *dsf_msg;
    struct msg_buff *msg;
```

© COPYRIGHT 1994 AMDAHL CORPORATION

```
{
   struct msg_buff *tmp_msg;
   int msgblkcnt = 1;

   if ((dsf_msg->fragm & BEGIN_FRAGMENT) || dsf_msg->fragm == 0) {
      for (tmp_msg = msg; tmp_msg->cont ; tmp_msg++)
         msgblkcnt++;
   }
   return (msgblkcnt * sizeof(struct msg_buff));
}
```

© COPYRIGHT 1994 AMDAHL CORPORATION

```
#ident "@(#)/usr/src/uts/uts/io/4655/dsf/dsfdrv.c        11.13 6/1/93 09:36:47 - (c) Copyright 1988, 1993
Amdahl Corporation"
/* */

/*
 * dsfdrv.c: Is used to link the media driver and send all DSF exchanges to
 * the remote DSF. This is prior to the media being declared up and running.
 * The media daemon links the media driver underneath the dsfdriver. The
 * routing and media table are downloaded by the dsf_daemon and the
 * respective media daemon(s). If the media sends an M_HANGUP then the message
 * is send up the media driver as an M_PROTO message. The media driver
 * decides on what needs to be done when the media goes down. The media goes
 * down on two situations 1) when the media driver sends an hangup message
 * and 2) when the dsfdriver finds out that there are no messages coming up
 * via the media driver. Each media driver is linked/attached according to
 * its own individual requirements(attach, link, etc). The mirror driver uses
 * the lower queues to send messages to the media. It seems redundant to hold
 * media lock sometimes because the synchronization which occures with the lower
 * queue is achieved via the fact that the media cannot disappear till
 * all elements are closed.
 */
#ifndef KERNEL
#define KERNEL
#endif

#include "mirror.h"

#ifndef STATIC
#define STATIC
#endif
#define DSFINTERVAL        (KEEPALIVE_INTERVAL / HZ)
#define CLOSETIME (KEEPALIVE_INTERVAL * 2 ) /*  twice KEEPALIVE_INTERVAL */
#define DSF_ASSERT(index)  if (index < 0 || index >= nmrr_media) return;
#define DSFLOG(sid,s,a1)  if (dsf_debug) strlog(DSF_MID,sid,1,SL_TRACE,s,a1);
#define DSFM_DAEMON       -1
/* Global Data */

extern media_obj_t *mrr_mediahp[];
extern mrr_route_info_t *mrrhastbl[];
extern int nmrr_media, nmrr_route;
int          dsf_debug = 0;
extern int     mrr_debug;

#if _UTS
static lock_t  *dsf_obj_cmn_lkp = 0;   /* unit structure basic lock for open */
```

© COPYRIGHT 1994 AMDAHL CORPORATION

```
rwlock_t  *mrr_mediahp_rwlkp = 0; /* Used for locking mrr_mediahp table */
extern lkinfo_t mrr_element_lkinfo;
static lkinfo_t med_obj_lkinfo;
#endif
extern int      dsf_route_data();
extern void     mrr_send_hangup();
extern void     mrr_upd_xmit_info(), mrr_en_all_usr_q(), mrr_rexmit_msg();
extern int      mrr_media_value_cmp(), mrr_validate(), mrr_pwr();
extern void             mrr_update_xmit_window();
STATIC int      dsf_uwput(), dsf_uwsvc(), dsf_lrput();
STATIC int      dsf_lwsrv(), dsf_rsrv();
STATIC int      dsf_open(), dsf_close(), dsf_mrroute(), dsf_chk_ver_conv();
STATIC media_obj_t *dsf_allocmedia();
STATIC void     dsf_free(), dsf_flush(), dsf_enterroute(), dsf_wait_for_close();
STATIC void     dsf_ioctl(), dsf_mproto(), dsf_enableq(), dsf_dis_all_mrr_q();
STATIC void     dsf_reconnect_xchg_req(), dsf_free_route(), dsf_recon_bufcall();
STATIC int      dsf_media(), dsf_open_req(), dsf_open_reply(), dsf_cpy_id();
STATIC void     dsf_send_close(), dsf_trace_qremove(), dsf_check_alive();
STATIC int      dsf_set_trace_med(), dsf_chkconn();
STATIC int      dsf_reconnect_xchg_rreq(), dsf_send_dsf_res();
STATIC int      dsf_reconnect_xchg_rres(), dsf_media_close();
STATIC void     dsf_snd_meddown_toadmin();
STATIC void     dsf_chk_snd_medhangup_toadmin();
STATIC void     dsf_start_dsf_keep_alive(), dsf_snd_medhangup_toadmin();
STATIC void             dsf_chk_snd_meddown_toadmin();
int             mrr_msg_length(), dsf_reconn_xchange();
void            dsf_ready_media(), dsf_send_keepalive();
media_obj_t     *dsf_chk_if_media_valid();

#if _UTS
int             dsfinit();
#endif

STATIC struct module_info dsf_info = {
        DSF_MID, DSF_NAME, 0, INFPSZ, STRHIGH, STRLOW
};

STATIC struct qinit dsf_urinit = {      /* Upper Read queue */
NULL, dsf_rsrv, dsf_open, dsf_close, NULL, &dsf_info, NULL};

STATIC struct qinit dsf_uwinit =/* Upper Write queue */
{
dsf_uwput, dsf_uwsvc, NULL, NULL, NULL, &dsf_info, NULL};
struct qinit    dsf_lrinit = {dsf_lrput, NULL, NULL, NULL, NULL, &dsf_info, NULL};
struct qinit    dsf_lwinit = {NULL, dsf_lwsrv, NULL, NULL, NULL, &dsf_info, NULL};
```

© COPYRIGHT 1994 AMDAHL CORPORATION

```
#if _UTS
int         dsfdevflag = (D_MP | D_INT);  /* we support a new-style
                                           * (SVR4) interface */
#endif                      /* For MP we make it D_MP */

/* mrr administrator streamtab */

struct streamtab dsfinfo = {
        &dsf_urinit,        /* rdinit   */
        &dsf_uwinit,        /* winit    */
        &dsf_lrinit,        /* muxrinit */
        &dsf_lwinit         /* muxwinit */
};


#if _UTS
/* Initialization routine called during UTS4 system startup time */
int
dsfinit()
{
        /* MP: initialize lock infos */
        mrr_element_lkinfo.lk_name = "mrr_element_lk";
        mrr_element_lkinfo.lk_flags = 0;
        /* mrr_element_lkinfo.lk_pad[0] = mrr_element_lkinfo.lk_pad[1]=0; */
        med_obj_lkinfo.lk_name = "med_obj_lk";
        med_obj_lkinfo.lk_flags = 0;
        /* med_obj_lkinfo.lk_pad[0] = med_obj_lkinfo.lk_pad[1]=0; */
        dsf_obj_cmn_lkp = LOCK_ALLOC(DSF_HIER1, plstr, &med_obj_lkinfo, KM_NOSLEEP);
        mrr_mediahp_rwlkp = RW_ALLOC(DSF_HIER1, plstr, &med_obj_lkinfo, KM_NOSLEEP);
}
#endif

#if _UTS
/* ARGSUSED */
STATIC int
dsf_open(q, dev, flag, sflag)
        queue_t     *q;
        dev_t       *dev;
        int         flag, sflag;

#else
/* ARGSUSED */
STATIC int
dsf_open(q, dev, flag, sflag)
        queue_t     *q;
```

© COPYRIGHT 1994 AMDAHL CORPORATION

```
        dev_t        dev;
        int          flag;
        int          sflag;

#endif

{
        register media_obj_t *mediap;

        if (sflag == CLONEOPEN) {
                if ((mediap = dsf_allocmedia()) == (media_obj_t *) 0) {
                        MRR_RETURN(EAGAIN);
                }
        } else {
                MRR_RETURN(EINVAL);
        }
        q->q_ptr = (qpptr_t) mediap->index;
        WR(q)->q_ptr = (qpptr_t) mediap->index;
        mediap->urq = q;

#if _UTS
        /* MP: enable put and service */
        *dev = makedevice(getemajor(*dev), mediap->index);
        qprocson(q);
        return (0);
#else
        return (mediap->index);
#endif
}

/* ARGSUSED */
#if _UTS
STATIC int
dsf_close(qp, flag, credp)
        queue_t      *qp;
        int          flag;
        cred_t       *credp;
#else
STATIC int
dsf_close(qp)
        queue_t      *qp;
#endif
{
        register media_obj_t *mediap;
        register int    minore = 0;
```

© COPYRIGHT 1994 AMDAHL CORPORATION

```
        register int    s = MRR_SETPL(s);
        MRR_PLT         oldpl, lastpl;

        if ((int)qp->q_ptr < 0 || (int)qp->q_ptr >= nmrr_media)
                return (0);

#if _UTS
/* Lock held for making sure that an element gets inserted in list */
   oldpl = RW_WRLOCK(mrr_mediahp_rwlkp, plstr);
   mediap = mrr_mediahp[(int)qp->q_ptr];
        lastpl = RW_WRLOCK(mediap->media.med_rwlkp, plstr);
        mediap->status = DSF_MED_CLOSING;
   RW_UNLOCK(mrr_mediahp_rwlkp, oldpl);
   oldpl = lastpl;
        MRR_RLS_MED_LOCK(mediap, oldpl);
#else
   mediap = mrr_mediahp[(int)qp->q_ptr];
        mediap->status = DSF_MED_CLOSING;
#endif
        if (mediap->bid)
                MRR_UNBUFCALL(mediap->bid);
        if (mediap->xrsbid)
                MRR_UNBUFCALL(mediap->xrsbid);
        /* Stop Keep alive message as media is being closed */
        if (mediap->keepalive)
                MRR_UNTIMEOUT(mediap->keepalive);
        /* If trace queue or send an M_ERROR message */
        if (mediap->urtrq)
                MRR_PUTCTL1(qp, M_ERROR, ENXIO);
        minore = mediap->index;
        /* Check to see if this was a DSF_TRACE queue */
        dsf_trace_qremove(qp);
        /* Flush any messages on the queue */
        dsf_flush(qp);
        /*
         * Check if any active connections are there if so send M_HANGUP.
         * Sleep & wait until circuits are freed
         */
        (void) dsf_chkconn(mediap);
        /*
         * Wait for some time for all circuits to come down & keep alive
         * timeout to die down
         */
        if (MRR_TIMEOUT(dsf_wait_for_close, mediap, CLOSETIME)) {
        /* Get a Common LOCK */
```

© COPYRIGHT 1994 AMDAHL CORPORATION

```
#if _UTS
            oldpl = LOCK(dsf_obj_cmn_lkp, plstr);
            SV_WAIT(mediap->media.svp, prinet, dsf_obj_cmn_lkp);
#else
            sleep(mediap, PZERO);
#endif
    }
        /* Free the route related memory */
        if (mediap->index == DSFM_DAEMON) {  /* Opened by the main daemon */
                dsf_free_route();
        }
#if _UTS
        qprocsoff(qp);
        oldpl = LOCK(dsf_obj_cmn_lkp, plstr);
        /* MP: disable upper part of driver - put and service */
        RW_DEALLOC(mediap->media.med_rwlkp);
        RW_DEALLOC(mediap->media.element_rwlkp);
        SV_DEALLOC(mediap->media.svp);
        LOCK_DEALLOC(mediap->media.tr_lkp);
#endif
        dsf_free(mediap);
#if _UTS
        UNLOCK(dsf_obj_cmn_lkp, oldpl);
#endif
        MRR_SPLX(s);
        qp->q_ptr = (qpptr_t)nmrr_media +1;
        return (0);
}


/*
 * dsf_uwput is the upper write put routine.  It takes messages from ad
 * stream and decides what to do with them, controls and ioctls get processed
 * here.
 */

STATIC int
dsf_uwput(qp, mp)
        queue_t        *qp;
        mblk_t         *mp;
{


        switch (mp->b_datap->db_type) {
```

© COPYRIGHT 1994 AMDAHL CORPORATION

```
	case M_FLUSH:
		if (*mp->b_rptr & FLUSHW) {
			flushq(qp, FLUSHALL);
			*mp->b_rptr &= ~FLUSHW;
		}
		if (*mp->b_rptr & FLUSHR) {
			flushq(RD(qp), FLUSHALL);
			qreply(qp, mp);
		} else
			freemsg(mp);
		break;
	case M_IOCTL:
		dsf_ioctl(qp, mp);
		break;

	case M_PROTO:
		dsf_mproto(qp, mp);
		break;


	default:
		freemsg(mp);
		break;
	}
}


/*
 * dsf_uwsvc is the upper write service routine. All admin messages from the
 * daemon are  send  to the message to the remote side
 */

STATIC
int
dsf_uwsvc(qp)
	queue_t		*qp;
{
	register mblk_t *mp;
	register media_obj_t *mediap;
	MRR_PLT		oldpl = 0;

   if (!(mediap = dsf_chk_if_media_valid(qp->q_ptr)))
	   return 0;

	while ((mp = getq(qp)) != (mblk_t *) NULL) {
```

© COPYRIGHT 1994 AMDAHL CORPORATION

```
			if (mediap->media.lwqp) {
				if (!MRR_CANPUT(mediap->media.lwqp)) {
					putbq(mediap->media.lwqp, mp);
					break;
				} else {
					oldpl = MRR_HLD_MED_RDLOCK(mediap, plstr);
					MRR_PUT_TO_MEDIA(mediap, mp, oldpl);
				}

			} else {
				DSFLOG(mediap->index, "dsf_uwsvc: Lower queue NULL=%x\n",
					mediap->index);
				break;
			}

		}
		return (1);
}


STATIC void
dsf_ioctl(qp, mp)
	queue_t		*qp;
	mblk_t		*mp;
{
	register struct iocblk *iop;
	register struct linkblk *link;
	register media_obj_t *mdp;
	register int	error;
	MRR_PLT		oldpl;

   if (!(mdp = dsf_chk_if_media_valid(qp->q_ptr))) {
      freemsg(mp);
         return;
	}
	iop = (struct iocblk *) mp->b_rptr;
	switch (iop->ioc_cmd) {
	case I_LINK:
		DSFLOG(mdp->index, "dsf: I_LINK entering=%x\n", mdp->index);
#if _UTS
		oldpl = RW_WRLOCK(mdp->media.med_rwlkp, plstr);
#endif
		if (mdp->urq == RD(qp)) {
			link = (struct linkblk *) mp->b_cont->b_rptr;
			mdp->media.lwqp = link->l_qbot;
```

© COPYRIGHT 1994 AMDAHL CORPORATION

```
                mdp->media.l_index = link->l_index;
                mdp->media.lwqp->q_ptr = RD(mdp->media.lwqp)->q_ptr =
                        (qpptr_t) qp->q_ptr;
                mdp->status |= DSF_MED_LINKED;
                mdp->status &= ~DSF_MED_UNLINKED;
                mp->b_datap->db_type = M_IOCACK;
                DSFLOG(mdp->index, "dsf: I_LINK succeeded=%x\n", link->l_qbot);

        } else
                mp->b_datap->db_type = M_IOCNAK;
        iop->ioc_error = 0;
        iop->ioc_rval = 0;
        iop->ioc_count = 0;
        MRR_RLS_MED_LOCK(mdp, oldpl);
        qreply(qp, mp);
        break;

    case I_UNLINK:
#if _UTS
        oldpl = RW_WRLOCK(mdp->media.med_rwlkp, plstr);
#endif
        DSFLOG(mdp->index, "dsf: I_UNLINK entering=%x\n", mdp->index);
        mdp->media.lwqp = NULL;
        mdp->media.l_index = 0;
        mdp->status = DSF_MED_UNLINKED;
        mp->b_datap->db_type = M_IOCACK;
        MRR_RLS_MED_LOCK(mdp, oldpl);
        iop->ioc_count = 0;
        iop->ioc_error = 0;
        iop->ioc_rval = 0;
        /* prevent queues from being scheduled */
        dsf_dis_all_mrr_q(mdp);
        qreply(qp, mp);
        DSFLOG(mdp->index, "dsf: I_UNLINK succeeded=%x\n", mdp->index);
        break;

    case MR_COMM:
    case MR_ROUTE:              /* These are I_STR ioctl calls */
        if (mp->b_cont == NULL) {
                error = EINVAL;
                goto dsf_nak;
        }
        mp->b_datap->db_type = (iop->ioc_cmd == MR_ROUTE) ?
                dsf_mrroute(mdp, mp->b_cont):dsf_media(mdp, mp->b_cont);
        iop->ioc_count = 0;
```

© COPYRIGHT 1994 AMDAHL CORPORATION

```
                iop->ioc_error = 0;
                iop->ioc_rval = 0;
                qreply(qp, mp);
                break;
                /* May not require a write lock for turning trace on */
        case DSF_TRACE_ON:
                if (mp->b_cont == NULL) {
                        error = EINVAL;
                        goto dsf_nak;
                }
                if (!dsf_set_trace_med(RD(qp), mp->b_cont)) {
                        error = EINVAL;
                        goto dsf_nak;
                }
                mp->b_datap->db_type = M_IOCACK;
                iop->ioc_count = 0;
                iop->ioc_error = 0;
                iop->ioc_rval = 0;
                qreply(qp, mp);
                break;
        case DSF_TRACE_OFF:
                (void) dsf_set_trace_med(NULL, mp->b_cont);
                mp->b_datap->db_type = M_IOCACK;
                iop->ioc_count = 0;
                iop->ioc_error = 0;
                iop->ioc_rval = 0;
                qreply(qp, mp);
                break;

        default:
                error = EINVAL;
dsf_nak:
                iop->ioc_error = error;
                iop->ioc_count = 0;
                mp->b_datap->db_type = M_IOCNAK;
                qreply(qp, mp);
                break;
        }
        return;

}

/*
 * This routine allocates  storage for media value. This routine is called
 * from open.
```

© COPYRIGHT 1994 AMDAHL CORPORATION

```
 */
STATIC media_obj_t *
dsf_allocmedia()
{
        dev_t           minore = 0;
        register media_obj_t *mediap;
        MRR_PLT         oldpl;
#if _UTS
        if (dsf_obj_cmn_lkp ||mrr_mediahp_rwlkp )
                oldpl = LOCK(dsf_obj_cmn_lkp, plstr);
        else
                return ((media_obj_t *) NULL);
#endif
        mediap = mrr_mediahp[minore];
        while (minore < nmrr_media && mediap != (media_obj_t *) NULL) {
                mediap = mrr_mediahp[++minore];
        }
        if (minore >= nmrr_media) {
#if _UTS
                UNLOCK(dsf_obj_cmn_lkp, oldpl);
#endif
                return ((media_obj_t *) NULL);
        }
        if ((mediap = (media_obj_t *) KMEM_ALLOC(
                                        sizeof(media_obj_t), KM_NOSLEEP))) {
#if _UTS
                if (!(mediap->media.svp = SV_ALLOC(KM_NOSLEEP))) {
                        DSFLOG(minore, "Could not allocate MEM for SV lock (%x)\n", minore);
                        KMEM_FREE(mediap, sizeof(media_obj_t));
#if _UTS
                        UNLOCK(dsf_obj_cmn_lkp, oldpl);
#endif
                        return ((media_obj_t *) NULL);
                }
                if (!(mediap->media.med_rwlkp = RW_ALLOC(DSF_HIER30, plstr,
                                        &med_obj_lkinfo, KM_NOSLEEP))) {
                        DSFLOG(minore, "Could not allocate memory for RW lock (%x)\n",
                                minore);
                        SV_DEALLOC(mediap->media.svp);
                        KMEM_FREE(mediap, sizeof(media_obj_t));
#if _UTS
                        UNLOCK(dsf_obj_cmn_lkp, oldpl);
#endif
                        return ((media_obj_t *) NULL);
                }
```

© COPYRIGHT 1994 AMDAHL CORPORATION

```
		if (!(mediap->media.element_rwlkp = RW_ALLOC(DSF_HIER2, plstr,
					&med_obj_lkinfo, KM_NOSLEEP))) {
			DSFLOG(minore, "Could not allocate  memory for RW lock (%x)\n",
				minore);
			RW_DEALLOC(mediap->media.med_rwlkp);
			SV_DEALLOC(mediap->media.svp);
			KMEM_FREE(mediap, sizeof(media_obj_t));
#if _UTS
			UNLOCK(dsf_obj_cmn_lkp, oldpl);
#endif
			return ((media_obj_t *) NULL);
		}
		if (!(mediap->media.tr_lkp = LOCK_ALLOC(DSF_HIER3, plstr,
					&med_obj_lkinfo, KM_NOSLEEP))) {
			DSFLOG(minore, "Could not allocate  memory for RW lock (%x)\n",
				minore);
			RW_DEALLOC(mediap->media.element_rwlkp);
			RW_DEALLOC(mediap->media.med_rwlkp);
			SV_DEALLOC(mediap->media.svp);
			KMEM_FREE(mediap, sizeof(media_obj_t));
#if _UTS
			UNLOCK(dsf_obj_cmn_lkp, oldpl);
#endif
			return ((media_obj_t *) NULL);
		}
#else
		bzero((caddr_t) mediap, sizeof(media_obj_t));
#endif
		mediap->index = minore;
		mediap->status = DSF_MED_OPENED;
		mediap->activator = DSF_ACTIVE;
		mediap->xch_index = 0;		/* No dsf_xchanges yet */
		mediap->xch_con = (mrr_element_t *)NULL;
		mediap->version = DSF_VERSION;
		mrr_mediahp[minore] = mediap;

#if _UTS
		UNLOCK(dsf_obj_cmn_lkp, oldpl);
#endif
		return (mediap);
	} else {
#if _UTS
		UNLOCK(dsf_obj_cmn_lkp, oldpl);
#endif
		return ((media_obj_t *) NULL);
```

© COPYRIGHT 1994 AMDAHL CORPORATION

```
	}
}

/*
 * Routine to flush the read and write queues.
 */

STATIC void
dsf_flush(qp)
	register queue_t *qp;
{
	flushq(qp, FLUSHALL);
	if (WR(qp)->q_first)
		flushq(WR(qp), FLUSHALL);
}

/*
 * dsf_free: Free the allocated media_obj_t memory and update the linked
 * list. Lock held on entry dsf_obj_cmn_lkp.
 */

STATIC void
dsf_free(medp)
	media_obj_t	*medp;
{
	register int	i = 0;
	register media_obj_t *mediap = mrr_mediahp[i];

	while (i < nmrr_media) {
		if (medp == mediap) {
			KMEM_FREE(medp, sizeof(media_obj_t));
			/* Get a Lock */

			mrr_mediahp[i] = (media_obj_t *) NULL;

			/* May have to free the locks also */
			return;
		}
		mediap = mrr_mediahp[++i];
	}
	DSFLOG(mediap->index, "dsf_free: No match found =%x\n", i);

}

/*
```

© COPYRIGHT 1994 AMDAHL CORPORATION

```
 * dsf_chkconn: This function sends a M_HANGUP or wakeup  to all the active
 * connections since the admin process is exiting for a fatal error.
 */

STATIC int
dsf_chkconn(mediap)
        register media_obj_t *mediap;
{
        register int    i;
        register int    active = 0;
        register mrr_element_t *mrrp;
        MRR_PLT oldpl;

DSFCHK:
#if _UTS
        oldpl = RW_RDLOCK(mediap->media.element_rwlkp, plstr);
#endif

        for (i=0; i < MRCONNSZ; i++) {
DSFCHKAGN:
                mrrp = mediap->mrrcon[i];
                while (mrrp) {
#if _UTS
                        if (TRYLOCK(mrrp->lkp, plstr) == invpl){
                            cmn_err(CE_CONT," dsf_chkconn:Looping on Lock=%x\n", mrrp);
                            RW_UNLOCK(mediap->media.element_rwlkp, oldpl);
                goto DSFCHK;
                        }
#endif
                        mrrp->status = MR_MEDDOWNP;
                        if (mrrp->state & MR_SLEEPING) {
                                active = 1;
                                MRR_WAKEUP(mrrp);
                        } else {
                                if (mrrp->state & MR_UPSTATE) {
                                        active = 1;
                                        if (!(mrrp->status & MR_HANGUPSEND)) {
                                                /* Maybe freeze STREAM Here */
                                                if (mrrp->urqptr->q_next) {
#if _UTS
                                                        RW_UNLOCK(mediap->media.element_rwlkp,
plstr);
                                                        mrrp->oldpl = oldpl;
#endif
                                                        mrr_send_hangup(mrrp);
```

© COPYRIGHT 1994 AMDAHL CORPORATION

```
#if _UTS
                                                        RW_RDLOCK(mediap->media.element_rwlkp,
plstr);
                                                        oldpl = mrrp->oldpl;
#endif
                                                }
                                        }
                                } else {
                                        if (mrrp->state & MR_BUFCCLOSE) {
                                                active = 1;
                                                MRR_WAKEUP(mrrp);
                                        }
                                }
                        }
                        /* mrrp could have disappeared */
                        if (mrrp->urqptr) {
                           MRR_UNLOCK_CLOSE(mrrp);
        mrrp = mrrp->mrr_next;
                        } else {
                           MRR_UNLOCK_CLOSE(mrrp);
                                goto DSFCHKAGN;
                        }


                }
        }
#if _UTS
        RW_UNLOCK(mediap->media.element_rwlkp, oldpl);
#endif
        return (active);
}

/*
 * dsf_wait_for_close:  This function is called to check if any circuts are
 * still active. If they are then it  and waits. Media cannot go down since
 * it is called from dsf_close.
 */

STATIC void
dsf_wait_for_close(mediap)
        register media_obj_t *mediap;
{

        if (dsf_chkconn(mediap)) {
                /* Some elemnents are still active */
```

© COPYRIGHT 1994 AMDAHL CORPORATION

```
                if (MRR_TIMEOUT(dsf_wait_for_close, mediap, CLOSETIME))
                    return;
        }
#if _UTS
        /* All elements gone */
        SV_SIGNAL(mediap->media.svp, 0);
#else
        wakeup(mediap);
#endif

}

/*
 * dsf_enableq(): Enables all the communication on individual connection by
 * calling qenable. This routine is called after a LINK is sucessfully done.
 * TRYLOCK help in avoiding race condition. mrr_validate will not work
 */

STATIC void
dsf_enableq(mediap)
        register media_obj_t *mediap;
{
        register int    i = 0;
        register mrr_element_t *mrrp;
   MRR_PLT oldpl;
DSF_EN_Q:
#if _UTS
        oldpl = RW_RDLOCK(mediap->media.element_rwlkp, plstr);
#endif
        for (i=0; i < MRCONNSZ; i++) {
DSF_EN_AGN:
                mrrp = mediap->mrrcon[i];
                while (mrrp) {
#if _UTS
                        if (TRYLOCK(mrrp->lkp, plstr) == invpl) {
                            cmn_err(CE_CONT,"dsf_enableq:Looping on Lock=%x\n", mrrp);
                            RW_UNLOCK(mediap->media.element_rwlkp, oldpl);
            goto DSF_EN_Q;
                        }
#endif
                        /* Media just came up */

                        /* Check if any pending messages to be send */
                        if (!(mrrp->status & MR_NOREMOTE)) {
                            mrrp->status = mediap->status;
```

© COPYRIGHT 1994 AMDAHL CORPORATION

```
#if _UTS
                                        /* Don't allow close to race us when we give up locks */
                                        mrrp->wait_on_close = 1;
                                        mrrp->oldpl = oldpl;
                                        RW_UNLOCK(mediap->media.element_rwlkp, plstr);
#endif
                                        mrr_rexmit_msg(mrrp);
#if _UTS
                                        RW_RDLOCK(mediap->media.element_rwlkp, plstr);
                                        oldpl = mrrp->oldpl;
#endif
                                        mrr_en_all_usr_q(mrrp->urqptr);
                                }
                                /* mrrp could have disappeared  */
                                if (mrrp->urqptr) {
                                   MRR_UNLOCK_CLOSE(mrrp);
                                   mrrp = mrrp->mrr_next;
                                } else {
                                   MRR_UNLOCK_CLOSE(mrrp);
                                   goto DSF_EN_AGN;
                                }

                }
        }
#if _UTS
        RW_UNLOCK(mediap->media.element_rwlkp, oldpl);
#endif
}

/*
 * dsf_dis_all_mrr_q(): Disable all the communication on individual
 * connection by calling noenable. This routine is called after an I_UNLINK
 * message is received or a hangup is received from the media driver.
 * TRYLOCK help in avoiding race condition. mrr_validate will not work
 */

STATIC void
dsf_dis_all_mrr_q(mediap)
        register media_obj_t *mediap;
{
        register mrr_element_t *mrrp;
        register int    i;
   MRR_PLT oldpl;

DSF_DIS_AGAIN:
```

© COPYRIGHT 1994 AMDAHL CORPORATION

```
#if _UTS
        oldpl = RW_RDLOCK(mediap->media.element_rwlkp, plstr);
#endif
        /*
         * Please Note High Priority messages, if queued up, will still call
         * the service routine. The service routine should check for media
         * state, before transmitting.
         */
        for (i = 0; i < MRCONNSZ; i++) {
                mrrp = mediap->mrrcon[i];
                while (mrrp) {
#if _UTS
                        if ((mrrp->oldpl = TRYLOCK(mrrp->lkp, plstr)) == invpl) {
                            cmn_err(CE_CONT,"dsf_dis_all_mrr_q:Looping on Lock=%x\n", mrrp);
                            RW_UNLOCK(mediap->media.element_rwlkp, oldpl);
            goto DSF_DIS_AGAIN;
                        }
#endif
                        mrrp->status |= MR_MEDDOWN;
                        mrrp->status &= ~MR_MEDUP;
                        /* Could be possible to send wake & no enable again becuase
                         * of TRYLOCK failure
                         */
                    if ((mrrp->state & MR_OPENING) || (mrrp->state & MR_SLEEPING &&
                      mrrp->error_code == EINTR)) {
                      MRR_WAKEUP(mrrp);
                    } else {
                          if (mrrp->urqptr) {
                                  noenable(mrrp->urqptr);
                                  noenable(WR(mrrp->urqptr));
                              }
                        }
                        MRR_UNLOCK(mrrp);
                        mrrp = mrrp->mrr_next;

                }
        }
#if _UTS
        RW_UNLOCK(mediap->media.element_rwlkp, oldpl);
#endif
}

/*
 * M_PROTO message support
 */
```

© COPYRIGHT 1994 AMDAHL CORPORATION

```
STATIC void
dsf_mproto(qp, mp)
        register queue_t *qp;
        register mblk_t *mp;
{
        register media_obj_t *mdp;
        register union dsf_admin *dscp = (union dsf_admin *) mp->b_rptr;
        MRR_PLT         oldpl;

    if (!(mdp = dsf_chk_if_media_valid(qp->q_ptr))) {
            freemsg(mp);
            return;
    }
        switch (dscp->type) {
        case DSF_CHAN_CLOSE_REQ:
                DSFLOG(mdp->index, ": sending DSF_CLOSE_REQ =%x\n", mdp->status);
                dsf_send_close(mdp);
                break;
        case DSF_DEBUG_ON:
                mrr_debug = 1;
                dsf_debug = 1;
                DSFLOG(mdp->index, " Turning Debug ON=%x\n", mdp->index);
                break;
        case DSF_DEBUG_OFF:
                DSFLOG(mdp->index, " Turning Debug OFF=%x\n", mdp->index);
                mrr_debug = 0;
                dsf_debug = 0;
                break;
        case DSF_TRACE_ON:
                DSFLOG(mdp->index, " Turning TRACE ON=%x\n", dscp->type);
                if (!dsf_set_trace_med(RD(qp), mp->b_cont)) {
                        *mp->b_rptr = (char) EINVAL;
                        mp->b_wptr += sizeof(char);
                        mp->b_datap->db_type = M_ERROR;
                        putnext(RD(qp), mp);
                        return;
                }
                break;
        case DSF_TRACE_OFF:
                DSFLOG(mdp->index, " Turning TRACE OFF=%x\n", dscp->type);
                (void) dsf_set_trace_med(NULL, mp->b_cont);
                break;
        default:
                break;
        }
```

© COPYRIGHT 1994 AMDAHL CORPORATION

```
        freemsg(mp);
}

/*
 * dsf_media:  gets the Media communication information. Changes Media status
 * to DSF_MED_READY and sends M_IOCNAK or M_IOCACK.
 */

STATIC int
dsf_media(mediap, mp)
        register media_obj_t *mediap;
        register mblk_t *mp;
{
        register usr_media_obj_t *lmediap = (usr_media_obj_t *) mp->b_rptr;
        register int    value = M_IOCNAK;
        MRR_PLT         oldpl = 0;

        if (MSGBLEN(mp) != sizeof(usr_media_obj_t))
                return (M_IOCNAK);
        if (mediap && (mediap->status & DSF_MED_LINKED)) {
                oldpl = MRR_HLD_MED_RDLOCK(mediap, plstr);
                bcopy(lmediap->id, mediap->media.lower.id, MAX_ID_LEN);
                bcopy(lmediap->media_value, mediap->media.lower.media_value,
                      MED_VALUE_SZ);
                /* Copy the media buffer size */
                mediap->media.lower.max_msg_size = lmediap->max_msg_size;
                /* Send out dsf_open_req and wait for response */
                if (mediap->activator)
                        return (dsf_open_req(mediap, oldpl));
                else {
                        mediap->status |= DSF_WAIT_DSF_OPEN_REQ;
                        MRR_RLS_MED_LOCK(mediap, oldpl);
                        return (M_IOCACK);
                }
        } else {
                DSFLOG(mediap->index,
                      "MEDIA LOAD FailedMedia = %x,and LowerQueue\n",
                      mediap);
                return (M_IOCNAK);
        }

}

/*
 * Routine to take care of loading the routing table. This is an IOCTL call.
```

© COPYRIGHT 1994 AMDAHL CORPORATION

```
*/

STATIC int
dsf_mrroute(mediap, mp)
        register media_obj_t *mediap;
        register mblk_t *mp;

{
        register struct mrr_route_info *new_entry, *mrr_routep, *prv_mrr_routep;
        register mrr_route_t *usr_routep = (mrr_route_t *) mp->b_rptr;
        register int    index;
        register int    s;
#if _UTS
   dev_t                        device = usr_routep->mrid;
#else
        int             device = usr_routep->mrid;
#endif
        register int    n = 1;
        MRR_PLT         oldpl = 0;

        if (!(new_entry = (struct mrr_route_info *) KMEM_ALLOC
            (sizeof(struct mrr_route_info), KM_NOSLEEP)))
                return (M_IOCNAK);
#if _UTS
        oldpl = RW_WRLOCK(mediap->media.med_rwlkp, plstr);
#else
        bzero((caddr_t) new_entry, sizeof(struct mrr_route_info));
#endif
        s = MRR_SETPL(s);
        index = MRHASH(device, nmrr_route);
        /* Make this the MAIN stream for loading routing table */
        mediap->index = DSFM_DAEMON;
        if ((mrr_routep = mrrhastbl[index]) == (struct mrr_route_info *) NULL) {
                mrrhastbl[index] = new_entry;
                dsf_enterroute(new_entry, usr_routep);
                new_entry->dr_chain = NULL;
                MRR_SPLX(s);
                MRR_RLS_MED_LOCK(mediap, oldpl);
                return (M_IOCACK);
        } else {
                /* There is already an entry */

                for (prv_mrr_routep = mrr_routep; mrr_routep;) {
                        if (mrr_routep->route_tbl.mrid == usr_routep->mrid) {
                                DSFLOG(device, "This  device is there...updating=%x\n", device);
```

© COPYRIGHT 1994 AMDAHL CORPORATION

```
                        KMEM_FREE(new_entry, sizeof(struct mrr_route_info));
                        dsf_enterroute(mrr_routep, usr_routep);
                        MRR_SPLX(s);
                        MRR_RLS_MED_LOCK(mediap, oldpl);
                        return (M_IOCACK);
                    }
                    DSFLOG(device, "There exists an entry in the hash table=%x\n", n);
                    n++;
                    prv_mrr_routep = mrr_routep;
                    mrr_routep = mrr_routep->dr_chain;
                }
                prv_mrr_routep->dr_chain = new_entry;
                dsf_enterroute(new_entry, usr_routep);
                new_entry->dr_chain = NULL;
                MRR_SPLX(s);
                MRR_RLS_MED_LOCK(mediap, oldpl);
                return (M_IOCACK);
        }
}

/*
 * dsf_enterroute: Enters the routing table into the array. The entry into
 * the array is first identified.
 */

STATIC void
dsf_enterroute(mrr_routep, mrr_route)
        register struct mrr_route_info *mrr_routep;
        register mrr_route_t *mrr_route;
{

        if (mrr_routep) {
                register mrr_route_t *rptr = &mrr_routep->route_tbl;

                rptr->mrid = mrr_route->mrid;
                bcopy(mrr_route->dev_name, rptr->dev_name, DRV_NAME_LENGTH);
                DSFLOG(0, "DRV=%s\n", rptr->dev_name);
                bcopy(mrr_route->media_value, rptr->media_value, MED_VALUE_SZ);

        } else
                DSFLOG(0,
                 "dsf_enterroute: a NULL entry for mrr_route_info=%x\n", 0);
}

/*
```

© COPYRIGHT 1994 AMDAHL CORPORATION

```
 * dsf_open_req sends a dsf_open_req message to the remote side. If the
 * message cannot be put then it puts it on the queue.
 */

STATIC int
dsf_open_req(mediap, oldpl)
        register media_obj_t *mediap;
        MRR_PLT         oldpl;
{
        register mblk_t *mp;
        register struct dsf_open_req *dsfoprq;


        if (!(mp = allocb(sizeof(struct dsf_open_req), BPRI_MED))) {
                DSFLOG(0,
                "DSF - could not allocate dsf_open_req buffer of size %x\n",
                        sizeof(struct dsf_open_req));
                MRR_RLS_MED_LOCK(mediap, oldpl);
                return (M_IOCNAK);
        }
        /* Now send the message to the Lower Mux Driver */
        dsfoprq = (struct dsf_open_req *) mp->b_rptr;
        /* No data conversion support */
        *(long *) dsfoprq->conv_flags = 0;
        dsfoprq->version = DSF_VERSION;
        bcopy(mediap->media.lower.id, dsfoprq->id, MAX_ID_LEN);
        mp->b_wptr = mp->b_rptr + sizeof(struct dsf_open_req);
        mediap->status |= DSF_WAIT_DSF_OPEN_RES;
        MRR_PUT_TO_MEDIA(mediap, mp, oldpl);
        return (M_IOCACK);
}

/*
 * dsf_open_reply: called when an M_DATA message is received. The message is
 * only received when the medium is in a transient state. On a failure, it
 * prints out a message and then waits for ever.
 */

STATIC int
dsf_open_reply(mediap, mp)
        register media_obj_t *mediap;
        register mblk_t *mp;
{
    register int value = 0;
    MRR_PLT oldpl = MRR_HLD_MED_RDLOCK(mediap, plstr);
```

© COPYRIGHT 1994 AMDAHL CORPORATION

```
        if (mediap->status & DSF_WAIT_DSF_OPEN_RES) {
                register struct dsf_open_resp *dsfop =
                (struct dsf_open_resp *) mp->b_rptr;

                if (dsfop->error_code) {
                        DSFLOG(dsfop, "DSF:DSFOPENRESP error=%x\n", dsfop->error_code);
                        goto  DSF_OPN_RPLY;
                }
                if (!dsf_chk_ver_conv(mediap, (char *) dsfop))
                        goto DSF_OPN_RPLY;
                mediap->error_code = dsfop->error_code;
                mediap->open_strms = dsfop->open_strms;
                mediap->dsf_reconn_count = 0;
                value = 1;
                goto  DSF_OPN_RPLY;
        } else {
                if (mediap->status & DSF_WAIT_DSF_OPEN_REQ) {
                        register struct dsf_open_req *dsfop =
                        (struct dsf_open_req *) mp->b_rptr;

                        /* Copy the ID */
                        bcopy(dsfop->id, mediap->media.lower.id, MAX_ID_LEN);
                        if (!dsf_chk_ver_conv(mediap, (char *) dsfop))
                                goto  DSF_OPN_RPLY;
                        MRR_RLS_MED_LOCK(mediap, oldpl);
                        (void) dsf_send_dsf_res(mediap);
                        oldpl = MRR_HLD_MED_RDLOCK(mediap, plstr);
                        mediap->status &= ~DSF_WAIT_DSF_OPEN_REQ;
                        mediap->status |= DSF_WAIT_DSF_OPEN_RES;
                        value = 1;
                        goto DSF_OPN_RPLY;
                } else {
                        DSFLOG(mediap, "SHOULD NOT BE IN THIS STATE =%x\n",
                                mediap->status);
                        goto DSF_OPN_RPLY;
                }
        }
DSF_OPN_RPLY:
   MRR_RLS_MED_LOCK(mediap, oldpl);
   return value;
}

/*
 * dsf_ready_media: Completes the whole sequence once a proper dsf open resp
```

© COPYRIGHT 1994 AMDAHL CORPORATION

```
 * is received. On any resource or bad response it sends an M_HANGUP
 */

void
dsf_ready_media(mdp, mp)
        register media_obj_t *mdp;
        register mblk_t *mp;
{
        /* This to be a dsf_open_res */
        register        s = MRR_SETPL(s);
        MRR_PLT oldpl;

        if (!dsf_open_reply(mdp, mp)) {
                DSFLOG(mdp->index, "Error in dsf_open_reply=%x\n", mdp->error_code);
                /* Just send a response and then close the media. At present we
                 * are the activator. No need to hold media lock.
                 */
                if (mdp->activator) {
                        (void) dsf_send_dsf_res(mdp);
                }
                /* Maybe send a M_HANGUP message up stream */
                if (mdp->urq->q_next)
                        MRR_PUTCTL(mdp->urq, M_HANGUP);
                MRR_SPLX(s);
                return;
        }
        if (mdp->activator && dsf_send_dsf_res(mdp)) {
           oldpl = MRR_HLD_MED_RDLOCK(mdp, plstr);
                if (mdp->error_code == DSF_OPEN_OK) {
                        mdp->status &= ~DSF_WAIT_DSF_OPEN_RES;
                        mdp->status |= DSF_XCHANGE;
                        if (mdp->stats.mrr_count) {
                        MRR_RLS_MED_LOCK(mdp, oldpl);
                                dsf_reconnect_xchg_req(mdp);
                        } else {
                                if (mdp->open_strms <= 0) {
                                        /*
                                         * Everthing is just fine No messages
                                         * to exchange
                                         */
                                        /* Finally ready for data transfer */
                                        mdp->status = DSF_MED_READY;
                                        /* Start timer to check Media is up */
                                        MRR_RLS_MED_LOCK(mdp, oldpl);
                                        dsf_start_dsf_keep_alive(mdp);
```

© COPYRIGHT 1994 AMDAHL CORPORATION

```
                        } else
                            MRR_RLS_MED_LOCK(mdp, oldpl);
                    }
                    MRR_SPLX(s);
                    return;
            } else {
                MRR_RLS_MED_LOCK(mdp, oldpl);
                    if (mdp->urq->q_next)
                            MRR_PUTCTL(mdp->urq, M_HANGUP);
                    MRR_SPLX(s);
                    return;
            }

    } else {
            MRR_SPLX(s);
            if (mdp->activator) {
                    DSFLOG(mdp->index, "Error in dsf_send_dsf_res=%x\n", mdp->index);
                    if (mdp->urq->q_next)
                            MRR_PUTCTL(mdp->urq, M_HANGUP);
                    return;
            }
            return;
    }
}

/*
 * dsf_send_dsf_res: sends a dsf open response to the remote side. This is in
 * positive response to a dsf open response send from the remote side.
 */
STATIC int
dsf_send_dsf_res(mediap)
        register media_obj_t *mediap;
{
        register mblk_t *mp;
        register struct dsf_open_resp *dsfop;
        MRR_PLT         oldpl;

#if _UTS
   oldpl = LOCK(dsf_obj_cmn_lkp, plstr);
#endif
        if (DSF_MEDIA_VALID(mediap)) {
#if _UTS
          UNLOCK(dsf_obj_cmn_lkp, oldpl);
#endif
                if (!(mp = allocb(sizeof(struct dsf_open_resp), BPRI_MED))) {
```

© COPYRIGHT 1994 AMDAHL CORPORATION

```
                if (!(mediap->bid = bufcall(sizeof(struct dsf_open_resp), BPRI_MED,
                                dsf_send_dsf_res, (long) mediap))) {
                        DSFLOG(0, "DSF:DSFOPENRESP: BUFCALL FAILURE\n",0);
                        return (0);
                } else {
                        return (1);
                }


        }
        oldpl = MRR_HLD_MED_RDLOCK(mediap, plstr);
        dsfop = (struct dsf_open_resp *) mp->b_rptr;

        if (mediap->version > DSF_VERSION) {
                dsfop->error_code = mediap->error_code =
                        DSF_VERSION_MISMATCH;
                mediap->status |= DSF_MED_VER_MISMATCH;

        } else {
                if (*(long *) mediap->conv_flags != DSF_VERSION) {
                        dsfop->error_code = mediap->error_code =
                                DSF_DATAREP_MISMATCH;
                        mediap->status |= DSF_MED_CONV_MISMATCH;
                } else {
                        dsfop->error_code = mediap->error_code = DSF_OPEN_OK;
                        dsfop->version = mediap->version;
                        (*(long *) dsfop->conv_flags) = *(long *) mediap->conv_flags;
                        dsfop->open_strms = mediap->stats.mrr_count;
                }
        }
        mp->b_wptr = mp->b_rptr + sizeof(struct dsf_open_resp);
        /* Finally send the response to a dsf_open_response */
        MRR_PUT_TO_MEDIA(mediap, mp, oldpl);
        return (1);
    }
#if _UTS
   UNLOCK(dsf_obj_cmn_lkp, oldpl);
#endif
        return (0);
}

/*
 * dsf_reconnect_xchg_req: Need to send a DSF_RECONN_REQ to the remote side
 * since we have some streams that were in a transient state
 */
```

© COPYRIGHT 1994 AMDAHL CORPORATION

```
STATIC void
dsf_reconnect_xchg_req(mediap)
        register media_obj_t *mediap;
{
        register short  index = mediap->xch_index;
        register mrr_element_t *mrrconptr = mediap->xch_con;
        register mblk_t *mp;
        register struct dsf_msg *rqp;
        register int    i, total_conn ;
        MRR_PLT         oldpl;

DSF_START:
#if _UTS
   oldpl = LOCK(dsf_obj_cmn_lkp, plstr);
#endif
        if (!DSF_MEDIA_VALID(mediap)) {
#if _UTS
       UNLOCK(dsf_obj_cmn_lkp, oldpl);
#endif
                return;
        }
#if _UTS
   UNLOCK(dsf_obj_cmn_lkp, oldpl);
#endif
   mediap->bid = 0; /* Maybe came thru bufcall */
        if (!(mp = allocb(sizeof(struct dsf_msg_header) +
                        sizeof(struct dsf_reconn_req), BPRI_MED))) {
                DSFLOG(mediap->index,
                      "DSF-could not allocate struct dsf_reconn_req buffer of size %x\n",
                      sizeof(struct dsf_reconn_req));
                if (!(mediap->bid = bufcall((sizeof(struct dsf_msg_header) +
                        sizeof(struct dsf_reconn_req)), BPRI_MED,
                                dsf_reconnect_xchg_req, mediap)))
                        DSFLOG(0,
                              "DSF - bufcall failed in dsf_reconnect_xchg_req=%x\n",
                              mediap->index);
                return;

        }
        rqp = (struct dsf_msg *) mp->b_rptr;
        rqp->header.type = (u_char) DSF_ADMIN;
        rqp->header.priority = (u_char) DSF_HI_PRI;
        rqp->header.len = sizeof(struct dsf_msg_header) +
                sizeof(struct dsf_reconn_req);
        rqp->header.dest_id = 0;
```

© COPYRIGHT 1994 AMDAHL CORPORATION

```
        rqp->header.seq = 0;
        rqp->header.src_id = 0;
        rqp->header.ack_req = 0;
        rqp->body.admin_msg.type = DSF_RECONN_REQ;
        i = total_conn = 0;
        if (!mrrconptr){
           mrrconptr = mediap->mrrcon[index++];
           mediap->xch_index = index;
        }
DSF_ASSOC:
        for (; mrrconptr && i < ASSOC_LIST_LEN; i++) {
                register int    j;

                rqp->body.admin_msg.dsf_reconn_req.assoc_list[i].loc_id =
                        (int) mrrconptr;
                rqp->body.admin_msg.dsf_reconn_req.assoc_list[i].rem_id =
                        (int) mrrconptr->remote.remote_queue_id;
                for (j = 0; j < DSF_PRIO_NUM; j++)
                        rqp->body.admin_msg.dsf_reconn_req.
                                assoc_list[i].last_seq_rec[j] =
                                mrrconptr->remote.rec_info.rcv_info[j].rec_seq;
                rqp->body.admin_msg.dsf_reconn_req.assoc_list[i].window =
                        mrrconptr->remote.rec_info.avail_win;
   mrrconptr = mrrconptr->mrr_next;

        }
        if (i < ASSOC_LIST_LEN && (index + 1) < MRCONNSZ) {
                mrrconptr = mediap->mrrcon[index++];
                mediap->xch_index = index;
                goto DSF_ASSOC;
        }
        /* Send the actual Numbers only */
        rqp->body.admin_msg.dsf_reconn_req.str_num = i;
        total_conn += i;
        if (total_conn) {
                /* Might as well send the total size */
                mp->b_wptr = mp->b_rptr + (sizeof(struct dsf_msg_header) +
                                        sizeof(struct dsf_reconn_req));
                oldpl = MRR_HLD_MED_RDLOCK(mediap, plstr);
                mediap->dsf_reconn_count++;
                /* No need to test just send */
                DSFMEDTRACE(mediap, mp, oldpl, DSFTOMEDIA);
                MRR_PUT_TO_MEDIA(mediap, mp, oldpl);
        } else
                freemsg(mp);
```

© COPYRIGHT 1994 AMDAHL CORPORATION

```
		/*
		 * If there are more stream ids to be exchanged then send
		 * them
		 */

	if (i >= ASSOC_LIST_LEN && (index + 1) < MRCONNSZ) {
		if (!(mediap->xch_con = mrrconptr)){
		   mrrconptr = mediap->mrrcon[index++];
		   mediap->xch_index = index;
		}
		goto DSF_START;
	}

	mediap->xch_con = (mrr_element_t *) 0;
   mediap->xch_index = 0;

}

/*
 * dsf_reconn_xchange: Receives either a request or a response from the
 * remote side.
 */
int
dsf_reconn_xchange(mdp, cur_msg_ptr)
	register media_obj_t *mdp;
	register struct dsf_msg *cur_msg_ptr;
{
	register int	count = 0;
	MRR_PLT oldpl;

	if (cur_msg_ptr->header.type == DSF_DATA) {
		DSFLOG(mdp->index, "reconn_xchange:received DSF_DATA pkt=%x\n",
		      mdp->index);
		return (-1);
	}
	if (cur_msg_ptr->header.type == DSF_ADMIN) {
		switch (cur_msg_ptr->body.admin_msg.type) {
		case DSF_RECONN_REQ:
			mdp->open_strms -= dsf_reconnect_xchg_rreq(mdp,
			      &cur_msg_ptr->body.admin_msg.dsf_reconn_req);
			count = sizeof(struct dsf_msg_header) +
				sizeof(struct dsf_reconn_req);
			if (mdp->dsf_reconn_count > 0 || mdp->open_strms > 0)
				return (count);
			break;
```

© COPYRIGHT 1994 AMDAHL CORPORATION

```
            case DSF_RECONN_RESP:
                    (void) dsf_reconnect_xchg_rres(mdp,
                        &cur_msg_ptr->body.admin_msg.dsf_reconn_resp);
                    count = sizeof(struct dsf_msg_header) +
                            sizeof(struct dsf_reconn_resp);
                    if (--mdp->dsf_reconn_count > 0 ||
                       mdp->open_strms > 0)
                            return (count);
                    break;
            default:
                    DSFLOG(mdp, "Got a bad type message when in DSF_XCHANGE \
              %x\n", cur_msg_ptr->header.type);
                    return (-1);
            }
    } else {
            DSFLOG(mdp, "Got bad header type  when in DSF_XCHANGE \
              %x\n", cur_msg_ptr->header.type);
            return (-1);
    }
    /* Enable queues  */
    /* Finally ready for data transfer */
    oldpl = MRR_HLD_MED_RDLOCK(mdp, plstr);
    mdp->status = DSF_MED_READY;
    MRR_RLS_MED_LOCK(mdp, oldpl);
    dsf_enableq(mdp);
    dsf_start_dsf_keep_alive(mdp);
    return (count);

}

/*
 * dsf_reconnect_xchg_rres: This is a response from the remote side. It is a
 * dsf_reconn_resp. It tries to go through the streams id without partners
 * and take appropriate action. In the open, close stage it will
 * wakeprocs((caddr_t) q, PRMPT) the process. In any other state it will put
 * it in a  MR_UPRDY state.
 */

STATIC int
dsf_reconnect_xchg_rres(mdp, dsfp)
        register media_obj_t *mdp;
        register struct dsf_reconn_resp *dsfp;
{
        register        count, i;
        register mrr_element_t *mrrp;
```

© COPYRIGHT 1994 AMDAHL CORPORATION

```
	if (dsfp->type != DSF_RECONN_RESP)
		return (0);
	count = dsfp->str_num;		/* Number of stream id's */
	for (i = 0; count--;) {

		/*
		 * Hopefully this is a direct index into the right
		 * mrr_element_t If not then we are in deep trouble
		 */
		mrrp = (mrr_element_t *) dsfp->no_partner_list[i++];
		if (mrr_validate(mrrp, mdp)) {
			mrrp->status = MR_NOREMOTE;
			if (mrrp->state & MR_SLEEPING) {
				MRR_WAKEUP(mrrp);
				MRR_UNLOCK(mrrp);
			} else {
				mrr_send_hangup(mrrp);
				MRR_UNLOCK_CLOSE(mrrp);
			}

		}
	}
	return (dsfp->str_num);
}

/*
 * dsf_reconnect_xchg_rreq: Routine to send a DSF_RECONN_RESP to the remote
 * side. The remote side has obviously send us a DSF_RECONN_REQ.
 */

STATIC int
dsf_reconnect_xchg_rreq(mdp, dsf_req)
	register media_obj_t *mdp;
	register struct dsf_reconn_req *dsf_req;
{
	register struct dsf_msg *dsf_res;
	register mrr_element_t *mrrp;
	register mblk_t *mps;
	register int	i, j;
	MRR_PLT		oldpl;

	if (!(mps = allocb(sizeof(struct dsf_msg_header) +
			sizeof(struct dsf_reconn_resp), BPRI_MED))) {
		DSFLOG(0,
			"DSF - could not allocate dsf_reconn_res buffer of size %x\n",
```

© COPYRIGHT 1994 AMDAHL CORPORATION

```
                sizeof(struct dsf_reconn_resp) + sizeof(struct dsf_msg_header));
        /* If there is already a resp just increment it */
        if (mdp->xrsbid) {
                mdp->xch_resp++;
                return (dsf_req->str_num);
        } else {
                if ((mdp->xrsbid = bufcall((sizeof(struct dsf_msg_header) +
                        sizeof(struct dsf_reconn_resp)), BPRI_MED,
                                dsf_recon_bufcall, mdp)))
                        mdp->xch_resp++;
                return (dsf_req->str_num);
        }

}
dsf_res = (struct dsf_msg *) mps->b_rptr;
dsf_res->header.type = (u_char) DSF_ADMIN;
dsf_res->header.priority = (u_char) DSF_NORMAL_PRI;
dsf_res->header.len = sizeof(struct dsf_msg_header) +
        sizeof(struct dsf_reconn_resp);
dsf_res->header.dest_id = 0;
dsf_res->header.seq = 0;
dsf_res->header.src_id = 0;
dsf_res->header.ack_req = 0;
dsf_res->body.admin_msg.type = DSF_RECONN_RESP;
for (i = j = 0; i < dsf_req->str_num; i++) {
        mrrp = (mrr_element_t *) dsf_req->assoc_list[i].rem_id;
        if (!mrr_validate(mrrp, mdp))
                /* No partner for stream */
                dsf_res->body.admin_msg.dsf_reconn_resp.
                        no_partner_list[j++] = dsf_req->assoc_list[i].loc_id;
        else {
            if (mrrp->remote.remote_queue_id != dsf_req->assoc_list[i].loc_id) {
                dsf_res->body.admin_msg.dsf_reconn_resp.
                        no_partner_list[j++] = dsf_req->assoc_list[i].loc_id;
                        MRR_UNLOCK(mrrp);
            } else {

                /*
                 * Update the information about window size and acked
                 * messages
                 */
                   register int    k;
                   register int    window;
                   register mblk_t *mpl;
```

© COPYRIGHT 1994 AMDAHL CORPORATION

```
                        for (k = 0; k < DSF_PRIO_NUM; k++)
                                mrr_upd_xmit_info(mrrp,
                                 dsf_req->assoc_list[i].last_seq_rec[k], k);
                        window = dsf_req->assoc_list[i].window;
                    /*
                     * Adjust window by number of bytes already sent, but
                     * not acked
                     */
                     mrrp->remote.send_info.cur_window = window -
                        mrrp->remote.send_info.non_acked_bytes;
                    mrr_update_xmit_window(mrrp);
                    MRR_UNLOCK(mrrp);
                }
            }
        }
        dsf_res->body.admin_msg.dsf_reconn_resp.str_num = j;
        /* Might as well send the total size */
        mps->b_wptr = mps->b_rptr + (sizeof(struct dsf_msg_header) +
                                sizeof(struct dsf_reconn_resp));
        oldpl = MRR_HLD_MED_RDLOCK(mdp, plstr);
        /* No need to test just send */
        MRR_PUT_TO_MEDIA(mdp, mps, oldpl);
        return (dsf_req->str_num);
}


/*
 * mrr_msg_length - Determines the length of a message.
 *
 */

int
mrr_msg_length(mp)
        register mblk_t *mp;
{
        register int    len = 0;

        while (mp != NULL) {
                len += (mp->b_wptr - mp->b_rptr);
                mp = mp->b_cont;
        }
        return (len);
}
```

© COPYRIGHT 1994 AMDAHL CORPORATION

```
/*
 * dsf_media_close: Send a media close(DSF_CHAN_CLOSE_REQ) for a graceful
 * disconnect of the media.
 */

STATIC int
dsf_media_close(mediap)
	register media_obj_t *mediap;
{
	register struct dsf_msg *dsf_close;
	register mblk_t *mp;
	MRR_PLT		oldpl;

#if _UTS
   oldpl = LOCK(dsf_obj_cmn_lkp, plstr);
#endif
	if (DSF_MEDIA_VALID(mediap)) {
#if _UTS
	   UNLOCK(dsf_obj_cmn_lkp, oldpl);
#endif
		if (!(mp = allocb(sizeof(struct dsf_msg_header) +
				sizeof(struct dsf_close_msg), BPRI_MED))) {
			if (!(mediap->bid = bufcall((sizeof(struct dsf_msg_header)
				+ sizeof(struct dsf_close_msg)), BPRI_MED,
					dsf_media_close, (long) mediap)))
				return (0);
			else
				return (1);
		}
		dsf_close = (struct dsf_msg *) mp->b_rptr;
		mp->b_wptr +=
			(sizeof(struct dsf_msg_header) + sizeof(struct dsf_close_msg));
		dsf_close->header.type = (u_char) DSF_ADMIN;
		dsf_close->header.priority = (u_char) DSF_NORMAL_PRI;
		dsf_close->header.len = sizeof(struct dsf_msg_header) +
			sizeof(struct dsf_close_msg);
		dsf_close->header.dest_id = 0;
		dsf_close->header.seq = 0;
		dsf_close->header.src_id = 0;
		dsf_close->header.ack_req = 0;
		dsf_close->body.admin_msg.type = DSF_CHAN_CLOSE_REQ;
		oldpl = MRR_HLD_MED_RDLOCK(mediap, plstr);
		mediap->status |= DSF_CLOSE_SEND;
		MRR_PUT_TO_MEDIA(mediap, mp, oldpl);
		return (1);
```

© COPYRIGHT 1994 AMDAHL CORPORATION

```
        }
#if _UTS
   UNLOCK(dsf_obj_cmn_lkp, oldpl);
#endif
        return (0);
}

/*
 * dsf_free_route: This frees the routing table entries
 */

STATIC void
dsf_free_route()
{
        register int    i = 0;
        register mrr_route_info_t *mrr_rp;
        register mrr_route_info_t *prv, *nxt;
        MRR_PLT         oldpl;

#if _UTS
        oldpl = LOCK(dsf_obj_cmn_lkp, plstr);
#endif
        while (i < nmrr_route) {
                while (mrr_rp = mrrhastbl[i]) {
                        prv = nxt = mrr_rp;
                        while (nxt->dr_chain) {
                                prv = nxt;
                                nxt = nxt->dr_chain;
                        }
                        KMEM_FREE(nxt, sizeof(mrr_route_info_t));
                        if (prv == nxt)
                                mrrhastbl[i] = (mrr_route_info_t *) 0;
                        else
                                prv->dr_chain = (mrr_route_info_t *) 0;
                }
                mrr_rp = mrrhastbl[++i];
        }
#if _UTS
        UNLOCK(dsf_obj_cmn_lkp, oldpl);
#endif
}

/* dsf_chk_ver_conv: Checks to see if the version of the remote DSF Matches
 * the one we have. Note that the media locks are held.
 */
```

© COPYRIGHT 1994 AMDAHL CORPORATION

```
STATIC int
dsf_chk_ver_conv(mediap, ptr)
        register media_obj_t *mediap;
        register char  *ptr;
{
        if (mediap->status & DSF_WAIT_DSF_OPEN_RES) {
                register struct dsf_open_resp *dsfop = (struct dsf_open_resp *) ptr;

DSF_CHK:
                if ((mediap->version = dsfop->version) > DSF_VERSION) {
                        DSFLOG(0, "bad version received=%x\n", dsfop->version);
                        return (0);
                }
                if ((*(long *) mediap->conv_flags = *(long *) dsfop->conv_flags) !=
                    DSF_VERSION) {
                        DSFLOG(0, "bad conversion received =%x\n",
                                *(int *) dsfop->conv_flags);
                        return (0);
                }
                return (1);
        } else {
                register struct dsf_open_req *dsfop = (struct dsf_open_req *) ptr;

                goto DSF_CHK;
        }
}

/*
 * dsf_send_close: Send a media close request to a remote side. If fails send
 * a nak
 */

STATIC void
dsf_send_close(mediap)
        register media_obj_t *mediap;
{
        if (mediap->status & (DSF_MED_READY | DSF_XCHANGE)) {
                if (!dsf_media_close(mediap))
                        DSFLOG(mediap, "Error in sending DSF_CLOSE_REQ=0\n",0);
        }
}


/*
 * dsf_recon_bufcall: Is a buffcall for sending response to remote side
```

© COPYRIGHT 1994 AMDAHL CORPORATION

```
 *
 */

STATIC void
dsf_recon_bufcall(mdp)
        register media_obj_t *mdp;
{
        register struct dsf_msg *dsf_res;
        register mblk_t *mps;
        MRR_PLT         oldpl;

DSFMRXRS:
        if (!(mps = allocb(sizeof(struct dsf_msg_header) +
                        sizeof(struct dsf_reconn_resp), BPRI_MED))) {
                DSFLOG(0,
                        "DSF - could not allocate dsf_reconn_res buffer of size %d\n",
                        sizeof(struct dsf_reconn_resp) + sizeof(struct dsf_msg_header));
                if (!(mdp->xrsbid = bufcall((sizeof(struct dsf_msg_header) +
                                sizeof(struct dsf_reconn_resp)), BPRI_MED,
                                        dsf_recon_bufcall, mdp)))
                        DSFLOG(0,
                                "DSF - bufcall failed in dsf_reconnect_xchg_rreq=%d\n",
                                mdp->index);
                return;

        }
        dsf_res = (struct dsf_msg *) mps->b_rptr;
        dsf_res->header.type = (u_char) DSF_ADMIN;
        dsf_res->header.priority = (u_char) DSF_NORMAL_PRI;
        dsf_res->header.len = sizeof(struct dsf_msg_header) +
                sizeof(struct dsf_reconn_resp);
        dsf_res->header.dest_id = 0;
        dsf_res->header.seq = 0;
        dsf_res->header.src_id = 0;
        dsf_res->header.ack_req = 0;
        dsf_res->body.admin_msg.type = DSF_RECONN_RESP;
        dsf_res->body.admin_msg.dsf_reconn_resp.str_num = 0;
        mps->b_wptr = mps->b_rptr + (sizeof(struct dsf_msg_header) +
                                sizeof(struct dsf_reconn_resp));
        /* No need to test just send */
        oldpl = MRR_HLD_MED_RDLOCK(mdp, plstr);
        MRR_PUT_TO_MEDIA(mdp, mps, oldpl);

        if (--mdp->xch_resp)
                goto DSFMRXRS;
```

© COPYRIGHT 1994 AMDAHL CORPORATION

```
}

/*
 * dsf_trace_remove: The queue has been used for tracing and is being closed.
 */

STATIC void
dsf_trace_qremove(qp)
        register queue_t *qp;
{
        register media_obj_t *mediap;
        dev_t           minore = 0;
        MRR_PLT         oldpl, oldpl1;
#if _UTS
        oldpl = LOCK(dsf_obj_cmn_lkp, plstr);
#endif
        mediap = mrr_mediahp[minore];
        while (minore < nmrr_media) {
                mediap = mrr_mediahp[minore++];
                if (mediap && mediap->urtrq == qp) {
#if _UTS
                        oldpl1 = LOCK(mediap->media.tr_lkp, oldpl);
#endif
                        mediap->urtrq = (queue_t *) NULL;
#if _UTS
                        UNLOCK(mediap->media.tr_lkp, oldpl1);
#endif
                }
        }
#if _UTS
                UNLOCK(dsf_obj_cmn_lkp, oldpl);
#endif

}
/*
 * dsf_set_trace_med:Search for the id name and turn that trace queue on or
 * off.
 *
 */

STATIC int
dsf_set_trace_med(qp, mp)
        register queue_t *qp;
        register mblk_t *mp;
{
```

© COPYRIGHT 1994 AMDAHL CORPORATION

```
        register media_obj_t *mediap;
        dev_t           minore = 0;
        MRR_PLT         oldpl;
#if _UTS
        oldpl = LOCK(dsf_obj_cmn_lkp, plstr);
#endif
        if (mp) {
                while (minore < nmrr_media) {
                        if ((mediap = mrr_mediahp[minore++])) {
                                register char  *md_name = mediap->media.lower.media_value;

                                if (mrr_media_value_cmp(md_name, mp->b_rptr)) {
                                        if (qp && mediap->urtrq) {
#if _UTS
                                                UNLOCK(dsf_obj_cmn_lkp, oldpl);
#endif
                                                return (0);     /* No two opens */
                                        } else {
                                            if ( mediap->status != DSF_MED_CLOSING) {
                                                mediap->urtrq = qp;
                                                mediap->trc_count[DSFFROMMEDIA] =
                                                        mediap->trc_count[DSFTOMEDIA] = 0;
                                            } else
                                                continue;
                                        }
#if _UTS
                                        UNLOCK(dsf_obj_cmn_lkp, oldpl);
#endif
                                        return (1);
                                }
                        }
                }
#if _UTS
                UNLOCK(dsf_obj_cmn_lkp, oldpl);
#endif
        }
        return (0);

}

STATIC int
dsf_lrput(qp, mp)
        register queue_t *qp;
        register mblk_t *mp;
{
```

© COPYRIGHT 1994 AMDAHL CORPORATION

```
        register media_obj_t *mdp;
        MRR_PLT oldpl;

        if (!(mdp = dsf_chk_if_media_valid(qp->q_ptr))) {
           freemsg(mp);
           return 0;
        }
        switch (mp->b_datap->db_type) {
        case M_DATA:
                dsf_route_data(mdp, mp);
                break;
        case M_HANGUP:
                /*
                 * convert to an M_PROTO message and send up stream
                 * signifying that an M_HANGUP has been received.
                 */
                dsf_chk_snd_medhangup_toadmin(mdp);
                break;
        default:
                /* Only M_HANGUP expected, send to admin stream  */
                if (mdp->urq)
                        putnext(mdp->urq, mp);
                else
                        freemsg(mp);
                break;
        }
        return (1);
}

/*
 * dsf_lwsrv:   If called , then just send the message Empty out the queue.
 */

STATIC int
dsf_lwsrv(qp)
        register queue_t *qp;
{
        register media_obj_t *medp;
        register mblk_t *mp;
        register        s = MRR_SETPL(s);
        MRR_PLT         oldpl;

    if (!(medp = dsf_chk_if_media_valid(qp->q_ptr))) {
            return 0;
         }
```

© COPYRIGHT 1994 AMDAHL CORPORATION

```
        /*
         * At the end check to see if the upper queues have been blocked If
         * so qenable them
         */
        /*
         * try to enable the upper queues, If they are blocked
         *
         */
        while ((mp = getq(qp)) != NULL) {
                oldpl = MRR_HLD_MED_RDLOCK(medp, plstr);
                MRR_PUT_TO_MEDIA(medp, mp, oldpl);

        }
        MRR_SPLX(s);
        return (0);
}

/*
 * dsf_check_alive - Check whether media is still alive. If no message has
 * been received in the last time interval send out a keep alive message to
 * demand a response. If no message has been received in the last three time
 * intervals assume medium is dead and set status. Yes there is a possibility
 * that the media still goes away after the validation. Bad luck!!!.
 */


STATIC void
dsf_check_alive(mdp)
        register media_obj_t *mdp;
{
        uint    lbolt = 0;
        MRR_PLT    oldpl;

        /* If media is not valid then just return */
#if _UTS
   oldpl = LOCK(dsf_obj_cmn_lkp, plstr);
#endif
        if (!DSF_MEDIA_VALID(mdp)) {
#if _UTS
      UNLOCK(dsf_obj_cmn_lkp, oldpl);
#endif
                return;
        }
#if _UTS
   UNLOCK(dsf_obj_cmn_lkp, oldpl);
```

© COPYRIGHT 1994 AMDAHL CORPORATION

```
        oldpl = MRR_HLD_MED_RDLOCK(mdp, plstr);
#endif
        if (!(mdp->status & DSF_MED_READY)) {
                mdp->keepalive = 0;
                MRR_RLS_MED_LOCK(mdp, oldpl);
                return;
        }

#if _UTS
   MRR_RLS_MED_LOCK(mdp, oldpl);
        drv_getparm((unsigned long) TIME, &lbolt);
#else
        {
                extern time_t   time;
                lbolt = time;
        }
#endif
        if ((lbolt - mdp->stats.last_msg_time) > DSFINTERVAL) {
                if (lbolt - mdp->stats.last_msg_time > 2 * DSFINTERVAL) {
                        if ((lbolt - mdp->stats.last_msg_time) > (3 * DSFINTERVAL) &&
                           mdp->missed_keepalive > 1) {
                                /*
                                 * Set status of all element on that media to
                                 * down
                                 */
                                oldpl = MRR_HLD_MED_RDLOCK(mdp, plstr);
                                mdp->status &= ~DSF_MED_READY;
                                mdp->status |= DSF_KEEP_ALIVE_FAILED;
                                MRR_RLS_MED_LOCK(mdp, oldpl);
                                dsf_dis_all_mrr_q(mdp);
                                /* Send a Media down to admin */
                                dsf_snd_meddown_toadmin(mdp);
                                mdp->keepalive = 0;
                                return;
                        }
                        mdp->missed_keepalive++;
                }
                dsf_send_keepalive(mdp, DSF_KEEPALIVE_REQ);
                mdp->keepalive = MRR_TIMEOUT(dsf_check_alive, (caddr_t) mdp,
                                        DSFKEEPALIVE );
        } else {
                mdp->missed_keepalive = 0;
                mdp->keepalive = MRR_TIMEOUT(dsf_check_alive, (caddr_t) mdp,
                                        DSFKEEPALIVE );
        }
```

© COPYRIGHT 1994 AMDAHL CORPORATION

```
}

/*
 * dsf_send_keepalive - Send a keepalive request or response.
 */
STATIC void
dsf_send_keepalive(mdp, msg_type)
        register media_obj_t *mdp;
        int             msg_type;
{
        register struct dsf_msg *kp_alv_msg_ptr;
        register mblk_t *kp_alv_mp = allocb(sizeof(struct dsf_msg_header)
                                + sizeof(struct dsf_keepalive), BPRI_MED);
        MRR_PLT         oldpl = 0;

        if (kp_alv_mp == NULL) {
                /* Could not allocate message buffer */
                /* May be next time we have better luck */
                return;
        }
        kp_alv_msg_ptr = (struct dsf_msg *) kp_alv_mp->b_rptr;
        kp_alv_mp->b_wptr += (sizeof(struct dsf_msg_header)
                        + sizeof(struct dsf_keepalive));
        kp_alv_msg_ptr->header.type = DSF_ADMIN;
        kp_alv_msg_ptr->header.priority = DSF_HI_PRI;
        kp_alv_msg_ptr->header.ack_req = 0;
        kp_alv_msg_ptr->header.fragm = 0;
        kp_alv_msg_ptr->header.len = sizeof(struct dsf_msg_header)
                + sizeof(struct dsf_keepalive);
        kp_alv_msg_ptr->header.dest_id = 0;
        kp_alv_msg_ptr->header.src_id = 0;
        kp_alv_msg_ptr->header.seq = 0;
        kp_alv_msg_ptr->body.admin_msg.type = msg_type;
        oldpl = MRR_HLD_MED_RDLOCK(mdp, plstr);
        if (mdp->status & DSF_MED_READY) {
        /* send it to trace  queue */
           DSFMEDTRACE(mdp, kp_alv_mp, oldpl, DSFTOMEDIA);
                MRR_PUT_TO_MEDIA(mdp, kp_alv_mp, oldpl);
        } else {
           MRR_RLS_MED_LOCK(mdp, oldpl);
                freemsg(kp_alv_mp);
        }

}
```

170

© COPYRIGHT 1994 AMDAHL CORPORATION

```
/*
 * dsf_snd_meddown_toadmin: Send AN M_PROTO message to admin saying that
 * media is down(maybe temporarily) and to to the appropriate thing.
 * dsf_obj_cmn_lkp Lock held on entry released on exit
 */

STATIC void
dsf_snd_meddown_toadmin(mdp)
        register media_obj_t *mdp;
{
        register mblk_t *mp;
        register dsf_med_down_t *dsf_med_down_p;

        if (!(mp = allocb(sizeof(dsf_med_down_t), BPRI_MED))) {
                if (bufcall(sizeof(dsf_med_down_t), BPRI_MED,
                        dsf_chk_snd_meddown_toadmin, mdp)) {
                        return;
                } else {
                        DSFLOG(0, "bufcall failure on dsf_snd_meddown_toadmin=%x\n",mdp);

                        return;
                }
        }
        mp->b_datap->db_type = M_PROTO;
        dsf_med_down_p = (dsf_med_down_t *) mp->b_rptr;
        dsf_med_down_p->type = DSF_MED_DOWN;
        mp->b_wptr = mp->b_rptr + sizeof(dsf_med_down_t);

        if (mdp && mdp->urq)
                putnext(mdp->urq, mp);
        else
                freemsg(mp);

}
/*
 * dsf_chk_snd_meddown_toadmin: Send AN M_PROTO message to admin saying that
 * media is down(maybe temporarily) and to do the appropriate thing.
 * Called from bufcall make sure media ia up.
 */
STATIC void dsf_chk_snd_meddown_toadmin(mdp)
        register media_obj_t *mdp;
{
   MRR_PLT oldpl;
#if _UTS
```

© COPYRIGHT 1994 AMDAHL CORPORATION

```
   oldpl = LOCK(dsf_obj_cmn_lkp, plstr);
#endif
        if (!DSF_MEDIA_VALID(mdp)) {
#if _UTS
      UNLOCK(dsf_obj_cmn_lkp, oldpl);
#endif
                return;
        }
#if _UTS
      UNLOCK(dsf_obj_cmn_lkp, oldpl);
#endif
   dsf_snd_meddown_toadmin(mdp);
}

/* dsf_start_dsf_keep_alive: Used for checking if media is up/down
 */

STATIC void
dsf_start_dsf_keep_alive(mdp)
        register media_obj_t *mdp;
{
#if _UTS
        drv_getparm((unsigned long) TIME, &mdp->stats.last_msg_time);
#else
        {
                extern time_t   time;
                mdp->stats.last_msg_time = time;
        }
#endif
        /* Check if there is a race condition existing, if a timeout is there
         * This can be eliminated if the daemon makes sure that the request
         * for bringing media up is done after 2 * DSFKEEPALIVE
         */
        if (!mdp->keepalive)
                mdp->keepalive = MRR_TIMEOUT(dsf_check_alive, (caddr_t) mdp,
                                        DSFKEEPALIVE );

}

/*
 * dsf_snd_medhangup_toadmin: Send AN M_PROTO message to admin saying that
 * media is down and it should exit.
 */

STATIC void
```

© COPYRIGHT 1994 AMDAHL CORPORATION

```
dsf_snd_medhangup_toadmin(mdp)
        register media_obj_t *mdp;
{
        register mblk_t *mp;
        register dsf_med_hangup_t *dsf_med_hangup;

        if (!(mp = allocb(sizeof(dsf_med_hangup_t), BPRI_MED))) {
                if (bufcall(sizeof(dsf_med_hangup_t), BPRI_MED,
                            dsf_chk_snd_medhangup_toadmin, mdp)) {
                        return;
                } else {
                        DSFLOG(0, "bufcall failure on dsf_snd_meddown_toadmin=%x\n",mdp);
                        return;
                }
        }
        mp->b_datap->db_type = M_PROTO;
        dsf_med_hangup = (dsf_med_hangup_t *) mp->b_rptr;
        dsf_med_hangup->type = DSF_MED_HANGUP;
        mp->b_wptr = mp->b_rptr + sizeof(dsf_med_hangup_t);
        if (mdp)
                putnext(mdp->urq, mp);
        else
                freemsg(mp);

}

/*
 * dsf_chk_snd_medhangup_toadmin: Send AN M_PROTO message to admin saying
 * that media is down and it should exit. Because via bufcall check if media
 * still there.
 */
STATIC void
dsf_chk_snd_medhangup_toadmin(mdp)
        register media_obj_t *mdp;
{
   MRR_PLT oldpl;
#if _UTS
   oldpl = LOCK(dsf_obj_cmn_lkp, plstr);
#endif
        if (!DSF_MEDIA_VALID(mdp)) {
#if _UTS
      UNLOCK(dsf_obj_cmn_lkp, oldpl);
#endif
                return;
        }
```

© COPYRIGHT 1994 AMDAHL CORPORATION

```
#if _UTS
   UNLOCK(dsf_obj_cmn_lkp, oldpl);
        oldpl = RW_WRLOCK(mdp->media.med_rwlkp, plstr);
#endif
 /* Already send an Hangup  Or no need to send */
   if ( mdp->status & DSF_MED_UNLINKED) {
      MRR_RLS_MED_LOCK(mdp, oldpl);
      return;
   }
   mdp->status = DSF_MED_UNLINKED;
   MRR_RLS_MED_LOCK(mdp, oldpl);

   dsf_snd_medhangup_toadmin(mdp);
}


/* dsf_rsrv: Send trace messages to the given trace stream
 */
STATIC int
dsf_rsrv(q)
      queue_t *q;
{
      mblk_t *mp;
      register s;

      s = splstr();
      while (mp = getq(q)) {
            if (!canput(q->q_next)) {
                  putbq(q, mp);
                  break;
            }
            putnext(q, mp);
      }
      splx(s);
      return(0);
}

/*  dsf_chk_if_media_valid: Check to see if it is okay to use media for
 *  communication.
 */

media_obj_t *dsf_chk_if_media_valid(index)
   register int index;
{
   MRR_PLT oldpl;
```

© COPYRIGHT 1994 AMDAHL CORPORATION

```
    register media_obj_t *mdp;

#if _UTS
        oldpl = RW_RDLOCK(mrr_mediahp_rwlkp, plstr);
#endif
        if (index < 0 || index >= nmrr_media ||
           (mdp = mrr_mediahp[index]) == (media_obj_t *)NULL ||
           mdp->status == DSF_MED_CLOSING) {
                DSFLOG(0,"***Media Absent***=%x", index);
#if _UTS
       RW_UNLOCK(mrr_mediahp_rwlkp, oldpl);
#endif
       return (media_obj_t *)NULL;
        }
#if _UTS
   RW_UNLOCK(mrr_mediahp_rwlkp, oldpl);
#endif
   return mdp;
}
```

© COPYRIGHT 1994 AMDAHL CORPORATION

```
#ident "@(#)/usr/src/amdahl/cmd/4655/vcs4/dsf/daemon/chan/med_support.c  11.5 4/21/93 12:54:15"
/* */

#include <stdio.h>
#include <sys/types.h>
#include <sys/fcntl.h>
#include <poll.h>
#include <errno.h>
#include <stropts.h>
#include <sys/ioctl.h>
#include <dsf/dsf.h>
#include <dsf/mirror.h>

#define POLLTIME    1000    /* This is 1 sec */

#ifdef DEBUG
#define DEBUG0(s)  printf(s)
#define DEBUG1(s,a1)  printf(s,a1)
#else
#define DEBUG0(s)
#define DEBUG1(s,a1)
#endif

extern int errno;
void send_dsf_close(), terminate(), sndmsg_console(), logtime();
int send_attach(), waitfor_ack(), send_media_type(), dsf_close_resp();
int chk_admin_msgs();

/* Send the attach request as an M_PROTO type message. On failure returns
 * a -1 else a 0.
 */
int send_attach(fd, att_req, len)
   int fd;
   char *att_req;
   int len;

{
   struct strbuf ctlbuf;

   ctlbuf.len = len;
   ctlbuf.buf = att_req;
   if (putmsg(fd, &ctlbuf, (char *) 0, 0) < 0) {
        return (-1);
   }
   return (0);
```

© COPYRIGHT 1994 AMDAHL CORPORATION

```
}

/* Will  poll the driver for a response for the attach request.
 * check_attach_resp is a function which will check for media attach response.
 * If the resposneis okay it should return a positive number.
 * Will wait  for  time secs before declaring failure
 */

int waitfor_ack(fd, check_attach_resp, time)
   int fd;
   int (*check_attach_resp) ();
   int time;
{
   struct pollfd pollfds[1];
   int result;

   pollfds[0].fd = fd;
   pollfds[0].events = POLLIN;
   pollfds[0].revents = 0;


   while ((result = poll(pollfds, 1, time)) < 0) {
        if (errno == EAGAIN || errno == EINTR)
           continue;
        else {
           DEBUG1("poll failed: %d\n", errno);
           return (-1);
        }
   }


   /* check returned events on the admin */

   /* quit if we receive POLLERR or POLLNVAL messages */
   if (pollfds[0].revents & (POLLERR | POLLNVAL)) {
        DEBUG1("POLLERR or POLLNVAL message received on media, \
                pollval = 0x%x\n", pollfds[result].revents);
        return (-1);
   }
   if (pollfds[0].revents & POLLHUP) {
        DEBUG0("Hangup received on media\n");
        return (-1);
   }
   if (pollfds[0].revents & POLLIN) {
        if ((*check_attach_resp) (fd) < 0)
```

© COPYRIGHT 1994 AMDAHL CORPORATION

```
            return (-1);
        else
            return (0);
    }
    if (pollfds[0].revents == 0)
        DEBUG0("Timeout no event...\n");
    return (-1);
}

int send_media_type(fd, lowercomm)
    int fd;
    register usr_media_obj_t *lowercomm;
{

    struct strioctl ioc;

    ioc.ic_cmd = MR_COMM;
    ioc.ic_timout = -1;
    ioc.ic_len = sizeof(usr_media_obj_t);
    ioc.ic_dp = (char *) lowercomm;
    return (ioctl(fd, I_STR, (char *) &ioc));
}

void sndmsg_console(str, val)
    char *str;
    int val;
{
    FILE *fd;

    if ((fd = fopen("/dev/console", "w")) == (FILE *) NULL) {
        perror("open on console failed");
        return;
    }
    fprintf(fd, str, val);
    fflush(fd);
    fclose(fd);
}

void terminate()
{
    /* Send a DSF_CLOSE Request to remote side before exiting */
    /* Make sure that fd is file desriptor to /dev/dsf */
    extern int fd;

    if (fd != -1) {
```

© COPYRIGHT 1994 AMDAHL CORPORATION

```
        /* Send DSF_CLOSE_REQ and wait for reply */
        send_dsf_close(fd);
        close(fd);
        fd = -1;
    }
    exit(2);
}

static int dsf_close_resp(fd)
{
    struct strbuf ctlbuf;
    int flag = 0;
    struct dsf_close_msg dsf_cl_msg;

    ctlbuf.maxlen = sizeof(struct dsf_close_msg);
    ctlbuf.len = 0;
    ctlbuf.buf = (char *) &dsf_cl_msg;

    if (getmsg(fd, &ctlbuf, NULL, &flag) >= 0) {
        DEBUG1("DSF_RESP:dsf_cl_msg.type=%x\n", dsf_cl_msg.type);
        return (0);
    }
    DEBUG0("Error in receiving DSF_RESP\n");
    return (-1);
}

static void send_dsf_close(fd)
    register int fd;
{
    struct dsf_close_msg dsf_cl_msg;
    struct strbuf ctlbuf;

    dsf_cl_msg.type = DSF_CHAN_CLOSE_REQ;
    ctlbuf.len = sizeof(struct dsf_close_msg);
    ctlbuf.buf = (char *) &dsf_cl_msg;
    if (putmsg(fd, &ctlbuf, (char *) 0, 0) < 0) {
        DEBUG0("Failure in sending DSF_CHAN_CLOSE_REQ\n");
        return;
    }
    if (waitfor_ack(fd, dsf_close_resp, (30 * POLLTIME)) == -1) {
        DEBUG0("NO RESP...\n");
    }
    return;
}
```

© COPYRIGHT 1994 AMDAHL CORPORATION

```
int chk_admin_msgs(fd, msg, no, logfd)
   register int fd;
   char *msg;
   int no;
   FILE *logfd;

{
   struct strbuf ctlbuf;
   union dsf_admin dsf_msg;
   int flag = 0;

   ctlbuf.maxlen = sizeof(union dsf_admin);
   ctlbuf.len = 0;
   ctlbuf.buf = (char *) &dsf_msg;

   if (getmsg(fd, &ctlbuf, NULL, &flag) >= 0) {
        switch (dsf_msg.type) {
        case DSF_MED_HANGUP:
            logtime(logfd);
            fprintf(logfd, "Media driver send an Hangup...\n");
            fflush(logfd);
            sleep(MRR_SLEEPTIME);
            return (DSF_MED_HANGUP);
        case DSF_MED_DOWN:
            logtime(logfd);
            fprintf(logfd, "Media down received from  DSF driver...\n");
            fflush(logfd);
            return (DSF_MED_DOWN);
        case DSF_CLOSE_RESP:
            logtime(logfd);
            fprintf(logfd, " DSF_CLOSE_RESP received from remote side \n");
            fflush(logfd);
            /* Graceful exit */
            sleep(2); /* Wait for message to be seen  */
            return (0);
        default:
            return (0);
        }
   }
   fprintf(logfd, "Error in receiving \n");
   return (0);

}
```

© COPYRIGHT 1994 AMDAHL CORPORATION

```
void logtime(logfd)
FILE  *logfd;
{
        char    *ctime();
        long    time();
        static char stamp[512];
        long    clock;
        char    *s;

        clock = time((long *)0);
        s = ctime(&clock);
        s[19] = '\0';
        (void)sprintf(stamp, "%s \t",&s[4]);
        fprintf(logfd,"%s", stamp);

}
```

© COPYRIGHT 1994 AMDAHL CORPORATION

```
#ident "@(#)/usr/src/uts/uts/io/4655/dsf/mirror.c      11.14 6/14/93 09:03:02 - (c) Copyright 1988,
1993 Amdahl Corporation"
/* */
/*
 * mirror.c Will provide UTS4.0 clients and SVR3.2 clients with the
 * capability of talking with the actual drivers running in the remote DSF
 * environment. The actual driver has to be ported to the remote environment.
 * At present, the DSF on the host side acts as an activator, starting of the
 * DSF exchanges needed to allow the mirror driver to act on behalf of all
 * drivers running in the remote environment. The dsfdrv.c takes care of
 * bringing the media up and monitoring it . The driver is MP and makes all
 * application feel as if it is talking to the actual driver. The host driver
 * is a simple program containing the information about struct streamtab.
 *
 */

#ifndef KERNEL
#define KERNEL
#endif

#include "mirror.h"

#ifndef STATIC
#define STATIC
#endif

#define MRTIME      (10 *HZ)
#define MRCLTIME (6 * MRTIME)
#define MRR_MOD_RT(q) ((mrr_route_info_t *)((mrr_element_t *)(q->q_ptr))->route)
#define MRROPN(s) ((s == MODOPEN) ? \
            sizeof(struct r_push_req):sizeof(struct r_open_req))
#define MRRCLOSE(s) ((s == MODOPEN) ? \
            sizeof(struct r_pop_req):sizeof(struct r_close_req))
#define MRRLINK(cmd) (((cmd == I_LINK) || (cmd == I_PLINK)) ? \
               sizeof(struct r_link_req):sizeof(struct r_unlink_req))
#define   MRRLOG(sid,s,a1)   if (mrr_debug) \
                 (void)strlog(MRR_MID,sid,0,SL_TRACE,s,a1);


#if _UTS
#define MRR_ASSERT(m)      { \
                        if (!m) { \
                     MRRLOG((m), "Element disappeared %d \n",0); \
                     return; \
                   } \
```

© COPYRIGHT 1994 AMDAHL CORPORATION

```
                              }

#define MRR_PUT_PRI(m,mrrp)         \
        if (mrrp->remote.send_info.xmit_info[mrrp->pri].xmit_msg || \
      mrrp->remote.send_info.xmit_info[mrrp->pri].to_send_list) \
      (m)->b_band = mrrp->pri; \
   else \
      (m)->b_band = DSF_HI_PRI;
#define MRR_CHK_MEDQ(m,q,mdp)           0

/*
 * ((q)->q_first || \ (((m)->b_datap->db_type <= QPCTL \ &&
 * !MRR_BCANPUT(q,(m)->b_band)) && \ !(mdp->status & DSF_MED_READY)))
 */
#define MRRCHKUPQ(m,q)            ((m)->b_datap->db_type <= QPCTL  \
                          && !MRR_BCANPUT(q,(m)->b_band))
#define MD_UPD_STATS(md)          { \
                          (void)(drv_getparm((unsigned long)TIME, \
                          &((md)->stats.last_msg_time))); \
                          (md)->stats.no_of_mssg++; \
                          }
#define MRR_SLEEP_LK(m)           LOCK((m)->lkp, plstr)
#define MRR_SND_UNLOCK(m)    { \
                         (m)->seq_msg_being_send = 1; \
                              MRR_UNLOCK(m); \
                                  }
#define MRR_CLS_UNLOCK(m)    { \
                         (m)->wait_on_close = 1; \
                              MRR_UNLOCK(m); \
                                  }
#define MRR_LOCK_SND(m) { \
                                          register queue_t *qp; \
                                                 MRR_LOCK(m, plstr);  \
                                                 qp= WR((m)->urqptr); \
                                                 (m)->seq_msg_being_send = 0;
\
                                                 if (qp->q_first) \
                                                    qenable(qp); \
                                          }

#define MRR_LOCK_CLS(m) { \
                                                 MRR_LOCK(m, plstr);  \
                                                 (m)->wait_on_close = 0; \
                                          }
```

© COPYRIGHT 1994 AMDAHL CORPORATION

```
#define MRR_ALRDY_SNDING(m)   (m)->seq_msg_being_send
#define MRR_IS_MSG_BEING_SND_TO_USR(m)    (m)->msg_being_rcv
#define MRR_SENDING_MSG_TO_USR(mrrp)      { \
                                                        (mrrp)->msg_being_rcv
= 1; \
                                                MRR_UNLOCK(mrrp); \
                                              }
#define MRR_SND_MSG_TO_USR(mrrp)     { \
                                                            MRR_LOCK(mrrp,
plstr); \
                                                        mrrp->msg_being_rcv
= 0; \
                                              }
#else
#define MRR_ASSERT(m)      if (!m) { \
                        MRRLOG(0, "Element = %x\n",m); \
                        return; \
                   }
#define MRR_PUT_PRI(m,p)
#define MRR_CHK_MEDQ(m,q,mdp)          0

/*
 * ((q)->q_first || \ ((((m)->b_datap->db_type <= QPCTL  \ && !MRR_CANPUT(q))
 * \ && !(mdp->status & DSF_MED_READY))))
 */
#define MRRCHKUPQ(m,q)          ((m)->b_datap->db_type <= QPCTL &&  \
                         !MRR_CANPUT(q))
#define I_PLINK       I_LINK
#define I_PUNLINK    I_UNLINK
#define MD_UPD_STATS(md)        { \
                         extern time_t time; \
                         (md)->stats.last_msg_time = time; \
                         (md)->stats.no_of_mssg++; \
                         }
#define MRR_SLEEP_LK(m)
#define MRR_SND_UNLOCK(m)
#define MRR_LOCK_SND(m)
#define MRR_LOCK_CLS(m)
#define MRR_CLS_UNLOCK(m)
#define MRR_ALRDY_SNDING(m)          0
#define MRR_IS_MSG_BEING_SND_TO_USR(m) 0
#define MRR_SENDING_MSG_TO_USR
#define MRR_SND_MSG_TO_USR
typedef struct dsf_cred cred_t;
```

© COPYRIGHT 1994 AMDAHL CORPORATION

```
#endif
#define MRRFLOWCNTRL(m,mrrp)  ((m)->b_datap->db_type <= QPCTL && \
                               (mrrp)->remote.send_info.state == BLOCKED)
#define MRR_MEDIA_NAME(m) (mrr_mediahp[(m)->med])->media.lower.id
#define MREOM(up)    ((*(int *)up == 0xffffffff))
#define MRRALLPRI  -1
#define DEFAULT_ACK_REQUEST_THRESH 4096

static uint    mrr_ack_req_thresh = DEFAULT_ACK_REQUEST_THRESH;
static int     mrr_win_adj_shft = 0;   /* Shift maximum window size by this */

int            mrr_open(), mrr_drv_open(), mrr_close();
int            mrr_urput(), mrr_ursrv(), mrr_uwput(), mrr_uwsrv();
int            mrr_lrput(), mrr_lrsrv(), mrr_lwput(), mrr_lwsrv();
int            mrr_media_value_cmp(), dsf_route_data(), mrr_pwr();
void           mrr_send_ack(), mrr_en_all_usr_q();
void           mrr_rexmit_msg(), mrr_send_hangup(), mrr_update_xmit_window();
STATIC int     mrr_r_open_req(), mrr_mod_close(), mrr_remote_pushed_resp();
STATIC int     mrr_xmit_pnd_msgs(), mrr_sanity_check(), mrr_remote_open_resp();
STATIC int     mrr_send_link(), mrr_link_alloc(), mrr_build_frag_msg();
STATIC int     mrr_build_msg(), mrr_rcv_fragment(), mrr_fragment_dmsg();
STATIC int     mrr_expected_seq(), mrr_uwrite_process(), mrr_snd_hi_pri_mssg();
STATIC void    mrr_rcv_data(), mrr_remoteq_init(), mrr_drv_open_resp();
STATIC int     mrr_find_ulink(), mrr_drv_close_req(), mrr_deplete_msgs();
STATIC void    mrr_mod_open_resp(), mrr_buf_wakeup(), mrr_pop_resp();
STATIC struct mrr_route_info *mrr_chk_route();
STATIC media_obj_t *mrr_checkmediaup();
STATIC void    mrr_append_mp(), mrr_xmit_all_pri_msgs(), mrr_cred_copy();
STATIC void    mrr_lock_xmit(), mrr_bufcall(), mrr_elment_ins();
STATIC void    mrr_bcopy(), mrr_resend_ack_naks();
STATIC void    mrr_send_nak(), mrr_free_mem(), mrr_adj_win_size();
STATIC void    mrr_free_mp_list(), mrr_snd_buf_intr(), mrr_free_all();
STATIC void    mrr_update_admin_header(), mrr_admin_close_resp();
STATIC void    mrr_enableq(), mrr_process_ack(), mrr_process_nak();
STATIC void    mrr_dsf_close_res(), mrr_admin_close_req();
STATIC void    mrr_link_resp(), mrr_unlink_resp(), mrr_free_act_admin();
STATIC void    mrr_element_unid(), mrr_free_cred_struct();
STATIC mrr_act_admin_t *mrr_common_lkulk_resp();
STATIC int     mrr_pop_req(), mrr_data_mssg();
STATIC int     mrr_no_of_msgblk(), mrr_snd_to_media(), mrr_frag_no();
STATIC void    mrr_close_resp(), mrr_upd_xmit_info(), dsf_send_trace_msg();
STATIC void    mrr_build_msg_buff(), mrr_all_mssg_q_en(), mrr_en_xmit_queue();
STATIC void    mrr_comb_rxmit_pend_mssg(), mrr_save_hpri_mssg(), mrr_send_intr();
STATIC void    mrr_snd_positive_wind(), mrr_snd_ack_with_window();
STATIC void    mrr_flush_read_queue(), mrr_flush_private_q();
```

© COPYRIGHT 1994 AMDAHL CORPORATION

```
STATIC void    mrr_xmit_alloc_fail(), mrr_rcv_alloc_error(), mrr_free_frags();
STATIC void    mrr_snd_to_usr(), mrr_correct_cred_ptr();
STATIC int     mrr_chk_rem_exp_seq(), mrr_send_remote_mssg(), mrr_assert_lock();
STATIC void    mrr_local_action(), mrr_snd_msg_to_media(), mrr_snd_no_part();
STATIC void    mrr_just_snd_msg_to_media(), mrr_save_msg_frag();
STATIC int     mrr_io_cr_append();
STATIC void    mrr_elment_rmv(), mrr_update_available_window();
#ifndef _UTS
STATIC void    mrr_correct_stroptions();
#else
STATIC int     mrr_getuts_locks();
STATIC void    mrr_msg_tobe_snd(), mrr_snd_pnd_ack_nak();
STATIC void    mrr_append_msg_chk_xmit(), mrr_append_acknak_chk_xmit();
STATIC void    mrr_xmit_all_acks_nak(), mrr_send_ack_nak_tmout();
lkinfo_t       mrr_element_lkinfo;
extern rwlock_t *mrr_mediahp_rwlkp;
#endif
extern struct module_info mrr_uminfo;
extern int     mrr_msg_length();
extern media_obj_t *mrr_mediahp[];
extern mrr_route_info_t *mrrhastbl[];
extern void    dsf_send_keepalive();
extern int     nmrr_media, nmrr_route;
extern media_obj_t *dsf_chk_if_media_valid();

/* Credentials used by all tasks(if not defined). */
static struct dsf_cred loc_cred = {0, 0, 0, 0, 0, 0, 0, 0,
        0xffffffff, 0xffffffff, 0, 0, 0, 0, 0, 0, 0, 0, 0, 0, 0, 0, 0, 0, 0, 0, 0, 0, 0,
0, 0, 0, 0, 0, 0, 0, 0, 0, 0, 0, 0, 0, 0, 0, 0};

int            mrr_debug = 1;

/*
 * Note: That the open, close, read put, read service, write put, write
 * service routines are NOT static since they need to be configured for all
 * other drivers and modules.
 */

/*
 * mrr_open:   Opens a connection to the remote side by issueing a R_OPEN
 * req. The routing information should be available before an open can be
 * issued. This routine sleeps.
 */

#if _UTS
```

© COPYRIGHT 1994 AMDAHL CORPORATION

```
int
mrr_open(q, devp, flag, sflag, credp)
        queue_t        *q;
        dev_t          *devp;
        int            flag, sflag;
        cred_t         *credp;

#else
int
mrr_open(q, dev, flag, sflag)
        queue_t        *q;
        dev_t          dev;
        int            flag;
        int            sflag;

#endif
{

        dev_t          mrr_minor, mrr_major = -1;

        if (sflag == MODOPEN)
#if _UTS
                return (mrr_mod_open(q, flag, sflag, credp));
#else
                return (mrr_mod_open(q, flag, sflag));
#endif

        else {

#if _UTS
                mrr_major = getemajor(*devp);
                mrr_minor = getminor(*devp);
                if (mrr_major == NODEV) {
                        MRRLOG(0, "Mirror: No major number exists=%d\n", mrr_major);
                        return (EINVAL);
                }
                return (mrr_drv_open(q, devp, flag, sflag, credp, mrr_major, mrr_minor));
#else
                mrr_minor = minor(dev);
                mrr_major = major(dev);
                return (mrr_drv_open(q, dev, flag, sflag, mrr_major, mrr_minor));
#endif
        }
}
```

© COPYRIGHT 1994 AMDAHL CORPORATION

```
#if _UTS
STATIC int
mrr_mod_open(q, flag, sflag, credp)
        queue_t       *q;
        int           flag, sflag;
        cred_t        *credp;

#else
STATIC int
mrr_mod_open(q, flag, sflag)
        queue_t       *q;
        int           flag;
        int           sflag;

#endif
{
        register media_obj_t *mediap;
        register struct mrr_route_info *mrr_routep;
        register mrr_element_t *mrrp;
        register int   slp_pri = ((PZERO + 1) | PCATCH);
        MRR_PLT        old_ipl;
        register struct stdata *stp;
        register int   ret_code = 0;
        register queue_t *wqp;

        /*
         * Check if already opened  Modules pushed on the same stream do not
         * need to be send again
         */
        if (q->q_ptr)
                return (0);

        if (!(WR(q)->q_next)) {
                MRRLOG(0, "MODOPEN:No queue->next =%x\n", q);
                MRR_RETURN(ENODEV);
        } else {
#if _UTS
                /* Check the routing hash table if the device exists */
                stp = (WR(q))->q_stp;
                old_ipl = HOLD_STREAM(stp, plstr);
#endif

                mrr_routep = MRR_MOD_RT(WR(q)->q_next);
```

© COPYRIGHT 1994 AMDAHL CORPORATION

```
#if _UTS
                RELEASE_STREAM(stp, old_ipl);
#endif
        }

        /*
         * Now check if the media is up and running. Since this is a pop the
         * chances of media disappearing is zero. So no need to synch.
         */
#if _UTS
        old_ipl = RW_RDLOCK(mrr_mediahp_rwlkp, plstr);
#endif
        if (!(mediap = mrr_checkmediaup(mrr_routep))) {
                MRRLOG(0, " Media not up or not attached=%x\n", mrr_routep);
#if _UTS
                RW_UNLOCK(mrr_mediahp_rwlkp, old_ipl);
#endif
                MRR_RETURN(ENODEV);
        }
        /*
         * Since remote side expects the same src id for PUSH we send the src
         * id of the driver underneath
         */

#if _UTS
        RW_UNLOCK(mrr_mediahp_rwlkp, old_ipl);
        stp = (WR(q))->q_stp;
        old_ipl = HOLD_STREAM(stp, plstr);
#endif

        mrrp = (mrr_element_t *) (WR(q)->q_next->q_ptr);

#if _UTS
        RELEASE_STREAM(stp, old_ipl);
#endif

        q->q_ptr = (qpptr_t) mrrp;
        WR(q)->q_ptr = (qpptr_t) mrrp;
        /*
         * Now issue an R_PUSH request and wait for a response from the put
         * or service routine. Even though the open has not completed the
         * lower mux can call put routine for processing
         */
        MRR_LOCK(mrrp, plstr);
    wqp = WR(mrrp->urqptr);
```

© COPYRIGHT 1994 AMDAHL CORPORATION

```
        if (mrrp->status & MR_MEDUP) {
                mrrp->state |= MR_PUSHING;
        /*
         * The following could happen because of the to seq_msg_being_send.
         * Sleep until woken up and then check for Hangup received.
         */
        while ((mrrp->status & MR_MEDUP) && wqp->q_first ) {
            MRRLOG(mrrp->state, "Push:Waiting for All mssg to be send %x\n", mrrp);
                MRR_UNLOCK(mrrp);
                /* wait for all messages to be send via the service routine */
                MRR_SLEEP(mrrp, slp_pri);
                MRR_LOCK(mrrp, plstr);
                if (mrrp->status & MR_HANGUPSEND) {
                    mrrp->state &= ~MR_PUSHING;
                    MRR_UNLOCK(mrrp);
                    MRR_RETURN(EAGAIN);
                }

        }
#if _UTS
                MRR_UNLOCK(mrrp);
                qprocson(q);    /* Sometime M_SETOPT come via the put */
                MRR_LOCK(mrrp, plstr);
                if (!mrr_r_open_req(q, mrrp, flag, sflag, credp)) {
                        MRR_UNLOCK(mrrp);
                        qprocsoff(q);
                        MRR_LOCK(mrrp, plstr);
#else
                old_ipl = MRR_SETPL(old_ipl);        /* Synchronize sleep and wake
                                                      * up */
                if (!mrr_r_open_req(q, mrrp, flag, sflag, NULL)) {
                        MRR_SPLX(old_ipl);
#endif

                        MRRLOG(mrrp->mrr_major, "Error in sending R_PUSH=%x\n", mrrp);
                        mrrp->state &= ~MR_PUSHING;
                        MRR_UNLOCK(mrrp);
                        MRR_RETURN(EAGAIN);
                }
        } else {
                MRRLOG(mrrp->status, " Medium not up status=%x\n", mrrp);
                MRR_UNLOCK(mrrp);
                MRR_RETURN(ENXIO);
        }
```

© COPYRIGHT 1994 AMDAHL CORPORATION

```
        MRR_SPLX(old_ipl);
MRMOPSLP:
        if (mrrp->state & MR_PUSHED) {
        /* Make sure that the  original read service queue does not have
    * any messages, since by changing mrrp->urqptr we essentially bypass
    * the original queue. At this stage we are ignoring it.
    */
                ret_code = mrr_remote_pushed_resp(mrrp, q);
                MRR_UNLOCK(mrrp);
                if (ret_code) {
                        MRR_RETURN(ret_code);
                } else
                        return (0);
        }
        /* slp_pri get ignored for UTS4.0 */
        if (MRR_SLEEP(mrrp, slp_pri)) {
                /* Somebody interrupted the call */
                MRR_LOCK(mrrp, plstr);
                mrrp->error_code = ret_code = EINTR;
                if (!(mrrp->status & MR_MEDUP) || (mrrp->state & MR_PUSHED)) {
                        goto MRMOPSLP1;
                }
                mrr_send_intr(mrrp);
                slp_pri = PZERO;/* Don't catch anymore */
                /* Because of race condition */
                if (!(mrrp->state & MR_PUSHED)) {
                        MRR_SLEEP_NO_INTR(mrrp, slp_pri);
                        MRR_LOCK(mrrp, plstr);
                        goto MRMOPSLP1;
                }
                goto MRMOPSLP1;

        } else {
                /* got awoken by a wakeup (),for UTS4 at base priority */
                MRR_LOCK(mrrp, plstr);
MRMOPSLP1:
                switch (mrrp->status) {
                case MR_REXMIT:
                        goto MRMOPSLP;
                case (MR_MEDUP | MR_HANGUPSEND): {
                case MR_MEDUP:
                      if (mrrp->state & MR_PUSHED) {
                          if (mrrp->error_code) {
                                  mrrp->state &= ~MR_PUSHED;
                                  ret_code = mrrp->error_code;
```

© COPYRIGHT 1994 AMDAHL CORPORATION

```
                    } else {
                    /* Make sure that the  original read service queue does
                     * not have  any messages, since by changing mrrp->urqptr
                     * we essentially bypass the original queue.
                     * At this stage we are ignoring it.
                  */
                 mrrp->urqptr = q;
                 ret_code = 0;
                }
            } else {            /* Should not happen */
                MRRLOG(mrrp->state, "Bad state PUSH try again=%x\n", mrrp);
                goto MRMOPSLP;
            }
                MRR_UNLOCK(mrrp);
                if (ret_code) {
                    MRR_RETURN(ret_code);
                } else
                    return (0);
        }
        default:        /*  MR_NOREMOTE | MR_MEDDOWNP | interrupted
                             */
            mrrp->state &= ~MR_PUSHING;
            MRR_UNLOCK(mrrp);
            if (!ret_code)
                ret_code = ENXIO;
            MRR_RETURN(ret_code);
        }
    }               /* sleep */
}

/*
 * mrr_drv_open: Used for driver opens only. It forms the remote message and
 * waits for the remote side to respond.
 */

#if _UTS
int
mrr_drv_open(q, devp, flag, sflag, credp, mrr_major, mrr_minor)
        queue_t     *q;
        dev_t       *devp;
        int         flag, sflag;
        cred_t      *credp;
        dev_t       mrr_major;
        dev_t       mrr_minor;
```

© COPYRIGHT 1994 AMDAHL CORPORATION

```
#else
int
mrr_drv_open(q, dev, flag, sflag, mrr_major, mrr_minor)
        queue_t         *q;
        dev_t           dev;
        int             flag;
        int             sflag;
        dev_t           mrr_major;
        dev_t           mrr_minor;

#endif
{

        register media_obj_t *mediap;
        register struct mrr_route_info *mrr_routep;
        register mrr_element_t *mrrp;
        register int    s;
        register int    slp_pri = ((PZERO + 1) | PCATCH);
        MRR_PLT         oldpl, lastpl;
        register int    ret_code = 0;

        /* Now check if the media is up and running . But synch first */
#if _UTS
        /*
         * Make sure element gets inserted before media tries to close
         */
        oldpl = RW_RDLOCK(mrr_mediahp_rwlkp, plstr);
#endif

        /* Check the routing hash table if the device exists */
        if (!(mrr_routep = mrr_chk_route(mrr_major))) {
                MRRLOG(mrr_minor, "No entry in hash table for=%x\n", mrr_major);
#if _UTS
                RW_UNLOCK(mrr_mediahp_rwlkp, oldpl);
#endif
                MRR_RETURN(ENODEV);
        }
MRR_WAIT:
        if (!(mediap = mrr_checkmediaup(mrr_routep))) {
                MRRLOG(mrr_minor, " Media not up =%x\n", mrr_routep);
#if _UTS
                RW_UNLOCK(mrr_mediahp_rwlkp, oldpl);
#endif
                MRR_RETURN(ENODEV);
        }
```

© COPYRIGHT 1994 AMDAHL CORPORATION

```
        if (q->q_ptr) {                 /* already open */
                mrrp = (mrr_element_t *) q->q_ptr;
                /* check to see if an open is already in progress */
                if (mrr_validate(mrrp, mediap)) {
                        if (mrrp->state & MR_OPENED) {
#if _UTS
                            RW_UNLOCK(mrr_mediahp_rwlkp, oldpl);
#endif
                                goto MRR_OPNED; /* With lock held */
                        } else {
                                MRRLOG(mrr_minor, "***OPEN within an open %x\n", mrrp);
                                MRR_UNLOCK(mrrp);
                                goto MRR_WAIT;
                        }
                }
        }
        /* Now that we have an entry allocate the memory we need */
        if (!(mrrp = (mrr_element_t *) KMEM_ALLOC(sizeof(mrr_element_t),
                                                KM_NOSLEEP))) {
                MRRLOG(mrr_minor, " No memory available for mrr_element_t=%d\n",
                    sizeof(mrr_element_t));
#if _UTS
                RW_UNLOCK(mrr_mediahp_rwlkp, oldpl);
#endif
                MRR_RETURN(EAGAIN);
        }
#ifndef _UTS
        bzero((caddr_t) mrrp, sizeof(mrr_element_t));
#endif

        s = MRR_SETPL(s);
        mrrp->mrr_major = mrr_major;
        mrrp->urqptr = q;
        mrrp->route = mrr_routep;
        mrrp->med = mediap->index;
        mrr_remoteq_init(mrrp, q);
        mrrp->mrr_minor = mrr_minor;
        mrrp->status = mediap->status & DSF_MED_READY;
        mrrp->state = MR_FLOWING;
        mrrp->pri = DSF_NORMAL_PRI;
        mrrp->bid = mrrp->cbid = 0;        /* No pending bufcall */
        mrrp->info = (mrr_act_admin_t *) NULL;
        mrrp->hi_pri_msg = NULL;
        mrrp->error_code = 0;
        mrrp->mrr_next = (mrr_element_t *) 0;
```

© COPYRIGHT 1994 AMDAHL CORPORATION

```
#if _UTS
        mrrp->msg_frag = NULL;
        mrrp->msg_frag_len = 0;
        if (!mrr_getuts_locks(mrrp)) {
                KMEM_FREE(mrrp, sizeof(mrr_element_t));
                RW_UNLOCK(mrr_mediahp_rwlkp, oldpl);
                MRR_SPLX(s);
                MRR_RETURN(EAGAIN);
        }
        /* Nobody sending message yet */
        mrrp->seq_msg_being_send = mrrp->tout_msg_being_snd = 0;
        /* Nobody is receiving message */
        mrrp->msg_being_rcv = 0;
        /* No ack/nak being queued */
        mrrp->ack_nak_being_snd = mrrp->tout_snd_ack_nak = 0;
        mrrp->ack_nak_msg = (mblk_t *) NULL;
        /* No operation so don't wait */
        mrrp->wait_on_close = 0;
#endif

        q->q_ptr = (qpptr_t) mrrp;
        WR(q)->q_ptr = (qpptr_t) mrrp;
        /*
         * Update media structure with a active mrr_element
         *
         */

#if _UTS
        lastpl = RW_WRLOCK(mediap->media.element_rwlkp, plstr);
#endif
        mrr_elment_ins(mrrp);

#if _UTS
        RW_UNLOCK(mediap->media.element_rwlkp, lastpl);
#else
        MRR_SPLX(s);
#endif


#if _UTS
        RW_UNLOCK(mrr_mediahp_rwlkp, oldpl);
        MRR_LOCK(mrrp, plstr);
#endif
        /*
         * Now issue a R_OPEN  request and wait for a response  from the put
```

© COPYRIGHT 1994 AMDAHL CORPORATION

```
	 * or service routine. Even though the open has not completed the
	 * lower mux can call put routine for processing
	 */
MRR_OPNED:
	if (mrrp->status & MR_MEDUP) {
		mrrp->state |= MR_OPENING;
#if _UTS
		if (!(mrrp->state & MR_OPENED)) {
			MRR_UNLOCK(mrrp);
			qprocson(q);	/* Sometime M_SETOPT come via the put */
			MRR_LOCK(mrrp, plstr);
		} else {
		   register queue_t *wqp = WR(mrrp->urqptr);
		/* On second opens make sure that no messages are queued.
		 */
		  while ((mrrp->status & MR_MEDUP) && wqp->q_first ) {
		 MRRLOG(mrrp->state,"Open:Waiting for msgs  %x\n", mrrp);
			MRR_UNLOCK(mrrp);
			/* wait for all messages to be send via the service routine */
			MRR_SLEEP(mrrp, slp_pri);
			MRR_LOCK(mrrp, plstr);
			if (mrrp->status & MR_HANGUPSEND) {
			   mrrp->state &= ~MR_OPENING;
			   MRR_UNLOCK(mrrp);
			   MRR_RETURN(EAGAIN);
			}
		}
	}
		if (!mrr_r_open_req(q, mrrp, flag, sflag, credp)) {
			if (!(mrrp->state & MR_OPENED)) {
				MRR_UNLOCK(mrrp);
				qprocsoff(q);
				MRR_LOCK(mrrp, plstr);
			}
#else
		s = MRR_SETPL(s);
		if (!mrr_r_open_req(q, mrrp, flag, sflag, NULL)) {
#endif
			mrrp->state &= ~MR_OPENING;
			MRRLOG(mrr_minor, "Error in sending R_OPEN=%x\n", mrrp);
			if (!(mrrp->state & MR_OPENED))
				mrr_free_all(mrrp);
			MRR_SPLX(s);
			MRR_RETURN(EAGAIN);
		}
```

© COPYRIGHT 1994 AMDAHL CORPORATION

```
                MRR_SPLX(s);
        } else {
                MRRLOG(mrrp->status, " Medium not up status=%x\n", mrrp);
                if (!(mrrp->state & MR_OPENED))
                        mrr_free_all(mrrp);
                MRR_RETURN(ENXIO);
        }
MROPSLP:
        if (!(mrrp->state & MR_OPENING)) {        /* Opening response available */

#if _UTS
                ret_code = mrr_remote_open_resp(mrrp, devp);

#else
                ret_code = mrr_remote_open_resp(mrrp, dev);

#endif

                if (ret_code) {
                        if (!(mrrp->state & MR_OPENED)) {
                                mrr_free_all(mrrp);
                                MRR_RETURN(ret_code);
                        } else {
                                MRR_UNLOCK(mrrp);
                                MRR_RETURN(ret_code);
                        }
                } else {
#if _UTS
                        MRR_UNLOCK(mrrp);
                        return (0);
#else
                        return (mrrp->mrr_minor);
#endif
                }
        }
        /* slp_pri get ignored for UTS4.0 */
        if (MRR_SLEEP(mrrp, slp_pri)) {
                /* Somebody interrupted the call */
                MRR_LOCK(mrrp, plstr);
                mrrp->error_code = ret_code = EINTR;
                if (!(mrrp->status & MR_MEDUP) || !(mrrp->state & MR_OPENING)) {
                        goto MROPSLP1;
                }
                mrr_send_intr(mrrp);
                slp_pri = PZERO;/* Don't catch anymore */
```

© COPYRIGHT 1994 AMDAHL CORPORATION

```
                /* Because of race condition */
                if (mrrp->state & MR_OPENING) {
                        MRR_SLEEP_NO_INTR(mrrp, slp_pri);
                        MRR_LOCK(mrrp, plstr);
                        goto MROPSLP1;
                }
                goto MROPSLP1;
        } else {
                MRR_LOCK(mrrp, plstr);
MROPSLP1:
                /* got awoken by a wakeup(), for UTS4 at base priority */
                switch (mrrp->status) {
                case MR_REXMIT:
                        goto MROPSLP;
                case (MR_MEDUP | MR_HANGUPSEND): {
                /* got to wait for a open response */
                case MR_MEDUP:

#if _UTS
                                ret_code = mrr_remote_open_resp(mrrp, devp);

#else
                                ret_code = mrr_remote_open_resp(mrrp, dev);

#endif

                                if (ret_code) {
                                        if (!(mrrp->state & MR_OPENED)) {
                                                mrr_free_all(mrrp);
                                                MRR_RETURN(ret_code);
                                        }
                                        MRR_UNLOCK(mrrp);
                                        MRR_RETURN(ret_code);
                                } else
#if _UTS
                                        MRR_UNLOCK(mrrp);
                                return (0);
#else
                                        return (mrrp->mrr_minor);
#endif
                        }
                default:        /* MR_NOREMOTE | MR_MEDDOWNP | interrupted
                                        */
                        mrrp->state &= ~MR_OPENING;
                        if (!(mrrp->state & MR_OPENED))
```

© COPYRIGHT 1994 AMDAHL CORPORATION

```
                        mrr_free_all(mrrp);
                else
                        MRR_UNLOCK(mrrp);
                if (!ret_code)
                        ret_code = ENXIO;
                MRR_RETURN(ret_code);
        }               /* switch */

    }
}

/*
 * mrr_close:   close a connection to the remote side by issusing a R_CLOSE
 * req. This routine sleeps.
 */
/* ARGSUSED */

#if _UTS
int
mrr_close(qp, flag, credp)
        queue_t       *qp;
        int           flag;
        cred_t        *credp;

#else
int
mrr_close(qp)
        queue_t       *qp;

#endif

{
        register mrr_element_t *mrrp;

        mrrp = (mrr_element_t *) qp->q_ptr;
        MRR_ASSERT(mrrp);
        if (WR(qp)->q_next) {

#if _UTS
                return (mrr_mod_close(mrrp, credp, qp));
        }
#else
                return (mrr_mod_close(mrrp, NULL, qp));
        }
#endif
```

© COPYRIGHT 1994 AMDAHL CORPORATION

```
        /* Driver close */
        else
#if _UTS
                return (mrr_drv_close(mrrp, credp, qp));
#else
                return (mrr_drv_close(mrrp, NULL, qp));
#endif

}

/*
 * mrr_mod_close: Used for module closes. Basically comes from a push. It
 * created a remote message and sends it over to the remote side, waiting for
 * a response. Since it is never a terminating driver, the storage space is
 * not de-allocated.
 */

STATIC int
mrr_mod_close(mrrp, credp, qp)
        register mrr_element_t *mrrp;
        cred_t          *credp;
        register queue_t *qp;
{
        register        status = 0;
        register int    slp_pri = ((PZERO + 1) | PCATCH);
        MRR_PLT         old_ipl;
        register struct stdata *stp;
        register queue_t *wqp = WR(mrrp->urqptr);

#if _UTS
        MRR_LOCK(mrrp, plstr);
        mrrp->state |= MR_POPING;
        /* if media is down temp then sleep for it to come up */
        /* slp_pri get ignored for UTS4.0 */
        while (mrrp->status & MR_MEDDOWN) {
                MRRLOG(mrrp->state, "Pop:Waiting for Media to come up %x\n", mrrp);
                MRR_SLEEP(mrrp, slp_pri);
                MRR_LOCK(mrrp, plstr);
        }
        /* Now check if the close is because of an M_HANGUP.
         */
MR_POP_HNGUP:
         if (mrrp->status & MR_HANGUPSEND) {
            register mblk_t *mp;
```

© COPYRIGHT 1994 AMDAHL CORPORATION

```
            mrr_flush_private_q(mrrp, mrrp->pri);
            while ((mp = getq(wqp)) != NULL)
                    freemsg(mp);
        }
        /*
         * The following could happen because of the to seq_msg_being_send.
         * Sleep until woken up and then check for Hangup received.
         */
        if ((mrrp->status & MR_MEDUP) && wqp->q_first ) {
           MRRLOG(mrrp->state, "Pop:Waiting for All mssg to be send %x\n", mrrp);
                MRR_UNLOCK(mrrp);
                /* wait for all messages to be send via the service routine */
                MRR_SLEEP(mrrp, slp_pri);
                MRR_LOCK(mrrp, plstr);
                goto MR_POP_HNGUP;

        }
   /* Make sure that all the puts & service routines have finished */
        MRR_UNLOCK(mrrp);
        qprocsoff(qp);
        MRR_LOCK(mrrp, plstr);
#else
        mrrp->state |= MR_POPING;
#endif

        /*
         * Now issue a R_POP request and wait for a response.
         */
        if (mrrp->status & (MR_NOREMOTE | MR_MEDDOWNP))
                goto MRR_POP;

#if _UTS
        if (!mrr_pop_req(mrrp, credp)) {
                mrrp->state &= ~MR_POPING;      /* Only if media went down */
                goto MRR_POP;
        }
#else
        old_ipl = MRR_SETPL(old_ipl);
        if (!mrr_pop_req(mrrp, (cred_t *) NULL)) {
                mrrp->state &= ~MR_POPING;      /* Only if media went down */
                MRR_SPLX(old_ipl);
                goto MRR_POP;
        }
        MRR_SPLX(old_ipl);
#endif
```

© COPYRIGHT 1994 AMDAHL CORPORATION

```
MRPOPSLP:
	if (mrrp->state & MR_POPED) {
		status = mrrp->error_code;
		goto MRR_POP;

	}
	/* slp_pri get ignored for UTS4.0 */
	if (MRR_SLEEP(mrrp, slp_pri)) {
		/* Somebody interrupted the call */
		MRR_LOCK(mrrp, plstr);
		mrrp->error_code = status = EINTR;
		if (!(mrrp->status & MR_MEDUP) || (mrrp->state & MR_POPED)) {
			goto MRPOPSLP1;
		}
		mrr_send_intr(mrrp);
		slp_pri = PZERO;/* Don't catch anymore */
		if (!(mrrp->state & MR_POPED)) {
			MRR_SLEEP_NO_INTR(mrrp, slp_pri);
			MRR_LOCK(mrrp, plstr);
			goto MRPOPSLP1;
		}
		goto MRPOPSLP1;
	} else {
		MRR_LOCK(mrrp, plstr);
MRPOPSLP1:
		/* got awoken by a wakeup (), for UTS4 at base priority */
		switch (mrrp->status) {
		case MR_REXMIT:
			goto MRPOPSLP;
		case (MR_MEDUP | MR_HANGUPSEND): /* got to wait for a pop response */
		case MR_MEDUP:	/* Woken  up by the upper put or service
					 * routine */
			if (mrrp->state & MR_POPED)
				status = mrrp->error_code;
			else {
				MRRLOG(mrrp->state, "Pop:Error in state %x\n", mrrp);
				goto MRPOPSLP;
			}
			break;
		default:	/* MR_NOREMOTE | MR_MEDDOWNP | interrupted
				 */
		    mrrp->state &= ~MR_POPING;
			if (!status)
				status = EIO;
			break;
```

© COPYRIGHT 1994 AMDAHL CORPORATION

```
                }
        }
MRR_POP:
#if _UTS
        stp = (RD(WR(mrrp->urqptr)))->q_stp;
        old_ipl = HOLD_STREAM(stp, plstr);
#endif

        mrrp->urqptr = RD((WR(mrrp->urqptr))->q_next);

#if _UTS
        RELEASE_STREAM(stp, old_ipl);
#endif

        mrrp->state &= ~MR_POPED;
        MRR_UNLOCK(mrrp);
        MRR_RETURN(status);

}

/*
 * mrr_drv_close: Send a R_CLOSE_REQ to the remote side and sleep till a
 * response comes. Once the response is available it remove the element from
 * the active list  and deallocates the storage.
 */

STATIC int
mrr_drv_close(mrrp, credp, qp)
        register mrr_element_t *mrrp;
        cred_t          *credp;
        register queue_t *qp;
{
        register        status = 0;
        register int    slp_pri = ((PZERO + 1) | PCATCH);
        register queue_t *wqp = WR(qp);

        /*
         * Now issue a R_CLOSE request and wait for a response  from the put
         * or service routine.
         */
#if _UTS
        MRR_LOCK(mrrp, plstr);
        mrrp->state |= MR_CLOSING;
        /* if media is down temp then sleep for it to come up */
```

© COPYRIGHT 1994 AMDAHL CORPORATION

```
        /* slp_pri get ignored for UTS4.0 */
        while (mrrp->status & MR_MEDDOWN) {
                MRRLOG(mrrp->state, "Close:Waiting for Media to come up %x\n", mrrp);
                MRR_SLEEP(mrrp, slp_pri);
                MRR_LOCK(mrrp, plstr);
        }
        /* Now check if the close is because of an M_HANGUP.
         */
MRR_CLS_HNGUP:
        if (mrrp->status & MR_HANGUPSEND) {
            register mblk_t *mp;

            mrr_flush_private_q(mrrp, mrrp->pri);
            while ((mp = getq(wqp)) != NULL)
                    freemsg(mp);
        }
        /*
         * The following could happen because of the to seq_msg_being_send.
         * Sleep until woken up and then check for M_HANGUP received.
         */
        if ((mrrp->status & MR_MEDUP) && wqp->q_first) {
            MRRLOG(mrrp->state, "mrr_close:Waiting for All mssg to be send %x\n",
                    mrrp);
                MRR_SLEEP(mrrp, slp_pri);
                MRR_LOCK(mrrp, plstr);
                /* Check also if we have received an M_HANGUP */
                goto MRR_CLS_HNGUP;
        }
   /* Make sure that all the puts & service routines have finished */
        MRR_UNLOCK(mrrp);
        qprocsoff(qp);
        MRR_LOCK(mrrp, plstr);
#else
        mrrp->state |= MR_CLOSING;
#endif

        if (mrrp->status & (MR_NOREMOTE | MR_MEDDOWNP)) {
                goto MRR_CLOSE;
        }
#if _UTS
        if (!mrr_drv_close_req(mrrp, credp)) {
                /* Only if media goes down permenantly */
                goto MRR_CLOSE;
        }
#else
```

© COPYRIGHT 1994 AMDAHL CORPORATION

```
	if (!mrr_drv_close_req(mrrp, (cred_t *) NULL)) {
		/* Only if media goes down permenantly */
		goto MRR_CLOSE;
	}
#endif


MRCLSLP:
	if (mrrp->state & MR_CLOSED) {
		status = mrrp->error_code;
		goto MRR_CLOSE;
	}
	/* slp_pri get ignored for UTS4.0 */
	if (MRR_SLEEP(mrrp, slp_pri)) {
		/* Somebody interrupted the call */
		mrrp->error_code = status = EINTR;
		MRR_LOCK(mrrp, plstr);
		if (!(mrrp->status & MR_MEDUP) || (mrrp->state & MR_CLOSED)) {
			goto MRCLSLP1;
		}
		mrr_send_intr(mrrp);
		slp_pri = PZERO;/* Don't catch anymore */
		/* Because of race condition */
		if (!(mrrp->state & MR_CLOSED)) {
			MRR_SLEEP_NO_INTR(mrrp, slp_pri);
			MRR_LOCK(mrrp, plstr);
			goto MRCLSLP1;
		}
		goto MRCLSLP1;
	} else {
		MRR_LOCK(mrrp, plstr);
MRCLSLP1:
		/* got awoken by a wakeup (),for UTS4 at base priority */
		switch (mrrp->status) {
		case MR_REXMIT:
			goto MRCLSLP;
		case (MR_MEDUP | MR_HANGUPSEND): /* Got to wait for a close response */
		case MR_MEDUP:	/* MR_MEDUP woken by the upper put or service
				 * routine */
			if (mrrp->state & MR_CLOSED)
				status = mrrp->error_code;
			else {
				MRRLOG(mrrp->state, "close: err in state,try again %x\n", mrrp);
				goto MRCLSLP;
```

© COPYRIGHT 1994 AMDAHL CORPORATION

```
                }
                break;
        default:        /* MR_HANGUPSEND | MR_NOREMOTE | MR_MEDDOWNP
                         * | interrupted */
                if (!status)
                        status = EIO;
                break;



        }
    }
MRR_CLOSE:
    mrr_free_all(mrrp);
    MRR_RETURN(status);

}

/*
 * mrr_uwput: This is the upper write put routine. It will obtain a lock
 * before sending data via the mrr_transmit function. In case there is a
 * message on the queue, then it will put the message in the queue and wait
 * for the service routine to send the message. Note even module use the
 * driver queue.
 */

int
mrr_uwput(qp, mp)
        register queue_t *qp;
        register mblk_t *mp;
{
        register mrr_element_t *mrrp = (mrr_element_t *) qp->q_ptr;
        extern int      putq();
        register queue_t *wqp;

        MRR_ASSERT(mrrp);
        MRR_LOCK(mrrp, plstr);
        wqp = WR(mrrp->urqptr);
        /*
         * May be check media canput(). Removed due to performance
         * consideration
         */
        /* High priority messages go directly */
        if (queclass(mp) == QNORM) {
                if (!mrr_sanity_check(wqp, mp, putq)) {
```

© COPYRIGHT 1994 AMDAHL CORPORATION

```
                        MRR_UNLOCK(mrrp);
                        return (0);
                }
                if (wqp->q_first || MRRFLOWCNTRL(mp, mrrp) || MRR_ALRDY_SNDING(mrrp))
{
                        putq(wqp, mp);          /* let the service routine take
                                                 * careof it */
                        MRR_UNLOCK(mrrp);
                        return (0);
                }
        }
        if (mrr_uwrite_process(wqp, mp) == MRR_XMIT_FAIL)
                putq(wqp, mp);
        MRR_UNLOCK(mrrp);
        return (0);
}

/*
 * mrr_uwsrv: This is the upper service routine. It will send data via the
 * mrr_transmit function. The service routine has to prevent the put routine
 * from preempting it.
 */

int
mrr_uwsrv(qp)
        register queue_t *qp;
{

        /*
         * The service routine has to do the following: look at the status.
         * 1) If MR_NOREMOTE  then send M_HANGUP. 2) If MR_MEDDOWN then putbq
         * 3) If MR_REXMIT then retransmit the pending messages 4) IF
         * MR_MEDUP then continue processing in normal way
         */
        register int    s = MRR_SETPL(s);
        register mrr_element_t *mrrp = (mrr_element_t *) qp->q_ptr;
        register mblk_t *mp;
        register int    result;
        register queue_t *wqp;
        extern int      putbq();

        MRR_ASSERT(mrrp);
        MRR_LOCK(mrrp, plstr);
        wqp = WR(mrrp->urqptr);
        while ((mp = getq(wqp)) != NULL) {
```

© COPYRIGHT 1994 AMDAHL CORPORATION

```
                if (!mrr_sanity_check(wqp, mp, putbq))
                        break;

                if (MRRFLOWCNTRL(mp, mrrp) || MRR_ALRDY_SNDING(mrrp)) {
                        putbq(wqp, mp);
                        MRR_SPLX(s);
                        MRR_UNLOCK(mrrp);
                        return 0;
                }
                if ((result = mrr_uwrite_process(wqp, mp)) == MRR_XMIT_FAIL) {
                        putbq(wqp, mp);         /* try again */
                        MRR_SPLX(s);
                MRR_UNLOCK(mrrp);
                return 0;
                } else if (result == MRR_XMIT_BRK) {
                        noenable(wqp);
                        MRR_SPLX(s);
                MRR_UNLOCK(mrrp);
                return 0;;
                }
                /* Sucess in sending data */
        }
        if (mrrp->state & MR_SLEEPING)
           MRR_WAKEUP(mrrp);
        MRR_SPLX(s);
        MRR_UNLOCK(mrrp);
        return 0;

}

/*
 * mrr_lrput: This routine is the lower read put routine, it should never be
 * called. If it does then free the message and inform that there was a
 * message
 */

int
mrr_lrput(qp, mp)
        register queue_t *qp;
        register mblk_t *mp;
{
        freemsg(mp);
}

/*
```

© COPYRIGHT 1994 AMDAHL CORPORATION

```
 * mrr_lrsrv: This routine is the lower read service routine, it should never
 * be called. If it does then free the message and inform that there was a
 * message
 */

int
mrr_lrsrv(qp)
        register queue_t *qp;
{
        register mblk_t *mp;
        register int    s = MRR_SETPL(s);
        register mrr_element_t *mrrp = (mrr_element_t *) qp->q_ptr;

        while ((mp = getq(qp)) != NULL) {
                freemsg(mp);
        }
        MRR_SPLX(s);
        return (0);
}

/*
 * mrr_lwput: This routine is the lower write put routine. It sends the
 * message if the media is up. It is never called
 */

int
mrr_lwput(qp, mp)
        register queue_t *qp;
        register mblk_t *mp;
{
        register media_obj_t *medp;
        MRR_PLT         oldpl;

        if (!(medp = dsf_chk_if_media_valid(qp->q_ptr))) {
                freemsg(mp);
                return 0;
        }
        if (qp->q_first)
                putq(qp, mp);   /* let the service routine take careof it */
        else {
                oldpl = MRR_HLD_MED_RDLOCK(medp, plstr);
                MRR_PUT_TO_MEDIA(medp, mp, oldpl);
        }
        return (0);
```

© COPYRIGHT 1994 AMDAHL CORPORATION

```
}

/*
 * mrr_urput: Upper read put should not be called by anybody. If it does then
 * the message is send up stream.
 */

int
mrr_urput(qp, mp)
        register queue_t *qp;
        register mblk_t *mp;
{
        register mrr_element_t *mrrp = (mrr_element_t *) qp->q_ptr;

        if (qp->q_first || MRRCHKUPQ(mp, qp)) {
                putq(qp, mp);  /* let the service routine take careof it */
                return (0);
        } else {
                /* Cannot hold lock */
                putnext(qp, mp);
                return (0);
        }
        /* May need to assert mrr_element_t */


}

/*
 * mrr_ursrv: Upper read called when stream head is full. No need to check If
 * close is being executed it will wait till all messages are send to user.
 */

int
mrr_ursrv(qp)
        register queue_t *qp;
{
        register mblk_t *mp;
        register mrr_element_t *mrrp = (mrr_element_t *) qp->q_ptr;
        register        s = MRR_SETPL(s);

        MRR_ASSERT(mrrp);
        MRR_LOCK(mrrp, plstr);
        while ((mp = getq(qp)) != NULL) {
                if (MRRCHKUPQ(mp, qp)) {
                        putbq(qp, mp);          /* try again */
```

© COPYRIGHT 1994 AMDAHL CORPORATION

```
                        /*
                         * Update the available window , maybe one message
                         * went up
                         */
                        mrrp->remote.rec_info.avail_win = max(0,
                                        ((mrrp->remote.rec_info.max_win   >>
(mrr_win_adj_shft + 1)) -
                                          qp->q_count));
                        goto MRRCHKACK;
                } else {

                        /*
                         * Prevent mrr_snd_to_usr from getting the LOCK,
                         * since it could result in messages going out of
                         * sequence
                         */
                        MRR_SENDING_MSG_TO_USR(mrrp);
                        putnext(qp, mp);
                        MRR_SND_MSG_TO_USR(mrrp);

                }

        }
        /* Update the available window  */
        mrr_update_available_window(qp->q_next, mrrp);
MRRCHKACK:
        if (mrrp->remote.rec_info.avail_win - mrrp->remote.rec_info.comm_win >
           (mrrp->remote.rec_info.avail_win >> 1))
                mrr_send_ack(mrrp, mrrp->pri);
        MRR_SPLX(s);
        MRR_UNLOCK(mrrp);
        return (0);


}

/*
 * mrr_lwsrv:  If the media is up, empty out the queue. If canput fails try
 * again
 */

int
mrr_lwsrv(qp)
        register queue_t *qp;
{
```

© COPYRIGHT 1994 AMDAHL CORPORATION

```
        register media_obj_t *medp;
        register mblk_t *mp;
        register       s = MRR_SETPL(s);
        MRR_PLT        oldpl;

        if (!(medp = dsf_chk_if_media_valid(qp->q_ptr)))
                return 0;
        /*
         * Check to see if any messages are there if so send them via media
         * qenabled by mrr_send_ack and mrr_send_nak
         */
        while ((mp = getq(qp)) != NULL) {
                register struct dsf_msg_header *dsf_hdr = (struct dsf_msg_header *)
                * mp->b_rptr;
                register mrr_element_t *mrrp = (mrr_element_t *) dsf_hdr->src_id;
                if (mrr_validate(mrrp, medp)) {
                        if (MRR_CHK_MEDQ(mp, qp, medp) || MRR_ALRDY_SNDING(mrrp)) {
                                MRRLOG(0, "mrr_lwsrv: trying again to send=%d\n", medp->index);
                                putbq(qp, mp);
                                MRR_SPLX(s);
                                MRR_UNLOCK(mrrp);
                                return (0);
                        } else {
                                /*
                                 * qprocoff will verify that we don't need to
                                 * hold any flags
                                 */
                                mrr_snd_msg_to_media(mrrp, mp);
                                MRR_UNLOCK(mrrp);
                        }
                }
        }
        MRR_SPLX(s);
        return (0);
}

/*
 * mrr_r_open_req: Send a R_OPEN request to the remote side,this is also used
 * when a module is poped.
 */

STATIC int
mrr_r_open_req(qp, mrrp, flag, sflag, credp)
        register queue_t *qp;
        register mrr_element_t *mrrp;
```

© COPYRIGHT 1994 AMDAHL CORPORATION

```
        register int    flag;
        register int    sflag;
        cred_t          *credp;
{
        register struct dsf_msg *r_open_req_ptr;
        mblk_t          *opmp;

        if ((opmp = allocb(sizeof(struct dsf_msg_header) + MRROPN(sflag),
                        BPRI_MED)) == NULL)
                return (0);     /* Try again */
        r_open_req_ptr = (struct dsf_msg *) opmp->b_rptr;
        opmp->b_wptr += sizeof(struct dsf_msg_header) + MRROPN(sflag);
        mrr_update_admin_header(&r_open_req_ptr->header, mrrp, opmp);
        if (sflag == MODOPEN) {
                r_open_req_ptr->body.admin_msg.type = R_PUSH_REQ;
                mrr_bcopy(qp->q_qinfo->qi_minfo->mi_idname,
                        r_open_req_ptr->body.admin_msg.r_push_req.mod_name,
                        DRV_NAME_LENGTH);
        } else {
                r_open_req_ptr->body.admin_msg.type = R_OPEN_REQ;
                r_open_req_ptr->body.admin_msg.r_open_req.minor_dev = mrrp->mrr_minor;
                r_open_req_ptr->body.admin_msg.r_open_req.flag = flag;
                r_open_req_ptr->body.admin_msg.r_open_req.sflag = sflag;
                r_open_req_ptr->body.admin_msg.r_open_req.orig_window_size =
                        mrrp->remote.rec_info.max_win;
                mrr_bcopy(mrrp->route->route_tbl.dev_name,
                        r_open_req_ptr->body.admin_msg.r_open_req.dev_name,
                        DRV_NAME_LENGTH);

        }
        mrr_cred_copy(&r_open_req_ptr->body.admin_msg.r_open_req.user_cred,
                credp);
        MRR_PUT_PRI(opmp, mrrp);
        (void) mrr_send_remote_mssg(mrrp, opmp, mrrp->pri);
        return (1);
}

/*
 * mrr_drv_close_req: send a R_CLOSE_REQ to the remote side. Must be send
 */
STATIC int
mrr_drv_close_req(mrrp, credp)
        register mrr_element_t *mrrp;
        cred_t          *credp;
```

© COPYRIGHT 1994 AMDAHL CORPORATION

```
{
	register struct dsf_msg *r_close_req_ptr;
	mblk_t		*clmp;

	while ((clmp = allocb((sizeof(struct dsf_msg_header) +
			sizeof(struct r_close_req)), BPRI_MED)) == NULL) {
		MRRLOG(mrrp->mrr_minor, "Failure in allocb during close =%x\n", mrrp);
		if (mrrp->cbid) {
			MRR_UNLOCK(mrrp);
			MRR_UNBUFCALL(mrrp->cbid);
			MRR_LOCK(mrrp, plstr);
		}
		if (!(mrrp->cbid = bufcall((sizeof(struct dsf_msg_header) +
					sizeof(struct r_close_req)), BPRI_MED, mrr_buf_wakeup,
mrrp))) {
			MRRLOG(mrrp->mrr_minor, "bufcall failed during closing=%d\n", mrrp);
			if (mrrp->ctid) {
				MRR_UNLOCK(mrrp);
				MRR_UNTIMEOUT(mrrp->ctid);
				MRR_LOCK(mrrp, plstr);
			}
			mrrp->ctid = MRR_TIMEOUT(mrr_buf_wakeup, mrrp, MRTIME);
		}
		mrrp->state |= MR_BUFCCLOSE;
		/* Sleep because of serializing of subsequent close */
		/* PZERO  | PCATCH get ignored for UTS4.0 */
		(void) MRR_SLEEP_NO_INTR(mrrp, (PZERO | PCATCH));
		MRR_LOCK(mrrp, plstr);		/* Get back the locks */
		mrrp->state &= ~MR_BUFCCLOSE;
		MRRLOG(0, "Bufcall sleep Woken Up=%x\n", mrrp);
		if (mrrp->cbid) {
			MRR_UNLOCK(mrrp);
			MRR_UNBUFCALL(mrrp->cbid);
			MRR_LOCK(mrrp, plstr);
			mrrp->cbid = 0;
		} else {
			MRR_UNLOCK(mrrp);
			MRR_UNTIMEOUT(mrrp->ctid);
			MRR_LOCK(mrrp, plstr);
			mrrp->ctid = 0;
		}
		if (mrrp->status & (MR_NOREMOTE | MR_MEDDOWNP))
			return (0);
	}
	r_close_req_ptr = (struct dsf_msg *) clmp->b_rptr;
```

© COPYRIGHT 1994 AMDAHL CORPORATION

```
	clmp->b_wptr += sizeof(struct dsf_msg_header) + sizeof(struct r_close_req);
	mrr_update_admin_header(&r_close_req_ptr->header, mrrp, clmp);
	r_close_req_ptr->body.admin_msg.type = R_CLOSE_REQ;
	mrr_cred_copy(&r_close_req_ptr->body.admin_msg.r_close_req.user_cred,
		credp);
	MRR_PUT_PRI(clmp, mrrp);
	(void) mrr_send_remote_mssg(mrrp, clmp, mrrp->pri);
	return (1);

}

/*
 * mrr_pop_req: send a R_POP_REQ to the remote side. Also used while poping
 * modules.
 */
STATIC int
mrr_pop_req(mrrp, credp)
	register mrr_element_t *mrrp;
	cred_t		*credp;

{
	register struct dsf_msg *r_pop_req_ptr;
	mblk_t		*popmp;

	while ((popmp = allocb((sizeof(struct dsf_msg_header) +
			sizeof(struct r_pop_req)), BPRI_MED)) == NULL) {
		MRRLOG(mrrp->mrr_minor, "Failure in allocb during pop%x\n", mrrp);
		if (mrrp->cbid) {
			MRR_UNLOCK(mrrp);
			MRR_UNBUFCALL(mrrp->cbid);
			MRR_LOCK(mrrp, plstr);
		}
		if (!(mrrp->cbid = bufcall((sizeof(struct dsf_msg_header) +
				sizeof(struct r_pop_req)), BPRI_MED, mrr_buf_wakeup,
mrrp))) {
			MRRLOG(mrrp->mrr_minor, "bufcall failed during closing=%x\n", mrrp);
			if (mrrp->ctid) {
				MRR_UNLOCK(mrrp);
				MRR_UNTIMEOUT(mrrp->ctid);
				MRR_LOCK(mrrp, plstr);
			}
			mrrp->ctid = MRR_TIMEOUT(mrr_buf_wakeup, mrrp, MRTIME);
		}
		mrrp->state |= MR_BUF_CLS_POP;
		/* Sleep because of serializing of subsequent pops */
```

© COPYRIGHT 1994 AMDAHL CORPORATION

```
                /* PZERO  | PCATCH get ignored for UTS4.0 */
                (void) MRR_SLEEP_NO_INTR(mrrp, (PZERO | PCATCH));
                MRR_LOCK(mrrp, plstr);
                mrrp->state &= ~MR_BUF_CLS_POP;
                MRRLOG(0, "Bufcall sleep Woken Up=%x\n", mrrp);
                if (mrrp->cbid) {
                        MRR_UNLOCK(mrrp);
                        MRR_UNBUFCALL(mrrp->cbid);
                        MRR_LOCK(mrrp, plstr);
                        mrrp->cbid = 0;
                } else {
                        MRR_UNLOCK(mrrp);
                        MRR_UNTIMEOUT(mrrp->ctid);
                        MRR_LOCK(mrrp, plstr);
                        mrrp->ctid = 0;
                }
                if (mrrp->status & (MR_NOREMOTE | MR_MEDDOWNP))
                        return (0);
        }
        r_pop_req_ptr = (struct dsf_msg *) popmp->b_rptr;
        popmp->b_wptr += sizeof(struct dsf_msg_header) + sizeof(struct r_pop_req);
        mrr_update_admin_header(&r_pop_req_ptr->header, mrrp, popmp);
        r_pop_req_ptr->body.admin_msg.type = R_POP_REQ;
        mrr_cred_copy(&r_pop_req_ptr->body.admin_msg.r_pop_req.user_cred,
                  credp);
        MRR_PUT_PRI(popmp, mrrp);
        (void) mrr_send_remote_mssg(mrrp, popmp, mrrp->pri);
        return (1);

}


/*
 * mrr_append_mp - Append message at the end of a  list.
 */

STATIC void
mrr_append_mp(mpl, mp)
        register mblk_t *mpl;
        mblk_t          *mp;
{
        while (mpl->b_next != NULL)
                mpl = mpl->b_next;
        mpl->b_next = mp;
```

© COPYRIGHT 1994 AMDAHL CORPORATION

```
}

/*
 * mrr_xmit_all_pri_msgs:Completes the information in the header, duplicates
 * the message to save in list of non-acked messages and then calls the put
 * of the driver. Please obtain a LOCK before calling this routine Also do a
 * canput before calling this routine. Yes there is a possibility that after
 * doing MRR_CHK_MEDQ the putnext can fail... Note that all messages will be
 * given a sequence number. Locks to be held
 */

STATIC void
mrr_xmit_all_pri_msgs(mrrp)
        mrr_element_t  *mrrp;
{

        register int    i;
        register int    s = MRR_SETPL(s);

        /* Get a LOCK before xmitting the messages */

        for (i = DSF_HI_PRI; i >= DSF_NORMAL_PRI; i--) {
                if (!mrr_xmit_pnd_msgs(mrrp, i)) {
                        break;
                }
        }
        MRR_SPLX(s);

}

/*
 * mrr_xmit_pnd_msgs:transmit a message with a given priority to the remote
 * side check if the window is open. If not queue it up and wait for the
 * window to open. LOCK held.
 */
STATIC int
mrr_xmit_pnd_msgs(mrrp, priority)
        mrr_element_t  *mrrp;
        int             priority;
{
        register mblk_t *msg;
        register struct xmit_info *xmit_infop =
        &mrrp->remote.send_info.xmit_info[priority];
```

© COPYRIGHT 1994 AMDAHL CORPORATION

```
#if _UTS
        if (mrrp->seq_msg_being_send) {
                if (!mrrp->tout_msg_being_snd)
                        mrrp->tout_msg_being_snd = MRR_TIMEOUT(mrr_msg_tobe_snd, mrrp, 0);
                if (!mrrp->tout_msg_being_snd)
                        MRRLOG(0, " timeout is zero %x\n", mrrp);
                return (1);
        }
#endif
        /*
         * Since locks are freed we have to synch with close. Hence
         * mrrp->urqptr is checked to see if close is waiting
         */
        while (mrrp->urqptr && (msg = xmit_infop->to_send_list) &&
              (mrrp->remote.send_info.state == FLOWING ||
                ((struct dsf_msg_header *) msg->b_rptr)->type != DSF_DATA)) {
                if (((struct dsf_msg_header *) msg->b_rptr)->fragm) {
                        xmit_infop->to_send_list = msg->b_next;
                        if (!mrr_fragment_dmsg(mrrp, priority, msg)) {
                                xmit_infop->to_send_list = msg;
                                return (0);
                        } else
                                continue;
                } else {
                        xmit_infop->to_send_list = msg->b_next;
                        if (!mrr_snd_to_media(mrrp, priority, msg)) {
                                xmit_infop->to_send_list = msg;
                                return (0);
                        }
                }

        }                       /* end of while */
        return (1);

}


/*
 * mrr_cred_copy: copy the credential into the admin message to be send.
 */

STATIC void
mrr_cred_copy(tocredp, fromcredp)
        register cred_t *tocredp, *fromcredp;
{
```

© COPYRIGHT 1994 AMDAHL CORPORATION

```
#if _UTS
        if (fromcredp) {
                bcopy((char *) fromcredp, (char *) tocredp, (sizeof(cred_t) +
                                        (sizeof(gid_t) * (ngroups_max - 1))));
                return;
        }
#else

        /*
         * This is SVR3.2 so set what ever fields you can use, use it and
         * hope for the best
         */
        *tocredp = loc_cred;
        tocredp->cr_uid = u.u_uid;
        tocredp->cr_gid = u.u_gid;
        tocredp->cr_ruid = u.u_ruid;
#endif
}

/*
 * mrr_lock_xmit: Get a lock before calling the xmit routine
 */
STATIC void
mrr_lock_xmit(mrrp)
        register mrr_element_t *mrrp;
{
        /* Obtain a lock before proceeding */
        register media_obj_t *mdp;
        MRR_PLT         oldpl;

        if (!(mdp = dsf_chk_if_media_valid(mrrp->med)) || !mrr_validate(mrrp, mdp))
                return;
        /* Make sure close does not beat us */
#if _UTS
        mrrp->wait_on_close = 1;
#endif
        mrrp->bid = 0;
        mrr_xmit_all_pri_msgs(mrrp);
        MRR_UNLOCK_CLOSE(mrrp);
}

/*
 * mrr_bufcall: calls buffcall, if not previously called
 */
```

© COPYRIGHT 1994 AMDAHL CORPORATION

```
STATIC void
mrr_bufcall(mrrp, mp)
        register mrr_element_t *mrrp;
        register mblk_t *mp;
{
        MRRLOG(0, "Bufcall occured reason failure of dupmsg %x\n", mrrp);
        if (!mrrp->bid)
                /*
                 * Is there a better way??. Since the failure has occured due
                 * to message block depletion(dupb failure).
                 */
                if (!(mrrp->bid = bufcall(mrr_no_of_msgblk(mp) * sizeof(mblk_t),
                                BPRI_MED, mrr_lock_xmit, mrrp)))        /* should be struct
                                                                        * mbinfo */
                        MRRLOG(0, "mrr_bufcall:bufcall failed %x\n", mrrp);
}

/*
 * mrr_elment_ins: This routine has to be called with write locks held, since
 * it is inserting an elment in a LL.
 */

STATIC void
mrr_elment_ins(mrrp)
        mrr_element_t  *mrrp;
{
        register int    index = MRHASH((int) mrrp, MRCONNSZ);
        register mrr_element_t *mconp, *pmconp;
        register media_obj_t *mrr_mdp = mrr_mediahp[mrrp->med];

        mconp = pmconp = mrr_mdp->mrrcon[index];
        while (mconp) {
                pmconp = mconp;
                mconp = mconp->mrr_next;
        }
        /* Need to insert the mrr_element_t now */
        if (!pmconp)
                mrr_mdp->mrrcon[index] = mrrp;
        else
                pmconp->mrr_next = mrrp;
        mrr_mdp->stats.mrr_count++;
        mrr_mdp->stats.mrr_tcount++;

}
```

© COPYRIGHT 1994 AMDAHL CORPORATION

```
/*
 * mrr_elment_rmv: This routine has to be called with all locks held, since
 * it is removing an element in a LL.
 */

STATIC void
mrr_elment_rmv(mrrp)
        mrr_element_t  *mrrp;
{
        register int    s = MRR_SETPL(s);
        register int    index = MRHASH((int) mrrp, MRCONNSZ);
        register mrr_element_t *mconp, *pmconp;
        register media_obj_t *mrr_mdp = mrr_mediahp[mrrp->med];

        mconp = pmconp = mrr_mdp->mrrcon[index];
        while (mconp && mconp != mrrp) {
                pmconp = mconp;
                mconp = mconp->mrr_next;
        }
        /* Need to remove the mrr_element_t now */
        if (mconp == NULL) {
                MRR_SPLX(s);
                return;
        }
        if (mconp == pmconp)
                mrr_mdp->mrrcon[index] = mconp->mrr_next;
        else
                pmconp->mrr_next = mconp->mrr_next;
        mrr_mdp->stats.mrr_count--;
        MRR_SPLX(s);
}

/*
 * mrr_chk_route: Locates the device driver entry in the routing table
 *
 */
STATIC struct mrr_route_info *
mrr_chk_route(mrr_major)
        register dev_t  mrr_major;
{
        register mrr_route_info_t *mrr_routep = NULL;
        register int    index;

        index = MRHASH(mrr_major, nmrr_route);
        mrr_routep = mrrhastbl[index];
```

© COPYRIGHT 1994 AMDAHL CORPORATION

```
        while (mrr_routep) {
                if (mrr_routep->route_tbl.mrid == mrr_major)
                        break;
                mrr_routep = mrr_routep->dr_chain;
        }
        return (mrr_routep);
}

/*
 * mrr_checkmediaup: Checks to see if the media is linked and is up
 *
 */

STATIC media_obj_t *
mrr_checkmediaup(mrr_routep)
        mrr_route_info_t *mrr_routep;
{
        register int    i = 0;
        register mrr_route_t *rp = &mrr_routep->route_tbl;
        register media_obj_t *mediap = mrr_mediahp[i];

        while (i < nmrr_media) {
                if (mediap) {
                        if (mrr_media_value_cmp(mediap->media.lower.media_value,
                                                rp->media_value)) {
                                if (mediap->status == DSF_MED_READY)
                                        return (mediap);

                        }
                }
                mediap = mrr_mediahp[++i];
        }
        return ((media_obj_t *) NULL);
}

/*
 * mrr_remoteq_init: Initialize the Flow contolling information
 */
STATIC void
mrr_remoteq_init(mrrp, q)
        struct mrr_element *mrrp;
        register queue_t *q;
{
        register int    i;
        struct r_queue_info *rmq = &mrrp->remote;
```

© COPYRIGHT 1994 AMDAHL CORPORATION

```
        register struct send_queue_info *snd_infop = &rmq->send_info;

        rmq->rec_info.comm_win = rmq->rec_info.avail_win =
                rmq->rec_info.max_win = (2 * q->q_hiwat);
        rmq->send_info.state = FLOWING;
        for (i = 0; i < DSF_PRIO_NUM; i++) {
                rmq->rec_info.rcv_info[i].rec_seq =
                        rmq->rec_info.rcv_info[i].ack_seq = 0;
                rmq->rec_info.rcv_info[i].rcv_frags = NULL;
                /* nak_seq cannot be set to 0, since seq no start with 0 */
                rmq->rec_info.rcv_info[i].nak_seq = -1;
                rmq->rec_info.rcv_info[i].rec_seq = 0;
                snd_infop->xmit_info[i].cur_seq = 0;
                snd_infop->xmit_info[i].acked = 0;
                snd_infop->xmit_info[i].fragp = NULL;
                snd_infop->xmit_info[i].xmit_msg = NULL;
                snd_infop->xmit_info[i].last_msg = &snd_infop->xmit_info[i].xmit_msg;
                snd_infop->xmit_info[i].to_send_list = NULL;
        }

}

/*
 * mrr_media_value_cmp: Compares the content of the media value upto the
 * first space. s1 is the string that contains all the media related
 * parameter. The first paramter (each parameter is separated by a space in
 * the media object ) is used for comparision The only reason for having
 * other parameters in the same string is for  future.
 */

int
mrr_media_value_cmp(s1, s2)
        register char  *s1, *s2;
{
        register int    size = MED_VALUE_SZ;

        while (size-- && (*s1 != '\0' || *s2 != '\0')) {
                if (*s1++ != *s2++)
                        return (0);
        }

        return (1);
}

/*
```

© COPYRIGHT 1994 AMDAHL CORPORATION

```
 * mrr_bcopy: copies data upto the given length or upto a '\0'
 */

STATIC void
mrr_bcopy(from, to, len)
        register char  *from, *to;
        register int    len;
{
        char            *dev;

        for (dev = to; len-- && *from != '\0'; from++, to++)
                *to = *from;
        if (len)
                *to = '\0';


}


/*
 * mrr_send_ack - Send an acknowledgement about received data and communicate
 * the current window. It updates the number of last ack sent, if it was
 * successful.
 */

void
mrr_send_ack(mrrp, priority)
        mrr_element_t  *mrrp;
        register int    priority;
{
        register struct dsf_msg *ack_msg_ptr;
        register mblk_t *ack_mp = allocb((sizeof(struct dsf_msg_header)
                                  + sizeof(struct r_ack_msg)), BPRI_MED);
        register struct rcv_info *rcv_infop;
        register media_obj_t *mrr_mdp;

        if (ack_mp == NULL) {
                if (mrrp->remote.rec_info.ack_nak_bid == 0 &&
                    (mrrp->remote.rec_info.ack_nak_bid = bufcall(
                   sizeof(struct dsf_msg_header) + sizeof(struct r_ack_msg),
                        BPRI_MED, mrr_resend_ack_naks, (long) mrrp)) == 0)
                        /* bufcall() failed, let ack be sent next time */
                        MRRLOG(0, "bufcall() failed in send_ack=%d\n", 0);
                return;         /* Could not allocate message buffer */
        }
```

© COPYRIGHT 1994 AMDAHL CORPORATION

```
#if _UTS
        ack_mp->b_band = DSF_HI_PRI;
#endif
        ack_msg_ptr = (struct dsf_msg *) ack_mp->b_rptr;
        ack_mp->b_wptr += (sizeof(struct dsf_msg_header)
                        + sizeof(struct r_ack_msg));
        ack_msg_ptr->header.type = DSF_ADMIN;
        ack_msg_ptr->header.priority = priority;
        ack_msg_ptr->header.ack_req = 0;
        ack_msg_ptr->header.fragm = 0;
        ack_msg_ptr->header.len = sizeof(struct dsf_msg_header)
                + sizeof(struct r_ack_msg);
        ack_msg_ptr->header.src_id = (int) mrrp;
        ack_msg_ptr->header.dest_id = mrrp->remote.remote_queue_id;
        ack_msg_ptr->header.seq = 0;        /* No seq needed */
        ack_msg_ptr->body.admin_msg.type = R_ACK_MSG;
        ack_msg_ptr->body.admin_msg.r_ack_msg.priority = priority;
        rcv_infop = &mrrp->remote.rec_info.rcv_info[priority];
        ack_msg_ptr->body.admin_msg.r_ack_msg.ack_seq =
                rcv_infop->ack_seq = rcv_infop->rec_seq;
        ack_msg_ptr->body.admin_msg.r_ack_msg.window_size =
            mrrp->remote.rec_info.avail_win;

        if (priority == mrrp->pri)
                mrrp->remote.rec_info.comm_win = mrrp->remote.rec_info.avail_win;
        if (mrrp->med < 0 || mrrp->med >= nmrr_media) {
                MRRLOG(mrrp->med, "Index not in range at Ack time %x\n", mrrp);
                return;
        }
        mrr_mdp = mrr_mediahp[mrrp->med];
        if (MRR_CHK_MEDQ(ack_mp, mrr_mdp->media.lwqp, mrr_mdp)) {
                MRRLOG(0, "mrr_send_ack:putting on lower write queue%x\n", mrrp);
                putq(mrr_mdp->media.lwqp, ack_mp);
                enableok(mrr_mdp->media.lwqp);
                qenable(mrr_mdp->media.lwqp);
                return;
        } else {

#if _UTS
                /* If  an ack is already in progress then save the message */
                if (mrrp->ack_nak_msg || mrrp->ack_nak_being_snd) {
                        mrr_append_acknak_chk_xmit(mrrp, ack_mp);
                        return;
                }
                mrrp->ack_nak_being_snd = 1;
```

© COPYRIGHT 1994 AMDAHL CORPORATION

```
#endif
                mrr_just_snd_msg_to_media(mrrp, ack_mp);
#if _UTS
                /* Check if close is waiting for us */
                if (mrrp->urqptr) {
                        mrrp->ack_nak_being_snd = 0;
                        /* Check if any more acks/nak need to be send */
                        mrr_snd_pnd_ack_nak(mrrp);
                }
#endif

        }

}

/*
 * mrr_resend_ack_naks: If the acks or nak admin messages could not be send
 * then this funtion will send them.
 */
STATIC void
mrr_resend_ack_naks(mrrp)
        struct mrr_element *mrrp;
{
        register int    i;
        register struct rcv_info *rcv_infop;
        register media_obj_t *mdp;
        MRR_PLT         oldpl;


        if (!(mdp = dsf_chk_if_media_valid(mrrp->med)) || !mrr_validate(mrrp, mdp))
                return;
        /* Make sure close does not beat us */
#if _UTS
        mrrp->wait_on_close = 1;
#endif
        mrrp->remote.rec_info.ack_nak_bid = 0;     /* Clear bufcall field */
        for (i = DSF_PRIO_NUM - 1; i >= 0; i--) {
                rcv_infop = &mrrp->remote.rec_info.rcv_info[i];
                if (rcv_infop->rec_seq == rcv_infop->nak_seq)
                        /* NAK needs to be sent for this priority */
                        mrr_send_nak(mrrp, i, mrrp->remote.rec_info.avail_win);
                else if (rcv_infop->rec_seq != rcv_infop->ack_seq ||
                         (i == mrrp->pri && mrrp->remote.rec_info.comm_win <= 0
                          && mrrp->remote.rec_info.avail_win > 0))
                        mrr_send_ack(mrrp, i);
```

© COPYRIGHT 1994 AMDAHL CORPORATION

```
	}
	MRR_UNLOCK_CLOSE(mrrp);
}

/*
 * mrr_send_nak - Tell the remote the next expected sequence number and the
 * current window. If due to resource problems the message can not be sent,
 * make a bufcall to guarantee later delivery. Make a note about the nak
 * message so it won't be duplicated. In case of success, it updates the
 * number of last ack sent and the comm_win field.
 */

STATIC void
mrr_send_nak(mrrp, priority, window)
	struct mrr_element *mrrp;
	int		priority;
	register int	window;
{
	register struct dsf_msg *nak_msg_ptr;
	register mblk_t *nak_mp = allocb(sizeof(struct dsf_msg_header)
				+ sizeof(struct r_nak_msg), BPRI_MED);
	register struct rcv_info *rcv_infop;
	register media_obj_t *mrr_mdp;

	rcv_infop = &mrrp->remote.rec_info.rcv_info[priority];
	rcv_infop->nak_seq = rcv_infop->rec_seq;
	if (nak_mp == NULL) {
		/* Could not allocate message buffer */
		if (mrrp->remote.rec_info.ack_nak_bid == 0)
			if ((mrrp->remote.rec_info.ack_nak_bid = bufcall(
							sizeof(struct dsf_msg_header) +
sizeof(struct r_nak_msg),
			BPRI_MED, mrr_resend_ack_naks, (long) mrrp)) == 0) {
				MRRLOG(0, "Bufcall during Ack/Nak=%x\n", mrrp);

				/*
				 * bufcall() failed, let nak be sent next
				 * time
				 */
				/* rcv_infop->nak_seq--; */
			}
		return;
	}
	rcv_infop->ack_seq = rcv_infop->rec_seq;
	nak_msg_ptr = (struct dsf_msg *) nak_mp->b_rptr;
```

© COPYRIGHT 1994 AMDAHL CORPORATION

```
        nak_mp->b_wptr += (sizeof(struct dsf_msg_header)
                        + sizeof(struct r_nak_msg));
        nak_msg_ptr->header.type = DSF_ADMIN;
#if _UTS
        nak_mp->b_band = DSF_HI_PRI;
#endif
        nak_msg_ptr->header.priority = priority;
        if (mrrp->remote.send_info.non_acked_bytes > 0 && mrrp->pri == priority)
                nak_msg_ptr->header.ack_req = 1;
        else
                nak_msg_ptr->header.ack_req = 0;
        nak_msg_ptr->header.fragm = 0;
        nak_msg_ptr->header.len = sizeof(struct dsf_msg_header)
                + sizeof(struct r_nak_msg);
        nak_msg_ptr->header.src_id = (int) mrrp;
        nak_msg_ptr->header.dest_id = mrrp->remote.remote_queue_id;
        /* No seq number needed */
        nak_msg_ptr->header.seq = 0;
        nak_msg_ptr->body.admin_msg.type = R_NAK_MSG;
        nak_msg_ptr->body.admin_msg.r_nak_msg.priority = priority;
        nak_msg_ptr->body.admin_msg.r_nak_msg.nak_seq = rcv_infop->nak_seq;
        nak_msg_ptr->body.admin_msg.r_nak_msg.window_size = window;
        if (priority == mrrp->pri)
                mrrp->remote.rec_info.comm_win = window;
        if (mrrp->med < 0 || mrrp->med >= nmrr_media) {
                MRRLOG(0, "Index not in range at Ack time=%d\n", mrrp->med);
                return;
        }
        mrr_mdp = mrr_mediahp[mrrp->med];
        if (MRR_CHK_MEDQ(nak_mp, mrr_mdp->media.lwqp, mrr_mdp)) {
                MRRLOG(0, "mrr_send_nak:canput failed=%x\n", mrrp);
                putq(mrr_mdp->media.lwqp, nak_mp);
                enableok(mrr_mdp->media.lwqp);
                qenable(mrr_mdp->media.lwqp);
                return;
        } else {

#if _UTS
                /* If  an nak is already in progress then save the messages */
                if (mrrp->ack_nak_msg || mrrp->ack_nak_being_snd) {
                        MRRLOG(0, "Putting nak message on queue %x\n", mrrp);
                        mrr_append_acknak_chk_xmit(mrrp, nak_mp);
                        return;
                }
                mrrp->ack_nak_being_snd = 1;
```

© COPYRIGHT 1994 AMDAHL CORPORATION

```
#endif
                mrr_just_snd_msg_to_media(mrrp, nak_mp);
#if _UTS
                if (mrrp->urqptr) {
                        /* Check if any acks are pending */
                        mrrp->ack_nak_being_snd = 0;
                        mrr_snd_pnd_ack_nak(mrrp);
                }
#endif

                mrrp->stats.naks_send++;

        }

}

/*
 * mrr_free_mem: frees all the allocation  and frees messages if any. in the
 * mr_element structure. Lock held
 */

STATIC void
mrr_free_mem(mrrp)
        register mrr_element_t *mrrp;
{
        register        s = MRR_SETPL(s);
        register mrr_act_admin_t *prv, *nxt;
        register int    i;

        MRR_LOCK(mrrp, plstr);
        for (prv = mrrp->info; prv;) {
                if (prv->ml)
                        freemsg(prv->ml);
                nxt = prv;
                prv = prv->next;
                KMEM_FREE(nxt, sizeof(mrr_act_admin_t));
        }

        /* Before  actual close check transmit buffer */
        for (i = 0; i < DSF_PRIO_NUM; i++) {
                mrr_free_mp_list(mrrp->remote.send_info.xmit_info[i].fragp);
                mrrp->remote.send_info.xmit_info[i].fragp = NULL;
                mrr_free_mp_list(mrrp->remote.send_info.xmit_info[i].xmit_msg);
                mrrp->remote.send_info.xmit_info[i].xmit_msg = NULL;
                mrrp->remote.send_info.xmit_info[i].last_msg =
```

© COPYRIGHT 1994 AMDAHL CORPORATION

```
                &mrrp->remote.send_info.xmit_info[i].xmit_msg;
            mrr_free_mp_list(mrrp->remote.send_info.xmit_info[i].to_send_list);
            mrrp->remote.send_info.xmit_info[i].to_send_list = NULL;
            /* Check fragments received */
            mrr_free_mp_list(mrrp->remote.rec_info.rcv_info[i].rcv_frags);
            mrrp->remote.rec_info.rcv_info[i].rcv_frags = NULL;
        }
        if (mrrp->hi_pri_msg) {
            mrr_free_mp_list(mrrp->hi_pri_msg);
            mrrp->hi_pri_msg = NULL;
        }
#if _UTS
        if (mrrp->msg_frag) {
            freemsg(mrrp->msg_frag);
            mrrp->msg_frag = NULL;
            mrrp->msg_frag_len = 0;
        }
        /* Free any ack/nak messages */
        mrr_free_mp_list(mrrp->ack_nak_msg);
        /* Free the locks */
        if (mrrp->svp)
            SV_DEALLOC(mrrp->svp);
        /*
         * Since we are going to free the lock make sure that the lock is not
         * held by anybody.
         */
        /* Loop till the lock is free */
        while (mrrp->wait_on_close || mrrp->seq_msg_being_send ||
              mrrp->ack_nak_being_snd) {
            MRR_UNLOCK(mrrp);
            MRRLOG(mrrp, "Looping in close for lock %x", mrrp);
            MRR_LOCK(mrrp, plstr);
        }
        MRR_UNLOCK(mrrp);
        LOCK_DEALLOC(mrrp->lkp);

#endif

        /* Now free the mrr_element itself */
        KMEM_FREE(mrrp, sizeof(mrr_element_t));
        MRR_SPLX(s);
}

/*
 * mrr_free_mp_list - Frees a list of messages in the xmit buffer
```

© COPYRIGHT 1994 AMDAHL CORPORATION

```
*/

STATIC void
mrr_free_mp_list(mp)
        register mblk_t *mp;
{
        register mblk_t *tmp_msg;

        while (mp != NULL) {
                tmp_msg = mp;
                mp = mp->b_next;
                tmp_msg->b_next = NULL;
                freemsg(tmp_msg);
        }
}

/*
 * mrr_sanity_check: Checks to see if it is okay to send a message to the
 * lower mux. If not then it takes appropriate action. LOCK is held
 */

STATIC int
mrr_sanity_check(qp, mp, put)
        register queue_t *qp;
        register mblk_t *mp;
        register int    (*put) ();
{
        register mrr_element_t *mrrp = (mrr_element_t *) qp->q_ptr;

        if (!mrrp && mrrp->status & MR_HANGUPSEND) {
                MRRLOG(0,
                "mrr_uw***: Has  NULL OR a hangup has been send %x\n", mrrp);
                freemsg(mp);
                return (0);
        }
        if (mrrp->status & (MR_NOREMOTE | MR_MEDDOWNP)) {
                MRRLOG(0,
                "No partner OR Medium down, sending an M_HANGUP %x\n", mrrp);
                mp->b_datap->db_type = M_HANGUP;
                MRR_UNLOCK(mrrp);
                putnext(OTHERQ(qp), mp);
                MRR_LOCK(mrrp, plstr);
                return (0);
        }
        if (mrrp->status & MR_MEDDOWN) {
```

© COPYRIGHT 1994 AMDAHL CORPORATION

```
                /* Wait for the medium to come down or become UN_BLOCKED */
                MRRLOG(mrrp->status, "mrr_sanity_check: Media Down %x\n", mrrp);
                noenable(qp);   /* Service routine enabled when media comes
                                 * up. */
                (*put) (qp, mp);/* let the service routine take careof it */

                return (0);
        }
        if (mrrp->status & MR_REXMIT)
                mrr_rexmit_msg(mrrp);
        return (1);
}


/*
 * mrr_rexmit_msg: Re transmits all the message which have not been acked
 */
void
mrr_rexmit_msg(mrrp)
        mrr_element_t  *mrrp;
{
        register int    i = 0;

        for (i = DSF_HI_PRI; i >= DSF_NORMAL_PRI; i--)
                mrr_comb_rxmit_pend_mssg(mrrp, i);
        mrr_xmit_all_pri_msgs(mrrp);
}

/*
 * mrr_uwrite_process: Common routine for upper put and service routine The
 * only function which is taken care of is the M_IOCTL(I_LINK and the
 * I_UNLINK. Entered locked.
 */
STATIC int
mrr_uwrite_process(qp, mp)
        register queue_t *qp;
        register mblk_t *mp;
{
        register mrr_element_t *mrrp = (mrr_element_t *) qp->q_ptr;
        register struct iocblk *iocp;

        /* Now check if it is an M_IOCTL message */
        switch (mp->b_datap->db_type) {
        case M_FLUSH:                   /* May be send to remote side also */
                if (*mp->b_rptr & FLUSHW) {
```

© COPYRIGHT 1994 AMDAHL CORPORATION

```
                        flushq(qp, FLUSHALL);
                        *mp->b_rptr &= ~FLUSHW;
                        mrr_flush_private_q(mrrp, mrrp->pri);
                }
                if (*mp->b_rptr & FLUSHR) {
                        flushq(RD(qp), FLUSHALL);

                        /*
                         * No need of qreply since the remote side will send
                         * us anyway
                         */
                }
#if _UTS
                if (*mp->b_rptr & FLUSHBAND) {
                        flushband(qp, *(mp->b_rptr + sizeof(char)), FLUSHALL);
                        mrr_flush_private_q(mrrp, DSF_BAND_PRI);
                }
#endif

                break;
        case M_IOCTL:
                if ((mp->b_wptr - mp->b_rptr) < sizeof(struct iocblk)) {
                        break;  /* send it to the remote side */

                }
                iocp = (struct iocblk *) mp->b_rptr;

                /*
                 * Most of the IOCTL are passed on except the I_LINK and
                 * I_UNLINK
                 */
                switch (iocp->ioc_cmd) {
                case I_LINK:
                case I_UNLINK:

#if _UTS
                case I_PLINK:
                case I_PUNLINK:
#endif

                        if (!mrr_send_link(mrrp, mp)) {
                                MRR_UNLOCK(mrrp);
                                putnext(OTHERQ(qp), mp);
                                MRR_LOCK(mrrp, plstr);
                        }
```

© COPYRIGHT 1994 AMDAHL CORPORATION

```
                        return (MRR_XMIT_PASS);
                default:

                        /*
                         * Save the value of the credential pointer only for
                         * UTS4. Only one is saved .
                         */

#if _UTS
                        /* Append the credential to the M_IOCTL message */
                        if (!mrr_io_cr_append(mp)) {
                                MRR_UNLOCK(mrrp);
                                putnext(OTHERQ(qp), mp);
                                MRR_LOCK(mrrp, plstr);
                                return (MRR_XMIT_PASS);
                        }
                        mrrp->io_cr = iocp->ioc_cr;
                        /* Indicate to remote  that this is from UTS4 */
                        iocp->ioc_cr = (cred_t *) - 1;
#else
                        mrrp->io_cr = (long) iocp->ioc_uid;
#endif

                        break;
                }

        default:
                break;
        }
        /* Just form a data_msg and send it over to the remote side */
        return (mrr_data_mssg(qp, mp));
}

/*
 * mrr_io_cr_append: This function alloctes a message block for the
 * credential structure and appends it to the existing message.
 */

#if _UTS
STATIC int
mrr_io_cr_append(mp)
        register mblk_t *mp;
{
        static frtn_t   mrr_free_rtn = {mrr_free_cred_struct, 0};
        register struct iocblk *iocp = (struct iocblk *) mp->b_rptr;
```

© COPYRIGHT 1994 AMDAHL CORPORATION

```
        register mblk_t *temp_bp = mp->b_cont;
        register mblk_t *mp_cred = esballoc((uchar_t *) iocp->ioc_cr,
                                sizeof(cred_t), BPRI_MED, &mrr_free_rtn);

        if (!mp_cred) {
                mp->b_datap->db_type = M_IOCNAK;
                return (0);
        }
        mp->b_cont = mp_cred;
        mp_cred->b_wptr += sizeof(cred_t);
        mp_cred->b_cont = temp_bp;
        return (1);

}

void
mrr_free_cred_struct()
{

}

#endif

/*
 * mrr_send_link: Send an R_LINK or R_UNLINK command to the remote side any
 * failure results in a M_IOCNAK to be send upstream.
 */
STATIC int
mrr_send_link(mrrp, mp)
        register mrr_element_t *mrrp;
        register mblk_t *mp;
{
        struct dsf_msg *r_link_req_ptr;
        mblk_t          *limp;
        register struct iocblk *iocp = (struct iocblk *) mp->b_rptr;
        register struct linkblk *linkp;

        if (!mp->b_cont) {
                mp->b_datap->db_type = M_IOCNAK;
                return (0);
        }
        linkp = (struct linkblk *) mp->b_cont->b_rptr;
        if ((limp = allocb(sizeof(struct dsf_msg_header) +
                        MRRLINK(iocp->ioc_cmd), BPRI_MED)) == NULL) {
                iocp->ioc_error = ENOSR;
```

© COPYRIGHT 1994 AMDAHL CORPORATION

```
		mp->b_datap->db_type = M_IOCNAK;
		return (0);	/* Try again */
	}
	if (iocp->ioc_cmd == I_LINK || iocp->ioc_cmd == I_PLINK) {
		if (!mrr_link_alloc(mrrp, mp)) {
			freemsg(limp);
			iocp->ioc_error = ENOSR;
			mp->b_datap->db_type = M_IOCNAK;
			return (0);	/* Try again */
		}
	}
	r_link_req_ptr = (struct dsf_msg *) limp->b_rptr;
	limp->b_wptr += sizeof(struct dsf_msg_header) + MRRLINK(iocp->ioc_cmd);
	mrr_update_admin_header(&r_link_req_ptr->header, mrrp, limp);
	if (iocp->ioc_cmd == I_LINK || iocp->ioc_cmd == I_PLINK)
		r_link_req_ptr->body.admin_msg.type = R_LINK_REQ;
	else
		r_link_req_ptr->body.admin_msg.type = R_UNLINK_REQ;

#if _UTS
	mrr_cred_copy(&r_link_req_ptr->body.admin_msg.r_link_req.user_cred,
			iocp->ioc_cr);
#else
	mrr_cred_copy(&r_link_req_ptr->body.admin_msg.r_link_req.user_cred,
			NULL);
#endif

	r_link_req_ptr->body.admin_msg.r_link_req.cmd = iocp->ioc_cmd;
	if (iocp->ioc_cmd == I_LINK || iocp->ioc_cmd == I_PLINK) {
		register mrr_element_t *mrp_b =
		(mrr_element_t *) (linkp->l_qbot->q_next)->q_ptr;

		r_link_req_ptr->body.admin_msg.r_link_req.lower_fd =
			mrp_b->remote.remote_queue_id;
		r_link_req_ptr->body.admin_msg.r_link_req.upper_linkid =
			linkp->l_index;

	} else {		/* May have to assert mrrp->info-> */
		r_link_req_ptr->body.admin_msg.r_unlink_req.upper_linkid =
			linkp->l_index;
		r_link_req_ptr->body.admin_msg.r_unlink_req.lower_linkid =
			mrr_find_ulink(mrrp, linkp->l_index, mp);
		if (r_link_req_ptr->body.admin_msg.r_unlink_req.lower_linkid < 0) {
			freemsg(limp);
			iocp->ioc_error = EINVAL;
```

© COPYRIGHT 1994 AMDAHL CORPORATION

```
                        mp->b_datap->db_type = M_IOCNAK;
                        MRRLOG(mrrp->info, "Could Not find the link index=%x \n", mrrp);
                        return (0);
                }
        }

        mrrp->state |= (iocp->ioc_cmd == I_LINK || iocp->ioc_cmd == I_PLINK) ?
                MR_LINKING : MR_UNLINKING;
        /* Make sure that is the priority of the message */
        MRR_PUT_PRI(limp, mrrp);
        (void) mrr_send_remote_mssg(mrrp, limp, mrrp->pri);
        return (1);

}

/*
 * mrr_link_alloc: allocates storage for link information. Returns a zero on
 * a failure.
 */
STATIC int
mrr_link_alloc(mrrp, mp)
        register mrr_element_t *mrrp;
        register mblk_t *mp;
{
        register mrr_act_admin_t *ad_inp;

        if (!(ad_inp = (mrr_act_admin_t *) KMEM_ALLOC(sizeof(mrr_act_admin_t),
                                                KM_NOSLEEP))) {
                return (0);
        }
        bzero((caddr_t) ad_inp, sizeof(mrr_act_admin_t));
        if (!mrrp->info)
                mrrp->info = ad_inp;
        else {
                register mrr_act_admin_t *prv, *pres;

                for (prv = pres = mrrp->info; pres;) {
                        prv = pres;
                        pres = pres->next;
                }
                prv->next = ad_inp;
        }
        /* Initialize the information */
        ad_inp->ml = mp;
        ad_inp->local = *((struct linkblk *) mp->b_cont->b_rptr);
```

© COPYRIGHT 1994 AMDAHL CORPORATION

```
        return (1);
}

/*
 * mrr_update_admin_header: Updates all the elment in the header. This is
 * only used for an admin message.
 */

STATIC void
mrr_update_admin_header(hptr, mrrp, mp)
        register struct dsf_msg_header *hptr;
        register mrr_element_t *mrrp;
        register mblk_t *mp;
{
        hptr->type = (char) DSF_ADMIN;
        hptr->ack_req = 1;    /* ask for a ack */
        hptr->len = MSGBLEN(mp);
        hptr->fragm = 0;
        hptr->dest_id = mrrp->remote.remote_queue_id;
        hptr->src_id = (int) mrrp;
        hptr->seq = mrrp->remote.send_info.xmit_info[mrrp->pri].cur_seq++;
}


/*
 * mrr_build_msg - Construct a STREAMS message out of a flat buffer. It
 * returns the total length of the message (non-negative int), or in case of
 * allocation failure 0 mpp points to the created STREAMS message.
 */

STATIC int
mrr_build_msg(buff_ptr, mpp)
        struct msg_buff *buff_ptr;
        mblk_t        **mpp;
{
        register mblk_t *new_mp, **cur_mpp;
        register int    processed_len = 0;

        *mpp = NULL;
        cur_mpp = mpp;
        for (;;) {
                if ((new_mp = allocb(buff_ptr->length + buff_ptr->offset, BPRI_MED))
                    == NULL) {

                        /*
```

© COPYRIGHT 1994 AMDAHL CORPORATION

```
                 * Allocation failed, free already allocated part and
                 * return 0
                 */
                MRRLOG(0, "Error in allocation data during build_msg=%d\n",
                      buff_ptr->length + buff_ptr->offset);
                *cur_mpp = NULL;
                freemsg(*mpp);
                return (-1);
            }
            *cur_mpp = new_mp;
            new_mp->b_rptr += buff_ptr->offset;
            new_mp->b_wptr = new_mp->b_rptr + buff_ptr->length;

#if _UTS
            new_mp->b_band = buff_ptr->band;
            new_mp->b_flag = buff_ptr->flag;
#endif

            new_mp->b_datap->db_type = buff_ptr->type;
            cur_mpp = &new_mp->b_cont;
            bcopy((char *) buff_ptr + buff_ptr->dataoffset, new_mp->b_rptr,
                buff_ptr->length);
            processed_len += buff_ptr->length;
            if (buff_ptr->cont == 0) {
                *cur_mpp = NULL;
                return (processed_len);
            }
            buff_ptr++;    /* Goto next message block */
        }
}

/*
 * mrr_snd_no_part - Send an R_NO_PARTNER message to remote. If memory is not
 * available to allocate message buffer, do not send any, as this is for
 * information purpose only.
 */

STATIC void
mrr_snd_no_part(mdp, src, dest)
        register media_obj_t *mdp;
        register int    src;
        register int    dest;
{
        register struct dsf_msg *no_partner_msgp;
        mblk_t         *npmp;
```

© COPYRIGHT 1994 AMDAHL CORPORATION

```
        register mrr_element_t *mrrp = (mrr_element_t *) dest;

        if ((npmp = allocb((sizeof(struct dsf_msg_header) +
                        sizeof(struct r_no_partner)))) == NULL) {
                MRRLOG(mrrp, "Can't send R_NO_PARTNER. allocb failure %x\n", mrrp);
                return;         /* No resource */
        }
        no_partner_msgp = (struct dsf_msg *) npmp->b_rptr;
        npmp->b_wptr += (sizeof(struct dsf_msg_header) +
                        sizeof(struct r_no_partner));
        no_partner_msgp->header.type = DSF_ADMIN;
#if _UTS
        npmp->b_band = DSF_NORMAL_PRI;
#endif
        no_partner_msgp->header.priority = DSF_NORMAL_PRI;
        no_partner_msgp->header.ack_req = 0;
        no_partner_msgp->header.fragm = 0;
        no_partner_msgp->header.len = (npmp->b_wptr - npmp->b_rptr);
        no_partner_msgp->header.src_id = 0;
        no_partner_msgp->header.dest_id = 0;
        no_partner_msgp->header.seq = 0;
        no_partner_msgp->body.admin_msg.type = R_NO_PARTNER;
        no_partner_msgp->body.admin_msg.r_no_partner.src_id = src;
        no_partner_msgp->body.admin_msg.r_no_partner.dest_id = dest;
        if (MRR_CHK_MEDQ(npmp, mdp->media.lwqp, mdp)) {
                putq(mdp->media.lwqp, npmp);
                enableok(mdp->media.lwqp);
                qenable(mdp->media.lwqp);
                MRRLOG(0, "mrr_snd_no_part: failed %x\n", mrrp);
                return;
        } else
                mrr_just_snd_msg_to_media(mrrp, npmp);
}

/*
 * mrr_data_mssg: Convert an actual user message into a dsf message and send
 * over to the media driver.
 */
STATIC int
mrr_data_mssg(qp, mp)
        register queue_t *qp;
        register mblk_t *mp;
{
        register mrr_element_t *mrrp = (mrr_element_t *) qp->q_ptr;
        register mblk_t *dsf_mp;
```

© COPYRIGHT 1994 AMDAHL CORPORATION

```
        register int    msgsize, adj_msg_len;
        int             n = 0, pri;
        register struct dsf_msg_header *dsf;

        n = mrr_no_of_msgblk(mp);
        msgsize = sizeof(struct dsf_msg_header) + (n * sizeof(struct msg_buff));
        /* Make sure that the message is aligned on an int boundry */
        if ((adj_msg_len = (mrr_msg_length(mp) % sizeof(int)))) {
                adj_msg_len = (sizeof(int) - adj_msg_len);
                msgsize += adj_msg_len;
        }
        if ((dsf_mp = allocb(msgsize, BPRI_MED)) == NULL) {
                MRRLOG(msgsize, "mrr_data_mssg: Failure in allocb=%x\n", mrrp);
                noenable(qp);
                if (queclass(mp) == QNORM) {
                        mrr_xmit_alloc_fail(mrrp, msgsize);
                        return (MRR_XMIT_FAIL);

                } else {
                        /* Save High priority messages */
                        mrr_save_hpri_mssg(mrrp, mp);
                        mrr_xmit_alloc_fail(mrrp, msgsize);
                        return (MRR_XMIT_BRK);
                }
        }
        dsf_mp->b_wptr += msgsize;
        mrr_build_msg_buff((struct dsf_msg_header *) dsf_mp->b_rptr, mp,
                        mrrp, adj_msg_len);
        linkb(dsf_mp, mp);
        if (mp->b_datap->db_type & QPCTL) {      /* high priority cntrl */
                pri = DSF_HI_PRI;
#if _UTS
                dsf_mp->b_band = pri;
#endif
        } else {

#if _UTS
                if (mp->b_band == 0) {      /* normal band messages */
                        pri = mrrp->pri;
                        /*
                         * Still check if we can send it out at higher band
                         * priority
                         */
                        if (mp->b_datap->db_type == M_IOCTL) {
                                MRR_PUT_PRI(dsf_mp, mrrp);
```

© COPYRIGHT 1994 AMDAHL CORPORATION

```
			} else
				dsf_mp->b_band = pri;
		} else {		/* High band priority */
			pri = DSF_BAND_PRI;
			dsf_mp->b_band = pri;
		}
#else
		pri = mrrp->pri;
#endif
	}

	dsf = (struct dsf_msg_header *) dsf_mp->b_rptr;
	if (pri > mrrp->pri || mrrp->remote.send_info.non_acked_bytes >=
	   mrr_ack_req_thresh) {
		dsf->ack_req = 1;
	}
	dsf->seq = mrrp->remote.send_info.xmit_info[pri].cur_seq++;
	dsf->priority = pri;
	return (mrr_send_remote_mssg(mrrp, dsf_mp, pri));
}

/*
 * mrr_send_remote_mssg: Will transmit a message if  bufcall is not pending.
 * If no pending messages, then send directly. Locks required on entry.
 *
 */

STATIC int
mrr_send_remote_mssg(mrrp, dsf_mp, pri)
	mrr_element_t  *mrrp;
	register mblk_t *dsf_mp;
	register int    pri;
{
	register	s = MRR_SETPL(s);
	register struct xmit_info *xmit_infop =
	&mrrp->remote.send_info.xmit_info[pri];
	struct dsf_msg_header *dsf = (struct dsf_msg_header *) dsf_mp->b_rptr;
	register media_obj_t *mrr_mdp = mrr_mediahp[mrrp->med];

	/*
	 * If a message is being send then wait since a race condition can
	 * develop. This can occur in an MP environment since  locks are not
	 * held across media driver.
	 */
```

© COPYRIGHT 1994 AMDAHL CORPORATION

```
#if _UTS
        if (mrrp->seq_msg_being_send) {
                mrr_append_msg_chk_xmit(mrrp, dsf_mp, pri);
                return (MRR_XMIT_PASS);
        }
#endif

        /* If message on send list then queue them up behind */
        if (xmit_infop->to_send_list) {
                MRRLOG(0, "Appending Message to xmit of = %x\n", mrrp);
                mrr_append_mp(xmit_infop->to_send_list, dsf_mp);
                if (!mrrp->bid || !mrrp->cbid || !mrrp->ctid)
                        (void) mrr_xmit_pnd_msgs(mrrp, pri);

        } else {
                /* No pending message */
                /* Now check whether message has to be fragmented */
                if (dsf->len > mrr_mdp->media.lower.max_msg_size) {
                        dsf->fragm = mrr_frag_no(dsf->len,
                                        mrr_mdp->media.lower.max_msg_size);
                        if (!mrr_fragment_dmsg(mrrp, pri, dsf_mp)) {
                                xmit_infop->to_send_list = dsf_mp;
                                dsf_mp->b_next = NULL;
                                /* Since it failed  stop & wait */
                                MRR_SPLX(s);
                                return (MRR_XMIT_BRK);
                        }
                } else {        /* Normal Data or Admin messages */
                        if (!mrr_snd_to_media(mrrp, pri, dsf_mp)) {
                                xmit_infop->to_send_list = dsf_mp;
                                dsf_mp->b_next = NULL;
                                MRR_SPLX(s);
                                return (MRR_XMIT_BRK);
                        }
                }
        }
        MRR_SPLX(s);
        return (MRR_XMIT_PASS);

}

/*
 * mrr_build_msg_buff - Creates a dsf_msg and copy the data and control
 * information into it.
 */
```

© COPYRIGHT 1994 AMDAHL CORPORATION

```
STATIC void
mrr_build_msg_buff(dsf_msg_header, mp, mrrp, alignoff)
        struct dsf_msg_header *dsf_msg_header;
        mblk_t        *mp;
        register mrr_element_t *mrrp;
        register int    alignoff;
{
        register int    control_len;
        register int    rem_control_len;
        register struct msg_buff *msg_buff_ptr;
        register mblk_t *cur_mp = mp;
        register int    data_len;

        dsf_msg_header->type = DSF_DATA;
        dsf_msg_header->src_id = (int) mrrp;
        dsf_msg_header->dest_id = mrrp->remote.remote_queue_id;
        dsf_msg_header->fragm = 0;
        dsf_msg_header->ack_req = 0;        /* Decide later if ack is wanted */
        msg_buff_ptr = (struct msg_buff *) (dsf_msg_header + 1);

        /* Write the control information before copying the data */
        control_len = sizeof(struct msg_buff) + alignoff;

        /* The first block's type, band, and flag apply to all */
        msg_buff_ptr->offset = cur_mp->b_rptr - cur_mp->b_datap->db_base;

#if _UTS
        msg_buff_ptr->flag = cur_mp->b_flag;
        msg_buff_ptr->band = cur_mp->b_band;
#else
        msg_buff_ptr->flag = msg_buff_ptr->band = 0;
#endif

        msg_buff_ptr->type = cur_mp->b_datap->db_type;
        msg_buff_ptr->length = cur_mp->b_wptr - cur_mp->b_rptr;
        cur_mp = cur_mp->b_cont;
        while (cur_mp != NULL) {
                msg_buff_ptr->cont = 1;
                control_len += sizeof(struct msg_buff);
                msg_buff_ptr++;
                msg_buff_ptr->length = cur_mp->b_wptr - cur_mp->b_rptr;
                msg_buff_ptr->offset = cur_mp->b_rptr - cur_mp->b_datap->db_base;
                msg_buff_ptr->type = cur_mp->b_datap->db_type;

#if _UTS
```

© COPYRIGHT 1994 AMDAHL CORPORATION

```
		msg_buff_ptr->flag = cur_mp->b_flag;
		msg_buff_ptr->band = cur_mp->b_band;
#else
		msg_buff_ptr->flag = msg_buff_ptr->band = 0;
#endif

		cur_mp = cur_mp->b_cont;
	}
	msg_buff_ptr->cont = 0;
	data_len = 0;
	cur_mp = mp;
	rem_control_len = control_len;
	msg_buff_ptr = (struct msg_buff *) (dsf_msg_header + 1);
	while (rem_control_len >= sizeof(struct msg_buff)) {
		msg_buff_ptr->dataoffset = rem_control_len + data_len;
		data_len += msg_buff_ptr->length;
		rem_control_len -= sizeof(struct msg_buff);
		msg_buff_ptr++;
		cur_mp = cur_mp->b_cont;
	}
	dsf_msg_header->len = data_len + control_len + sizeof(struct dsf_msg_header);
}

/*
 * mrr_no_of_msgblk: Returns the size of the message
 */

STATIC int
mrr_no_of_msgblk(bp)
	register mblk_t *bp;
{
	register int	s = MRR_SETPL(s);
	register int	n = 0;

	for (; bp; bp = bp->b_cont) {
		if (bp->b_wptr >= bp->b_rptr)
			n++;
	}
	MRR_SPLX(s);
	return (n);
}

/*
 * mrr_update_xmit_window: Checks to see if the window on the remote side is
 * open. This is like canput to the remote side
```

© COPYRIGHT 1994 AMDAHL CORPORATION

```
 */

void
mrr_update_xmit_window(mrrp)
        register mrr_element_t *mrrp;
{
        register int    s = MRR_SETPL(s);

        if (mrrp->remote.send_info.cur_window <= 0) {
                /* Can't send message (window decreased) */
                mrrp->remote.send_info.cur_window = 0;
                mrrp->remote.send_info.state = BLOCKED;
                mrrp->state &= ~MR_FLOWING;
                mrrp->state |= MR_BLOCKED;
                noenable(WR(mrrp->urqptr));
        } else
                mrrp->remote.send_info.state = FLOWING;
        MRR_SPLX(s);

}

/*
 * mrr_enableq: Enables all the queues which have failed canput All queues
 * status will be marked flowing.
 */
STATIC void
mrr_enableq(mediap)
        register media_obj_t *mediap;
{
        register mrr_element_t *mrrp;
        MRR_PLT         oldpl;
        register int    i;

MRRAGAIN:

#if _UTS
        oldpl = RW_RDLOCK(mediap->media.element_rwlkp, plstr);

#endif

        for (i = 0; i < MRCONNSZ;) {
                mrrp = mediap->mrrcon[i++];
                while (mrrp && mrrp->urqptr && mrrp->state == MR_BLOCKED) {
                        /* Get lock since different hierrarchy try TRYLOCK */
#if _UTS
```

© COPYRIGHT 1994 AMDAHL CORPORATION

```
			if ((mrrp->oldpl = TRYLOCK(mrrp->lkp, plstr)) == invpl) {
				MRRLOG(mediap, " mrr_enableq:Looping on Lock%x\n", mrrp);
				RW_UNLOCK(mediap->media.element_rwlkp, oldpl);
				goto MRRAGAIN;
			}
#endif
			mrrp->state = MR_FLOWING;
			mrr_en_all_usr_q(mrrp->urqptr);
			MRR_UNLOCK(mrrp);
			mrrp = mrrp->mrr_next;

		}
	}
#if _UTS
	RW_UNLOCK(mediap->media.element_rwlkp, oldpl);
#endif
}

/*
 * mrr_en_all_usr_q: Will enable the read and write queues. The queue passed
 * is the read queue.
 */

void
mrr_en_all_usr_q(q)
	register queue_t *q;
{
	if (q) {
		enableok(q);
		qenable(q);
		enableok(WR(q));
		qenable(WR(q));
	}
}

/*
 * mrr_expected_seq - Checks whether received message has expected sequence
 * number. If yes, an ACK message will be sent if it was an admin message or
 * a high priority message. The return value is 1. In case the sequence
 * number is too small, an ACK message is send indicating the current state
 * and the return value is 0. In case the sequence number is too large, a NAK
 * message with the expected sequence number is sent unless such a NAK
 * message had been sent before.
 */
```

© COPYRIGHT 1994 AMDAHL CORPORATION

```
STATIC int
mrr_expected_seq(cur_msg_ptr, mrrp)
	struct dsf_msg *cur_msg_ptr;
	struct mrr_element *mrrp;
{
	register int	priority;
	register struct rcv_info *rcv_infop;

	priority = cur_msg_ptr->header.priority;
	rcv_infop = &mrrp->remote.rec_info.rcv_info[priority];
	if (rcv_infop->rec_seq == cur_msg_ptr->header.seq) {
		/* Expected case */
		rcv_infop->rec_seq++;

		/*
		 * In case it was a normal data message, an ACK will be sent
		 * based on the remaining window size and how many messages
		 * have not been acked. This will be done once the data has
		 * been processed, and the remaining window been calculated.
		 */
		return (1);
	}
	if (cur_msg_ptr->header.seq < rcv_infop->rec_seq)
		/* Check for wrap around */
		if (rcv_infop->rec_seq - cur_msg_ptr->header.seq < (uint) 0x8fffffff) {

			/*
			 * No wrap around, we received message that was
			 * already received
			 */
			/* Send ACK, indicating current state */
			mrr_send_ack(mrrp, priority);
			return (0);
		}
	MRRLOG(cur_msg_ptr->header.seq, "Sequence number Error Got =%x \n",
	    mrrp);

	/*
	 * Sequence number too far ahead, send NAK message (if not already
	 * sent)
	 */
	if (rcv_infop->nak_seq != rcv_infop->rec_seq)
		mrr_send_nak(mrrp, priority, mrrp->remote.rec_info.avail_win);
	return (0);
}
```

© COPYRIGHT 1994 AMDAHL CORPORATION

```
/*
 * dsf_route_data: routine does the actual processing of the data received
 * from the remote side. Messages received are either data or admin messages.
 * If they are data messages then they are broken into individual messages
 * and put in the upper queue. Admin messages are acted upon depending on the
 * message type received.
 */

int
dsf_route_data(mdp, mp)
        register media_obj_t *mdp;
        register mblk_t *mp;
{
        struct dsf_msg *cur_msg_ptr;
        register int    len = (mp->b_wptr - mp->b_rptr);
        MRR_PLT         oldpl;
        extern int      dsf_reconn_xchange();
        extern void     dsf_ready_media();

        oldpl = MRR_HLD_MED_RDLOCK(mdp, plstr);
        if (mdp->status & DSF_MED_READY) {
                DSFMEDTRACE(mdp, mp, oldpl, DSFFROMMEDIA);
                goto MRR_NORMAL;
        }
        if (mdp->status & (DSF_WAIT_DSF_OPEN_REQ | DSF_WAIT_DSF_OPEN_RES)) {
                MRRLOG(len, "dsf_route_data:received dsf_open_res %x\n",
                        mdp);
                MRR_RLS_MED_LOCK(mdp, oldpl);
                dsf_ready_media(mdp, mp);
                oldpl = MRR_HLD_MED_RDLOCK(mdp, plstr);
                len -= sizeof(struct dsf_open_resp);
                mp->b_rptr += sizeof(struct dsf_open_resp);
        }
        DSFMEDTRACE(mdp, mp, oldpl, DSFFROMMEDIA);
        while ((mdp->status & DSF_XCHANGE) && len > 0 && !MREOM(mp->b_rptr)) {
                register int    count = 0;
                register int    msg_len;

                cur_msg_ptr = (struct dsf_msg *) mp->b_rptr;
                MRRLOG(len, "Received exchange pkt %x\n", mdp);
                /* Could be a request or a response */
                MRR_RLS_MED_LOCK(mdp, oldpl);
                count = dsf_reconn_xchange(mdp, cur_msg_ptr);
```

© COPYRIGHT 1994 AMDAHL CORPORATION

```
                msg_len = (cur_msg_ptr->header.len + 3) -
                        (cur_msg_ptr->header.len + 3) % 4;
                len -= msg_len;
                mp->b_rptr += msg_len;
                oldpl = MRR_HLD_MED_RDLOCK(mdp, plstr);

        }
        if (!(mdp->status & DSF_MED_READY)) {
                MRR_RLS_MED_LOCK(mdp, oldpl);
                goto MRR_EXIT;
        }
MRR_NORMAL:
        MRR_RLS_MED_LOCK(mdp, oldpl);
        cur_msg_ptr = (struct dsf_msg *) mp->b_rptr;
        MD_UPD_STATS(mdp);
        while (len > 0 && !MREOM(cur_msg_ptr)) {
                if (cur_msg_ptr->header.type == DSF_DATA) {
                        register struct mrr_element *mrrp;
                        /*
                         * mrr_validate returns a lock if the element is
                         * valid
                         */
                        if (!mrr_validate(cur_msg_ptr->header.dest_id, mdp))
                                goto MRR_CONT;
                        mrrp = (struct mrr_element *) cur_msg_ptr->header.dest_id;
                        if (!mrr_chk_rem_exp_seq(cur_msg_ptr, mdp)) {
                                MRR_UNLOCK(mrrp);
                                goto MRR_CONT;
                        }
                        if (cur_msg_ptr->header.fragm) {
                                /* Message fragment */
                                if (!mrr_rcv_fragment(cur_msg_ptr, mp)) {
                                        MRR_UNLOCK_CLOSE(mrrp);
                                        return;
                                } else {
                                        MRR_UNLOCK_CLOSE(mrrp);
                                        goto MRR_CONT;
                                }
                        } else {/* Data less than media length */
                                mrr_rcv_data(cur_msg_ptr);
                                MRR_UNLOCK_CLOSE(mrrp);
                        }

                } else if (cur_msg_ptr->header.type == DSF_ADMIN) {
```

© COPYRIGHT 1994 AMDAHL CORPORATION

```
register struct mrr_element *mrrp = (struct mrr_element *)
cur_msg_ptr->header.dest_id;
/*
 * mrr_validate returns a lock if the element is
 * valid
 */

switch (cur_msg_ptr->body.admin_msg.type) {
case R_ACK_MSG:
        /*
         * mrr_validate returns a lock if the element
         * is valid
         */
        if (!mrr_validate(mrrp, mdp))
                goto MRR_CONT;
        if (mrrp->remote.remote_queue_id == 0)
            mrrp->remote.remote_queue_id = cur_msg_ptr->header.src_id;
        if (mrrp->remote.remote_queue_id != cur_msg_ptr->header.src_id)
                mrr_snd_no_part(mdp, cur_msg_ptr->header.src_id,
                        cur_msg_ptr->header.dest_id);
        else
                mrr_process_ack(cur_msg_ptr, mrrp);
        MRR_UNLOCK(mrrp);
        goto MRR_CONT;
case R_NAK_MSG:
        /*
         * mrr_validate returns a lock if the element
         * is valid
         */
        if (!mrr_validate(mrrp, mdp))
                goto MRR_CONT;
        if (mrrp->remote.remote_queue_id == 0)
            mrrp->remote.remote_queue_id = cur_msg_ptr->header.src_id;
        if (mrrp->remote.remote_queue_id != cur_msg_ptr->header.src_id)
                mrr_snd_no_part(mdp, cur_msg_ptr->header.src_id,
                        cur_msg_ptr->header.dest_id);
        else
                mrr_process_nak(cur_msg_ptr, mrrp);
        MRR_UNLOCK(mrrp);
        goto MRR_CONT;
case R_NO_PARTNER:

        /*
         * Check whether local queue still has the
         * same partner
```

© COPYRIGHT 1994 AMDAHL CORPORATION

```
			*/
			{
				struct mrr_element *mrrp = (struct mrr_element *)
				cur_msg_ptr->body.admin_msg.r_no_partner.src_id;
				/*
				 * mrr_validate returns a lock if the
				 * element is valid
				 */
				if (!mrr_validate(mrrp, mdp))
					goto MRR_CONT;
				/*
				 * Note that if urqptr is gone then
				 * mrrp is gone
				 */
				if (mrrp->remote.remote_queue_id !=
				    cur_msg_ptr->body.admin_msg.r_no_partner.dest_id ||
				    mrrp->urqptr == NULL) {
					MRR_UNLOCK(mrrp);
					goto MRR_CONT;
				}
				/* No need to send a mrr_snd_no_part */
				mrrp->status = MR_NOREMOTE;
				if (mrrp->state & MR_SLEEPING) {
					MRR_WAKEUP(mrrp);
				} else if (mrrp->state & MR_UPSTATE)
					mrr_send_hangup(mrrp);
				MRR_UNLOCK_CLOSE(mrrp);
				goto MRR_CONT;
			}
		case DSF_CHAN_CLOSE_REQ:
			/* Send a M_PROTO message to the admin */
			mrr_dsf_close_res(mdp);
			mrr_admin_close_req(mdp);
			mdp->status &= ~DSF_MED_READY;
			goto MRR_EXIT;
		case DSF_CHAN_CLOSE_RESP:
			mdp->status &= ~DSF_CLOSE_SEND;
			mrr_admin_close_resp(mdp);
			goto MRR_EXIT;
		case R_PUSH_RESP:
		case R_POP_RESP:
		case R_LINK_RESP:
		case R_UNLINK_RESP:
			/*
			 * mrr_validate returns a lock if the element
```

© COPYRIGHT 1994 AMDAHL CORPORATION

```
                 * is valid
                 */
                if (!mrr_validate(mrrp, mdp))
                        goto MRR_CONT;
                if (mrrp->remote.remote_queue_id != cur_msg_ptr->header.src_id
                    || mrrp->urqptr == NULL)
                        mrr_snd_no_part(mdp, cur_msg_ptr->header.src_id,
                                cur_msg_ptr->header.dest_id);
                else if (mrr_expected_seq(cur_msg_ptr, mrrp))
                        mrr_local_action(mrrp, cur_msg_ptr);
                MRR_UNLOCK_CLOSE(mrrp);
                goto MRR_CONT;
        case R_CLOSE_RESP:
                /*
                 * mrr_validate returns a lock if the element
                 * is valid
                 */
                if (!mrr_validate(mrrp, mdp))
                        goto MRR_CONT;
                if (mrrp->remote.remote_queue_id != cur_msg_ptr->header.src_id
                    || mrrp->urqptr == NULL)
                        mrr_snd_no_part(mdp, cur_msg_ptr->header.src_id,
                                cur_msg_ptr->header.dest_id);
                else if (mrr_expected_seq(cur_msg_ptr, mrrp))
                        mrr_close_resp(mrrp, cur_msg_ptr);
                else
                        mrrp->error_code = ENOLINK;
                MRR_WAKEUP(mrrp);
                MRR_UNLOCK(mrrp);
                goto MRR_CONT;

        case R_OPEN_RESP:
                /*
                 * mrr_validate returns a lock if the element
                 * is valid
                 */
                if (mrr_validate(mrrp, mdp)) {
                        if (mrrp->urqptr)
                                if (mrr_expected_seq(cur_msg_ptr, mrrp)) {
                                        mrr_drv_open_resp(mrrp, cur_msg_ptr);
                                }
                        MRR_UNLOCK(mrrp);
                }
                goto MRR_CONT;
```

© COPYRIGHT 1994 AMDAHL CORPORATION

```
case DSF_KEEPALIVE_REQ:
        /* Send with a keep alive response */
        dsf_send_keepalive(mdp, DSF_KEEPALIVE_RESP);
        goto MRR_CONT;
case DSF_KEEPALIVE_RESP:
        goto MRR_CONT;      /* No need to process more */
case R_SET_PRIO:
        /*
         * mrr_validate returns a lock if the element
         * is valid
         */
        if (!mrr_validate(mrrp, mdp)) {
                goto MRR_CONT;
        }
        if (mrrp->remote.remote_queue_id) {
                if (mrrp->remote.remote_queue_id
                    != cur_msg_ptr->header.src_id) {
                        mrr_snd_no_part(mdp, cur_msg_ptr->header.src_id,
                        cur_msg_ptr->header.dest_id);
                        MRR_UNLOCK(mrrp);
                        goto MRR_CONT;
                }
        } else
                mrrp->remote.remote_queue_id = cur_msg_ptr->header.src_id;
        if (mrr_expected_seq(cur_msg_ptr, mrrp)) {
            register struct  xmit_info *xmit_infop0 =
            &mrrp->remote.send_info.xmit_info[0];
            register struct xmit_info *xmit_infop =
                &mrrp->remote.send_info.xmit_info[DSF_BAND_PRI];
            register mblk_t *mp;

                mrrp->pri = DSF_BAND_PRI;
        /* Make sure that all priority 0 messages in the to send list
         *  gets put in the new priority. Assign new seq number and
         * send them.
         */
            /* Move from pri 0 to mrrp->pri send queue. Assume all
             * messages are acked, so change the cur_seq no.
             */
            /* Now open the window to Xmit */
            mrrp->remote.send_info.cur_window +=
                mrrp->remote.send_info.non_acked_bytes;
            mrrp->remote.send_info.non_acked_bytes = 0;
            /* Combine the msgs on the Xmit & to send list */
            /* There cannot be any messages on send_list of new
```

© COPYRIGHT 1994 AMDAHL CORPORATION

```
                 * priority.
                 */
                if ((xmit_infop->to_send_list = xmit_infop0->xmit_msg)
                        != NULL) {
                    *xmit_infop0->last_msg = xmit_infop0->to_send_list;
                    xmit_infop0->xmit_msg = NULL;
                    xmit_infop0->last_msg = &xmit_infop0->xmit_msg;
                } else
                    xmit_infop->to_send_list = xmit_infop0->to_send_list;
                xmit_infop0->to_send_list = NULL;
                xmit_infop0->cur_seq = xmit_infop0->acked;
                if (xmit_infop->to_send_list) {
                    /* Now change the sequence number */
                    for (mp = xmit_infop->to_send_list; mp;) {
                        struct dsf_msg *dsf = (struct dsf_msg *)mp->b_rptr;

                        dsf->header.seq = xmit_infop->cur_seq++;
                        mp = mp->b_next;
                    }
                    mrrp->remote.send_info.state = FLOWING;

                    if (mrrp->state & MR_BLOCKED) {
                            mrrp->state &= ~MR_BLOCKED;
                                        enableok(WR(mrrp->urqptr));
                                        qenable(WR(mrrp->urqptr));
                            }
                     mrr_xmit_pnd_msgs(mrrp, mrrp->pri);
                }

            /* Now check to see if we need to ack any priority 0 message
             */
                if (mrrp->remote.rec_info.rcv_info[0].ack_seq !=
                    mrrp->remote.rec_info.rcv_info[0].rec_seq)
                        mrr_send_ack( mrrp, 0);
            }
            MRR_UNLOCK(mrrp);
            goto MRR_CONT;
        default:
            MRRLOG(0, "Not supported admin message type %d \n",
                  cur_msg_ptr->body.admin_msg.type);
            goto MRR_CONT;
        }
    } else {
        MRRLOG(0, "Invalid dsf msg type: %d \n ",
              cur_msg_ptr->header.type);
```

© COPYRIGHT 1994 AMDAHL CORPORATION

```
                        /* Bad message */
                        break;
                }
MRR_CONT:
                /* Goto next message in buffer */
                {
                        register int    msg_len;

                        msg_len = (cur_msg_ptr->header.len + 3) - (cur_msg_ptr->header.len + 3)
% 4;
                        if (msg_len) {
                                len -= msg_len;
                                cur_msg_ptr = (struct dsf_msg *) ((char *) cur_msg_ptr +
                                                                msg_len);
                        } else {
                                MRRLOG(0, "Message length is %d. Exiting\n", msg_len);
                                break;
                        }
                }
        }
MRR_EXIT:
        /* Release the buffer */
        freemsg(mp);

}

/*
 * mrr_process_ack - Process an ACK for the queue of id dest.
 */

STATIC void
mrr_process_ack(cur_msg_ptr, mrrp)
        struct dsf_msg *cur_msg_ptr;
        register mrr_element_t *mrrp;
{
        register struct r_ack_msg *ack_msg;
        register int    s = MRR_SETPL(s);

        ack_msg = &cur_msg_ptr->body.admin_msg.r_ack_msg;
        /* First remove all the acked messages */
        mrr_upd_xmit_info(mrrp, ack_msg->ack_seq, ack_msg->priority);
        /* Adjust window by number of bytes already sent, but not acked */
        if (ack_msg->priority == mrrp->pri) {
                mrrp->remote.send_info.cur_window = ack_msg->window_size -
                    mrrp->remote.send_info.non_acked_bytes;
```

© COPYRIGHT 1994 AMDAHL CORPORATION

```
                mrr_update_xmit_window(mrrp);
                mrr_en_xmit_queue(mrrp, ack_msg->priority);
        }
        if (cur_msg_ptr->header.ack_req)
                mrr_send_ack(mrrp, ack_msg->priority);
        MRR_SPLX(s);

}

/*
 * mrr_process_nak - Message with sequence number nak_seq has to be
 * retransmitted, messages with lower sequence numbers are acked. Retransmit
 * only as many messages as the new window allows. Other messages will be put
 * back onto the queue.
 */

STATIC void
mrr_process_nak(dsf_msgp, mrrp)
        struct dsf_msg *dsf_msgp;
        register mrr_element_t *mrrp;
{
        register struct r_nak_msg *nak_msg;
        register int    s = MRR_SETPL(s);

        nak_msg = &dsf_msgp->body.admin_msg.r_nak_msg;
        if (dsf_msgp->header.ack_req)
                mrr_send_ack(mrrp, nak_msg->priority);
        mrr_upd_xmit_info(mrrp, nak_msg->nak_seq, nak_msg->priority);
        /* Get the Lock to prevent the bufcall failure call to xmit data */
        /* Resend all non-acked messages of this priority */
        /* Update new window size and see if we can send */
        if (nak_msg->priority == mrrp->pri) {
                mrrp->remote.send_info.cur_window = nak_msg->window_size;
                mrr_update_xmit_window(mrrp);
        }
        /* free all fragment messages since it is already on send list */
        mrr_free_mp_list(mrrp->remote.send_info.xmit_info[nak_msg->priority].fragp);
        mrr_comb_rxmit_pend_mssg(mrrp, nak_msg->priority);
        mrr_en_xmit_queue(mrrp, nak_msg->priority);
        mrrp->stats.nak_rcvd++;     /* Update stats */
        MRR_SPLX(s);
}

/*
 * mrr_upd_xmit_info: Update the transmit sequence number
```

© COPYRIGHT 1994 AMDAHL CORPORATION

```
 */
STATIC void
mrr_upd_xmit_info(mrrp, ack, priority)
        register mrr_element_t *mrrp;
        register uint   ack;
        int             priority;
{
        register struct xmit_info *xmit_info =
        &mrrp->remote.send_info.
        xmit_info[priority];
        register uint   seq = xmit_info->acked;
        register int    acked_bytes = 0;

        if (ack < seq)
                /* Wrap around ? */
                if ((uint) (seq - ack) < (uint) 0x8fffffff)
                        return;
        while (seq != ack) {
                register mblk_t *tmp_mp;
                register mblk_t *mp;

                if ((mp = xmit_info->xmit_msg) == NULL) {
                        mrrp->remote.send_info.non_acked_bytes = 0;
                        MRRLOG(ack, "Ack sequence number disagreement %x\n", mrrp);
                        break;
                }
                if (priority == mrrp->pri &&
                    (u_char) ((struct dsf_msg_header *) mp->b_rptr)->type == DSF_DATA)
                        mrrp->remote.send_info.non_acked_bytes -=
                                mrr_msg_length(mp->b_cont);
                tmp_mp = mp->b_next;
                mp->b_next = NULL;
                freemsg(mp);
                xmit_info->xmit_msg = tmp_mp;
                seq++;
        }
        xmit_info->acked = ack;
        if (xmit_info->xmit_msg == NULL)
                xmit_info->last_msg = &xmit_info->xmit_msg;

}


/*
```

© COPYRIGHT 1994 AMDAHL CORPORATION

```
 * mrr_rcv_data: The data received on a queue is first validated and then the
 * sequence number is checked and the windows updated. Locks held
 */

STATIC void
mrr_rcv_data(cur_msg_ptr)
	register struct dsf_msg *cur_msg_ptr;
{

	register struct msg_buff *msg_buff_ptr;
	register struct mrr_element *mrrp =
	(struct mrr_element *) cur_msg_ptr->header.dest_id;
	register int	msg_len;
	mblk_t		*mp;

	msg_buff_ptr = &cur_msg_ptr->body.data_msg;
	if ((msg_len = mrr_build_msg(msg_buff_ptr, &mp)) < 0) {
		/* Not enough resources to build STREAMS message */
		/* First decrement the rec seq number */
		/* Send NAK message if possible */
		mrr_rcv_alloc_error(mrrp, cur_msg_ptr->header.priority);
		return;
	}
	mrr_snd_to_usr(mrrp, mp, cur_msg_ptr->header.priority,
			cur_msg_ptr->header.ack_req, msg_len);

}

/*
 * mrr_snd_to_usr: Send data to user upstream. LOCK held on entry & exit.
 */

STATIC void
mrr_snd_to_usr(mrrp, mp, pri, ack_req, msg_len)
	register mrr_element_t *mrrp;
	register mblk_t *mp;
	register int	pri;
	register int	ack_req;
	register int	msg_len;
{
	register int	s = MRR_SETPL(s);
	register int	ack_it = 0;
	register media_obj_t *mrr_mdp = mrr_mediahp[mrrp->med];
	MRR_PLT		oldpl;
```

© COPYRIGHT 1994 AMDAHL CORPORATION

```
        /* Put message into queue */
        /* Make sure no interrupts happen now  */

#ifndef _UTS
        mrr_correct_stroptions(mp);
#endif

        /* Update the iocblk with the proper uid & gid or credential ptr */
        mrr_correct_cred_ptr(mrrp, mp);

        /*
         * Check for M_FLUSH and free the held messages on the read queue
         * mrr_flush_read_queue(mrrp, mp);
         */
#if _UTS
        /*
         * Need to make sure that the mrrp does not disappear
         */
        oldpl = RW_RDLOCK(mrr_mdp->media.element_rwlkp, plstr);
#endif
        if (mrrp->urqptr) {
            /*
             * Check for M_HANGUP and  set status flag.Wake up sleeping processes.
             */
            if (mp->b_datap->db_type == M_HANGUP) {
                mrrp->status |= MR_HANGUPSEND;
                if (mrrp->state & MR_SLEEPING)
                    MRR_WAKEUP(mrrp);
            }

                /*
                 * Check if this message has to be sent  or a message
                 * fragment is received. If a message fragment is received
                 * then save until final message is received. In case of an
                 * M_PROTO message put the control part at the beginning; the
                 * data part is appended at the end.
                 */
#if _UTS
                if (mp->b_flag & MSGFRAG) {
                        mrrp->msg_frag_len += msg_len;
                        /*
                         * Lets continue receiving  message fragments Make
                         * sure that the available window is +ve
                         */
                        mrr_update_available_window(mrrp->urqptr->q_next, mrrp);
```

© COPYRIGHT 1994 AMDAHL CORPORATION

```
                    if (mrrp->remote.rec_info.avail_win  <= 0)
                            mrrp->remote.rec_info.avail_win = 1;
                    /* Check comm_win window */
                    if ((mrrp->remote.rec_info.comm_win -= msg_len) <= 0) {
                            mrrp->remote.rec_info.comm_win = 0;
                            ack_it = 1;
                    }
                    mrr_save_msg_frag(mrrp, mp);
                    RW_UNLOCK(mrr_mdp->media.element_rwlkp, oldpl);
                    goto CHECK_ACK;
            }
#endif
            if (pri > mrrp->pri) {
                    /* High priority messages are not delayed */
                    MRR_PUT_TO_USR(mrrp->urqptr, mrrp, mp, oldpl);
                    /* Possibility of mrrp becoming dealloacted */
                    if (!mrr_assert_lock(mrrp))
                            return;
            } else {
#if _UTS
                    /* Check if there were any previous message fragments */
                    if (mrrp->msg_frag) {
                            mrr_save_msg_frag(mrrp, mp);
                            mp = mrrp->msg_frag;
                            mrrp->msg_frag = NULL;
                            mrrp->msg_frag_len = 0;
                    }
#endif
                    if ((mrrp->urqptr->q_first) || MRRCHKUPQ(mp, mrrp->urqptr) ||
                        MRR_IS_MSG_BEING_SND_TO_USR(mrrp)) {
                            putq(mrrp->urqptr, mp);
                            /* Update communicated Window */
                            mrrp->remote.rec_info.comm_win -= msg_len;
                            /* Update available window */
                            if ((mrrp->remote.rec_info.avail_win =
                                (mrrp->remote.rec_info.max_win >> (mrr_win_adj_shft + 1)) -
                                mrrp->urqptr->q_count) < 0)
                                    mrrp->remote.rec_info.avail_win = 0;
#if _UTS
                            RW_UNLOCK((mrr_mediahp[mrrp->med])->media.element_rwlkp,
oldpl);
#endif
                    } else {
                            register queue_t *q = mrrp->urqptr->q_next;
```

© COPYRIGHT 1994 AMDAHL CORPORATION

```
                    MRR_PUT_TO_USR(mrrp->urqptr, mrrp, mp, oldpl);
                    /* Possibility of mrrp becoming dealloacted */
                    if (!mrr_assert_lock(mrrp))
                          return;
                    /* Update communicated Window */
                    mrrp->remote.rec_info.comm_win -= msg_len;
                    /* Update available window */
                    mrr_update_available_window(q, mrrp);
                    /*
                     * Check whether more than 10 messages are
                     * not  ACKed
                     */
                    if (mrrp->remote.rec_info.rcv_info[
                                                  mrrp->pri].rec_seq  -
mrrp->remote.rec_info.rcv_info[
                                    mrrp->pri].ack_seq >= 10) {
                          ack_it = 1;
                    }
              }

        }
CHECK_ACK:
        /* Check whether ACK should be sent */
        if (ack_it || ack_req ||
           mrrp->remote.rec_info.avail_win - mrrp->remote.rec_info.comm_win >
           (mrrp->remote.rec_info.avail_win >> 1)) {
                mrr_send_ack(mrrp, pri);

        }
    } else {
#if _UTS
        RW_UNLOCK(mrr_mdp->media.element_rwlkp, oldpl);
#endif
        freemsg(mp);
    }
    MRR_SPLX(s);
}

/*
 * mrr_dsf_close_res:  The remote side has send a dsf_close_request. Respond
 * to it. No need to hold media lock since we are being called from a dsf put
 * or dsf service routine. The media cannot disappear.
 */

STATIC void
```

© COPYRIGHT 1994 AMDAHL CORPORATION

```
mrr_dsf_close_res(mediap)
        register media_obj_t *mediap;
{
        register struct dsf_msg *dsf_close;
        register mblk_t *mp;
        MRR_PLT         oldpl = 0;

        if (DSF_MEDIA_VALID(mediap)) {
                if ((mp = allocb(sizeof(struct dsf_msg_header) +
                         sizeof(struct dsf_close_msg), BPRI_MED)) == NULL) {
                        if (bufcall((sizeof(struct dsf_msg_header) +
                                     sizeof(struct dsf_close_msg)), BPRI_MED, mrr_dsf_close_res,
                                    mediap)) {
                                return;
                        } else {
                                MRRLOG(0, "bufcall failure on dsf_close_res %x\n", mediap);
                                return;
                        }

                }
                dsf_close = (struct dsf_msg *) mp->b_rptr;
                mp->b_wptr += sizeof(struct dsf_msg_header) +
                        sizeof(struct dsf_close_msg);
                dsf_close->body.admin_msg.dsf_close_msg.type = DSF_CHAN_CLOSE_RESP;
                dsf_close->header.type = DSF_ADMIN;
                dsf_close->header.priority = DSF_NORMAL_PRI;
                dsf_close->header.fragm = 0;
                dsf_close->header.len = MSGBLEN(mp);
                dsf_close->header.dest_id = 0;
                dsf_close->header.seq = 0;
                dsf_close->header.src_id = (int) mediap;
                dsf_close->header.ack_req = 0;

                /*
                 * if (!MRR_CANPUT(mediap->media.lwqp)) { cmn_err(CE_CONT,
                 * "mrr_dsf_close_res: %xcanput failed.\n", mediap->index);
                 * putq(mediap->media.lwqp, mp); return; } else
                 */
                oldpl = MRR_HLD_MED_RDLOCK(mediap, plstr);
                MRR_PUT_TO_MEDIA(mediap, mp, oldpl);
                return;
        }
}

/*
```

© COPYRIGHT 1994 AMDAHL CORPORATION

```
 * mrr_admin_close_resp:Send an M_PROTO type message to the admin queue
 * indicating the a dsf close has been received. No need to hold media locks
 * since we are being called from a put/service routine of dsf driver
 */
STATIC void
mrr_admin_close_resp(mediap)
	register media_obj_t *mediap;
{
	register mblk_t *mp;
	register struct dsf_close_msg *dsf_clp;

	if (DSF_MEDIA_VALID(mediap)) {
		if (!(mp = allocb(sizeof(struct dsf_close_msg), BPRI_MED))) {
			if (bufcall(sizeof(struct dsf_close_msg), BPRI_MED,
				    mrr_admin_close_resp, mediap)) {
				return;
			} else {
				MRRLOG(0, "bufcall failure on mrr_admin_close %x\n", mediap);
				return;
			}
		}
		mp->b_datap->db_type = M_PROTO;
		dsf_clp = (struct dsf_close_msg *) mp->b_rptr;
		dsf_clp->type = DSF_CLOSE_RESP;
		mp->b_wptr = mp->b_rptr + sizeof(struct dsf_close_msg);
		/* Any Locks held. Free them */
		putnext(mediap->urq, mp);
	} else
		MRRLOG(0, "Media closed cannot send M_PROTO to daemon=%d\n", mediap);
}

/*
 * mrr_admin_close_req:Send an M_PROTO type message to the admin queue
 * indicating the a dsf close has been received. No media Locks need to be
 * held, since called from dsf put directly.
 */
STATIC void
mrr_admin_close_req(mediap)
	register media_obj_t *mediap;
{
	register mblk_t *mp;
	register struct dsf_close_msg *dsf_clp;

	if (DSF_MEDIA_VALID(mediap)) {
		if (!(mp = allocb(sizeof(struct dsf_close_msg), BPRI_MED))) {
```

© COPYRIGHT 1994 AMDAHL CORPORATION

```
                if (bufcall(sizeof(struct dsf_close_msg), BPRI_MED,
                        mrr_admin_close_req, mediap)) {
                    return;
                } else {
                    MRRLOG(0, "bufcall failure on mrr_admin_close=%d\n", mediap);
                    return;
                }
            }
            mp->b_datap->db_type = M_PROTO;
            dsf_clp = (struct dsf_close_msg *) mp->b_rptr;
            dsf_clp->type = DSF_CHAN_CLOSE_REQ;
            mp->b_wptr = mp->b_rptr + sizeof(struct dsf_close_msg);
            putnext(mediap->urq, mp);
        }
}

/*
 * mrr_local_action: Acts on the Admin messages received from the remote
 * side. action taken depends on the message received.
 */

STATIC void
mrr_local_action(mrrp, cur_msg_ptr)
        register mrr_element_t *mrrp;
        register struct dsf_msg *cur_msg_ptr;
{
        switch (cur_msg_ptr->body.admin_msg.type) {

        case R_PUSH_RESP:
                mrr_mod_open_resp(mrrp, cur_msg_ptr);
                break;
        case R_POP_RESP:
                mrr_pop_resp(mrrp, cur_msg_ptr);
                break;
        case R_LINK_RESP:
                mrr_link_resp(mrrp, &cur_msg_ptr->body.admin_msg.r_link_resp);
                break;
        case R_UNLINK_RESP:
                mrr_unlink_resp(mrrp, &cur_msg_ptr->body.admin_msg.r_unlink_resp);
                break;
        default:
                MRRLOG(mrrp->mrr_minor, "Bad type of mssg Rcvd from remote %d\n",
                    cur_msg_ptr->body.admin_msg.type);
                break;
        }
```

© COPYRIGHT 1994 AMDAHL CORPORATION

```
}

/*
 * mrr_free_all: Will Unbuf MRR_TIMEOUT and free all memeory pertaining to
 * the element. Element Lock held and freed just before dealloc.
 *
 */
STATIC void
mrr_free_all(mrrp)
        register mrr_element_t *mrrp;
{

#if _UTS
        register media_obj_t *mediap = mrr_mediahp[mrrp->med];
        pl_t            oldpl;

#endif
        mrr_element_unid(mrrp);
#if _UTS
        oldpl = RW_WRLOCK(mediap->media.element_rwlkp, plstr);
#endif
        mrr_elment_rmv(mrrp);
#if _UTS
        /* Inform the media driver that the stream is disappearing */
        mrrp->urqptr = NULL;
        MRR_UNLOCK(mrrp);
        RW_UNLOCK(mediap->media.element_rwlkp, oldpl);
#endif
        mrr_free_mem(mrrp);

}

/*
 * mrr_send_hangup:   Send an M_HANGUP to an active circuit.  Locks held on
 * entry & exit.
 */

void
mrr_send_hangup(mrrp)
        register mrr_element_t *mrrp;
{
        register mblk_t *mp;
        MRR_PLT         oldpl;

        if ((mp = allocb(0, BPRI_HI)) == NULL) {
```

© COPYRIGHT 1994 AMDAHL CORPORATION

```
			MRRLOG(0, "Error in allocating Message for M_HANGUP %x \n", mrrp);
			return;
		}
		mp->b_datap->db_type = M_HANGUP;
#if _UTS
		oldpl = RW_RDLOCK(mrr_mediahp[mrrp->med]->media.element_rwlkp, plstr);
#endif
		mrrp->status |= MR_HANGUPSEND;
		MRR_PUT_TO_USR(mrrp->urqptr, mrrp, mp, oldpl);
		(void) mrr_assert_lock(mrrp);
}

/*
 * mrr_common_lkulk_resp: Response to an R_LINK or an R_UNLINK. This command
 * is send by the remote side. Locks held
 */
STATIC mrr_act_admin_t *
mrr_common_lkulk_resp(mrrp, upper_id)
	register mrr_element_t *mrrp;
	register int	upper_id;
{
	register mrr_act_admin_t *adm;


	/* Get the  link information */
	for (adm = mrrp->info; adm; adm = adm->next) {
		if (adm->local.l_index == upper_id)
			return (adm);
	}
	MRRLOG(0, "Could not match Link/Unlink resp %x\n", mrrp);
	return (mrr_act_admin_t *) NULL;

}

/*
 * mrr_link_resp: react to a R_LINK_REQ received from the remote side. in
 * case of an error send an M_IOCNAK message.
 */


STATIC void
mrr_link_resp(mrrp, lkp)
	register mrr_element_t *mrrp;
	register struct r_link_resp *lkp;
{
```

© COPYRIGHT 1994 AMDAHL CORPORATION

```
        register struct iocblk *iop;
        register mrr_act_admin_t *prv;
        MRR_PLT         oldpl;

        mrrp->state &= ~MR_LINKING;
        if (!(prv = mrr_common_lkulk_resp(mrrp, lkp->upper_linkid))) {
                return;
        }
        prv->remote_link_id = lkp->lower_linkid;
        if (prv->ml) {
                iop = (struct iocblk *) prv->ml->b_rptr;
                iop->ioc_error = lkp->uerror;
                iop->ioc_rval = 0;
                iop->ioc_count = 0;
                prv->ml->b_datap->db_type = lkp->uerror ? M_IOCNAK : M_IOCACK;
#if _UTS
                oldpl = RW_RDLOCK(mrr_mediahp[mrrp->med]->media.element_rwlkp, plstr);
#endif
                MRR_PUT_TO_USR(mrrp->urqptr, mrrp, prv->ml, oldpl);
                if (!mrr_assert_lock(mrrp))
                        return;
                prv->ml = (mblk_t *) NULL;
        } else
                MRRLOG(0, "Message disappeared during link Resp=%x\n", mrrp);
        if (lkp->uerror) {
                mrr_free_act_admin(mrrp, prv);
                return;
        }
        mrrp->state |= MR_LINKED;
}

/*
 * mrr_unlink_resp: react to a R_UNLINK_REQ received from the remote side. in
 * case of an error send an M_IOCNAK message.
 */

STATIC void
mrr_unlink_resp(mrrp, ulkp)
        register mrr_element_t *mrrp;
        register struct r_unlink_resp *ulkp;
{

        register struct iocblk *iop;
        register mrr_act_admin_t *prv;
        MRR_PLT         oldpl;
```

© COPYRIGHT 1994 AMDAHL CORPORATION

```
        mrrp->state &= ~MR_UNLINKING;
        if (!(prv = mrr_common_lkulk_resp(mrrp, ulkp->upper_linkid))) {
                return;
        }
        if (prv->ml) {
                iop = (struct iocblk *) prv->ml->b_rptr;
                iop->ioc_error = ulkp->uerror;
                iop->ioc_rval = 0;
                iop->ioc_count = 0;
                prv->ml->b_datap->db_type = ulkp->uerror ? M_IOCNAK : M_IOCACK;
#if _UTS
                oldpl = RW_RDLOCK(mrr_mediahp[mrrp->med]->media.element_rwlkp, plstr);
#endif
                MRR_PUT_TO_USR(mrrp->urqptr, mrrp, prv->ml, oldpl);
                if (!mrr_assert_lock(mrrp))
                        return;
                prv->ml = (mblk_t *) NULL;
        } else
                MRRLOG(0, " Message disappeared during Unlink Resp %x\n", mrrp);
        mrr_free_act_admin(mrrp, prv);
}

/*
 * mrr_find_ulink: Find the link id for which a Remote Link or unlink
 * response is received.
 */

STATIC int
mrr_find_ulink(mrrp, unlinkfd, mp)
        register mrr_element_t *mrrp;
        int             unlinkfd;
        register mblk_t *mp;
{
        register mrr_act_admin_t *prv;

        for (prv = mrrp->info; prv;) {
                if (prv->local.l_index == unlinkfd) {
                        if (prv->ml) {
                                freemsg(prv->ml);
                                MRRLOG(0, "Freeing a LINK mssg?? %x\n", mrrp);
                        }
                        prv->ml = mp;
                        return (prv->remote_link_id);
                }
                prv = prv->next;
```

© COPYRIGHT 1994 AMDAHL CORPORATION

```
	}
	MRRLOG(0, "Could not find I_index in I_UNLINK %x\n", mrrp);
	return (-1);
}

/*
 * mrr_free_act_admin: This function will free the link data information when
 * an UN_LINK message is received. Locks held
 */

STATIC void
mrr_free_act_admin(mrrp, ul_actp)
	register mrr_element_t *mrrp;
	register mrr_act_admin_t *ul_actp;
{
	register mrr_act_admin_t *prv, *nxt;

	for (nxt = prv = mrrp->info; nxt;) {
		if (nxt == ul_actp) {  /* found a match */
			register mrr_act_admin_t *sav;

			sav = nxt->next;
			if (nxt->ml)
				freemsg(nxt->ml);
			KMEM_FREE(nxt, sizeof(mrr_act_admin_t));
			if (nxt == mrrp->info)
				mrrp->info = sav;
			else
				prv->next = sav;
			return;
		}
		prv = nxt;
		nxt = nxt->next;
	}
	MRRLOG(0, "Could not free  mrr_act_admin_t during resp %x\n", mrrp);
}

/*
 * mrr_mod_open_resp: The resp for a R_OPEN has come check for validity
 */

STATIC void
mrr_mod_open_resp(mrrp, dsf)
	register mrr_element_t *mrrp;
	register struct dsf_msg *dsf;
```

270

© COPYRIGHT 1994 AMDAHL CORPORATION

```
{
        register struct r_cmd_resp *r_res = &dsf->body.admin_msg.r_cmd_resp;

        mrrp->state &= ~MR_PUSHING;
        mrrp->state |= MR_PUSHED;
        if ((mrrp->error_code = r_res->uerror))
                MRRLOG(r_res->uerror, "Error reported by remote side on Push %x\n",
                        mrrp);
        if (dsf->header.ack_req)
                mrr_send_ack(mrrp, dsf->header.priority);
        MRR_WAKEUP(mrrp);
}

/*
 * mrr_drv_open_resp: This is a response from the remote side. It saves  the
 * error returned from the remote side and wakes up the sleeping beauty. Also
 * it changes it state to OPENED.
 */


STATIC void
mrr_drv_open_resp(mrrp, dsf)
        register mrr_element_t *mrrp;
        register struct dsf_msg *dsf;
{
        register struct r_open_resp *r_res = &dsf->body.admin_msg.r_open_resp;

        mrrp->state &= ~MR_OPENING;
        if ((mrrp->error_code = r_res->uerror))
                MRRLOG(r_res->uerror, "Error reported by remote side on Open %x\n",
                        mrrp);
        mrrp->mrr_minor = r_res->minor_dev;
        if (!(mrrp->state & MR_OPENED)) {
                mrrp->remote.remote_queue_id = dsf->header.src_id;
                /* Now store the lower window size for transmit size */
                mrrp->remote.send_info.cur_window = r_res->lower_window_size;
                /* get rid of the open message  from send list. */
                mrr_upd_xmit_info(mrrp, 1, 0);

        }
        /* see if you can send an ack */
        if (dsf->header.ack_req)
                mrr_send_ack(mrrp, dsf->header.priority);
        MRR_WAKEUP(mrrp);
}
```

© COPYRIGHT 1994 AMDAHL CORPORATION

```
/*
 * mrr_close_resp: received a remote close response. Save the error from
 * remote side and wake up sleeping beauty.
 */

STATIC void
mrr_close_resp(mrrp, dsf)
        register mrr_element_t *mrrp;
        register struct dsf_msg *dsf;
{
        register struct r_cmd_resp *r_res = &dsf->body.admin_msg.r_cmd_resp;

        mrrp->state &= ~MR_CLOSING;
        mrrp->state = MR_CLOSED;
        if ((mrrp->error_code = r_res->uerror)) {
                MRRLOG(r_res->uerror, "Error reported by remote side on close=%x\n",
                      mrrp);
        }
}

/*
 * mrr_pop_resp: Received a POP response from remote side. Save the error and
 * wakes up the sleeping beauty.
 */

STATIC void
mrr_pop_resp(mrrp, dsf)
        register mrr_element_t *mrrp;
        register struct dsf_msg *dsf;
{
        register struct r_cmd_resp *r_res = &dsf->body.admin_msg.r_cmd_resp;

        mrrp->state &= ~MR_POPING;
        mrrp->state |= MR_POPED;
        if (dsf->header.ack_req) {
                mrr_send_ack(mrrp, dsf->header.priority);
        }
        if ((mrrp->error_code = r_res->uerror)) {
                MRRLOG(r_res->uerror, "Error reported by remote side on Pop=%x\n",
                      mrrp);
        }
        MRR_WAKEUP(mrrp);

}
```

© COPYRIGHT 1994 AMDAHL CORPORATION

```
/*
 * mrr_element_unid: unbufcall and timeout  for a given mirror element
 */

STATIC void
mrr_element_unid(mrrp)
        register mrr_element_t *mrrp;
{

        if (mrrp->bid) {
                MRR_UNLOCK(mrrp);
                MRR_UNBUFCALL(mrrp->bid);
                MRR_LOCK(mrrp, plstr);
                mrrp->bid = 0;
        }
        if (mrrp->cbid) {
                MRR_UNLOCK(mrrp);
                MRR_UNBUFCALL(mrrp->cbid);
                MRR_LOCK(mrrp, plstr);
                mrrp->cbid = 0;
        }
        if (mrrp->ctid) {
                MRR_UNLOCK(mrrp);
                MRR_UNTIMEOUT(mrrp->ctid);
                MRR_LOCK(mrrp, plstr);
                mrrp->ctid = 0;
        }
#if _UTS
        if (mrrp->tout_msg_being_snd) {
                MRR_UNLOCK(mrrp);
                MRR_UNTIMEOUT(mrrp->tout_msg_being_snd);
                MRR_LOCK(mrrp, plstr);
                mrrp->tout_msg_being_snd = 0;
                if (mrrp->tout_snd_ack_nak) {
                        MRR_UNLOCK(mrrp);
                        MRR_UNTIMEOUT(mrrp->tout_snd_ack_nak);
                        MRR_LOCK(mrrp, plstr);
                        mrrp->tout_snd_ack_nak = 0;
                }
        }
#endif
}

/*
 * mrr_buf_wakeup: buffcall function on allocb failure on a close or pop
```

© COPYRIGHT 1994 AMDAHL CORPORATION

```
 * request.
 */

STATIC void
mrr_buf_wakeup(mrrp)
        register mrr_element_t *mrrp;
{
        register media_obj_t *mdp;
        MRR_PLT         oldpl;


        if (!(mdp = dsf_chk_if_media_valid(mrrp->med)) || !mrr_validate(mrrp, mdp))
                return;
        mrrp->cbid = mrrp->ctid = 0;
        MRR_WAKEUP(mrrp);
        MRR_UNLOCK(mrrp);
}


/*
 * dsf_send_trace_msg: Sends Trace messages to the admin queue before sending
 * it to the media. No Locks required to be held
 */

STATIC void
dsf_send_trace_msg(dsfmsg, mdp, len, direc)
        register mblk_t *dsfmsg;
        register media_obj_t *mdp;
        register int    len;
        register int    direc;
{
        register struct dsf_media_trace *tr_msg;
        register mblk_t *mpc, *mp;
        register        msg_size = len;

#if _UTS
        MRR_PLT         oldpl = LOCK(mdp->media.tr_lkp, plstr);

#endif

        if (len && mdp && mdp->urtrq) {
                /* Update the counter */
                mdp->trc_count[direc]++;
```

© COPYRIGHT 1994 AMDAHL CORPORATION

```
        if (!(mpc = allocb(sizeof(struct dsf_media_trace), BPRI_MED))) {
                MRRLOG(0, "Control block allocb failure during trace %x\n", mdp);

#if _UTS
                UNLOCK(mdp->media.tr_lkp, oldpl);
#endif

                return;
        }
#if _UTS
        if (!(mp = dupmsg(dsfmsg))) {
                MRRLOG(0, " dupmsg  data failure during trace %x\n", mdp);
                freemsg(mpc);
                UNLOCK(mdp->media.tr_lkp, oldpl);
                return;
        }
#else
        if (!(mp = allocb(len, BPRI_MED))) {
                MRRLOG(0, " allocb failure for data during trace %x\n", mdp);
                freemsg(mpc);
                return;
        }
#endif

        mpc->b_datap->db_type = M_PROTO;
        mpc->b_wptr += sizeof(struct dsf_media_trace);
        tr_msg = (struct dsf_media_trace *) mpc->b_rptr;
        tr_msg->type = DSF_TRACE_MSG;
        tr_msg->len = len;
        tr_msg->direc = direc;
        tr_msg->count = mdp->trc_count[direc];

#if _UTS
        if (drv_getparm((unsigned long) TIME,
                        (unsigned long *) &tr_msg->time) == -1)
                tr_msg->time = 0;
#else
        {
                extern time_t   time;

                tr_msg->time = time;
        }
#endif

#ifndef _UTS
```

© COPYRIGHT 1994 AMDAHL CORPORATION

```
		{
			register int	length;
			register mblk_t *mpd = dsfmsg;

			while (mpd != NULL) {
				length = mpd->b_wptr - mpd->b_rptr;
				bcopy(mpd->b_rptr, mp->b_wptr, length);
				mp->b_wptr += length;
				mpd = mpd->b_cont;
			}
		}
#endif

		linkb(mpc, mp);
		putq(mdp->urtrq, mpc);
	}
#if _UTS
	UNLOCK(mdp->media.tr_lkp, oldpl);
#endif
}

/*
 * mrr_all_mssg_q_en: Enable a queue which has been blocked due to a allocb
 * failure. Hold the locks obviously. Send messages which were first
 */

STATIC void
mrr_all_mssg_q_en(qp)
	register queue_t *qp;
{
	register int	s = MRR_SETPL(s);
	mrr_element_t	*mrrp = (mrr_element_t *) qp->q_ptr;
	register struct xmit_info *xmit_infop;
	register media_obj_t *mdp;
	MRR_PLT		oldpl;

	if (!(mdp = dsf_chk_if_media_valid(mrrp->med)) || !mrr_validate(mrrp, mdp))
		return;
	/* Make sure close does not beat us */
#if _UTS
	mrrp->wait_on_close = 1;
#endif
	xmit_infop = &mrrp->remote.send_info.xmit_info[mrrp->pri];
	mrrp->cbid = mrrp->ctid = 0;
	/* First check send list */
```

270

© COPYRIGHT 1994 AMDAHL CORPORATION

```
        mrr_xmit_all_pri_msgs(mrrp);
        /* The element could have been closed hence check for it */
        if (mrrp->urqptr) {
                /* Next deplete the private message queue */
                if (!mrr_deplete_msgs(qp)) {
                        MRR_SPLX(s);
                        MRR_UNLOCK_CLOSE(mrrp);
                        return;
                }
                /* Turn on the streams queue */
                enableok(qp);
                qenable(qp);
        }
        MRR_SPLX(s);
        MRR_UNLOCK_CLOSE(mrrp);
}

/*
 * mrr_snd_to_media: Checks to see if window is open, before calling this
 * function. Also check if is up. If dupmsg fails then call bufcall and
 * return.
 */

STATIC int
mrr_snd_to_media(mrrp, priority, msg)
        mrr_element_t  *mrrp;
        int            priority;
        register mblk_t *msg;
{
        register mblk_t *send_msg;
        register struct dsf_msg_header *dsf_msg_header;
        register struct xmit_info *xmit_infop =
        &mrrp->remote.send_info.xmit_info[priority];
        register media_obj_t *mrr_mdp = mrr_mediahp[mrrp->med];


        /* Maybe check canput on media. Removed due to perf consideration */
        if (!(send_msg = dupmsg(msg))) {
                mrr_bufcall(mrrp, msg);
                return (0);
        }
        dsf_msg_header = (struct dsf_msg_header *) msg->b_rptr;
        dsf_msg_header->priority = priority;
        *xmit_infop->last_msg = msg;
        xmit_infop->last_msg = &msg->b_next;
```

© COPYRIGHT 1994 AMDAHL CORPORATION

```
        msg->b_next = NULL;
        if (priority == mrrp->pri && dsf_msg_header->type == DSF_DATA) {
                register int    msglen = mrr_msg_length(send_msg->b_cont);

                mrrp->remote.send_info.cur_window -= msglen;
                mrr_update_xmit_window(mrrp);
                mrrp->remote.send_info.non_acked_bytes += msglen;
        }
        mrr_snd_msg_to_media(mrrp, send_msg);
        return (1);


}

/*
 * mrr_en_xmit_queue: Will enable the xmit queue if it was previously
 * blocked. The window is opened once the pending message is send
 */

STATIC void
mrr_en_xmit_queue(mrrp, pri)
        register mrr_element_t *mrrp;
        register int    pri;
{
        if (WR(mrrp->urqptr)) {
                if (!mrrp->bid) {
                        if (pri == MRRALLPRI)
                                mrr_xmit_all_pri_msgs(mrrp);
                        else
                                mrr_xmit_pnd_msgs(mrrp, pri);
                }
                /* If window still flowing enable the service routines */
                if (mrrp->remote.send_info.state == FLOWING &&
                    (mrrp->state & MR_BLOCKED)) {
                        mrrp->state &= ~MR_BLOCKED;
                        mrrp->state |= MR_FLOWING;
                        enableok(WR(mrrp->urqptr));
                        qenable(WR(mrrp->urqptr));
                }
        }
}

/*
 * mrr_comb_rxmit_pend_mssg: When Messages have to be re-xmitted and there
 * are pending messages then they have to be appended before sending them
```

© COPYRIGHT 1994 AMDAHL CORPORATION

```
                        nxt_msg = tmp_mp;
                        tmp_mp = tmp_mp->b_next;
                }
                nxt_msg->b_next = msg;
        }


}

/*
 * mrr_deplete_msgs: Will exhaust the private queue first before using the
 * streams queue. All priority messages are stored, though only high priority
 * message gets stored
 */

STATIC int
mrr_deplete_msgs(qp)
        register queue_t *qp;
{
        register mrr_element_t *mrrp = (mrr_element_t *) qp->q_ptr;
        register mblk_t *msg;

        while ((msg = mrrp->hi_pri_msg)) {
                register mblk_t *savmsg = msg->b_next;

                if (!mrr_snd_hi_pri_mssg(qp, msg)) {
                        MRRLOG(0, " A failure in allocb again %x\n", mrrp);
                        return (0);
                }
                mrrp->hi_pri_msg = savmsg;
        }
        return (1);
}



#ifndef _UTS
/*
 * mrr_correct_stroptions: Since there is a differrence between SV3.2 and
 * SVR4 it needs to be corrected
 */
STATIC void
mrr_correct_stroptions(bp)
```

© COPYRIGHT 1994 AMDAHL CORPORATION

```
        register mblk_t *bp;
{
        if (bp->b_datap->db_type == M_SETOPTS) {
                struct stroptions stropt;
                register unsigned char *bp_ptr = bp->b_rptr;

                stropt.so_flags = (short) (*(long *) bp_ptr);
                bp_ptr += sizeof(long);
                stropt.so_readopt = (short) (*(short *) bp_ptr);
                bp_ptr += sizeof(short);
                stropt.so_wroff = (ushort) (*(ushort *) bp_ptr);
                bp_ptr += sizeof(ushort);
                stropt.so_minpsz = (short) (*(long *) bp_ptr);
                bp_ptr += sizeof(long);
                stropt.so_maxpsz = (short) (*(long *) bp_ptr);
                bp_ptr += sizeof(long);
                stropt.so_hiwat = (short) (*(long *) bp_ptr);
                bp_ptr += sizeof(long);
                stropt.so_lowat = (short) (*(long *) bp_ptr);
                bcopy(&stropt, bp->b_rptr, sizeof(struct stroptions));
                bp->b_wptr = bp->b_rptr + sizeof(struct stroptions);
        }
}

#endif


/*
 * mrr_correct_cred_ptr: When the remote side returns the saved cred pointer
 * is restored.
 */
STATIC void
mrr_correct_cred_ptr(mrrp, bp)
        register mrr_element_t *mrrp;
        register mblk_t *bp;
{

        if (bp->b_datap->db_type == M_IOCNAK || bp->b_datap->db_type == M_IOCACK) {
                register struct iocblk *iocp = (struct iocblk *) bp->b_rptr;
#if _UTS
                iocp->ioc_cr = mrrp->io_cr;
#else
                (long) iocp->ioc_uid = mrrp->io_cr;
#endif
```

© COPYRIGHT 1994 AMDAHL CORPORATION

```
                return;
        }
#if _UTS
        if (bp->b_datap->db_type == M_IOCDATA) {
                register struct copyresp *copyresp = (struct copyresp *) bp->b_rptr;

                copyresp->cp_cr = mrrp->io_cr;
                return;
        }
        if (bp->b_datap->db_type == M_COPYOUT || bp->b_datap->db_type == M_COPYIN)
{
                register struct copyreq *copyreq = (struct copyreq *) bp->b_rptr;

                copyreq->cq_cr = mrrp->io_cr;
        }
#endif
}


/*
 * mrr_snd_positive_wind: Will Open up a window after 1 tick. This prevents
 * constant sending of nak to the remote side. Also resource availibility is
 * not  guranteed after 1 tick.
 */

STATIC void
mrr_snd_positive_wind(mrrp)
        register mrr_element_t *mrrp;
{
        if (!mrrp->remote.rec_info.ack_nak_bid) {
                if (mrrp->ctid) {
                        MRR_UNLOCK(mrrp);
                        MRR_UNTIMEOUT(mrrp->ctid);
                        MRR_LOCK(mrrp, plstr);
                }
                mrrp->ctid = MRR_TIMEOUT(mrr_snd_ack_with_window, mrrp, 0);
        }
}

/*
 * mrr_snd_ack_with_window: Will resend a ack to the  remote side. This ack
 * will open the window allowing the remote side to send data again.
 */

STATIC void
```

© COPYRIGHT 1994 AMDAHL CORPORATION

```
mrr_snd_ack_with_window(mrrp)
        register mrr_element_t *mrrp;
{
        register        s = MRR_SETPL(s);
        register struct rcv_info *rcv_infop;
        register media_obj_t *mdp;
        MRR_PLT         oldpl;

        /* Make sure no ack/nak is being received during that time */
#if _UTS
        if (!(mdp = dsf_chk_if_media_valid(mrrp->med)) || !mrr_validate(mrrp, mdp))
                return;
        mrrp->wait_on_close = 1;
#endif
        rcv_infop = &mrrp->remote.rec_info.rcv_info[mrrp->pri];
        mrrp->ctid = 0;
        if (rcv_infop->rec_seq != rcv_infop->ack_seq ||
            (mrrp->remote.rec_info.comm_win <= 0 &&
             mrrp->remote.rec_info.avail_win > 0))
                mrr_send_ack(mrrp, mrrp->pri);
        MRR_SPLX(s);
        MRR_UNLOCK_CLOSE(mrrp);

}

/*
 * mrr_snd_hi_pri_mssg: Convert a high priority message  into a dsf message
 * and send over to the lower mux.
 */
STATIC int
mrr_snd_hi_pri_mssg(qp, mp)
        register queue_t *qp;
        register mblk_t *mp;
{
        register mrr_element_t *mrrp = (mrr_element_t *) qp->q_ptr;
        register mblk_t *dsf_mp;
        register int    msgsize, adj_msg_len;
        int             n = 0;
        register struct dsf_msg_header *dsf;

        n = mrr_no_of_msgblk(mp);
        msgsize = sizeof(struct dsf_msg_header) + (n * sizeof(struct msg_buff));
        /* Make sure that the message is aligned on an int boundry */
        if ((adj_msg_len = (mrr_msg_length(mp) % sizeof(int)))) {
                adj_msg_len = (sizeof(int) - adj_msg_len);
```

© COPYRIGHT 1994 AMDAHL CORPORATION

```
			msgsize += adj_msg_len;
		}
		if ((dsf_mp = allocb(msgsize, BPRI_MED)) == NULL) {
			MRRLOG(msgsize, "mrr_snd_hi_pri_mssg: Failure in allocb %x\n", mrrp);
			mrr_xmit_alloc_fail(mrrp, msgsize);
			return (0);
		}
		dsf_mp->b_wptr += msgsize;
		mrr_build_msg_buff((struct dsf_msg_header *) dsf_mp->b_rptr, mp,
					mrrp, adj_msg_len);
		linkb(dsf_mp, mp);

#if _UTS
		dsf_mp->b_band = mp->b_band;
#endif

		dsf = (struct dsf_msg_header *) dsf_mp->b_rptr;
		dsf->ack_req = 1;
		dsf->seq = mrrp->remote.send_info.xmit_info[DSF_HI_PRI].cur_seq++;
		mrr_send_remote_mssg(mrrp, dsf_mp, DSF_HI_PRI);
		return (1);
}

/*
 * mrr_adj_win_size - Depending on the available memory window sizes and the
 * threshold for ack requests get adjusted.
 */
STATIC void
mrr_adj_win_size()
{

}


/*
 * mrr_send_intr- Send an interrupt admin message saying that the user plans
 * to give up. Go back to sleep after that
 */

STATIC void
mrr_send_intr(mrrp)
	register mrr_element_t *mrrp;
{
	register struct dsf_msg *int_msg_ptr;
	mblk_t		*intr_mp = allocb(sizeof(struct dsf_msg_header)
```

© COPYRIGHT 1994 AMDAHL CORPORATION

```
                        + sizeof(struct r_interrupt), BPRI_MED);

        if (intr_mp == NULL) {
                if (mrrp->cbid) {
                        MRR_UNLOCK(mrrp);
                        MRR_UNBUFCALL(mrrp->cbid);
                        MRR_LOCK(mrrp, plstr);
                }
                if ((mrrp->cbid = bufcall((sizeof(struct dsf_msg_header) +
                                sizeof(struct r_interrupt)), BPRI_MED, mrr_snd_buf_intr,
mrrp)))
                        return;
                else {
                        if (mrrp->ctid) {
                                MRR_UNLOCK(mrrp);
                                MRR_UNTIMEOUT(mrrp->ctid);
                                MRR_LOCK(mrrp, plstr);
                        }
                        mrrp->ctid = MRR_TIMEOUT(mrr_snd_buf_intr, mrrp, MRTIME);
                        return;
                }
        }
        int_msg_ptr = (struct dsf_msg *) intr_mp->b_rptr;
        intr_mp->b_wptr += (sizeof(struct dsf_msg_header)
                        + sizeof(struct r_interrupt));
        mrr_update_admin_header(&int_msg_ptr->header, mrrp, intr_mp);
        int_msg_ptr->header.ack_req = 0;
        int_msg_ptr->body.admin_msg.type = R_INTERRUPT;
#if _UTS
        intr_mp->b_band = mrrp->pri;
#endif
        mrr_send_remote_mssg(mrrp, intr_mp, mrrp->pri);

}

/*
 * mrr_snd_buf_intr: Since interrrupt packed has to be send we need this
 * function. Hold the lock(maybe not)
 */

STATIC void
mrr_snd_buf_intr(mrrp)
        register mrr_element_t *mrrp;
{
        register media_obj_t *mdp;
```

© COPYRIGHT 1994 AMDAHL CORPORATION

```
        MRR_PLT         oldpl;
#if _UTS
        if (!(mdp = dsf_chk_if_media_valid(mrrp->med)) || !mrr_validate(mrrp, mdp))
                return;
        /* Make sure close does not beat us */
        mrrp->wait_on_close = 1;
#endif
        mrrp->cbid = mrrp->ctid = 0;
        mrr_send_intr(mrrp);
        MRR_UNLOCK_CLOSE(mrrp);
}

/*
 * mrr_flush_read_queue: Will flush all the messagse on the read queue This
 * message is received from remote side. Of course the window needs to be
 * adjusted.
 */
STATIC void
mrr_flush_read_queue(mrrp, bp)
        register mrr_element_t *mrrp;
        register mblk_t *bp;
{
        if (bp->b_datap->db_type == M_FLUSH) {
                if (*bp->b_rptr & FLUSHR) {
                        flushq(mrrp->urqptr, FLUSHALL);
                        MRR_LOCK(mrrp, plstr);
                        mrr_update_available_window(mrrp->urqptr->q_next, mrrp);
                        if (mrrp->remote.rec_info.avail_win -
                            mrrp->remote.rec_info.comm_win >
                            (mrrp->remote.rec_info.avail_win >> 1)) {
                                mrr_send_ack(mrrp, mrrp->pri);
                        }
                        MRR_UNLOCK(mrrp);
                }
#if _UTS
                /* Flush band */
                if (*bp->b_rptr & FLUSHBAND) {
                        flushband(mrrp->urqptr, *(bp->b_rptr + sizeof(char)), FLUSHALL);
                        MRR_LOCK(mrrp, plstr);
                        mrr_update_available_window(mrrp->urqptr->q_next, mrrp);
                        if (mrrp->remote.rec_info.avail_win -
                            mrrp->remote.rec_info.comm_win >
                            (mrrp->remote.rec_info.avail_win >> 1)) {
                                mrr_send_ack(mrrp, DSF_BAND_PRI);
                                MRR_UNLOCK(mrrp);
```

© COPYRIGHT 1994 AMDAHL CORPORATION

```
                        }
                }
#endif
        }
}

/*
 * mrr_flush_private_q: Will flush the messages which are pending in the mrrp
 * private queue. Actually only data needs to flushed, but since the
 * complication of sequence updating, nak sequence received, it is prudent to
 * free every message and hope for the best. Locks are held by this routine.
 */

STATIC void
mrr_flush_private_q(mrrp, pri)
        register mrr_element_t *mrrp;
        register int    pri;
{
    register struct dsf_msg *dsf;
        /* Always check high priority */
        if (mrrp->hi_pri_msg) {
                mrr_free_mp_list(mrrp->hi_pri_msg);
                mrrp->hi_pri_msg = NULL;
        }
        /* High priority messages need to be flushed */
        mrr_free_mp_list(mrrp->remote.send_info.xmit_info[DSF_HI_PRI].to_send_list);
        /*
         * Update the sequence number first.
         */
    if (mrrp->remote.send_info.xmit_info[pri].to_send_list) {
        dsf = (struct dsf_msg *)
        mrrp->remote.send_info.xmit_info[pri].to_send_list->b_rptr;
        mrrp->remote.send_info.xmit_info[pri].cur_seq = dsf->header.seq;
            mrr_free_mp_list(mrrp->remote.send_info.xmit_info[pri].to_send_list);
            mrrp->remote.send_info.xmit_info[pri].to_send_list = NULL;
        }


}

/*
 * mrr_frag_no - Returns the number of fragments necessary to transmit the
 * message of length msg_size.
 */
```

© COPYRIGHT 1994 AMDAHL CORPORATION

```
STATIC int
mrr_frag_no(msg_size, max_fragm)
	register int	msg_size, max_fragm;
{
	register int	result;

	msg_size -= sizeof(struct dsf_msg_header);
	max_fragm -= sizeof(struct dsf_msg_header);
	result = msg_size / max_fragm;
	if (msg_size % max_fragm != 0)
		result++;
	return (result);
}

/*
 * mrr_fragment_dmsg - Fragment the message in to_send_list of the given
 * priority. Returns 1, when the whole message got sent, and 0 when it did
 * not succeed. WR LOCKS Note: Interrupts have to be disabled in this
 * function.
 */
STATIC int
mrr_fragment_dmsg(mrrp, prio, cur_msg)
	mrr_element_t *mrrp;
	register int	prio;
	register mblk_t *cur_msg;
{
	int		cur_frg_no;	/* Fragment number (decreasing) */
	int		rem_len;/* Remaining length of message */
	mblk_t		*first_fp;	/* First fragment of the list of
					 * fragments */
	register mblk_t *hp = NULL; /* Current header message block */
	mblk_t		*cmp;	/* Current message block of original message */
	mblk_t		*cfmp = NULL;		/* Current message block of fragment */
	unsigned char	*cur_rptr;	/* Points to next data byte in
					 * original message */
	register struct dsf_msg_header *headerp;	/* Fragment header */
	register media_obj_t *mrr_mdp = mrr_mediahp[mrrp->med];
	int		max_msg_size;	/* Maximum space for data in message */
	register mblk_t *tmp;

	register struct xmit_info *xmit_infop =
	&mrrp->remote.send_info.xmit_info[prio];
	register struct dsf_msg_header *msg_header;	/* Get the first
							 * fragment */
	MRR_PLT		oldpl = 0;
```

© COPYRIGHT 1994 AMDAHL CORPORATION

```
register int    cur_frag_len;      /* # of bytes already contained in
                                    * fragment */

MRR_ASSERT(mrr_mdp);
max_msg_size = mrr_mdp->media.lower.max_msg_size -
        sizeof(struct dsf_msg_header); /* Maximum space for data in
                                        * message */
/* Get the first fragment message */
msg_header = (struct dsf_msg_header *) cur_msg->b_rptr;
if ((first_fp = xmit_infop->fragp) == NULL) {
        /* Start from the beginning */
        cur_frag_len = 0;
        cmp = cur_msg;
        cur_frg_no = msg_header->fragm;
        rem_len = msg_header->len - sizeof(struct dsf_msg_header);
        cur_rptr = cmp->b_rptr + sizeof(struct dsf_msg_header);
} else {
        /* Partially allocated fragments */
        /* Is there one already completed fragment ? */
        if (first_fp->b_cont != NULL && first_fp->b_next != NULL)
                /* There is a second fragment */
                hp = first_fp->b_next;
        else
                /* Only one fragment */
                hp = first_fp;
        headerp = (struct dsf_msg_header *) hp->b_rptr;
        cur_frg_no = headerp->fragm & 0x7f;
        rem_len = msg_header->len - (msg_header->fragm - cur_frg_no)
                * max_msg_size - sizeof(struct dsf_msg_header);
        /* Find last allocated message block */
        cur_frag_len = 0;
        if (hp->b_cont == NULL) {
                cfmp = hp;
        } else {
                for (cfmp = hp->b_cont; cfmp->b_cont != NULL; cfmp = cfmp->b_cont)
                        cur_frag_len += (cfmp->b_wptr - cfmp->b_rptr);
                cur_frag_len += (cfmp->b_wptr - cfmp->b_rptr);   /* Add last one */
        }
        cmp = cfmp->b_next;
        cfmp->b_next = NULL;       /* This was just a temporary pointer
                                    * to get at at the next block of the
                                    * original message. */

        /*
         * The next byte to copy has been saved in the b_prev field
```

© COPYRIGHT 1994 AMDAHL CORPORATION

```
                 * of the last header message block.
                 */
                cur_rptr = (unsigned char *) hp->b_prev;
        }
        while (cur_frg_no > 0) {
                if (hp != NULL)
                        goto GOT_HEADER;
                if ((hp = allocb(sizeof(struct dsf_msg_header), BPRI_MED)) == NULL) {
                        if ((xmit_infop->fragp = first_fp) != NULL)
                                /* Save next byte to read */
                                first_fp->b_prev = (mblk_t *) cur_rptr;
                        if (cfmp != NULL)
                                cfmp->b_next = cmp;
                        mrr_xmit_alloc_fail(mrrp, sizeof(struct dsf_msg_header));

#if _UTS
                        mrrp->seq_msg_being_send = 0;      /* Make sure we don't
                                                            * hold it for ever */
#endif

                        return (0);
                }
                if (first_fp == NULL)
                        first_fp = hp;
                else
                        first_fp->b_next = hp;          /* Never more than two are on
                                                         * the list */

                /*
                 * Copy header from header in to_send_list, and modify length
                 * and fragment field.
                 */
                bcopy(cur_msg->b_rptr, hp->b_rptr,
                      sizeof(struct dsf_msg_header));
                hp->b_wptr += sizeof(struct dsf_msg_header);
                headerp = (struct dsf_msg_header *) hp->b_rptr;
                headerp->len = (rem_len > max_msg_size ? max_msg_size : rem_len) +
                        sizeof(struct dsf_msg_header);
                headerp->fragm = cur_frg_no;
                if (msg_header->fragm == cur_frg_no)
                        headerp->fragm |= BEGIN_FRAGMENT;
                cfmp = hp;
GOT_HEADER:
                /* Now dup the message blocks until fragment is full */
                while (cur_frag_len < max_msg_size && cmp) {
```

© COPYRIGHT 1994 AMDAHL CORPORATION

```
                register mblk_t *nmp;

                if ((nmp = dupb(cmp)) == NULL) {
                        xmit_infop->fragp = first_fp;
                        cfmp->b_next = cmp;             /* Remember current
                                                         * position */
                        hp->b_prev = (mblk_t *) cur_rptr;
                        mrr_xmit_alloc_fail(mrrp, sizeof(mblk_t));

#if _UTS
                        mrrp->seq_msg_being_send = 0;   /* Make sure we don't
                                                         * hold it */
#endif

                        return (0);
                }
                nmp->b_rptr = cur_rptr;
                cfmp->b_cont = nmp;
                cfmp = nmp;
                cur_frag_len += (nmp->b_wptr - nmp->b_rptr);
                if (cur_frag_len > max_msg_size) {
                        nmp->b_wptr -= (cur_frag_len - max_msg_size);
                        cur_rptr = nmp->b_wptr;
                        break;
                }
                if ((cmp = cmp->b_cont) == NULL)
                        break;
                cur_rptr = cmp->b_rptr;
        }               /* while (cur_frag_len < max_msg_size) */

        /* Done with fragment */
        rem_len -= (headerp->len - sizeof(struct dsf_msg_header));
        /* Previous fragment can be sent now */
        if (first_fp != hp) {
                first_fp->b_next = NULL;
                oldpl = MRR_HLD_MED_RDLOCK(mrr_mdp, plstr);
                DSFMEDTRACE(mrr_mdp, first_fp, oldpl, DSFTOMEDIA);
                MRR_SND_UNLOCK(mrrp);
                MRR_PUT_TO_MEDIA(mrr_mdp, first_fp, oldpl);
                /* don't free  flag since we are still sending */
                MRR_LOCK(mrrp, plstr);
                first_fp = hp;
        }
        hp = 0;
        cur_frag_len = 0;
```

© COPYRIGHT 1994 AMDAHL CORPORATION

```
		cur_frg_no--;
	}			/* while (cur_frg_no > 0) */

	tmp = cur_msg;			/* xmit_infop->to_send_list; */
	*(xmit_infop->last_msg) = tmp;
	tmp->b_next = NULL;
	xmit_infop->last_msg = &tmp->b_next;
	/*
	 * Before sending final seg update window All fragments have been
	 * sent. Adjust window, and move message to list of transmitted
	 * messages.
	 */
	if (prio == mrrp->pri) {
		mrrp->remote.send_info.cur_window -= mrr_msg_length(tmp->b_cont);
		mrr_update_xmit_window(mrrp);
		mrrp->remote.send_info.non_acked_bytes += mrr_msg_length(tmp->b_cont);

	}
	/* Sent final fragment */
	xmit_infop->fragp = NULL;
	mrr_snd_msg_to_media(mrrp, first_fp);
	return (1);


}

/*
 * mrr_xmit_alloc_fail: Called because of failure during xmitting of message
 * to remote side.
 */

STATIC void
mrr_xmit_alloc_fail(mrrp, size)
	register mrr_element_t *mrrp;
	register int	size;
{
	if (mrrp->cbid) {
		MRR_UNLOCK(mrrp);
		MRR_UNBUFCALL(mrrp);
		MRR_LOCK(mrrp, plstr);
	}
	if (!(mrrp->cbid = bufcall(size, BPRI_MED, mrr_all_mssg_q_en,
				WR(mrrp->urqptr)))) {
		if (mrrp->ctid) {
```

© COPYRIGHT 1994 AMDAHL CORPORATION

```
                MRR_UNLOCK(mrrp);
                MRR_UNTIMEOUT(mrrp->ctid);
                MRR_LOCK(mrrp, plstr);
            }
            mrrp->ctid = MRR_TIMEOUT(mrr_all_mssg_q_en,
                                WR(mrrp->urqptr), MRTIME);
        }
}


/*
 * mrr_build_frag_msg - Build a STREAMS message out of fragment buffers. We
 * assume that the struct msg_buffs are all contained in the first fragment.
 * This code would fail, if there are too many message blocks. In case of a
 * 4k buffer this means, we can handle 254 message blocks in one message.
 */

STATIC int
mrr_build_frag_msg(frag_list, max_msg_size, last_msg, mpp)
        mblk_t          *frag_list;
        int             max_msg_size;
        struct dsf_msg_header *last_msg;
        mblk_t          **mpp;
{
        register mblk_t *new_mp, **cur_mpp;
        register int    processed_len = 0;
        register int    adj_offs; /* Adjust dataoffset with this number */
        register int    pack_adj;         /* Last byte in current fragment */
        struct msg_buff *buff_ptr;
        unsigned char  *rptr;
        register int    beg_copy, bytes_to_copy, copy_len;
        char            *cur_data;
        register struct dsf_msg_header *frag_list_dsf =
        (struct dsf_msg_header *) frag_list->b_rptr;

        *mpp = NULL;
        cur_mpp = mpp;
        cur_data = (char *) frag_list->b_rptr;
        buff_ptr = &((struct dsf_msg *) frag_list->b_rptr)->body.data_msg;
        adj_offs = sizeof(struct dsf_msg_header);
        pack_adj = max_msg_size - sizeof(struct dsf_msg_header);

        for (;;) {
                if ((new_mp = allocb(buff_ptr->length + buff_ptr->offset, BPRI_MED)) ==
                   NULL)
```

© COPYRIGHT 1994 AMDAHL CORPORATION

```
                goto MSG_ERROR;

        *cur_mpp = new_mp;
        new_mp->b_rptr += buff_ptr->offset;
        new_mp->b_wptr = new_mp->b_rptr + buff_ptr->length;

#if _UTS
        new_mp->b_band = buff_ptr->band;
        new_mp->b_flag = buff_ptr->flag;
#endif

        new_mp->b_datap->db_type = buff_ptr->type;
        cur_mpp = &new_mp->b_cont;
        beg_copy = adj_offs + buff_ptr->dataoffset;
        if (beg_copy >= max_msg_size) {
                if (last_msg == NULL) {
                        MRRLOG(0, "Invalid fragment structure=%d\n", 0);
                        goto MSG_ERROR;
                }
                if ((frag_list = frag_list->b_next) == NULL) {
                        frag_list_dsf = last_msg;
                        cur_data = (char *) last_msg;
                        last_msg = NULL;
                } else {
                        frag_list_dsf = (struct dsf_msg_header *) frag_list->b_rptr;
                        cur_data = (char *) frag_list->b_rptr;
                }
                adj_offs -= pack_adj;
                beg_copy -= pack_adj;
        }
        bytes_to_copy = buff_ptr->length;
        rptr = new_mp->b_rptr;
        for (;;) {
                if (beg_copy + bytes_to_copy > max_msg_size)
                        copy_len = max_msg_size - beg_copy;
                else
                        copy_len = bytes_to_copy;
                bcopy(cur_data + beg_copy, rptr, copy_len);
                if ((bytes_to_copy -= copy_len) <= 0)
                        break;
                rptr += copy_len;
                if (last_msg == NULL) {
                        MRRLOG(0, "Invalid fragment structure=%d\n", 0);
                        goto MSG_ERROR;
                }
```

© COPYRIGHT 1994 AMDAHL CORPORATION

```
                        if ((frag_list = frag_list->b_next) == NULL) {
                                frag_list_dsf = last_msg;
                                cur_data = (char *) last_msg;
                                last_msg = NULL;
                        } else {
                                frag_list_dsf = (struct dsf_msg_header *) frag_list->b_rptr;
                                cur_data = (char *) frag_list->b_rptr;
                        }
                        adj_offs -= pack_adj;
                        beg_copy = sizeof(struct dsf_msg_header);
                }

                processed_len += buff_ptr->length;
                if (buff_ptr->cont == 0) {
                        *cur_mpp = NULL;
                        return processed_len;
                }
                buff_ptr++;   /* Goto next message block */
                adj_offs += sizeof(struct msg_buff);
        }
MSG_ERROR:
        /* Allocation failed, free already allocated part and return -1 */
        *cur_mpp = NULL;
        freemsg(*mpp);
        return -1;
}

/*
 * mrr_free_frags - free a list of fragments.
 */

void
mrr_free_frags(rcv_infop)
        struct rcv_info *rcv_infop;
{
        register mblk_t *fl = rcv_infop->rcv_frags, *tfl;

        while (fl != NULL) {
                tfl = fl;
                fl = fl->b_next;
                tfl->b_next = NULL;
                freemsg(tfl);
        }
        rcv_infop->rcv_frags = NULL;
}
```

© COPYRIGHT 1994 AMDAHL CORPORATION

```
/*
 * mrr_rcv_fragment -Add a new fragment to the list of received fragments. If
 * it was the last one create a message and return 1, 0 otherwise.Any error
 * results in freeing all already received fragments and sending a NAK to the
 * remote side. bp points to the whole message and cointains info for one.
 */
STATIC int
mrr_rcv_fragment(cur_msg_ptr, bp)
        register struct dsf_msg *cur_msg_ptr;
        register mblk_t *bp;
{
        register struct mrr_element *mrrp =
        (struct mrr_element *) cur_msg_ptr->header.dest_id;
        register media_obj_t *mrr_mdp;
        mblk_t          *mpp;
        register int    priority;
        register struct rcv_info *rcv_infop;
        register mblk_t *last_frag;
        register int    msg_len;
        struct dsf_msg_header *last_frag_dsf;

        mrr_mdp = mrr_mediahp[mrrp->med];
        priority = cur_msg_ptr->header.priority;
        rcv_infop = &mrrp->remote.rec_info.rcv_info[priority];
        rcv_infop->rec_seq--;
        if ((last_frag = rcv_infop->rcv_frags) == NULL) {
                /* No fragment on record */
                if ((cur_msg_ptr->header.fragm & BEGIN_FRAGMENT) == 0)
                        /* Invalid fragment */
                        goto SEND_NAK;
                rcv_infop->rcv_frags = (mblk_t *) bp;
                goto GOOD_EXIT;
        } else {
                while (last_frag->b_next != NULL)
                        last_frag = last_frag->b_next;
                last_frag_dsf = (struct dsf_msg_header *) last_frag->b_rptr;
                if ((last_frag_dsf->fragm & 0x7f) - 1 > cur_msg_ptr->header.fragm) {
                        /* Hole in sent fragments - Unexpected */
                        MRRLOG(cur_msg_ptr->header.fragm, "Fragment  out of sequence=%x\n",
                              mrrp);
                        mrr_free_frags(rcv_infop);
                        goto SEND_NAK;
                } else if ((last_frag_dsf->fragm & 0x7f) - 1 < cur_msg_ptr->header.fragm) {
                        /* duplicate sent */
                        return (-1);
```

© COPYRIGHT 1994 AMDAHL CORPORATION

```
		}
		/* Expected fragment received */

		if (cur_msg_ptr->header.fragm != 1) {
			last_frag->b_next = bp;
			goto GOOD_EXIT;
		}
		/* All fragments received */
		rcv_infop->rec_seq++;		/* Accept this sequence number */
		if ((msg_len = mrr_build_frag_msg(rcv_infop->rcv_frags,
						mrr_mdp->media.lower.max_msg_size,
&cur_msg_ptr->header, &mpp)) < 0) {

			/*
			 * Allocation error - free all fragments except for
			 * last
			 */
			last_frag->b_next = NULL;
			mrr_free_frags(rcv_infop);
			mrr_rcv_alloc_error(mrrp, priority);
			return (-1);
		}
		/* Successful */
		last_frag->b_next = NULL;	/* Don't free the last one */
		mrr_free_frags(rcv_infop);
		/* Send data to user. Priority of all fragments are the same */
		mrr_snd_to_usr(mrrp, mpp, priority, cur_msg_ptr->header.ack_req,
				msg_len);
		return (msg_len);
	}
SEND_NAK:
	if (rcv_infop->nak_seq != rcv_infop->rec_seq) {
		mrr_send_nak(mrrp, priority, mrrp->remote.rec_info.avail_win);
	}
	return (-1);
GOOD_EXIT:
	bp->b_next = NULL;
	return (0);
}

/*
 * mrr_rcv_alloc_error - Handle failure of allocating a message buffer during
 * receive. Nak has to be send.
 */
```

© COPYRIGHT 1994 AMDAHL CORPORATION

```
STATIC void
mrr_rcv_alloc_error(mrrp, pri)
        register mrr_element_t *mrrp;
        register int    pri;
{
        register int    s = MRR_SETPL(s);

        mrrp->remote.rec_info.rcv_info[pri].rec_seq--;
        mrr_adj_win_size();
        if (pri == mrrp->pri) {
                mrr_send_nak(mrrp, pri, 0);
                /* Start a MRR_TIMEOUT for sending a +ve window later */
                mrr_snd_positive_wind(mrrp);
        } else {
                mrr_send_nak(mrrp, pri, mrrp->remote.rec_info.avail_win);
        }
        MRR_SPLX(s);
        return;


}

/*
 * mrr_chk_rem_exp_seq: Checks the remote id of the message and the expected
 * sequence. Lock held on entry
 */

STATIC int
mrr_chk_rem_exp_seq(cur_msg_ptr, mdp)
        register struct dsf_msg *cur_msg_ptr;
        register media_obj_t *mdp;
{
        register struct mrr_element *mrrp =
        (struct mrr_element *) cur_msg_ptr->header.dest_id;

        if (mrrp->remote.remote_queue_id) {
                if (mrrp->remote.remote_queue_id != cur_msg_ptr->header.src_id) {
                        /* Invalid destination or source */
                        MRRLOG(0, "Invalid source or remote id on %s\n",
                              MRR_MEDIA_NAME(mrrp));
                        mrr_snd_no_part(mdp, cur_msg_ptr->header.src_id,
                                    cur_msg_ptr->header.dest_id);
                        return (0);
                }
        } else {                /* Sometimes some messages come before open
```

© COPYRIGHT 1994 AMDAHL CORPORATION

```
                        * response */
                mrrp->remote.remote_queue_id = cur_msg_ptr->header.src_id;
        }
        /* Check sequence number */
        if (!mrr_expected_seq(cur_msg_ptr, mrrp)) {
                return (0);
        }
        return (1);
}

/* mrr_remote_pushed_resp: Check the response for a push from the remote side */

STATIC int
mrr_remote_pushed_resp(mrrp, q)
        register mrr_element_t *mrrp;
        register queue_t *q;
{
        if (mrrp->state & MR_PUSHED) {
                if (mrrp->error_code) {
                        mrrp->state &= ~MR_PUSHED;
                        return (mrrp->error_code);
                }
                mrrp->urqptr = q;
                return (0);
        } else {                /* Should not happen */
                MRRLOG(mrrp->state, "Error in MODOPEN State=%x\n", mrrp);
                return (ENXIO);
        }

}

/*
 * mrr_remote_open_resp: Check for the proper response from a remote side
 */
STATIC int
mrr_remote_open_resp(mrrp, devp)
        register mrr_element_t *mrrp;

#if _UTS
        dev_t           *devp;

#else
        dev_t           devp;

#endif
```

© COPYRIGHT 1994 AMDAHL CORPORATION

```
{
        if (!(mrrp->state & MR_OPENED)) {
            register struct xmit_info *xmit_infop =
            &mrrp->remote.send_info.xmit_info[0];
                register mblk_t *mp;

                /* Now check if there are any messages on the xmit queue. If yes,
                 * remote ID's have to to be updated.
             */
             mp = xmit_infop->xmit_msg;
             while (mp) {
                 register struct dsf_msg *dsf =
                     (struct dsf_msg *)mp->b_rptr;

                 dsf->header.dest_id = mrrp->remote.remote_queue_id;
                 mp =  mp->b_next;
             }

         }
         if (mrrp->error_code)
                 return (mrrp->error_code);
         mrrp->state |= MR_OPENED;
#if _UTS
         *devp = makedevice(mrrp->mrr_major, mrrp->mrr_minor);
         return (0);
#else
         return (0);
#endif

}

/*
 * mrr_snd_msg_to_media: Just send to the media. Set msg_being_send flag.
 * Locks are held on return.
 */

STATIC void
mrr_snd_msg_to_media(mrrp, msg)
        register mrr_element_t *mrrp;
        register mblk_t *msg;

{
        register media_obj_t *mrr_mdp = mrr_mediahp[mrrp->med];
        MRR_PLT         oldpl = 0;
```

© COPYRIGHT 1994 AMDAHL CORPORATION

```
        oldpl = MRR_HLD_MED_RDLOCK(mrr_mdp, plstr);
        DSFMEDTRACE(mrr_mdp, msg, oldpl, DSFTOMEDIA);
        MRR_SND_UNLOCK(mrrp);
        MRR_PUT_TO_MEDIA(mrr_mdp, msg, oldpl);
        MRR_LOCK_SND(mrrp);
}
/*
 * mrr_just_snd_msg_to_media: Just send to the media. Locks are held on
 * return. wait_on_close is used for race condition with close.
 */

STATIC void
mrr_just_snd_msg_to_media(mrrp, msg)
        register mrr_element_t *mrrp;
        register mblk_t *msg;

{
        register media_obj_t *mrr_mdp = mrr_mediahp[mrrp->med];
        MRR_PLT         oldpl = 0;

        oldpl = MRR_HLD_MED_RDLOCK(mrr_mdp, plstr);
        DSFMEDTRACE(mrr_mdp, msg, oldpl, DSFTOMEDIA);
        MRR_CLS_UNLOCK(mrrp);
        MRR_PUT_TO_MEDIA(mrr_mdp, msg, oldpl);
        MRR_LOCK_CLS(mrrp);

}

/*
 * mrr_validate: Validate whether the pointer to mrr_element_t is in the
 * given range. Holds mrrp locks on return.
 */

int
mrr_validate(mrrp, mdp)
        register mrr_element_t *mrrp;
        register media_obj_t *mdp;
{
        register int    index;
        register mrr_element_t *mrrcop;
        register int    s = MRR_SETPL(s);

        if (mdp) {
#if _UTS
MRR_VALIDATE:
```

© COPYRIGHT 1994 AMDAHL CORPORATION

```
        oldpl = MRR_HLD_MED_RDLOCK(mrr_mdp, plstr);
        DSFMEDTRACE(mrr_mdp, msg, oldpl, DSFTOMEDIA);
        MRR_SND_UNLOCK(mrrp);
        MRR_PUT_TO_MEDIA(mrr_mdp, msg, oldpl);
        MRR_LOCK_SND(mrrp);
}
/*
 * mrr_just_snd_msg_to_media: Just send to the media. Locks are held on
 * return. wait_on_close is used for race condition with close.
 */

STATIC void
mrr_just_snd_msg_to_media(mrrp, msg)
        register mrr_element_t *mrrp;
        register mblk_t *msg;

{
        register media_obj_t *mrr_mdp = mrr_mediahp[mrrp->med];
        MRR_PLT         oldpl = 0;

        oldpl = MRR_HLD_MED_RDLOCK(mrr_mdp, plstr);
        DSFMEDTRACE(mrr_mdp, msg, oldpl, DSFTOMEDIA);
        MRR_CLS_UNLOCK(mrrp);
        MRR_PUT_TO_MEDIA(mrr_mdp, msg, oldpl);
        MRR_LOCK_CLS(mrrp);

}

/*
 * mrr_validate: Validate whether the pointer to mrr_element_t is in the
 * given range. Holds mrrp locks on return.
 */

int
mrr_validate(mrrp, mdp)
        register mrr_element_t *mrrp;
        register media_obj_t *mdp;
{
        register int    index;
        register mrr_element_t *mrrcop;
        register int    s = MRR_SETPL(s);

        if (mdp) {
#if _UTS
MRR_VALIDATE:
```

© COPYRIGHT 1994 AMDAHL CORPORATION

```
                /*
                 * No need to hold media Lock since media will not disappear
                 * if an element is active. Specially if come via dsf lower
                 * put.
                 */
                pl_t oldpl = RW_RDLOCK(mdp->media.element_rwlkp, plstr);

#endif
                index = MRHASH((int) mrrp, MRCONNSZ);
                mrrcop = mdp->mrrcon[index];
                while (mrrcop) {
                        if (mrrcop == mrrp) {
                                MRR_SPLX(s);
#if _UTS
                                if ((TRYLOCK(mrrp->lkp, plstr)) == invpl) {
                                        RW_UNLOCK(mdp->media.element_rwlkp, oldpl);
                                        goto MRR_VALIDATE;
                                }
                                mrrp->oldpl = oldpl;
                                RW_UNLOCK(mdp->media.element_rwlkp, plstr);
#endif
                                return ((int) mrrcop);
                        } else
                                mrrcop = mrrcop->mrr_next;
                }
                MRR_SPLX(s);
                MRRLOG(mdp, "Element does not exist=%x\n", mrrp);
#if _UTS
                RW_UNLOCK(mdp->media.element_rwlkp, oldpl);
#endif
        }
        return (0);
}

/*
 * mrr_pwr: Calculates the exponent of size
 */
int
mrr_pwr(size)
        register int    size;
{
        register int    n = 0;

        while (size >>= 1)
                n++;
```

© COPYRIGHT 1994 AMDAHL CORPORATION

```
        return (n);
}

/*
 * mrr_assert_lock: Checks to see it the upper queue has disappeared.
 */
STATIC int
mrr_assert_lock(mrrp)
        register mrr_element_t *mrrp;
{
        MRR_LOCK(mrrp, plstr);
        if (!mrrp->urqptr) {
                MRRLOG(mrrp, "Upper queue gone =%x\n", mrrp);
                return (0);
        }
        return (1);
}
/* mrr_update_available_window: Check to see if window is zero. If it is
 * then take appropriate action, like enabling the queue.
 */

STATIC void
mrr_update_available_window(q, mrrp)
    register queue_t *q;
    register mrr_element_t *mrrp;
{
        if ((mrrp->remote.rec_info.avail_win = ((mrrp->remote.rec_info.max_win >>
            mrr_win_adj_shft) - q->q_count)) <= 0) {
#if _UTS
            /* Freeze stream here . Make sure avail_win is not zero
        */
       pl_t freezeval = freezestr(q);

                if ((mrrp->remote.rec_info.avail_win =((mrrp->remote.rec_info.max_win >>
                    mrr_win_adj_shft) - q->q_count)) <= 0) {
                        /*
                        * Window became zero. Equivalent to
                        * canput
                        */
                    q->q_flag |= QWANTW;
                    mrrp->remote.rec_info.avail_win = 0;
                }
                unfreezestr(q, freezeval);
#else
            /*
```

© COPYRIGHT 1994 AMDAHL CORPORATION

```
        * Window became zero. Equivalent to
        * canput
        */
        q->q_flag |= QWANTW;
        mrrp->remote.rec_info.avail_win = 0;
#endif
        }

}
#if _UTS

/*
 * mrr_save_msg_frag: Store messages received from remote side. They are not
 * complete  messages. Hence they need to be saved.
 */
STATIC void
mrr_save_msg_frag(mrrp, mp)
        register mrr_element_t *mrrp;
        register mblk_t *mp;
{
        mp->b_flag &= 0x7fff;          /* Make sure that MSGFRAG is cleared */
        if (mrrp->msg_frag == NULL) {
                mrrp->msg_frag = mp;
                return;
        }
        if (mp->b_datap->db_type == M_DATA)
                linkb(mrrp->msg_frag, mp);
        else if (mp->b_datap->db_type == M_PROTO) {
                /* Add data type to the end */
                linkb(mrrp->msg_frag, mp->b_cont);
                mp->b_cont = mrrp->msg_frag;
                /* Add to the front */
                mrrp->msg_frag = mp;
        } else {
                MRRLOG(mp->b_datap->db_type, "Different Msg during msg frag%x\n", mrrp);
                linkb(mrrp->msg_frag, mp);
        }

}

/*
 * mrr_msg_tobe_snd: Called since a message was being send when it tried to
 * send previously. This can occur due to a race condition. This is true for
 * an MP environment, since the entry points to send a message are plenty.
 */
```

© COPYRIGHT 1994 AMDAHL CORPORATION

```
STATIC void
mrr_msg_tobe_snd(mrrp)
        register mrr_element_t *mrrp;
{
        register media_obj_t *mdp;
        MRR_PLT         oldpl;

        if (!(mdp = dsf_chk_if_media_valid(mrrp->med)) || !mrr_validate(mrrp, mdp))
                return;
#if _UTS
        /* make sure that close does not beat us */
        mrrp->wait_on_close = 1;
#endif
        mrrp->tout_msg_being_snd = 0;
        mrr_xmit_all_pri_msgs(mrrp);
        MRR_UNLOCK_CLOSE(mrrp);
}

/*
 * mrr_send_ack_nak_tmout: Send ack/nak with locks held
 */
STATIC void
mrr_send_ack_nak_tmout(mrrp)
        register mrr_element_t *mrrp;
{
        if (!mrr_validate(mrrp, mrr_mediahp[mrrp->med]))
                return;
#if _UTS
        /* Make sure close does not beat us */
        mrrp->wait_on_close = 1;
#endif
        mrrp->tout_snd_ack_nak = 0;
        mrr_snd_pnd_ack_nak(mrrp);
        MRR_UNLOCK_CLOSE(mrrp);
}

/*
 * mrr_snd_pnd_ack_nak: Called since a ack/nak was being send when it tried
 * to send previously. This can occur due to a race condition. This is true
 * for an MP environment, since the entry points to send a message are
 * plenty.
 */
STATIC void
mrr_snd_pnd_ack_nak(mrrp)
        register mrr_element_t *mrrp;
```

© COPYRIGHT 1994 AMDAHL CORPORATION

```
{
        if (mrrp->ack_nak_being_snd) {
                mrrp->tout_snd_ack_nak = MRR_TIMEOUT(mrr_send_ack_nak_tmout, mrrp, 0);
                if (!mrrp->tout_snd_ack_nak)
                        MRRLOG(0, "ack/nak timout is zero %x\n", mrrp);
                return;
        }
        mrr_xmit_all_acks_nak(mrrp);
}


/*
 * mrr_append_then_check: First append a given message since somebody is
 * sending a message and then checks if it gets a xmit fired off, so that it
 * can send later.
 */

STATIC void
mrr_append_msg_chk_xmit(mrrp, dsf_mp, pri)
        mrr_element_t  *mrrp;
        register mblk_t *dsf_mp;
        register int    pri;
{
        register struct xmit_info *xmit_infop =
        &mrrp->remote.send_info.xmit_info[pri];

        if (xmit_infop->to_send_list) {
                mrr_append_mp(xmit_infop->to_send_list, dsf_mp);
        } else
                xmit_infop->to_send_list = dsf_mp;
        (void) mrr_xmit_pnd_msgs(mrrp, pri);
}

/*
 * mrr_append_acknak_chk_xmit: First append an ack msg since somebody is
 * sending a message and then checks if it gets a xmit fired off, so that it
 * can send latter.
 */

STATIC void
mrr_append_acknak_chk_xmit(mrrp, dsf_mp)
        register mrr_element_t *mrrp;
        register mblk_t *dsf_mp;
{
```

© COPYRIGHT 1994 AMDAHL CORPORATION

```
	if (mrrp->ack_nak_msg) {
		mrr_append_mp(mrrp->ack_nak_msg, dsf_mp);
	} else
		mrrp->ack_nak_msg = dsf_mp;

}

/*
 * mrr_xmit_all_acks_nak: Will xmit all pending acks/nak messages in the
 * order they have received
 */
STATIC void
mrr_xmit_all_acks_nak(mrrp)
	register mrr_element_t *mrrp;
{
	register mblk_t *msg;
	register media_obj_t *mrr_mdp = mrr_mediahp[mrrp->med];

	/* Checking for urqptr verifies that close is not waiting */
	while (mrrp->urqptr && (msg = mrrp->ack_nak_msg)) {
		mrrp->ack_nak_msg = msg->b_next;
		mrrp->ack_nak_being_snd = 1;
		mrr_just_snd_msg_to_media(mrrp, msg);
		/* check if element is still there. Close could be waiting */
		mrrp->ack_nak_being_snd = 0;

	}

}

/*
 * mrr_getuts_locks- Get the locks required for xmitting and receiving. This
 * is only for mp.
 */

STATIC int
mrr_getuts_locks(mrrp)
	register mrr_element_t *mrrp;
{

	if (!(mrrp->svp = SV_ALLOC(KM_NOSLEEP)))
		return (0);
	if (!(mrrp->lkp = LOCK_ALLOC(MRR_HIER1, plstr, &mrr_element_lkinfo,
					KM_NOSLEEP)))
		return (0);
```

© COPYRIGHT 1994 AMDAHL CORPORATION

```
        mrrp->oldpl = MRR_LK_NOT_USED;        /* Indicates not inuse  */
        return (1);
}

#endif
```

© COPYRIGHT 1994 AMDAHL CORPORATION

```
#ident "@(#)/usr/src/uts/uts/io/4655/dsf/mirror.h        11.9 6/1/93 09:35:52 - (c) Copyright 1988, 1993
Amdahl Corporation"
/* */

#ifndef _SYS_MIRROR_H
#define _SYS_MIRROR_H
#ifdef KERNEL

#if _UTS
#include <util/param.h>
#include <util/types.h>
#include <util/sysmacros.h>
#include <svc/errno.h>
#include <io/stropts.h>
#include <io/stream.h>
#include <io/strlog.h>
#include <proc/cred.h>
#include <io/ddi.h>
#include <io/strmp.h>
#include <mem/kmem.h>
#include <io/strsubr.h>
#include <util/cmn_err.h>
#include <proc/ksynch.h>
#include <io/conf.h>                /* for D_MP */
#include "dsf.h"
#else
#include "sys/param.h"
#include "sys/types.h"
#include "sys/sysmacros.h"
#include "sys/errno.h"
#include "sys/stropts.h"
#include "sys/stream.h"
#include "sys/strlog.h"
#include "sys/debug.h"
#include "sys/fs/s5dir.h"
#include "sys/signal.h"
#include "sys/immu.h"
#include "sys/psw.h"
#include "sys/pcb.h"
#include "sys/inode.h"
#include "sys/fstyp.h"
#include "sys/file.h"
#include "sys/conf.h"
#include "sys/region.h"
#include "sys/proc.h"
```

© COPYRIGHT 1994 AMDAHL CORPORATION

```
#include "sys/user.h"
#include "sys/proc.h"
#include "sys/cmn_err.h"
#include "dsf.h"
#endif
#endif                          /* KERNEL */
#define DSF_MID        0x555
#define MRR_MID                 0x556
#define MR_HIWAT   4096
#define MR_LOWAT   2048
#define MR_NAME                 "mirror"
#define DSF_NAME    "dsf"
#define DSFDEV                  "/dev/dsf"
#define MRRAD_SP    ' '
#define MED_VALUE_SZ      64
#define MRR_RELATED       ('m'<<8)
#define MR_ROUTE   (MRR_RELATED | 1)
#define MR_COMM           (MRR_RELATED | 2)
#define DSF_CLOSE_RESP    (MRR_RELATED | 3)
#define DSF_DEBUG_ON      (MRR_RELATED | 4)
#define DSF_DEBUG_OFF    (MRR_RELATED | 5)
#define DSF_TRACE_ON      (MRR_RELATED | 6)
#define DSF_TRACE_OFF     (MRR_RELATED | 7)
#define DSF_TRACE_MSG     (MRR_RELATED | 8)
#define DSF_MED_DOWN      (MRR_RELATED | 9)
#define DSF_MED_HANGUP  (MRR_RELATED | 10)
#define DSF_NOTKNOWN      -1
#define DSF_SUCCESS       1
#define DSF_FAILURE       0
#define DSF_ACTIVE        1
#define DSF_PASSIVE       0
#define DSFFROMMEDIA    0
#define DSFTOMEDIA        1
#define MAXINFO           40
#define MRR_XMIT_PASS     1
#define MRR_XMIT_FAIL     0
#define MRR_XMIT_BRK      -1
#define DSFKEEPALIVE      KEEPALIVE_INTERVAL
#define MRR_SLEEPTIME     ((KEEPALIVE_INTERVAL  * 2) / HZ)
#if _UTS
/* MP related stuff */
#define       DSF_HIER1   1      /* media lock */
#define MRR_HIER1  1      /* Xmit lock for an mrr_element */
#define       DSF_HIER2  2  /* media RW element lock */
#define DSF_HIER3   3     /* Lock for trace */
```

© COPYRIGHT 1994 AMDAHL CORPORATION

```
#define DSF_HIER30  30      /* RW/LOCK for media */
#else
#define toid_t  int
#endif

typedef struct med_stats med_stats_t;
typedef struct mrr_stats mrr_stats_t;
typedef struct com_med_obj com_med_obj_t;
typedef struct mrr_element mrr_element_t;
typedef struct media_obj media_obj_t;
typedef struct mrr_act_admin mrr_act_admin_t;
typedef struct usr_media_obj usr_media_obj_t;
typedef struct mrr_route_info mrr_route_info_t;
typedef struct mrr_route mrr_route_t;
typedef struct dsf_media_trace dsf_media_trace_t;
typedef struct dsf_debug dsf_debug_t;
typedef struct dsf_usr_trace dsf_usr_trace_t;
typedef struct dsf_med_down dsf_med_down_t;
typedef struct dsf_med_hangup dsf_med_hangup_t;

/*
 * Note that each Major Number is an index into a routing table. It  helps in
 * identifying the media.
 */
struct mrr_route {
        dev_t                   mrid;   /* The Major number */
        char            dev_name[DRV_NAME_LENGTH];      /* remote device name */
        char            media_value[MED_VALUE_SZ];      /* media values for
                                                         * routing */
};

/*
 * This structures are used by the open routine to identify its clients and
 * the lower media. Every connection is put on a linked list if it is
 * successfull. This structure is allocated statically and uses the hashing
 * algorithm. These tables are updated when the routing information is
 * downloaded by the admin daemon.
 */


struct mrr_route_info {
        mrr_route_info_t *dr_chain;     /* The next routing information */
        mrr_route_t     route_tbl;      /* Routing information */

};
```

© COPYRIGHT 1994 AMDAHL CORPORATION

```
struct usr_media_obj {
        uint        max_msg_size;   /* Max Media size */
        char        id[MAX_ID_LEN];       /* Send during DSF_OPEN */
        char        media_value[MED_VALUE_SZ];        /* media information */

};

/*
 * Media related statistics. Also used during reconnection. The last_msg_time
 * is used for sending DSF_KEEPALIVE_REQ messages
 */
struct med_stats {
        uint        last_msg_time;    /* Time last message was received */
        uint        no_of_mssg;       /* No of ADMIN & DATA mssgs received */
        int         mrr_count;        /* connections active */
        int         mrr_tcount;       /* total connections opened */

};

/*
 * DSF element related statistics
 */
struct mrr_stats {
        uint        nak_rcvd;         /* No of nak  received */
        uint        naks_send;        /* No of nak's send */
};


/*
 * This structure is updated, when the admin process sends information about
 * the media. The admin process, does this after the linking process is
 * successful.
 */


struct com_med_obj {
        int         l_index;/* mux_id index */
        queue_t        *lwqp;   /* Updated during LINK. This is the lower
                                 * media queue  */
        usr_media_obj_t lower;          /* Everthing you wanted to know about the
                                 * media */
#if _UTS
        rwlock_t       *element_rwlkp;          /* Used for inserting/removing mirror
```

© COPYRIGHT 1994 AMDAHL CORPORATION

```
                                  * elements */
      sv_t          *svp;      /* unit structure synchronisation during
                                  * close */
      rwlock_t      *med_rwlkp;    /* Used for Synchronizing during
                                  * Unlink and put  */
      lock_t        *tr_lkp;   /* unit structure basic lock for trace */
#endif
};

/* All mrr_element status  (media status )values */
#define MR_HANGUPSEND  0x01
#define MR_REXMIT 0x02
#define MR_MEDDOWN      0x04
#define MR_NOREMOTE     0x08
#define MR_MEDUP   DSF_MED_READY
#define MR_MEDDOWNP     0x20
#define MR_TIMEOUT      0x40
#define MR_UPRDY   (MR_MEDUP | MR_REXMIT)

/* mrr_element state */
#define MR_OPENING        0x00001
#define MR_OPENED 0x00002
#define MR_PUSHING        0x00004
#define MR_PUSHED 0x00008
#define MR_POPING  0x00010
#define MR_POPED   0x00020
#define MR_LINKING        0x00040
#define MR_LINKED  0x00080
#define MR_UNLINKING      0x00100
#define MR_UNLINKED       0x00200
#define MR_CLOSING        0x00400
#define MR_BUFCCLOSE      0x00800
#define MR_BUF_CLS_POP    0x01000
#define MR_CLOSED 0x02000
#define MR_FLOWING        0x04000
#define MR_BLOCKED        0x08000
#define MR_UPSTATE (MR_OPENED | MR_PUSHED | MR_LINKED | MR_UNLINKED |
MR_POPED \
      | MR_LINKING | MR_UNLINKING)
#define MR_SLEEPING (MR_OPENING | MR_PUSHING | MR_POPING | MR_CLOSING | \
      MR_BUF_CLS_POP)


/*
 * Each of these structures are stored dynamically. They are allocated before
```

© COPYRIGHT 1994 AMDAHL CORPORATION

```
 * a remote open is send. Each protocol connection uses this structure.
 */
#define DSF_BOTTOM 0            /* The stream component is on the device end */
#define DSF_TOP 1               /* The stream component is at the user end */


struct mrr_element {
        dev_t           mrr_major;      /* Corresponds to the major */
        queue_t         *urqptr;  /* upper queue.  */
        mrr_route_info_t *route;/* hash table pointer for this conn */
        int             med;    /* index into media table */
   dev_t                        mrr_minor;      /* Minor number assigned */
        int             state;  /* Conn Stage,Data Tx,Comp Stage */
        int             status; /* Status of media */
        int             pri;    /* DSF_NORMAL or DSF_BAND_PRI */
        toid_t          bid;    /* bufcall id for dupb failure */
        toid_t          cbid;   /* bufcall id for open close, pop */
        toid_t          ctid;   /* timeout id push and allocb failure */
        mblk_t          *hi_pri_msg;    /* Save allocb fail messages */
        mrr_act_admin_t *info;          /* store active admin info  */
        int             error_code;     /* Error code returned by admin resp */
        mrr_element_t  *mrr_next;       /* Next on a given media */
        mrr_stats_t     stats;  /* Statistic for a given connection */
        struct r_queue_info remote;     /* remote queue information */
#if _UTS
        mblk_t                  *msg_frag; /* Save mssgs for application */
   int                  msg_frag_len; /* mssgs received so far from applications */
        int             ack_nak_being_snd;      /* Flag that an acknak msg is  send */
        mblk_t          *ack_nak_msg;  /* Ack/Nak message being saved */
        toid_t          tout_snd_ack_nak;       /* Ack nak messages need to be send */
        int             seq_msg_being_send;     /* Flag to indicate sq msg being send */
        toid_t          tout_msg_being_snd;     /* Wait timeout when msg being send */
        int             msg_being_rcv;  /* Flag to say msg  being send to user */
        int                             wait_on_close;  /* Flag to indicate close should wait */
        cred_t          *io_cr;  /* value of cred ptrs for ioctls */
        sv_t            *svp;    /* unit structure synchronisation - eg. close */
        lock_t          *lkp;    /* unit structure basic lock for write */
        pl_t            oldpl;
#else
        long            io_cr;   /* uid & gid for  SV3.2 */
#endif                           /* UTS */
};


/*
```

© COPYRIGHT 1994 AMDAHL CORPORATION

```
 * Admin Info during an active connection. The memory is got during an
 * I_LINK operaion
 */


struct mrr_act_admin {
        int             remote_link_id;
        struct linkblk  local;
        mblk_t          *ml;
        mrr_act_admin_t *next;
};

#define         MRCONNSZ  64
#define         MRHASH(mrid, consz)         (((mrid) >> (mrr_pwr(consz))) & (consz-1))
#define MR_INPROCESS      0x1
#define MR_SUCCESS        0x2
#define MR_FAILURE        0x4


/*
 * The dest_id in struct dsf_msg_header should be directly point to
 * mrr_element_t. As soon as the lower comm media is attached to the DSF
 * drivers the media daemon issues an attach request. Also the mirror driver
 * has to issue a DSF_OPEN_REQ to the remote side. The remote partner, sends
 * information about itself.
 */


/*
 * Admin related information. The admin driver has a clone interface. The
 * following structure defines the information stored in the admin stream.
 * There is a header pointer to this structure.
 */
#define DSF_MED_CLOSING             0x0000
#define DSF_MED_OPENED          0x0001
#define DSF_MED_LINKED          0x0002
#define DSF_WAIT_DSF_OPEN_REQ       0x0004
#define DSF_WAIT_DSF_OPEN_RES       0x0008
#define DSF_MED_READY           0x0010
#define DSF_MED_UNLINKED        0x0020
#define DSF_MED_VER_MISMATCH        0x0040
#define DSF_MED_CONV_MISMATCH       0x0080
#define DSF_XCHANGE             0x0100
#define DSF_TIMEOUT             0x0200
```

© COPYRIGHT 1994 AMDAHL CORPORATION

```
#define DSF_CLOSE_SEND          0x0400
#define DSF_KEEP_ALIVE_FAILED   0x0800

struct media_obj {
        int             status;         /* Status of the media, left by the admin */
        int             index;          /* Minor Number associated with admin stream */
        toid_t          bid;            /* bufcall id */
        toid_t          xrsbid;         /* id for bufcall on xchange resp */
        int             xch_resp;       /* how many exchange to be send */
        short           open_strms;     /* remote STREAM count,send during reconnect */
        short           error_code;     /* Error code if Failure */
        int             dsf_reconn_count;       /* DSF request count received */
        short           activator;      /* ACTIVE OR PASSIVE */
        short           xch_index;      /* Index into mrrcon when sending xch mssg */
        mrr_element_t   *xch_con;/* Next xch_con to send during xchange */
        queue_t         *urq;           /* Store the admin Read proccesses queue. */
        queue_t         *urtrq;         /* Read queue of logging trace */
        unsigned int    version;/* DSF version number */
        unsigned int    trc_count[2];   /* Trace counter number */
        unsigned char   conv_flags[4];  /* Data representation */
        toid_t          keepalive;      /* Keep alive timeout with remote DSF */
        int             missed_keepalive;       /* How many to miss before giving up */
        med_stats_t     stats;  /* Stats info */
        com_med_obj_t   media;          /* Information about media from admin */
        mrr_element_t   *mrrcon[MRCONNSZ];      /* Connection active on this media */
};
/* These are DSF trace messages which are send to the dsf driver */

struct dsf_debug {
        int             type;           /* DSF_DEBUG on or DSF_DEBUG off */
};

/* The media trace to be turned on is defined by an M_IOCTL message */
struct dsf_usr_trace {
        int             type;
};

/* The struct dsf_msg dsf_msg is send as an M_PROTO message */

struct dsf_media_trace {
        int             type;           /* DSF_TRACE_MSG always */
        int             len;
        unsigned int    time;           /* Time of receiving/sending the message */
        int             direc;          /* Send or received from  media */
        unsigned int    count;          /* Counter for this message */
```

© COPYRIGHT 1994 AMDAHL CORPORATION

```
};

/* The struct dsf_med_down_t is send when when media is down temorarily */

struct dsf_med_down {
        int             type;       /* DSF_MED_DOWN */
};

struct dsf_med_hangup {
        int             type;       /* DSF_MED_HANGUP */
};

union dsf_admin {
        int             type;
        dsf_debug_t     dsfdebug;
        dsf_usr_trace_t dsfusrtrace;
        dsf_media_trace_t dsftrace;
        dsf_med_down_t  dsfmeddown;
        dsf_med_hangup_t dsfmehangup;
        struct dsf_close_msg dsf_close_msg;
};

#define DSF_MEDIA_VALID(mediap) \
(mediap == mrr_mediahp[mediap->index] && (mediap->status & DSF_MED_CLOSING) == 0)

#if _UTS
#define MRR_LK_NOT_USED                 (plbase -1)
#define MRR_PLT                      register pl_t
#define qpptr_t _VOID *
#define KMEM_ALLOC(s,f)              (kmem_zalloc(s,f))
#define KMEM_FREE(a,s)               (kmem_free(a,s))
#define MRR_UNBUFCALL(b)             (unbufcall(b))
#define MRR_RETURN(e)                return(e);
#define MRR_SLEEP(m,p)               (!(SV_WAIT_SIG((m)->svp, prinet,(m)->lkp)))
#define MRR_SLEEP_NO_INTR(m,p) (SV_WAIT((m)->svp, prinet,(m)->lkp))
#define MRR_WAKEUP(m)                SV_SIGNAL((m)->svp, 0)
#define MRR_CANPUT(q)                canputnext(q)
#define MRR_BCANPUT(q,p)             bcanputnext((q),(p))
#define MRR_TIMEOUT(fn,a,t)        itimeout((fn),(a),(t),(plstr))
#define MRR_UNTIMEOUT(t)             untimeout(t)
#define MRR_PUTCTL(q,m)              putnextctl((q),(m))
#define MRR_PUTCTL1(q,m,v)         putnextctl1((q),(m),(v))
#define MRR_SETPL(s)                 s
#define MRR_SPLX(s)
#define MRR_HLD_MED_RDLOCK(m,p)        RW_RDLOCK((m)->media.med_rwlkp, (p));
```

© COPYRIGHT 1994 AMDAHL CORPORATION

```
#define MRR_RLS_MED_LOCK(m,p)    RW_UNLOCK((m)->media.med_rwlkp, (p))
#define MRR_LOCK(m, p)          { \
                        (m)->oldpl = LOCK((m)->lkp, p); \
                        }
#define MRR_UNLOCK(m)           { \
                        (m)->oldpl = MRR_LK_NOT_USED; \
                    UNLOCK((m)->lkp, (m)->oldpl); \
                        }

#define MRR_PUT_TO_MEDIA(md,mp,pl)   { \
                              if ((md) && (md)->media.lwqp) \
                                 putnextlk((md)->media.lwqp, \
                                 mp,(md)->media.med_rwlkp, pl);\
                              else  {\
                                strlog(MRR_MID,0,0,SL_TRACE,"Dropping Msg %x\n",md);
\
                                RW_UNLOCK((md)->media.med_rwlkp, pl); \
                                freemsg(mp); \
                              } \
                            }

#define MRR_PUT_TO_USR(q,m,mp,pl)        { \
                        (m)->wait_on_close =1; \
                        (pl)= (m)->oldpl; \
                        (m)->oldpl = plstr; \
                        MRR_UNLOCK(m); \
                        putnextlk((q),mp,(mrr_mediahp[(m)->med])->media.element_rwlkp, \
                        pl); \
                        }
#define MRR_UNLOCK_CLOSE(m)    { \
                      (m)->wait_on_close = 0; \
                           MRR_UNLOCK(m); \
                              }

#else
#define MRR_PLT      register int
#define qpptr_t char *
#define KMEM_ALLOC(s,f)          (km_alloc(s,(1-f)))
#define KMEM_FREE(a,s)           (km_free(a,s))
#define KM_NOSLEEP               1
#define KM_SLEEP          0
#define MRR_UNBUFCALL(b)
#define MRR_RETURN(e)            { \
                         u.u_error = e; \
                         return(OPENFAIL);  \
```

© COPYRIGHT 1994 AMDAHL CORPORATION

```
                                }
#define MRR_SLEEP(m,p)            sleep(((caddr_t)m),(p))
#define MRR_SLEEP_NO_INTR(m,p)  sleep(((caddr_t)m),(p))
#define MRR_WAKEUP(m)             wakeup((caddr_t)(m))
#define MRR_CANPUT(q)             canput((q)->q_next)
#define MRR_BCANPUT(q,p)          MRR_CANPUT(q)
#define MRR_TIMEOUT(f,a,t)        timeout((f),(a),(t))
#define MRR_UNTIMEOUT(t)          untimeout(t)
#define MRR_PUTCTL(q,m)           putctl((q)->q_next,(m))
#define MRR_PUTCTL1(q,m,v)        putctl1((q)->q_next,(m),(v))
#define MRR_SETPL(s)              splstr()
#define MRR_SPLX(s)               splx(s)
#define MRR_HLD_MED_RDLOCK(m,p)       0
#define MRR_RLS_MED_LOCK(m,p)
#define MRR_LOCK(m, p)
#define MRR_UNLOCK(m)
#define MRR_UNLOCK_CLOSE(m)
#define MRR_PUT_TO_MEDIA(md,mp,pl)  { \
                               if ((md) && (md)->media.lwqp) \
                                  putnext((md)->media.lwqp, mp); \
                                else  { \
                                   freemsg(mp); \
                                } \
                             }
#define MRR_PUT_TO_USR(q,m,mp,pl)       putnext(q,mp)
#endif
#define DSFMEDTRACE(mdp, mp, oldpl, value)  \
                                                    if ((mdp)->urtrq) {  \
                                                    MRR_RLS_MED_LOCK(mdp,  oldpl);
\
                         dsf_send_trace_msg((mp), mdp, \
                         mrr_msg_length(mp), value); \
                         oldpl = MRR_HLD_MED_RDLOCK(mdp, plstr); \
                                                    }

#define MSGBLEN(mp)         ((mp)->b_wptr - (mp)->b_rptr)
#endif                        /* _SYS_MIRROR_H          */
```

© COPYRIGHT 1994 AMDAHL CORPORATION

```
# @(#)/usr/src/amdahl/cmd/4655/vcs4/dsf/daemon/dsf_daemon/reload_route    11.1 8/5/92 16:44:57 -
(c) Copyright 1988, 1993 Amdahl Corporation
#
addr=`ps -e | grep dsf_daem | cut -c0-6`
if [ "$addr" != "" ]
then
        kill -16 $addr
        status=0
else
        status=1
fi
exit $status
```

310

© COPYRIGHT 1994 AMDAHL CORPORATION

```
# @(#)/usr/src/amdahl/cmd/4655/vcs4/dsf/daemon/dsf_daemon/restart_media 11.1 8/5/92 16:45:10 -
(c) Copyright 1988, 1993 Amdahl Corporation
#
addr=`ps -e | grep dsf_daem | cut -c0-6`
if [ "$addr" != "" ]
then
	kill -17 $addr
	status=0
else
	status=1
fi
exit $status
```

© COPYRIGHT 1994 AMDAHL CORPORATION

```
#ident "@(#)/usr/src/amdahl/cmd/4655/vcs4/dsf/trace/rstrace/rstrace.c 11.3 12/2/92 10:59:17"

/*      Copyright (c) 1990 UNIX System Laboratories, Inc.   */
/*      Copyright (c) 1984, 1986, 1987, 1988, 1989, 1990 AT&T     */
/*        All Rights Reserved         */

/*      THIS IS UNPUBLISHED PROPRIETARY SOURCE CODE OF        */
/*      UNIX System Laboratories, Inc.                        */
/*      The copyright notice above does not evidence any      */
/*      actual or intended publication of such source code.   */

#include <fcntl.h>
#include <time.h>
#include <sys/param.h>
#include <sys/stropts.h>
#include <sys/strlog.h>
#include <stdio.h>

#define CTLSIZE sizeof(struct log_ctl)
#define DATSIZE LOGMSGSZ
#define TIMESIZE 26
#define MAXTID 50

static int errflg = 0;    /* set if error in argument parsing */
static int infile = 0;    /* set if using standard input for arguments */
static int log;


#define numeric(c) ((c <= '9') && (c >= '0'))
int convarg(ap)
   char *ap;
{
   short ids[2];

   if (!ap)
        return (-2);
   if (numeric(*ap))
        return (atoi(ap));
   if (!strcmp(ap, "all"))
        return (-1);
   errflg = 1;
   return (-2);
}

char *getarg()
```

© COPYRIGHT 1994 AMDAHL CORPORATION

```
{
    static char argbuf[40];
    static eofflg = 0;
    char *ap;
    int c;

    if (eofflg) {
        infile = 0;
        return (NULL);
    }
    ap = argbuf;

    /*
     * Scan to first significant character in standard input. If EOF is
     * encountered turn off standard input scanning and return NULL
     */
    while ((c = getchar()) == ' ' || c == '\n' || c == '\t');
    if (c == EOF) {
        infile = 0;
        eofflg++;
        return (NULL);
    }

    /*
     * collect token until whitespace is encountered. Don't do anything with
     * EOF here as it will be caught the next time around.
     */
    while (1) {
        *ap++ = c;
        if ((c = getchar()) == ' ' || c == '\n' || c == '\t' || c == EOF) {
            if (c == EOF)
                eofflg++;
            *ap = '\0';
            return (argbuf);
        }
    }
}


getid(ac, av, tp)
    int ac;
    char **av;
    struct trace_ids *tp;
{
    static index = 1;
```

© COPYRIGHT 1994 AMDAHL CORPORATION

```
	/*
	 * if inside of standard input scan take arguments from there.
	 */
retry:
	if (infile) {
		tp->ti_mid = convarg(getarg());
		tp->ti_sid = convarg(getarg());
		tp->ti_level = convarg(getarg());
		if (errflg)
			return (0);

		/*
		 * if the previous operations encountered EOF, infile will be set to
		 * zero.  The trace_ids structure must then be loaded from the
		 * command line arguments. Otherwise, the structure is now valid and
		 * should be returned.
		 */
		if (infile)
			return (1);
	}

	/*
	 * if we get here we are either taking arguments from the command line
	 * argument list or we hit end of file on standard input and should
	 * return to finish off the command line arguments
	 */
	if (index >= ac)
		return (0);

	/*
	 * if a '-' is present, start parsing from standard input
	 */
	if (!strcmp(av[index], "-")) {
		infile = 1;
		index++;
		goto retry;
	}

	/*
	 * Parsing from command line, make sure there are at least 3 arguments
	 * remaining.
	 */
	if ((index + 2) >= ac)
		return (0);
```

© COPYRIGHT 1994 AMDAHL CORPORATION

```
    tp->ti_mid = convarg(av[index++]);
    tp->ti_sid = convarg(av[index++]);
    tp->ti_level = convarg(av[index++]);

    if (errflg)
        return (0);
    return (1);
}

main(ac, av)
    int ac;
    char **av;
{
    int n;
    char cbuf[CTLSIZE];
    char dbuf[DATSIZE];
    struct strioctl istr;
    struct strbuf ctl, dat;
    struct log_ctl *lp = (struct log_ctl *) cbuf;
    struct trace_ids tid[MAXTID];
    struct trace_ids *tp;
    int ntid;
    int val;
    int flag;

    ctl.buf = cbuf;
    ctl.maxlen = CTLSIZE;
    dat.buf = dbuf;
    dat.len = dat.maxlen = DATSIZE;

    if (ac < 2) {
        fprintf(stderr, "ERROR: No log device specified\n");
        exit(1);
    }
    log = open(av[1], O_RDWR);
    if (log < 0) {
        fprintf(stderr, "ERROR: unable to open %s\n", av[1]);
        perror("");
        exit(1);
    }
    /* Adjust arguments */
    ac--;
    av++;

    tp = tid;
```

© COPYRIGHT 1994 AMDAHL CORPORATION

```
    ntid = 0;

    if (ac == 1) {
        ntid++;
        tid[0].ti_mid = -1;
        tid[0].ti_sid = -1;
        tid[0].ti_level = -1;
    } else
        while (getid(ac, av, tp)) {
            ntid++;
            tp++;
        }

    if (errflg)
        exit(errflg);

    istr.ic_cmd = I_TRCLOG;
    istr.ic_dp = (char *) tid;
    istr.ic_len = ntid * sizeof(struct trace_ids);
    istr.ic_timout = 0;
    if (ioctl(log, I_STR, &istr) < 0) {
        fprintf(stderr, "ERROR: tracer already exists\n");
        exit(1);
    }
    setbuf(stdout, (char *) NULL);
    flag = 0;
    while (getmsg(log, &ctl, &dat, &flag) >= 0) {
        flag = 0;
        if (ctl.len == 0 && dat.len == 0) {
                fprintf(log, "rstrace received HANGUP message\n");
                exit(2);
        }
        lp = (struct log_ctl *) cbuf;
        prlog(stdout, lp, dbuf);
    }
}

/*
 * calculate the address of the log printf arguments. The pointer lp MUST
 * start on a word boundary. This also assumes that struct log_msg is
 * an integral number of words long. If either of these is violated,
 * an alignment fault will result.
 */
int *logadjust(dp)
    char *dp;
```

© COPYRIGHT 1994 AMDAHL CORPORATION

```
{
   while (*dp++ != 0);
   dp = (char *) (((unsigned long) dp + sizeof(int) - 1) & ~(sizeof(int) - 1));
   return ((int *) dp);
}


prlog(log, lp, dp)
   FILE *log;
   struct log_ctl *lp;
   char *dp;
{
   char *ts;
   int *args;
   char *ap;

   ts = ctime(&(lp->ttime));
   ts[19] = '\0';
   fprintf(log, "%06d %s %08x %2d %s%s%s %d %d ",
          lp->seq_no, (ts + 11),
          lp->ltime, lp->level,
          ((lp->flags & SL_FATAL) ? "F" : "."),
          ((lp->flags & SL_NOTIFY) ? "N" : "."),
          ((lp->flags & SL_ERROR) ? "E" : "."),
          lp->mid, lp->sid);

   args = logadjust((char *) dp);

   fprintf(log, dp, args[0], args[1], args[2], args[3]);
   putc('\n', log);
}
```

© COPYRIGHT 1994 AMDAHL CORPORATION

```
#ident "@(#)/usr/src/amdahl/cmd/4655/vcs4/dsf/daemon/chan/vme_adm.c     11.8 4/5/93 16:25:43 -
(c) Copyright 1988, 1993 Amdahl Corporation"
/* */
/* File: vme_adm.c - last edit:
 * yatin      Fri Jul 10 17:15:30 1992
 * helge      Mon May 11 15:03:54 1992
 * lyatin     Mon May  4 11:24:28 1992
 *
 * Copyright (c) 1991 by Amdahl Corporation. All rights reserved.
 * Copyright (c) 1992 by Amdahl Corporation. All rights reserved.
 */

#include <stdio.h>
#include <sys/types.h>
#include <sys/fcntl.h>
#include <poll.h>
#include <errno.h>
#include <string.h>
#include <signal.h>
#include <stropts.h>
#include <sys/ioctl.h>
#include "sys/vmedrv.h"
#include "dsf/dsf.h"
#include "dsf/mirror.h"
#include "dsf/adm55.h"
#define DSFDEV "/dev/dsf"
#define VMEMEDIA "/dev/vmed"
#define DSF_VME     "vme_bus "
#define VME_CON_MSG     "VME driver error... Please bring up Board  %d\n"
#define SLEEPTIME  5
#define LINESIZE 400
#define CTLSIZE  128
#define DATSIZE     1024
#define DEBUG1(s,a1) if (debug) printf(s,a1)
#define ERR0(s)  { logtime(logf); fprintf(logf,s); fflush(logf); }
#define ERR1(s,a1) { logtime(logf); fprintf(logf,s,a1);fflush(logf); }
#define ERR2(s,a1,a2) { logtime(logf); fprintf(logf,s,a1,a2); fflush(logf);}
#define TTIME 240
#define VMELOGFILE "/etc/opt/dsf/vmeadmlog"
FILE        *logf;
static int    check_attach_resp();
char          my_name[32];
int          debug = 0;
extern int     errno;
extern int     vme_drv_map_addr();
```

© COPYRIGHT 1994 AMDAHL CORPORATION

```
extern void     vme_drv_unmap(), logtime();
extern void         catch_free_shm(), catch_all_signals(), terminate();
static char     line[LINESIZE];
int             fd = -1;

/* VME related stuff */
static struct vme_att_req att_req;
static struct vme_att_resp att_res;
static int      cardno = -1;

int             link_channel();
static int      monitor(), check_attach_resp(), unlink_media();
static void      loadmediavalue();
static int      media_down(), dsf_med_down();
static int      wait_for_remote_dsf();

main(argc, argv)
        int             argc;
        char            *argv[];
{
        void            loadmediavalue();
        usr_media_obj_t lowercomm;
        static int      mux_id = -1;
        int             mntr_result = 0;
        extern int       send_media_type();
        int             trytime = TTIME;
        static char      logfile[64];
        static char      devicename[64];

        (void) strcpy(logfile, VMELOGFILE);
        (void) strcat(logfile, argv[1]);

        if ((logf = fopen(logfile, "a")) == NULL) {
                (void) fprintf(stderr, "%s: Cannot open \"%s\" as log file\n",
                                argv[0], logfile);
                exit(1);
        }
        /* do a setpgrp() to separate mrr_daemon from parent process */
        setpgrp();
        strcpy(my_name, argv[0]);
        loadmediavalue((argc - 1), argv, &lowercomm);
        /* catch all signals to free shared memory */
        catch_all_signals(catch_free_shm);
        signal(SIGTERM, terminate);
        signal(SIGINT, terminate);
```

© COPYRIGHT 1994 AMDAHL CORPORATION

```
        /* send mrroute to admin driver in kernel */

        do {
START_AGAIN:

                if (mntr_result == DSF_MED_DOWN ||
                    mntr_result == DSF_MED_HANGUP) {
                        if (unlink_media(fd, mux_id))
                                goto LINKCHAN;

                }
                if (fd != -1) {
                        close(fd);
                        sleep(SLEEPTIME);
                }
                while ((fd = open(DSFDEV, O_RDWR)) < 0) {
                        ERR1("Opened failed on DSF driver=%d. Trying again\n", errno);
                        sleep(SLEEPTIME);
                        if (--trytime == 0) {
                                ERR0("Exiting could not open successfully\n");
                                exit(1);
                        }
                }
LINKCHAN:

                trytime = TTIME;
                while ((mux_id = link_channel(fd, &lowercomm)) < 0) {
                        ERR1("Could not link vmedrv under DSF=%d. Trying again\n", errno);
                        sleep(SLEEPTIME);
                        if (--trytime == 0) {
                                ERR0("Exiting could not connect vmedrv under DSF Driver\n");
                                exit(1);
                        }
                }
                trytime = TTIME;
                /* store vme_share address. Don't allow process to terminate */
            signal(SIGTERM, catch_free_shm);
            signal(SIGINT, catch_free_shm);
                while (vme_drv_map_addr(cardno, att_res.vme_drv_desc_addr) < 0) {
                        ERR1("Could not map %x shared memory .Trying again \n",
                            att_res.vme_drv_desc_addr);         /* exit ??? */
                        signal(SIGTERM, terminate);
              signal(SIGINT, terminate);
                        sleep(SLEEPTIME);
                        if (--trytime == 0) {
```

© COPYRIGHT 1994 AMDAHL CORPORATION

```
                        ERR0("Exiting could not map shared memory.Bye \n");
                        exit(1);
                }
                signal(SIGTERM, catch_free_shm);
        signal(SIGINT, catch_free_shm);
         }
         signal(SIGTERM, terminate);
    signal(SIGINT, terminate);
         trytime = TTIME;
         while (send_media_type(fd, &lowercomm) < 0) {
                sleep(SLEEPTIME);
                if (--trytime == 0) {
                        ERR0("Exiting could not send media information\n");
                        exit(1);
                }
         }
         /* Wait for some time for card comes up before going to monitor */
         if ((mntr_result = wait_for_remote_dsf(cardno)) == DSF_MED_DOWN) {
            /* Check if we received a close request from remote side */
            struct pollfd   pollfds[1];,

            pollfds[0].fd = fd;
        pollfds[0].events = (POLLHUP | POLLIN);
        pollfds[0].revents = 0;
        if (poll(pollfds, 1, 0) > 0)
                if (!chk_admin_msgs(fd, VME_CON_MSG, cardno, logf))
                   exit(0); /* exit, remote side told us that. */
                 else
                     ERR0("Waiting for remote side to come up.\n");
                 /* Lets' start over again */
     goto START_AGAIN;


          }
      ERR2("%s for board %d is up\n", my_name, cardno);
     } while ((mntr_result = monitor(fd, mux_id)));

}

int
link_channel(fdm, lowercomm)
        register int    fdm;
        register usr_media_obj_t *lowercomm;
{
```

© COPYRIGHT 1994 AMDAHL CORPORATION

```
        int             fd0;
        int             mux_id;
        extern int      send_attach(), waitfor_ack();

        if ((fd0 = open(VMEMEDIA, O_RDWR)) < 0) {
                ERR1("VME Open failed =%d.\n", errno);
                return (-1);
        }
        att_req.type = VME_ATTACH_REQ;
        if (send_attach(fd0, &att_req, sizeof(struct vme_att_req)) < 0) {
                ERR0("Attach  failed \n");
                close(fd0);
                return (-1);
        }
        if (waitfor_ack(fd0, check_attach_resp, 20) < 0) {
                ERR0("Did Not attach\n");
                close(fd0);
                return (-1);
        }
        if ((mux_id = ioctl(fdm, I_LINK, fd0)) == -1) {
                ERR1("ioctl, I_LINK failed =%d\n", errno);
                close(fd0);
                return (-1);
        }
        close(fd0);
        return (mux_id);
}

/*
 * Poll for a M_HANGUP or an M_PROTO message from the mirrror driver. If it
 * is an M_HANGUP message then try to open and link sctm  again . If the
 * message is an MPC_PROTO then a graceful exit is called for. This is done
 * by just exiting.
 */

static int
monitor(dsf, mux_id)
        int             dsf;
        int             mux_id;
{

        struct pollfd   pollfds[1];
        int             result;
        extern void     sndmsg_console();
```

© COPYRIGHT 1994 AMDAHL CORPORATION

```
        pollfds[0].fd = dsf;
        pollfds[0].events = (POLLHUP | POLLIN);
        pollfds[0].revents = 0;


        while ((result = poll(pollfds, 1, -1)) < 0) {
                if (errno == EAGAIN)
                        continue;
                else {
                        ERR1("poll failed: %d\n", errno);
                        return (0);       /* Maybe continue */
                }
        }


        /* check returned events on the admin */

        /* quit if we receive POLLERR or POLLNVAL messages */
        if (pollfds[0].revents & (POLLERR | POLLNVAL)) {
                ERR1("POLLERR or POLLNVAL mesg received on admin \
                pollval = 0x%x\n", pollfds[result].revents);
                ERR1("Exiting monitoring %x\n", att_res.vme_drv_desc_addr);
                return (0);       /* Maybe continue */
        }
        if (pollfds[0].revents & POLLHUP) {
                ERR0("Hangup received on admin\n");

                /*
                 * Issue an I_UNLINK and try again. Send message on console
                 * signifying to admin that the media underneath is down
                 */
                sndmsg_console(VME_CON_MSG, cardno);
                return (unlink_media(dsf, mux_id));

        }
        if (pollfds[0].revents & POLLIN)
                return (chk_admin_msgs(fd, VME_CON_MSG, cardno, logf));
        /* End of monitor */
        return (0);
}
```

© COPYRIGHT 1994 AMDAHL CORPORATION

```
static void
loadmediavalue(argn, argv, lowercomm)
        int             argn;
        char            *argv[];
        register usr_media_obj_t *lowercomm;
{

        char            *mptr, *ptr, *nptr;
        register int    len;

        (void) strcpy(lowercomm->id, DSF_VME);
        (void) strcat(lowercomm->id, argv[1]);
        (void) strcpy(lowercomm->media_value, lowercomm->id);
        DEBUG1("ID value =%s\n", lowercomm->id);

        if (argn--) {
                cardno = atoi(argv[1]);
                DEBUG1("Card No=%d\n", cardno);
                DEBUG1("Media value =%s\n", lowercomm->media_value);

        }
        /* end of routing information */
        if (argn--) {
                att_req.n_rd_buf = atoi(argv[2]);
                DEBUG1("n_rd_buf=%d\n", att_req.n_rd_buf);
        }
        if (argn--) {
                att_req.n_wrt_buf = atoi(argv[3]);
                DEBUG1("n_wrt_buf=%d\n", att_req.n_wrt_buf);
        }
        if (argn--) {
                lowercomm->max_msg_size = att_req.buff_size = atoi(argv[4]);
                DEBUG1("bsize=%d\n", att_req.buff_size);
        }
}




static int
check_attach_resp(fd)
        int             fd;
```

© COPYRIGHT 1994 AMDAHL CORPORATION

```
{
        struct strbuf   ctlbuf;
        int             flag = 0;

        ctlbuf.maxlen = sizeof(struct vme_att_resp);
        ctlbuf.len = 0;
        ctlbuf.buf = (char *) &att_res;

        if (getmsg(fd, &ctlbuf, (char *) 0, &flag) >= 0) {
                DEBUG1("VMEDRV_DESC_ADDR=%x\n", att_res.vme_drv_desc_addr);
                if (att_res.type == VME_ATTACH_RESP && att_res.error_code == 0)
                        return (0);
                else
                        ERR2("PPA_ATTACH_RESP_FAILURE= %d %d\n",
                            att_res.error_code, att_res.vme_drv_desc_addr);
        }
        return (-1);

}

static int
unlink_media(fd, mux_id)
        register int    fd;
        register int    mux_id;
{
        int             unlink_ret;

        if (mux_id == -1)
                return (0);
        else {
                if ((unlink_ret = ioctl(fd, I_UNLINK, mux_id)) == -1) {
                        ERR1("Could not unlink media driver for VME %d\n", cardno);
                        perror("Unlink Error:");
                        if (unlink_ret == ETIME || unlink_ret == ENOSR)
                                return (0);
                }
        }
        sleep(SLEEPTIME);    /* Wait for 10 seconds before trying again */
        return (1);

}
/*
 * wait_for_remote_dsf(): waits for the remote card to declare itself
 * available. It tries to map the vme address for a total of 5 minutes.
 */
```

© COPYRIGHT 1994 AMDAHL CORPORATION

```
static int
wait_for_remote_dsf(cardno)
        int             cardno;
{
    int count;
    int value = -1;

    for (count = 5; count &&
        ((value = dsf_med_down(cardno)) == DSF_MED_DOWN ); count--) {
        /* store vme_share address. Don't allow process to terminate */
         signal(SIGTERM, catch_free_shm);
                signal(SIGINT, catch_free_shm);
                  if (vme_drv_map_addr(cardno, att_res.vme_drv_desc_addr) < 0)
                            ERR1("Could Not map =%x shared memory to the process \n",
                                att_res.vme_drv_desc_addr);
                  signal(SIGTERM, terminate);
            signal(SIGINT, terminate);
    }

    return value;

}
/*
 * Wait a while for the media of  your interest to come up.
 * Wait totally for 1 minute.
 */

static int
dsf_med_down(cardno)
        int             cardno;
{
        register int    count;
        char            devicename[64];
        int value = -1;

        sprintf(devicename, "%s%x\0",DEVLOOP,cardno);
        for (count = 30; count &&
            ((value = media_down(devicename)) == DSF_MED_DOWN); --count)
                sleep(2);          /* Wait for 2 sec before trying again */
        return value;
}

/*
 * media_down: Opens the admin driver on the DSF. If it could open it
 * then DSF is declared to be up. Any error results in a failure.
```

© COPYRIGHT 1994 AMDAHL CORPORATION

```
 */
static int
media_down(devicename)
        char            *devicename;
{
        register int    fd0;

        if ((fd0 = open(devicename, O_RDWR)) < 0) {
                return DSF_MED_DOWN;
        }
        close(fd0);
        return 0;
}
```

© COPYRIGHT 1994 AMDAHL CORPORATION

```
#ident "@(#)/usr/src/uts/uts/io/4655/dsf/vmedrv.c        11.3 11/6/92 11:42:27 - (c) Copyright 1988, 1993
Amdahl Corporation"
/* */
/* File: vmedrv.c - last edit:
 * helge        Wed Jun 17 17:24:33 1992
 * lyatin       Mon Jan  6 13:34:06 1992
 *
 * Copyright (c) 1991 by Amdahl Corporation. All rights reserved.
 * Copyright (c) 1992 by Amdahl Corporation. All rights reserved.
 */

#include "sys/param.h"
#include "sys/types.h"
#include "sys/sysmacros.h"
#include "sys/errno.h"
#include "sys/stropts.h"
#include "sys/stream.h"
#include "sys/strlog.h"
#include "sys/debug.h"
#include "sys/fs/s5dir.h"
#include "sys/signal.h"
#include "sys/immu.h"
#include "sys/psw.h"
#include "sys/pcb.h"
#include "sys/inode.h"
#include "sys/fstyp.h"
#include "sys/file.h"
#include "sys/conf.h"
#include "sys/region.h"
#include "sys/proc.h"
#include "sys/user.h"
#include "sys/cmn_err.h"
#include "sys/vmedrv.h"
#include "sys/vmedrvshr.h"


#define BUFF_SIZE 4096
#define BUFF_NUM 32
#ifndef STATIC
#define STATIC
#endif
extern char wrt_buff_pool[];
extern u_char buff_in_use[];

#define VME_DEV_CLOSED 0
```

© COPYRIGHT 1994 AMDAHL CORPORATION

```
#define VME_DEV_OPEN   1
#define VME_DEV_ATT    2

struct dev_desc {
    int status;
    queue_t *rq;
    mblk_t *rd_buff[MAX_BUFFS]; /* Up to MAX_BUFFS read.buffers */
    char *wrt_buff[MAX_BUFFS]; /* Pointers to write buffers */
    char *rem_data_mbx; /* Mailbox waiting for DATA-AVAILABLE message */
    char *rem_ack_mbx; /* Mailbox waiting for READ-DATA message */
    int bid; /* If a bufcall() is outstanding this is != 0 */
};

#define MAX_DEV 8
#define DRAM_START 0x800000

static u_char *vmbx; /* Virtual base address of mailboxes */

extern caddr_t vmeiobase; /* Short I/O space base */

/*
 * Each minor number will have associated with it an entry of dev_table and
 * an entry of vme_dev_table.
 */

static struct dev_desc dev_table[MAX_DEV];
extern struct vme_buff_desc vme_dev_table[];

#define DATA_INT(d) { \
    if (dev_table[d].rem_data_mbx != NULL) \
        *dev_table[d].rem_data_mbx = VME_BUS_DATA; \
    else { \
        map_mbx(d); \
        if (dev_table[d].rem_data_mbx != NULL) \
            *dev_table[d].rem_data_mbx = VME_BUS_DATA; \
    } \
}

#define ACK_INT(d) { \
    if (dev_table[d].rem_ack_mbx != NULL) \
        *dev_table[d].rem_ack_mbx = VME_BUS_ACK; \
    else if (vme_dev_table[d].rd_ack_req_mbx != 0) { \
        map_mbx(d); \
        if (dev_table[d].rem_ack_mbx != NULL) \
            *dev_table[d].rem_ack_mbx = VME_BUS_ACK; \
```

© COPYRIGHT 1994 AMDAHL CORPORATION

```
   } \
}

extern caddr_t memap();
extern mblk_t *allocb();

#define VMEDRV_ID 0xeeb1

static struct module_info vmedrvinfo = {
   VMEDRV_ID, "vmed", 0, BUFF_SIZE, 3*BUFF_SIZE, BUFF_SIZE/2
};


STATIC int vmeopen(), vmewput(), vmersrv(), vmeclose();

static struct qinit rinit = {
   NULL,           /* Put routine */
   vmersrv,        /* Service routine */
   vmeopen,        /* Open Routine */
   vmeclose,       /* Close Routine */
   NULL,           /* Admin Routine */
   &vmedrvinfo,    /* Information */
   NULL            /* Statistics */
};

static struct qinit winit = {
   vmewput,        /* Put routine */
   NULL,           /* Service routine */
   NULL,           /* Open Routine */
   NULL,           /* Close Routine */
   NULL,           /* Admin Routine */
   &vmedrvinfo,    /* Information */
   NULL            /* Statistics */
};

struct streamtab vmedinfo = {&rinit, &winit, NULL, NULL};

extern int onboard; /* Contains size of memory in number of clicks */

/*
 * vmeopen - Open routine that allocates a free minor device number. Other
 *           resources are allocated by the attach request.
 */

STATIC int vmeopen(q, dev, flag, sflag)
```

© COPYRIGHT 1994 AMDAHL CORPORATION

```
    queue_t *q;
    int  dev, flag, sflag;
{
    int new_dev;
    register int i;

    if (sflag == CLONEOPEN) {
        for (i = 0; i < MAX_DEV; i++) {
            if (dev_table[i].status == VME_DEV_CLOSED) {
                /* Found a non-used one */
                WR(q)->q_ptr = q->q_ptr = (caddr_t)i;
                dev_table[i].status = VME_DEV_OPEN;
                dev_table[i].rq = q;
                return i;
            }
        }
        u.u_error = EMFILE;
        return OPENFAIL;
    } else if ((new_dev = minor(dev)) < 0 || new_dev >= MAX_DEV) {
        u.u_error = ENODEV;
        return OPENFAIL;
    } else if (dev_table[new_dev].status == VME_DEV_CLOSED) {
        WR(q)->q_ptr = q->q_ptr = (caddr_t)new_dev;
        dev_table[new_dev].status = VME_DEV_OPEN;
        dev_table[i].rq = q;
        return new_dev;
    } else if (new_dev != q->q_ptr) {
        u.u_error = EINVAL;
        return OPENFAIL;
    } else
        return new_dev;
}

STATIC void cp_msg(mp, buff_ptr)
    register mblk_t *mp;
    register char *buff_ptr;
{
    register int len;

    while (mp != NULL) {
        len = mp->b_wptr - mp->b_rptr;
        bcopy(mp->b_rptr, buff_ptr, len);
        buff_ptr += len;
        mp = mp->b_cont;
    }
```

© COPYRIGHT 1994 AMDAHL CORPORATION

```
}

#define A32_D16 0x80000000
struct map_entry {
   ulong phys_addr;
   char *virt_addr;
};

static int n_maptbl = 0;
static struct map_entry map_table[MAX_DEV];

/*
 * vmemap_cache - Search address in list of already mapped addresses
 */

char *vmemap_cache(addr)
   ulong addr;
{
   register int i;
   for (i = 0; i < n_maptbl; i++)
      if (map_table[i].phys_addr == addr)
         return map_table[i].virt_addr;
   return NULL;
}

void save_vmemap(virt_addr, phys_addr)
   char *virt_addr;
   ulong phys_addr;
{
   if (n_maptbl == MAX_DEV)
      n_maptbl--; /* Should not happen, if it does we overwrite last entry */
   map_table[n_maptbl].virt_addr = virt_addr;
   map_table[n_maptbl].phys_addr = phys_addr;
   n_maptbl++;
}

/*
 * map_mbx - Map remote mailboxes to virtual address
 */

STATIC void map_mbx(dev_id)
   int dev_id;
{
   register ulong wrt_mbx, rd_ack_req_mbx, round_addr;
   int s = splstr();
```

© COPYRIGHT 1994 AMDAHL CORPORATION

```
    if ((wrt_mbx = vme_dev_table[dev_id].wrt_mbx) != 0) {
        if (wrt_mbx & SHORT_MEM_PREFIX)
            dev_table[dev_id].rem_data_mbx = vmeiobase + (wrt_mbx & 0x0fffffff);
        else {
            round_addr = wrt_mbx & 0xfffff000;
            if ((dev_table[dev_id].rem_data_mbx = vmemap_cache(round_addr)) == 0) {
                /* Need to create new entry */
                if ((dev_table[dev_id].rem_data_mbx =
                        memap(A32_D16 | round_addr, 2)) == NULL) {
                    splx(s);
                    return;
                }
                save_vmemap(dev_table[dev_id].rem_data_mbx, round_addr);
            }
            dev_table[dev_id].rem_data_mbx += (wrt_mbx % 4096);
        }
    }
    if ((rd_ack_req_mbx = vme_dev_table[dev_id].rd_ack_req_mbx) != 0) {
        if (rd_ack_req_mbx & SHORT_MEM_PREFIX)
            dev_table[dev_id].rem_ack_mbx = vmeiobase +
                (rd_ack_req_mbx & 0x0fffffff);
        else {
            round_addr = rd_ack_req_mbx & 0xfffff000;
            if ((dev_table[dev_id].rem_ack_mbx = vmemap_cache(round_addr)) == 0) {
                /* Need to create new entry */
                if ((dev_table[dev_id].rem_ack_mbx =
                        memap(A32_D16 | round_addr, 2)) == NULL) {
                    splx(s);
                    return;
                }
                save_vmemap(dev_table[dev_id].rem_ack_mbx, round_addr);
            }
            dev_table[dev_id].rem_ack_mbx += (rd_ack_req_mbx % 4096);
        }
    }
    splx(s);
}

/*
 * proc_attach - Process an attach request on a newly opened stream.
 */

STATIC void proc_attach(q, mp)
    queue_t *q;
    mblk_t *mp;
```

© COPYRIGHT 1994 AMDAHL CORPORATION

```
{
   register struct vme_att_resp *att_resp = (struct vme_att_resp *)mp->b_rptr;
   register struct vme_att_req *att_req = (struct vme_att_req *)mp->b_rptr;
   register int i, buff_ind;
   register int d = (int)q->q_ptr;

   if (mp->b_wptr - mp->b_rptr != sizeof(struct vme_att_req) ||
        att_req->type != VME_ATTACH_REQ ||
        dev_table[d].status != VME_DEV_OPEN) {
      /* Invalid message */
      freemsg(mp);
      putctl1(RD(q)->q_next, M_ERROR, EINVAL);
      return;
   }
   att_resp->type = VME_ATTACH_RESP;
   if (att_req->buff_size > BUFF_SIZE)
      att_req->buff_size = BUFF_SIZE;
   if (att_req->n_rd_buf > MAX_BUFFS)
      att_req->n_rd_buf = MAX_BUFFS;
   if (att_req->n_wrt_buf  > MAX_BUFFS)
      att_req->n_wrt_buf = MAX_BUFFS;

   vme_dev_table[d].buff_size = att_req->buff_size;
   /* Allocate read buffer resources */
   for (i = 0; i < att_req->n_rd_buf; i++) {
      if ((dev_table[d].rd_buff[i] = allocb(vme_dev_table[d].buff_size),
           BPRI_MED) == NULL) {
         /* Not enough STREAMS resources */
         register int j;
         att_resp->error_code = ENOSR;
         for (j = 0; j < i; j++)
            freemsg(dev_table[d].rd_buff[j]);
         qreply(q, mp);
         return;
      }
      vme_dev_table[d].rd_buff_addr[i] =
           svtophys(dev_table[d].rd_buff[i]->b_rptr) - DRAM_START;
      vme_dev_table[d].rd_buff_len[i] = 0;
   }
   vme_dev_table[d].n_rd_buf = i;
   /* Allocate write buffer resources */
   buff_ind = 0;
   for (i = 0; i < att_req->n_wrt_buf; i++) {
      while (buff_ind < BUFF_NUM && buff_in_use[buff_ind] != 0)
         buff_ind++;
```

© COPYRIGHT 1994 AMDAHL CORPORATION

```
        if (buff_ind >= BUFF_NUM)
            break;
        buff_in_use[buff_ind] = 1;
        dev_table[d].wrt_buff[i] = &wrt_buff_pool[buff_ind++ * BUFF_SIZE];
        vme_dev_table[d].wrt_buff_addr[i] = kvtophys(dev_table[d].wrt_buff[i])
             - DRAM_START;
        vme_dev_table[d].wrt_buff_len[i] = 0;
    }
    vme_dev_table[d].n_wrt_buf = i;
    /* Initialize remainder of shared descriptor (except for status )*/

    vme_dev_table[d].rd_mbx = ctob(onboard) - 4096 + 2 * d;
    vme_dev_table[d].wrt_mbx = 0;
    vme_dev_table[d].rd_ack_req_mbx = 0;
    vme_dev_table[d].wrt_ack_req_mbx = vme_dev_table[d].rd_mbx + 1;
    vme_dev_table[d].next_rd_rd = 0;
    vme_dev_table[d].next_rd_wrt = 0;
    vme_dev_table[d].next_wrt_rd = 0;
    vme_dev_table[d].next_wrt_wrt = 0;

    /* Initialize remainder device descriptor */

    dev_table[d].rem_data_mbx = NULL;
    dev_table[d].rem_ack_mbx = NULL;
    dev_table[d].bid = 0;
    dev_table[d].status = VME_DEV_ATT;

    /* Prepare response */

    att_resp->error_code = 0;
    att_resp->vme_drv_desc_addr = kvtophys(&vme_dev_table[d]) - DRAM_START;
    att_resp->n_rd_buf = vme_dev_table[d].n_rd_buf;
    att_resp->n_wrt_buf = vme_dev_table[d].n_wrt_buf;
    att_resp->buff_size = vme_dev_table[d].buff_size;
    qreply(q, mp);
    vme_dev_table[d].status = VMEDRV_ACTIVE;
}

/*
 * vmewput - Processes data messages and attach requests.
 *
 */

STATIC int vmewput(q, mp)
    queue_t *q;
```

© COPYRIGHT 1994 AMDAHL CORPORATION

```
    register mblk_t *mp;
{
    register int minor_dev;
    int s;

    switch (mp->b_datap->db_type) {

    case M_FLUSH:
    /* M_FLUSH - Cananonical flush processing.  If flush write queue, flush it
     * including the message being output.  If flush read then do the read
     * queue and send the message back upstream.
     */
        if (*mp->b_rptr & FLUSHW) {
            flushq(q, FLUSHDATA);
            *mp->b_rptr &= ~FLUSHW;
        }
        if (*mp->b_rptr & FLUSHR) {
            flushq(RD(q), FLUSHDATA);
            qreply(q, mp);
        } else
            freemsg(mp);
        break;

    case M_DATA:
        minor_dev = (int)q->q_ptr;
        s = splstr();

        if (vme_dev_table[minor_dev].status != VMEDRV_ACTIVE) {
            /* Can't process data message */
            freemsg(mp);
            /* Check whether the remote side did the close */
            if (dev_table[minor_dev].status == VME_DEV_ATT)
                putctl(RD(q)->q_next, M_HANGUP);
            else
                putctl1(RD(q)->q_next, M_ERROR, EINVAL);
        } else if (vme_dev_table[minor_dev].n_wrt_buf == 0) {
            /* no write buffers - interrupt only */
            DATA_INT(minor_dev);
            freemsg(mp);
        } else if (q->q_first || !vme_write_mp(q, mp))
            putq(q, mp); /* No space to write */
        splx(s);
        break;

    case M_PROTO:
```

© COPYRIGHT 1994 AMDAHL CORPORATION

```
  case M_PCPROTO:
     s = splstr();
       proc_attach(q, mp);
       splx(s);
       break;

  /* Throw anything else away silently */
  default:
       freemsg(mp);
       break;
  }
}

STATIC int vmeclose(q, flag)
   queue_t *q;
   int flag;
{
   register int d = (int)q->q_ptr;
   register int i;
   register int s;

   if (d < 0 || d > MAX_DEV)
      return 0;
   s = splstr();
   if (dev_table[d].status == VME_DEV_ATT) {
      dev_table[d].status = VME_DEV_CLOSED;
      splx(s);
      vme_dev_table[d].status = 0;
      vme_dev_table[d].wrt_ack_req_mbx = 0;
      vme_dev_table[d].rd_mbx = 0;
      for (i = 0; i < vme_dev_table[d].n_rd_buf; i++)
         vme_dev_table[d].rd_buff_addr[i] = 0;
      delay(10); /* To avoid race conditions */
      DATA_INT(d); /* Tell other side about it */
      /* Release all read buffers */
      for (i = 0; i < vme_dev_table[d].n_rd_buf; i++) {
         freemsg(dev_table[d].rd_buff[i]);
         dev_table[d].rd_buff[i] = NULL;
      }
      vme_dev_table[d].n_rd_buf = 0;
      /* Free up the write buffers */
      for (i = 0; i < vme_dev_table[d].n_wrt_buf; i++) {
         register int buff_ind;
         buff_ind = (dev_table[d].wrt_buff[i] - wrt_buff_pool) / BUFF_SIZE;
         buff_in_use[buff_ind] = 0;
```

© COPYRIGHT 1994 AMDAHL CORPORATION

```
            dev_table[d].wrt_buff[i] = NULL;
            vme_dev_table[d].wrt_buff_addr[i] = 0;
        }
        vme_dev_table[d].n_wrt_buf = 0;
        if (dev_table[d].bid != 0) {
       /*     unbufcall(dev_table[d].bid); */
            dev_table[d].bid = 0;
        }
    } else {
        dev_table[d].status = VME_DEV_CLOSED;
        splx(s);
    }
}

/*
 * vmedinit - Initializes the descriptors and map the mailbox area into
 *              virtual memory.
 */

void vmedinit()
{

    vmeioinit();
    vmbx = (u_char *)memap(ctob(onboard)+ DRAM_START - 4096, btoc(4096));
    bzero(vmbx, 2*MAX_DEV);
    bzero(&vme_dev_table, (sizeof(struct vme_buff_desc)) * MAX_DEV);
    bzero(&dev_table, sizeof(dev_table));
}

/*
 * xmit_int - A write buffer has been read. Check whether next buffer has
 *            already data in it and should go.
 */

STATIC void xmit_int(d)
    register int d;
{
    register int w_ind = vme_dev_table[d].next_wrt_wrt;
    register mblk_t *mp;
    register queue_t *wq;
    register int s;


    if (dev_table[d].status != VME_DEV_ATT) {
        return;
```

© COPYRIGHT 1994 AMDAHL CORPORATION

```
    }
    if (vme_dev_table[d].next_wrt_rd == w_ind &&
        vme_dev_table[d].wrt_buff_len[w_ind] > 0) {
        if (++w_ind == vme_dev_table[d].n_wrt_buf)
            w_ind = 0;
        vme_dev_table[d].wrt_buff_len[w_ind] = 0;
        vme_dev_table[d].next_wrt_wrt = w_ind;
        DATA_INT(d);
    }
    wq = WR(dev_table[d].rq);
    s = splstr();
    while ((mp = getq(wq)) != NULL)
        if (!vme_write_mp(wq, mp)) {
            putbq(wq, mp);
            break;
        }
    splx(s);
}

/*
 * null_msg - In case an interrupt was received but no data send up a zero
 *            length data message.
 */

STATIC void null_msg(d)
    int d;
{
    register mblk_t *mp;

    /* Check whether one message has just been sent */
    if (dev_table[d].rq->q_next->q_first)
        return; /* No need for duplicate */
    if ((mp = allocb(0, BPRI_MED)) == NULL) {
        if ((dev_table[d].bid = bufcall(sizeof(mblk_t), BPRI_MED, null_msg, d)) == 0)
            timeout(null_msg, d, HZ);
        return;
    }
    putnext(dev_table[d].rq, mp);
}

/*
 * alloc_rd_buff - Try to allocate a read buffer again.
 */

STATIC void alloc_rd_buff(d)
```

© COPYRIGHT 1994 AMDAHL CORPORATION

```
    register int d;
{
    register int r_ind;
    register int s = splstr();
    int success = 0;

    dev_table[d].bid = 0;
    if (vme_dev_table[d].status != VMEDRV_ACTIVE) {
        splx(s);
        return;
    }
    for (r_ind = vme_dev_table[d].next_rd_wrt; ;) {
        if (dev_table[d].rd_buff[r_ind] == NULL)
            if ((dev_table[d].rd_buff[r_ind] =
                allocb(vme_dev_table[d].buff_size, BPRI_MED)) == NULL) {
                if ((dev_table[d].bid = bufcall(vme_dev_table[d].buff_size,
                        BPRI_MED, alloc_rd_buff, d)) == 0)
                    /* bufcall() failed */
                    timeout(alloc_rd_buff, d, HZ);
                break;
            } else {
                vme_dev_table[d].rd_buff_addr[r_ind] = svtophys(dev_table[d].
                        rd_buff[r_ind]->b_rptr) - DRAM_START;
                success = 1;
            }
        if (++r_ind == vme_dev_table[d].next_rd_wrt)
            break;
        if (r_ind == vme_dev_table[d].n_rd_buf)
            r_ind = 0;
    }
    splx(s);
    if (success)
        ACK_INT(d);
}

/*
 * vmersrv - Tries to send a new message upstream.
 */

STATIC int vmersrv(q)
    queue_t *q;
{
    register mblk_t *mp;
    register int s = splstr();
```

© COPYRIGHT 1994 AMDAHL CORPORATION

```
    while ((mp = getq(q)) != NULL) {
        if (!canput(q->q_next)) {
            putbq(q, mp);
            break;
        }
        putnext(q, mp);
    }
    splx(s);
}

/*
 * msg_size - Determine total number of bytes in a message
 */

static int msg_size(mp)
    register mblk_t *mp;
{
    register int len = 0;

    while (mp != NULL) {
        len += (mp->b_wptr - mp->b_rptr);
        mp = mp->b_cont;
    }
    return len;
}

/*
 * vme_write_mp - Write a message to next available buffer.
 */

STATIC int vme_write_mp(q, mp)
    queue_t *q;
    mblk_t *mp;
{
    register int d = (int)q->q_ptr;
    register int next_wrt_wrt = vme_dev_table[d].next_wrt_wrt;
    int msg_len = msg_size(mp);

    if (msg_len > BUFF_SIZE - vme_dev_table[d].wrt_buff_len[next_wrt_wrt]) {
        /* Message does not fit */
        if (msg_len > BUFF_SIZE) {
            cmn_err(CE_WARN, "Message too large for VME bus driver %d",
                msg_len);
            putctl1(RD(q)->q_next, M_ERROR, EINVAL);
            freemsg(mp);
```

© COPYRIGHT 1994 AMDAHL CORPORATION

```
            return 1;
        } else if (next_wrt_wrt + 1 == vme_dev_table[d].next_wrt_rd ||
            (vme_dev_table[d].next_wrt_rd == 0 &&
            next_wrt_wrt >= vme_dev_table[d].n_wrt_buf - 1))
            /* Can't write into next buffer (wrap around) */
            return 0;
        else {
            if (++next_wrt_wrt >= vme_dev_table[d].n_wrt_buf)
                next_wrt_wrt = 0;
            vme_dev_table[d].next_wrt_wrt = next_wrt_wrt;
            DATA_INT(d);
            /* Previous buffer is now available for read */
            cp_msg(mp, dev_table[d].wrt_buff[next_wrt_wrt]);
            vme_dev_table[d].wrt_buff_len[next_wrt_wrt] = msg_len;
        }
    } else {
        /* Message fits into current buffer */
        cp_msg(mp, dev_table[d].wrt_buff[next_wrt_wrt] +
            vme_dev_table[d].wrt_buff_len[next_wrt_wrt]);
        vme_dev_table[d].wrt_buff_len[next_wrt_wrt] += msg_len;
        /* Increment index of next write buffer if equal to next read
         * buffer.
         */
        if (next_wrt_wrt == vme_dev_table[d].next_wrt_rd) {
            if (++next_wrt_wrt >= vme_dev_table[d].n_wrt_buf)
                next_wrt_wrt = 0;
            vme_dev_table[d].wrt_buff_len[next_wrt_wrt] = 0;
            vme_dev_table[d].next_wrt_wrt = next_wrt_wrt;
            DATA_INT(d);
        }
    }
    freemsg(mp);
    return 1;
}


/*
 * recv_int - a new message buffer has been filled. Send the message upstream,
 *           if possible and allocate a new buffer. If no new buffer is
 *           available make a bufcall() for later allocation.
 */

STATIC void recv_int(d)
    int d;
{
```

© COPYRIGHT 1994 AMDAHL CORPORATION

```
    register mblk_t *mp;
    register int r_ind;
    register queue_t *rq = dev_table[d].rq;
    register int read_data = 0;

    if (vme_dev_table[d].status != VMEDRV_ACTIVE) {
        if (dev_table[d].status == VME_DEV_ATT)
            /* Remote closed */
            putctl(rq->q_next, M_HANGUP);
        return;
    }
    r_ind = vme_dev_table[d].next_rd_rd;

    while (r_ind != vme_dev_table[d].next_rd_wrt) {
        mp = dev_table[d].rd_buff[r_ind];
        mp->b_wptr = mp->b_rptr + vme_dev_table[d].rd_buff_len[r_ind];
        if (rq->q_first || !canput(rq->q_next))
            putq(rq, mp);
        else
            putnext(rq, mp);

        if ((dev_table[d].rd_buff[r_ind] = allocb(vme_dev_table[d].buff_size,
              BPRI_MED)) == NULL) {
            vme_dev_table[d].rd_buff_addr[r_ind] = 0;
            if (dev_table[d].bid == 0)
                if ((dev_table[d].bid = bufcall(vme_dev_table[d].buff_size,
                      BPRI_MED, alloc_rd_buff, d)) == 0)
                    /* bufcall() failed */
                    timeout(alloc_rd_buff, d, HZ);
        } else {
            read_data = 1;
            vme_dev_table[d].rd_buff_addr[r_ind] = svtophys(dev_table[d].
                  rd_buff[r_ind]->b_rptr) - DRAM_START;
        }
        if (++r_ind == vme_dev_table[d].n_rd_buf)
            r_ind = 0;
    } /* while */
    vme_dev_table[d].next_rd_rd = r_ind;
    if (read_data)
        ACK_INT(d);
}

/*
 * vmedintr - Interrupt routine to be called in case somebody writes to a
 *            mailbox over the vme bus.
```

© COPYRIGHT 1994 AMDAHL CORPORATION

```
 */

void vmedintr()
{
    register u_char *mbx_ptr = vmbx;
    register int i;

    for (i = 0; i < MAX_DEV ; i++) {
        if (*mbx_ptr != 0) {
            *mbx_ptr = 0;
            if (dev_table[i].status != VME_DEV_ATT)
                ;
            else if (vme_dev_table[i].n_rd_buf == 0)
                null_msg(i);
            else
                recv_int(i);
        }
        mbx_ptr++;
        if (*mbx_ptr != 0) {
            *mbx_ptr = 0;
            xmit_int(i);
        }
        mbx_ptr++;
    }
}
```

© COPYRIGHT 1994 AMDAHL CORPORATION

```
/* File: adm55.c - last edit:
 * helge        Fri Apr  3 14:10:12 1992
 *
 * Copyright (c) 1991 by Amdahl Corporation. All rights reserved.
 */

#include "sys/types.h"
#include "sys/param.h"
#include "sys/sysmacros.h"
#include "sys/stream.h"
#include "sys/stropts.h"
#include "sys/errno.h"
#include "sys/cred.h"
#include <sys/adm55.h>
#include <sys/cmn_err.h>

#define STATIC

static struct module_info minfo = {
     0xee12, "adm55", 0, INFPSZ, 512, 128};

STATIC int adm55open(), adm55close(), adm55wput(), adm55wsrv(), adm55rsrv();

static struct qinit rinit = {
     NULL, adm55rsrv, adm55open, adm55close, NULL, &minfo, NULL};

static struct qinit winit = {
     adm55wput, adm55wsrv, NULL, NULL, NULL, &minfo, NULL};

struct streamtab adm55info = {&rinit, &winit, NULL, NULL};

int adm55devflag = 0;

STATIC int adm55open(q, devp, flag, sflag, credp)
    queue_t *q;
    dev_t *devp;
    int flag;
    int sflag;
    cred_t *credp;
{
    struct loop *loop;
    dev_t newminor;
    register mblk_t *m;

    /*
```

© COPYRIGHT 1994 AMDAHL CORPORATION

```
 * If CLONEOPEN, pick a minor device number to use.
 * Otherwise, check the minor device range.
 */

if (sflag == CLONEOPEN) {
    for (newminor = 0; newminor < loop_cnt; newminor++) {
        if (loop_loop[newminor].qptr == NULL)
            break;
    }
} else
    newminor = getminor(*devp);

if (newminor >= loop_cnt)
    return ENXIO;

/* Construct new device number and reset devp */

/* getmajor gets the external major number, if (sflag == CLONEOPEN) */

if (q->q_ptr) /* already open */
    return 0;
if (newminor > 3)
    dsf_set_prio(q);
*devp = makedevice(getemajor(*devp), newminor);
loop = &loop_loop[newminor];
WR(q)->q_ptr = (char *)loop;
q->q_ptr = (char *)loop;
loop->qptr = WR(q);
loop->oqptr = NULL;
if ((m = allocb(sizeof(struct stroptions), BPRI_LO)) != 0) {
    struct stroptions *strop = (struct stroptions *) m->b_rptr;

        strop->so_flags = SO_READOPT|SO_LOWAT|SO_HIWAT|SO_ISTTY;
        strop->so_readopt = RMSGN;
        strop->so_lowat = 35;
        strop->so_hiwat = 539;

        m->b_wptr += sizeof (struct stroptions);
        m->b_datap->db_type = M_SETOPTS;
        putnext(q, m);
}

    return 0;
}
```

© COPYRIGHT 1994 AMDAHL CORPORATION

```
STATIC int adm55wput(q, mp)
   queue_t *q;
   mblk_t *mp;
{
   register struct loop *loop;

   loop = (struct loop *)q->q_ptr;

   switch (mp->b_datap->db_type) {
   case M_IOCTL:
       {
          struct iocblk *iocp;
          int error;

            iocp = (struct iocblk *)mp->b_rptr;
            switch (iocp->ioc_cmd) {
            case LOOP_SET:
               {
                  int to; /* other minor device */
                  /*
                   * Sanity check. ioc_count contains the amount of
                   * user supplied data which must equal the size of an int.
                   */

                  if (iocp->ioc_count != TRANSPARENT &&
                        iocp->ioc_count != sizeof(int)) {
                     error = EINVAL;
                     goto iocnak;
                  }

                  /* fetch other dev from 2nd message block */
                  to = *(int *)mp->b_cont->b_rptr;
                  /*
                   *
                   * More sanity checks. The minor must be in range, open
                   * already. Also, this device and the other one must be
                   * disconnected.
                   */

                  if (to >= loop_cnt || to < 0 || !loop_loop[to].qptr) {
                     error = ENXIO;
                     goto iocnak;
                  }

                  if (loop->oqptr || loop_loop[to].oqptr) {
```

© COPYRIGHT 1994 AMDAHL CORPORATION

```
                error = ENXIO;
                goto iocnak;
            }
            /* Cross connect streams via the loop structure */
            loop->oqptr = RD(loop_loop[to].qptr);
            loop_loop[to].oqptr = RD(q);
            /*
             * Return successful ioctl. Set ioc_count to zero
             * since no data are returned
             */

            mp->b_datap->db_type = M_IOCACK;
            iocp->ioc_count = 0;
              qreply(q, mp);
              break;
            }

        default:
            error = EINVAL;
        iocnak:
            /*
             * Bad ioctl. Setting ioc_error causes the ioctl call to return
             * that particular errno. By default, ioctl will return EINVAL
             * on failure.
             */
            mp->b_datap->db_type = M_IOCNAK;
            iocp->ioc_error = error; /* set returned errno */
            qreply(q, mp);
            break;
        }
        break;
    }

  case M_FLUSH:
    if (*mp->b_rptr & FLUSHW) {
        flushq(q, FLUSHALL); /* write */
        flushq(loop->oqptr, FLUSHALL);
            /* read on other side equals write on this side */
     }
     if (*mp->b_rptr & FLUSHR) {
         flushq(RD(q), FLUSHALL);
         flushq(WR(loop->oqptr), FLUSHALL);
     }

     switch (*mp->b_rptr) {
```

© COPYRIGHT 1994 AMDAHL CORPORATION

```
            case FLUSHW:
                *mp->b_rptr = FLUSHR;
                break;
            case FLUSHR:
                *mp->b_rptr = FLUSHW;
                break;
            }
            putnext(loop->oqptr, mp);
            break;

    default: /* If this stream isn't connected, send M_ERROR upstream. */
        if (loop->oqptr == NULL) {
            freemsg(mp);
            putctl1(RD(q)->q_next, M_ERROR, ENXIO);
            break;
        }
        putq(q, mp);
    }
}


STATIC int adm55wsrv(q)
    register queue_t *q;
{
    mblk_t *mp;
    register struct loop *loop;

    loop = (struct loop *)q->q_ptr;

    while ((mp = getq(q)) != NULL) {
        /* Check if we can put the message up the other stream read queue */
        if (mp->b_datap->db_type <= QPCTL && !canput(loop->oqptr->q_next)) {
            putbq(q, mp);
            break;
        }
        /* send message to queue following other stream read queue */
        putnext(loop->oqptr, mp);
    }
}

STATIC int adm55rsrv(q)
    register queue_t *q;
{
    /* Enter only when "back enabled" by flow control */
```

© COPYRIGHT 1994 AMDAHL CORPORATION

```
    struct loop *loop;

    loop = (struct loop *)q->q_ptr;
    if (loop->oqptr == NULL)
        return;

    /* manually enable write service procedure */

    qenable(WR(loop->oqptr));
}

STATIC adm55close(q, flag, credp)
    queue_t *q;
    int flag;
    cred_t *credp;
{
    register struct loop *loop;

    loop = (struct loop *)q->q_ptr;
    loop->qptr = NULL;

    /*
     * If we are connected to another stream, break the linkage, and send
     * a hangup message. The hangup message causes the stream head to fail
     * writes, allow the queued data to be read completely, and then
     * return EOF on subsequent reads.
     */

    if (loop->oqptr) {
        ((struct loop *)loop->oqptr->q_ptr)->oqptr = NULL;
        if (loop->oqptr) /* We could have looped to ourselves */
            putctl(loop->oqptr->q_next, M_HANGUP);
        loop->oqptr = NULL;
    }
    return 0;
}
```

© COPYRIGHT 1994 AMDAHL CORPORATION

```
#ident "%W% %G% %U% %n%"
/* %N% */
/* File: agent.c - last edit:
 * helge        Fri May 28 14:32:50 1993
 *
 * Copyright (c) 1991 by Amdahl Corporation. All rights reserved.
 * Copyright (c) 1992 by Amdahl Corporation. All rights reserved.
 * Copyright (c) 1993 by Amdahl Corporation. All rights reserved.
 */

/*
 * The master task processes a queue of requests and distributes it among
 * the agent tasks.
 */

#include <sys/agent.h>
#include <sys/clock.h>
#include <sys/cmn_err.h>
#include <sys/dsf_obj.h>
#include <sys/errno.h>
#include <sys/kmem.h>
#include <sys/param.h>
#include <sys/proc.h>
#include <sys/strsubr.h>
#include <sys/sysmacros.h>
#include <vrtxil.h>
#include <spl.h>

#ifndef TRUSTED
#define STATIC
#else
#define STATIC static
#endif

/*
 * Globals
 */

volatile int max_agents;        /* Maximum number of agent tasks */
volatile int current_agents;    /* Current number of agents */
struct proc_req *delayed_proc_req;
static struct proc_req *last_proc_req;


/* Statics */
```

© COPYRIGHT 1994 AMDAHL CORPORATION

```
STATIC volatile int current_idle_agents;      /* Number of agents on the idle list */

STATIC proc_t *idle_list;      /* Contains list of idle agents */
STATIC proc_t *active_list;    /* Contains list of active agents */

/*
 * Locals
 */

STATIC int call_agent(struct proc_req *);
STATIC proc_t *new_agent(void);
STATIC void agent(void);
STATIC void process_request(struct proc_req *);
STATIC void proc_ropen(struct proc_req *);
STATIC void ropen_response(struct proc_req *, int, int, uint);
STATIC void proc_rclose(struct proc_req *);
STATIC void proc_rpush(struct proc_req * p_req);
STATIC void rcmd_response(int, struct proc_req *, int);
STATIC void proc_rlink(struct proc_req * p_req);
STATIC void rlink_response(struct proc_req * p_req, int rlink_id, int status);
STATIC void proc_rpop(struct proc_req * p_req);
STATIC void proc_runlink(struct proc_req * p_req);
STATIC void runlink_response(struct proc_req * p_req, int status);
STATIC void append_request(struct proc_req *p_req, struct proc_req *req_lst);

/*
 * A pool of proc_reqs is allocated in the beginning, to guarantee their will
 * always be a supply.
 */
static volatile int n_proc_req;   /* Number of allocated proc_reqs */
STATIC struct proc_req *free_pr_list; /* List of free proc_reqs */

#define PROC_REQ_POOL_SIZE 30

#define MAXWINDOW 0x10000

void init_agents()
{
        register struct proc_req *tmp_req;

        idle_list = NULL;
        active_list = NULL;
        current_idle_agents = 0;
        max_agents = 10;
```

© COPYRIGHT 1994 AMDAHL CORPORATION

```
        current_agents = 0;
        delayed_proc_req = NULL;
        free_pr_list = NULL;
        for (n_proc_req = 0; n_proc_req < PROC_REQ_POOL_SIZE; n_proc_req++) {
                if ((tmp_req = kmem_alloc(sizeof(struct proc_req), KM_NOSLEEP)) == NULL)
                        return;
                tmp_req->next_req = free_pr_list;
                free_pr_list = tmp_req;
        }
}

/*
 * alloc_proc_req - Allocate a new proc_req. Return NULL, if none is available
 */

struct proc_req *alloc_proc_req()
{
        register int s;
        register struct proc_req *tmp_req;

        s = splstr();
        if (free_pr_list != NULL) {
                tmp_req = free_pr_list;
                free_pr_list = free_pr_list->next_req;
                splx(s);
                return tmp_req;
        }
        if ((tmp_req = kmem_alloc(sizeof(struct proc_req), KM_NOSLEEP)) == NULL) {
                splx(s);
                return NULL;
        }
        n_proc_req++;
        splx(s);
        return tmp_req;
}

/*
 * Interrupts have to be disabled.
 */

STATIC void free_proc_req(proc_req)
        struct proc_req *proc_req;
{
        if (n_proc_req > PROC_REQ_POOL_SIZE && free_pr_list != NULL) {
                kmem_free(proc_req, sizeof(struct proc_req));
```

© COPYRIGHT 1994 AMDAHL CORPORATION

```
		n_proc_req--;
	} else {
		proc_req->next_req = free_pr_list;
		free_pr_list = proc_req;
	}
}

/*
 * submit_proc_req - Submit request to agent.
 */

void submit_proc_req(p_req_ptr)
	register struct proc_req *p_req_ptr;

{
	int s = splstr();
	register proc_t *pp;

	/* Check whether stream is already assigned to agent */
	if ((pp = find_agent(p_req_ptr->src_id, p_req_ptr->dest_id)) != NULL) {
		/* Add request to current requests of this task */
		append_request(p_req_ptr, (struct proc_req *) pp->p_param);
		splx(s);
		return;
	}
	if (delayed_proc_req != NULL) {
		/* Already some requests are waiting */
		last_proc_req->next_req = p_req_ptr;
		last_proc_req = p_req_ptr;
		splx(s);
		return;
	}
	/* Try to submit immediately to agent */
	if (!call_agent(p_req_ptr)) {
		/* No agent available right now */
		delayed_proc_req = last_proc_req = p_req_ptr;
	}
	splx(s);
}

/*
 * append_request - Add new request to end of request list.
 *		Note: function has to be in protected region.
 */
```

© COPYRIGHT 1994 AMDAHL CORPORATION

```
STATIC void append_request(p_req, req_lst)
        struct proc_req *p_req, *req_lst;

{
        while (req_lst->next_req != NULL)
                req_lst = req_lst->next_req;

        p_req->next_req = NULL;
        req_lst->next_req = p_req;
}

/*
 * check_idle_list - Check whether more than 5 agents are idle
 *                   or whether there are more agents than the maximum
 *                   allowed number.
 *                   Note: This routine has to be called within a protected
 *                        region.
 */

/*STATIC void check_idle_list()
 *{
 *      register proc_t *pp;
 *      register int list_length;
 *      int err;
 *
 *      while (idle_list != NULL && current_agents > max_agents) {
 *              pp = idle_list;
 *              idle_list = idle_list->p_ilink;
 *              sc_tdelete(pp->p_tid, 0, &err);
 *              current_agents--;
 *              current_idle_agents--;
 *      }
 *      list_length = current_idle_agents - max_agents / 2;*/  /* Maximum number of
 *                                                              * idle tasks */
/*      while (list_length > 0 && idle_list != NULL) {
 *              pp = idle_list;
 *              idle_list = idle_list->p_ilink;
 *              sc_tdelete(pp->p_tid, 0, &err);
 *              current_agents--;
 *              current_idle_agents--;
 *      }
 *}
 */

/*
```

© COPYRIGHT 1994 AMDAHL CORPORATION

```
 * set_max_agents - Set maximum number of agents
 */

/*
 *int set_max_agents(value, len, ki_data)
 *      register char *value;
 *      register int len;
 *      void *ki_data;
 *{
 *      register int s = splstr();
 *
 *      max_agents = atoi(value);
 *      if (max_agents <= 0)
 *              max_agents = 1;
 *      check_idle_list();
 *      splx(s);
 *      return 0;
 *}
 */

/*
 * find_agent - Check whether an agent currently works on a request for a
 *              given stream.
 *              Note: function has to be in protected region.
 */

proc_t *find_agent(src_id, dest_id)
        int src_id, dest_id;
{
        register proc_t *tpp;

        if (src_id != 0) {
                for (tpp = active_list; tpp != NULL; tpp = tpp->p_ilink)
                        if (((struct proc_req *) (tpp->p_param))->src_id == src_id)
                                break;
        } else {
                for (tpp = active_list; tpp != NULL; tpp = tpp->p_ilink)
                        if (((struct proc_req *) (tpp->p_param))->dest_id == dest_id)
                                break;
        }
        return tpp;
}

/*
 * stop_opening_strs - Send interrupt signal to all tasks executing
```

© COPYRIGHT 1994 AMDAHL CORPORATION

```
 *                              an open request for the given media. Remove such
 *                              requests from the delayed request queue.
 *                            NOTE: Interrupts have to be disabled.
 */

void stop_opening_strs(dsf_chan_obj_ptr)
        struct dsf_chan_obj *dsf_chan_obj_ptr;
{
        register proc_t *tpp;
        register struct proc_req *p_req, *prev_req;

        /* First signal all active processes that process open request */

        for (tpp = active_list; tpp != NULL; tpp = tpp->p_ilink)
                if ((p_req = ((struct proc_req *) (tpp->p_param)))->dsf_chan_obj_ptr
                            == dsf_chan_obj_ptr && p_req->dest_id == NULL)
                        signal_proc(tpp);

        /* Now check delayed request list */

        for (p_req = delayed_proc_req, prev_req = NULL; p_req != NULL;) {
                if (p_req->dest_id == NULL && p_req->dsf_chan_obj_ptr == dsf_chan_obj_ptr)
{
                        /* Remove this element from the list */
                        if (prev_req == NULL) {
                                delayed_proc_req = p_req->next_req;
                                free_proc_req(p_req);
                                p_req = delayed_proc_req;
                        } else {
                                prev_req->next_req = p_req->next_req;
                                free_proc_req(p_req);
                                p_req = prev_req->next_req;
                        }
                } else {
                        prev_req = p_req;
                        p_req = p_req->next_req;
                }
        }
}

/*
 * Select an agent task to have the request processed
 * Interrupts have to be disabled when entering this routine.
 * If no agent was available return 0, else 1.
 */
```

© COPYRIGHT 1994 AMDAHL CORPORATION

```
STATIC int call_agent(p_req)
        struct proc_req *p_req;
{
        register proc_t *pp;

        if (idle_list == NULL) {
                if ((pp = new_agent()) == NULL)
                        return 0;
        } else {
                pp = idle_list;
                idle_list = idle_list->p_ilink;
                current_idle_agents--;
        }
        pp->p_int = p_req->int_sig; /* Set signal interrupt flag */
        p_req->next_req = NULL;
        pp->p_param = (caddr_t) p_req;
        /* Now add it to active list */
        pp->p_ilink = active_list;
        active_list = pp;
        wakeup((caddr_t) pp);  /* Tell task to do something */
        return 1;
}

/*
 * new_agent - Create a new agent task, if maximum number has not been reached
 * yet. Interrupts are disabled on entry of this routine.
 */

STATIC proc_t *new_agent()
{
        proc_t *pp;

        if (current_agents >= max_agents)
                return NULL;  /* Maximum number of agents are active */

        if ((pp = fork_utask(agent, 0, 0, NULL)) == NULL) {
                cmn_err(CE_WARN, "Can't create more than %d agent tasks",
                      current_agents);
                /* Adjust max_agents */
                max_agents = current_agents;
                return NULL;
        }
        current_agents++;
        return pp;
}
```

© COPYRIGHT 1994 AMDAHL CORPORATION

```
/*
 * make_non_active - Remove task from active agent list.
 *              Note: Call needs to be in protected region.
 */

STATIC void make_non_active(pp)
        register proc_t *pp;
{
        register proc_t *tpp;

        if (active_list == pp) {
                active_list = active_list->p_ilink;
                return;
        }
        for (tpp = active_list; tpp != NULL && tpp->p_ilink != pp;
              tpp = tpp->p_ilink);
        if (tpp == NULL)
                cmn_err(CE_WARN, "Active agent not on active list");
        else
                tpp->p_ilink = pp->p_ilink;
}

/*
 * Agent task main routine.
 */

STATIC void agent()
{
        register proc_t *my_pp;
        struct proc_req *p_req;
        register struct proc_req *tmp_req;
        register int s;

        my_pp = get_procp();

        /* Enter processing cycle */

        s = splstr();

        for (;;) {
                if (my_pp->p_param == NULL)
                        (void) sleep((caddr_t) my_pp, 0);       /* Wait for request */
SHORT_LOOP:
                splx(s);
                p_req = (struct proc_req *) my_pp->p_param;
```

© COPYRIGHT 1994 AMDAHL CORPORATION

```
my_pp->p_cred =
    (struct cred *) &p_req->dsf_admin_msg.user_ctxt_msg.user_cred;
/* Check whether stream got closed in the mean time */
if (p_req->dest_id == 0 || valid_dsf_id(p_req->dest_id))
        process_request(p_req);
s = splstr();
tmp_req = p_req->next_req;  /* Check for another request */
/* Free memory of request after use */
free_proc_req(p_req);
if ((my_pp->p_param = (caddr_t) tmp_req) != NULL) {
        goto SHORT_LOOP;
}
/* Check whether there are any pending requests */
if (delayed_proc_req != NULL) {
        /* Get next request */
        register struct proc_req *prev_req;
        register int src_id;

        tmp_req = delayed_proc_req;
        my_pp->p_param = (caddr_t)tmp_req;
        delayed_proc_req = delayed_proc_req->next_req;
        tmp_req->next_req = NULL;
        /* Check whether there are other requests for the same stream
         * already queued.
         */
        if ((src_id = tmp_req->src_id) == 0) {
                register int dest_id;
                dest_id = tmp_req->dest_id;
        DEST_AGAIN:
                for (tmp_req = delayed_proc_req, prev_req = NULL;
                            tmp_req != NULL;
                            prev_req = tmp_req, tmp_req = tmp_req->next_req) {
                        if (dest_id == tmp_req->dest_id) {
                                if (prev_req == NULL)
                                        delayed_proc_req = tmp_req->next_req;
                                else
                                        prev_req->next_req = tmp_req->next_req;
                                tmp_req->next_req = NULL;
                                append_request(tmp_req,   (struct   proc_req   *)
my_pp->p_param);
                                goto DEST_AGAIN;
                        }
                }
        } else {
        SRC_AGAIN:
```

© COPYRIGHT 1994 AMDAHL CORPORATION

```
                    for (tmp_req = delayed_proc_req, prev_req = NULL;
                            tmp_req != NULL;
                            prev_req = tmp_req, tmp_req = tmp_req->next_req) {
                        if (src_id == tmp_req->src_id) {
                                if (prev_req == NULL)
                                        delayed_proc_req = tmp_req->next_req;
                                else
                                        prev_req->next_req = tmp_req->next_req;
                                tmp_req->next_req = NULL;
                                append_request(tmp_req,   (struct   proc_req   *)
my_pp->p_param);
                                goto SRC_AGAIN;
                        }
                    }
                }
                /* Give up CPU, if other tasks are waiting */
                reschedule();
                goto SHORT_LOOP;
            }
            my_pp->p_stat = SIDLE;
            make_non_active(my_pp);
            if (current_agents > max_agents) {
                    /* Remove this task */
                    int err;

                    current_agents--;
                    splx(s);
                    sc_tdelete(0, 0, &err);
            }
            current_idle_agents++;
            my_pp->p_ilink = idle_list;
            idle_list = my_pp;
        }
}

/*
 * process_request - Serve a request send a return message back.
 */
STATIC void process_request(p_req)
        struct proc_req *p_req;
{
        switch (p_req->dsf_admin_msg.type) {
        case R_OPEN_REQ:
                proc_ropen(p_req);
                break;
```

© COPYRIGHT 1994 AMDAHL CORPORATION

```
        case R_CLOSE_REQ:
                proc_rclose(p_req);
                break;
        case R_PUSH_REQ:
                proc_rpush(p_req);
                break;
        case R_POP_REQ:
                proc_rpop(p_req);
                break;
        case R_LINK_REQ:
                proc_rlink(p_req);
                break;
        case R_UNLINK_REQ:
                proc_runlink(p_req);
                break;
        default:
                cmn_err(CE_NOTE, "%d not supported request", p_req->dsf_admin_msg.type);
                break;
        }
}

/*
 * check_duplicate - Checks whether src is already a connected stream;
 *              returns 1, if yes, 0 if not.
 */

STATIC int check_duplicate(dsf_chan_obj_ptr, src)
        struct dsf_chan_obj *dsf_chan_obj_ptr;
        int src;
{
        register struct dsf_element *dsfep;

        dsfep = dsf_chan_obj_ptr->str_list;
        while (dsfep != NULL) {
                if (dsfep->dsf_rinfo.remote_queue_id == src) {
                        return 1;
                }
                dsfep = dsfep->dsf_next_el;
        }
        return 0;
}

/*
 * proc_ropen - Process a remote open request
 */
```

© COPYRIGHT 1994 AMDAHL CORPORATION

```
STATIC void proc_ropen(p_req)
        struct proc_req *p_req;
{
        dev_t dev;
        register major_t major_dev;
        register struct r_open_req *r_open_req = &p_req->dsf_admin_msg.r_open_req;
        register struct vnode *vp;
        register int status;
        uint rec_window = 0;
        register int s;
        register struct dsf_element *dsfep;

        /* Check whether duplicate (first) open */
        if (p_req->dest_id == 0) {
                /* First open */

                /* Get major device number */

                if ((major_dev = conf_major(r_open_req->dev_name)) == NODEV) {
                        set_uerror(ENODEV);
                        ropen_response(p_req, -1, 0, 0);
                        return;
                }
                if (r_open_req->sflag == CLONEOPEN) {
                        dev = makedevice(conf_major("clone"), major_dev);
                } else {
                        dev = makedevice(major_dev, r_open_req->minor_dev);
                }
                if ((vp = find_vnode(dev)) == NULL) {
                        set_uerror(ENOENT);
                        ropen_response(p_req, -1, 0, 0);
                        return;
                }
                if (check_duplicate(p_req->dsf_chan_obj_ptr, p_req->src_id))
                        return; /* Ignore duplicate first opens */
                if ((dsfep = kmem_zalloc(sizeof(struct dsf_element), KM_NOSLEEP))
                     == NULL) {
                        /* No resources */
                        set_uerror(EAGAIN);
                        ropen_response(p_req, -1, 0, 0);
                        return;
                }
                dsfep->priority = DSF_NORMAL_PRI;
                dsfep->dsf_type = DSF_BOTTOM;
                dsfep->dsf_chan_obj_ptr = p_req->dsf_chan_obj_ptr;
```

© COPYRIGHT 1994 AMDAHL CORPORATION

```
} else {
        /* Second open on same stream */

        /*
         * Because we synchronize admin requests on a given stream,
         * it must still be open.
         */
        dsfep = (struct dsf_element *) p_req->dest_id;
        vp = ((struct stdata *) dsfep->dsf_str)->sd_vnode;
        dev = vp->dev;
}
s = splhi();
vp->v_count++;
splx(s);

status = stropen(vp, &dev, r_open_req->flag,
     (cred_t *) & r_open_req->user_cred, &rem_strhinfo, (int) dsfep);

if (status != 0) {
        if (p_req->dest_id == 0) {
                /* This was a new stream */
                kmem_free(dsfep, sizeof(struct dsf_element));
                rec_window = 0;
        } else
                rec_window = dsfep->dsf_rinfo.rec_info.avail_win;
        set_uerror(status);
        status = -1;
        s = splhi();
        vp->v_count--;
        splx(s);
} else if (p_req->dest_id == 0) {
        /* This was a new stream */
        register struct dsf_chan_obj *dsf_chan_obj_ptr;
        register struct rec_queue_info *rec_infop;
        register struct send_queue_info *snd_infop;
        register int i;
        extern volatile int win_adj_shft;

        if ((vp = find_vnode(dev)) != NULL) {
                vp->flag = r_open_req->flag;
                vp->strhinfo = &rem_strhinfo;
                dsf_chan_obj_ptr = dsfep->dsf_chan_obj_ptr;
                dsfep->dsf_rinfo.remote_queue_id = p_req->src_id;
                s = splhi();
                if ((dsfep->dsf_next_el = dsf_chan_obj_ptr->str_list) != NULL)
```

© COPYRIGHT 1994 AMDAHL CORPORATION

```
                dsf_chan_obj_ptr->str_list->dsf_prev_el = dsfep;
        dsfep->dsf_prev_el = NULL;
        dsf_chan_obj_ptr->str_list = dsfep;
        dsf_chan_obj_ptr->dsf_stats.n_opn_strms++;
        splx(s);
        dsfep->dsf_str = (caddr_t) vp->v_stream;
        dsfep->dsf_wrq = vp->v_stream->sd_wrq;
        enter_dsf_id((int) dsfep);

        rec_infop = &dsfep->dsf_rinfo.rec_info;
        if (dsfep->dsf_wrq->q_next->q_hiwat > MAXWINDOW)
                dsfep->dsf_wrq->q_next->q_hiwat = MAXWINDOW;
        rec_infop->max_win = 2 * dsfep->dsf_wrq->q_next->q_hiwat;
        rec_window = rec_infop->comm_win = rec_infop->avail_win =
            rec_infop->max_win >> win_adj_shft;
        rec_infop->rcv_info[0].rec_seq = 1;  /* Open request received */
        for (i = 1; i < DSF_PRIO_NUM; i++)
                rec_infop->rcv_info[i].nak_seq = ~0;
        snd_infop = &dsfep->dsf_rinfo.send_info;
        snd_infop->state = FLOWING;
        snd_infop->cur_window = r_open_req->orig_window_size;
        for (i = 0; i < DSF_PRIO_NUM; i++)
                snd_infop->xmit_info[i].last_msg =
                    &snd_infop->xmit_info[i].xmit_msg;

        /* Check whether DSF object died in the meantime */
        if (dsf_chan_obj_ptr->status_flag == DSF_DEAD) {
                local_str_close(dsfep);
                return;
        }

        /* If this is a priority stream, send R_SET_PRIO message now */
        if (dsfep->priority == DSF_BAND_PRI) {
                send_ack(dsfep, DSF_NORMAL_PRI);
                send_set_prio(dsfep);
        }

        /* Send data messages that were queued up during open */
        (*rem_strhinfo.st_rdinit->qi_srvp) (RD(dsfep->dsf_wrq));

        status = (int) dsfep;
} else {
        cmn_err(CE_WARN, "inconsistent data structs after stropen");
        status = -1;
        set_uerror(EINVAL);
```

© COPYRIGHT 1994 AMDAHL CORPORATION

```
                }
        } else {
                /* Other open on old stream */
                status = (int) dsfep;
                rec_window = dsfep->dsf_rinfo.rec_info.avail_win;
                s = splhi();
                vp->v_count--;          /* We will only get one close request */
                splx(s);
        }
        ropen_response(p_req, status, getminor(dev), rec_window);
}

/*
 * ropen_response - Send back the status
 */

STATIC void ropen_response(p_req, fd, minor_dev, rec_window)
        struct proc_req *p_req;
        int fd;
        int minor_dev;
        uint rec_window;
{
        register struct dsf_msg *r_open_resp_ptr;
        mblk_t *opmp;

        while ((opmp = allocb_sleep(sizeof(struct dsf_msg_header) +
                        sizeof(struct r_open_resp))) == NULL)
                delay(HZ / 2);

        r_open_resp_ptr = (struct dsf_msg *) opmp->b_rptr;
        opmp->b_wptr += sizeof(struct dsf_msg_header) + sizeof(struct r_open_resp);

        r_open_resp_ptr->header.dest_id = p_req->src_id;

        r_open_resp_ptr->body.admin_msg.type = R_OPEN_RESP;
        r_open_resp_ptr->header.priority = DSF_HI_PRI;
        r_open_resp_ptr->body.admin_msg.r_open_resp.minor_dev = minor_dev;
        r_open_resp_ptr->body.admin_msg.r_open_resp.lower_window_size = rec_window;
        if (fd == -1) {
                /* Open failed */
                r_open_resp_ptr->body.admin_msg.r_open_resp.uerror = get_uerror();
                if (p_req->dest_id != 0) {
                        write_admin_msg((struct dsf_element *) p_req->dest_id, opmp);
                        return;
                }
```

© COPYRIGHT 1994 AMDAHL CORPORATION

```
			r_open_resp_ptr->header.type = DSF_ADMIN;
			r_open_resp_ptr->header.len = opmp->b_wptr - opmp->b_rptr;
			r_open_resp_ptr->header.ack_req = 0;
			r_open_resp_ptr->header.fragm = 0;
			r_open_resp_ptr->header.src_id = 0;
			r_open_resp_ptr->header.seq = 0;
			if (m_write_msg(p_req->dsf_chan_obj_ptr, opmp, DSF_HI_PRI,
					sizeof(struct dsf_msg_header) + sizeof(struct r_open_resp)) < 0) {
				freeb(opmp);
				transport_err(p_req->dsf_chan_obj_ptr);
			}
		} else {
			r_open_resp_ptr->body.admin_msg.r_open_resp.uerror = 0;
			write_admin_msg((struct dsf_element *) fd, opmp);
		}

}

/*
 * proc_rclose - Process a remote close request. This routine is only called
 *		when type == DSF_BOTTOM!
 */

STATIC void proc_rclose(p_req)
	struct proc_req *p_req;
{
	register struct r_close_req *r_close_req = &p_req->dsf_admin_msg.r_close_req;
	register struct dsf_element *dsfep = (struct dsf_element *) p_req->dest_id;
	register struct stdata *stp = (struct stdata *) dsfep->dsf_str;
	register int status;
	register int s = splstr();
	register int i;
	register mblk_t *mp;
	extern void m_flush_dsf_msg();

	if (dsfep->dsf_bid != 0) {
		unbufcall(dsfep->dsf_bid);
		dsfep->dsf_bid = 0;
	}
	if (dsfep->dsf_hbid != 0) {
		unbufcall(dsfep->dsf_hbid);
		dsfep->dsf_hbid = 0;
	}
	free_mp_list(dsfep->dsf_rhipri_ml);
	dsfep->dsf_rhipri_ml = NULL;
```

© COPYRIGHT 1994 AMDAHL CORPORATION

```
        /*
         * If there are some not acked messages, free them.
         */

        m_flush_dsf_msg(dsfep); /* Flush queued up but not sent messages */
        for (i = 0; i < DSF_PRIO_NUM; i++) {
                free_mp_list(dsfep->dsf_rinfo.send_info.xmit_info[i].xmit_msg);
                dsfep->dsf_rinfo.send_info.xmit_info[i].xmit_msg = NULL;
                dsfep->dsf_rinfo.send_info.xmit_info[i].last_msg =
                     &dsfep->dsf_rinfo.send_info.xmit_info[i].xmit_msg;
                free_xfrags(&dsfep->dsf_rinfo.send_info.xmit_info[i]);
                free_mp_list(dsfep->dsf_rinfo.send_info.xmit_info[i].to_send_list);
                dsfep->dsf_rinfo.send_info.xmit_info[i].to_send_list = NULL;
                free_frags(dsfep->dsf_chan_obj_ptr,
                     &dsfep->dsf_rinfo.rec_info.rcv_info[i]);
        }
        dsfep->dsf_rinfo.send_info.state = BLOCKED;

        splx(s);
        status = closevp(stp->sd_vnode, (cred_t *) & r_close_req->user_cred);
        rcmd_response(R_CLOSE_RESP, p_req, status);
        s = splstr();
        if (dsfep->dsf_prev_el != NULL)
                dsfep->dsf_prev_el->dsf_next_el = dsfep->dsf_next_el;
        else
                dsfep->dsf_chan_obj_ptr->str_list = dsfep->dsf_next_el;
        dsfep->dsf_chan_obj_ptr->dsf_stats.n_opn_strms--;
        if (dsfep->dsf_next_el != NULL)
                dsfep->dsf_next_el->dsf_prev_el = dsfep->dsf_prev_el;
        /* Remove id from table of valid dsf ids */
        delete_dsf_id((int) dsfep);
        splx(s);
        /* Free ioctl credentials - if still present */
        if (dsfep->ioc_id)
                freemsg(dsfep->ioc_cr);
        kmem_free(dsfep, sizeof(struct dsf_element));
}

/*
 * rcmd_response - Send back the status for a command. If type == R_CLOSE_RESP,
 *               and no ack is expected and
 *               all previous data messages are flushed.
 */

STATIC void rcmd_response(type, p_req, status)
```

© COPYRIGHT 1994 AMDAHL CORPORATION

```
        int type;
        struct proc_req *p_req;
        int status;
{
        mblk_t *crmp;
        register struct dsf_msg *r_cmd_resp_ptr;
        register int error;
        register struct xmit_info *xmit_infop;
        int priority; /* Priority to be used by response */
        register struct dsf_element *dsfep = (struct dsf_element *) p_req->dest_id;

        if (p_req->dsf_chan_obj_ptr == NULL)
                /* Locally generated request */
                return;
        while ((crmp = allocb_sleep(sizeof(struct dsf_msg_header) +
                        sizeof(struct r_cmd_resp))) == NULL)
                delay(HZ / 2);

        r_cmd_resp_ptr = (struct dsf_msg *) crmp->b_rptr;
        crmp->b_wptr += sizeof(struct dsf_msg_header) + sizeof(struct r_cmd_resp);

        r_cmd_resp_ptr->header.dest_id = p_req->src_id;

        r_cmd_resp_ptr->body.admin_msg.type = type;
        if (status < 0)
                r_cmd_resp_ptr->body.admin_msg.r_cmd_resp.uerror = get_uerror();
        else
                r_cmd_resp_ptr->body.admin_msg.r_cmd_resp.uerror = 0;
        if (type == R_CLOSE_RESP) {
                r_cmd_resp_ptr->header.type = DSF_ADMIN;
                r_cmd_resp_ptr->header.len = sizeof(struct dsf_msg_header) +
                     sizeof(struct r_cmd_resp);
                r_cmd_resp_ptr->header.ack_req = 0;
                r_cmd_resp_ptr->header.fragm = 0;
                r_cmd_resp_ptr->header.src_id = (int) dsfep;
                xmit_infop = &dsfep->dsf_rinfo.send_info.xmit_info[dsfep->priority];
                if (xmit_infop->to_send_list == NULL && xmit_infop->xmit_msg == NULL) {
                        priority = DSF_HI_PRI;
                        r_cmd_resp_ptr->header.seq =
                                dsfep->dsf_rinfo.send_info.xmit_info[DSF_HI_PRI].cur_seq++;
                } else {
                        priority = dsfep->priority;
                        r_cmd_resp_ptr->header.seq = xmit_infop->cur_seq++;
                }
                r_cmd_resp_ptr->header.priority = priority;
```

© COPYRIGHT 1994 AMDAHL CORPORATION

```
		if (m_write_msg(p_req->dsf_chan_obj_ptr, crmp, priority,
			sizeof(struct dsf_msg_header) + sizeof(struct r_cmd_resp)) < 0) {
			freeb(crmp);
			transport_err(p_req->dsf_chan_obj_ptr);
		}
	} else {
		r_cmd_resp_ptr->header.priority = DSF_HI_PRI;
		write_admin_msg(dsfep, crmp);
	}
}

/*
 * proc_rpush - Process a remote push request
 */

STATIC void proc_rpush(p_req)
	struct proc_req *p_req;
{
	register struct r_push_req *r_push_req = &p_req->dsf_admin_msg.r_push_req;
	register int status;
	register struct dsf_element *dsfep = (struct dsf_element *) p_req->dest_id;

	status = push_mod(((struct stdata *) dsfep->dsf_str)->sd_vnode,
		r_push_req->mod_name, (cred_t *) & r_push_req->user_cred);
	if (status != 0) {
		set_uerror(status);
		status = -1;
	}
	rcmd_response(R_PUSH_RESP, p_req, status);
}


/*
 * proc_rpop - Process a remote pop request
 */

STATIC void proc_rpop(p_req)
	struct proc_req *p_req;
{
	register struct r_pop_req *r_pop_req = &p_req->dsf_admin_msg.r_pop_req;
	register int status;
	register struct dsf_element *dsfep = (struct dsf_element *) p_req->dest_id;

	status = pop_mod(((struct stdata *) dsfep->dsf_str)->sd_vnode,
		(cred_t *) & r_pop_req->user_cred);
```

© COPYRIGHT 1994 AMDAHL CORPORATION

```
        if (status != 0) {
                set_uerror(status);
                status = -1;
        }
        rcmd_response(R_POP_RESP, p_req, status);
}

/*
 * proc_rlink - Process a remote link request
 */

STATIC void proc_rlink(p_req)
        struct proc_req *p_req;
{
        register struct r_link_req *r_link_req = &p_req->dsf_admin_msg.r_link_req;
        int rlink_id;
        register int status;
        register struct dsf_element *dsfepu = (struct dsf_element *) p_req->dest_id;
        register struct dsf_element *dsfepl =
        (struct dsf_element *) r_link_req->lower_fd;

        if (!valid_dsf_id((int) dsfepl) || dsfepl->dsf_type != DSF_BOTTOM) {
                set_uerror(EINVAL);
                rlink_response(p_req, 0, -1);
                return;
        }
        status = link_drvs(((struct stdata *) dsfepu->dsf_str)->sd_vnode,
             r_link_req->cmd, ((struct stdata *) dsfepl->dsf_str)->sd_vnode,
             (struct cred *) & r_link_req->user_cred, r_link_req->upper_linkid,
             &rlink_id);
        if (status != 0) {
                set_uerror(status);
                status = -1;
        }
        rlink_response(p_req, rlink_id, status);
}

/*
 * rlink_response - Return the result of a link request.
 */

STATIC void rlink_response(p_req, rlink_id, status)
        struct proc_req *p_req;
        int rlink_id;
        int status;
```

© COPYRIGHT 1994 AMDAHL CORPORATION

```
{
        mblk_t *lrmp;
        register struct dsf_msg *r_link_resp_ptr;
        register int error;
        register struct xmit_info *xmit_infop;
        int priority; /* Priority to be used by response */
        register struct dsf_element *dsfep = (struct dsf_element *) p_req->dest_id;

        while ((lrmp = allocb_sleep(sizeof(struct dsf_msg_header) +
                        sizeof(struct r_link_resp))) == NULL)
                delay(HZ / 2);

        r_link_resp_ptr = (struct dsf_msg *) lrmp->b_rptr;
        lrmp->b_wptr += sizeof(struct dsf_msg_header) + sizeof(struct r_link_resp);

        r_link_resp_ptr->header.dest_id = p_req->src_id;

        r_link_resp_ptr->body.admin_msg.type = R_LINK_RESP;
        r_link_resp_ptr->body.admin_msg.r_link_resp.upper_linkid =
            p_req->dsf_admin_msg.r_link_req.upper_linkid;
        r_link_resp_ptr->body.admin_msg.r_link_resp.lower_linkid = rlink_id;
        if (status < 0)
                r_link_resp_ptr->body.admin_msg.r_link_resp.uerror = get_uerror();
        else
                r_link_resp_ptr->body.admin_msg.r_link_resp.uerror = 0;
        xmit_infop = &dsfep->dsf_rinfo.send_info.xmit_info[dsfep->priority];
        if (xmit_infop->to_send_list == NULL && xmit_infop->xmit_msg == NULL)
                priority = DSF_HI_PRI;
        else
                priority = dsfep->priority;
        r_link_resp_ptr->header.priority = priority;

        write_admin_msg(dsfep, lrmp);
}

/*
 * proc_runlink - Process a remote unlink request
 */

STATIC void proc_runlink(p_req)
        struct proc_req *p_req;
{
        register struct r_unlink_req *r_unlink_req = &p_req->dsf_admin_msg.r_unlink_req;
        register int status;
        register struct dsf_element *dsfep = (struct dsf_element *) p_req->dest_id;
```

© COPYRIGHT 1994 AMDAHL CORPORATION

```
	status = unlink_drvs(((struct stdata *) dsfep->dsf_str)->sd_vnode,
	     r_unlink_req->cmd, r_unlink_req->lower_linkid,
	     (struct cred *) & r_unlink_req->user_cred);
	if (status != 0) {
		set_uerror(status);
		status = -1;
	}
	runlink_response(p_req, status);
}

STATIC void runlink_response(p_req, status)
	struct proc_req *p_req;
	int status;
{
	mblk_t *ulrmp;
	register struct dsf_msg *r_unlink_resp_ptr;
	register int error;
	register struct xmit_info *xmit_infop;
	int priority; /* Priority to be used by response */
	register struct dsf_element *dsfep = (struct dsf_element *) p_req->dest_id;

	while ((ulrmp = allocb_sleep(sizeof(struct dsf_msg_header) +
			sizeof(struct r_unlink_resp))) == NULL)
		delay(HZ / 2);

	r_unlink_resp_ptr = (struct dsf_msg *) ulrmp->b_rptr;
	ulrmp->b_wptr += sizeof(struct dsf_msg_header) +
	     sizeof(struct r_unlink_resp);

	r_unlink_resp_ptr->header.dest_id = p_req->src_id;

	r_unlink_resp_ptr->body.admin_msg.type = R_UNLINK_RESP;
	r_unlink_resp_ptr->body.admin_msg.r_unlink_resp.upper_linkid =
	     p_req->dsf_admin_msg.r_unlink_req.upper_linkid;
	if (status < 0)
		r_unlink_resp_ptr->body.admin_msg.r_unlink_resp.uerror = get_uerror();
	else
		r_unlink_resp_ptr->body.admin_msg.r_unlink_resp.uerror = 0;
	xmit_infop = &dsfep->dsf_rinfo.send_info.xmit_info[dsfep->priority];
	if (xmit_infop->to_send_list == NULL && xmit_infop->xmit_msg == NULL)
		priority = DSF_HI_PRI;
	else
		priority = dsfep->priority;
	r_unlink_resp_ptr->header.priority = priority;
	write_admin_msg(dsfep, ulrmp);
```

© COPYRIGHT 1994 AMDAHL CORPORATION

```
}
```

© COPYRIGHT 1994 AMDAHL CORPORATION

```
#ident "%W% %G% %U% %n%"

/* File: chanadmin.c - last edit:
 * helge        Fri Apr  9 15:16:04 1993
 *
 * Copyright (c) 1991 by Amdahl Corporation. All rights reserved.
 * Copyright (c) 1992 by Amdahl Corporation. All rights reserved.
 * Copyright (c) 1993 by Amdahl Corporation. All rights reserved.
 */

/*
 * This file contains the functions to administrate the channel objects
 */

#include <sys/cmn_err.h>
#include <sys/dsf.h>
#include <sys/dsf_obj.h>
#include <sys/kmem.h>
#include <sys/param.h>
#include <sys/proc.h>
#include <sys/strsubr.h>
#include <spl.h>

/*
 * Table containing instances of DSF channel objects, their status
 * and association with a task.
 */

struct dsf_chan_assoc *dsf_chan_obj_tbl[MAX_DSF_CHANS] = {NULL};
static int inst_cnt = 0;
extern void dsf_read_task();

/*
 * dsf_channel_open - Looks whether the desired media is supported, forks
 *                    off a task and passes to it the open parameters.
 *                    Returns an index into dsf_chan_obj_tbl, if both
 *                    actions were successful and -1 otherwise.
 */

int dsf_channel_open(media, mode, address)
        char *media;
        int mode;
        char *address;
{
        register int i, index, s;
```

© COPYRIGHT 1994 AMDAHL CORPORATION

```
	register struct dsf_chan_obj *dsf_chan_obj_ptr;
	register struct dsf_chan_assoc *dsf_chan_assoc_entry;

	/* Find entry in dsfchosw */

	for (index = 0; index < dsfchocnt; index++) {
		if (strcmp(media, dsfchosw[index].media_name) == 0)
			goto FOUND_IT;
	}
	return -1;	/* Media not found */

FOUND_IT:

	/*
	 * Check whether object of this type and for this address already
	 * exists
	 */

	s = splstr();
	for (i = 0; i < inst_cnt; i++) {
		if (dsf_chan_obj_tbl[i] != NULL &&
		    index == dsf_chan_obj_tbl[i]->dsf_chan_obj_type &&
		    strcmp(address, dsf_chan_obj_tbl[i]->dsf_open_parm.address) == 0) {
			dsf_chan_assoc_entry = dsf_chan_obj_tbl[i];
			dsf_chan_obj_ptr = dsf_chan_assoc_entry->dsf_chan_obj_ptr;
			if (dsf_chan_obj_ptr->status_flag != DSF_DEAD &&
			    dsf_chan_obj_ptr->status_flag != DSF_DOWN &&
			    dsf_chan_assoc_entry->tid != 0) {
				splx(s);
				return 0;	/* This channel is already in use */
			}
			/* We can reuse this entry */
			dsf_chan_obj_ptr->status_flag = DSF_OPENING;
			goto COPY_OPEN_PARM;
		}
	}

	/* Allocate all entries required */

	if ((dsf_chan_assoc_entry = kmem_zalloc(sizeof(struct dsf_chan_assoc),
			KM_NOSLEEP)) == NULL) {
		splx(s);
		return -1;
	}
	if ((dsf_chan_obj_ptr = kmem_alloc(sizeof(struct dsf_chan_obj), KM_NOSLEEP))
```

© COPYRIGHT 1994 AMDAHL CORPORATION

```
            == NULL) {
                splx(s);
                kmem_free((char *) dsf_chan_assoc_entry, sizeof(struct dsf_chan_assoc));
                return -1;      /* No memory */
        }
        dsf_chan_assoc_entry->dsf_chan_obj_ptr = dsf_chan_obj_ptr;
        /* Copy template into instance */
        bcopy((char *) dsfchosw[index].template_obj, (char *) dsf_chan_obj_ptr,
            sizeof(struct dsf_chan_obj));
        dsf_chan_obj_ptr->status_flag = DSF_OPENING;
        dsf_chan_assoc_entry->dsf_chan_obj_type = index;

        /* Find available spot in the instance table */
        for (i = 0; i < inst_cnt; i++)
                if (dsf_chan_obj_tbl[i] == NULL) {
                        dsf_chan_obj_tbl[i] = dsf_chan_assoc_entry;
                        goto COPY_OPEN_PARM;
                }
        if (inst_cnt >= MAX_DSF_CHANS) {
                /* Ran out of table entries - should not happen */
                splx(s);
                kmem_free((char *) dsf_chan_assoc_entry, sizeof(struct dsf_chan_assoc));
                kmem_free((char *) dsf_chan_obj_ptr, sizeof(struct dsf_chan_obj));
                cmn_err(CE_WARN, "Too many open media");
                return -1;
        }
        i = inst_cnt;
        dsf_chan_obj_tbl[inst_cnt++] = dsf_chan_assoc_entry;
COPY_OPEN_PARM:
        splx(s);
        dsf_chan_assoc_entry->dsf_open_parm.mode = mode;
        if (address != NULL)
                strcpy(dsf_chan_assoc_entry->dsf_open_parm.address, address);
        else
                dsf_chan_assoc_entry->dsf_open_parm.address[0] = '\0';

        /* Now try to fork off the responsible task for this channel */
        if (fork_utask(dsf_read_task, 0, 0, (caddr_t) dsf_chan_assoc_entry)
            == NULL) {
                dsf_chan_obj_tbl[i] = NULL;
                kmem_free((char *) dsf_chan_assoc_entry, sizeof(struct dsf_chan_assoc));
                kmem_free((char *) dsf_chan_obj_ptr, sizeof(struct dsf_chan_obj));
                return -1;
        }
        return 0;
```

© COPYRIGHT 1994 AMDAHL CORPORATION

```
}

static void free_dsf_object(dsf_obj_ptr)
        char *dsf_obj_ptr;
{
        kmem_free(dsf_obj_ptr, sizeof(struct dsf_chan_obj));
}

#define FREE_DSF_OBJ_TIMEOUT 3600*HZ

/*
 * dsf_delete_channel - After a fatal error or an orderly close this routine
 *                      removes the entry from dsf_chan_obj_tbl and releases
 *                      the memory resources.
 */

void dsf_delete_channel(tid)
        int tid;
{
        register int i;
        register struct dsf_chan_assoc *dsf_chan_assoc_entry;

        for (i = 0; i < inst_cnt; i++) {
                if (dsf_chan_obj_tbl[i] != NULL && tid == dsf_chan_obj_tbl[i]->tid) {
                        dsf_chan_assoc_entry = dsf_chan_obj_tbl[i];
                        dsf_chan_obj_tbl[i] = NULL;

                        /*
                         * We do not deallocate the DSF channel object, as
                         * there might still be some references floating
                         * around. We mark it as dead, so the write functions
                         * would know. free_dsf_object will deallocate the
                         * object after a timeout.
                         */
                        dsf_chan_assoc_entry->dsf_chan_obj_ptr->status_flag = DSF_DEAD;
                        timeout(free_dsf_object, dsf_chan_assoc_entry->dsf_chan_obj_ptr,
                             FREE_DSF_OBJ_TIMEOUT);
                        kmem_free((char *) dsf_chan_assoc_entry,
                             sizeof(struct dsf_chan_assoc));
                        return;
                }
        }
        cmn_err(CE_WARN, "Could not find DSF channel entry for task %d", tid);
}
```

© COPYRIGHT 1994 AMDAHL CORPORATION

```
/*
 * dsf_channel_close -  Sends a request to the remote partner to close the
 *                      channel. No reconnection will be tried, all streams
 *                        will be closed.
 *                        Returns -1, if no such channel exists.
 *                        Returns -2, if no resource is available to send close request
 */

int dsf_channel_close(media, address)
        char *media;
        char *address;
{
        register int i, index, s;

        /* Find entry in dsfchosw */

        for (index = 0; index < dsfchocnt; index++) {
                if (strcmp(media, dsfchosw[index].media_name) == 0)
                        goto FOUND_IT;
        }
        return -1;      /* Media not found */

FOUND_IT:
        /* Check whether object of this type and for this address exists */

        for (i = 0; i < inst_cnt; i++) {
                if (dsf_chan_obj_tbl[i] != NULL &&
                     index == dsf_chan_obj_tbl[i]->dsf_chan_obj_type &&
                     strcmp(address, dsf_chan_obj_tbl[i]->dsf_open_parm.address) == 0) {
                        /* Block all streams */
                        register struct dsf_element *dsfep;
                        register struct dsf_chan_obj *dsf_chan_obj_ptr;
                        register struct dsf_msg *close_msg;
                        mblk_t *cmp;

                        dsf_chan_obj_ptr = dsf_chan_obj_tbl[i]->dsf_chan_obj_ptr;
                        s = splstr();
                        for (dsfep = dsf_chan_obj_ptr->str_list; dsfep != NULL;
                             dsfep = dsfep->dsf_next_el)
                                dsfep->dsf_rinfo.send_info.state = BLOCKED;
                        splx(s);
                        if (dsf_chan_obj_ptr->status_flag == DSF_UP) {
                                /* Send close request to other side */
                                if ((cmp = allocb(sizeof(struct dsf_msg_header) +
                                                sizeof(struct dsf_close_msg), BPRI_MED)) == NULL)
```

© COPYRIGHT 1994 AMDAHL CORPORATION

```
                                return -2;      /* No resource */
                        close_msg = (struct dsf_msg *) cmp->b_rptr;
                        cmp->b_wptr += (sizeof(struct dsf_msg_header) +
                            sizeof(struct dsf_close_msg));
                        close_msg->header.type = DSF_ADMIN;
                        close_msg->header.priority = DSF_NORMAL_PRI;
                        close_msg->header.ack_req = 0;
                        close_msg->header.len = sizeof(struct dsf_msg_header) +
                            sizeof(struct dsf_close_msg);
                        close_msg->header.dest_id = 0;
                        close_msg->header.src_id = 0;
                        close_msg->header.seq = 0;
                        close_msg->body.admin_msg.type = DSF_CHAN_CLOSE_REQ;
                        m_write_msg(dsf_chan_obj_ptr, cmp, DSF_NORMAL_PRI,
                            sizeof(struct dsf_msg_header) +
                            sizeof(struct dsf_close_msg));
                        /* Write error will cause read to fail */
                        dsf_chan_obj_ptr->status_flag = DSF_CLOSING;
                } else if (dsf_chan_obj_ptr->status_flag == DSF_OPENING) {
                        dsf_chan_obj_ptr->status_flag = DSF_CLOSING;
                        m_close(dsf_chan_obj_ptr, 0);
                } else if (dsf_chan_obj_ptr->status_flag == DSF_DOWN)
                        dsf_chan_obj_ptr->status_flag = DSF_CLOSING;
                return 0;
            }
        }
        return -1;      /* No dsf object channel of that address */
}

/*
 * dsf_channel_reset - Close the medium specified, but do not send a close
 *                     message first. The medium will come up again.
 *                     Returns -1, if medium and address does not exist.
 */

int dsf_channel_reset(media, address)
        char *media;
        char *address;
{
        register int i, index, s;

        /* Find entry in dsfchosw */

        for (index = 0; index < dsfchocnt; index++) {
                if (strcmp(media, dsfchosw[index].media_name) == 0)
```

© COPYRIGHT 1994 AMDAHL CORPORATION

```
                        goto FOUND_IT;
        }
        return -1;      /* Media not found */

FOUND_IT:
        /* Check whether object of this type and for this address exists */

        for (i = 0; i < inst_cnt; i++) {
                if (dsf_chan_obj_tbl[i] != NULL &&
                    index == dsf_chan_obj_tbl[i]->dsf_chan_obj_type &&
                    strcmp(address, dsf_chan_obj_tbl[i]->dsf_open_parm.address) == 0) {
                        /* Block all streams */
                        register struct dsf_element *dsfep;
                        register struct dsf_chan_obj *dsf_chan_obj_ptr;
                        register struct dsf_msg *close_msg;
                        mblk_t *cmp;

                        dsf_chan_obj_ptr = dsf_chan_obj_tbl[i]->dsf_chan_obj_ptr;
                        s = splstr();
                        for (dsfep = dsf_chan_obj_ptr->str_list; dsfep != NULL;
                             dsfep = dsfep->dsf_next_el)
                                dsfep->dsf_rinfo.send_info.state = BLOCKED;
                        splx(s);
                        if (dsf_chan_obj_ptr->status_flag == DSF_OPENING)
                                dsf_chan_obj_ptr->status_flag = DSF_RESET;
                        m_close(dsf_chan_obj_ptr, 0);
                        return 0;
                }
        }
        return -1;
}
```

© COPYRIGHT 1994 AMDAHL CORPORATION

```
#ident "%W% %G% %U% %n%"

/* File: chanhead.c - last edit:
 * helge        Mon Jun 14 12:58:40 1993
 * lyatin       Mon Dec 16 10:30:21 1991
 *
 * Copyright (c) 1992 by Amdahl Corporation. All rights reserved.
 * Copyright (c) 1993 by Amdahl Corporation. All rights reserved.
 */

/*
 * Contains STREAMS head functionality for talking across the dsf channel
 */

#include <sys/agent.h>
#include <sys/clock.h>
#include <sys/cmn_err.h>
#include <sys/debug.h>
#include <sys/dsf.h>
#include <sys/dsf_obj.h>
#include <sys/errno.h>
#include <sys/kmem.h>
#include <sys/lstream.h>
#include <sys/mem.h>
#include <sys/param.h>
#include <sys/proc.h>
#include <sys/stream.h>
#include <sys/stropts.h>
#include <sys/strsubr.h>
#include <vrtxil.h>
#include <spl.h>
#include <app_param.h>

#ifdef ITRACE
#include "itrace.h"
#endif

#define STATIC

/*
 *  Qinit structure and Module_info structures
 *        for stream head read and write queues
 */
STATIC int strrput(), strrsrv();
```

© COPYRIGHT 1994 AMDAHL CORPORATION

```
strwsrv();
STATIC struct module_info strm_info = {0, "strrhead", 0, INFPSZ, STRHIGH, STRLOW};
STATIC struct module_info stwm_info = {0, "strwhead", 0, 0, 0, 0};
STATIC struct qinit strdata = {strrput, strrsrv, NULL, NULL, NULL, &strm_info, NULL};
STATIC struct qinit stwdata = {NULL, strwsrv, NULL, NULL, NULL, &stwm_info, NULL};
struct streamtab rem_strhinfo = {&strdata, &stwdata, NULL, NULL};

#define DEFAULT_ACK_REQUEST_THRESH 4096
volatile uint ack_req_thresh = DEFAULT_ACK_REQUEST_THRESH;

/*
 * Defines the number of bytes that can be sent before and ACK has to be
 * received. This number will be adjusted when resources become scarce.
 */
volatile int win_adj_shft = 0;  /* Shift maximum window size by this */
#define MIN_MEM 150000 /* Bytes reserved for non DSF allocation */
volatile int receive_stopped = 0; /* When resources get tight (kmem_avail() < MIN_MEM)
                                     * no more data messages will be accepted.
                                     */

#ifdef __STDC__
STATIC void send_nak_null(struct dsf_chan_obj *dsf_chan_obj_ptr, uint src_id,
        int priority);
STATIC int send_open_resp(struct dsf_chan_obj * dsf_chan_obj_ptr, int error_code);
STATIC int msg_to_agent(struct dsf_chan_obj * dsf_chan_obj_ptr, int dest_id,
        int src_id, union dsf_admin_msg * dsf_admin_msg_ptr);
STATIC void proc_interrupt(int src_id);
STATIC int send_data_msg(struct dsf_element * dsfep, queue_t * q, mblk_t * mp,
        int prio);
STATIC void process_ack(struct dsf_msg * dsf_msgp);
STATIC void process_nak(struct dsf_msg * dsf_msgp);
STATIC void restart_queue(struct dsf_element * dsfep);
STATIC int upd_xmit_info(struct dsf_element * dsfep, uint ack, int priority);
STATIC void close_streams(struct dsf_chan_obj *dsf_chan_obj_ptr);

#else
STATIC void send_nak_null();
STATIC int send_open_resp();
STATIC int msg_to_agent();
STATIC void proc_interrupt();
STATIC void send_data_msg();
STATIC void process_ack();
STATIC void process_nak();
STATIC void restart_queue();
STATIC int upd_xmit_info();
```

© COPYRIGHT 1994 AMDAHL CORPORATION

```
STATIC void close_streams();

#endif

/*
 * check_win_size - Depending on the available memory window sizes and
 *                  the threshold for ack requests get adjusted.
 */

void dsf_check_win_size()
{
        register ulong curmem = kmem_avail();
        register int adjust = 0;

        if (Strcount > curmem) {
                if (Strcount > (curmem << 3))
                        adjust = 4;
                else if (Strcount > (curmem << 2))
                        adjust = 3;
                else if (Strcount > (curmem << 1))
                        adjust = 2;
                else
                        adjust = 1;
        }
        if (win_adj_shft > adjust)
                win_adj_shft--;
        else
                win_adj_shft = adjust;
        ack_req_thresh = DEFAULT_ACK_REQUEST_THRESH >> win_adj_shft;
}

/*
 * allocb_sleep - Allocate STREAMS buffer and sleep, if it is not available.
 */

mblk_t *allocb_sleep(size)
        unsigned int size;
{
        register int status;
        mblk_t *mp;

        for (;;) {
                if ((mp = allocb(size, BPRI_MED)) != NULL) {
                        return mp;
                }
```

© COPYRIGHT 1994 AMDAHL CORPORATION

```
                if (bufcall(size, BPRI_MED, wakeup, (long) &mp) != 0)
                        return NULL;  /* We should not open another
                                       * channel, when we are so much out
                                       * of resources. */
                sleep((caddr_t) & mp, 0);        /* Non-interruptible sleep */
        }
}

STATIC int wait_open_resp(dsf_chan_obj_ptr, buff_ptr_ptr, lenp)
        struct dsf_chan_obj *dsf_chan_obj_ptr;
        struct bio_buff **buff_ptr_ptr;
        int *lenp;
{
        register struct dsf_open_resp *dsf_open_resp;

        /* Wait for open response */
        if ((*lenp = m_read_msg(dsf_chan_obj_ptr, buff_ptr_ptr)) <= 0) {
                /* Read error */
                cmn_err(CE_NOTE, "Channel object read error %s", dsf_chan_obj_ptr->id);
                return 1;
        }
        dsf_open_resp = (struct dsf_open_resp *) (*buff_ptr_ptr)->buffer;
        if (dsf_open_resp->error_code != DSF_OPEN_OK)
                return -1;

        if (dsf_open_resp->version > DSF_VERSION)
                return -2;
        return 0;
}

STATIC int send_open_resp(dsf_chan_obj_ptr, error_code)
        struct dsf_chan_obj *dsf_chan_obj_ptr;
        int error_code;
{
        register int status;
        register struct dsf_element *dsfep;
        register int local_open_str = 0;
        register struct dsf_open_resp *dsf_open_resp;
        mblk_t *opmp;

        if (error_code == DSF_OPEN_OK)
                for (dsfep = dsf_chan_obj_ptr->str_list; dsfep != NULL;
                     dsfep = dsfep->dsf_next_el)
                        local_open_str++;
        if ((opmp = allocb(sizeof(struct dsf_open_resp), BPRI_MED)) == NULL) {
```

© COPYRIGHT 1994 AMDAHL CORPORATION

```
                /* Close all open streams if we are so much out of resources */
                local_open_str = 0;
                cmn_err(CE_NOTE, "No memory for open response. Closing all open streams");
                close_streams(dsf_chan_obj_ptr);
                delay(HZ / 2);
                while ((opmp = allocb_sleep(sizeof(struct dsf_open_resp))) == NULL)
                        delay(HZ / 2);
        }
        opmp->b_wptr += sizeof(struct dsf_open_resp);
        dsf_open_resp = (struct dsf_open_resp *) opmp->b_rptr;
        *((long *) &dsf_open_resp->conv_flags[0]) = 0;
        dsf_open_resp->version = DSF_VERSION;
        dsf_open_resp->open_strms = local_open_str;
        dsf_open_resp->error_code = error_code;
        if ((status = m_write_msg(dsf_chan_obj_ptr, opmp, DSF_HI_PRI,
                        sizeof(struct dsf_open_resp))) < 0)
                freeb(opmp);
        return status;
}

STATIC void init_admin_header(dsf_header_ptr, len)
        struct dsf_msg_header *dsf_header_ptr;
        int len;
{
        dsf_header_ptr->type = DSF_ADMIN;
        dsf_header_ptr->priority = 0;
        dsf_header_ptr->ack_req = 0;
        dsf_header_ptr->fragm = 0;
        dsf_header_ptr->len = len;
        dsf_header_ptr->dest_id = 0;
        dsf_header_ptr->src_id = 0;
        dsf_header_ptr->seq = 0;
}

/*
 * proc_reconn_req - Processes the remote's reconnect request. Returns the
 *                   number of elements in the message.
 */

STATIC int proc_reconn_req(dsf_chan_obj_ptr, dsf_reconn_req)
        struct dsf_chan_obj *dsf_chan_obj_ptr;
        struct dsf_reconn_req *dsf_reconn_req;
{
        register int i, j;
        register struct dsf_element *dsfep;
```

© COPYRIGHT 1994 AMDAHL CORPORATION

```
register mblk_t *rmp;
struct dsf_msg *dsf_msg_ptr;
struct dsf_reconn_resp *dsf_reconn_resp_ptr =
&dsf_msg_ptr->body.admin_msg.dsf_reconn_resp;
register int s;

if ((rmp = allocb_sleep(sizeof(struct dsf_msg_header) +
                sizeof(struct dsf_reconn_resp))) == NULL)
        return -1;
rmp->b_wptr += sizeof(struct dsf_msg_header) +
    sizeof(struct dsf_reconn_resp);
dsf_msg_ptr = (struct dsf_msg *) rmp->b_rptr;
init_admin_header(&dsf_msg_ptr->header, sizeof(struct dsf_msg_header) +
    sizeof(struct dsf_reconn_resp));

dsf_reconn_resp_ptr = &dsf_msg_ptr->body.admin_msg.dsf_reconn_resp;
dsf_reconn_resp_ptr->type = DSF_RECONN_RESP;
j = 0;
for (i = 0; i < dsf_reconn_req->str_num; i++) {
        dsfep = (struct dsf_element *) dsf_reconn_req->assoc_list[i].rem_id;
        if (dsfep == NULL)
                continue;       /* Should not happen */
        s = splstr();
        if (!valid_dsf_id((int) dsfep) ||
            dsfep->dsf_rinfo.remote_queue_id != dsf_reconn_req->assoc_list[i].
            loc_id || (((struct stdata *)dsfep->dsf_str)->sd_flag & STRNOTOP) != 0)
                /* No partner for stream */
                dsf_reconn_resp_ptr->no_partner_list[j++] = dsf_reconn_req->
                    assoc_list[i].loc_id;
        else {

                /*
                 * Update the information about window size and acked
                 * messages
                 */
                register int k;

                dsfep->dsf_rinfo.send_info.n_send_list = 0;
                for (k = 0; k < DSF_PRIO_NUM; k++) {
                        register struct xmit_info *xmit_infop =
                        &dsfep->dsf_rinfo.send_info.xmit_info[k];

                        (void) upd_xmit_info(dsfep, dsf_reconn_req->assoc_list[i].
                            last_seq_rec[k], k);
                        if (xmit_infop->xmit_msg) {
```

© COPYRIGHT 1994 AMDAHL CORPORATION

```
                                    if ((*xmit_infop->last_msg = xmit_infop->to_send_list)
                                        == NULL)
                                            dsfep->dsf_rinfo.send_info.n_send_list++;
                                    xmit_infop->to_send_list = xmit_infop->xmit_msg;
                                    xmit_infop->xmit_msg = NULL;
                                    xmit_infop->last_msg = &xmit_infop->xmit_msg;
                            }
                    }
                    dsfep->dsf_rinfo.send_info.cur_window =
                        dsf_reconn_req->assoc_list[i].window;
                    dsfep->dsf_rinfo.send_info.non_acked_bytes = 0;
            }
            splx(s);
        }
        dsf_reconn_resp_ptr->str_num = j;
        if (m_write_msg(dsf_chan_obj_ptr, rmp, DSF_HI_PRI,
                sizeof(struct dsf_msg_header) + sizeof(struct dsf_reconn_resp)) < 0) {
            freeb(rmp);
            return -1;
        }
        return dsf_reconn_req->str_num;
}

/*
 * local_str_close - Closes the local part of a stream whose partner or
 *                   whose connection to the partner has been lost.
 *                   At this moment only streams that end here with a
 *                   device driver are supported.
 *                   Note: This routine cannot be called from interrupt
 *                   context.
 */

void local_str_close(dsfep)
        struct dsf_element *dsfep;
{
        union dsf_admin_msg dsf_admin_msg;
        register struct stdata *stp;

        if (dsfep->dsf_type != DSF_BOTTOM)
                return; /* TODO: support streams that start here */
        stp = (struct stdata *) dsfep->dsf_str;
        /* If the stream is currently being closed, do nothing. */
        if ((stp->sd_flag & (STRCLOSE | STRNOTOP)) != 0)
                return;
        /* First make sure this stream becomes inactive */
```

© COPYRIGHT 1994 AMDAHL CORPORATION

```
        stp->sd_flag |= STRNOTOP;
        dsfep->dsf_rinfo.send_info.state = BLOCKED;
        dsfep->dsf_rinfo.send_info.cur_window = 0;

        /* Create close request for agent */
        dsf_admin_msg.type = R_CLOSE_REQ;
        bcopy((char *) &loc_cred, (char *) &dsf_admin_msg.r_close_req.user_cred,
             sizeof(struct cred));

        /*
         * Submit close request to agent - NULL channel because generated
         * locally. Delay, if no request is available, and try again.
         */

        while (!msg_to_agent(NULL, (int) dsfep, 0, &dsf_admin_msg))
                delay(HZ/2);
}

/*
 * close_streams - Closes all the streams associated with one DSF channel
 *                 object.
 *                 Note: while this function is called no new messages
 *                 can arrive on this channel because this function is
 *                 executed by the task that reads all the messages.
 */

STATIC void close_streams(dsf_chan_obj_ptr)
        struct dsf_chan_obj *dsf_chan_obj_ptr;
{
        register struct dsf_element *dsfep;
        register int s;

LOOP:
        s = splstr();
        for (dsfep = dsf_chan_obj_ptr->str_list; dsfep != NULL;
             dsfep = dsfep->dsf_next_el) {
                if (dsfep->dsf_type == DSF_BOTTOM && (((struct stdata *) dsfep->dsf_str)
                        ->sd_flag & (STRCLOSE | STRNOTOP)) == 0) {
                        splx(s);
                        /* In case stream is sleeping, wake it up first */
                        proc_interrupt((int)dsfep->dsf_rinfo.remote_queue_id);
                        local_str_close(dsfep);
                        goto LOOP;      /* Start loop from beginning as some
                                         * elements might have been removed
                                         * from the list independently.
```

© COPYRIGHT 1994 AMDAHL CORPORATION

```
                                 * This is not an infinite loop, as local_str_close() marks
                                 * the streams it calls with STRNOTOP.
                                 */
                }
                /* TODO: support streams that originate here */
        }
        /* Check for streams that were just opening */
        stop_opening_strs(dsf_chan_obj_ptr);
}

/*
 * dsf_reconnect - Exchanges reconnect messages with the remote. Returns
 *                 pointer to remainder of message or -1 in case of read or
 *                 write error.
 */

STATIC struct dsf_msg *dsf_reconnect(dsf_chan_obj_ptr, remote_open_str,
            buff_ptr_ptr, cur_buff_ptr, len_ptr)
        struct dsf_chan_obj *dsf_chan_obj_ptr;
        int remote_open_str;    /* Number of remote open streams */
        struct bio_buff **buff_ptr_ptr; /* Points to current buffer */
        caddr_t cur_buff_ptr;   /* Current position in read buffer */
        int *len_ptr;     /* Contains number of bytes left in read buffer */
{
        register struct dsf_element *dsfep;
        register int expected_answs = 0;
        register struct dsf_msg *dsf_msg_ptr;
        register struct dsf_reconn_req *dsf_reconn_req_ptr;
        register int s = splstr();

        dsfep = dsf_chan_obj_ptr->str_list;
        while (dsfep != NULL) {
                register int i, j;
                register int status;
                register mblk_t *rmp;
                if ((((struct stdata *) dsfep->dsf_str)->sd_flag & STRNOTOP) != 0) {
                        dsfep = dsfep->dsf_next_el;
                        continue;
                }
                splx(s);
                if ((rmp = allocb_sleep(sizeof(struct dsf_msg_header) +
                                sizeof(struct dsf_reconn_req))) == NULL) {
                        return (struct dsf_msg *) - 1;
                }
```

© COPYRIGHT 1994 AMDAHL CORPORATION

```
            rmp->b_wptr += sizeof(struct dsf_msg_header) +
                sizeof(struct dsf_reconn_req);
            dsf_msg_ptr = (struct dsf_msg *) rmp->b_rptr;
            /* Initialize the header */
            init_admin_header(&dsf_msg_ptr->header, sizeof(struct dsf_msg_header) +
                sizeof(struct dsf_reconn_req));
            dsf_reconn_req_ptr = &dsf_msg_ptr->body.admin_msg.dsf_reconn_req;
            dsf_reconn_req_ptr->type = DSF_RECONN_REQ;
            s = splstr();
            for (i = 0; i < ASSOC_LIST_LEN && dsfep != NULL; i++) {
                if ((((struct stdata *) dsfep->dsf_str)->sd_flag & STRNOTOP) != 0) {
                    dsfep = dsfep->dsf_next_el;
                    continue;
                }
                dsf_reconn_req_ptr->assoc_list[i].loc_id = (int) dsfep;
                dsf_reconn_req_ptr->assoc_list[i].rem_id =
                    dsfep->dsf_rinfo.remote_queue_id;
                for (j = 0; j < DSF_PRIO_NUM; j++) {
                    dsf_reconn_req_ptr->assoc_list[i].last_seq_rec[j] =
                        dsfep->dsf_rinfo.rec_info.rcv_info[j].rec_seq;
                    dsfep->dsf_rinfo.rec_info.rcv_info[j].ack_seq =
                        dsfep->dsf_rinfo.rec_info.rcv_info[j].rec_seq;
                }
                dsf_reconn_req_ptr->assoc_list[i].window =
                    dsfep->dsf_rinfo.rec_info.avail_win;
                dsfep->dsf_rinfo.rec_info.comm_win =
                    dsfep->dsf_rinfo.rec_info.avail_win;
                dsfep = dsfep->dsf_next_el;
            }
            splx(s);
            dsf_reconn_req_ptr->str_num = i;
            if (m_write_msg(dsf_chan_obj_ptr, rmp, DSF_HI_PRI,
                    sizeof(struct dsf_msg_header) + sizeof(struct dsf_reconn_req))
                < 0) {
                freeb(rmp);
                if (cur_buff_ptr != NULL)
                    free_mem_block(*buff_ptr_ptr);
                return (struct dsf_msg *) - 1;
            }
            expected_answs++;
            s = splstr();
        }
        splx(s);
        for (;;) {
            if (remote_open_str <= 0 && expected_answs <= 0) {
```

© COPYRIGHT 1994 AMDAHL CORPORATION

```
                s = splstr();

                for (dsfep = dsf_chan_obj_ptr->str_list; dsfep != NULL;
                     dsfep = dsfep->dsf_next_el)
                        if (dsfep->dsf_type == DSF_BOTTOM) {
                                register struct stdata *stp =
                                (struct stdata *) dsfep->dsf_str;

                                if ((stp->sd_flag & STRNOTOP) == 0) {
                                        dsfep->dsf_rinfo.send_info.state = FLOWING;
                                        qenable(RD(stp->sd_wrq));
                                }
                        }       /* TODO: support streams that start
                                 * here */
                splx(s);
                if (qready())
                        runqueues();
                return (struct dsf_msg *) cur_buff_ptr;
        }
        /* Process the messages in the buffer */
        while (*len_ptr > sizeof(struct dsf_msg_header)) {
                register int status;
                register struct dsf_msg *msg_ptr = (struct dsf_msg *) cur_buff_ptr;

                if (remote_open_str <= 0 && expected_answs <= 0)
                        /* Can't be a reconnect message */
                        return (struct dsf_msg *) cur_buff_ptr;

                if (msg_ptr->header.type == DSF_ADMIN) {
                        if (msg_ptr->body.admin_msg.type == DSF_RECONN_REQ) {
                                if ((status = proc_reconn_req(dsf_chan_obj_ptr,
                                                &msg_ptr->body.admin_msg.dsf_reconn_req))
< 0) {
                                        free_mem_block(*buff_ptr_ptr);
                                        return (struct dsf_msg *) - 1;
                                }
                                remote_open_str -= status;
                        } else if (msg_ptr->body.admin_msg.type == DSF_RECONN_RESP)
{
                                register int i;
                                register struct dsf_reconn_resp *dsf_reconn_resp =
                                &msg_ptr->body.admin_msg.dsf_reconn_resp;
                                s = splstr();
                                for (i = 0; i < dsf_reconn_resp->str_num; i++) {
                                        register struct dsf_element *dsfep =
```

© COPYRIGHT 1994 AMDAHL CORPORATION

```
                                        (struct dsf_element *) dsf_reconn_resp->
                                        no_partner_list[i];
                                if (valid_dsf_id((int)dsfep)) {
                                        proc_interrupt((int)dsfep->dsf_rinfo.
                                                remote_queue_id);
                                        local_str_close(dsfep);
                                }
                        }
                        splx(s);
                        expected_answs--;
                } else {
                        cmn_err(CE_NOTE,
                            "Invalid admin message type during reconnection exchange
(%d) %s",

                            msg_ptr->body.admin_msg.type, dsf_chan_obj_ptr->id);
                        free_mem_block(*buff_ptr_ptr);
                        return (struct dsf_msg *) - 1;
                }
                (*len_ptr) -= msg_ptr->header.len;
                cur_buff_ptr += msg_ptr->header.len;
                /* No alignment adjustments necessary */
            } else {        /* non admin message */
                cmn_err(CE_NOTE,
                    "Invalid message type during reconnection exchange (%d) %s",
                    msg_ptr->header.type, dsf_chan_obj_ptr->id);
                free_mem_block(*buff_ptr_ptr);
                return (struct dsf_msg *) - 1;
            }
        }       /* while */
        if (cur_buff_ptr != NULL)
                free_mem_block(*buff_ptr_ptr);
        /* If no message in buffer, read */
        if ((*len_ptr = m_read_msg(dsf_chan_obj_ptr, buff_ptr_ptr)) <= 0) {
                return (struct dsf_msg *) - 1;  /* Read error */
        }
        cur_buff_ptr = (*buff_ptr_ptr)->buffer;
    }   /* for */
}

STATIC void shut_dsf_chan(dsf_chan_assoc_entry)
        struct dsf_chan_assoc *dsf_chan_assoc_entry;
{
        register struct dsf_chan_obj *dsf_chan_obj_ptr;

        dsf_chan_obj_ptr = dsf_chan_assoc_entry->dsf_chan_obj_ptr;
```

© COPYRIGHT 1994 AMDAHL CORPORATION

```
        dsf_chan_obj_ptr->status_flag = DSF_CLOSING;
        close_streams(dsf_chan_obj_ptr);
        m_close(dsf_chan_obj_ptr, 1);
        cmn_err(CE_NOTE, "Channel object with id '%s' closed down",
             dsf_chan_obj_ptr->id);
        dsf_delete_channel(dsf_chan_assoc_entry->tid);
}

/*
 * proc_close_req - Responds to the close request by sending a close response
 *                  and then closes all streams. After some delay (to allow
 *                  the close response to be transmitted) it closes the
 *                  channel and then deletes itself.
 */

STATIC void proc_close_req(dsf_chan_assoc_entry)
        struct dsf_chan_assoc *dsf_chan_assoc_entry;
{
        register struct dsf_chan_obj *dsf_chan_obj_ptr;
        register struct dsf_msg *close_msgp;
        mblk_t *cmp;

        while ((cmp = allocb_sleep(sizeof(struct dsf_msg_header) +
                        sizeof(struct dsf_close_msg))) == NULL)
                delay(HZ / 2);

        dsf_chan_obj_ptr = dsf_chan_assoc_entry->dsf_chan_obj_ptr;
        dsf_chan_obj_ptr->status_flag = DSF_CLOSING;
        close_msgp = (struct dsf_msg *) cmp->b_rptr;
        cmp->b_wptr += (sizeof(struct dsf_msg_header) +
             sizeof(struct dsf_close_msg));
        cmp->b_pad2 = 0;     /* No window space needed */
        init_admin_header(&close_msgp->header, cmp->b_wptr - cmp->b_rptr);
        close_msgp->body.admin_msg.type = DSF_CHAN_CLOSE_RESP;
        if (m_write_msg(dsf_chan_obj_ptr, cmp, DSF_NORMAL_PRI,
                  sizeof(struct dsf_msg_header) + sizeof(struct dsf_close_msg)) < 0)
                freeb(cmp);
        close_streams(dsf_chan_obj_ptr);
        delay(20 * HZ);          /* 20 Second delay for close response to be sent out */
        m_close(dsf_chan_obj_ptr, 1);
        cmn_err(CE_NOTE, "Channel object with id '%s' closed down",
             dsf_chan_obj_ptr->id);
        dsf_delete_channel(dsf_chan_assoc_entry->tid);
}
```

© COPYRIGHT 1994 AMDAHL CORPORATION

```
STATIC void set_close_streams_flag(flag_ptr)
        int *flag_ptr;
{
        *flag_ptr = 1;
}

/*
 * send_no_partner_msg - Send a R_NO_PARTNER message to remote. If memory
 *                       is not available to allocate message buffer, do not
 *                       send any, as this is for informational purpose only.
 */

STATIC void send_no_partner_msg(dsf_chan_obj_ptr, src_id, dest_id)
        struct dsf_chan_obj *dsf_chan_obj_ptr;
        int src_id;
        int dest_id;
{
        register struct dsf_msg *no_partner_msgp;
        mblk_t *npmp;

        dsf_chan_obj_ptr->dsf_stats.inv_ids++;
        if ((npmp = allocb(sizeof(struct dsf_msg_header) +
                        sizeof(struct r_no_partner), BPRI_MED)) == NULL)
                return; /* No resource */
        no_partner_msgp = (struct dsf_msg *) npmp->b_rptr;
        npmp->b_wptr += (sizeof(struct dsf_msg_header) +
             sizeof(struct r_no_partner));
        npmp->b_pad2 = 0;   /* No window space needed */
        init_admin_header(&no_partner_msgp->header, npmp->b_wptr - npmp->b_rptr);
        no_partner_msgp->body.admin_msg.type = R_NO_PARTNER;
        no_partner_msgp->body.admin_msg.r_no_partner.src_id = src_id;
        no_partner_msgp->body.admin_msg.r_no_partner.dest_id = dest_id;
        if (m_write_msg(dsf_chan_obj_ptr, npmp, DSF_NORMAL_PRI,
                    sizeof(struct dsf_msg_header) + sizeof(struct r_no_partner)) < 0) {
                freeb(npmp);
                transport_err(dsf_chan_obj_ptr);
        }
}

/*
 * expected_seq - Checks whether received message has expected sequence
 *                number. If yes, the return value is 1.
 *                In case the sequence number is too small, an ACK message
 *                is sent indicating the current state and the return value is
 *                0.
```

© COPYRIGHT 1994 AMDAHL CORPORATION

```
 *              In case the sequence number is too large, a NAK message
 *              with the expected sequence number is sent unless such a
 *              NAK message had been sent before.
 */

STATIC int expected_seq(cur_msg_ptr, dsfep)
        struct dsf_msg *cur_msg_ptr;
        struct dsf_element *dsfep;
{
        register int priority;
        register struct rcv_info *rcv_infop;

        priority = cur_msg_ptr->header.priority;
        if (priority < dsfep->priority)
                /* Ignore messages of lower priority */
                /* They will be resend at a higher priority */
                return 0;

#ifdef ITRACE
        if (itrace_on) {
                ENTER_ITRACE_EVENT(dsfep, cur_msg_ptr->header.seq, DATA, 0, priority,
                    cur_msg_ptr->header.len, cur_msg_ptr->header.fragm);
        }
#endif

        rcv_infop = &dsfep->dsf_rinfo.rec_info.rcv_info[priority];
        if (rcv_infop->rec_seq == cur_msg_ptr->header.seq) {
                /* Expected case */
                rcv_infop->rec_seq++;

                /*
                 * In case it was a normal data message, an ACK will be sent
                 * based on the remaining window size and how many messages
                 * have not been acked. This will be done once the data has
                 * been processed, and the remaining window been calculated.
                 */
                return 1;
        }
        dsfep->dsf_chan_obj_ptr->dsf_stats.seq_errors++;
        if (cur_msg_ptr->header.seq < rcv_infop->rec_seq)
                /* Check for wrap around */
                if (rcv_infop->rec_seq - cur_msg_ptr->header.seq < (uint) 0x8fffffff) {

                        /*
                         * No wrap around, we received message that was
```

© COPYRIGHT 1994 AMDAHL CORPORATION

```
                         * already received
                         */
                        /* Send ACK, indicating current state */
                        send_ack(dsfep, priority);
                        return 0;
                }

        /*
         * Sequence number too far ahead, send NAK message (if not already
         * sent)
         */
        if (rcv_infop->nak_seq != rcv_infop->rec_seq)
                send_nak(dsfep, priority);
        return 0;
}

/*
 * dsf_alloc_error - Handle failure of allocating a message buffer.
 */

void dsf_alloc_error(dsfep, cur_msg_ptr)
        struct dsf_element *dsfep;
        struct dsf_msg *cur_msg_ptr;
{
        register int priority;

        if (receive_stopped)
                dsfep->dsf_chan_obj_ptr->dsf_stats.rcv_refused++;
        else
                dsfep->dsf_chan_obj_ptr->dsf_stats.alloc_errs++;
        dsf_check_win_size(); /* Adjust window size */
        priority = cur_msg_ptr->header.priority;
        dsfep->dsf_rinfo.rec_info.rcv_info[priority].rec_seq--;
        if (priority == dsfep->priority) {
                int avail_window;
                register int s = splstr();

                /* Close window for a moment to gain breathing room */
                avail_window = dsfep->dsf_rinfo.rec_info.avail_win;
                dsfep->dsf_rinfo.rec_info.avail_win = 0;
                send_nak(dsfep, priority);
                dsfep->dsf_rinfo.rec_info.avail_win = avail_window;
                splx(s);
                /* reopen window */
                timeout(qenable, (caddr_t) dsfep->dsf_wrq, 1);
```

© COPYRIGHT 1994 AMDAHL CORPORATION

```
	} else
		send_nak(dsfep, priority);
}

/*
 * dsf_read_task - Task that waits for message buffers on a dsf channel
 *		and processes them. The I/O routines used to do I/O on
 *		the dsf channel are contained in a dsf channel object
 *		provided through the association table 'dsf_chan_obj_tbl'
 *		passed as a parameter to the task.
 *		Note: This task has to be created with fork_utask()
 *			as it might sleep().
 */

void dsf_read_task()
{
	struct dsf_chan_obj *dsf_chan_obj_ptr;
	int err;
	int len;
	struct bio_buff *buff_ptr;
	struct dsf_msg *cur_msg_ptr;
	mblk_t *mp;
	register int i;
	register struct dsf_chan_assoc *dsf_chan_assoc_entry;
	int remote_open_str;
	proc_t *pp;
	extern void dsf_check_alive();

	/* First get the parameter and the task id */

	pp = get_procp();

	dsf_chan_assoc_entry = (struct dsf_chan_assoc *) pp->p_param;
	dsf_chan_assoc_entry->tid = pp->p_tid;
	dsf_chan_obj_ptr = dsf_chan_assoc_entry->dsf_chan_obj_ptr;

OPEN_CONN:
	if (dsf_chan_assoc_entry->dsf_open_parm.mode != 0) {
		/* Establish connection */
		int time_id;
		int close_streams_flag = 0;

		if (dsf_chan_obj_ptr->str_list != NULL)
			/* May be timeout should be configurable */
			time_id = timeout(set_close_streams_flag,
```

© COPYRIGHT 1994 AMDAHL CORPORATION

```
                (caddr_t) & close_streams_flag, 60 * 20 * HZ);
        while (!(*dsf_chan_obj_ptr->open_fct)(&dsf_chan_assoc_entry->
                dsf_open_parm, dsf_chan_obj_ptr)) {
                /*
                 * Open failed. In case of active open, wait for a
                 * while, then try again. In case of passive open,
                 * the error is fatal; log it and exit.
                 */
                if (dsf_chan_obj_ptr->status_flag == DSF_OPENING &&
                        dsf_chan_assoc_entry->dsf_open_parm.mode       ==
DSF_ACTIVE_OPEN) {
                        if (close_streams_flag)

                                /*
                                 * Timeout for keeping stream parts
                                 * alive
                                 */
                                close_streams(dsf_chan_obj_ptr);
                        delay(dsf_chan_obj_ptr->open_retry_time * HZ);
                } else {
                        if (dsf_chan_obj_ptr->str_list != NULL) {
                                untimeout(time_id);
                                close_streams(dsf_chan_obj_ptr);
                        }
                        cmn_err(CE_WARN, "Channel object open %s %s failed %d",

dsfchosw[dsf_chan_assoc_entry->dsf_chan_obj_type].media_name,
                            dsf_chan_assoc_entry->dsf_open_parm.address,
                            pp->p_uerror);
                        dsf_delete_channel(dsf_chan_assoc_entry->tid);
                        sc_tdelete(0, 0, &err);
                        /* Does not continue */
                }
        }
        if (dsf_chan_obj_ptr->str_list != NULL)
                untimeout(time_id);
        dsf_chan_obj_ptr->status_flag = DSF_UP;
}
/* Exchange open request and response */

if (dsf_chan_assoc_entry->dsf_open_parm.mode == DSF_ACTIVE_OPEN) {
        /* Send open request */
        register mblk_t *opmp;
        register struct dsf_open_req *dsf_open_req_ptr;
        register struct dsf_open_resp *dsf_open_resp;
```

© COPYRIGHT 1994 AMDAHL CORPORATION

```
while ((opmp = allocb_sleep(sizeof(struct dsf_open_req)))
     == NULL)
        delay(HZ / 2);

opmp->b_wptr += sizeof(struct dsf_open_req);
dsf_open_req_ptr = (struct dsf_open_req *) opmp->b_rptr;
/* Fill in the open request */
/* No data conversion support */
*((long *) &dsf_open_req_ptr->conv_flags[0]) = 0;
dsf_open_req_ptr->version = DSF_VERSION;

strcpy(dsf_open_req_ptr->id, dsf_chan_obj_ptr->id);

if (m_write_msg(dsf_chan_obj_ptr, opmp, DSF_HI_PRI,
          sizeof(struct dsf_open_req)) < 0) {
        /* Write failed */
        freeb(opmp);
        cmn_err(CE_NOTE, "Channel object write failed (%s)",
             dsf_chan_obj_ptr->id);
        goto RETRY;
}
switch (wait_open_resp(dsf_chan_obj_ptr, &buff_ptr, &len)) {
case 0:
        remote_open_str =
                ((struct dsf_open_resp *) (buff_ptr->buffer))->open_strms;
        free_mem_block(buff_ptr);
        break;
case 1:
        /* Try again */
        goto RETRY;
case -2:
        send_open_resp(dsf_chan_obj_ptr, DSF_VERSION_MISMATCH);
case -1:
default:
        /* Fatal error */
        goto ERR_VERSION;
}
/* Everything fine */
/* Tell remote the good news */
if (send_open_resp(dsf_chan_obj_ptr, DSF_OPEN_OK) < 0) {
        /* Retry */
        cmn_err(CE_NOTE, "Channel object write failed (%s)",
             dsf_chan_obj_ptr->id);
        goto RETRY;
}
```

© COPYRIGHT 1994 AMDAHL CORPORATION

```
			len = 0;
			cur_msg_ptr = dsf_reconnect(dsf_chan_obj_ptr, remote_open_str,
				&buff_ptr, NULL, &len);
		} else {
			/* Passive open */
			/* Wait for open request */
			register struct dsf_open_req *dsf_open_req;

			if (m_read_msg(dsf_chan_obj_ptr, &buff_ptr) <= 0) {
				/* Read error */
				cmn_err(CE_NOTE, "Channel object read error - task %d",
					pp->p_tid);
				goto RETRY;
			}
			dsf_open_req = (struct dsf_open_req *) buff_ptr->buffer;
			dsf_open_req->id[MAX_ID_LEN-1] = '\0';
			strcpy(dsf_chan_obj_ptr->id, dsf_open_req->id);
			if (dsf_open_req->version > DSF_VERSION) {
				send_open_resp(dsf_chan_obj_ptr, DSF_VERSION_MISMATCH);
				goto ERR_VERSION;
			}
			/* Everything fine */
			free_mem_block(buff_ptr);
			/* Tell remote the good news */
			if (send_open_resp(dsf_chan_obj_ptr, DSF_OPEN_OK) < 0) {
				/* Retry */
				cmn_err(CE_NOTE, "Channel object write failed (%s)",
					dsf_chan_obj_ptr->id);
				goto RETRY;
			}
			switch (wait_open_resp(dsf_chan_obj_ptr, &buff_ptr, &len)) {
			case 0:
				remote_open_str =
					((struct dsf_open_resp *) (buff_ptr->buffer))->open_strms;
				break;
			case 1:
				/* Try again */
				goto RETRY;
			case -1:
			case -2:
			default:
				/* Fatal error */
				goto ERR_VERSION;
			}
			if ((len -= sizeof(struct dsf_open_resp)) > 0) {
```

© COPYRIGHT 1994 AMDAHL CORPORATION

```
                        cur_msg_ptr = dsf_reconnect(dsf_chan_obj_ptr, remote_open_str,
                            &buff_ptr, buff_ptr->buffer + sizeof(struct dsf_open_resp),
                            &len);
                } else {
                        len = 0;
                        free_mem_block(buff_ptr);
                        cur_msg_ptr = dsf_reconnect(dsf_chan_obj_ptr, remote_open_str,
                            &buff_ptr, NULL, &len);
                }
        }
        if ((int) cur_msg_ptr == -1) {
                cmn_err(CE_NOTE,
                    "Read or write error during reconnect message exchange (%s)",
                    dsf_chan_obj_ptr->id);
                goto RETRY;
        }
        cmn_err(CE_NOTE, "Channel object with id '%s' successfully opened",
            dsf_chan_obj_ptr->id);

        /* Start keepalive mechanism */
        dsf_chan_obj_ptr->dsf_stats.last_msg_time = lbolt;
        timeout(dsf_check_alive, (caddr_t) dsf_chan_obj_ptr, KEEPALIVE_INTERVAL);

        /* Loop of reading and processing */

        for (;;) {
LOOP:
                if (len <= 0) {
                        len = m_read_msg(dsf_chan_obj_ptr, &buff_ptr);
                        if (len < 0) {
                                cmn_err(CE_NOTE, "Channel object read error (%s)",
                                    dsf_chan_obj_ptr->id);
                                break;  /* Retry after a timeout */
                        }
                        /* Update statistics */
                        dsf_chan_obj_ptr->dsf_stats.last_msg_time = lbolt;
                        dsf_chan_obj_ptr->dsf_stats.msg_rcv++;
                        dsf_chan_obj_ptr->dsf_stats.bytes_rcv += len;
                        cur_msg_ptr = (struct dsf_msg *) buff_ptr->buffer;
                }
                if (win_adj_shft > 2 && kmem_avail() < MIN_MEM)
                        receive_stopped = 1;
                else
                        receive_stopped = 0;
                while (len >= sizeof(struct dsf_msg_header)) {
```

© COPYRIGHT 1994 AMDAHL CORPORATION

```
if (cur_msg_ptr->header.len == 0 || cur_msg_ptr->header.len > len) {
        cmn_err(CE_WARN,
            "Msg with invalid message length received '%s' %d %x %d",
            dsf_chan_obj_ptr->id, cur_msg_ptr->header.len,
            cur_msg_ptr->header.len, len);
        len = 0;
        break;
}
if (cur_msg_ptr->header.type == DSF_DATA) {
        register struct dsf_element *dsfep =
        (struct dsf_element *) cur_msg_ptr->header.dest_id;
        register int msg_len;
        int ack_it;

        /*
         * Find the destination queue and check for
         * consistency
         */
        if (!valid_dsf_id((int) dsfep) ||
            dsfep->dsf_rinfo.remote_queue_id !=
            cur_msg_ptr->header.src_id) {
                /* Invalid destination or source */
                send_no_partner_msg(dsf_chan_obj_ptr,
                    cur_msg_ptr->header.src_id, (int) dsfep);
                goto CONT;
        }
        /* Check sequence number */
        if (!expected_seq(cur_msg_ptr, dsfep)) {
                goto CONT;
        }
        if (cur_msg_ptr->header.fragm) {
                /* Message fragment */
                if ((msg_len = rcv_fragment(dsfep, buff_ptr, cur_msg_ptr,
                        &mp)) < 0) {
                        /* Error */
                        goto CONT;
                } else if (msg_len == 0) {
                        /* Valid fragment received */

                        /*
                         * Do not deallocate this
                         * message block
                         */
                        len = 0;
                        APPL_POLL
```

© COPYRIGHT 1994 AMDAHL CORPORATION

```
                        goto LOOP;     /* Read next message */
                }

                /*
                 * mp contains the complete message,
                 * last fragment is not deallocated.
                 */
        } else {
                if  ((msg_len  =  build_msg(&cur_msg_ptr->body.data_msg,
&mp))
                    < 0) {

                        /*
                         * Not enough resources to
                         * build STREAMS message
                         */
                        if (((struct stdata *)dsfep->dsf_str)->sd_flag &
                                (STWRERR | STRHUP)) {
                                /* Hangup was already sent, ignore message */
                                goto CONT;
                        }
                        /*
                         * Send NAK message and
                         * adjust window and sequence number
                         */
                        dsf_alloc_error(dsfep, cur_msg_ptr);
                        goto CONT;
                }
        }
        /* Put message into queue */
        ack_it = 0;

        if (mp->b_datap->db_type == M_IOCTL) {

                /*
                 * Save credentials if from UTS4,
                 * allocate them if from SVR3 (TPIX)
                 */
                register struct iocblk *iocbp = (struct iocblk *) mp->b_rptr;
                register mblk_t *m_crp;

                if ((uint) iocbp->ioc_cr == 0xFFFFFFFF) {

                        /*
                         * This comes from UTS4, the
```

© COPYRIGHT 1994 AMDAHL CORPORATION

```
                         * credential structure
                         * follows in the b_cont
                         * field.
                         */
                        m_crp = mp->b_cont;
                        mp->b_cont = m_crp->b_cont;      /*   Unlink
credentials */

                        ack_it = 1;
                } else {
                        /* SVR3 (TPIX) */
                        register struct dsf_cred *crp;

                        if((m_crp = allocb(sizeof(struct dsf_cred), BPRI_MED))
                            == NULL) {
                                /* Send NAK */
                                freemsg(mp);
                                dsf_alloc_error(dsfep, cur_msg_ptr);
                                goto CONT;
                        }
                        m_crp->b_wptr += sizeof(struct dsf_cred);
                        crp = (struct dsf_cred *) m_crp->b_rptr;
                        *(struct cred *) crp = loc_cred;
                        crp->cr_uid = crp->cr_ruid = crp->cr_suid =
                            ((uint) iocbp->ioc_cr) >> 16;
                        crp->cr_gid = crp->cr_rgid = crp->cr_sgid =
                            ((uint) iocbp->ioc_cr) & 0xffff;
                }
                dsfep->ioc_id = iocbp->ioc_id;

                /*
                 * If old credentials are still
                 * present, do not deallocate as they
                 * might still be used somewhere.
                 */
                m_crp->b_cont = dsfep->ioc_cr;
                dsfep->ioc_cr = m_crp;
                iocbp->ioc_cr = (cred_t *) m_crp->b_rptr;
        } else if (mp->b_datap->db_type == M_IOCDATA) {
                register struct copyresp *cp = (struct copyresp *) mp->b_rptr;

                if (dsfep->ioc_cr)
                        cp->cp_cr = (cred_t *) dsfep->ioc_cr->b_rptr;
                else {
                        cmn_err(CE_WARN, "M_IOCDATA with ioctl %x",
dsfep);
```

© COPYRIGHT 1994 AMDAHL CORPORATION

```
                        cp->cp_cr = &loc_cred;
                }
        }
        if (cur_msg_ptr->header.priority > dsfep->priority)

                /*
                 * High priority messages are not
                 * delayed
                 */
                putnext(dsfep->dsf_wrq, mp);
        else {
                /* Update communicated Window */
                if ((dsfep->dsf_rinfo.rec_info.comm_win -= msg_len) < 0)
                        dsfep->dsf_rinfo.rec_info.comm_win = 0;
                /* Check whether driver had sent an M_HANGUP */
            if (dsfep->dsf_type == DSF_BOTTOM &&
                    (((struct stdata *) dsfep->dsf_str)->sd_flag &
                        (STWRERR | STRHUP)) != 0)       {
                        freemsg(mp);
                        ack_it = 1;
                        /* Keep window open */
                        if (dsfep->dsf_rinfo.rec_info.avail_win <= 0)
                                dsfep->dsf_rinfo.rec_info.avail_win = 1;
                } else if (dsfep->dsf_wrq->q_first ||
                    !bcanput(dsfep->dsf_wrq->q_next, mp->b_band)) {
                        putq(dsfep->dsf_wrq, mp);
                        /* Update available window */
                        if ((dsfep->dsf_rinfo.rec_info.avail_win =
                                    (dsfep->dsf_rinfo.rec_info.max_win >>
                                        (win_adj_shft + 1)) -
                                    dsfep->dsf_wrq->q_count) < 0)
                                dsfep->dsf_rinfo.rec_info.avail_win = 0;
                } else {
                        register queue_t *q = dsfep->dsf_wrq->q_next;

                        putnext(dsfep->dsf_wrq, mp);
                        /* Update available window */
                        while (q->q_next && !q->q_qinfo->qi_srvp)
                                q = q->q_next;
                        dsfep->dsf_rinfo.rec_info.max_win = 2 * q->q_hiwat;
                        if ((dsfep->dsf_rinfo.rec_info.avail_win =
                                    (dsfep->dsf_rinfo.rec_info.max_win >>
                                        win_adj_shft) - q->q_count) <= 0) {
                                /* Window became zero */
```

© COPYRIGHT 1994 AMDAHL CORPORATION

```
                                /*
                                 * Tell queue, we are
                                 * intending to write
                                 * more
                                 */
                                q->q_flag |= QWANTW;
                                dsfep->dsf_rinfo.rec_info.avail_win = 0;
                        }

                        /*
                         * Check whether more than 10
                         * messages are not ACKed
                         */
                        if(dsfep->dsf_rinfo.rec_info.rcv_info[dsfep->priority].
                                rec_seq - dsfep->dsf_rinfo.rec_info.
                                rcv_info[dsfep->priority].ack_seq >= 10)
                                ack_it = 1;
                }
        }
        /* Check whether ACK should be sent */
        if (ack_it || cur_msg_ptr->header.ack_req ||
            dsfep->dsf_rinfo.rec_info.avail_win -
            dsfep->dsf_rinfo.rec_info.comm_win >
            (dsfep->dsf_rinfo.rec_info.avail_win >> 1))
                send_ack(dsfep, cur_msg_ptr->header.priority);

        APPL_POLL
} else if (cur_msg_ptr->header.type == DSF_ADMIN) {
        register struct dsf_element *dsfep;

        switch (cur_msg_ptr->body.admin_msg.type) {
        case R_ACK_MSG:
                if (!valid_dsf_id(cur_msg_ptr->header.dest_id)) {
                        send_no_partner_msg(dsf_chan_obj_ptr,
                                cur_msg_ptr->header.src_id,
                                cur_msg_ptr->header.dest_id);
                } else if (((struct dsf_element *) cur_msg_ptr->header.dest_id)
                                ->dsf_rinfo.remote_queue_id ==
                        cur_msg_ptr->header.src_id)
                        process_ack(cur_msg_ptr);
                break;
        case R_NAK_MSG:
                dsf_chan_obj_ptr->dsf_stats.n_nacks++;
                if (!valid_dsf_id(cur_msg_ptr->header.dest_id)) {
                        send_no_partner_msg(dsf_chan_obj_ptr,
```

© COPYRIGHT 1994 AMDAHL CORPORATION

```
                        cur_msg_ptr->header.src_id,
                        cur_msg_ptr->header.dest_id);
            } else if (((struct dsf_element *) cur_msg_ptr->header.dest_id)
                        ->dsf_rinfo.remote_queue_id ==
                  cur_msg_ptr->header.src_id)
                    process_nak(cur_msg_ptr);
            break;
        case R_NO_PARTNER:

            /*
             * Check whether local queue still
             * has the same partner
             */
            {
                    struct dsf_element *dsfep = (struct dsf_element *)
                    cur_msg_ptr->body.admin_msg.r_no_partner.src_id;

                    if (valid_dsf_id((int) dsfep) &&
                        cur_msg_ptr->body.admin_msg.r_no_partner.dest_id
==
                         dsfep->dsf_rinfo.remote_queue_id) {
                      /* Wake up process, in case it is sleeping */
                      proc_interrupt(dsfep->dsf_rinfo.remote_queue_id);
                           local_str_close(dsfep);
                    }
                    break;
            }
        case DSF_CHAN_CLOSE_REQ:
                free_mem_block(buff_ptr);
                proc_close_req(dsf_chan_assoc_entry);
                sc_tdelete(0, 0, &err);
                /* Does not continue */
                break;
        case DSF_CHAN_CLOSE_RESP:
                free_mem_block(buff_ptr);
                shut_dsf_chan(dsf_chan_assoc_entry);
                sc_tdelete(0, 0, &err);
                break;
        case R_CLOSE_REQ:
        case R_PUSH_REQ:
        case R_POP_REQ:
        case R_LINK_REQ:
        case R_UNLINK_REQ:
                {
                        register struct dsf_element *dsfep;
```

© COPYRIGHT 1994 AMDAHL CORPORATION

```
                                        dsfep   =   (struct  dsf_element   *)
cur_msg_ptr->header.dest_id;
                                        if (!valid_dsf_id((int) dsfep) ||
                                             dsfep->dsf_rinfo.remote_queue_id !=
                                             cur_msg_ptr->header.src_id) {
                                                send_no_partner_msg(dsf_chan_obj_ptr,
                                                     cur_msg_ptr->header.src_id,
                                                     cur_msg_ptr->header.dest_id);
                                                break;
                                        }
                                        if (dsfep->dsf_type != DSF_BOTTOM ||
                                             !expected_seq(cur_msg_ptr, dsfep))
                                                break;
                                        if (!msg_to_agent(dsf_chan_obj_ptr, cur_msg_ptr->header
                                                .dest_id, cur_msg_ptr->header.src_id,
                                             &cur_msg_ptr->body.admin_msg)) {
                                           /* Can't allocate request. NAK it. */
                                           register int priority = cur_msg_ptr->header.priority;
                                           dsfep->dsf_rinfo.rec_info.rcv_info[priority].rec_seq--;
                                           send_nak(dsfep, priority);
                                           goto CONT;
                                        }
                                        if (cur_msg_ptr->header.ack_req != 0)
                                                send_ack(dsfep,cur_msg_ptr->header.priority);
                                        break;
                                    }
                            case R_OPEN_REQ:

                                    /*
                                     * If this is an additional open on
                                     * an already existing stream
                                     * (sequence number != 0) check
                                     * destination and whether sequence
                                     * number is expected.
                                     */
                                    {
                                        register struct dsf_element *dsfep;

                                        dsfep   =   (struct  dsf_element   *)
cur_msg_ptr->header.dest_id;
                                        if (dsfep != NULL) {
                                                if (!valid_dsf_id((int) dsfep) ||
                                                     dsfep->dsf_rinfo.remote_queue_id !=
                                                     cur_msg_ptr->header.src_id) {
                                                        send_no_partner_msg(dsf_chan_obj_ptr,
```

© COPYRIGHT 1994 AMDAHL CORPORATION

```
                        cur_msg_ptr->header.src_id,
                        cur_msg_ptr->header.dest_id);
                    break;
                }
                if (dsfep->dsf_type != DSF_BOTTOM ||
                    !expected_seq(cur_msg_ptr, dsfep))
                    break;
            }
            if (!msg_to_agent(dsf_chan_obj_ptr, (int) dsfep,
                cur_msg_ptr->header.src_id,
                &cur_msg_ptr->body.admin_msg)) {
                /* Can't allocate request. NAK it. */
                register int priority = cur_msg_ptr->header.priority;
                if (dsfep) {

dsfep->dsf_rinfo.rec_info.rcv_info[priority].rec_seq--;
                    send_nak(dsfep, priority);
                } else
                    send_nak_null(dsf_chan_obj_ptr,
                            cur_msg_ptr->header.src_id,

priority);
            }
            break;
        }
    case DSF_KEEPALIVE_REQ:
        /* Send with a keep alive response */
        send_keepalive(dsf_chan_obj_ptr, DSF_KEEPALIVE_RESP);
        break;
    case DSF_KEEPALIVE_RESP:
        break;  /* No need to process more */
    case R_INTERRUPT:
        {
            register struct dsf_element *dsfep;

            dsfep   =   (struct   dsf_element   *)
cur_msg_ptr->header.dest_id;

            if (dsfep != NULL) {
                if (!valid_dsf_id((int) dsfep) ||
                    dsfep->dsf_rinfo.remote_queue_id !=
                    cur_msg_ptr->header.src_id) {
                    send_no_partner_msg(dsf_chan_obj_ptr,
                        cur_msg_ptr->header.src_id,
                        cur_msg_ptr->header.dest_id);
                    break;
```

© COPYRIGHT 1994 AMDAHL CORPORATION

```
                                        }
                                        if (!expected_seq(cur_msg_ptr, dsfep))
                                                break;
                                        if (cur_msg_ptr->header.ack_req != 0)
                                                s e n d _ a c k ( d s f e p ,
cur_msg_ptr->header.priority);
                                }
                                proc_interrupt(cur_msg_ptr->header.src_id);
                                break;
                        }
                default:
                        cmn_err(CE_NOTE, "Not supported admin message type %d
(%s)",
                                cur_msg_ptr->body.admin_msg.type,
                                dsf_chan_obj_ptr->id);
                        break;
                }
        } else {
                cmn_err(CE_WARN, "Invalid dsf msg type: %d (%s)",
                        cur_msg_ptr->header.type, dsf_chan_obj_ptr->id);
                /* Assume whole block is bad */
                len = 0;
                break;
        }
CONT:
        /* Goto next message in buffer */
        {
                register int tot_msg_len;

                tot_msg_len = (cur_msg_ptr->header.len + 3);
                tot_msg_len -= (tot_msg_len % 4);
                len -= tot_msg_len;
                cur_msg_ptr = (struct dsf_msg *) ((char *) cur_msg_ptr
                        + tot_msg_len);
        }
    }
    /* Release the buffer */
    free_mem_block(buff_ptr);
    reschedule();   /* Give other tasks a chance to run */
}

RETRY:
        transport_err(dsf_chan_obj_ptr);
        m_close(dsf_chan_obj_ptr, 1);
        if (dsf_chan_assoc_entry->dsf_open_parm.mode == 0) {
```

© COPYRIGHT 1994 AMDAHL CORPORATION

```
                /* This has to be opened from the other side */

                /*
                 * Keep the entry, but remove the task id.
                 */
                dsf_chan_assoc_entry->tid = 0;
                sc_tdelete(0, 0, &err);
        } else {
                delay(dsf_chan_obj_ptr->open_retry_time * HZ);
                if (dsf_chan_obj_ptr->status_flag == DSF_CLOSING) {
                        /* Somebody closed it in the meantime */
                        close_streams(dsf_chan_obj_ptr);
                        dsf_delete_channel(dsf_chan_assoc_entry->tid);
                        sc_tdelete(0, 0, &err);
                }

                dsf_chan_obj_ptr->status_flag = DSF_OPENING;
                goto OPEN_CONN;
        }

ERR_VERSION:
        cmn_err(CE_NOTE, "DSF channel open error: Version or data mismatch (%s)",
             dsf_chan_obj_ptr->id);
        free_mem_block(buff_ptr);
        close_streams(dsf_chan_obj_ptr);
        transport_err(dsf_chan_obj_ptr);
        m_close(dsf_chan_obj_ptr, 1);
        dsf_delete_channel(dsf_chan_assoc_entry->tid);
        sc_tdelete(0, 0, &err);
}

/*
 * send_nak_null - Send NAK for an open request.
 */

STATIC void send_nak_null(dsf_chan_obj_ptr, src_id, priority)
        struct dsf_chan_obj *dsf_chan_obj_ptr;
        uint src_id;
        int priority;
{
        register struct dsf_msg *nak_msg_ptr;
        register mblk_t *nak_mp = allocb_sleep(sizeof(struct dsf_msg_header)
             + sizeof(struct r_nak_msg));

        nak_mp->b_wptr += (sizeof(struct dsf_msg_header)
```

© COPYRIGHT 1994 AMDAHL CORPORATION

```
            + sizeof(struct r_nak_msg));
        nak_msg_ptr = (struct dsf_msg *) nak_mp->b_rptr;
        nak_msg_ptr->header.type = DSF_ADMIN;
        nak_msg_ptr->header.priority = DSF_HI_PRI;
        nak_msg_ptr->header.ack_req = 0;
        nak_msg_ptr->header.fragm = 0;
        nak_msg_ptr->header.len = sizeof(struct dsf_msg_header)
            + sizeof(struct r_nak_msg);
        nak_msg_ptr->header.src_id = 0;
        nak_msg_ptr->header.dest_id = src_id;
        nak_msg_ptr->body.admin_msg.type = R_NAK_MSG;
        nak_msg_ptr->body.admin_msg.r_nak_msg.priority = priority;
        nak_msg_ptr->body.admin_msg.r_nak_msg.nak_seq = 0;

        nak_msg_ptr->body.admin_msg.r_nak_msg.window_size = 1024; /* just a number */
        if (m_write_msg(dsf_chan_obj_ptr, nak_mp, DSF_HI_PRI,
                    sizeof(struct dsf_msg_header) + sizeof(struct r_nak_msg)) < 0) {
                freeb(nak_mp);
                transport_err(dsf_chan_obj_ptr);
        }
}

/*
 * Schedule read queue again to allocate message header for data mesage.
 */

STATIC void dsf_qenable(dsfep)
        struct dsf_element *dsfep;
{
        dsfep->dsf_hbid = 0;
        qenable(RD(dsfep->dsf_wrq));
}

static int bufcall_fail = 0;
#define CHK_BUFCALL_TOUT (HZ/4)

STATIC void check_bufcalls(dsf_chan_obj_ptr)
        struct dsf_chan_obj *dsf_chan_obj_ptr;
{
        register struct dsf_element *dsfep;
        int local_bufcall_fail = 0;
        extern void resend_ack_naks();
        register int s = splstr();

        bufcall_fail = 0;
```

© COPYRIGHT 1994 AMDAHL CORPORATION

```
        for (dsfep = dsf_chan_obj_ptr->str_list; dsfep != NULL; dsfep = dsfep->
            dsf_next_el) {
                if (dsfep->dsf_hbid == 0 && (dsfep->dsf_rhipri_ml != NULL ||
                            dsfep->dsf_rinfo.send_info.state == FLOWING &&
                            RD(dsfep->dsf_wrq)->q_first)) {
                        if (!(dsfep->dsf_hbid = bufcall(sizeof(struct dsf_msg_header)
                                        + sizeof(struct msg_buff), BPRI_MED, dsf_qenable,
                                        (long) dsfep))) {
                                local_bufcall_fail = 1;
                                break;
                        }
                }
                if (dsfep->dsf_rinfo.send_info.state == NO_MEM &&
                    dsfep->dsf_bid == 0) {
                        /* try again bufcall() for this one */
                        if ((dsfep->dsf_bid = bufcall(sizeof(mblk_t), BPRI_MED,
                                        restart_queue, (long) dsfep)) == 0) {
                                local_bufcall_fail = 1;
                                break;
                        }
                }
                if (dsfep->dsf_rinfo.rec_info.ack_nak_bid == 0xffffffff)
                        resend_ack_naks(dsfep);
        }
        if (!bufcall_fail && local_bufcall_fail) {
                bufcall_fail = 1;
                timeout(check_bufcalls, (caddr_t) dsf_chan_obj_ptr, CHK_BUFCALL_TOUT);
        }
        splx(s);
}

void dsf_reg_chk_bufcalls(dsf_chan_obj_ptr)
{
        if (!bufcall_fail) {
                bufcall_fail = 1;
                timeout(check_bufcalls, (caddr_t) dsf_chan_obj_ptr, CHK_BUFCALL_TOUT);
        }
}

/*
 * dsf_dup_bufcall - If dupb() fails, call this routine to get things going
 *                   again later.
 */

void dsf_dup_bufcall(dsfep)
```

© COPYRIGHT 1994 AMDAHL CORPORATION

```
	register struct dsf_element *dsfep;
{
	dsfep->dsf_rinfo.send_info.state = NO_MEM;
	dsfep->dsf_chan_obj_ptr->dsf_stats.dup_errs++;
	if (dsfep->dsf_bid == 0 &&
	    (dsfep->dsf_bid = bufcall(sizeof(mblk_t), BPRI_MED, restart_queue,
			(long) dsfep)) == 0) {
		dsf_reg_chk_bufcalls(dsfep->dsf_chan_obj_ptr);
	}
}

#ifdef DEBUG
static void check_seq(dsfep)
	struct dsf_element *dsfep;
{
	mblk_t *mp;
	uint old_seq;

	mp = dsfep->dsf_rinfo.send_info.xmit_info[dsfep->priority].to_send_list;
	if (mp == NULL)
		return;
	old_seq = ((struct dsf_msg_header *) (mp->b_rptr))->seq;
	for (mp = mp->b_next; mp != NULL; mp = mp->b_next) {
		if (((struct dsf_msg_header *) (mp->b_rptr))->seq != old_seq + 1) {
			cmn_err(CE_NOTE, "sequence err %x %d %d", dsfep, old_seq,
			    ((struct dsf_msg_header *) (mp->b_rptr))->seq);
			old_seq = ((struct dsf_msg_header *) (mp->b_rptr))->seq;
		} else
			old_seq++;
	}
}

#endif

/*
 * clear_to_send_lists - Try to send all messages on the to_send_list queues
 *			NOTE: Interrupts have to be disabled.
 */

STATIC void clear_to_send_lists(dsfep)
	struct dsf_element *dsfep;
{
	struct xmit_info *xmit_infop;
	register mblk_t *mp;
	register mblk_t *dp;
```

© COPYRIGHT 1994 AMDAHL CORPORATION

```
int window;
register int i;

if (dsfep->dsf_bid != 0) {
        unbufcall(dsfep->dsf_bid);
        dsfep->dsf_bid = 0;
}
window = dsfep->dsf_rinfo.send_info.cur_window;
/* Check high priority messages first */
if (dsfep->dsf_rhipri_ml) {
        if (dsfep->dsf_hbid) {
                unbufcall(dsfep->dsf_hbid);
                dsfep->dsf_hbid = 0;
        }
        while ((mp = dsfep->dsf_rhipri_ml) != NULL) {
                dsfep->dsf_rhipri_ml = mp->b_next;
                if (!send_data_msg(dsfep, RD(dsfep->dsf_wrq), mp, DSF_HI_PRI))
                        /* Allocation failed */
                        break;
        }
        if (dsfep->dsf_rhipri_ml == NULL)
                dsfep->dsf_rinfo.send_info.n_send_list--;
        else {
                dsfep->dsf_rinfo.send_info.state = NO_MEM;
                return;
        }
}
for (i = DSF_HI_PRI; i >= DSF_NORMAL_PRI; i--) {
        xmit_infop = &dsfep->dsf_rinfo.send_info.xmit_info[i];
        if ((mp = xmit_infop->to_send_list) != NULL)
                dsfep->dsf_rinfo.send_info.n_send_list--;
        else
                continue;
        for (; mp != NULL && (window > 0 || i > dsfep->priority ||
                    ((struct dsf_msg_header *) mp->b_rptr)->type != DSF_DATA);
              mp = xmit_infop->to_send_list) {
                if (((struct dsf_msg_header *) mp->b_rptr)->len >
                      dsfep->dsf_chan_obj_ptr->io_state.max_msg_size) {
                        /* Complete message that has to be fragmented */
                        if (((struct dsf_msg_header *) mp->b_rptr)->fragm != 0) {
                                /* This fragment is still being sent */
                                if (fragment_dmsg(dsfep, i) == 0) {
                                        /* Failure */
                                        dsfep->dsf_rinfo.send_info.n_send_list++;
                                        return;
```

© COPYRIGHT 1994 AMDAHL CORPORATION

```
                        } else {
                                window = dsfep->dsf_rinfo.send_info.cur_window;
                                continue;
                        }
                }       /* else */

                /*
                 * This just marks the end of fragments
                 * already sent
                 */
        } else {
                if ((dp = dupb(mp)) == NULL) {

                        /*
                         * No resource to send message Do a
                         * bufcall to restart_queue once the
                         * resource is available.
                         */
                        dsf_dup_bufcall(dsfep);
                        dsfep->dsf_rinfo.send_info.n_send_list++;
                        return;
                }
                dp->b_cont = mp->b_cont;
                if (m_write_msg(dsfep->dsf_chan_obj_ptr, dp, i,
                        ((struct dsf_msg_header *) dp->b_rptr)->len) < 0) {
                        freeb(dp);
                        transport_err(dsfep->dsf_chan_obj_ptr);
                        dsfep->dsf_rinfo.send_info.n_send_list++;
                        return;
                }
#ifdef ITRACE
                if (itrace_on) {
                        ENTER_ITRACE_EVENT(dsfep,
                              ((struct dsf_msg_header *) dp->b_rptr)->seq, DATA, 1,
i,
                              ((struct dsf_msg_header *) dp->b_rptr)->len,
                              ((struct dsf_msg_header *) dp->b_rptr)->fragm);
                }
#endif
        }
        if (dsfep->priority == i &&
            ((struct dsf_msg_header *) mp->b_rptr)->fragm == 0) {

                /*
```

© COPYRIGHT 1994 AMDAHL CORPORATION

```
                         * No window update for fragments
                         */
                        window -= mp->b_pad2;
                        dsfep->dsf_rinfo.send_info.cur_window = window;
                        dsfep->dsf_rinfo.send_info.non_acked_bytes += mp->b_pad2;
                }
                *xmit_infop->last_msg = mp;
                xmit_infop->to_send_list = mp->b_next;
                xmit_infop->last_msg = &mp->b_next;
                mp->b_next = NULL;

        }
        if (mp != NULL)

                /*
                 * Window closed now and something left on the
                 * to_send_list
                 */
                dsfep->dsf_rinfo.send_info.n_send_list++;
    }
    if (dsfep->dsf_rinfo.send_info.cur_window > 0)
        dsfep->dsf_rinfo.send_info.state = FLOWING;
    else
        dsfep->dsf_rinfo.send_info.state = BLOCKED;
}

/*
 * restart_queue - After a lack of resources caused a data message not to be
 *                 sent, this routine retries the sending.
 */

STATIC void restart_queue(dsfep)
    struct dsf_element *dsfep;

{
    register int s = splstr();

    dsfep->dsf_bid = 0;  /* Clear the bufcall id */
    clear_to_send_lists(dsfep);
    if (dsfep->dsf_rinfo.send_info.state == FLOWING) {
        register queue_t *rq = RD(dsfep->dsf_wrq);

        enableok(rq);
        qenable(rq);
    }
```

© COPYRIGHT 1994 AMDAHL CORPORATION

```
        splx(s);
}

/*
 * msg_to_agent - A request is received from remote that needs user context.
 *              The request is copied into a newly allocated structure
 *              and put into the input queue of the master agent for the
 *              user processes.
 *              Returns 0, if request could not be submitted, 1 otherwise.
 */

STATIC int msg_to_agent(dsf_chan_obj_ptr, dest_id, src_id, dsf_admin_msg_ptr)
        struct dsf_chan_obj *dsf_chan_obj_ptr;
        int dest_id, src_id;
        union dsf_admin_msg *dsf_admin_msg_ptr;

{
        register struct proc_req *p_req_ptr;

        if ((p_req_ptr = alloc_proc_req()) == NULL)
                return 0;
        p_req_ptr->dsf_chan_obj_ptr = dsf_chan_obj_ptr;
        p_req_ptr->dest_id = dest_id;
        p_req_ptr->src_id = src_id;
        p_req_ptr->int_sig = 0;
        p_req_ptr->dsf_admin_msg = *dsf_admin_msg_ptr;
        p_req_ptr->next_req = NULL;
        submit_proc_req(p_req_ptr);
        return 1;
}

/*
 * proc_interrupt - An interrupt signal for a stream has been received. It
 *                will cause a premature end to a sleep() system call.
 *                There are three cases to be considered:
 *                      - The request that will cause a sleep is not executed
 *                        yet (still in the delayed_proc_req queue).
 *                      - Request is being executed but sleep has not been
 *                        called.
 *                      - Sleep has been called.
 */

STATIC void proc_interrupt(src_id)
        int src_id;
```

© COPYRIGHT 1994 AMDAHL CORPORATION

```
{
        register proc_t *pp;
        register struct proc_req *p_req_ptr;
        register int s = splstr();

        if ((pp = find_agent(src_id, 0)) != NULL)     /* src_id != 0 */
                signal_proc(pp);          /* Handles the cases 2 and 3 */
        else {
                for (p_req_ptr = delayed_proc_req; p_req_ptr != NULL;
                      p_req_ptr = p_req_ptr->next_req)
                         if (p_req_ptr->src_id == src_id) {
                                  p_req_ptr->int_sig = 1;
                                  break;
                         }
        }
        splx(s);
}

/*
 * DSF stream head write service routine.
 * This routine checks whether messages are on the queue and can be
 * forwarded to the downstream queue, if possible. If the window is
 * significantly changed, it sends an ACK to the remote partner.
 */

STATIC int strwsrv(q)
        register queue_t *q;

{
        register mblk_t *mp;
        register uint update;
        register struct dsf_element *dsfep;
        register struct stdata *stp;
        register int s;

        stp = (struct stdata *) q->q_ptr;
        s = splstr();

        if (stp->sd_flag & WSLEEP) {
                stp->sd_flag &= ~WSLEEP;
                splx(s);
                wakeprocs((caddr_t) q, PRMPT);
                return; /* Wakes up sleeping strclose() */
        }
        splx(s);
```

© COPYRIGHT 1994 AMDAHL CORPORATION

```
	while (canput(q->q_next)) {
		/* Get next message */
		if ((mp = getq(q)) == NULL)
			break;
		putnext(q, mp);
	}
	dsfep = ((stdata_t *) q->q_ptr)->sd_dsf_el;
	if (mp != NULL) {
		if ((dsfep->dsf_rinfo.rec_info.avail_win =
			    (dsfep->dsf_rinfo.rec_info.max_win >> (win_adj_shft + 1)) -
			    dsfep->dsf_wrq->q_count) < 0)
			dsfep->dsf_rinfo.rec_info.avail_win = 0;
	} else {
		register queue_t *tq = q->q_next;

		/* Update available window */
		while (tq->q_next && !tq->q_qinfo->qi_srvp)
			tq = tq->q_next;
		dsfep->dsf_rinfo.rec_info.max_win = 2 * tq->q_hiwat;
		if ((dsfep->dsf_rinfo.rec_info.avail_win = (dsfep->dsf_rinfo
			   .rec_info.max_win >> win_adj_shft) - tq->q_count) <= 0) {
			s = splstr();
			if (tq->q_count != 0) {
				dsfep->dsf_rinfo.rec_info.avail_win = 0;
				tq->q_flag |= QWANTW;
			} else
				/* Don't let small window sizes be shifted out */
				dsfep->dsf_rinfo.rec_info.avail_win = 1;
			splx(s);
		}
	}
	if (dsfep->dsf_rinfo.rec_info.avail_win -
	     dsfep->dsf_rinfo.rec_info.comm_win >
	     (dsfep->dsf_rinfo.rec_info.avail_win >> 1))
		send_ack(dsfep, dsfep->priority);
	return 0;
}

/*
 * free_xfrags - Free all (partially) allocated fragments. Do not deallocate
 *		element in to_send_list.
 */
void free_xfrags(xmit_infop)
	register struct xmit_info *xmit_infop;
```

© COPYRIGHT 1994 AMDAHL CORPORATION

```
{
        register mblk_t *tfp, *fp = xmit_infop->fragp, *sp;
        uint seq, len;

        /*
         * b_next of one fragment could point to the header of the complete
         * message in the to_send_list. Let's first find that complete
         * message (it has the same sequence number, but a length >
         * max_msg_size)
         */
        if (fp == NULL)
                return;
        seq = ((struct dsf_msg_header *) fp->b_rptr)->seq;
        len = ((struct dsf_msg_header *) fp->b_rptr)->len;
        for (sp = xmit_infop->to_send_list; sp != NULL; sp = sp->b_next)
                if (((struct dsf_msg_header *) sp->b_rptr)->seq == seq &&
                     ((struct dsf_msg_header *) sp->b_rptr)->len > len)
                        break;
        while (fp != NULL && fp != sp) {
                tfp = fp;
                fp = fp->b_next;
                freemsg(tfp);
        }
        xmit_infop->fragp = NULL;
}

/*
 * send_frag - dup the header and then send a fragment. Return -1 if dupb()
 *             failed, -2 if the send failed and 0 if it was successful.
 */

STATIC int send_frag(dsfep, fp)
        struct dsf_element *dsfep;
        mblk_t *fp;

{
        register mblk_t *dp;
        register struct dsf_msg_header *header;

        if ((dp = dupb(fp)) == NULL) {
                dsf_dup_bufcall(dsfep);
                return -1;
        }
        dp->b_cont = fp->b_cont;
        header = (struct dsf_msg_header *) dp->b_rptr;
```

© COPYRIGHT 1994 AMDAHL CORPORATION

```
	if (m_write_msg(dsfep->dsf_chan_obj_ptr, dp, header->priority, header->len)
	    < 0) {
		freeb(dp);
		return -2;
	}

#ifdef ITRACE
	if (itrace_on) {
		ENTER_ITRACE_EVENT(dsfep, header->seq, DATA, 1, header->priority,
		    header->len, header->fragm);
	}
#endif

	return 0;
}

/*
 * fragment_dmsg - Fragment the message in to_send_list of the given priority
 *		This function can be called from bufcall().
 *		Returns 1, when the whole message got sent, and 0 when
 *		it did not succeed.
 *		Note: Interrupts have to be disabled in this function.
 */

STATIC int fragment_dmsg(dsfep, prio)
	struct dsf_element *dsfep;
	int prio;

{
	int cur_frg_no;		/* Fragment number (decreasing) */
	int rem_len;	/* Remaining length of message */
	mblk_t *first_fp;	/* First fragment of the list of fragments */
	register mblk_t *hp;	/* Current header message block */
	mblk_t *cmp;	/* Current message block of original message */
	mblk_t *cfmp;	/* Current message block of fragment */
	unsigned char *cur_rptr;	/* Points to next data byte in
					 * original message */
	register struct dsf_msg_header *headerp;	/* Fragment header */
	int max_msg_size = dsfep->dsf_chan_obj_ptr->io_state.max_msg_size -
	  sizeof(struct dsf_msg_header);	/* Maximum space for data in message */
	register mblk_t *tmp;
	register int status;

	register struct xmit_info *xmit_infop =
		&dsfep->dsf_rinfo.send_info.xmit_info[prio];
```

© COPYRIGHT 1994 AMDAHL CORPORATION

```
register struct dsf_msg_header *msg_header =
        (struct dsf_msg_header *) xmit_infop->to_send_list->b_rptr;

register int cur_frag_len;      /* # of bytes already contained in
                                 * fragment */

/* First find the position, from where to continue */
if ((first_fp = xmit_infop->fragp) == NULL) {
        /* Start from the beginning */
        cur_frag_len = 0;
        cmp = xmit_infop->to_send_list;
        cur_frg_no = msg_header->fragm;
        rem_len = msg_header->len - sizeof(struct dsf_msg_header);
        cur_rptr = cmp->b_rptr + sizeof(struct dsf_msg_header);
        hp = NULL;
        cfmp = NULL;
} else {
        /* Partially allocated fragments */
        /* Is there one already completed fragment ? */
        if (first_fp->b_cont != NULL && first_fp->b_next != NULL)
                /* There is a second fragment */
                hp = first_fp->b_next;
        else
                /* Only one fragment */
                hp = first_fp;
        headerp = (struct dsf_msg_header *) hp->b_rptr;
        cur_frg_no = headerp->fragm & 0x7f;
        rem_len = msg_header->len - (msg_header->fragm - cur_frg_no)
             * max_msg_size - sizeof(struct dsf_msg_header);
        /* Find last allocated message block */
        cur_frag_len = 0;
        if (hp->b_cont == NULL) {
                cfmp = hp;
        } else {
                for (cfmp = hp->b_cont; cfmp->b_cont != NULL; cfmp = cfmp->b_cont)
                        cur_frag_len += (cfmp->b_wptr - cfmp->b_rptr);
                cur_frag_len += (cfmp->b_wptr - cfmp->b_rptr);    /* Add last one */
        }
        cmp = cfmp->b_next;
        cfmp->b_next = NULL;        /* This was just a temporary pointer
                                     * to get at at the next block of the
                                     * original message. */

        /*
         * The next byte to copy has been saved in the b_prev field
```

© COPYRIGHT 1994 AMDAHL CORPORATION

```
		 * of the last header message block.
		 */
		cur_rptr = (unsigned char *) hp->b_prev;
	}
	while (cur_frg_no > 0) {
		if (hp != NULL)
			goto GOT_HEADER;
		if ((hp = allocb(sizeof(struct dsf_msg_header), BPRI_MED)) == NULL) {
			if ((xmit_infop->fragp = first_fp) != NULL)
				/* Save next byte to read */
				first_fp->b_prev = (mblk_t *) cur_rptr;
			if (cfmp != NULL)
				cfmp->b_next = cmp;
			dsf_dup_bufcall(dsfep);
			return 0;
		}
		if (first_fp == NULL)
			first_fp = hp;
		else
			first_fp->b_next = hp;		/* Never more than two are on
							 * the list */

		/*
		 * Copy header from header in to_send_list, and modify length
		 * and fragment field.
		 */
		bcopy(xmit_infop->to_send_list->b_rptr, hp->b_rptr,
		    sizeof(struct dsf_msg_header));
		hp->b_wptr += sizeof(struct dsf_msg_header);
		headerp = (struct dsf_msg_header *) hp->b_rptr;
		headerp->len = (rem_len > max_msg_size ? max_msg_size : rem_len) +
		    sizeof(struct dsf_msg_header);
		if (cur_frg_no == msg_header->fragm)
			headerp->fragm = cur_frg_no | BEGIN_FRAGMENT;
		else
			headerp->fragm = cur_frg_no;
		cfmp = hp;
GOT_HEADER:
		/* Now dup the message blocks until fragment is full */
		while (cur_frag_len < max_msg_size) {
			register mblk_t *nmp;

			if ((nmp = dupb(cmp)) == NULL) {
				xmit_infop->fragp = first_fp;
				cfmp->b_next = cmp;		/* Remember current
```

© COPYRIGHT 1994 AMDAHL CORPORATION

```
                                        * position */
                hp->b_prev = (mblk_t *) cur_rptr;
                dsf_dup_bufcall(dsfep);
                return 0;
        }
        nmp->b_rptr = cur_rptr;
        cfmp->b_cont = nmp;
        cfmp = nmp;
        cur_frag_len += (nmp->b_wptr - nmp->b_rptr);
        if (cur_frag_len > max_msg_size) {
                nmp->b_wptr -= (cur_frag_len - max_msg_size);
                cur_rptr = nmp->b_wptr;
                break;
        }
        if ((cmp = cmp->b_cont) == NULL)
                break;
        cur_rptr = cmp->b_rptr;
}       /* while (cur_frag_len < max_msg_size) */

/* Done with fragment */
rem_len -= (headerp->len - sizeof(struct dsf_msg_header));
/* Previous fragment can be sent now */
if (first_fp != hp) {
        first_fp->b_next = NULL;
        status = send_frag(dsfep, first_fp);
        if (status < 0) {
                /* Failure */
                xmit_infop->fragp = hp;
                cfmp->b_next = cmp;          /* Remember current
                                              * position */
                hp->b_prev = (mblk_t *) cur_rptr;

                /*
                 * Put fragment on to_send_list ahead of
                 * complete message
                 */
                first_fp->b_next = xmit_infop->to_send_list;
                xmit_infop->to_send_list = first_fp;
                if (status == -2)
                        transport_err(dsfep->dsf_chan_obj_ptr);
                return 0;
        }
        /* Append fragment to xmitted list */
        *xmit_infop->last_msg = first_fp;
        xmit_infop->last_msg = &first_fp->b_next;
```

© COPYRIGHT 1994 AMDAHL CORPORATION

```
                        first_fp = hp;
                }
                hp = NULL;
                cur_frag_len = 0;
                cur_frg_no--;
        }       /* while (cur_frg_no > 0) */

        /* Send final fragment */
        xmit_infop->fragp = NULL;
        status = send_frag(dsfep, first_fp);
        if (status < 0) {
                first_fp->b_next = xmit_infop->to_send_list;
                xmit_infop->to_send_list = first_fp;
                if (status == -2)
                        transport_err(dsfep->dsf_chan_obj_ptr);
                return 0;
        }

        /*
         * All fragments have been sent. Adjust window, and move message to
         * list of transmitted messages.
         */
        /* Append fragment to xmitted list */
        *xmit_infop->last_msg = first_fp;
        xmit_infop->last_msg = &first_fp->b_next;

        /*
         * The header of the total message is appended to the xmitted list so
         * we know about the length of the total message. It will be used for
         * window updates, in case of ACKs and re-transmissions.
         */
        tmp = xmit_infop->to_send_list;
        *(xmit_infop->last_msg) = tmp;
        xmit_infop->to_send_list = tmp->b_next;
        xmit_infop->last_msg = &tmp->b_next;
        tmp->b_next = NULL;
        freemsg(tmp->b_cont);           /* Don't need those around */
        tmp->b_cont = NULL;
        msg_header->fragm = 0;          /* Clear the fragment flag to indicate, all
                                         * fragments are created. */
        if (prio == dsfep->priority) {
                dsfep->dsf_rinfo.send_info.non_acked_bytes += tmp->b_pad2;
                if ((dsfep->dsf_rinfo.send_info.cur_window -= tmp->b_pad2) <= 0)
                        dsfep->dsf_rinfo.send_info.state = BLOCKED;
        }
```

© COPYRIGHT 1994 AMDAHL CORPORATION

```
        return 1;
}

/*
 * frag_no - Returns the number of fragments necessary to transmit the message
 *          of length msg_size.
 */

STATIC int frag_no(msg_size, max_fragm)
        register int msg_size, max_fragm;

{
        register int result;

        msg_size -= sizeof(struct dsf_msg_header);
        max_fragm -= sizeof(struct dsf_msg_header);
        result = msg_size / max_fragm;
        if (msg_size % max_fragm != 0)
                result++;
        return result;
}

/*
 * send_data_msg - Send a data message to remote stream. This function prepends
 *               the dsf_header and the headers for the message buffers.
 *               M_DATA messages that are split across multiple blocks
 *               are combined, when the resulting message block is less than
 *               4K bytes.
 *               In case of resource failure, the message is put back to the
 *               message queue or if only the dupb() failed at the end
 *               of the to_send_list for this priority.
 *               Returns 1, if successful, 0 otherwise.
 *
 *               Note: This routine has to be called with interrupts
 *                     disabled.
 */

#define MAX_MDATA_BLOCK 4096

STATIC int send_data_msg(dsfep, q, mp, prio)
        struct dsf_element *dsfep;
        queue_t *q;
        mblk_t *mp;
        int prio;
```

© COPYRIGHT 1994 AMDAHL CORPORATION

```
{
	register mblk_t *tmp, *header;
	register int header_size;
	register int mdata_msg = (mp->b_datap->db_type == M_DATA);
	register int bsize;
	register int offset;
	struct dsf_msg_header *dsf_msg_header;
	register struct msg_buff *msg_buff_ptr;
	register mblk_t *dp;

	/* Determine size of header */

	header_size = sizeof(struct dsf_msg_header) + sizeof(struct msg_buff);
	if (mdata_msg == 0)
		for (tmp = mp->b_cont; tmp != NULL; tmp = tmp->b_cont)
			header_size += sizeof(struct msg_buff);
	else {
		bsize = mp->b_wptr - mp->b_rptr;
		for (tmp = mp->b_cont; tmp != NULL; tmp = tmp->b_cont) {
			/* Can we continue merging? */
			if ((bsize += (tmp->b_wptr - tmp->b_rptr)) <= MAX_MDATA_BLOCK)
				continue;
			else {
				/* Start new block */
				header_size += sizeof(struct msg_buff);
				bsize = tmp->b_wptr - tmp->b_rptr;
			}
		}
	}
	if ((header = allocb(header_size, BPRI_MED)) == NULL) {

		/*
		 * Allocation for header failed, put back to message queue
		 */
		if (dsfep->dsf_hbid == 0 &&
		    !(dsfep->dsf_hbid = bufcall(header_size, BPRI_MED, dsf_qenable,
				(long) dsfep))) {
			dsf_reg_chk_bufcalls(dsfep->dsf_chan_obj_ptr);
		}
		if (prio == DSF_HI_PRI) {
			/* Can't put high priority messages on queue */
			if (dsfep->dsf_rhipri_ml == NULL)
				dsfep->dsf_rinfo.send_info.n_send_list++;
			mp->b_next = dsfep->dsf_rhipri_ml;
			dsfep->dsf_rhipri_ml = mp;
```

© COPYRIGHT 1994 AMDAHL CORPORATION

```
		} else
			putbq(q, mp);
		return 0;
	}
	header->b_wptr += header_size;
	header->b_cont = mp;
	header->b_pad2 = mp->b_pad2;	/* Pass length along */

	/* Fill out the fields in the header */

	dsf_msg_header = (struct dsf_msg_header *) header->b_rptr;
	dsf_msg_header->type = DSF_DATA;
	dsf_msg_header->priority = prio;
	if (prio > dsfep->priority || (dsfep->dsf_rinfo.send_info.non_acked_bytes
			< ack_req_thresh && dsfep->dsf_rinfo.send_info.non_acked_bytes +
			mp->b_pad2 >= ack_req_thresh))
		dsf_msg_header->ack_req = 1;
	else
		dsf_msg_header->ack_req = 0;
	dsf_msg_header->fragm = 0;
	dsf_msg_header->len = header_size + mp->b_pad2;
	dsf_msg_header->src_id = (int) dsfep;
	dsf_msg_header->dest_id = dsfep->dsf_rinfo.remote_queue_id;
	dsf_msg_header->seq = dsfep->dsf_rinfo.send_info.xmit_info[prio].cur_seq++;

	msg_buff_ptr = (struct msg_buff *) (dsf_msg_header + 1);
	offset = header_size - sizeof(struct dsf_msg_header);

	/* The first block's type, band, and flag apply to all */
	msg_buff_ptr->offset = mp->b_rptr - mp->b_datap->db_base;
	msg_buff_ptr->flag = mp->b_flag;
	msg_buff_ptr->band = mp->b_band;
	msg_buff_ptr->type = mp->b_datap->db_type;
	msg_buff_ptr->dataoffset = offset;

	bsize = mp->b_wptr - mp->b_rptr;

	for (tmp = mp->b_cont; tmp != NULL; tmp = tmp->b_cont) {
		if (mdata_msg == 0 || bsize + (tmp->b_rptr - tmp->b_wptr) >
			MAX_MDATA_BLOCK) {
			msg_buff_ptr->length = bsize;
			msg_buff_ptr->cont = 1;
			offset += (bsize - sizeof(struct msg_buff));
			msg_buff_ptr++;
			msg_buff_ptr->offset = 0;
```

© COPYRIGHT 1994 AMDAHL CORPORATION

```
                msg_buff_ptr->flag = tmp->b_flag;
                msg_buff_ptr->band = tmp->b_band;
                msg_buff_ptr->type = tmp->b_datap->db_type;
                msg_buff_ptr->dataoffset = offset;
                bsize = tmp->b_wptr - tmp->b_rptr;
        } else
                bsize += (tmp->b_wptr - tmp->b_rptr);
}
msg_buff_ptr->length = bsize;
msg_buff_ptr->cont = 0;

/* Now check whether message has to be fragmented */
if (dsf_msg_header->len > dsfep->dsf_chan_obj_ptr->io_state.max_msg_size) {
        /* Send list is NULL when send_data_msg is called */
        dsf_msg_header->fragm = frag_no(dsf_msg_header->len,
            dsfep->dsf_chan_obj_ptr->io_state.max_msg_size);
        dsfep->dsf_rinfo.send_info.xmit_info[prio].to_send_list = header;
        if (fragment_dmsg(dsfep, prio))
                return 1;
        else {
                dsfep->dsf_rinfo.send_info.n_send_list++;
                return 0;
        }
}
/* No fragmentation needed */
if ((dp = dupb(header)) == NULL) {

        /*
         * No resource to send message Put messages on to_send list
         * and do a bufcall to restart_queue once the resource is
         * available.
         */
        dsf_dup_bufcall(dsfep);
        /* Send list is NULL when send_data_msg is called */
        dsfep->dsf_rinfo.send_info.n_send_list++;
        dsfep->dsf_rinfo.send_info.xmit_info[prio].to_send_list = header;
        return 0;
} else {
        dp->b_cont = header->b_cont;
        if (m_write_msg(dsfep->dsf_chan_obj_ptr, dp, prio, dsf_msg_header->len)
            < 0) {
                freeb(dp);

                /*
                 * Send list is NULL when send_data_msg is called
```

© COPYRIGHT 1994 AMDAHL CORPORATION

```
                        */
                        dsfep->dsf_rinfo.send_info.n_send_list++;
                        dsfep->dsf_rinfo.send_info.xmit_info[prio].to_send_list = header;
                        transport_err(dsfep->dsf_chan_obj_ptr);
                        return 0;
                } else {
                        *dsfep->dsf_rinfo.send_info.xmit_info[prio].last_msg = header;
                        dsfep->dsf_rinfo.send_info.xmit_info[prio].last_msg =
                            &header->b_next;
                        if (prio == dsfep->priority) {
                                dsfep->dsf_rinfo.send_info.non_acked_bytes += header->b_pad2;
                                if ((dsfep->dsf_rinfo.send_info.cur_window -= header->b_pad2) <=
0)
                                        dsfep->dsf_rinfo.send_info.state = BLOCKED;
                        }

#ifdef ITRACE
                        if (itrace_on) {
                                ENTER_ITRACE_EVENT(dsfep, dsf_msg_header->seq, DATA, 1, prio,
                                    dsf_msg_header->len, dsf_msg_header->fragm);
                        }
#endif

                        return 1;
                }
        }
}

/*
 * strrput - Stream read put procedure.  Called from downstream driver/module
 *         with messages for the remote stream. If the message cannot be
 *          sent up, it will be kept in the queue.
 */

STATIC int strrput(q, bp)
        register queue_t *q;
        register mblk_t *bp;

{
        register struct dsf_element *dsfep;
        volatile short s;
        register struct iocblk *iocbp;
        register struct stdata *stp;

        switch (bp->b_datap->db_type) {
```

© COPYRIGHT 1994 AMDAHL CORPORATION

```
default:
        /* Most messages just forward without looking */
        break;
case M_HANGUP:
        /* Wakeup sleeping processes and forward message */
        s = splstr();
        stp = (struct stdata *) q->q_ptr;
        stp->sd_werror = ENXIO;
        stp->sd_flag |= STRHUP;
        fsplx(s);
        wakeprocs((caddr_t) stp, PRMPT);        /* the ioctllers */
        break;
case M_FLUSH:
        /* Flush read queue only and forward message */

        /*
         * Flush queues. The indication of which queues to flush is
         * in the first byte of the message. If the read queue is
         * specified, then flush it. If FLUSHBAND is set, just flush
         * the band specified by the second byte of the message.
         */
        {
                register mblk_t *mp;
                register mblk_t *nmp;
                mblk_t *last;
                int backenable = 0;
                int band;
                queue_t *nq;
                unsigned char pri, i, bpri;
                qband_t *qbp;

                s = splstr();
                stp = (struct stdata *) q->q_ptr;

                if (*bp->b_rptr & FLUSHR) {
                        if (*bp->b_rptr & FLUSHBAND) {
                                ASSERT((bp->b_wptr - bp->b_rptr) >= 2);
                                pri = *(bp->b_rptr + 1);
                                if (pri > q->q_nband)
                                        goto wrapflush;
                                if (pri == 0) {
                                        mp = q->q_first;
                                        q->q_first = NULL;
                                        q->q_last = NULL;
                                        q->q_count = 0;
```

© COPYRIGHT 1994 AMDAHL CORPORATION

```
		for (qbp = q->q_bandp; qbp; qbp = qbp->qb_next) {
			qbp->qb_first = NULL;
			qbp->qb_last = NULL;
			qbp->qb_count = 0;
			qbp->qb_flag &= ~QB_FULL;
		}
		q->q_blocked = 0;
		q->q_flag &= ~QFULL;
		while (mp) {
			nmp = mp->b_next;
			if (mp->b_band == 0) {
				freemsg(mp);
			} else {
				putq(q, mp);
			}
			mp = nmp;
		}
		if ((q->q_flag & QWANTW) &&
		    (q->q_count <= q->q_lowat)) {

			/*
			 * find nearest back
			 * queue with service
			 * proc
			 */
			q->q_flag &= ~QWANTW;
			for (nq = backq(q); nq &&
!nq->q_qinfo->qi_srvp;
			    nq = backq(nq));
			if (nq) {
				qenable(nq);
				setqback(nq, 0);
			}
		}
	} else {		/* pri != 0 */
		band = pri;
		qbp = q->q_bandp;
		while (--band > 0)
			qbp = qbp->qb_next;
		mp = qbp->qb_first;
		if (mp == NULL)
			goto wrapflush;
		last = qbp->qb_last;
		if (mp == last)		/* only message in band */
			last = mp->b_next;
```

© COPYRIGHT 1994 AMDAHL CORPORATION

```
                        while (mp != last) {
                                nmp = mp->b_next;
                                if (mp->b_band == pri) {
                                        rmvq(q, mp);
                                        freemsg(mp);
                                }
                                mp = nmp;
                        }
                        if (mp && mp->b_band == pri) {
                                rmvq(q, mp);
                                freemsg(mp);
                        }
                }
        } else {        /* flush entire queue */
                mp = q->q_first;
                q->q_first = NULL;
                q->q_last = NULL;
                q->q_count = 0;
                stp->sd_flag &= ~STRPRI;
                for (qbp = q->q_bandp; qbp; qbp = qbp->qb_next) {
                        qbp->qb_first = NULL;
                        qbp->qb_last = NULL;
                        qbp->qb_count = 0;
                        qbp->qb_flag &= ~QB_FULL;
                }
                q->q_blocked = 0;
                q->q_flag &= ~QFULL;
                while (mp) {
                        nmp = mp->b_next;
                        freemsg(mp);
                        mp = nmp;
                }
                bzero((caddr_t) qbf, NBAND);
                bpri = 1;
                for (qbp = q->q_bandp; qbp; qbp = qbp->qb_next) {
                        if ((qbp->qb_flag & QB_WANTW) &&
                             (qbp->qb_count <= qbp->qb_lowat)) {
                                qbp->qb_flag &= ~QB_WANTW;
                                backenable = 1;
                                qbf[bpri] = 1;
                        }
                        bpri++;
                }
                if ((q->q_flag & QWANTW) && (q->q_count <=
q->q_lowat)) {
```

© COPYRIGHT 1994 AMDAHL CORPORATION

```
                                        q->q_flag &= ~QWANTW;
                                        backenable = 1;
                                        qbf[0] = 1;
                                }

                                /*
                                 * If any band can now be written to,
                                 * and there is a writer for that
                                 * band, then backenable the closest
                                 * service procedure.
                                 */
                                if (backenable) {

                                        /*
                                         * find nearest back queue
                                         * with service proc
                                         */
                                        for (nq = backq(q); nq && !nq->q_qinfo->qi_srvp;
                                             nq = backq(nq));
                                        if (nq) {
                                                qenable(nq);
                                                for (i = 0; i < bpri; i++)
                                                        if (qbf[i])
                                                                setqback(nq, i);
                                        }
                                }
                        }
                }
wrapflush:
                fsplx(s);
        }
        break;  /* Forward message */
case M_IOCACK:
case M_IOCNAK:
        /* Check for link and unlink messages */
        /* User level tasks are waiting for those ioctls */

        /*
         * Free credentials for other ioctls, if the ids match
         */
        iocbp = (struct iocblk *) bp->b_rptr;

        /*
         * If not waiting for ACK or NAK then just forward msg. If
         * already have ACK or NAK for user then just forward msg. If
```

© COPYRIGHT 1994 AMDAHL CORPORATION

```
             * incorrect id sequence number then just forward msg.
             */
            s = splstr();
            stp = (struct stdata *) q->q_ptr;
            if ((stp->sd_flag & IOCWAIT) == 0 || stp->sd_iocblk ||
                (stp->sd_iocid != iocbp->ioc_id)) {
                    dsfep = stp->sd_dsf_el;

                    /*
                     * Non link or unlink ioctl, can credentials be
                     * freed?
                     */
                    if (iocbp->ioc_id == dsfep->ioc_id) {
                            freemsg(dsfep->ioc_cr);
                            dsfep->ioc_id = 0;
                            dsfep->ioc_cr = NULL;
                    }
                    fsplx(s);
                    break;
            }

            /*
             * Assign ACK or NAK to user and wake up.
             */
            stp->sd_iocblk = bp;
            fsplx(s);
            wakeprocs((caddr_t) stp, PRMPT);
            return; /* Do not forward message */
    }

    bp->b_pad2 = dsf_msg_length(bp);    /* Save message length */
    dsfep = ((struct stdata *) q->q_ptr)->sd_dsf_el;
    if (dsfep->dsf_rinfo.remote_queue_id == 0) {
            /* During open */
            putq(q, bp);
            return 0;
    }
    s = splstr();
    /* Get priority of message */
    /* High priority messages are sent into closed windows */
    if (queclass(bp) == QPCTL) {
            if (dsfep->dsf_rhipri_ml != NULL ||
                dsfep->dsf_rinfo.send_info.xmit_info[DSF_HI_PRI].to_send_list) {
                    if (dsfep->dsf_rhipri_ml == NULL)
                            dsfep->dsf_rinfo.send_info.n_send_list++;
```

© COPYRIGHT 1994 AMDAHL CORPORATION

```
                        append_mp(&dsfep->dsf_rhipri_ml, bp);
                } else
                        send_data_msg(dsfep, q, bp, DSF_HI_PRI);
                fsplx(s);
                return 0;
        } else if (dsfep->priority == DSF_NORMAL_PRI && bp->b_band != 0) {
                if (q->q_first != NULL && q->q_first->b_band > 0 ||
                    dsfep->dsf_rinfo.send_info.xmit_info[DSF_BAND_PRI].to_send_list)
                        putq(q, bp);
                else
                        send_data_msg(dsfep, q, bp, DSF_BAND_PRI);
                fsplx(s);
                return 0;
        }
        /* Check whether window is open */

        if (q->q_first != NULL || dsfep->dsf_rinfo.send_info.state != FLOWING ||
            dsfep->dsf_rinfo.send_info.xmit_info[dsfep->priority].to_send_list) {

                /*
                 * A message is already stored on queue or window is closed
                 */
                putq(q, bp);
                fsplx(s);
                return 0;
        }
        /* Message can be sent */
        send_data_msg(dsfep, q, bp, dsfep->priority);
        fsplx(s);
        return 0;
}

/*
 * strrsrv - Service routine for the remote streams read queue head.
 */

STATIC int strrsrv(q)
        register queue_t *q;

{
        register struct stdata *stp = (struct stdata *) q->q_ptr;
        register mblk_t *mp;
        register int state;
        volatile short s;
        register struct dsf_element *dsfep = stp->sd_dsf_el;
```

© COPYRIGHT 1994 AMDAHL CORPORATION

```
	register struct send_queue_info *send_infop;

	if (dsfep == NULL)
		return 0;
	send_infop = &dsfep->dsf_rinfo.send_info;
	s = splstr();
	if ((state = send_infop->state) == FLOWING || state == NO_MEM) {
		/* Check for elements in the to_send_list s */
		if (send_infop->n_send_list) {
			clear_to_send_lists(dsfep);
			if (send_infop->state != FLOWING) {
				fsplx(s);
				return 0;
			}
		}
		while ((mp = getq(q)) != NULL) {
			register int priority;

			priority = (dsfep->priority == DSF_BAND_PRI ||
			     mp->b_band ? DSF_BAND_PRI : DSF_NORMAL_PRI);
			if (!send_data_msg(dsfep, q, mp, priority) ||
			     send_infop->state != FLOWING) {
				fsplx(s);
				return 0;
			}
		}
	}
	fsplx(s);
	return 0;
}

/*
 * upd_xmit_info - Frees acked messages
 */

STATIC int upd_xmit_info(dsfep, ack, priority)
	register struct dsf_element *dsfep;
	register uint ack;
	int priority;

{
	register struct xmit_info *xmit_info = &dsfep->dsf_rinfo.send_info.
		xmit_info[priority];
	register uint seq = xmit_info->acked;
	register int acked_bytes = 0;
```

© COPYRIGHT 1994 AMDAHL CORPORATION

```
	if (ack < seq)
		/* Wrap around ? */
		if ((uint) (seq - ack) < (uint) 0x8fffffff)
			return 0;

	while (seq != ack) {
		register mblk_t *tmp_mp;
		register mblk_t *mp;

		if ((mp = xmit_info->xmit_msg) == NULL) {
			cmn_err(CE_NOTE, "Ack seq number disagreement %x ack:%d seq:%d",
			     dsfep, ack, seq);
			ack = seq; /* Do not ack future */
			break;
		}
		if (((struct dsf_msg_header *) mp->b_rptr)->fragm == 0) {

			/*
			 * Only update acked bytes and sequence for complete
			 * messages
			 */
			acked_bytes += mp->b_pad2;		/* Length of data is kept here */
			seq++;
		}
		tmp_mp = mp->b_next;
		freemsg(mp);
		xmit_info->xmit_msg = tmp_mp;
	}
	xmit_info->acked = ack;
	if (xmit_info->xmit_msg == NULL)
		xmit_info->last_msg = &xmit_info->xmit_msg;

	if (priority == dsfep->priority)
		dsfep->dsf_rinfo.send_info.non_acked_bytes -= acked_bytes;
	return 1;
}

/*
 * process_ack - Process an ACK for the queue of id dest.
 */

STATIC void process_ack(dsf_msgp)
	struct dsf_msg *dsf_msgp;

{
```

© COPYRIGHT 1994 AMDAHL CORPORATION

```
        register struct r_ack_msg *ack_msg;
        register struct dsf_element *dsfep;
        volatile short s;
        register int window;
        register mblk_t *mp;

        dsfep = (struct dsf_element *) dsf_msgp->header.dest_id;
        ack_msg = &dsf_msgp->body.admin_msg.r_ack_msg;

#ifdef ITRACE
        if (itrace_on) {
                ENTER_ITRACE_EVENT(dsfep, ack_msg->ack_seq, ACK, 0, ack_msg->priority,
                    ack_msg->window_size, 0);
        }
#endif

        if (dsf_msgp->header.ack_req)
                send_ack(dsfep, ack_msg->priority);
        s = splstr();

        /* First remove all the acked messages */
        if (!upd_xmit_info(dsfep, ack_msg->ack_seq, ack_msg->priority)) {
                fsplx(s);
                return;
        }

        /*
         * Adjust window by number of bytes already sent, but not acked
         */
        if (dsfep->priority == ack_msg->priority) {
                window = ack_msg->window_size - dsfep->dsf_rinfo.send_info.non_acked_bytes;
                if ((dsfep->dsf_rinfo.send_info.cur_window = window) <= 0) {
                        dsfep->dsf_rinfo.send_info.state = BLOCKED;
                        noenable(RD(dsfep->dsf_wrq));
                } else if (dsfep->dsf_rinfo.send_info.state == BLOCKED) {
                        register queue_t *rq = RD(dsfep->dsf_wrq);

                        dsfep->dsf_rinfo.send_info.state = FLOWING;
                        enableok(rq);
                        qenable(rq);
                }
        }
        fsplx(s);
}
```

© COPYRIGHT 1994 AMDAHL CORPORATION

```
/*
 * resend_msgs - Retransmits all non-acked messages until window is full.
 *              In case of memory resource problems, messages not sent are
 *               put into the to_send_list. The return value is the remaining
 *               window size.
 *              NOTE: Interrupts have to be disabled.
 */

STATIC void resend_msgs(dsfep, priority)
        struct dsf_element *dsfep;
        int priority;

{
        register mblk_t *mp;
        register struct xmit_info *xmit_infop =
        &dsfep->dsf_rinfo.send_info.xmit_info[priority];

        if ((mp = xmit_infop->xmit_msg) != NULL) {
                if ((*xmit_infop->last_msg = xmit_infop->to_send_list) == NULL)
                        dsfep->dsf_rinfo.send_info.n_send_list++;
                xmit_infop->to_send_list = mp;
                xmit_infop->xmit_msg = NULL;
                xmit_infop->last_msg = &xmit_infop->xmit_msg;
        }
        clear_to_send_lists(dsfep);
}

/*
 * process_nak - Message with sequence number nak_seq has to be retransmitted,
 *               messages with lower sequence numbers are acked. Retransmit
 *               only as many messages as the new window allows. Other messages
 *               will be put back onto the queue.
 */

STATIC void process_nak(dsf_msgp)
        struct dsf_msg *dsf_msgp;

{
        register struct r_nak_msg *nak_msg;
        register struct dsf_element *dsfep;
        register int window;
        register int s;
        int old_state;

        dsfep = (struct dsf_element *) dsf_msgp->header.dest_id;
```

© COPYRIGHT 1994 AMDAHL CORPORATION

```
	nak_msg = &dsf_msgp->body.admin_msg.r_nak_msg;

#ifdef ITRACE
	if (itrace_on) {
		ENTER_ITRACE_EVENT(dsfep, nak_msg->nak_seq, NAK, 0, nak_msg->priority,
		    nak_msg->window_size, 0);
	}
#endif

	if (dsf_msgp->header.ack_req)
		send_ack(dsfep, nak_msg->priority);

	s = splstr();

	old_state = dsfep->dsf_rinfo.send_info.state;
	if (!upd_xmit_info(dsfep, nak_msg->nak_seq, nak_msg->priority)) {
		splx(s);
		cmn_err(CE_WARN, "NAK seq smaller than ACKed seq");
		return;
	}
	if (nak_msg->priority == dsfep->priority) {
		dsfep->dsf_rinfo.send_info.non_acked_bytes = 0;
		dsfep->dsf_rinfo.send_info.cur_window = nak_msg->window_size;
	}

	/* Resend all non-acked messages of this priority */
	resend_msgs(dsfep, nak_msg->priority);
	if (old_state == BLOCKED && dsfep->dsf_rinfo.send_info.state == FLOWING) {
		register queue_t *rq = RD(dsfep->dsf_wrq);

		enableok(rq);
		if (rq->q_first)
			qenable(rq);
	}
	splx(s);
}

/*
 * dsf_msg_length - Determines the length of a message as used by dsf (different
 *		msgdsize
 */

STATIC int dsf_msg_length(mp)
	register mblk_t *mp;
```

© COPYRIGHT 1994 AMDAHL CORPORATION

```
{
        register int len = 0;

        while (mp != NULL) {
                len += (mp->b_wptr - mp->b_rptr);
                mp = mp->b_cont;
        }
        return len;
}
```

© COPYRIGHT 1994 AMDAHL CORPORATION

```
#ident "%W% %G% %U% %n%"
/* %N% */
/* File: close.c - last edit:
 * helge        Wed Mar 10 13:18:20 1993
 *
 * Copyright (c) 1991 by Amdahl Corporation. All rights reserved.
 * Copyright (c) 1993 by Amdahl Corporation. All rights reserved.
 */

#include <sys/cred.h>
#include <sys/ddi.h>
#include <sys/errno.h>
#include <sys/file.h>
#include <sys/lstream.h>
#include <sys/param.h>
#include <sys/strsubr.h>
#include <sys/vnode.h>
#include <spl.h>

/*
 * closevp - Close a vnode, call strclose in case the reference count goes to
 *          zero. Deallocate temporary vnodes after closing.
 */

int closevp(vp, cred)
   struct vnode *vp;
   struct cred *cred;
{
   register int s;

   if (vp == NULL || (vp->v_type & VNODE_MARK) != VNODE_MARK) {
      set_uerror(EINVAL);
      return -1;
   }
   if (vp->v_count == 0)
      return 0;

   if (vp->v_count == 1)
      strclose(vp, vp->flag, cred);
   s = splstr();
   --vp->v_count;
   if (vp->v_count == 0 && vp->v_type == VTEMP)
      delete_vnode(vp);
   splx(s);
   return 0;
```

© COPYRIGHT 1994 AMDAHL CORPORATION

```
}

/*
 * close - Gets called to close a locally opened stream.
 */

int close(fd)
    int fd;
{
    register struct stdata *stp;

    if (fd < 0 || fd >= MAX_FD || (stp = lstr_fd[fd].stp) == NULL) {
        set_uerror(EINVAL);
        return -1;
    }
    lstr_fd[fd].stp = NULL;
    return closevp(stp->sd_vnode, &loc_cred);
}
```

© COPYRIGHT 1994 AMDAHL CORPORATION

```
/* File: confmgr.c - last edit:
 * helge        Wed Mar 11 21:26:20 1992
 *
 * Copyright (c) 1991 by Amdahl Corporation. All rights reserved.
 */

#include <sys/conf.h>
#include <sys/devlist.h>
#include <sys/kmem.h>
#include <sys/param.h>
#include <sys/sysmacros.h>
#include <sys/vnode.h>

#define FNAMESIZE 32

struct fnode {
   char fname[FNAMESIZE]; /* Unique name to identify device */
   dev_t device; /* Device number asociated with name */
   struct fnode *next_fnode; /* Hash table link */
};

#define HTBL_SIZE 32

static struct fnode *fn_htbl[HTBL_SIZE];

int nstrpush = 8;        /* maxmimum number of pushes allowed */
int strmsgsz = 4096;     /* maximum stream message size */
int strctlsz = 2048;     /* maximum size of ctl part of message */
long strthresh = 0;      /* Strcount threshold above which */
                         /* some Streams operations will be stopped */
int ngroups_max = NGROUPS_UMAX; /* Size of cr_groups[] array in cred struct */

/*
 * conf_major - Finds an entry in cdevsw by name and returns the index
 *              (major device number)
 */

int conf_major(name)
   char *name;
{
   register int i;

   for (i = 0; i < cdevcnt; i++)
      if (strcmp(cdevsw[i].driver_name, name) == 0)
         return i;
```

© COPYRIGHT 1994 AMDAHL CORPORATION

```
   return NODEV;
}

/* Calculates a hash value for fn_htbl */

static unsigned hash(s)
   char *s;
{
   unsigned h = 0, g;

   while (*s != '\0') {
      h = (h << 4) + *s++;
      if ((g = h & 0xf0000000) != 0) {
         h ^= (g >> 24);
         h ^= g;
      }
  }
  return h % HTBL_SIZE;
}

/*
 * enter_fnode - Enter entry into fn_htbl. Returns -1, if entry already
 *               exists.
 */

static int enter_fnode(name, dev)
   char *name;
   dev_t dev;
{
   unsigned h;
   register struct fnode *fnode;

   h = hash(name);
   fnode = fn_htbl[h];
   while (fnode != NULL) {
      if (strcmp(name, fnode->fname) == 0)
         return -1; /* Entry exists */
      fnode = fnode->next_fnode;
   }
   if((fnode = (struct fnode *)kmem_alloc(sizeof(struct fnode), KM_NOSLEEP))
        == NULL)
      return -1;
   strcpy(fnode->fname, name);
   fnode->device = dev;
   fnode->next_fnode = fn_htbl[h];
```

© COPYRIGHT 1994 AMDAHL CORPORATION

```
    fn_htbl[h] = fnode;
    return 0;
}

/*
 * get_dev - Finds the entry of a device name in fn_htbl, and returns
 *           the associated device number.
 */
dev_t get_dev(dev_name)
    char *dev_name;
{
    register struct fnode *fnode;

    fnode = fn_htbl[hash(dev_name)];
    while (fnode != NULL) {
        if (strcmp(dev_name, fnode->fname) == 0)
            return fnode->device;
        fnode = fnode->next_fnode;
    }
    return NODEV;
}

static int ctonum(input, endptr)
    char *input;
    char **endptr;
{
    int result = 0;
    while (*input == ' ' || *input == '\t')
        input++;
    while (*input != '\0') {
        if ('0' <= *input && *input <= '9')
            result = 10 * result + (*input - '0');
        else
            break;
        input++;
    }
    *endptr = input;
    return result;
}

/*
 * fnode_desired - Check whether an 'f' appears next in the string.
 *
 */
```

© COPYRIGHT 1994 AMDAHL CORPORATION

```
static int fnode_desired(s)
   char *s;
{
   while (*s != '\0' && (*s == ' ' || *s == '\t'))
      s++;
   return (*s == 'f');
}

/*
 * configure - Translate the information in 'devicelist' into entries in the
 *             fnode and vnode tables. In case the devicelist contains an
 *             invalid entry that index is returned otherwise length.
 */

int configure(devicelist, length)
   struct devicelist *devicelist;
   int length;
{
   register int index;
   register int clone_major = conf_major("clone");
   dev_t dev;

   for (index = 0; index < length; index++) {
      if (strncmp(devicelist[index].directive, "-1", 2) == 0) {
         /* Clone device */
         if (clone_major == NODEV ||
               (dev = conf_major(devicelist[index].dev_name)) == NODEV)
            return index;
         dev = makedevice(clone_major, dev);
         if (enter_vnode(dev, VPERM) == NULL)
            return index;
         if (fnode_desired(&devicelist[index].directive[2]) &&
               enter_fnode(devicelist[index].dev_name, dev) < 0)
            return index;
      } else {
         /*
          * Enter vnode (and possibly fnode) for every minor device num in
          * range
          */
         char base_name[FNAMESIZE];
         char dev_name[FNAMESIZE];
         int low_minor, high_minor;
         int major_dev, minor;
         char *end;
         int fnodep;
```

4.0

© COPYRIGHT 1994 AMDAHL CORPORATION

```
            strcpy(base_name, devicelist[index].dev_name);
            if ((major_dev = conf_major(base_name)) == NODEV)
               return index;
            low_minor = ctonum(devicelist[index].directive, &end);
            while (*end == '-' || *end == ' ' || *end == '\t')
               end++;
            if (*end == '\0')
               high_minor = low_minor;
            else
               high_minor = ctonum(end, &end);
            fnodep = fnode_desired(end);
            for (minor = low_minor; minor <= high_minor; minor++) {
               dev = makedevice(major_dev, minor);
               if (enter_vnode(dev, VPERM) == NULL)
                  return index;
               if (fnodep) {
                  sprintf(dev_name, "%s%d", base_name, minor);
                  if (enter_fnode(dev_name, dev) < 0)
                    return index;
               }
            }
         }
      }
   return index;
}

/*
 * init_conf - Needs to be called at initialization time to clear hash table
 */

void init_conf()
{
   bzero(fn_htbl, sizeof(fn_htbl));
}
```

© COPYRIGHT 1994 AMDAHL CORPORATION

```
#ident "%W% %G% %U% %n%"
/* %N% */
/* File: driver.c - last edit:
 * helge        Wed Mar 10 13:18:07 1993
 *
 * Copyright (c) 1991 by Amdahl Corporation. All rights reserved.
 * Copyright (c) 1993 by Amdahl Corporation. All rights reserved.
 */

#include <sys/cred.h>
#include <sys/dsf.h>
#include <sys/errno.h>
#include <sys/kmem.h>
#include <sys/param.h>
#include <sys/stropts.h>
#include <sys/strsubr.h>
#include <sys/vnode.h>
#include <spl.h>


/*
 * link_drs - Link a lower driver to a multiplexer.
 */

int link_drvs(upper_vp, cmd, lower_vp, crp, upper_linkid, lower_linkidp)
    struct vnode *upper_vp;
    int cmd;
    struct vnode *lower_vp;
    struct cred *crp;
    int upper_linkid;
    int *lower_linkidp;
{
    struct linkinfo *linkp;
    struct stdata *stpdown;
    queue_t *rq;
    struct stdata *stp;
    struct strioctl strioc;
    register int s;
    register int error;
    struct linkblk prv_linkblk;

    /*
     * Check whether vnode pointers point to real open vnodes
     */
```

© COPYRIGHT 1994 AMDAHL CORPORATION

```
if (upper_vp == NULL || (upper_vp->v_type & VNODE_MARK) != VNODE_MARK ||
    upper_vp->v_count == 0
    || (stp = upper_vp->v_stream) == NULL
    || lower_vp == NULL
    || (lower_vp->v_type & VNODE_MARK) != VNODE_MARK
    || lower_vp->v_count == 0) {
   return (EINVAL);
}

/*
 * Test for invalid upper stream
 */
if (stp->sd_flag & STRHUP)
     return (ENXIO);
if (!stp->sd_strtab->st_muxwinit)
     return (EINVAL);

/*
 * Test for invalid lower stream.
 */
if (((stpdown = lower_vp->v_stream) == NULL) ||
       (stpdown == stp) || (stpdown->sd_flag &
       (STPLEX | STRHUP | STRDERR | STWRERR | IOCWAIT)) ||
       linkcycle(stp, stpdown))
     return (EINVAL);
if (cmd == I_PLINK)
     rq = NULL;
else
     rq = getendq(stp->sd_wrq);
if (!(linkp = alloclink(rq, stpdown->sd_wrq, lower_vp)))
     return (EAGAIN);

/* Copy linkblock into private linkblock to replace local link id with
 * link id of the host.
 */
bcopy((char *)linkp, (char *)&prv_linkblk, sizeof(struct linkblk));
prv_linkblk.l_index = upper_linkid;
linkp->li_lblk.l_rem_linkid = upper_linkid; /* Save it for munlink() here */

strioc.ic_cmd = cmd;
strioc.ic_timout = 0;
strioc.ic_len = sizeof(struct linkblk);
strioc.ic_dp = (char *) &prv_linkblk;

/* Set up queues for link */
```

© COPYRIGHT 1994 AMDAHL CORPORATION

```
    rq = RD(stpdown->sd_wrq);
    setq(rq, stp->sd_strtab->st_muxrinit, stp->sd_strtab->st_muxwinit);
    rq->q_ptr = WR(rq)->q_ptr = NULL;
    rq->q_flag |= QWANTR;
    WR(rq)->q_flag |= QWANTR;

    if (error = strdoioctl(stp, &strioc, NULL, STRLINK, crp, lower_linkidp)) {
        lbfree(linkp);
        setq(rq, lower_vp->strhinfo->st_rdinit, lower_vp->strhinfo->st_wrinit);
        rq->q_ptr = WR(rq)->q_ptr = (caddr_t) stpdown;
        return (error);
    }
    s = splstr();
    stpdown->sd_flag |= STPLEX;
    stpdown->sd_vnode->v_count++;
    if (error = mux_addedge(stp, stpdown, linkp->li_lblk.l_index)) {
        int type;

        if (cmd == I_LINK) {
            type = LINKIOCTL | LINKNORMAL;
            strioc.ic_cmd = I_UNLINK;
        } else {          /* I_PLINK */
            type = LINKIOCTL | LINKPERSIST;
            strioc.ic_cmd = I_PUNLINK;
        }
        splx(s);
        (void) munlink(stp, linkp, type, crp, lower_linkidp);
        return (error);
    }
    splx(s);

    /*
     * Wake up any other processes that may have been waiting on the
     * lower stream.  These will all error out.
     */
    wakeprocs((caddr_t) rq, PRMPT);
    wakeprocs((caddr_t) WR(rq), PRMPT);
    wakeprocs((caddr_t) stpdown, PRMPT);
    *lower_linkidp = linkp->li_lblk.l_index;
    return (0);
}

/*
 * unlink_drvs -  Unlink a multiplexor. If link_id is -1, unlink all links for
 *                which this is the controlling stream.  Otherwise, link_id is
```

© COPYRIGHT 1994 AMDAHL CORPORATION

```
 *              an index number for a link to be removed.
 */

int unlink_drvs(upper_vp, cmd, link_id, crp)
   struct vnode *upper_vp;
   int cmd;
   int link_id;
   struct cred *crp;
{
   struct stdata *stp;
   struct linkinfo *linkp;
   int type;
   int error;
   int rvalp;

   /*
    * Check whether vnode pointer points to real open vnode
    */

   if (upper_vp == NULL || (upper_vp->v_type & VNODE_MARK) != VNODE_MARK
        || upper_vp->v_count == 0
        || (stp = upper_vp->v_stream) == NULL) {
      return (EINVAL);
   }

   if (cmd == I_UNLINK)
        type = LINKIOCTL | LINKNORMAL;
   else /* I_PUNLINK */
        type = LINKIOCTL | LINKPERSIST;
   if (link_id == 0)
        return (EINVAL);
   if (link_id == MUXID_ALL)
        error = munlinkall(stp, type, crp, &rvalp);
   else {
        if (!(linkp = findlinks(stp, link_id, type))) {
           /* invalid user supplied index number */
           return (EINVAL);
        }
      error = munlink(stp, linkp, type, crp, &rvalp);
   }
   return (error);
}
```

© COPYRIGHT 1994 AMDAHL CORPORATION

```
#ident "%W% %G% %U% %n%"

/* File: supmisc.c - last edit:
 * helge       Fri May 28 14:24:37 1993
 *
 * Copyright (c) 1991 by Amdahl Corporation. All rights reserved.
 * Copyright (c) 1992 by Amdahl Corporation. All rights reserved.

 * Copyright (c) 1993 by Amdahl Corporation. All rights reserved.
 */

#include <vrtx.h>
#include <vrtxil.h>
#include <sys/proc.h>
#include <sys/stream.h>
#include <sys/strsubr.h>

#ifndef NULL
#define NULL 0
#endif


/*
 * init_task_procp - Put the VRTX TCB pointer into the proc structure of current
 *                   task and return the pointer to the proc structure
 */

proc_t *init_task_procp()
{
    int err;
    struct task_info task_info;
    register proc_t *pp;
    register TCB *tcbp;

    tcbp = (TCB *)sc_tinquiry((int *)&task_info, 0, &err);
    if (err != 0)
        return NULL;
    pp = *(PT_HASH(task_info.tid));

    while (pp != NULL) {
        if (pp->p_tid == task_info.tid) {
          pp->p_tcb = tcbp;
            return pp;
        }
        pp = pp->p_plink;
```

© COPYRIGHT 1994 AMDAHL CORPORATION

```
    }
    return NULL;
}

/*
 * get_proc_arg - Get the argument passed to the current task (has to have
 *                been created with fork_utask(). It returns 0, if the
 *                task was not created with fork_utask() (and no argument),
 *                1 otherwise.
 */

int get_proc_arg(arg_ptr)
    caddr_t *arg_ptr;
{
    register proc_t *pp = get_procp();

    if (pp == NULL)
        return 0; /* No proc structure found for task */
    *arg_ptr = pp->p_param;
    return 1;
}

/*
 * atox - translate a hex string to a hex number.
 */

uint atox(s)
    register char *s;
{
    register uint rval = 0;
    register char c;

    while ((c = *s++) != 0) {
        rval <<= 4;
        if (c >= '0' && c <= '9')
            rval += (c - '0');
        else if (c >= 'a' && c <= 'f')
            rval += (c - 'a' + 10);
        else if (c >= 'A' && c <= 'F')
            rval += (c - 'A' + 10);
        else
            return rval >> 4;
    }
    return rval;
}
```

© COPYRIGHT 1994 AMDAHL CORPORATION

```
/*
 * dsf_set_prio - Set the priority of a stream to DSF_BAND_PRIO. Returns -1
 *               if it is not a read queue.
 */

int dsf_set_prio(q)
   queue_t *q; /* Read q of STREAM */
{
   register queue_t *tq;
   register int s;
   register struct dsf_element *dsfep;

   if ((q->q_flag & QREADR) == 0)
      return -1;
   s = splstr();
   for (tq = q->q_next; tq->q_next != NULL; tq = tq->q_next)
      ;
   /* Found the top of the queue */
   dsfep = ((struct stdata *)tq->q_ptr)->sd_dsf_el;
   if (dsfep == NULL) {
      splx(s);
      return -1;
   }
   dsfep->priority = DSF_BAND_PRI;
   if (dsfep->dsf_rinfo.remote_queue_id != 0) {
         /* Send priority message, if this is not during open routine */
              register struct rcv_info *rcv_infop =
                   &dsfep->dsf_rinfo.rec_info.rcv_info[DSF_NORMAL_PRI];
              if (rcv_infop->ack_seq != rcv_infop->rec_seq)
              send_ack(dsfep, DSF_NORMAL_PRI);
              send_set_prio(dsfep);
         }
   splx(s);
}
```

© COPYRIGHT 1994 AMDAHL CORPORATION

```
#ident "%W% %G% %U% %n%"
/* %N% */
/* File: vnode.c - last edit:
 * helge        Wed Mar 10 13:16:40 1993
 *
 * Copyright (c) 1991 by Amdahl Corporation. All rights reserved.
 * Copyright (c) 1993 by Amdahl Corporation. All rights reserved.
 */

/*
 * Contains the management of the vnodes
 */

#include <sys/cmn_err.h>
#include <sys/param.h>
#include <sys/vnode.h>
#include <spl.h>

#define VNODES_PER_TBL ((PAGESIZE - 12)/sizeof(struct vnode))
struct vn_tbl {
    struct vn_tbl *next_table; /* Pointer to next table */
    int alloc_nodes; /* Number of vnodes allocated or on free_list this table */
    struct vnode *free_list; /* List of available nodes */
    struct vnode vnode[VNODES_PER_TBL];
};

static struct vn_tbl *vn_tblp = NULL, *last_vtbl;

/*
 * alloc_vnode - Return a pointer to an available vnode
 */

struct vnode *alloc_vnode()
{
    register struct vn_tbl *vtp;
    register int s;
    register struct vnode *result;

    s = splhi();
    for (vtp = vn_tblp; vtp != NULL; vtp = vtp->next_table) {
        if (vtp->free_list != NULL) {
            result = vtp->free_list;
            vtp->free_list = result->next_node;
            goto RETURN;
        }
```

© COPYRIGHT 1994 AMDAHL CORPORATION

```
        if (vtp->alloc_nodes < VNODES_PER_TBL) {
            result = &vtp->vnode[vtp->alloc_nodes++];
            goto RETURN;
        }
    }
    splx(s);
    /* All vnodes in existing tables allocated */
    vtp = (struct vn_tbl *)pagealloc(1); /* Get new page */
    if (vtp == NULL)
        return NULL;

    bzero((char *)vtp, PAGESIZE);
    s = splhi();
    if (vn_tblp == NULL)
        vn_tblp = last_vtbl = vtp;
    else {
        last_vtbl->next_table = vtp;
        last_vtbl = vtp;
    }
    result = &vtp->vnode[vtp->alloc_nodes++];
RETURN:
    splx(s);
    bzero(result, sizeof(struct vnode));
    return result;
}

/*
 * free_vnode - Frees a vnode and checks whether a table could be returned
 *              to the heap.
 */

void free_vnode(vp)
    struct vnode *vp;
{
    register struct vn_tbl *vtp;
    register int s;

    s = splhi();
    for (vtp = vn_tblp; vtp != NULL; vtp = vtp->next_table) {
        if ((unsigned int)vp > (unsigned int)vtp &&
              vp - vtp->vnode < VNODES_PER_TBL) {
            /* Found the right table */
            bzero(vp, sizeof(struct vnode));
            vp->next_node = vtp->free_list;
            vtp->free_list = vp;
```

© COPYRIGHT 1994 AMDAHL CORPORATION

```
        splx(s);
        return;
      }
  }
  splx(s);
  cmn_err(CE_WARN, "invalid vnode deallocated");
}

#define HASH_TBL_SIZE 64
struct vnode *vn_htbl[HASH_TBL_SIZE];
#define VHASH(n) ((n ^ (n >> 16)) & (HASH_TBL_SIZE - 1))
/*
 * enter_vnode - Enter a vnode into the vnode hash table. The access key
 *               is the device number. Returns NULL in case of failure.
 */

struct vnode *enter_vnode(dev, type)
  dev_t dev;
  u_short type;
{
  unsigned int h = VHASH(dev);
  register struct vnode *vp;
  register int s;

  s = splhi();
  for (vp = vn_htbl[h]; vp != NULL && vp->dev != dev;
       vp = vp->next_node)
      ;
  if (vp != NULL) {
     splx(s);
     return vp; /* Vnode already exists */
  }

  if ((vp = alloc_vnode()) == NULL) {
     splx(s);
     return NULL;
  }
  vp->dev = dev;
  vp->v_type = type;
  vp->next_node = vn_htbl[h];
  vn_htbl[h] = vp;
  splx(s);
  return vp;
}
```

© COPYRIGHT 1994 AMDAHL CORPORATION

```
/*
 * find_vnode - Given a device number return the corresponding vnode.
 */

struct vnode *find_vnode(dev)
   dev_t dev;
{
   register struct vnode *vp;

   for (vp = vn_htbl[VHASH(dev)]; vp != NULL && vp->dev != dev;
        vp = vp->next_node)
      ;
   return vp;
}

/*
 * delete_vnode - Remove a vnode from the table and free it.
 */

void delete_vnode(vp)
   struct vnode *vp;
{
   register struct vnode *tvp, *pvp;

   if (vp->dev != NODEV) {
      /* Removed vnode from the vnode table */
      pvp = NULL;
      for (tvp = vn_htbl[VHASH(vp->dev)]; tvp != NULL && tvp != vp;
           tvp = tvp->next_node)
         pvp = tvp;
      if (tvp != NULL) {
         if (pvp == NULL)
            vn_htbl[VHASH(vp->dev)] = tvp->next_node;
         else
            pvp->next_node = tvp->next_node;
      }
   }
   free_vnode(vp);
}

/*
 * init_vnodes - Needs to be called at initialization to clear hash table
 */

void init_vnodes()
```

© COPYRIGHT 1994 AMDAHL CORPORATION

```
{
   bzero(vn_htbl, sizeof(vn_htbl));
}
```

© COPYRIGHT 1994 AMDAHL CORPORATION

```
/* File: write.c - last edit:
 * helge        Tue May 12 16:28:06 1992
 *
 * Copyright (c) 1991 by Amdahl Corporation. All rights reserved.

 * Copyright (c) 1992 by Amdahl Corporation. All rights reserved.
 */

/*
 * Contains routines to do local writes and putmsg to a stream.
 */

#include <sys/clock.h>
#include <sys/debug.h>
#include <sys/errno.h>
#include <sys/file.h>
#include <sys/lstream.h>
#include <sys/param.h>
#include <sys/stream.h>
#include <sys/stropts.h>
#include <sys/strsubr.h>
#include <sys/sysmacros.h>
#include <sys/vnode.h>

/*
 * Write attempts to break the read request into messages conforming
 * with the minimum and maximum packet sizes set downstream.
 *
 * Write will always attempt to get the largest buffer it can to satisfy the
 * message size. If it can not, then it will try up to 2 classes down to try
 * to satisfy the write. Write will not block if downstream queue is full and
 * O_NDELAY is set, otherwise it will block waiting for the queue to get room.
 *
 * A write of zero bytes gets packaged into a zero length message and sent
 * downstream like any other message.
 *
 * If buffers of the requested sizes are not available, the write will
 * sleep until the buffers become available.
 *
 * Write (if specified) will supply a write offset in a message if it
 * makes sense. This can be specified by downstream modules as part of
 * a M_SETOPTS message. Write will not supply the write offset if it
 * cannot supply any data in a buffer. In other words, write will never
 * send down an empty packet due to a write offset.
 */
```

© COPYRIGHT 1994 AMDAHL CORPORATION

```
int write(fd, buff, len)
   int fd;
   char *buff;
   unsigned int len;
{
   register struct stdata *stp;
   register struct queue *wqp;
   register mblk_t *mp;
   register int s;
   long rmin, rmax;
   long iosize;
   char waitflag;
   int tempmode;
   int done = 0;
   int error = 0;
   register int size;
   extern int strhold;

   if (fd < 0 || fd >= MAX_FD || (stp = lstr_fd[fd].stp) == NULL
        || stp->sd_flag & STPLEX) {
      set_uerror(EINVAL);
      return -1;
   }

   if (stp->sd_flag & (STWRERR | STRHUP)) {
        set_uerror ((stp->sd_flag & STRHUP) ? EIO : stp->sd_werror);
        return -1;
   }

   /*
    * Check the min/max packet size constraints. If min packet size is
    * non-zero, the write cannot be split into multiple messages and still
    * guarantee the size constraints.
    */
   wqp = stp->sd_wrq;
   rmin = wqp->q_next->q_minpsz;
   rmax = wqp->q_next->q_maxpsz;
   ASSERT((rmax >= 0) || (rmax == INFPSZ));
   if (rmax == 0)
        return (0);
   if (strmsgsz != 0 && rmax == INFPSZ) {
        rmax = strmsgsz;
   }
   if (rmin > 0) {
        if (len < rmin || (rmax != INFPSZ && len > rmax)) {
```

© COPYRIGHT 1994 AMDAHL CORPORATION

```
            set_uerror(ERANGE);
            return -1;
        }
    }

    /*
     * Do until count satisfied or error.
     */
    waitflag = WRITEWAIT;
    tempmode = stp->sd_vnode->flag;
    size = len;
    do {
        mblk_t *amp;  /* auto */

        s = splstr();
        while (!bcanput(wqp->q_next, 0)) {
            if ((error = strwaitq(stp, waitflag, (off_t) 0,
                            tempmode, &done)) || done) {
                splx(s);
                set_uerror(error);
                return -1;
            }
        }

        /* still at splstr */
        if (mp = wqp->q_first) {
            int spaceleft;
            /*
             * Grab the previously held message "mp" and see if there's room
             * in it to hold this write's data.
             */
            spaceleft = mp->b_datap->db_lim - mp->b_wptr;
            if (size <= spaceleft) {
                bcopy(buff, mp->b_wptr, size);
                  mp->b_wptr += size;
                  wqp->q_count += size;
                  if (wqp->q_count >= wqp->q_hiwat)
                      wqp->q_flag |= QFULL;
                  /*
                   * If the buffer would hold yet another write of the same
                   * size, return.  (wait a while)
                   */
                  if ((size << 1) <= spaceleft) {
                      splx(s);
                      return len;
```

© COPYRIGHT 1994 AMDAHL CORPORATION

```
            }
            size = 0;
        }
        wqp->q_first = NULL;
        splx(s);
    } else {
        splx(s);
        /*
         * Determine the size of the next message to be packaged.  May
         * have to break write into several messages based on max packet
         * size.
         */
        if (rmax == INFPSZ)
            iosize = size;
        else
            iosize = MIN(size, rmax);

        if ((error = strmakemsg((struct strbuf *) NULL, iosize, buff,
            stp, (long) 0, &amp)) || !amp) {
          set_uerror(error);
            return -1;
        }
        mp = amp;
        buff += iosize;

        /*
         * When explicitly enabled (typically for TTYs), check to see if
         * data might be coalesced for better performance.
         *
         * Policy:  Use the size of this write as predictor of the size of
         * the next write.  If this msg buffer has space for another
         * write of the same size, hold onto it for a while.
         */
        if (size == iosize && strhold && (stp->sd_flag & STRHOLD) &&
                size <= (mp->b_datap->db_lim - mp->b_wptr)) {
            splstr();
            wqp->q_first = mp;
            stp->sd_rtime = lbolt + STRSCANP;

            /*
             * Add queue to held-message list
             */
            if (!(wqp->q_flag & QHLIST)) {
              wqp->q_flag |= QHLIST;
```

© COPYRIGHT 1994 AMDAHL CORPORATION

```
                if (!scanqhead)
                    scanqhead = wqp;
                else
                    scanqtail->q_link = wqp;

                scanqtail = wqp;
                wqp->q_link = NULL;

                if (!strscanflag) {
                    strscanflag++;
                    timeout(strscan, 0, STRSCANP);
                }
            }
            splx(s);
            return len;
        }

        size -= iosize;
    }

    /*
     * Put block downstream.
     */
    if (size == 0 && (stp->sd_flag & STRDELIM))
        mp->b_flag |= MSGDELIM;
    (*wqp->q_next->q_qinfo->qi_putp)(wqp->q_next, mp);
    waitflag |= NOINTR;
    if (qready())
        runqueues();

} while (size > 0);

return len;
}

static struct strbuf null_buff = { 0, 0, NULL};

/*
 * putmsg - Put a message downstream.
 */
int putmsg(fd, ctlptr, dataptr, flags)
    int fd;
    struct strbuf *ctlptr;
    struct strbuf *dataptr;
    int flags;
```

© COPYRIGHT 1994 AMDAHL CORPORATION

```
{
   register int status;
   register struct stdata *stp;

   if (fd < 0 || fd >= MAX_FD || (stp = lstr_fd[fd].stp) == NULL) {
      set_uerror(EINVAL);
      return -1;
   }
   if ((status = strputmsg(stp->sd_vnode,
         (ctlptr == NULL ? &null_buff : ctlptr),
         (dataptr == NULL ? &null_buff : dataptr), 0,
         (flags == RS_HIPRI ? MSG_HIPRI : MSG_BAND))) != 0) {
      set_uerror(status);
      return -1;
   }
   return 0;
}

/*
 * putpmsg - Put a priority message downstream.
 */
int putpmsg(fd, ctlptr, dataptr, band, flags)
   int fd;
   struct strbuf *ctlptr;
   struct strbuf *dataptr;
   int band;
   int flags;
{
   register int status;
   register struct stdata *stp;

   if (fd < 0 || fd >= MAX_FD || (stp = lstr_fd[fd].stp) == NULL) {
      set_uerror(EINVAL);
      return -1;
   }
   if ((status = strputmsg(stp->sd_vnode,
         (ctlptr == NULL ? &null_buff : ctlptr),
         (dataptr == NULL ? &null_buff : dataptr), band, flags)) != 0) {
      set_uerror(status);
      return -1;
   }
   return 0;
}

/*
```

© COPYRIGHT 1994 AMDAHL CORPORATION

```
 * strputmsg - Internal routine to put a message down stream.
 */

static int strputmsg(vp, mctl, mdata, pri, flag)
    register struct vnode *vp;
    register struct strbuf *mctl;
    register struct strbuf *mdata;
    unsigned char pri;
    register flag;
{
    register struct stdata *stp;
    mblk_t *mp;
    register s;
    register long msgsize;
    long rmin, rmax;
    int error, done;

    ASSERT(vp->v_stream);
    stp = vp->v_stream;

    if (stp->sd_flag & STPLEX)
        return (EINVAL);
    if (stp->sd_flag & (STRHUP | STWRERR)) {
        return (stp->sd_werror);
    }

    /*
     * Check for legal flag value.
     */
    switch (flag) {
    case MSG_HIPRI:
        if ((mctl->len < 0) || (pri != 0))
            return (EINVAL);
        break;
    case MSG_BAND:
        break;

    default:
        return (EINVAL);
    }

    /*
     * Make sure ctl and data sizes together fall within the limits of the
     * max and min receive packet sizes and do not exceed system limit.
     */
```

© COPYRIGHT 1994 AMDAHL CORPORATION

```
	rmin = stp->sd_wrq->q_next->q_minpsz;
	rmax = stp->sd_wrq->q_next->q_maxpsz;
	ASSERT((rmax >= 0) || (rmax == INFPSZ));
	if (rmax == 0)
		return (ERANGE);
	if (strmsgsz != 0) {
		if (rmax == INFPSZ)
			rmax = strmsgsz;
		else
			rmax = MIN(strmsgsz, rmax);
	}
	if ((msgsize = mdata->len) < 0) {
		msgsize = 0;
		rmin = 0;	/* no range check for NULL data part */
	}
	if ((msgsize < rmin) || ((msgsize > rmax) && (rmax != INFPSZ)) ||
	     (mctl->len > strctlsz))
		return (ERANGE);

	s = splstr();
	while (!(flag & MSG_HIPRI) && !bcanput(stp->sd_wrq->q_next, pri)) {
		if ((error = strwaitq(stp, WRITEWAIT, (off_t) 0, vp->flag, &done)) || done) {
			splx(s);
			return (error);
		}
	}
	splx(s);

	if ((error = strmakemsg(mctl, msgsize, mdata->buf, stp, (long) flag, &mp)) || !mp)
		return (error);
	mp->b_band = pri;

	/*
	 * Put message downstream.
	 */
	(*stp->sd_wrq->q_next->q_qinfo->qi_putp) (stp->sd_wrq->q_next, mp);
	if (qready())
		runqueues();
	return (0);
}
```

© COPYRIGHT 1994 AMDAHL CORPORATION

```
1,3c1
< /*    Copyright (c) 1990, 1991 UNIX System Laboratories, Inc.     */
< /*    Copyright (c) 1984, 1986, 1987, 1988, 1989, 1990 AT&T      */
< /*      All Rights Reserved          */
---
> #ident "%W% %G% %U% %n%"
5,8c3,9
< /*    THIS IS UNPUBLISHED PROPRIETARY SOURCE CODE OF           */
< /*    UNIX System Laboratories, Inc.                 */
< /*    The copyright notice above does not evidence any      */
< /*    actual or intended publication of such source code.    */
---
> /* File: clock.c - last edit:
>  * helge      Mon Mar 15 14:03:37 1993
>  *
>  * Copyright (c) 1991 by Amdahl Corporation. All rights reserved.
>  * Copyright (c) 1992 by Amdahl Corporation. All rights reserved.
>  * Copyright (c) 1993 by Amdahl Corporation. All rights reserved.
>  */
17c18
< #ident       "@(#)uts-3b2:svc/clock.c        1.16"
---
> #ident       "@(#)kernel:os/clock.c          1.34"
19,41c20,29
< #include <mem/anon.h>
< #include <mem/as.h>
< #include <mem/rm.h>
< #include <mem/tuneable.h>
< #include <mem/vmsystm.h>
< #include <proc/class.h>
< #include <proc/proc.h>
< #include <proc/signal.h>
< #include <proc/user.h>
< #include <svc/callo.h>
< #include <svc/hrtcntl.h>
< #include <svc/resource.h>
< #include <svc/systm.h>
< #include <svc/time.h>
< #include <util/cmn_err.h>
< #include <util/debug.h>
< #include <util/inline.h>
< #include <util/param.h>
< #include <util/psw.h>
< #include <util/sysinfo.h>
< #include <util/sysmacros.h>
```

© COPYRIGHT 1994 AMDAHL CORPORATION

```
< #include <util/types.h>
< #include <util/var.h>
---
> #include "app_param.h"
> #include "sys/callo.h"
> #include "sys/clock.h"
> #include "sys/ddi.h"
> #include "sys/cmn_err.h"
> #include "sys/param.h"
> #include "sys/proc.h"
> #include "sys/types.h"
> #include "sys/var.h"
> #include "spl.h"
42a31,32
> #define STATIC
>
50,52d39
< *   maintain user/system times
< *   maintain date
< *   profile
54d40
< *   jab the scheduler
57,63c43
< #define      PRF_ON       01
< unsigned     prfstat; /* state of profiler */
< extern int   fsflush();
< extern int   tickdelta;
< extern long  timedelta;
< extern int   doresettodr;
< extern int   idleswtch;       /* flag set while idle in pswtch() */
---
> volatile clock_t lbolt = 0;   /* time in HZ since last boot */
65c45,46
< extern int (*io_poll[])();    /* driver entry points to poll every tick */
---
> STATIC volatile int calllimit = -1; /* index of last valid entry in table */
> extern struct callo callout[CALLOUT_TBL_SIZE];
67,70c48
< time_t       time;            /* time in seconds since 1970 */
<                       /* is here only for compatibility */
< timestruc_t hrestime;         /* time in seconds and nsec since since 1970 */
< clock_t      lbolt;           /* time in HZ since last boot */
---
> #define      PDELAY       (PZERO-1)
72,73c50,52
```

© COPYRIGHT 1994 AMDAHL CORPORATION

```
< STATIC int one_sec = 1;
< STATIC int fsflushcnt;                /* counter for t_fsflushr */
---
> STATIC void timein(void);
> STATIC int heap_down(int, int);
> STATIC int heap_up(int, int);
75,76c54
< extern struct callo callout[];        /* callout table, defined in kernel.cf */
< STATIC int calllimit = -1; /* index of last valid entry in table */
---
> static int local_timer = 0; /* Used for application specific speed-up of timer */
78,95c56
< /*
<  * Kludge for SVID-compliance is preferable to allocating the
<  * structure in generic code.  rf_init points this at a
<  * counter.
<  */
< time_t        *rfsi_servep;
<
< #ifdef DEBUG
< STATIC int catchmenowcnt;             /* counter for debugging interrupt */
< STATIC int catchmestart = 60;         /* counter for debugging interrupt */
< STATIC int idlemsg;
< extern int idlecntdown;
< #endif
<
< int
< clock(pc, ps)
<       caddr_t pc;
<       psw_t ps;
---
> int clock()
97,101d57
<       register struct proc *pp;
<       register int      retval;
<       register rlim_t rlim_cur;
<       static rqlen, sqlen;
<       register int (**pollptr)();       /* pointer to next poll point */
103,104d58
<       retval = 0;
<
106c60,64
<        * If panic, clock should be stopped.
---
>        * Service timeout() requests if any are due at this time. This code
```

© COPYRIGHT 1994 AMDAHL CORPORATION

```
>        * is simpler than the original array-based callout table since we
>        * are using absolute times in the table. No need to decrement
>        * relative times; merely see if the first (earliest) entry is due to
>        * be called.
108,126c66,67
<       ASSERT(panicstr == NULL);
<
<       /*
<        * XENIX Compatibility Change:
<        *  Call the device driver entries for poll on clock ticks,
<        *  if there are any.  This table (io_poll) is created by
<        *  "cunix" for drivers that contain a "poll" routine.
<        */
<       for (pollptr = &io_poll[0]; *pollptr; pollptr++)
<               (**pollptr)();
<
<       /*
<        * Service timeout() requests if any are due at this time.
<        * This code is simpler than the original array-based callout
<        * table since we are using absolute times in the table.
<        * No need to decrement relative times; merely see if the first
<        * (earliest) entry is due to be called.
<        */
<
---
>       /* Application specific addition to clock() */
>       APPL_CLOCK
128c69
<               timepoke();
---
>               timein();
130,178d70
<       if (prfstat & PRF_ON)
<               prfintr((u_int)pc, USERMODE(ps));
<       pp = u.u_procp;
<       if (USERMODE(ps)) {
<               sysinfo.cpu[CPU_USER]++;
<               pp->p_utime++;
<               if (u.u_prof.pr_scale & ~1)
<                       retval = 1;
<       } else {
<               if (SYSIDLE(pc)) {
<                       if (syswait.iowait+syswait.swap+syswait.physio) {
<                               sysinfo.cpu[CPU_WAIT]++;
<                               if (syswait.iowait)
```

© COPYRIGHT 1994 AMDAHL CORPORATION

```
<                               sysinfo.wait[W_IO]++;
<                       if (syswait.swap)
<                               sysinfo.wait[W_SWAP]++;
<                       if (syswait.physio)
<                               sysinfo.wait[W_PIO]++;
<               } else {
<                       sysinfo.cpu[CPU_IDLE]++;
<               }
<       } else {
<               sysinfo.cpu[CPU_KERNEL]++;
<               pp->p_stime++;
<               if (rfsi_servep && RF_SERVER())
<                       (*rfsi_servep)++;
<       }
<   }
<
<   /*
<    * Update memory usage for the currently running process.
<    */
<   if (pp->p_stat == SONPROC) {
<       /*
<        *      u.u_mem = rm_asrss(pp->p_as);
<        */
<       u.u_mem =
<        ((pp->p_as) == (struct as *)NULL ? 0 : (pp->p_as)->a_rss);
<
<       /*
<        * Call the class specific function to do it's
<        * once-per-tick processing for the current process.
<        */
<       CL_TICK(pp, pp->p_clproc);
<   }
<
<   if (idleswtch == 0 && pp->p_cpu < 80)
<       pp->p_cpu++;
<
180,322c72
<
<   /*
<    * "double" long arithmetic for minfo.freemem.
<    */
<   if (!BASEPRI(ps)) {
<       unsigned long ofrmem;
<
<       ofrmem = minfo.freemem[0];
```

© COPYRIGHT 1994 AMDAHL CORPORATION

```
<               minfo.freemem[0] += freemem;
<               if (minfo.freemem[0] < ofrmem)
<                       minfo.freemem[1]++;
<       }
<
<       /*
<        * Increment the time-of-day
<        */
<       if (timedelta == 0) {
<               BUMPTIME(&hrestime, TICK, one_sec);
<       } else {
<               /*
<                * Drift clock if necessary.
<                */
<               register long delta;
<
<               if (timedelta < 0) {
<                       /*
<                        * Want more ticks per second, because
<                        * we want the clock to advance more
<                        * slowly.
<                        */
<                       delta = (MICROSEC/HZ) - tickdelta;
<                       timedelta += tickdelta;
<               } else {
<                       /*
<                        * Speed up clock: fewer ticks
<                        * per second.
<                        */
<                       delta = (MICROSEC/HZ) + tickdelta;
<                       timedelta -= tickdelta;
<               }
<               /*
<                * Convert from msecs to nsecs
<                */
<               delta *= (NANOSEC/MICROSEC);
<               BUMPTIME(&hrestime, delta, one_sec);
<               if (-tickdelta < timedelta && timedelta < tickdelta) {
<                       /*
<                        * We're close enough.
<                        */
<                       timedelta = 0;
<                       if (doresettodr) {
<                               doresettodr = 0;
<                               wtodc();
```

© COPYRIGHT 1994 AMDAHL CORPORATION

```
<                       }
<               }
<       }
<       if (one_sec) {
<               extern void rf_clock();
<
<               time++;
<               one_sec = 0;
<
<               /*
<                * Enforce CPU rlimit.
<                */
<               rlim_cur = u.u_rlimit[RLIMIT_CPU].rlim_cur;
<               if ((rlim_cur != RLIM_INFINITY) &&
<                   (((pp->p_utime/HZ) + (pp->p_stime/HZ)) > rlim_cur))
<                       psignal(pp, SIGXCPU);
<
<               if (BASEPRI(ps))
<                       return retval;
<
< #ifdef DEBUG
<               if (idlemsg && --idlecntdown == 0)
<                     cmn_err(CE_WARN, "System is idle\n");
< #endif
<
<               minfo.freeswap = anoninfo.ani_free;
<
<               rqlen = 0;
<               sqlen = 0;
<
<               for (pp = practive; pp != NULL; pp = pp->p_next) {
<                       if (pp->p_clktim)
<                               if (--pp->p_clktim == 0)
<                                       psignal(pp, SIGALRM);
<                       pp->p_cpu >>= 1;
<                       if (pp->p_stat == SRUN || pp->p_stat == SONPROC)
<                               if (pp->p_flag & SLOAD)
<                                       rqlen++;
<                               else
<                                       sqlen++;
<               }
<
<               if (rqlen) {
<                       sysinfo.runque += rqlen;
<                       sysinfo.runocc++;
```

© COPYRIGHT 1994 AMDAHL CORPORATION

```
<           }
<           if (sqlen) {
<                   sysinfo.swpque += sqlen;
<                   sysinfo.swpocc++;
<           }
< #ifdef DEBUG
<           /*
<            * call this routine at regular intervals
<            * to allow debugging.
<            */
<           if (--catchmenowcnt <= 0) {
<                   catchmenowcnt = catchmestart;
<                   catchmenow();
<           }
< #endif
<
<           /*
<            * Wake up fsflush to write out DELWRI
<            * buffers, dirty pages and other cached
<            * administrative data, e.g. inodes.
<            */
<           if (--fsflushcnt <= 0) {
<                   fsflushcnt = tune.t_fsflushr;
<                   wakeprocs((caddr_t)fsflush, PRMPT);
<           }
<           /*
<            * XXX
<            * All VFSs should have a VFS_CLOCK operation called from
<            * here.
<            */
<           rf_clock(pc, USERMODE(ps));
<           vmmeter();
<           if (runin != 0) {
<                   runin = 0;
<                   setrun(proc_sched);
<           }
<           if (((freemem <= tune.t_gpgslo) || sqlen) && runout != 0) {
<                   runout = 0;
<                   setrun(proc_sched);
<           }
<           if (bclnlist != NULL || freemem < desfree) {
<                   wakeprocs((caddr_t)proc_pageout, PRMPT);
<           }
<   }
<   return retval;
```

© COPYRIGHT 1994 AMDAHL CORPORATION

```
---
>       return 0;
335c85
< STATIC int timeid = 0;     /* unique sequence number for entry id */
---
> static volatile int timeid = 0;         /* unique sequence number for entry id */
337,339c87,88
< int
< timeout(fun, arg, tim)
<       void (*fun)();
---
> int timeout(fun, arg, tim)
>       void (*fun) ();
341a91
>
356c106
<       int       s;                    /* temp variable for spl() */
---
>       volatile short s;          /* temp variable for spl() */
362,363c112,113
<       if ((j = calllimit + 1) == v.v_call)
<               cmn_err(CE_PANIC,"Timeout table overflow");
---
>       if ((j = calllimit + 1) == CALLOUT_TBL_SIZE)
>               cmn_err(CE_PANIC, "Timeout table overflow");
366,369c116,118
<       * We add the new entry into the next empty slot in the
<       * array representation of the heap.  heap_up() will
<       * restore the heap by moving the new entry up until
<       * it lies in a valid position.
---
>       * We add the new entry into the next empty slot in the array
>       * representation of the heap.  heap_up() will restore the heap by
>       * moving the new entry up until it lies in a valid position.
376,378c125,126
<       * j is the index of the new entry in the correct
<       * (legal heap) position.  Fill in the particulars
<       * of the request.
---
>       * j is the index of the new entry in the correct (legal heap)
>       * position. Fill in the particulars of the request.
396,399c144,147
< int
< ttimeout(fun, arg, tim)
<       void (*fun)();
```

© COPYRIGHT 1994 AMDAHL CORPORATION

```
<       caddr_t  arg;
---
> int ttimeout(fun, arg, tim)
>       void (*fun) ();
>       caddr_t arg;
>       long tim;
406c154
<       if (calllimit + 1 == v.v_call) {
---
>       if (calllimit + 1 == CALLOUT_TBL_SIZE) {
421,422c169
< int
< untimeout(id)
---
> int untimeout(id)
481,482c228
<  * timein() is called via a PIR9 which was set by timepoke()
<  * in clock()
---
>  * timein() is called from clock()
484,485c230
< int
< timein()
---
> STATIC void timein()
492c237
<       int       s;                    /* temp variable for spl() */
---
>       volatile short s;         /* temp variable for spl() */
498,500c243,244
<
<               svcall = *p0;
<
---
>               svcall.c_func = p0->c_func;
>               svcall.c_arg = p0->c_arg;
515,516c257
<       splx(s);
<       return 0;
---
>       fsplx(s);
527,528c268
< STATIC int
< heap_up(t, j)
---
```

© COPYRIGHT 1994 AMDAHL CORPORATION

```
> STATIC int heap_up(t, j)
549,550c289
< STATIC int
< heap_down(t, j)
---
> STATIC int heap_down(t, j)
568d306
<
578,581c316
< #define      PDELAY       (PZERO-1)
<
< void
< delay(ticks)
---
> void delay(ticks)
583a319,320
>         int err;
>         proc_t *pp = get_procp();
588,590c325,327
<         s = splhi();
<         (void)timeout((void(*)())wakeup, (caddr_t)u.u_procp+1, ticks);
<         sleep((caddr_t)u.u_procp+1, PDELAY);
---
>         s = splstr();
>         (void) timeout(wakeup, (caddr_t) pp, ticks);
>         sleep((caddr_t) pp, PDELAY);
595c332
<  * SunOS function to generate monotonically increasing time values.
---
>  * check_real_time - Compare kept real time with clock chip every 2 minutes
597,599c334,335
< void
< uniqtime(tv)
<         register struct timeval *tv;
---
>
> void check_real_time()
601c337,338
<         static struct timeval last;
---
>         register clock_t real_time;
>         unsigned long kept_time;
603,609c340,343
<         if (last.tv_sec != (long)hrestime.tv_sec) {
<                 last.tv_sec = (long)hrestime.tv_sec;
```

© COPYRIGHT 1994 AMDAHL CORPORATION

```
<               last.tv_usec = (long)0;
<       } else {
<               last.tv_usec++;
<       }
<       *tv = last;
---
>       real_time = get_real_time();
>       drv_getparm(TIME, &kept_time);
>       adjust_rtime += (real_time - kept_time);
>       timeout(check_real_time, 0, 60 * 2 * HZ);
```

© COPYRIGHT 1994 AMDAHL CORPORATION

```
total 558
-rw-r--r--  1 del   group   12528 Nov 23 15:34 clock.c.diff
-rw-rw-r--  1 del   group       0 Jan 07 10:43 iodiff.wp
-rw-r--r--  1 del   group    7801 Nov 19 16:48 log.c.diff
-rw-r--r--  1 del   group  109231 Nov 23 15:16 lstreamio.c.diff
-rw-r--r--  1 del   group   12691 Nov 24 13:31 slp.c.diff
-rw-r--r--  1 del   group  107978 Nov 23 14:46 streamio.c.diff
-rw-r--r--  1 del   group   27088 Nov 23 14:27 strsubr.c.diff
```

© COPYRIGHT 1994 AMDAHL CORPORATION lstreamio.c contains only the two functions strrput and strwsrv which were modified from streamio.c

==========================================================================

(this diff did not work too well)

```
1,54c1,6
< /*  Copyright (c) 1990, 1991 UNIX System Laboratories, Inc.   */
< /*  Copyright (c) 1984, 1986, 1987, 1988, 1989, 1990 AT&T     */
< /*    All Rights Reserved          */
<
< /*  THIS IS UNPUBLISHED PROPRIETARY SOURCE CODE OF        */
< /*  UNIX System Laboratories, Inc.                   */
< /*  The copyright notice above does not evidence any      */
< /*  actual or intended publication of such source code.   */
<
< #ident      "@(#)uts-3b2:io/streamio.c      1.30"
<
< #include <acc/audit/audit.h>
< #include <acc/dac/acl.h>
< #include <acc/mac/cca.h>
< #include <acc/mac/mac.h>
< #include <acc/priv/privilege.h>
< #include <fs/file.h>
< #include <fs/filio.h>
< #include <fs/ioccom.h>
< #include <fs/vnode.h>
< #include <io/conf.h>
< #include <io/poll.h>
< #include <io/sad/sad.h>
< #include <io/stream.h>
< #include <io/stropts.h>
< #include <io/strsubr.h>
< #include <io/termio.h>
< #include <io/termios.h>
< #include <io/ttold.h>
< #include <io/uio.h>
< #include <io/xt/jioctl.h>
```

© COPYRIGHT 1994 AMDAHL CORPORATION

```
< #include <mem/kmem.h>
< #include <proc/cred.h>
< #include <proc/proc.h>
< #include <proc/session.h>
< #include <proc/signal.h>
< #include <proc/user.h>
< #include <svc/errno.h>
< #include <svc/secsys.h>
< #include <svc/systm.h>
< #include <util/cmn_err.h>
< #include <util/debug.h>
< #include <util/inline.h>
< #include <util/param.h>
< #include <util/sysmacros.h>
< #include <util/types.h>
<
< #ifdef GEM
< #include <svc/events.h>
< #include <svc/evsys.h>
< #endif /* GEM */
<
< /*
<  * id value used to distinguish between different ioctl messages
---
> #ident "%W% %G% %U% %n%"
> /* %N% *//* File: lstreamio.c - last edit:
>  * helge     Thu Mar  4 10:36:37 1993
>  *
>  * Copyright (c) 1991 by Amdahl Corporation. All rights reserved.
>  * Copyright (c) 1993 by Amdahl Corporation. All rights reserved.
56d7
< STATIC long ioc_id;
58,60c9,10
< /*
<  *  Qinit structure and Module_info structures
<  *       for stream head read and write queues
---
> /* This file contains STREAMS head functionality for streams that are
>  * initiated locally.
62,64d11
< static int strrput();
< int  strwsrv();
< STATIC int strsink();
66,75c13,23
< STATIC struct module_info strm_info = { 0, "strrhead", 0, INFPSZ, STRHIGH, STRLOW };
```

© COPYRIGHT 1994 AMDAHL CORPORATION

```
< STATIC struct module_info stwm_info = { 0, "strwhead", 0, 0, 0, 0 };
< struct       qinit strdata = { strrput, NULL, NULL, NULL, NULL, &strm_info, NULL };
< struct       qinit stwdata = { NULL, strwsrv, NULL, NULL, NULL, &stwm_info, NULL };
< STATIC struct qinit deadrend = {
<       strsink, NULL, NULL, NULL, NULL, &strm_info, NULL
< };
< STATIC struct qinit deadwend = {
<       NULL, NULL, NULL, NULL, NULL, &stwm_info, NULL
< };
---
> #include <sys/cmn_err.h>
> #include <sys/cred.h>
> #include <sys/debug.h>
> #include <sys/errno.h>
> #include <sys/param.h>
> #include <sys/privilege.h>
> #include <sys/stream.h>
> #include <sys/strsubr.h>
> #include <sys/stropts.h>
> #include <sys/types.h>
> #include <spl.h>
77c25,30
< extern struct streamtab fifoinfo;
---
> static int strrput(), strwsrv();
> static struct module_info strm_info = {0, "strrhead", 0, INFPSZ, STRHIGH, STRLOW};
> static struct module_info stwm_info = {0, "strwhead", 0, 0, 0, 0};
> static struct qinit strdata = {strrput, NULL, NULL, NULL, NULL, &strm_info, NULL};
> static struct qinit stwdata = {NULL, strwsrv, NULL, NULL, NULL, &stwm_info, NULL};
> struct streamtab loc_strhinfo = {&strdata, &stwdata, NULL, NULL};
79,85c32
< /*
<  * Tunable parameters set in kernel.cf and used only in this file.
<  */
< extern int   strmsgsz;      /* maximum stream message size */
< extern int   strctlsz;      /* maximum size of ctl part of message */
< extern long  strthresh;     /* Strcount threshold above which */
<                             /* some Streams operations will be stopped */
---
93,96c44,46
< static
< strrput(q, bp)
<       register queue_t *q;
<       register mblk_t *bp;
---
```

© COPYRIGHT 1994 AMDAHL CORPORATION

```
> static int strrput(q, bp)
>     register queue_t *q;
>     register mblk_t *bp;
117d
<       case M_PASSFP:
126,194d75
<                               splx(s);
<                               return;
<                       }
<               }
<
<               /*
<                * Marking doesn't work well when messages
<                * are marked in more than one band.  We only
<                * remember the last message received, even if
<                * it is placed on the queue ahead of other
<                * marked messages.
<                */
<               if (bp->b_flag & MSGMARK)
<                       stp->sd_mark = bp;
<
<               /*
<                * Wake sleeping read/getmsg
<                */
<               if (stp->sd_flag & RSLEEP) {
<                       stp->sd_flag &= ~RSLEEP;
<                       if (stp->sd_vnode->v_type == VFIFO)
<                               wakeprocs((caddr_t)q, NOPRMPT); /*don't thrash*/
<                       else
<                               wakeprocs((caddr_t)q, PRMPT);
<               }
<
<               putq(q, bp);
<
<               if (bp->b_datap->db_type == M_PCPROTO) {
<                       stp->sd_flag |= STRPRI;
<                       if (stp->sd_sigflags & S_HIPRI)
<                               strsendsig(stp->sd_siglist, S_HIPRI, 0L);
<                       if (stp->sd_pollist.ph_events & POLLPRI)
<                               pollwakeup(&stp->sd_pollist, POLLPRI);
< #ifdef GEM
<                       if (stp->sd_eventflags & S_HIPRI)
<                               strevpost(stp, S_HIPRI, 0L);
< #endif /* GEM */
<               } else if (q->q_first == bp) {
```

© COPYRIGHT 1994 AMDAHL CORPORATION

```
<                       if (stp->sd_sigflags & S_INPUT)
<                               strsendsig(stp->sd_siglist, S_INPUT,
<                                   (long)bp->b_band);
<                       if (stp->sd_pollist.ph_events & POLLIN)
<                               pollwakeup(&stp->sd_pollist, POLLIN);
< #ifdef GEM
<                       if (stp->sd_eventflags & S_INPUT)
<                               strevpost(stp, S_INPUT, (long)bp->b_band);
< #endif /* GEM */
<                       if (bp->b_band == 0) {
<                           if (stp->sd_sigflags & S_RDNORM)
<                                   strsendsig(stp->sd_siglist, S_RDNORM, 0L);
<                           if (stp->sd_pollist.ph_events & POLLRDNORM)
<                                   pollwakeup(&stp->sd_pollist, POLLRDNORM);
< #ifdef GEM
<                           if (stp->sd_eventflags & S_RDNORM)
<                                   strevpost(stp, S_RDNORM, 0L);
< #endif /* GEM */
<                       } else {
<                           if (stp->sd_sigflags & S_RDBAND)
<                                   strsendsig(stp->sd_siglist, S_RDBAND,
<                                       (long)bp->b_band);
<                           if (stp->sd_pollist.ph_events & POLLRDBAND)
<                                   pollwakeup(&stp->sd_pollist, POLLRDBAND);
< #ifdef GEM
<                           if (stp->sd_eventflags & S_RDBAND)
<                                   strevpost(stp, S_RDBAND, (long)bp->b_band);
< #endif /* GEM */
<                       }
<               }
<
196a76,77
>         }
>     }
197a79,85
>     /*
>      * Marking doesn't work well when messages are marked in more than
>      * one band.  We only remember the last message received, even if it
>      * is placed on the queue ahead of other marked messages.
>      */
>     if (bp->b_flag & MSGMARK)
>         stp->sd_mark = bp;
199,205c87,94
<     case M_ERROR:
<             /*
```

© COPYRIGHT 1994 AMDAHL CORPORATION

```
<               * An error has occured downstream, the errno is in the first
<               * byte of the message.
<               */
<              if ((bp->b_wptr - bp->b_rptr) == 2) {       /* New flavor */
<                     unsigned char rw = 0;
---
>      /*
>       * Wake sleeping read/getmsg
>       */
>      if (stp->sd_flag & RSLEEP) {
>         stp->sd_flag &= ~RSLEEP;
>         wakeprocs((caddr_t) q, PRMPT);
>      }
>      putq(q, bp);
207,231c96,99
<                     s = splstr();
<                     if (*bp->b_rptr != NOERROR) {      /* read error */
<                            if (*bp->b_rptr != 0) {
<                                   stp->sd_flag |= STRDERR;
<                                   rw |= FLUSHR;
<                            } else {
<                                   stp->sd_flag &= ~STRDERR;
<                            }
<                            stp->sd_rerror = *bp->b_rptr;
<                     }
<                     bp->b_rptr++;
<                     if (*bp->b_rptr != NOERROR) {      /* write error */
<                            if (*bp->b_rptr != 0) {
<                                   stp->sd_flag |= STWRERR;
<                                   rw |= FLUSHW;
<                            } else {
<                                   stp->sd_flag &= ~STWRERR;
<                            }
<                            stp->sd_werror = *bp->b_rptr;
<                     }
<                     splx(s);
<                     if (rw) {
<                            wakeprocs((caddr_t)q, PRMPT); /* readers */
<                            wakeprocs((caddr_t)WR(q), PRMPT); /* writers */
<                            wakeprocs((caddr_t)stp, PRMPT);      /* ioctllers */
---
>      if (bp->b_datap->db_type == M_PCPROTO)
>         stp->sd_flag |= STRPRI;
>      splx(s);
>      return;
```

500

© COPYRIGHT 1994 AMDAHL CORPORATION

```
233,259d100
<                               s = splstr();
<                               if (stp->sd_sigflags & S_ERROR)
<                                       strsendsig(stp->sd_siglist, S_ERROR,
<                                           ((rw & FLUSHR) ?
<                                           (long)stp->sd_rerror :
<                                           (long)stp->sd_werror));
<                               pollwakeup(&stp->sd_pollist, POLLERR);
< #ifdef GEM
<                               if (stp->sd_eventflags & S_ERROR)
<                                       strevpost(stp, S_ERROR, ((rw & FLUSHR) ?
<                                           (long)stp->sd_rerror :
<                                           (long)stp->sd_werror));
< #endif /* GEM */
<                               splx(s);
<                               freemsg(bp);
<                               (void) putctl1(WR(q)->q_next, M_FLUSH, rw);
<                               return;
<                       }
<               } else if (*bp->b_rptr != 0) {                 /* Old flavor */
<                       s = splstr();
<                       stp->sd_flag |= (STRDERR|STWRERR);
<                       stp->sd_rerror = *bp->b_rptr;
<                       stp->sd_werror = *bp->b_rptr;
<                       splx(s);
<                       wakeprocs((caddr_t)q, PRMPT); /* the readers */
<                       wakeprocs((caddr_t)WR(q), PRMPT); /* the writers */
<                       wakeprocs((caddr_t)stp, PRMPT); /* the ioctllers */
261,275c102,116
<                       s = splstr();
<                       if (stp->sd_sigflags & S_ERROR)
<                               strsendsig(stp->sd_siglist, S_ERROR,
<                                   (stp->sd_werror ? (long)stp->sd_werror :
<                                   (long)stp->sd_rerror));
<                       pollwakeup(&stp->sd_pollist, POLLERR);
< #ifdef GEM
<                       if (stp->sd_eventflags & S_ERROR)
<                               strevpost(stp, S_ERROR, (stp->sd_werror ?
<                               (long)stp->sd_werror : (long)stp->sd_rerror));
< #endif /* GEM */
<                       splx(s);
<                       freemsg(bp);
<                       (void) putctl1(WR(q)->q_next, M_FLUSH, FLUSHRW);
<                       return;
---
```

© COPYRIGHT 1994 AMDAHL CORPORATION

```
>     case M_ERROR:
>       /*
>        * An error has occured downstream, the errno is in the first byte of
>        * the message.
>        */
>       if ((bp->b_wptr - bp->b_rptr) == 2) {        /* New flavor */
>           unsigned char rw = 0;
>
>           s = splstr();
>           if (*bp->b_rptr != NOERROR) {  /* read error */
>                if (*bp->b_rptr != 0) {
>                    stp->sd_flag |= STRDERR;
>                    rw |= FLUSHR;
>                } else {
>                    stp->sd_flag &= ~STRDERR;
277,278c118,134
<               freemsg(bp);
<               return;
---
>               stp->sd_rerror = *bp->b_rptr;
>           }
>           bp->b_rptr++;
>           if (*bp->b_rptr != NOERROR) {  /* write error */
>                if (*bp->b_rptr != 0) {
>                    stp->sd_flag |= STWRERR;
>                    rw |= FLUSHW;
>                } else {
>                    stp->sd_flag &= ~STWRERR;
>                }
>                stp->sd_werror = *bp->b_rptr;
>           }
>           splx(s);
>           if (rw) {
>                wakeprocs((caddr_t) q, PRMPT);        /* readers */
>                wakeprocs((caddr_t) WR(q), PRMPT);          /* writers */
>                wakeprocs((caddr_t) stp, PRMPT);      /* ioctllers */
280,281d135
<     case M_HANGUP:
<
283,304c137
<               s = splstr();
<               stp->sd_werror = ENXIO;
<               stp->sd_flag |= STRHUP;
<               splx(s);
<
```

© COPYRIGHT 1994 AMDAHL CORPORATION

```
<               /*
<                * send signal if controlling tty
<                */
<
<               if (stp->sd_sidp)
<                       prsignal(stp->sd_sidp, SIGHUP);
<
<               wakeprocs((caddr_t)q, PRMPT);           /* the readers */
<               wakeprocs((caddr_t)WR(q), PRMPT);  /* the writers */
<               wakeprocs((caddr_t)stp, PRMPT);         /* the ioctllers */
<
<               /*
<                * wake up read, write, and exception pollers and
<                * reset wakeup mechanism.
<                */
<
<               strhup(stp);
---
>               (void) putctl1(WR(q)->q_next, M_FLUSH, rw);
305a139,148
>           }
>       } else if (*bp->b_rptr != 0) {          /* Old flavor */
>           s = splstr();
>           stp->sd_flag |= (STRDERR | STWRERR);
>           stp->sd_rerror = *bp->b_rptr;
>           stp->sd_werror = *bp->b_rptr;
>           splx(s);
>           wakeprocs((caddr_t) q, PRMPT);     /* the readers */
>           wakeprocs((caddr_t) WR(q), PRMPT);         /* the writers */
>           wakeprocs((caddr_t) stp, PRMPT);  /* the ioctllers */
306a150,155
>           freemsg(bp);
>           (void) putctl1(WR(q)->q_next, M_FLUSH, FLUSHRW);
>           return;
>       }
>       freemsg(bp);
>       return;
308,322c157
<       case M_SIG:
<               /*
<                * Someone downstream wants to post a signal.  The
<                * signal to post is contained in the first byte of the
<                * message.  If the message would go on the front of
<                * the queue, send a signal to the process group
<                * (if not SIGPOLL) or to the siglist processes
```

© COPYRIGHT 1994 AMDAHL CORPORATION

```
<               * (SIGPOLL).  If something is already on the queue,
<               * just enqueue the message.
<               */
<              if (q->q_first) {
<                      putq(q, bp);
<                      return;
<              }
<              /* flow through */
---
>      case M_HANGUP:
324,332c159,163
<      case M_PCSIG:
<              /*
<               * Don't enqueue, just post the signal.
<               */
<              strsignal(stp, *bp->b_rptr, 0L);
<              freemsg(bp);
<              return;
< #ifdef GEM
<      case M_EVENT:
---
>      freemsg(bp);
>      s = splstr();
>      stp->sd_werror = ENXIO;
>      stp->sd_flag |= STRHUP;
>      splx(s);
334,344c165,167
<              /*
<               * Someone downstream wants to post an event.
<               * If the message would go on the front of
<               * the queue, post the event.  If something is
<               * already on the queue, just enqueue the message.
<               */
<              if (q->q_first) {
<                      putq(q, bp);
<                      return;
<              }
<              /* flow through */
---
>      wakeprocs((caddr_t) q, PRMPT);          /* the readers */
>      wakeprocs((caddr_t) WR(q), PRMPT);              /* the writers */
>      wakeprocs((caddr_t) stp, PRMPT);        /* the ioctllers */
346c169
<      case M_PCEVENT:
---
```

© COPYRIGHT 1994 AMDAHL CORPORATION

```
>       return;
348,354c171
<               /*
<                * Don't enqueue, just post the event.
<                */
<               strdrpost(bp);
<               freemsg(bp);
<               return;
< #endif /* GEM */
---
>       case M_FLUSH:
356,370c173,186
<       case M_FLUSH:
<               /*
<                * Flush queues.  The indication of which queues to flush
<                * is in the first byte of the message.  If the read queue
<                * is specified, then flush it.  If FLUSHBAND is set, just
<                * flush the band specified by the second byte of the message.
<                */
<           {
<               register mblk_t *mp;
<               register mblk_t *nmp;
<               mblk_t *last;
<               int backenable = 0;
<               int band;
<               queue_t *nq;
<               unsigned char pri, i;
---
>       /*
>        * Flush queues.  The indication of which queues to flush is in the
>        * first byte of the message.  If the read queue is specified, then
>        * flush it.  If FLUSHBAND is set, just flush the band specified by
>        * the second byte of the message.
>        */
>       {
>           register mblk_t *mp;
>           register mblk_t *nmp;
>           mblk_t *last;
>           int backenable = 0;
>           int band;
>           queue_t *nq;
>           unsigned char pri, i;
373,447c189,196
<               s = splstr();
<               if (*bp->b_rptr & FLUSHR) {
```

© COPYRIGHT 1994 AMDAHL CORPORATION

```
<               if (*bp->b_rptr & FLUSHBAND) {
<                   ASSERT((bp->b_wptr - bp->b_rptr) >= 2);
<                   pri = *(bp->b_rptr + 1);
<                   if (pri > q->q_nband)
<                       goto wrapflush;
<                   if (pri == 0) {
<                       mp = q->q_first;
<                       q->q_first = NULL;
<                       q->q_last = NULL;
<                       q->q_count = 0;
<                       for (qbp = q->q_bandp; qbp; qbp = qbp->qb_next) {
<                           qbp->qb_first = NULL;
<                           qbp->qb_last = NULL;
<                           qbp->qb_count = 0;
<                           qbp->qb_flag &= ~QB_FULL;
<                       }
<                       q->q_blocked = 0;
<                       q->q_flag &= ~QFULL;
<                       while (mp) {
<                           nmp = mp->b_next;
<                           if (mp->b_band == 0) {
<                               if (mp->b_datap->db_type == M_PASSFP)
<                                   closef(((struct strrecvfd *)
<                                     mp->b_rptr)->f.fp);
<                               freemsg(mp);
<                           } else {
<                                   putq(q, mp);
<                           }
<                           mp = nmp;
<                       }
<                       if ((q->q_flag & QWANTW) &&
<                         (q->q_count <= q->q_lowat)) {
<                           /* find nearest back queue with service proc */
<                           q->q_flag &= ~QWANTW;
<                           for (nq = backq(q); nq && !nq->q_qinfo->qi_srvp;
<                             nq = backq(nq))
<                               ;
<                           if (nq) {
<                               qenable(nq);
<                               setqback(nq, 0);
<                           }
<                       }
<                   } else {        /* pri != 0 */
<                       band = pri;
<                       qbp = q->q_bandp;
```

© COPYRIGHT 1994 AMDAHL CORPORATION

```
<                       while (--band > 0)
<                           qbp = qbp->qb_next;
<                       mp = qbp->qb_first;
<                       if (mp == NULL)
<                           goto wrapflush;
<                       last = qbp->qb_last;
<                       if (mp == last)     /* only message in band */
<                           last = mp->b_next;
<                       while (mp != last) {
<                           nmp = mp->b_next;
<                           if (mp->b_band == pri) {
<                               if (mp->b_datap->db_type == M_PASSFP)
<                                   closef(((struct strrecvfd *)
<                                     mp->b_rptr)->f.fp);
<                               rmvq(q, mp);
<                               freemsg(mp);
<                           }
<                           mp = nmp;
<                       }
<                       if (mp && mp->b_band == pri) {
<                           if (mp->b_datap->db_type == M_PASSFP)
<                               closef(((struct strrecvfd *)
<                                 mp->b_rptr)->f.fp);
<                           rmvq(q, mp);
<                           freemsg(mp);
<                       }
<                   }
<               } else {        /* flush entire queue */
---
>       s = splstr();
>       if (*bp->b_rptr & FLUSHR) {
>           if (*bp->b_rptr & FLUSHBAND) {
>               ASSERT((bp->b_wptr - bp->b_rptr) >= 2);
>               pri = *(bp->b_rptr + 1);
>               if (pri > q->q_nband)
>                   goto wrapflush;
>               if (pri == 0) {
452d200
<                   stp->sd_flag &= ~STRPRI;
463,465c211,215
<                       if (mp->b_datap->db_type == M_PASSFP)
<                           closef(((struct strrecvfd *)mp->b_rptr)->f.fp);
<                       freemsg(mp);
---
>                       if (mp->b_band == 0) {
```

© COPYRIGHT 1994 AMDAHL CORPORATION

```
>                               freemsg(mp);
>                       } else {
>                               putq(q, mp);
>                       }
468,490c218,219
<               bzero((caddr_t)qbf, NBAND);
<               bpri = 1;
<               for (qbp = q->q_bandp; qbp; qbp = qbp->qb_next) {
<                       if ((qbp->qb_flag & QB_WANTW) &&
<                         (qbp->qb_count <= qbp->qb_lowat)) {
<                               qbp->qb_flag &= ~QB_WANTW;
<                               backenable = 1;
<                               qbf[bpri] = 1;
<                       }
<                       bpri++;
<               }
<               if ((q->q_flag & QWANTW) && (q->q_count <= q->q_lowat)) {
<                       q->q_flag &= ~QWANTW;
<                       backenable = 1;
<                       qbf[0] = 1;
<               }
<
<               /*
<                * If any band can now be written to, and there is a
<                * writer for that band, then backenable the closest
<                * service procedure.
<                */
<               if (backenable) {
---
>               if ((q->q_flag & QWANTW) &&
>                     (q->q_count <= q->q_lowat)) {
491a221
>                       q->q_flag &= ~QWANTW;
493,494c223
<                       nq = backq(nq))
<                               ;
---
>                               nq = backq(nq));
497,499c226
<                       for (i = 0; i < bpri; i++)
<                               if (qbf[i])
<                                       setqback(nq, i);
---
>                       setqback(nq, 0);
502,555c229,246
```

© COPYRIGHT 1994 AMDAHL CORPORATION

```
<                       }
<               }
< wrapflush:
<               splx(s);
<               if ((*bp->b_rptr & FLUSHW) && !(bp->b_flag & MSGNOLOOP)) {
<                       *bp->b_rptr &= ~FLUSHR;
<                       bp->b_flag |= MSGNOLOOP;
<                       qreply(q, bp);
<                       return;
<               }
<               freemsg(bp);
<               return;
<       }
<
<       case M_IOCACK:
<       case M_IOCNAK:
<               iocbp = (struct iocblk *)bp->b_rptr;
<               /*
<                * If not waiting for ACK or NAK then just free msg.
<                * If already have ACK or NAK for user then just free msg.
<                * If incorrect id sequence number then just free msg.
<                */
<               s = splstr();
<               if ((stp->sd_flag & IOCWAIT) == 0 || stp->sd_iocblk ||
<                   (stp->sd_iocid != iocbp->ioc_id)) {
<                       freemsg(bp);
<                       splx(s);
<                       return;
<               }
<
<               /*
<                * Assign ACK or NAK to user and wake up.
<                */
<               stp->sd_iocblk = bp;
<               splx(s);
<               wakeprocs((caddr_t)stp, PRMPT);
<               return;
<
<       case M_COPYIN:
<       case M_COPYOUT:
<               reqp = (struct copyreq *)bp->b_rptr;
<
<               /*
<                * If not waiting for ACK or NAK then just fail request.
<                * If already have ACK, NAK, or copy request, then just
```

© COPYRIGHT 1994 AMDAHL CORPORATION

```
<           * fail request.
<           * If incorrect id sequence number then just fail request.
<           */
<          s = splstr();
<          if ((stp->sd_flag & IOCWAIT) == 0 || stp->sd_iocblk ||
<              (stp->sd_iocid != reqp->cq_id)) {
<                  if (bp->b_cont) {
<                          freemsg(bp->b_cont);
<                          bp->b_cont = NULL;
---
>              } else {        /* pri != 0 */
>                  band = pri;
>                  qbp = q->q_bandp;
>                  while (--band > 0)
>                      qbp = qbp->qb_next;
>                  mp = qbp->qb_first;
>                  if (mp == NULL)
>                      goto wrapflush;
>                  last = qbp->qb_last;
>                  if (mp == last)          /* only message in band */
>                      last = mp->b_next;
>                  while (mp != last) {
>                      nmp = mp->b_next;
>                      if (mp->b_band == pri) {
>                          rmvq(q, mp);
>                          freemsg(mp);
>                      }
>                      mp = nmp;
557,600c248,250
<                  bp->b_datap->db_type = M_IOCDATA;
<                  resp = (struct copyresp *)bp->b_rptr;
<                  resp->cp_rval = (caddr_t)1;   /* failure */
<                  splx(s);
<                  (*stp->sd_wrq->q_next->q_qinfo->qi_putp)(stp->sd_wrq->q_next, bp);
<                  if (qready())
<                          runqueues();
<                  return;
<          }
<
<          /*
<           * Assign copy request to user and wake up.
<           */
<          stp->sd_iocblk = bp;
<          splx(s);
<          wakeprocs((caddr_t)stp, PRMPT);
```

© COPYRIGHT 1994 AMDAHL CORPORATION

```
<               return;
<
<       case M_SETOPTS:
<               /*
<                * Set stream head options (read option, write offset,
<                * min/max packet size, and/or high/low water marks for
<                * the read side only).
<                */
<
<               bpri = 0;
<               ASSERT((bp->b_wptr - bp->b_rptr) == sizeof(struct stroptions));
<               sop = (struct stroptions *)bp->b_rptr;
<               s = splstr();
<               if (sop->so_flags & SO_READOPT) {
<                       switch (sop->so_readopt & RMODEMASK) {
<                       case RNORM:
<                               stp->sd_flag &= ~(RMSGDIS | RMSGNODIS);
<                               break;
<
<                       case RMSGD:
<                               stp->sd_flag = ((stp->sd_flag & ~RMSGNODIS) |
<                                  RMSGDIS);
<                               break;
<
<                       case RMSGN:
<                               stp->sd_flag = ((stp->sd_flag & ~RMSGDIS) |
<                                  RMSGNODIS);
<                               break;
---
>                       if (mp && mp->b_band == pri) {
>                          rmvq(q, mp);
>                          freemsg(mp);
602,615c252,279
<                       switch(sop->so_readopt & RPROTMASK) {
<                       case RPROTNORM:
<                               stp->sd_flag &= ~(RDPROTDAT | RDPROTDIS);
<                               break;
<
<                       case RPROTDAT:
<                               stp->sd_flag = ((stp->sd_flag & ~RDPROTDIS) |
<                                  RDPROTDAT);
<                               break;
<
<                       case RPROTDIS:
<                               stp->sd_flag = ((stp->sd_flag & ~RDPROTDAT) |
```

© COPYRIGHT 1994 AMDAHL CORPORATION

```
<                               RDPROTDIS);
<                           break;
---
>                   }
>               } else {        /* flush entire queue */
>                   mp = q->q_first;
>                   q->q_first = NULL;
>                   q->q_last = NULL;
>                   q->q_count = 0;
>                   stp->sd_flag &= ~STRPRI;
>                   for (qbp = q->q_bandp; qbp; qbp = qbp->qb_next) {
>                       qbp->qb_first = NULL;
>                       qbp->qb_last = NULL;
>                       qbp->qb_count = 0;
>                       qbp->qb_flag &= ~QB_FULL;
>                   }
>                   q->q_blocked = 0;
>                   q->q_flag &= ~QFULL;
>                   while (mp) {
>                       nmp = mp->b_next;
>                       freemsg(mp);
>                       mp = nmp;
>                   }
>                   bzero((caddr_t) qbf, NBAND);
>                   bpri = 1;
>                   for (qbp = q->q_bandp; qbp; qbp = qbp->qb_next) {
>                       if ((qbp->qb_flag & QB_WANTW) &&
>                           (qbp->qb_count <= qbp->qb_lowat)) {
>                         qbp->qb_flag &= ~QB_WANTW;
>                         backenable = 1;
>                         qbf[bpri] = 1;
617,633c281
<               }
<
<               if (sop->so_flags & SO_WROFF)
<                       stp->sd_wroff = sop->so_wroff;
<               if (sop->so_flags & SO_MINPSZ)
<                       q->q_minpsz = sop->so_minpsz;
<               if (sop->so_flags & SO_MAXPSZ)
<                       q->q_maxpsz = sop->so_maxpsz;
<               if (sop->so_flags & SO_HIWAT) {
<                   if (sop->so_flags & SO_BAND) {
<                       if (strqset(q, QHIWAT, sop->so_band, sop->so_hiwat))
<                               cmn_err(CE_WARN,
<                                   "strrput: could not allocate qband\n");
```

© COPYRIGHT 1994 AMDAHL CORPORATION

```
<                       else
<                               bpri = sop->so_band;
<                   } else {
<                       q->q_hiwat = sop->so_hiwat;
---
>                       bpri++;
635,644c283,286
<               }
<               if (sop->so_flags & SO_LOWAT) {
<                   if (sop->so_flags & SO_BAND) {
<                       if (strqset(q, QLOWAT, sop->so_band, sop->so_lowat))
<                               cmn_err(CE_WARN,
<                                   "strrput: could not allocate qband\n");
<                       else
<                               bpri = sop->so_band;
<                   } else {
<                       q->q_lowat = sop->so_lowat;
---
>                   if ((q->q_flag & QWANTW) && (q->q_count <= q->q_lowat)) {
>                       q->q_flag &= ~QWANTW;
>                       backenable = 1;
>                       qbf[0] = 1;
646,670d287
<               }
<               if (sop->so_flags & SO_MREADON)
<                       stp->sd_flag |= SNDMREAD;
<               if (sop->so_flags & SO_MREADOFF)
<                       stp->sd_flag &= ~SNDMREAD;
<               if (sop->so_flags & SO_NDELON)
<                       stp->sd_flag |= OLDNDELAY;
<               if (sop->so_flags & SO_NDELOFF)
<                       stp->sd_flag &= ~OLDNDELAY;
<               if (sop->so_flags & SO_ISTTY)
<                       stp->sd_flag |= STRISTTY;
<               if (sop->so_flags & SO_ISNTTY)
<                       stp->sd_flag &= ~STRISTTY;
<               if (sop->so_flags & SO_TOSTOP)
<                       stp->sd_flag |= STRTOSTOP;
<               if (sop->so_flags & SO_TONSTOP)
<                       stp->sd_flag &= ~STRTOSTOP;
<               if (sop->so_flags & SO_DELIM)
<                       stp->sd_flag |= STRDELIM;
< #ifndef _STYPES
<               if (sop->so_flags & SO_NODELIM)
<                       stp->sd_flag &= ~STRDELIM;
```

© COPYRIGHT 1994 AMDAHL CORPORATION

```
<               if (sop->so_flags & SO_STRHOLD)
<                       stp->sd_flag |= STRHOLD;
< #endif /* _STYPES */
672,684c289,302
<               freemsg(bp);
<
<               if (bpri == 0) {
<                       if ((q->q_count <= q->q_lowat) &&
<                           (q->q_flag & QWANTW)) {
<                               q->q_flag &= ~QWANTW;
<                               for (q = backq(q); q && !q->q_qinfo->qi_srvp;
<                                   q = backq(q))
<                                       ;
<                               if (q) {
<                                       qenable(q);
<                                       setqback(q, bpri);
<                               }
---
>                   /*
>                    * If any band can now be written to, and there is a
>                    * writer for that band, then backenable the closest
>                    * service procedure.
>                    */
>                   if (backenable) {
>                       /* find nearest back queue with service proc */
>                       for (nq = backq(q); nq && !nq->q_qinfo->qi_srvp;
>                            nq = backq(nq));
>                       if (nq) {
>                           qenable(nq);
>                           for (i = 0; i < bpri; i++)
>                               if (qbf[i])
>                                   setqback(nq, i);
686,702c304
<               } else {
<                       unsigned char i;
<
<                       qbp = q->q_bandp;
<                       for (i = 1; i < bpri; i++)
<                               qbp = qbp->qb_next;
<                       if ((qbp->qb_count <= qbp->qb_lowat) &&
<                           (qbp->qb_flag & QB_WANTW)) {
<                               qbp->qb_flag &= ~QB_WANTW;
<                               for (q = backq(q); q && !q->q_qinfo->qi_srvp;
<                                   q = backq(q))
<                                       ;
```

© COPYRIGHT 1994 AMDAHL CORPORATION

```
<                               if (q) {
<                                       qenable(q);
<                                       setqback(q, bpri);
<                               }
<                       }
---
>               }
704,729c306,311
<               splx(s);
<
<               return;
<
<       /*
<        * The following set of cases deal with situations where two stream
<        * heads are connected to each other (twisted streams). These messages
<        * have no meaning at the stream head.
<        */
<       case M_BREAK:
<       case M_CTL:
<       case M_DELAY:
<       case M_START:
<       case M_STOP:
<       case M_IOCDATA:
<       case M_STARTI:
<       case M_STOPI:
<               freemsg(bp);
<               return;
<
<       case M_IOCTL:
<               /*
<                * Always NAK this condition
<                * (makes no sense)
<                */
<               bp->b_datap->db_type = M_IOCNAK;
---
>       }
>     wrapflush:
>           splx(s);
>           if ((*bp->b_rptr & FLUSHW) && !(bp->b_flag & MSGNOLOOP)) {
>                   *bp->b_rptr &= ~FLUSHR;
>                   bp->b_flag |= MSGNOLOOP;
732,736c314,316
<
<       default:
<               ASSERT(0);
```

© COPYRIGHT 1994 AMDAHL CORPORATION

```
<               freemsg(bp);
<               return;
---
>           }
>           freemsg(bp);
>           return;
738d317
< }
740,795c319,322
< /*
<  * Write attempts to break the read request into messages conforming
<  * with the minimum and maximum packet sizes set downstream.
<  *
<  * Write will always attempt to get the largest buffer it can to satisfy the
<  * message size. If it can not, then it will try up to 2 classes down to try
<  * to satisfy the write. Write will not block if downstream queue is full and
<  * O_NDELAY is set, otherwise it will block waiting for the queue to get room.
<  *
<  * A write of zero bytes gets packaged into a zero length message and sent
<  * downstream like any other message.
<  *
<  * If buffers of the requested sizes are not available, the write will
<  * sleep until the buffers become available.
<  *
<  * Write (if specified) will supply a write offset in a message if it
<  * makes sense. This can be specified by downstream modules as part of
<  * a M_SETOPTS message.  Write will not supply the write offset if it
<  * cannot supply any data in a buffer.  In other words, write will never
<  * send down an empty packet due to a write offset.
<  */
< int
< strwrite(vp, uiop, crp)
<       struct vnode *vp;
<       struct uio *uiop;
<       cred_t *crp;
< {
<       register struct stdata *stp;
<       register struct queue *wqp;
<       register mblk_t *mp;
<       register int s;
<       long rmin, rmax;
<       long iosize;
<       char waitflag;
<       int tempmode;
<       int done = 0;
```

© COPYRIGHT 1994 AMDAHL CORPORATION

```
<       int error = 0;
<       int strmakemsg();
<
<       ASSERT(vp->v_stream);
<       stp = vp->v_stream;
<
<       if (error = straccess(stp, JCWRITE))
<               return (error);
<       if (stp->sd_flag & STPLEX)
<               return (EINVAL);
<       if (stp->sd_flag & (STWRERR|STRHUP)) {
<               if (stp->sd_flag & STRSIGPIPE)
<                       psignal(u.u_procp, SIGPIPE);
<
<               /*
<                * this is for POSIX compatibility
<                */
<               return ((stp->sd_flag & STRHUP) ? EIO : stp->sd_werror);
<       }
<
---
>     case M_IOCACK:
>     case M_IOCNAK:
>       iocbp = (struct iocblk *) bp->b_rptr;
>
797c324,326
<        * firewall - don't use too much memory
---
>        * If not waiting for ACK or NAK then just free msg. If already have
>        * ACK or NAK for user then just free msg. If incorrect id sequence
>        * number then just free msg.
799,820c328,333
<       if (strthresh && (Strcount > strthresh) && pm_denied(u.u_cred, P_SYSOPS))
<               return (ENOSR);
<
<       /*
<        * Check the min/max packet size constraints.  If min packet size
<        * is non-zero, the write cannot be split into multiple messages
<        * and still guarantee the size constraints.
<        */
<       wqp = stp->sd_wrq;
<       rmin = wqp->q_next->q_minpsz;
<       rmax = wqp->q_next->q_maxpsz;
<       ASSERT((rmax >= 0) || (rmax == INFPSZ));
<       if (rmax == 0)
```

© COPYRIGHT 1994 AMDAHL CORPORATION

```
<               return (0);
<       if (strmsgsz != 0) {
<               if (rmax == INFPSZ)
<                       rmax = strmsgsz;
<               else {
<                       if (vp->v_type == VFIFO)
<                               rmax = MIN(PIPE_BUF, rmax);
<                       else    rmax = MIN(strmsgsz, rmax);
<               }
---
>       s = splstr();
>       if ((stp->sd_flag & IOCWAIT) == 0 || stp->sd_iocblk ||
>           (stp->sd_iocid != iocbp->ioc_id)) {
>           freemsg(bp);
>           splx(s);
>           return;
822,827d334
<       if (rmin > 0) {
<               if (uiop->uio_resid < rmin)
<                       return (ERANGE);
<               if ((rmax != INFPSZ) && (uiop->uio_resid > rmax))
<                       return (ERANGE);
<       }
830c337
<        * Do until count satisfied or error.
---
>        * Assign ACK or NAK to user and wake up.
832,836c339,342
<       waitflag = WRITEWAIT;
<       if (stp->sd_flag & OLDNDELAY)
<               tempmode = uiop->uio_fmode & ~FNDELAY;
<       else
<               tempmode = uiop->uio_fmode;
---
>       stp->sd_iocblk = bp;
>       splx(s);
>       wakeprocs((caddr_t) stp, PRMPT);
>       return;
838,840c344,346
<       do {
<               register int size = uiop->uio_resid;
<               mblk_t *amp;    /* auto */
---
>     case M_COPYIN:
>     case M_COPYOUT:
```

© COPYRIGHT 1994 AMDAHL CORPORATION

```
>       reqp = (struct copyreq *) bp->b_rptr;
842,981c348,352
<               s = splstr();
<               while (!bcanput(wqp->q_next, 0)) {
<
<                       /*
<                        * if FIFO/pipe, don't sleep here. Sleep in the
<                        * fifo write routine.
<                        */
<                       if (vp->v_type == VFIFO) {
<                               splx(s);
<                               return (ESTRPIPE);
<                       }
<                       if ((error = strwaitq(stp, waitflag, (off_t)0,
<                           tempmode, &done)) || done) {
<                               splx(s);
<                               return (error);
<                       }
<               }
<
<               /* still at splstr */
<               if (mp = wqp->q_first) {
<                       int spaceleft;
<                       /*
<                        * Grab the previously held message "mp" and see
<                        * if there's room in it to hold this write's data.
<                        */
<                       spaceleft = mp->b_datap->db_lim - mp->b_wptr;
<                       if (size <= spaceleft) {
<                               if (error = uiomove(mp->b_wptr, size, UIO_WRITE, uiop)) {
<                                       splx(s);
<                                       return error;
<                               }
<                               mp->b_wptr += size;
<                               /*
<                                * If the buffer would hold yet another write
<                                * of the same size, return.  (wait a while)
<                                */
<                               if ((size<<1) <= spaceleft) {
<                                       splx(s);
<                                       return 0;
<                               }
<                       }
<
<                       wqp->q_first = NULL;
```

© COPYRIGHT 1994 AMDAHL CORPORATION

```
<               splx(s);
<           }
<           else {
<               splx(s);
<
<               /*
<                * Determine the size of the next message to be
<                * packaged.  May have to break write into several
<                * messages based on max packet size.
<                */
<               if (rmax == INFPSZ)
<                       iosize = uiop->uio_resid;
<               else    iosize = MIN(uiop->uio_resid, rmax);
<
<               if ((error = strmakemsg((struct strbuf *)NULL,
<                   iosize, uiop, stp, (long)0, &amp)) || !amp)
<                       return (error);
<               mp = amp;
<
<               /*
<                * When explicitly enabled (typically for TTYs), check to
<                * see if data might be coalesced for better performance.
<                *
<                * Policy:  Use the size of this write as predictor of the
<                * size of the next write.  If this msg buffer has space for
<                * another write of the same size, hold onto it for a while.
<                */
<               if (strhold && (stp->sd_flag & STRHOLD) &&
<                   size <= (mp->b_datap->db_lim - mp->b_wptr)) {
<
<                       splstr();
<                       wqp->q_first = mp;
<                       stp->sd_rtime = lbolt + STRSCANP;
<
<                       /*
<                        * Add queue to held-message list
<                        */
<                       if (!(wqp->q_flag & QHLIST)) {
<                               wqp->q_flag |= QHLIST;
<
<                               if (!scanqhead)
<                                       scanqhead = wqp;
<                               else
<                                       scanqtail->q_link = wqp;
<
```

© COPYRIGHT 1994 AMDAHL CORPORATION

```
<                                       scanqtail = wqp;
<                                       wqp->q_link = NULL;
<
<                                       if (!strscanflag) {
<                                               strscanflag++;
<                                               timeout(strscan, 0, STRSCANP);
<                                       }
<                               }
<                               splx(s);
<                               return 0;
<                       }
<               }
<
<               /*
<                * Put block downstream.
<                */
<               wqp->q_first = NULL;
<               if ((uiop->uio_resid == 0) && (stp->sd_flag & STRDELIM))
<                       mp->b_flag |= MSGDELIM;
<               (*wqp->q_next->q_qinfo->qi_putp)
<                       (wqp->q_next, mp);
<               waitflag |= NOINTR;
<               if (qready())
<                       runqueues();
<
<       } while (uiop->uio_resid);
<
<       return 0;
< }
<
< /*
<  * Stream head write service routine.
<  * Its job is to wake up any sleeping writers when a queue
<  * downstream needs data (part of the flow control in putq and getq).
<  * It also must wake anyone sleeping on a poll().
<  * For stream head right below mux module, it must also invoke put procedure
<  * of next downstream module.
<  */
<
< strwsrv(q)
<       register queue_t *q;
< {
<       register struct stdata *stp;
<       register int s;
<       register queue_t *tq;
```

© COPYRIGHT 1994 AMDAHL CORPORATION

```
<       register qband_t *qbp;
<       register int i;
<       qband_t *myqbp;
<       int isevent;
<
<       stp = (struct stdata *)q->q_ptr;
<       ASSERT(!(stp->sd_flag & STPLEX));
---
>       /*
>        * If not waiting for ACK or NAK then just fail request. If already
>        * have ACK, NAK, or copy request, then just fail request. If
>        * incorrect id sequence number then just fail request.
>        */
983,1056c354,358
<
<       if (stp->sd_flag & WSLEEP) {
<               stp->sd_flag &= ~WSLEEP;
<               if (stp->sd_vnode->v_type == VFIFO)
<                       wakeprocs((caddr_t)q, NOPRMPT); /*don't thrash*/
<               else
<                       wakeprocs((caddr_t)q, PRMPT);
<       }
<
<       if ((tq = q->q_next) == NULL) {
<
<               /*
<                * The other end of a stream pipe went away.
<                */
<               splx(s);
<               return;
<       }
<       while (tq->q_next && !tq->q_qinfo->qi_srvp)
<               tq = tq->q_next;
<
<       if (q->q_flag & QBACK) {
<               if (tq->q_flag & QFULL) {
<                       tq->q_flag |= QWANTW;
<               } else {
<                       if (stp->sd_sigflags & S_WRNORM)
<                               strsendsig(stp->sd_siglist, S_WRNORM, 0L);
<                       if (stp->sd_pollist.ph_events & POLLWRNORM)
<                               pollwakeup(&stp->sd_pollist, POLLWRNORM);
< #ifdef GEM
<                       if (stp->sd_eventflags & S_WRNORM)
<                               strevpost(stp, S_WRNORM, 0L);
```

© COPYRIGHT 1994 AMDAHL CORPORATION

```
< #endif /* GEM */
<               }
<       }
<
<       isevent = 0;
<       i = 1;
<       bzero((caddr_t)qbf, NBAND);
<       myqbp = q->q_bandp;
<       for (qbp = tq->q_bandp; qbp; qbp = qbp->qb_next) {
<               if (!myqbp)
<                       break;
<               if (myqbp->qb_flag & QB_BACK) {
<                       if (qbp->qb_flag & QB_FULL) {
<                               qbp->qb_flag |= QB_WANTW;
<                       } else {
<                               isevent = 1;
<                               qbf[i] = 1;
<                       }
<               }
<               myqbp = myqbp->qb_next;
<               i++;
<       }
<       while (myqbp) {
<               if (myqbp->qb_flag & QB_BACK) {
<                       isevent = 1;
<                       qbf[i] = 1;
<               }
<               myqbp = myqbp->qb_next;
<               i++;
<       }
<
<       if (isevent) {
<           for (i--; i; i--) {
<               if (qbf[i]) {
<                       if (stp->sd_sigflags & S_WRBAND)
<                               strsendsig(stp->sd_siglist, S_WRBAND, (long)i);
<                       if (stp->sd_pollist.ph_events & POLLWRBAND)
<                               pollwakeup(&stp->sd_pollist, POLLWRBAND);
< #ifdef GEM
<                       if (stp->sd_eventflags & S_WRBAND)
<                               strevpost(stp, S_WRBAND, (long)i);
< #endif /* GEM */
<               }
---
>       if ((stp->sd_flag & IOCWAIT) == 0 || stp->sd_iocblk ||
```

© COPYRIGHT 1994 AMDAHL CORPORATION

```
>           (stp->sd_iocid != reqp->cq_id)) {
>         if (bp->b_cont) {
>             freemsg(bp->b_cont);
>             bp->b_cont = NULL;
1057a360,367
>         bp->b_datap->db_type = M_IOCDATA;
>         resp = (struct copyresp *) bp->b_rptr;
>         resp->cp_rval = (caddr_t) 1;        /* failure */
>         splx(s);
>         (*stp->sd_wrq->q_next->q_qinfo->qi_putp) (stp->sd_wrq->q_next, bp);
>         if (qready())
>             runqueues();
>         return;
1059a370,373
>     /*
>      * Assign copy request to user and wake up.
>      */
>     stp->sd_iocblk = bp;
1061c375,376
< }
---
>     wakeprocs((caddr_t) stp, PRMPT);
>     return;
1063,1085c378
< /*
<  * ioctl for streams
<  */
< int
< strioctl(vp, cmd, arg, flag, copyflag, crp, rvalp)
<       struct vnode *vp;
<       int cmd;
<       int arg;
<       int flag;
<       int copyflag;
<       cred_t *crp;
<       int *rvalp;
< {
<       register struct stdata *stp;
<       register int s;
<       struct strioctl strioc;
<       struct uio uio;
<       struct iovec iov;
<       enum jcaccess access;
<       mblk_t *mp;
<       int error = 0;
```

© COPYRIGHT 1994 AMDAHL CORPORATION

```
<       int done = 0;
<       char *fmt = NULL;
---
>     case M_SETOPTS:
1087,1090d379
<       ASSERT(vp->v_stream);
<       ASSERT(copyflag == U_TO_K || copyflag == K_TO_K);
<       stp = vp->v_stream;
<
1092,1093c381,382
<        * if a message is being "held" awaiting possible consolidation,
<        * send it downstream before processing ioctl.
---
>        * Set stream head options (read option, write offset, min/max packet
>        * size, and/or high/low water marks for the read side only).
1095,1096d383
<       {
<               register queue_t *q = stp->sd_wrq;
1098,1112c385,392
<               s = splstr();
<               if (mp = q->q_first) {
<                       q->q_first = NULL;
<
<                       splx(s);
<                       putnext(q, mp);
<               }
<               else    splx(s);
<       }
<
<       switch (cmd) {
<       case I_RECVFD:
<       case I_E_RECVFD:
<       case I_S_RECVFD:
<               access = JCREAD;
---
>       bpri = 0;
>       ASSERT((bp->b_wptr - bp->b_rptr) == sizeof(struct stroptions));
>       sop = (struct stroptions *) bp->b_rptr;
>       s = splstr();
>       if (sop->so_flags & SO_READOPT) {
>           switch (sop->so_readopt & RMODEMASK) {
>           case RNORM:
>               stp->sd_flag &= ~(RMSGDIS | RMSGNODIS);
1115,1118c395,397
<       case I_FDINSERT:
```

© COPYRIGHT 1994 AMDAHL CORPORATION

```
<       case I_SENDFD:
<       case TIOCSTI:
<               access = JCWRITE;
---
>         case RMSGD:
>               stp->sd_flag = ((stp->sd_flag & ~RMSGNODIS) |
>                     RMSGDIS);
1121,1152c400,402
<       case TCGETA:
<       case TCGETS:
<       case TIOCGETP:
<       case TIOCGPGRP:
<       case JWINSIZE:
<       case TIOCGSID:
<       case TIOCMGET:
<       case LDGETT:
<       case TIOCGETC:
<       case TIOCLGET:
<       case TIOCGLTC:
<       case TIOCGETD:
<       case TIOCGWINSZ:
<       case LDGMAP:
<       case I_CANPUT:
<       case I_NREAD:
<       case FIONREAD:
<       case FIORDCHK:
<       case I_FIND:
<       case I_LOOK:
<       case I_GRDOPT:
< #ifdef GEM
<       case I_GETEV:
< #endif /* GEM */
<       case I_GETSIG:
<       case I_PEEK:
<       case I_GWROPT:
<       case I_LIST:
<       case I_CKBAND:
<       case I_GETBAND:
<       case I_GETCLTIME:
<               access = JCGETP;
---
>         case RMSGN:
>               stp->sd_flag = ((stp->sd_flag & ~RMSGDIS) |
>                     RMSGNODIS);
1153a404,408
```

© COPYRIGHT 1994 AMDAHL CORPORATION

```
>           }
>           switch (sop->so_readopt & RPROTMASK) {
>           case RPROTNORM:
>                stp->sd_flag &= ~(RDPROTDAT | RDPROTDIS);
>                break;
1155,1156c410,412
<      default:
<                access = JCSETP;
---
>           case RPROTDAT:
>                stp->sd_flag = ((stp->sd_flag & ~RDPROTDIS) |
>                     RDPROTDAT);
1158d413
<      }
1160,1320c415,418
<
<      if (error = straccess(stp, access))
<                return (error);
<      if (stp->sd_flag & (STRDERR|STWRERR|STPLEX))
<                return ((stp->sd_flag & STPLEX) ? EINVAL :
<                    (stp->sd_werror ? stp->sd_werror : stp->sd_rerror));
<
<      switch (cmd) {
<
<      default:
<                if (((cmd & IOCTYPE) == LDIOC) ||
<                    ((cmd & IOCTYPE) == tIOC) ||
<                    ((cmd & IOCTYPE) == TIOC)) {
<
<                          /*
<                           * The ioctl is a tty ioctl - set up strioc buffer
<                           * and call strdoioctl() to do the work.
<                           */
<                          if (stp->sd_flag & STRHUP)
<                                    return (ENXIO);
<                          strioc.ic_cmd = cmd;
<                          strioc.ic_timout = INFTIM;
<
<                          switch (cmd) {
<                          case TCXONC:
<                          case TCSBRK:
<                          case TCFLSH:
<                          case TCDSET:
<                                    strioc.ic_len = sizeof(int);
<                                    strioc.ic_dp = (char *)&arg;
```

© COPYRIGHT 1994 AMDAHL CORPORATION

```
<                       return (strdoioctl(stp, &strioc, NULL, K_TO_K,
<                           STRINT, crp, rvalp));
<
<               case TCSETA:
<               case TCSETAW:
<               case TCSETAF:
<                       strioc.ic_len = sizeof(struct termio);
<                       strioc.ic_dp = (char *)arg;
<                       return (strdoioctl(stp, &strioc, NULL,
<                           copyflag, STRTERMIO, crp, rvalp));
<
<               case TCSETS:
<               case TCSETSW:
<               case TCSETSF:
<                       strioc.ic_len = sizeof(struct termios);
<                       strioc.ic_dp = (char *)arg;
<                       return (strdoioctl(stp, &strioc, NULL,
<                           copyflag, STRTERMIOS, crp, rvalp));
<
<               case LDSETT:
<                       strioc.ic_len = sizeof(struct termcb);
<                       strioc.ic_dp = (char *)arg;
<                       return (strdoioctl(stp, &strioc, NULL,
<                           copyflag, STRTERMCB, crp, rvalp));
<
<               case TIOCSETP:
<                       strioc.ic_len = sizeof(struct sgttyb);
<                       strioc.ic_dp = (char *)arg;
<                       return (strdoioctl(stp, &strioc, NULL,
<                           copyflag, STRSGTTYB, crp, rvalp));
<
<               case TIOCSTI:
<                       if (pm_denied(crp, P_DACREAD)) {
<                               if ((flag & FREAD) == 0)
<                                       return (EPERM);
<                               if (stp->sd_sidp != u.u_procp->p_sessp->s_sidp)
<                                       return (EACCES);
<                       }
<                       strioc.ic_len = sizeof(char);
<                       strioc.ic_dp = (char *)arg;
<                       return (strdoioctl(stp, &strioc, NULL,
<                           copyflag, "c", crp, rvalp));
<
<               case TCGETA:
<                       fmt = STRTERMIO;
```

© COPYRIGHT 1994 AMDAHL CORPORATION

```
<
<                       case TCGETS:
<                               if (fmt == NULL)
<                                       fmt = STRTERMIOS;
<
<                       case LDGETT:
<                               if (fmt == NULL)
<                                       fmt = STRTERMCB;
<
<                       case TIOCGETP:
<                               if (fmt == NULL)
<                                       fmt = STRSGTTYB;
<                               strioc.ic_len = 0;
<                               strioc.ic_dp = (char *)arg;
<                               return (strdoioctl(stp, &strioc, NULL,
<                                   copyflag, fmt, crp, rvalp));
<                       }
<               }
<
<               /*
<                * Unknown cmd - send down request to support
<                * transparent ioctls.
<                */
<
<               strioc.ic_cmd = cmd;
<               strioc.ic_timout = INFTIM;
<               strioc.ic_len = TRANSPARENT;
<               strioc.ic_dp = (char *)&arg;
<               return (strdoioctl(stp, &strioc, NULL, copyflag, (char *)NULL,
<                   crp, rvalp));
<
<       case I_STR:
<               /*
<                * Stream ioctl.  Read in an strioctl buffer from the user
<                * along with any data specified and send it downstream.
<                * Strdoioctl will wait allow only one ioctl message at
<                * a time, and waits for the acknowledgement.
<                */
<
<               if (stp->sd_flag & STRHUP)
<                       return (ENXIO);
<               error = strcopyin((caddr_t)arg, (caddr_t)&strioc,
<                   sizeof(struct strioctl), STRIOCTL, copyflag);
<               if (error)
<                       return (error);
```

© COPYRIGHT 1994 AMDAHL CORPORATION

```
<               if ((strioc.ic_len < 0) || (strioc.ic_timout < -1))
<                       return (EINVAL);
<               error = strdoioctl(stp, &strioc, NULL, copyflag, (char *)NULL,
<                   crp, rvalp);
<               if (error == 0)
<                       error = strcopyout((caddr_t)&strioc, arg,
<                           sizeof(struct strioctl), STRIOCTL, copyflag);
<               return (error);
<
<       case I_NREAD:
<       case FIONREAD:
<               /*
<                * Return number of bytes of data in first message
<                * in queue in "arg" and return the number of messages
<                * in queue in return value.
<                */
<           {
<               int size = 0;
<               int count = 0;
<
<               s = splstr();
<               mp = RD(stp->sd_wrq)->q_first;
<               while (mp) {
<                       if (!(mp->b_flag & MSGNOGET))
<                               break;
<                       mp = mp->b_next;
<               }
<               if (mp)
<                       size = msgdsize(mp);
<               error = strcopyout(&size, (int *)arg, sizeof(size), STRINT,
<                   copyflag);
<               if (error || cmd == FIONREAD) {
<                       splx(s);
<                       return (error);
<               }
<               for (; mp; mp = mp->b_next)
<                       if (!(mp->b_flag & MSGNOGET))
<                               count++;
<               *rvalp = count;
<               splx(s);
<               return (error);
---
>         case RPROTDIS:
>               stp->sd_flag = ((stp->sd_flag & ~RDPROTDAT) |
>                   RDPROTDIS);
```

530

© COPYRIGHT 1994 AMDAHL CORPORATION

```
>               break;
1322,1667c420,431
<       case FIORDCHK:
<               /*
<                * FIORDCHK does not use arg value (like FIONREAD),
<                * instead a count is returned. I_NREAD value may
<                * not be accurate but safe. The real thing to do is
<                * to add the msgdsizes of all data messages until
<                * a non-data message.
<                */
<       {
<               int size = 0;
<
<               s = splstr();
<               mp = RD(stp->sd_wrq)->q_first;
<               while (mp) {
<                       if (!(mp->b_flag & MSGNOGET))
<                               break;
<                       mp = mp->b_next;
<               }
<               if (mp)
<                       size = msgdsize(mp);
<               *rvalp = size;
<               splx(s);
<               return (0);
<       }
<
<       case I_FIND:
<               /*
<                * Get module name.
<                */
<       {
<               char mname[FMNAMESZ+1];
<               queue_t *q;
<               int i;
<
<               error = strcopyin((caddr_t)arg, mname, FMNAMESZ+1, STRNAME,
<                   copyflag);
<               if (error)
<                       return (error);
<
<               /*
<                * Find module in fmodsw.
<                */
<               if ((i = findmod(mname)) < 0)
```

© COPYRIGHT 1994 AMDAHL CORPORATION

```
<                       return (EINVAL);
<
<               *rvalp = 0;
<
<               /* Look downstream to see if module is there. */
<               for (q = stp->sd_wrq->q_next; q &&
<                   (fmodsw[i].f_str->st_wrinit != q->q_qinfo); q = q->q_next)
<                       ;
<
<               *rvalp = (q ? 1 : 0);
<               return (error);
<       }
<
<   case I_PUSH:
<               /*
<                * Push a module.
<                */
<
<       {
<               register int i;
<               register queue_t *q;
<               register queue_t *tq;
<               register qband_t *qbp;
<               int idx;
<               dev_t dummydev;
<               o_pid_t *oldttyp;
<               uchar_t *rqbf, *wqbf;
<               int renab, wenab;
<               int nrband, nwband;
<               char mname[FMNAMESZ+1];
<
<               if (stp->sd_flag & STRHUP)
<                       return (ENXIO);
<               if (stp->sd_pushcnt >= nstrpush)
<                       return (EINVAL);
<
<               /*
<                * firewall - don't use too much memory
<                */
<
<               if (strthresh && (Strcount > strthresh) && pm_denied(u.u_cred, P_SYSOPS))
<                       return (ENOSR);
<
<               /*
<                * Get module name and look up in fmodsw.
```

© COPYRIGHT 1994 AMDAHL CORPORATION

```
<               */
<               error = strcopyin((caddr_t)arg, mname, FMNAMESZ+1, STRNAME,
<                   copyflag);
<               if (error)
<                       return (error);
<               if ((idx = findmod(mname)) < 0)
<                       return (EINVAL);
<
<               rqbf = kmem_zalloc(NBAND, KM_SLEEP);
<               wqbf = kmem_zalloc(NBAND, KM_SLEEP);
<               while (stp->sd_flag & STWOPEN) {
<                       if (flag & (FNDELAY|FNONBLOCK)) {
<                               kmem_free(rqbf, NBAND);
<                               kmem_free(wqbf, NBAND);
<                               return (EAGAIN);
<                       }
<                       if (sleep((caddr_t)stp, STOPRI|PCATCH)) {
<                               kmem_free(rqbf, NBAND);
<                               kmem_free(wqbf, NBAND);
<                               return (EINTR);
<                       }
<                       if (stp->sd_flag & (STRDERR|STWRERR|STRHUP|STPLEX)) {
<                               kmem_free(rqbf, NBAND);
<                               kmem_free(wqbf, NBAND);
<                               return ((stp->sd_flag & STPLEX) ? EINVAL :
<                                   (stp->sd_werror ? stp->sd_werror :
<                                   stp->sd_rerror));
<                       }
<               }
<               s = splstr();
<               stp->sd_flag |= STWOPEN;
<               oldttyp = u.u_ttyp;
<               q = RD(stp->sd_wrq);
<               renab = 0;
<               if (q->q_flag & QWANTW) {
<                       renab = 1;
<                       rqbf[0] = 1;
<               }
<               nrband = (int)q->q_nband;
<               for (i = 1, qbp = q->q_bandp; i <= nrband; i++) {
<                       if (qbp->qb_flag & QB_WANTW) {
<                               renab = 1;
<                               rqbf[i] = 1;
<                       }
<                       qbp = qbp->qb_next;
```

© COPYRIGHT 1994 AMDAHL CORPORATION

```
<               }
<               for (q = stp->sd_wrq->q_next; q && !q->q_qinfo->qi_srvp;
<                   q = q->q_next)
<                       ;
<               wenab = 0;
<               nwband = 0;
<               if (q) {
<                       if (q->q_flag & QWANTW) {
<                               wenab = 1;
<                               wqbf[0] = 1;
<                       }
<                       nwband = (int)q->q_nband;
<                       for (i = 1, qbp = q->q_bandp; i <= nwband; i++) {
<                               if (qbp->qb_flag & QB_WANTW) {
<                                       wenab = 1;
<                                       wqbf[i] = 1;
<                               }
<                               qbp = qbp->qb_next;
<                       }
<               }
<               splx(s);
<
<               /*
<                * Push new module and call its open routine
<                * via qattach(). Modules don't change device
<                * numbers, so just ignore dummydev here.
<                */
<               dummydev = vp->v_rdev;
<               if ((error = qattach(RD(stp->sd_wrq), &dummydev, 0, FMODSW, idx, crp)) == 0)
{
<
<                       stp->sd_pushcnt++;
<                       if (vp->v_type == VCHR) { /* sorry, no pipes allowed */
<                               if ((oldttyp == NULL) && (u.u_ttyp != NULL)) {
<
<                                       /*
<                                        * pre SVR4 driver has allocated the
<                                        * stream as a controlling terminal -
<                                        * check against SVR4 criteria and
<                                        * deallocate it if it fails
<                                        */
<                                       if (!strctty(u.u_procp, stp)) {
<                                               *u.u_ttyp = 0;
<                                               u.u_ttyp = NULL;
<                                       }
```

© COPYRIGHT 1994 AMDAHL CORPORATION

```
<                        } else if (stp->sd_flag & STRISTTY) {
<
<                                /*
<                                 * this is a post SVR4 tty driver -
<                                 * try to allocate it as a
<                                 * controlling terminal
<                                 */
<                                (void) strctty(u.u_procp, stp);
<                        }
<                }
<        } else {
<                s = splstr();
<                tq = RD(stp->sd_wrq);
<                for (q = backq(tq); q && !q->q_qinfo->qi_srvp;
<                    q = backq(q))
<                        ;
<                if (q) {
<                        done = 0;
<                        if (rqbf[0] && !(tq->q_flag & QWANTW))
<                                done = 1;
<                        else
<                                rqbf[0] = 0;
<                        qbp = tq->q_bandp;
<                        for (i = 1; i <= nrband; i++) {
<                                if (rqbf[i] && !(qbp->qb_flag&QB_WANTW))
<                                        done = 1;
<                                else
<                                        rqbf[i] = 0;
<                                qbp = qbp->qb_next;
<                        }
<                        if (done) {
<                                qenable(q);
<                                for (i = 0; i <= nrband; i++) {
<                                        if (rqbf[i])
<                                                setqback(q, i);
<                                }
<                        }
<                }
<                for (q = stp->sd_wrq->q_next; q && !q->q_qinfo->qi_srvp;
<                    q = q->q_next)
<                        ;
<                if (q) {
<                        done = 0;
<                        if (wqbf[0] && !(q->q_flag & QWANTW))
<                                done = 1;
```

© COPYRIGHT 1994 AMDAHL CORPORATION

```
<                               else
<                                       wqbf[0] = 0;
<                               qbp = q->q_bandp;
<                               for (i = 1; i <= nwband; i++) {
<                                       if (wqbf[i] && !(qbp->qb_flag&QB_WANTW))
<                                               done = 1;
<                                       else
<                                               wqbf[i] = 0;
<                                       qbp = qbp->qb_next;
<                               }
<                               if (done) {
<                                       qenable(stp->sd_wrq);
<                                       for (i = 0; i <= nwband; i++) {
<                                               if (wqbf[i])
<                                                   setqback(stp->sd_wrq, i);
<                                       }
<                               }
<                       }
<                       goto pushdone;
<               }
<
<               /*
<                * If flow control is on, don't break it - enable
<                * first back queue with svc procedure.
<                */
<               s = splstr();
<               q = RD(stp->sd_wrq->q_next);
<               if (q->q_qinfo->qi_srvp) {
<                       for (q = backq(q); q && !q->q_qinfo->qi_srvp;
<                           q = backq(q))
<                               ;
<                       if (q && renab) {
<                               qenable(q);
<                               for (i = 0; i <= nrband; i++) {
<                                       if (rqbf[i])
<                                               setqback(q, i);
<                               }
<                       }
<               }
<               q = stp->sd_wrq->q_next;
<               if (q->q_qinfo->qi_srvp) {
<                       if (wenab) {
<                               qenable(stp->sd_wrq);
<                               for (i = 0; i <= nwband; i++) {
<                                       if (wqbf[i])
```

© COPYRIGHT 1994 AMDAHL CORPORATION

```
<                                       setqback(stp->sd_wrq, i);
<                               }
<                       }
<               }
< pushdone:
<               stp->sd_flag &= ~STWOPEN;
<               splx(s);
<               kmem_free((caddr_t)rqbf, NBAND);
<               kmem_free((caddr_t)wqbf, NBAND);
<               wakeprocs((caddr_t)stp, PRMPT);
<               return (error);
<       }
<
<       case I_POP:
<               /*
<                * Pop module (if module exists).
<                */
<               if (stp->sd_flag&STRHUP)
<                       return (ENXIO);
<               if (!stp->sd_wrq->q_next)      /* for broken pipes */
<                       return (EINVAL);
<               if (stp->sd_wrq->q_next->q_next &&
<                   !(stp->sd_wrq->q_next->q_flag & QREADR)) {
<                       qdetach(RD(stp->sd_wrq->q_next), 1, flag, crp);
<                       stp->sd_pushcnt--;
<                       return (0);
<               }
<               return (EINVAL);
<
<       case I_LOOK:
<               /*
<                * Get name of first module downstream.
<                * If no module, return an error.
<                */
<       {
<               int i;
<
<               for (i = 0; i < fmodcnt; i++)
<                       if (fmodsw[i].f_str->st_wrinit == stp->sd_wrq->q_next->q_qinfo) {
<                               error = strcopyout(fmodsw[i].f_name,
<                                   (char *)arg, FMNAMESZ+1, STRNAME, copyflag);
<                               return (error);
<                       }
<               return (EINVAL);
<       }
```

© COPYRIGHT 1994 AMDAHL CORPORATION

```
<
<       case I_LINK:
<       case I_PLINK:
<               /*
<                * Link a multiplexor.
<                */
<           {
<               struct file *fpdown;
<               struct linkinfo *linkp, *alloclink();
<               struct stdata *stpdown;
<               queue_t *rq;
<
<               /*
<                * Test for invalid upper stream
<                */
<               if (stp->sd_flag & STRHUP)
<                       return (ENXIO);
<               if (vp->v_type == VFIFO)
<                       return (EINVAL);
<               if (!stp->sd_strtab->st_muxwinit)
<                       return (EINVAL);
<               if (error = getf(arg, &fpdown))
<                       return (error);
<
<               /*
<                * Test for invalid lower stream.
<                */
<               if (((stpdown = fpdown->f_vnode->v_stream) == NULL) ||
<                   (stpdown == stp) || (stpdown->sd_flag &
<                   (STPLEX|STRHUP|STRDERR|STWRERR|IOCWAIT)) ||
<                   linkcycle(stp, stpdown))
<                       return (EINVAL);
<               if (cmd == I_PLINK)
<                       rq = NULL;
---
>       }
>       if (sop->so_flags & SO_WROFF)
>           stp->sd_wroff = sop->so_wroff;
>       if (sop->so_flags & SO_MINPSZ)
>           q->q_minpsz = sop->so_minpsz;
>       if (sop->so_flags & SO_MAXPSZ)
>           q->q_maxpsz = sop->so_maxpsz;
>       if (sop->so_flags & SO_HIWAT) {
>           if (sop->so_flags & SO_BAND) {
>               if (strqset(q, QHIWAT, sop->so_band, sop->so_hiwat))
```

© COPYRIGHT 1994 AMDAHL CORPORATION

```
>               cmn_err(CE_WARN,
>                       "strrput: could not allocate qband\n");
1669,1716c433,435
<                       rq = getendq(stp->sd_wrq);
<               if (!(linkp = alloclink(rq, stpdown->sd_wrq, fpdown)))
<                       return (EAGAIN);
<               strioc.ic_cmd = cmd;
<               strioc.ic_timout = 0;
<               strioc.ic_len = sizeof(struct linkblk);
<               strioc.ic_dp = (char *)&linkp->li_lblk;
<
<               /* Set up queues for link */
<               rq = RD(stpdown->sd_wrq);
<               setq(rq, stp->sd_strtab->st_muxrinit, stp->sd_strtab->st_muxwinit);
<               rq->q_ptr = WR(rq)->q_ptr = NULL;
<               rq->q_flag |= QWANTR;
<               WR(rq)->q_flag |= QWANTR;
<
<               if (error = strdoioctl(stp, &strioc, NULL, K_TO_K, STRLINK, crp, rvalp)) {
<                       lbfree(linkp);
<                       setq(rq, &strdata, &stwdata);
<                       rq->q_ptr = WR(rq)->q_ptr = (caddr_t)stpdown;
<                       return (error);
<               }
<               s = splstr();
<               stpdown->sd_flag |= STPLEX;
<               fpdown->f_count++;
<               if (error = mux_addedge(stp, stpdown, linkp->li_lblk.l_index)) {
<                       int type;
<                       if (cmd == I_LINK) {
<                               type = LINKIOCTL|LINKNORMAL;
<                               strioc.ic_cmd = I_UNLINK;
<                       } else {        /* I_PLINK */
<                               type = LINKIOCTL|LINKPERSIST;
<                               strioc.ic_cmd = I_PUNLINK;
<                       }
<                       splx(s);
<                       (void) munlink(stp, linkp, type, crp, rvalp);
<                       return (error);
<               }
<               splx(s);
<               /*
<                * Wake up any other processes that may have been
<                * waiting on the lower stream. These will all
<                * error out.
```

© COPYRIGHT 1994 AMDAHL CORPORATION

```
<               */
<               wakeprocs((caddr_t)rq, PRMPT);
<               wakeprocs((caddr_t)WR(rq), PRMPT);
<               wakeprocs((caddr_t)stpdown, PRMPT);
<               *rvalp = linkp->li_lblk.l_index;
<               return (0);
---
>                       bpri = sop->so_band;
>               } else {
>                       q->q_hiwat = sop->so_hiwat;
1718,2216c437,442
<
<       case I_UNLINK:
<       case I_PUNLINK:
<               /*
<                * Unlink a multiplexor.
<                * If arg is -1, unlink all links for which this is the
<                * controlling stream.  Otherwise, arg is a index number
<                * for a link to be removed.
<                */
<           {
<               struct linkinfo *linkp;
<               int type;
<
<               if (vp->v_type == VFIFO)
<                       return (EINVAL);
<               if (cmd == I_UNLINK)
<                       type = LINKIOCTL|LINKNORMAL;
<               else    /* I_PUNLINK */
<                       type = LINKIOCTL|LINKPERSIST;
<               if (arg == 0)
<                       return (EINVAL);
<               if (arg == MUXID_ALL)
<                       error = munlinkall(stp, type, crp, rvalp);
<               else {
<                       if (!(linkp = findlinks(stp, arg, type))) {
<                               /* invalid user supplied index number */
<                               return (EINVAL);
<                       }
<                       error = munlink(stp, linkp, type, crp, rvalp);
<               }
<               return (error);
<           }
<
<       case I_FLUSH:
```

549

© COPYRIGHT 1994 AMDAHL CORPORATION

```
<           /*
<            * send a flush message downstream
<            * flush message can indicate
<            * FLUSHR - flush read queue
<            * FLUSHW - flush write queue
<            * FLUSHRW - flush read/write queue
<            */
<           if (stp->sd_flag & STRHUP)
<                   return (ENXIO);
<           if (arg & ~FLUSHRW)
<                   return (EINVAL);
<           while (!putctl1(stp->sd_wrq->q_next, M_FLUSH, arg))
<                   if (error = strwaitbuf(1, BPRI_HI))
<                           return (error);
<
<           if (qready())
<                   runqueues();
<           return (0);
<
<   case I_FLUSHBAND:
<       {
<           struct bandinfo binfo;
<
<           error = strcopyin((caddr_t)arg, (caddr_t)&binfo, sizeof(struct
<               bandinfo), STRBANDINFO, copyflag);
<           if (error)
<                   return (error);
<           if (stp->sd_flag & STRHUP)
<                   return (ENXIO);
<           if (binfo.bi_flag & ~FLUSHRW)
<                   return (EINVAL);
<           while (!(mp = allocb(2, BPRI_HI))) {
<                   if (error = strwaitbuf(2, BPRI_HI))
<                           return (error);
<           }
<           mp->b_datap->db_type = M_FLUSH;
<           *mp->b_wptr++ = binfo.bi_flag | FLUSHBAND;
<           *mp->b_wptr++ = binfo.bi_pri;
<           putnext(stp->sd_wrq, mp);
<           if (qready())
<                   runqueues();
<           return (0);
<       }
<
<   case I_SRDOPT:
```

© COPYRIGHT 1994 AMDAHL CORPORATION

```
<           /*
<            * Set read options
<            *
<            * RNORM - default stream mode
<            * RMSGN - message no discard
<            * RMSGD - message discard
<            * RPROTNORM - fail read with EBADMSG for M_[PC]PROTOs
<            * RPROTDAT - convert M_[PC]PROTOs to M_DATAs
<            * RPROTDIS - discard M_[PC]PROTOs and retain M_DATAs
<            */
<           if (arg & ~(RMODEMASK | RPROTMASK))
<                   return (EINVAL);
<
<           s = splstr();
<           switch (arg & RMODEMASK) {
<           case RNORM:
<                   stp->sd_flag &= ~(RMSGDIS | RMSGNODIS);
<                   break;
<           case RMSGD:
<                   stp->sd_flag = (stp->sd_flag & ~RMSGNODIS) | RMSGDIS;
<                   break;
<           case RMSGN:
<                   stp->sd_flag = (stp->sd_flag & ~RMSGDIS) | RMSGNODIS;
<                   break;
<           }
<
<           switch(arg & RPROTMASK) {
<           case RPROTNORM:
<                   stp->sd_flag &= ~(RDPROTDAT | RDPROTDIS);
<                   break;
<
<           case RPROTDAT:
<                   stp->sd_flag = ((stp->sd_flag & ~RDPROTDIS) |
<                       RDPROTDAT);
<                   break;
<
<           case RPROTDIS:
<                   stp->sd_flag = ((stp->sd_flag & ~RDPROTDAT) |
<                       RDPROTDIS);
<                   break;
<           }
<           splx(s);
<           return (0);
<
<       case I_GRDOPT:
```

© COPYRIGHT 1994 AMDAHL CORPORATION

```
<               /*
<                * Get read option and return the value
<                * to spot pointed to by arg
<                */
<           {
<               int rdopt;
<
<               rdopt = ((stp->sd_flag & RMSGDIS) ? RMSGD :
<                       ((stp->sd_flag & RMSGNODIS) ? RMSGN : RNORM));
<               rdopt |= ((stp->sd_flag & RDPROTDAT) ? RPROTDAT :
<                       ((stp->sd_flag & RDPROTDIS) ? RPROTDIS : RPROTNORM));
<
<               error = strcopyout(&rdopt, (int *)arg, sizeof(rdopt), STRINT,
<                   copyflag);
<               return (error);
<           }
< #ifdef GEM
<       case I_SETEV:
<           {
<               register struct strevent *osep, *sep, *psep;
<               str_sev_t strsev;
<               vnode_t *evp;
<
<               error = strcopyin((caddr_t)arg, &strsev, sizeof(str_sev_t),
<                   STRSEV, copyflag);
<               if (error)
<                       return (error);
<               psep = NULL;
<               if (strsev.se_ecb.ecb_eqd == EQ_NOQUEUE) { /* remove entries */
<                       error = EINVAL;
<                       s = splstr();
<                       sep = stp->sd_eventlist;
<                       while (sep) {
<                               if ((sep->se_pid == u.u_procp->p_pid) &&
<                                   (sep->se_kband == strsev.se_band) &&
<                                   (sep->se_kecb.ecb_eid == strsev.se_ecb.ecb_eid) &&
<                                   (sep->se_kmask & strsev.se_mask)) {
<                                       error = 0;
<                                       sep->se_kmask &= ~strsev.se_mask;
<                                       if (sep->se_kmask) {
<                                               psep = sep;
<                                               sep = sep->se_next;
<                                               continue;
<                                       }
<                                       VN_RELE(sep->se_vp);
```

© COPYRIGHT 1994 AMDAHL CORPORATION

```
<				osep = sep;
<				if (psep)
<					psep->se_next = sep->se_next;
<				else
<					stp->sd_eventlist = sep->se_next;
<				sep = sep->se_next;
<				sefree(osep);
<			} else {
<				psep = sep;
<				sep = sep->se_next;
<			}
<		}
<		if (error == 0) {	/* recalculate eventflags */
<			stp->sd_eventflags = 0;
<			for (sep = stp->sd_eventlist; sep; sep = sep->se_next)
<				stp->sd_eventflags |= sep->se_kmask;
<		}
<		splx(s);
<		return (error);
<	}
<
<	/*
<	 * Add an entry to sd_eventlist.
<	 */
<	if (arg & ~(S_INPUT|S_OUTPUT|S_HIPRI|S_MSG|S_HANGUP|S_ERROR)) {
<		return (EINVAL);
<	}
<	if (error = ev_eqdtovp(strsev.se_ecb.ecb_eqd, 0, &evp, NULL)) {
<		return (error);
<	}
<	VN_HOLD(evp);
<	s = splstr();
<	for (sep = stp->sd_eventlist; sep; psep = sep, sep = sep->se_next)
<		if ((sep->se_pid == u.u_procp->p_pid) &&
<		    (sep->se_uid == crp->cr_uid) &&
<		    (sep->se_kband == strsev.se_band) &&
<		    (sep->se_vp == evp) &&
<		    (sep->se_kecb.ecb_eid == strsev.se_ecb.ecb_eid) &&
<		    (sep->se_kecb.ecb_evpri == strsev.se_ecb.ecb_evpri))
<			break;
<	if (!sep) {
<		if (!(sep = sealloc(SE_SLEEP))) {
<			splx(s);
<			VN_RELE(evp);
<			return (EAGAIN);
```

© COPYRIGHT 1994 AMDAHL CORPORATION

```
<                       }
<                       if (psep)
<                               psep->se_next = sep;
<                       else
<                               stp->sd_eventlist = sep;
<                       sep->se_vp = evp;
<                       sep->se_kecb = strsev.se_ecb;
<                       sep->se_pid = u.u_procp->p_pid;
<                       sep->se_hostid = P_MYHOSTID;
<                       sep->se_uid = crp->cr_uid;
<                       sep->se_kmask = strsev.se_mask;
<                       sep->se_kband = strsev.se_band;
<               } else {
<                       sep->se_kmask |= strsev.se_mask;
<               }
<               stp->sd_eventflags |= strsev.se_mask;
<               splx(s);
<               return (0);
<       }
<
<       case I_GETEV:
<       {
<               register struct strevent *sep;
<               str_gev_t strgev;
<               str_gev_t *strgevp;
<               str_sev_t strsev;
<               str_sev_t *strsevp;
<               vnode_t *evp;
<               int i;
<               register pid_t pid = u.u_procp->p_pid;
<
<               if (arg == NULL) {
<
<                       /*
<                        * Return number of events being posted.
<                        */
<                       i = 0;
<                       for (sep = stp->sd_eventlist; sep; sep = sep->se_next)
<                               i++;
<                       *rvalp = i;
<                       return (0);
<               }
<
<               /*
<                * Find out what the user wants.
```

© COPYRIGHT 1994 AMDAHL CORPORATION

```
<	 */
<	error = strcopyin((caddr_t)arg, &strgev, sizeof(str_gev_t),
<	    STRGEV, copyflag);
<	if (error)
<		return (error);
<	if (strgev.ge_flags & ~(GEF_PROC))
<		return (EINVAL);
<	i = strgev.ge_ses;
<	strsevp = strgev.ge_sep;
<	s = splstr();
<	for (sep = stp->sd_eventlist; sep; sep = sep->se_next) {
<		if (i == 0)
<			break;
<
<		/*
<		 * To do: check hostid of process too.
<		 */
<		if ((strgev.ge_flags & GEF_PROC) && (sep->se_pid != pid))
<			continue;
<		if (sep->se_pid == pid) {
<
<			/*
<			 * To do: check to see that
<			 * sep->se_hostid == hostid of curproc.
<			 */
<			if (ev_eqdtovp(sep->se_kecb.ecb_eqd, 0, &evp, NULL))
<				strsev.se_ecb.ecb_eqd = EQ_NOQUEUE;
<			else if (sep->se_vp != evp)
<				strsev.se_ecb.ecb_eqd = EQ_NOQUEUE;
<			else
<				strsev.se_ecb.ecb_eqd = sep->se_kecb.ecb_eqd;
<		} else
<			strsev.se_ecb.ecb_eqd = EQ_NOQUEUE;
<		strsev.se_ecb.ecb_flags = sep->se_kecb.ecb_flags;
<		strsev.se_ecb.ecb_eid = sep->se_kecb.ecb_eid;
<		strsev.se_ecb.ecb_evpri = sep->se_kecb.ecb_evpri;
<		strsev.se_mask = sep->se_kmask;
<		strsev.se_band = sep->se_kband;
<		error = strcopyout((caddr_t)&strsev, (caddr_t)strsevp,
<		    sizeof(str_sev_t), STRSEV, copyflag);
<		if (error) {
<			splx(s);
<			return (error);
<		}
<		i--;
```

© COPYRIGHT 1994 AMDAHL CORPORATION

```
<                       strsevp++;
<               }
<               if ((i == 0) && (sep != NULL)) {
<                       if (strgev.ge_flags & GEF_PROC) {
<                               while (sep) {
<
<                                       /*
<                                        * To do: check hostid too.
<                                        */
<                                       if (sep->se_pid == pid) {
<                                               strgev.ge_flags |= GEF_MORE;
<                                               break;
<                                       }
<                                       sep = sep->se_next;
<                               }
<                       } else {
<                               strgev.ge_flags |= GEF_MORE;
<                       }
<               }
<               splx(s);
<               if (strgev.ge_flags & GEF_MORE) {
<                       error = strcopyout((caddr_t)&strgev, (caddr_t)arg,
<                           sizeof(str_gev_t), STRGEV, copyflag);
<                       if (error)
<                               return (error);
<               }
<               *rvalp = strgev.ge_ses - i;
<               return (0);
<           }
<
<       case I_STREV:
<       case I_UNSTREV:
<           {
<               struct str_event stev;
<               struct str_evmsg *ep;
<               mblk_t *bp;
<
<               if (stp->sd_flag & STRHUP)
<                       return (ENXIO);
<               error = strcopyin((caddr_t)arg, (caddr_t)&stev,
<                   sizeof(struct strevent), STREVENT, copyflag);
<               if (error)
<                       return (error);
<               while ((bp = allocb(sizeof(struct str_evmsg), 0)) == NULL)
<                       if (error = strwaitbuf(sizeof(struct str_evmsg), 0))
```

© COPYRIGHT 1994 AMDAHL CORPORATION

```
<                               return (error);
<                 ep = (struct str_evmsg *)bp->b_rptr;
<                 ep->sv_event = stev.ste_event;
<                 if ((cmd == I_UNSTREV) && (stev.ste_ecb.ecb_eqd == EQ_NOQUEUE))
<                         ep->sv_vp = NULL;
<                 else if (error = ev_eqdtovp(stev.ste_ecb.ecb_eqd, 0,
<                     &ep->sv_vp, NULL)) {
<                         freeb(bp);
<                         return (error);
<                 }
<                 ep->sv_eid = stev.ste_ecb.ecb_eid;
<                 ep->sv_evpri = stev.ste_ecb.ecb_evpri;
<                 ep->sv_flags = stev.ste_evflags;
<                 ep->sv_uid = crp->cr_uid;
<                 ep->sv_pid = u.u_procp->p_pid;
<                 ep->sv_hostid = 0; /* To do: set to hostid of curproc */
<                 bp->b_wptr += sizeof(struct str_evmsg);
<                 strioc.ic_cmd = cmd;
<                 strioc.ic_timout = INFTIM;
<                 strioc.ic_dp = stev.ste_buf.buf;
<                 if (stev.ste_buf.buf != NULL)
<                         strioc.ic_len = stev.ste_buf.len;
<                 else
<                         strioc.ic_len = 0;
<                 return (strdoioctl(stp, &strioc, bp, copyflag, (char *)NULL, crp, rvalp));
<         }
<
< #endif /* GEM */
<       case I_SETSIG:
<                 /*
<                  * Register the calling proc to receive the SIGPOLL
<                  * signal based on the events given in arg.  If
<                  * arg is zero, remove the proc from register list.
<                  */
<         {
<                 struct strevent *sep, *psep;
<
<                 psep = NULL;
<                 s = splstr();
<                 for (sep = stp->sd_siglist; sep && (sep->se_procp !=
<                     u.u_procp); psep = sep, sep = sep->se_next)
<                         ;
<
<                 if (arg) {
<                         if (arg & ~(S_INPUT|S_HIPRI|S_MSG|S_HANGUP|S_ERROR|
```

© COPYRIGHT 1994 AMDAHL CORPORATION

```
<                       S_RDNORM|S_WRNORM|S_RDBAND|S_WRBAND|S_BANDURG)) {
<                               splx(s);
<                               return (EINVAL);
<                       }
<                       if ((arg & S_BANDURG) && !(arg & S_RDBAND)) {
<                               splx(s);
<                               return (EINVAL);
<                       }
<
<                       /*
<                        * If proc not already registered, add it
<                        * to list.
<                        */
<                       if (!sep) {
<                               if (!(sep = sealloc(SE_SLEEP))) {
<                                       splx(s);
<                                       return (EAGAIN);
<                               }
<                               if (psep)
<                                       psep->se_next = sep;
<                               else
<                                       stp->sd_siglist = sep;
<                               sep->se_procp = u.u_procp;
<                       }
<
<                       /*
<                        * Set events.
<                        */
<                       sep->se_events = arg;
<               } else {
<
<                       /*
<                        * Remove proc from register list.
<                        */
<                       if (sep) {
<                               if (psep)
<                                       psep->se_next = sep->se_next;
<                               else
<                                       stp->sd_siglist = sep->se_next;
<                               sefree(sep);
<                       } else {
<                               splx(s);
<                               return (EINVAL);
<                       }
<               }
```

© COPYRIGHT 1994 AMDAHL CORPORATION

```
<
<               /*
<                * Recalculate OR of sig events.
<                */
<               stp->sd_sigflags = 0;
<               for (sep = stp->sd_siglist; sep; sep = sep->se_next)
<                       stp->sd_sigflags |= sep->se_events;
<               splx(s);
<               return (0);
<       }
<
<   case I_GETSIG:
<               /*
<                * Return (in arg) the current registration of events
<                * for which the calling proc is to be signalled.
<                */
<       {
<               struct strevent *sep;
<
<               s = splstr();
<               for (sep = stp->sd_siglist; sep; sep = sep->se_next)
<                       if (sep->se_procp == u.u_procp) {
<                               error = strcopyout((caddr_t)&sep->se_events,
<                                   (int *)arg, sizeof(int), STRINT, copyflag);
<                               splx(s);
<                               return (error);
<                       }
<               splx(s);
<               return (EINVAL);
<       }
<
<   case I_PEEK:
<       {
<               struct strpeek strpeek;
<               int n;
<
<               error = strcopyin((caddr_t)arg, (caddr_t)&strpeek,
<                 sizeof(strpeek), STRPEEK, copyflag);
<               if (error)
<                       return (error);
<
<               s = splstr();
<               mp = RD(stp->sd_wrq)->q_first;
<               while (mp) {
<                       if (!(mp->b_flag & MSGNOGET))
```

© COPYRIGHT 1994 AMDAHL CORPORATION

```
<                               break;
<                       mp = mp->b_next;
<               }
<               splx(s);
<               if (!mp || ((strpeek.flags & RS_HIPRI) &&
<                   queclass(mp) == QNORM)) {
<                       *rvalp = 0;
<                       return (0);
<               }
<
<               if (mp->b_datap->db_type == M_PASSFP)
<                       return (EBADMSG);
<
<               if (mp->b_datap->db_type == M_PCPROTO)
<                       strpeek.flags = RS_HIPRI;
---
>       }
>       if (sop->so_flags & SO_LOWAT) {
>           if (sop->so_flags & SO_BAND) {
>               if (strqset(q, QLOWAT, sop->so_band, sop->so_lowat))
>                   cmn_err(CE_WARN,
>                       "strrput: could not allocate qband\n");
2218,2262c444,446
<                       strpeek.flags = 0;
<
<               /*
<                * First process PROTO blocks, if any.
<                */
<               iov.iov_base = strpeek.ctlbuf.buf;
<               iov.iov_len = strpeek.ctlbuf.maxlen;
<               uio.uio_iov = &iov;
<               uio.uio_iovcnt = 1;
<               uio.uio_offset = 0;
<               uio.uio_segflg = (copyflag == U_TO_K) ? UIO_USERSPACE :
<                   UIO_SYSSPACE;
<               uio.uio_fmode = 0;
<               uio.uio_resid = iov.iov_len;
<               while (mp && mp->b_datap->db_type != M_DATA && uio.uio_resid >= 0) {
<                       if ((n = MIN(uio.uio_resid, mp->b_wptr - mp->b_rptr)) &&
<                           (error = uiomove((caddr_t)mp->b_rptr, n, UIO_READ, &uio)))
<                               return (error);
<                       mp = mp->b_cont;
<               }
<               strpeek.ctlbuf.len = strpeek.ctlbuf.maxlen - uio.uio_resid;
<
```

© COPYRIGHT 1994 AMDAHL CORPORATION

```
<           /*
<            * Now process DATA blocks, if any.
<            */
<           while (mp && mp->b_datap->db_type != M_DATA)
<                   mp = mp->b_cont;
<           iov.iov_base = strpeek.databuf.buf;
<           iov.iov_len = strpeek.databuf.maxlen;
<           uio.uio_iovcnt = 1;
<           uio.uio_resid = iov.iov_len;
<           while (mp && uio.uio_resid >= 0) {
<                   if ((n = MIN(uio.uio_resid, mp->b_wptr - mp->b_rptr)) &&
<                       (error = uiomove((char *)mp->b_rptr, n, UIO_READ, &uio)))
<                           return (error);
<                   mp = mp->b_cont;
<           }
<
<           strpeek.databuf.len = strpeek.databuf.maxlen - uio.uio_resid;
<           error = strcopyout((caddr_t)&strpeek, (caddr_t)arg,
<               sizeof(strpeek), STRPEEK, copyflag);
<           if (error)
<                   return (error);
<           *rvalp = 1;
<           return 0;
---
>               bpri = sop->so_band;
>       } else {
>               q->q_lowat = sop->so_lowat;
2264,2799d447
<
<       case I_FDINSERT:
<           {
<               struct strfdinsert strfdinsert;
<               struct file *resftp;
<               struct stdata *resstp;
<               queue_t *q;
<               register long msgsize;
<               long rmin, rmax;
<               int strmakemsg();
<
<               if (stp->sd_flag & STRHUP)
<                       return (ENXIO);
<               if (stp->sd_flag & (STRDERR|STWRERR|STPLEX))
<                       return ((stp->sd_flag & STPLEX) ? EINVAL :
<                           (stp->sd_werror ? stp->sd_werror : stp->sd_rerror));
<               error = strcopyin((caddr_t)arg, (caddr_t)&strfdinsert,
```

© COPYRIGHT 1994 AMDAHL CORPORATION

```
<               sizeof(strfdinsert), STRFDINSERT, copyflag);
<           if (error)
<                   return (error);
<           if (strfdinsert.offset < 0 ||
<             (strfdinsert.offset % sizeof(queue_t *)) != 0)
<                   return (EINVAL);
<           if (getf(strfdinsert.fildes, &resftp) ||
<             ((resstp = resftp->f_vnode->v_stream) == NULL))
<                   return (EINVAL);
<
<           if (resstp->sd_flag & (STRDERR|STWRERR|STRHUP|STPLEX))
<                   return ((resstp->sd_flag & STPLEX) ? EINVAL :
<                       (resstp->sd_werror ? resstp->sd_werror :
<                       resstp->sd_rerror));
<
<           /* get read queue of stream terminus */
<           for (q = resstp->sd_wrq->q_next; q->q_next; q = q->q_next)
<                   ;
<           q = RD(q);
<
<           if (strfdinsert.ctlbuf.len < strfdinsert.offset + sizeof(queue_t *))
<                   return (EINVAL);
<
<           /*
<            * Check for legal flag value.
<            */
<           if (strfdinsert.flags & ~RS_HIPRI)
<                   return (EINVAL);
<
<           /*
<            * Make sure ctl and data sizes together fall within
<            * the limits of the max and min receive packet sizes
<            * and do not exceed system limit.  A negative data
<            * length means that no data part is to be sent.
<            */
<           rmin = stp->sd_wrq->q_next->q_minpsz;
<           rmax = stp->sd_wrq->q_next->q_maxpsz;
<           ASSERT((rmax >= 0) || (rmax == INFPSZ));
<           if (rmax == 0)
<                   return (ERANGE);
<           if (strmsgsz != 0) {
<                   if (rmax == INFPSZ)
<                           rmax = strmsgsz;
<                   else
<                           rmax = MIN(strmsgsz, rmax);
```

© COPYRIGHT 1994 AMDAHL CORPORATION

```
<               }
<               if ((msgsize = strfdinsert.databuf.len) < 0)
<                       msgsize = 0;
<               if ((msgsize < rmin) ||
<                   ((msgsize > rmax) && (rmax != INFPSZ)) ||
<                   (strfdinsert.ctlbuf.len > strctlsz))
<                       return (ERANGE);
<
<               s = splstr();
<               while (!(strfdinsert.flags & RS_HIPRI) &&
<                   !bcanput(stp->sd_wrq->q_next, 0)) {
<                       if ((error = strwaitq(stp, WRITEWAIT, (off_t)0,
<                           flag, &done)) || done) {
<                               splx(s);
<                               return (error);
<                       }
<               }
<               splx(s);
<
<               iov.iov_base = strfdinsert.databuf.buf;
<               iov.iov_len = strfdinsert.databuf.len;
<               uio.uio_iov = &iov;
<               uio.uio_iovcnt = 1;
<               uio.uio_offset = 0;
<               uio.uio_segflg = (copyflag == U_TO_K) ? UIO_USERSPACE :
<                   UIO_SYSSPACE;
<               uio.uio_fmode = 0;
<               uio.uio_resid = iov.iov_len;
<               if ((error = strmakemsg(&strfdinsert.ctlbuf,
<                   strfdinsert.databuf.len, &uio, stp,
<                   strfdinsert.flags, &mp)) || !mp)
<                       return (error);
<
<               /*
<                * Place pointer to queue 'offset' bytes from the
<                * start of the control portion of the message.
<                */
<
<               *((queue_t **)(mp->b_rptr + strfdinsert.offset)) = q;
<
<               /*
<                * Put message downstream.
<                */
<               (*stp->sd_wrq->q_next->q_qinfo->qi_putp)(stp->sd_wrq->q_next, mp);
<               if (qready())
```

© COPYRIGHT 1994 AMDAHL CORPORATION

```
<                       runqueues();
<               return (error);
<       }
<
<   case I_SENDFD:
<       {
<               register queue_t *qp;
<               register struct adt_strrecvfd *adtstr;
<               register struct strrecvfd *srf;
<               register struct adtrecvfd *arf;
<               struct file *fp;
<
<               if (stp->sd_flag & STRHUP)
<                       return (ENXIO);
<
<               for (qp = stp->sd_wrq; qp->q_next; qp = qp->q_next)
<                       ;
<               if (qp->q_qinfo != &strdata)
<                       return (EINVAL);
<               if (error = getf(arg, &fp))
<                       return (error);
<               if ((qp->q_flag & QFULL) ||
<                   !(mp = allocb(sizeof(struct adt_strrecvfd), BPRI_MED)))
<                       return (EAGAIN);
<               adtstr = (struct adt_strrecvfd *)mp->b_rptr;
<               srf = (struct strrecvfd *)&adtstr->adt_strrecvfd;
<               arf = (struct adtrecvfd *)&adtstr->adt_adtrecvfd;
<               mp->b_wptr += sizeof(struct adt_strrecvfd);
<               mp->b_datap->db_type = M_PASSFP;
<               srf->f.fp = fp;
<               srf->uid = u.u_cred->cr_uid;
<               srf->gid = u.u_cred->cr_gid;
<               arf->adtrfd_sendpid = u.u_procp->p_pidp->pid_id;
<               arf->adtrfd_sendfd = arg;
<               fp->f_count++;
<               strrput(qp, mp);
<               return (0);
<       }
<
<   case I_RECVFD:
<   case I_E_RECVFD:
<   case I_S_RECVFD:
<       {
<               register struct adt_strrecvfd *adtstr;
<               register struct strrecvfd *srf;
```

© COPYRIGHT 1994 AMDAHL CORPORATION

```
<               register struct adtrecvfd *arf;
<               int vmode;
<               int i, fd;
<               struct cred *rcv_crp;
<               struct file *fp;
<               union {
<                       struct e_strrecvfd estrfd; /* EFT data structure */
<                       struct o_strrecvfd ostrfd; /* non-EFT data structure -
<                                                   * SVR3 compatibility mode.
<                                                   */
<               } str;
<
<               s = splstr();
<               while (!(mp = getq(RD(stp->sd_wrq)))) {
<                       if (stp->sd_flag & STRHUP) {
<                               splx(s);
<                               return (ENXIO);
<                       }
<                       if ((error = strwaitq(stp, GETWAIT, (off_t) 0,
<                           flag, &done)) || done) {
<                               splx(s);
<                               return (error);
<                       }
<               }
<               if (mp->b_datap->db_type != M_PASSFP) {
<                       putbq(RD(stp->sd_wrq), mp);
<                       splx(s);
<                       return (EBADMSG);
<               }
<               splx(s);
<               adtstr = (struct adt_strrecvfd *)mp->b_rptr;
<               srf = (struct strrecvfd *)&adtstr->adt_strrecvfd;
<               arf = (struct adtrecvfd *)&adtstr->adt_adtrecvfd;
<
<               /*
<                * make sure the process receiving this file
<                * descriptor has the appropriate domination and/or
<                * privileges to use this file descriptor.
<                */
<               fp = srf->f.fp;
<               /*
<                * if type is VFIFO then check for MAC_WRITE regardless
<                * of flag value.
<                */
<               if (fp->f_vnode->v_type == VFIFO)
```

© COPYRIGHT 1994 AMDAHL CORPORATION

```
<                   vmode = VWRITE;
<           else
<                   vmode = (fp->f_flag & (FWRITE|FTRUNC)) ? VWRITE : VREAD;
<
<           if (error = MAC_VACCESS(fp->f_vnode, vmode, crp)) {
<                   putbq(RD(stp->sd_wrq), mp);
<                   return (error);
<           }
<
<           /*
<            * If sender of the file was not its owner, the receiver must
<            * pass DAC on the file to be received.  For compatability,
<            * the check is only performed if MAC is installed.
<            */
<           if (mac_installed) {
<                   vattr_t va;
<
<                   /*
<                    * Using files open time credentials instead of the
<                    * receivers credentials to get the file attributes
<                    * because the VOP_GETATTR is on be-half of the kernel
<                    * and not the user attempting to receive the file.
<                    */
<                   if (error = VOP_GETATTR(fp->f_vnode, &va, 0,
<                       fp->f_cred)) {
<                           putbq(RD(stp->sd_wrq), mp);
<                           return (error);
<                   }
<                   if (srf->uid != va.va_uid) {
<                           if (error = VOP_ACCESS(fp->f_vnode,
<                               vmode, DAC_ACC, u.u_cred)) {
<                                   putbq(RD(stp->sd_wrq), mp);
<                                   return (error);
<                           }
<                   }
<           }
<           if (error = ufalloc(0, &fd)) {
<                   putbq(RD(stp->sd_wrq), mp);
<                   return (error);
<           }
<           setf(fd, fp);
<           if (cmd == I_S_RECVFD)
<                   rcv_crp = fp->f_cred;
<           srf->f.fd = fd;
<
```

© COPYRIGHT 1994 AMDAHL CORPORATION

```
<               if (cmd == I_RECVFD) {
<                       /* check to see if uid/gid values are too large. */
<
<                       if (srf->uid > USHRT_MAX || srf->gid > USHRT_MAX) {
<                               srf->f.fp = fp;
<                               putbq(RD(stp->sd_wrq), mp);
<                               setf(fd, NULLFP);
<                               return (EOVERFLOW);
<                       }
<                       str.ostrfd.f.fd = srf->f.fd;
<                       str.ostrfd.uid = (o_uid_t) srf->uid;
<                       str.ostrfd.gid = (o_gid_t) srf->gid;
<                       for(i = 0; i < 8; i++)
<                               str.ostrfd.fill[i] = 0;          /* zero pad */
<
<                       if (error = strcopyout((caddr_t)&str.ostrfd,
<                           (caddr_t)arg, sizeof(struct o_strrecvfd),
<                           O_STRRECVFD, copyflag)) {
<                               srf->f.fp = fp;
<                               putbq(RD(stp->sd_wrq), mp);
<                               setf(fd, NULLFP);
<                               return (error);
<                       }
<               } else if (cmd == I_S_RECVFD) {
<                       struct s_strrecvfd *sstrfd = (struct s_strrecvfd *)NULL;
<                       static size_t sstrfdsize = 0;
<
<                       if (sstrfdsize == 0)
<                               sstrfdsize = sizeof(struct s_strrecvfd) +
<                                   crgetsize() - sizeof(struct sub_attr);
<                       if ((sstrfd = (struct s_strrecvfd *)
<                           kmem_alloc(sstrfdsize, KM_SLEEP)) == NULL) {
<                               srf->f.fp = fp;
<                               putbq(RD(stp->sd_wrq), mp);
<                               setf(fd, NULLFP);
<                               return (ENOMEM);
<                       }
<
<                       sstrfd->fd = srf->f.fd;
<                       sstrfd->uid = (uid_t)srf->uid;
<                       sstrfd->gid = (gid_t)srf->gid;
<                       bcopy((caddr_t)rcv_crp, (caddr_t)&sstrfd->s_attrs,
<                           crgetsize());
<
<                       if (error = strcopyout((caddr_t)sstrfd, (caddr_t)arg,
```

© COPYRIGHT 1994 AMDAHL CORPORATION

```
<                       sstrfdsize, S_STRRECVFD, copyflag)) {
<                               srf->f.fp = fp;
<                               putbq(RD(stp->sd_wrq), mp);
<                               setf(fd, NULLFP);
<                       kmem_free(sstrfd, sstrfdsize);
<                               return (error);
<                       }
<                   kmem_free(sstrfd, sstrfdsize);
<               } else {                /* I_E_RECVFD */
<                       str.estrfd.f.fd = srf->f.fd;
<                       str.estrfd.uid = (uid_t)srf->uid;
<                       str.estrfd.gid = (gid_t)srf->gid;
<                       for(i = 0; i < 8; i++)
<                               str.estrfd.fill[i] = 0;         /* zero pad */
<
<                       if (error = strcopyout((caddr_t)&str.estrfd,
<                           (caddr_t)arg, sizeof(struct e_strrecvfd),
<                           STRRECVFD, copyflag)) {
<                               srf->f.fp = fp;
<                               putbq(RD(stp->sd_wrq), mp);
<                               setf(fd, NULLFP);
<                               return (error);
<                       }
<               }
<               /* Get audit information needed from receiver and dump and
<                * audit record
<                */
<               if (audit_on) {
<                       arf->adtrfd_recvpid = u.u_procp->p_pidp->pid_id;
<                       arf->adtrfd_recvfd = fd;
<                       adt_recvfd(arf);
<               }
<
<               freemsg(mp);
<               return (0);
<       }
<
<   case I_SWROPT:
<               /*
<                * Set/clear the write options. arg is a bit
<                * mask with any of the following bits set...
<                *      SNDZERO - send zero length message
<                *      SNDPIPE - send sigpipe to process if
<                *              sd_werror is set and process is
<                *              doing a write or putmsg.
```

© COPYRIGHT 1994 AMDAHL CORPORATION

```
<               * The new stream head write options should reflect
<               * what is in arg.
<               */
<              if (arg & ~(SNDZERO|SNDPIPE))
<                      return (EINVAL);
<
<              s = splstr();
<              stp->sd_flag &= ~(STRSNDZERO|STRSIGPIPE);
<              if (arg & SNDZERO)
<                      stp->sd_flag |= STRSNDZERO;
<              if (arg & SNDPIPE)
<                      stp->sd_flag |= STRSIGPIPE;
<              splx(s);
<              return (0);
<
<      case I_GWROPT:
<          {
<              int wropt = 0;
<
<              if (stp->sd_flag & STRSNDZERO)
<                      wropt |= SNDZERO;
<              if (stp->sd_flag & STRSIGPIPE)
<                      wropt |= SNDPIPE;
<              error = strcopyout(&wropt, (int *)arg, sizeof(wropt), STRINT,
<                  copyflag);
<              return (error);
<          }
<
<      case I_LIST:
<              /*
<               * Returns all the modules found on this stream,
<               * upto the driver. If argument is NULL, return the
<               * number of modules (including driver). If argument
<               * is not NULL, copy the names into the structure
<               * provided.
<               */
<
<          {
<              queue_t *q;
<              int num_modules, space_allocated;
<              struct str_list strlist;
<
<              if (arg == NULL) { /* Return number of modules plus driver */
<                      q = stp->sd_wrq;
<                      *rvalp = stp->sd_pushcnt + 1;
```

© COPYRIGHT 1994 AMDAHL CORPORATION

```
<           } else {
<                   error = strcopyin((caddr_t)arg, (caddr_t)&strlist,
<                       sizeof(struct str_list), STRLIST, copyflag);
<                   if (error)
<                           return (error);
<                   if ((space_allocated = strlist.sl_nmods) <= 0)
<                           return (EINVAL);
<                   q = stp->sd_wrq;
<                   num_modules = 0;
<                   while (SAMESTR(q) && (space_allocated != 0)) {
<                           error = strcopyout(
<                               q->q_next->q_qinfo->qi_minfo->mi_idname,
<                               (struct str_list *)strlist.sl_modlist,
<                               (FMNAMESZ + 1), STRNAME, copyflag);
<                           if (error)
<                                   return (error);
<                           q = q->q_next;
<                           space_allocated--;
<                           num_modules++;
<                           strlist.sl_modlist++;
<                   }
<                   if (SAMESTR(q))  /* Space ran out */
<                           return (ENOSPC);
<                   error = strcopyout((caddr_t) &num_modules, (int *)arg,
<                       sizeof(int), STRINT, copyflag);
<           }
<           return (error);
<       }
<
<   case I_CKBAND:
<       {
<           queue_t *q = RD(stp->sd_wrq);
<           qband_t *qbp;
<
<           /*
<            * Ignores MSGNOGET.
<            */
<           if ((arg < 0) || (arg >= NBAND))
<                   return (EINVAL);
<           if (arg > (int)q->q_nband) {
<                   *rvalp = 0;
<           } else {
<                   if (arg == 0) {
<                           if (q->q_first)
<                                   *rvalp = 1;
```

© COPYRIGHT 1994 AMDAHL CORPORATION

```
<                               else
<                                       *rvalp = 0;
<                       } else {
<                               qbp = q->q_bandp;
<                               while (--arg > 0)
<                                       qbp = qbp->qb_next;
<                               if (qbp->qb_first)
<                                       *rvalp = 1;
<                               else
<                                       *rvalp = 0;
<                       }
<               }
<               return (0);
<       }
<
<   case I_GETBAND:
<       {
<               int intpri;
<
<               /*
<                * Ignores MSGNOGET.
<                */
<               mp = RD(stp->sd_wrq)->q_first;
<               if (!mp)
<                       return (ENODATA);
<               intpri = (int)mp->b_band;
<               error = strcopyout((caddr_t)&intpri, (caddr_t)arg, sizeof(int),
<                   STRINT, copyflag);
<               return (error);
<       }
<
<   case I_ATMARK:
<       {
<               queue_t *q = RD(stp->sd_wrq);
<
<               if (arg & ~(ANYMARK|LASTMARK))
<                       return (EINVAL);
<               s = splstr();
<               mp = q->q_first;
<
<               /*
<                * Hack for sockets compatibility.  We need to
<                * ignore any messages at the stream head that
<                * are marked MSGNOGET and are not marked MSGMARK.
<                */
```

© COPYRIGHT 1994 AMDAHL CORPORATION

```
<               while (mp && ((mp->b_flag & (MSGNOGET|MSGMARK)) == MSGNOGET))
<                       mp = mp->b_next;
<
<               if (!mp)
<                       *rvalp = 0;
<               else if ((arg == ANYMARK) && (mp->b_flag & MSGMARK))
<                       *rvalp = 1;
<               else if ((arg == LASTMARK) && (mp == stp->sd_mark))
<                       *rvalp = 1;
<               else
<                       *rvalp = 0;
<               splx(s);
<               return (0);
<           }
<
<       case I_CANPUT:
<           {
<               char band;
<
<               if ((arg < 0) || (arg >= NBAND))
<                       return (EINVAL);
<               band = (char)arg;
<               *rvalp = bcanput(stp->sd_wrq->q_next, band);
<               return (0);
<           }
<
<       case I_SETCLTIME:
<           {
<               long closetime;
<
<               error = strcopyin((caddr_t)arg, (caddr_t)&closetime,
<                   sizeof(long), STRLONG, copyflag);
<               if (error)
<                       return (error);
<               if (closetime < 0)
<                       return (EINVAL);
<
<               /*
<                * Convert between milliseconds and clock ticks.
<                */
<               stp->sd_closetime = ((closetime / 1000) * HZ) +
<                   ((((closetime % 1000) * HZ) + 999) / 1000);
<               return (0);
<           }
<
```

© COPYRIGHT 1994 AMDAHL CORPORATION

```
<       case I_GETCLTIME:
<           {
<                   long closetime;
<
<                   /*
<                    * Convert between clock ticks and milliseconds.
<                    */
<                   closetime = ((stp->sd_closetime / HZ) * 1000) +
<                       (((stp->sd_closetime % HZ) * 1000) / HZ);
<                   error = strcopyout((caddr_t)&closetime, (caddr_t)arg,
<                       sizeof(long), STRLONG, copyflag);
<                   return (error);
<           }
<
<         case TIOCSSID:
<       {
<                   pid_t sid;
<
<                   if (stp->sd_sidp != u.u_procp->p_sessp->s_sidp)
<                           return ENOTTY;
<                   if (error = strcopyin(arg, (caddr_t)&sid, sizeof(pid_t),
<                       STRPIDT, copyflag))
<                           return error;
<                   return realloctty(u.u_procp, sid);
2800a449,466
>       if (sop->so_flags & SO_MREADON)
>           stp->sd_flag |= SNDMREAD;
>       if (sop->so_flags & SO_MREADOFF)
>           stp->sd_flag &= ~SNDMREAD;
>       if (sop->so_flags & SO_NDELON)
>           stp->sd_flag |= OLDNDELAY;
>       if (sop->so_flags & SO_NDELOFF)
>           stp->sd_flag &= ~OLDNDELAY;
>       if (sop->so_flags & SO_ISTTY)
>           stp->sd_flag |= STRISTTY;
>       if (sop->so_flags & SO_ISNTTY)
>           stp->sd_flag &= ~STRISTTY;
>       if (sop->so_flags & SO_TOSTOP)
>           stp->sd_flag |= STRTOSTOP;
>       if (sop->so_flags & SO_TONSTOP)
>           stp->sd_flag &= ~STRTOSTOP;
>       if (sop->so_flags & SO_DELIM)
>           stp->sd_flag |= STRDELIM;
2802,2892d467
<       case TIOCGSID:
```

© COPYRIGHT 1994 AMDAHL CORPORATION

```
<               if (stp->sd_sidp == NULL)
<                       return ENOTTY;
<               return strcopyout((caddr_t)&stp->sd_sidp->pid_id,
<                 arg, sizeof(pid_t), STRPIDT, copyflag);
<
<       case TIOCSPGRP:
<       {
<               pid_t pgrp;
<               proc_t *q, *pgfind();
<
<
<               if (stp->sd_sidp != u.u_procp->p_sessp->s_sidp)
<                       return ENOTTY;
<               if (error = strcopyin(arg, (caddr_t)&pgrp, sizeof(pid_t),
<                   STRPIDT, copyflag))
<                       return (error);
<               if (pgrp == stp->sd_pgidp->pid_id)
<                       return 0;
<               if (pgrp <= 0 || pgrp >= MAXPID)
<                       return EINVAL;
<               if ((q = pgfind(pgrp)) == NULL
<                 || q->p_sessp != u.u_procp->p_sessp)
<                       return EPERM;
<               PID_RELE(stp->sd_pgidp);
<               stp->sd_pgidp = q->p_pgidp;
<               PID_HOLD(stp->sd_pgidp);
<               return 0;
<       }
<
<       case TIOCGPGRP:
<               if (stp->sd_sidp == NULL)
<                       return ENOTTY;
<               return strcopyout((caddr_t)&stp->sd_pgidp->pid_id,
<                 arg, sizeof(pid_t), STRPIDT, copyflag);
<
<       case FIONBIO:
<       case FIOASYNC:
<               return (0);     /* handled by the upper layer */
<       }
< }
<
< /*
<  * Send an ioctl message downstream and wait for acknowledgement.
<  */
< int
```

© COPYRIGHT 1994 AMDAHL CORPORATION

```
< strdoioctl(stp, strioc, ebp, copyflag, fmtp, crp, rvalp)
<       struct stdata *stp;
<       struct strioctl *strioc;
<       mblk_t *ebp;
<       int copyflag;
<       char *fmtp;
<       cred_t *crp;
<       int *rvalp;
< {
<       register mblk_t *bp;
<       register s;
<       struct iocblk *iocbp;
<       struct copyreq *reqp;
<       struct copyresp *resp;
<       mblk_t *fmtbp;
<       int id;
<       int transparent = 0;
<       int error = 0;
<       int len = 0;
<       caddr_t taddr;
<       extern void str2time(), str3time();
<
<       if (strioc->ic_len == TRANSPARENT) {     /* send arg in M_DATA block */
<               transparent = 1;
<               strioc->ic_len = sizeof(int);
<       }
<
<       if ((strioc->ic_len < 0) ||
<           ((strmsgsz > 0) && (strioc->ic_len > strmsgsz))) {
<               if (ebp)
<                       freeb(ebp);
<               return (EINVAL);
<       }
<
<       while (!(bp = allocb(max(sizeof(struct iocblk), sizeof(struct copyreq)), BPRI_HI)))
<               if (error = strwaitbuf(sizeof(struct iocblk), BPRI_HI)) {
<                       if (ebp)
<                               freeb(ebp);
<                       return (error);
<               }
<
<       iocbp = (struct iocblk *)bp->b_wptr;
<       iocbp->ioc_count = strioc->ic_len;
<       iocbp->ioc_cmd = strioc->ic_cmd;
<       crhold(crp);
```

© COPYRIGHT 1994 AMDAHL CORPORATION

```
2894,2902c469,473
<       iocbp->ioc_cr = crp;
< #else
<       iocbp->ioc_uid = crp->cr_uid;
<       iocbp->ioc_gid = crp->cr_gid;
< #endif
<       iocbp->ioc_error = 0;
<       iocbp->ioc_rval = 0;
<       bp->b_datap->db_type = M_IOCTL;
<       bp->b_wptr += sizeof(struct iocblk);
---
>       if (sop->so_flags & SO_NODELIM)
>           stp->sd_flag &= ~STRDELIM;
>       if (sop->so_flags & SO_STRHOLD)
>           stp->sd_flag |= STRHOLD;
> #endif      /* _STYPES */
2904,2918c475
<       /*
<        * If there is data to copy into ioctl block, do so.
<        */
<       if (iocbp->ioc_count) {
<               if (transparent)
<                       id = K_TO_K;
<               else
<                       id = copyflag;
<               if (error = putiocd(bp, ebp, strioc->ic_dp, id, SE_NOSLP, fmtp)) {
<                       freemsg(bp);
<                       if (ebp)
<                               freeb(ebp);
<                       crfree(crp);
<                       return (error);
<               }
---
>       freemsg(bp);
2920,2930c477,485
<               /*
<                * We could have slept copying in user pages.
<                * Recheck the stream head state (the other end
<                * of a pipe could have gone away).
<                */
<               if (stp->sd_flag & (STRHUP|STRDERR|STWRERR|STPLEX)) {
<                       error = ((stp->sd_flag & STPLEX) ? EINVAL :
<                           (stp->sd_werror ? stp->sd_werror : stp->sd_rerror));
<                       freemsg(bp);
<                       crfree(crp);
```

© COPYRIGHT 1994 AMDAHL CORPORATION

```
<                       return (error);
---
>       if (bpri == 0) {
>           if ((q->q_count <= q->q_lowat) &&
>               (q->q_flag & QWANTW)) {
>               q->q_flag &= ~QWANTW;
>               for (q = backq(q); q && !q->q_qinfo->qi_srvp;
>                   q = backq(q));
>               if (q) {
>                   qenable(q);
>                   setqback(q, bpri);
2931a487
>           }
2933,2937c489
<               bp->b_cont = ebp;
<       }
<       s = splstr();
<       if (transparent)
<               iocbp->ioc_count = TRANSPARENT;
---
>           unsigned char i;
2939,2963c491,501
<       /*
<        * Block for up to STRTIMOUT sec if there is a outstanding
<        * ioctl for this stream already pending.  All processes
<        * sleeping here will be awakened as a result of an ACK
<        * or NAK being received for the outstanding ioctl, or
<        * as a result of the timer expiring on the outstanding
<        * ioctl (a failure), or as a result of any waiting
<        * process's timer expiring (also a failure).
<        */
<       stp->sd_flag |= STR2TIME;
<       id = timeout(str2time, (caddr_t)stp, STRTIMOUT*HZ);
<
<       while (stp->sd_flag & IOCWAIT) {
<               stp->sd_iocwait++;
<               if (sleep((caddr_t)&stp->sd_iocwait,STIPRI|PCATCH) ||
<                  !(stp->sd_flag & STR2TIME)) {
<                       stp->sd_iocwait--;
<                       error = ((stp->sd_flag & STR2TIME) ? EINTR : ETIME);
<                       if (!stp->sd_iocwait)
<                               stp->sd_flag &= ~STR2TIME;
<                       splx(s);
<                       untimeout(id);
<                       freemsg(bp);
```

© COPYRIGHT 1994 AMDAHL CORPORATION

```
<                       crfree(crp);
<                       return (error);
---
>           qbp = q->q_bandp;
>           for (i = 1; i < bpri; i++)
>                 qbp = qbp->qb_next;
>           if ((qbp->qb_count <= qbp->qb_lowat) &&
>                   (qbp->qb_flag & QB_WANTW)) {
>                 qbp->qb_flag &= ~QB_WANTW;
>                 for (q = backq(q); q && !q->q_qinfo->qi_srvp;
>                       q = backq(q));
>                 if (q) {
>                     qenable(q);
>                     setqback(q, bpri);
2965,2976c503
<                 stp->sd_iocwait--;
<                 if (stp->sd_flag & (STRHUP|STRDERR|STWRERR|STPLEX)) {
<                         error = ((stp->sd_flag & STPLEX) ? EINVAL :
<                             (stp->sd_werror ? stp->sd_werror : stp->sd_rerror));
<                         if (!stp->sd_iocwait)
<                                 stp->sd_flag &= ~STR2TIME;
<                         splx(s);
<                         untimeout(id);
<                         freemsg(bp);
<                         crfree(crp);
<                         return (error);
<                 }
---
>           }
2978,2996d504
<       untimeout(id);
<       if (!stp->sd_iocwait)
<               stp->sd_flag &= ~STR2TIME;
<
<       /*
<        * Have control of ioctl mechanism.
<        * Send down ioctl packet and wait for response.
<        */
<       if (stp->sd_iocblk) {
<               freemsg(stp->sd_iocblk);
<               stp->sd_iocblk = NULL;
<       }
<       stp->sd_flag |= IOCWAIT;
<
<       /*
```

© COPYRIGHT 1994 AMDAHL CORPORATION

```
<	 * Assign sequence number.
<	 */
<	iocbp->ioc_id = (stp->sd_iocid = ++ioc_id);
<
2998,3000d505
<	(*stp->sd_wrq->q_next->q_qinfo->qi_putp)(stp->sd_wrq->q_next, bp);
<	if (qready())
<		runqueues();
3002,3014c507
<	/*
<	 * Timed wait for acknowledgment.  The wait time is limited by the
<	 * timeout value, which must be a positive integer (number of seconds
<	 * to wait, or 0 (use default value of STRTIMOUT seconds), or -1
<	 * (wait forever).  This will be awakened either by an ACK/NAK
<	 * message arriving, the timer expiring, or the timer expiring
<	 * on another ioctl waiting for control of the mechanism.
<	 */
< waitioc:
<	s = splstr();
<	if (!(stp->sd_flag & STR3TIME) && strioc->ic_timout >= 0)
<		id = timeout(str3time, (caddr_t) stp,
<		    (strioc->ic_timout ? strioc->ic_timout: STRTIMOUT) * HZ);
---
>	return;
3016d508
<	stp->sd_flag |= STR3TIME;
3018,3020c510,512
<	 * If the reply has already arrived, don't sleep.  If awakened from
<	 * the sleep, fail only if the reply has not arrived by then.
<	 * Otherwise, process the reply.
---
>	 * The following set of cases deal with situations where two stream
>	 * heads are connected to each other (twisted streams).  These
>	 * messages have no meaning at the stream head.
3022,3033c514,523
<	while (!stp->sd_iocblk) {
<		if (stp->sd_flag & (STRDERR|STWRERR|STPLEX|STRHUP)) {
<			error = ((stp->sd_flag & STPLEX) ? EINVAL :
<			    (stp->sd_werror ? stp->sd_werror : stp->sd_rerror));
<			stp->sd_flag &= ~(STR3TIME|IOCWAIT);
<			if (strioc->ic_timout >= 0)
<				untimeout(id);
<			splx(s);
<			wakeprocs((caddr_t)&(stp->sd_iocwait), PRMPT);
<			crfree(crp);
```

510

© COPYRIGHT 1994 AMDAHL CORPORATION

```
<                       return (error);
<               }
---
>       case M_BREAK:
>       case M_CTL:
>       case M_DELAY:
>       case M_START:
>       case M_STOP:
>       case M_IOCDATA:
>       case M_STARTI:
>       case M_STOPI:
>         freemsg(bp);
>         return;
3035,3083c525
<               if (sleep((caddr_t)stp,STIPRI|PCATCH) ||
<                   !(stp->sd_flag & STR3TIME))  {
<                       error = ((stp->sd_flag & STR3TIME) ? EINTR : ETIME);
<                       stp->sd_flag &= ~(STR3TIME|IOCWAIT);
<                       bp = NULL;
<                       /*
<                        * A message could have come in after we were scheduled
<                        * but before we were actually run.
<                        */
<                       if (stp->sd_iocblk) {
<                               bp = stp->sd_iocblk;
<                               stp->sd_iocblk = NULL;
<                       }
<                       if (strioc->ic_timout >= 0)
<                               untimeout(id);
<                       splx(s);
<                       if (bp) {
<                               if ((bp->b_datap->db_type == M_COPYIN) ||
<                                   (bp->b_datap->db_type == M_COPYOUT)) {
<                                       if (bp->b_cont) {
<                                               freemsg(bp->b_cont);
<                                               bp->b_cont = NULL;
<                                       }
<                                       bp->b_datap->db_type = M_IOCDATA;
<                                       resp = (struct copyresp *)bp->b_rptr;
<                                       resp->cp_rval = (caddr_t)1;   /* failure */
<
(*stp->sd_wrq->q_next->q_qinfo->qi_putp)(stp->sd_wrq->q_next, bp);
<                                       if (qready())
<                                               runqueues();
<                               } else
```

© COPYRIGHT 1994 AMDAHL CORPORATION

```
<                               freemsg(bp);
<                       }
<                       wakeprocs((caddr_t)&(stp->sd_iocwait), PRMPT);
<                       crfree(crp);
<                       return (error);
<               }
<       }
<       ASSERT(stp->sd_iocblk);
<       bp = stp->sd_iocblk;
<       stp->sd_iocblk = NULL;
<       if ((bp->b_datap->db_type == M_IOCACK) || (bp->b_datap->db_type == M_IOCNAK))
{
<               stp->sd_flag &= ~(STR3TIME|IOCWAIT);
<               if (strioc->ic_timout >= 0)
<                       untimeout(id);
<               splx(s);
<               wakeprocs((caddr_t)&(stp->sd_iocwait), PRMPT);
<       } else {
<               splx(s);
<       }
---
>     case M_IOCTL:
3085d526
<
3087c528
<        * Have received acknowlegment.
---
>        * Always NAK this condition (makes no sense)
3088a530,532
>       bp->b_datap->db_type = M_IOCNAK;
>       qreply(q, bp);
>       return;
3090,3247c534,535
<       switch (bp->b_datap->db_type) {
<       case M_IOCACK:
<               /*
<                * Positive ack.
<                */
<               iocbp = (struct iocblk *)bp->b_rptr;
<
<               /*
<                * Set error if indicated.
<                */
<               if (iocbp->ioc_error) {
<                       error = iocbp->ioc_error;
```

© COPYRIGHT 1994 AMDAHL CORPORATION

```
<                       break;
<               }
<
<               /*
<                * Set return value.
<                */
<               *rvalp = iocbp->ioc_rval;
<
<               /*
<                * Data may have been returned in ACK message (ioc_count > 0).
<                * If so, copy it out to the user's buffer.
<                */
<               if (iocbp->ioc_count && !transparent) {
<                       if (strioc->ic_cmd == TCGETA ||
<                           strioc->ic_cmd == TCGETS ||
<                           strioc->ic_cmd == TIOCGETP ||
<                           strioc->ic_cmd == LDGETT) {
<                               if (error = getiocd(bp, strioc->ic_dp,
<                                   copyflag, fmtp))
<                                       break;
<                       } else if (error = getiocd(bp, strioc->ic_dp,
<                           copyflag, (char *)NULL)) {
<                               break;
<                       }
<               }
<               if (!transparent) {
<                       if (len) /* an M_COPYOUT was used with I_STR */
<                               strioc->ic_len = len;
<                       else
<                               strioc->ic_len = iocbp->ioc_count;
<               }
<               break;
<
<       case M_IOCNAK:
<               /*
<                * Negative ack.
<                *
<                * The only thing to do is set error as specified
<                * in neg ack packet.
<                */
<               iocbp = (struct iocblk *)bp->b_rptr;
<
<               error = (iocbp->ioc_error ? iocbp->ioc_error : EINVAL);
<               break;
<
```

© COPYRIGHT 1994 AMDAHL CORPORATION

```
<       case M_COPYIN:
<               /*
<                * Driver or module has requested user ioctl data.
<                */
<               reqp = (struct copyreq *)bp->b_rptr;
<               fmtbp = bp->b_cont;
<               bp->b_cont = NULL;
<               if (reqp->cq_flag & RECOPY) {
<                       /* redo I_STR copyin with canonical processing */
<                       ASSERT(fmtbp);
<                       reqp->cq_size = strioc->ic_len;
<                       error = putiocd(bp, NULL, strioc->ic_dp, copyflag, SE_SLEEP,
<                           (fmtbp ? (char *)fmtbp->b_rptr : (char *)NULL));
<                       if (fmtbp)
<                               freeb(fmtbp);
<               } else if (reqp->cq_flag & STRCANON) {
<                       /* copyin with canonical processing */
<                       ASSERT(fmtbp);
<                       error = putiocd(bp, NULL, reqp->cq_addr, copyflag, SE_SLEEP,
<                           (fmtbp ? (char *)fmtbp->b_rptr : (char *) NULL));
<                       if (fmtbp)
<                               freeb(fmtbp);
<               } else {
<                       /* copyin raw data (i.e. no canonical processing) */
<                       error = putiocd(bp, NULL, reqp->cq_addr, copyflag,
<                           SE_SLEEP, (char *)NULL);
<               }
<               if (error && bp->b_cont) {
<                       freemsg(bp->b_cont);
<                       bp->b_cont = NULL;
<               }
<
<               bp->b_wptr = bp->b_rptr + sizeof(struct copyresp);
<               bp->b_datap->db_type = M_IOCDATA;
<               resp = (struct copyresp *)bp->b_rptr;
<               resp->cp_rval = (caddr_t)error;
<
<               (*stp->sd_wrq->q_next->q_qinfo->qi_putp)(stp->sd_wrq->q_next, bp);
<               if (qready())
<                       runqueues();
<
<               if (error) {
<                       if (strioc->ic_timout >= 0)
<                               untimeout(id);
<                       crfree(crp);
```

© COPYRIGHT 1994 AMDAHL CORPORATION

```
<                       return (error);
<               }
<
<               goto waitioc;
<
<       case M_COPYOUT:
<               /*
<                * Driver or module has ioctl data for a user.
<                */
<               reqp = (struct copyreq *)bp->b_rptr;
<               ASSERT(bp->b_cont);
<               if (transparent) {
<                       taddr = reqp->cq_addr;
<               } else {
<                       taddr = strioc->ic_dp;
<                       len = reqp->cq_size;
<               }
<               if (reqp->cq_flag & STRCANON) {
<                       /* copyout with canonical processing */
<                       if (fmtbp = bp->b_cont) {
<                               bp->b_cont = fmtbp->b_cont;
<                               fmtbp->b_cont = NULL;
<                       }
<                       error = getiocd(bp, taddr, copyflag,
<                           (fmtbp ? (char *)fmtbp->b_rptr : (char *)NULL));
<                       if (fmtbp)
<                               freeb(fmtbp);
<               } else {
<                       /* copyout raw data (i.e. no canonical processing) */
<                       error = getiocd(bp, taddr, copyflag, (char *)NULL);
<               }
<               freemsg(bp->b_cont);
<               bp->b_cont = NULL;
<
<               bp->b_wptr = bp->b_rptr + sizeof(struct copyresp);
<               bp->b_datap->db_type = M_IOCDATA;
<               resp = (struct copyresp *)bp->b_rptr;
<               resp->cp_rval = (caddr_t)error;
<
<               (*stp->sd_wrq->q_next->q_qinfo->qi_putp)(stp->sd_wrq->q_next, bp);
<               if (qready())
<                       runqueues();
<
<               if (error) {
<                       if (strioc->ic_timout >= 0)
```

© COPYRIGHT 1994 AMDAHL CORPORATION

```
<                       untimeout(id);
<                   crfree(crp);
<                   return (error);
<               }
<               goto waitioc;
<
<       default:
<               ASSERT(0);
<               break;
<       }
<
---
>       default:
>         ASSERT(0);
3249,3250c537,538
<       crfree(crp);
<       return (error);
---
>       return;
>     }
3254,3257c542,546
<  * Get the next message from the read queue.  If the message is
<  * priority, STRPRI will have been set by strrput().  This flag
<  * should be reset only when the entire message at the front of the
<  * queue as been consumed.
---
>  * Stream head write service routine.
>  * Its job is to wake up any sleeping writers when a queue
>  * downstream needs data (part of the flow control in putq and getq).
>  * For stream head right below mux module, it must also invoke put procedure
>  * of next downstream module.
3259,3282d547
< int
< strgetmsg(vp, mctl, mdata, prip, flagsp, fmode, rvp)
<       register struct vnode *vp;
<       register struct strbuf *mctl;
<       register struct strbuf *mdata;
<       unsigned char *prip;
<       int *flagsp;
<       int fmode;
<       rval_t *rvp;
< {
<       register s;
<       register struct stdata *stp;
<       register mblk_t *bp, *nbp;
```

© COPYRIGHT 1994 AMDAHL CORPORATION

```
<       mblk_t *savemp = NULL;
<       mblk_t *savemptail = NULL;
<       int n, bcnt;
<       int done = 0;
<       int flg = 0;
<       int more = 0;
<       int error = 0;
<       char *ubuf;
<       int mark;
<       unsigned char pri;
<       queue_t *q;
3284,3566c549,550
<       ASSERT(vp->v_stream);
<       stp = vp->v_stream;
<       q = RD(stp->sd_wrq);
<       rvp->r_val1 = 0;
<
<       if (error = straccess(stp, JCREAD))
<               return (error);
<       if (stp->sd_flag & (STRDERR|STPLEX))
<               return ((stp->sd_flag & STPLEX) ? EINVAL : stp->sd_rerror);
<
<       switch (*flagsp) {
<       case MSG_HIPRI:
<               if (*prip != 0)
<                       return (EINVAL);
<               break;
<
<       case MSG_ANY:
<       case MSG_BAND:
<               break;
<
<       default:
<               return (EINVAL);
<       }
<
<       s = splstr();
<       mark = 0;
<       while (((*flagsp & MSG_HIPRI) && !(stp->sd_flag & STRPRI)) ||
<           ((*flagsp & MSG_BAND) && (!q->q_first ||
<           ((q->q_first->b_band < *prip) && !(stp->sd_flag & STRPRI)))) ||
<           !(bp = getq(q))) {
<               /*
<                * If STRHUP, return 0 length control and data.
<                */
```

© COPYRIGHT 1994 AMDAHL CORPORATION

```
<               if (stp->sd_flag & STRHUP) {
<                       mctl->len = mdata->len = 0;
<                       *flagsp = flg;
<                       splx(s);
<                       return (error);
<               }
<               if ((error = strwaitq(stp, GETWAIT, (off_t)0, fmode, &done)) || done) {
<                       splx(s);
<                       return (error);
<               }
<       }
<       if (bp == stp->sd_mark) {
<               mark = 1;
<               stp->sd_mark = NULL;
<       }
<       splx(s);
<
<       if (bp->b_datap->db_type == M_PASSFP) {
<               s = splstr();
<               if (mark && !stp->sd_mark)
<                       stp->sd_mark = bp;
<               putbq(q, bp);
<               splx(s);
<               return (EBADMSG);
<       }
<
<       pri = bp->b_band;
<       if (qready())
<               runqueues();
<
<       /*
<        * Set HIPRI flag if message is priority.
<        */
<       if (stp->sd_flag & STRPRI)
<               flg = MSG_HIPRI;
<       else
<               flg = MSG_BAND;
<
<       /*
<        * First process PROTO or PCPROTO blocks, if any.
<        */
<       if (mctl->maxlen >= 0 && bp && bp->b_datap->db_type != M_DATA) {
<               bcnt = mctl->maxlen;
<               ubuf = mctl->buf;
<               while (bp && bp->b_datap->db_type != M_DATA && bcnt >= 0) {
```

© COPYRIGHT 1994 AMDAHL CORPORATION

```
<                       if ((n = MIN(bcnt, bp->b_wptr - bp->b_rptr)) &&
<                           copyout((caddr_t)bp->b_rptr, ubuf, n)) {
<                               error = EFAULT;
<                               s = splstr();
<                               stp->sd_flag &= ~STRPRI;
<                               splx(s);
<                               more = 0;
<                               freemsg(bp);
<                               goto getmout;
<                       }
<                       ubuf += n;
<                       bp->b_rptr += n;
<                       if (bp->b_rptr >= bp->b_wptr) {
<                               nbp = bp;
<                               bp = bp->b_cont;
<                               freeb(nbp);
<                       }
<                       if ((bcnt -= n) <= 0)
<                               break;
<               }
<               mctl->len = mctl->maxlen - bcnt;
<       } else
<               mctl->len = -1;
<
<
<       if (bp && bp->b_datap->db_type != M_DATA) {
<               /*
<                * More PROTO blocks in msg.
<                */
<               more |= MORECTL;
<               savemp = bp;
<               while (bp && bp->b_datap->db_type != M_DATA) {
<                       savemptail = bp;
<                       bp = bp->b_cont;
<               }
<               savemptail->b_cont = NULL;
<       }
<
<       /*
<        * Now process DATA blocks, if any.
<        */
<       if (mdata->maxlen >= 0 && bp) {
<               bcnt = mdata->maxlen;
<               ubuf = mdata->buf;
<               while (bp && bcnt >= 0) {
```

© COPYRIGHT 1994 AMDAHL CORPORATION

```
<                       if ((n = MIN(bcnt, bp->b_wptr - bp->b_rptr)) &&
<                           copyout((caddr_t)bp->b_rptr, ubuf, n)) {
<                               error = EFAULT;
<                               s = splstr();
<                               stp->sd_flag &= ~STRPRI;
<                               splx(s);
<                               more = 0;
<                               freemsg(bp);
<                               goto getmout;
<                       }
<                       ubuf += n;
<                       bp->b_rptr += n;
<                       if (bp->b_rptr >= bp->b_wptr) {
<                               nbp = bp;
<                               bp = bp->b_cont;
<                               freeb(nbp);
<                       }
<                       if ((bcnt -= n) <= 0)
<                               break;
<               }
<               mdata->len = mdata->maxlen - bcnt;
<       } else
<               mdata->len = -1;
<
<       if (bp) {                       /* more data blocks in msg */
<               more |= MOREDATA;
<               if (savemp)
<                       savemptail->b_cont = bp;
<               else
<                       savemp = bp;
<       }
<
<       s = splstr();
<       if (savemp) {
<               savemp->b_band = pri;
<               if (mark && !stp->sd_mark) {
<                       savemp->b_flag |= MSGMARK;
<                       stp->sd_mark = savemp;
<               }
<               putbq(q, savemp);
<       } else {
<               stp->sd_flag &= ~STRPRI;
<       }
<       splx(s);
<
```

580

© COPYRIGHT 1994 AMDAHL CORPORATION

```
<       *flagsp = flg;
<       *prip = pri;
<
<       /*
<        * Getmsg cleanup processing - if the state of the queue has changed
<        * some signals may need to be sent and/or poll awakened.
<        */
< getmout:
<       while ((bp = q->q_first) && (bp->b_datap->db_type == M_SIG)) {
<               bp = getq(q);
<               strsignal(stp, *bp->b_rptr, (long)bp->b_band);
<               freemsg(bp);
<               if (qready())
<                       runqueues();
<       }
<
<
<       /*
<        * Check for event messages at the front of the read
<        * queue and generate the event(s) if appropriate.
<        * The only event that can be on queue is M_EVENT at
<        * this point.
<        */
< #ifdef GEM
<       while ((bp = q->q_first) &&
<               (bp->b_datap->db_type == M_EVENT)) {
<               bp = getq(q);
<               strdrpost(bp);
<               freemsg(bp);
<               if (qready())
<                       runqueues();
<       }
< #endif /* GEM */
<
<       /*
<        * If we have just received a high priority message and a
<        * regular message is now at the front of the queue, send
<        * signals in S_INPUT processes and wake up processes polling
<        * on POLLIN.
<        */
<       if ((bp = q->q_first) && !(stp->sd_flag & STRPRI)) {
<           if (flg & MSG_HIPRI) {
<               s = splstr();
<               if (stp->sd_sigflags & S_INPUT)
<                       strsendsig(stp->sd_siglist, S_INPUT, (long)bp->b_band);
```

© COPYRIGHT 1994 AMDAHL CORPORATION

```
<               if (stp->sd_pollist.ph_events & POLLIN)
<                       pollwakeup(&stp->sd_pollist, POLLIN);
< #ifdef GEM
<               if (stp->sd_eventflags & S_INPUT)
<                       strevpost(stp, S_INPUT, (long)bp->b_band);
< #endif /* GEM */
<
<               if (bp->b_band == 0) {
<                   if (stp->sd_sigflags & S_RDNORM)
<                           strsendsig(stp->sd_siglist, S_RDNORM, 0L);
<                   if (stp->sd_pollist.ph_events & POLLRDNORM)
<                           pollwakeup(&stp->sd_pollist, POLLRDNORM);
< #ifdef GEM
<                   if (stp->sd_eventflags & S_RDNORM)
<                           strevpost(stp, S_RDNORM, 0L);
< #endif /* GEM */
<               } else {
<                   if (stp->sd_sigflags & S_RDBAND)
<                           strsendsig(stp->sd_siglist, S_RDBAND,
<                               (long)bp->b_band);
<                   if (stp->sd_pollist.ph_events & POLLRDBAND)
<                           pollwakeup(&stp->sd_pollist, POLLRDBAND);
< #ifdef GEM
<                   if (stp->sd_eventflags & S_RDBAND)
<                           strevpost(stp, S_RDBAND, (long)bp->b_band);
< #endif /* GEM */
<               }
<               splx(s);
<           } else {
<               if (pri != bp->b_band) {
<                   s = splstr();
<                   if (bp->b_band == 0) {
<                       if (stp->sd_sigflags & S_RDNORM)
<                               strsendsig(stp->sd_siglist, S_RDNORM, 0L);
<                       if (stp->sd_pollist.ph_events & POLLRDNORM)
<                               pollwakeup(&stp->sd_pollist, POLLRDNORM);
< #ifdef GEM
<                       if (stp->sd_eventflags & S_RDNORM)
<                               strevpost(stp, S_RDNORM, 0L);
< #endif /* GEM */
<                   } else {
<                       if (stp->sd_sigflags & S_RDBAND)
<                               strsendsig(stp->sd_siglist, S_RDBAND,
<                                   (long)bp->b_band);
<                       if (stp->sd_pollist.ph_events & POLLRDBAND)
```

© COPYRIGHT 1994 AMDAHL CORPORATION

```
<                               pollwakeup(&stp->sd_pollist, POLLRDBAND);
< #ifdef GEM
<                       if (stp->sd_eventflags & S_RDBAND)
<                               strevpost(stp, S_RDBAND, (long)bp->b_band);
< #endif /* GEM */
<                       }
<                       splx(s);
<               }
<       }
< }
<       rvp->r_val1 = more;
<       return (error);
< }
<
< /*
<  * Put a message downstream.
<  */
< int
< strputmsg(vp, mctl, mdata, pri, flag, fmode)
<       register struct vnode *vp;
<       register struct strbuf *mctl;
<       register struct strbuf *mdata;
<       unsigned char pri;
<       register flag;
<       int fmode;
---
> static int strwsrv(q)
>     register queue_t *q;
3568,3576c552,556
<       register struct stdata *stp;
<       mblk_t *mp;
<       register s;
<       register long msgsize;
<       long rmin, rmax;
<       int error, done;
<       struct uio uio;
<       struct iovec iov;
<       int strmakemsg();
---
>     register struct stdata *stp;
>     register int s;
>     register queue_t *tq;
>     register qband_t *qbp;
>     qband_t *myqbp;
3578,3579c558
```

© COPYRIGHT 1994 AMDAHL CORPORATION

```
<       ASSERT(vp->v_stream);
<       stp = vp->v_stream;
---
>     s = splstr();
3581,3589c560,561
<       if (error = straccess(stp, JCWRITE))
<               return (error);
<       if (stp->sd_flag & STPLEX)
<               return (EINVAL);
<       if (stp->sd_flag & (STRHUP|STWRERR)) {
<               if (stp->sd_flag & STRSIGPIPE)
<                       psignal(u.u_procp, SIGPIPE);
<               return(stp->sd_werror);
<       }
---
>     while (tq->q_next && !tq->q_qinfo->qi_srvp)
>       tq = tq->q_next;
3591,3610c563,573
<       /*
<        * firewall - don't use too much memory
<        */
<
<       if (strthresh && (Strcount > strthresh) && pm_denied(u.u_cred, P_SYSOPS))
<               return (ENOSR);
<
<       /*
<        * Check for legal flag value.
<        */
<       switch (flag) {
<       case MSG_HIPRI:
<               if ((mctl->len < 0) || (pri != 0))
<                       return (EINVAL);
<               break;
<       case MSG_BAND:
<               break;
<
<       default:
<               return (EINVAL);
---
>     if (q->q_flag & QBACK) {
>       if (tq->q_flag & QFULL)
>           tq->q_flag |= QWANTW;
>     }
>     myqbp = q->q_bandp;
>     for (qbp = tq->q_bandp; qbp; qbp = qbp->qb_next) {
```

© COPYRIGHT 1994 AMDAHL CORPORATION

```
>       if (!myqbp)
>           break;
>       if (myqbp->qb_flag & QB_BACK) {
>           if (qbp->qb_flag & QB_FULL)
>               qbp->qb_flag |= QB_WANTW;
3611a575,576
>       myqbp = myqbp->qb_next;
>   }
3613,3636c578,582
<       /*
<        * Make sure ctl and data sizes together fall within the
<        * limits of the max and min receive packet sizes and do
<        * not exceed system limit.
<        */
<       rmin = stp->sd_wrq->q_next->q_minpsz;
<       rmax = stp->sd_wrq->q_next->q_maxpsz;
<       ASSERT((rmax >= 0) || (rmax == INFPSZ));
<       if (rmax == 0)
<               return (ERANGE);
<       if (strmsgsz != 0) {
<               if (rmax == INFPSZ)
<                       rmax = strmsgsz;
<               else
<                       rmax = MIN(strmsgsz, rmax);
<       }
<       if ((msgsize = mdata->len) < 0) {
<               msgsize = 0;
<               rmin = 0;       /* no range check for NULL data part */
<       }
<       if ((msgsize < rmin) ||
<           ((msgsize > rmax) && (rmax != INFPSZ)) ||
<           (mctl->len > strctlsz))
<               return (ERANGE);
---
>   stp = (struct stdata *) q->q_ptr;
>   if (stp->sd_flag & WSLEEP) {
>     stp->sd_flag &= ~WSLEEP;
>     wakeprocs((caddr_t) q, PRMPT);
>   }
3638,3665c584
<       s = splstr();
<       while (!(flag & MSG_HIPRI) && !bcanput(stp->sd_wrq->q_next, pri)) {
<               if ((error = strwaitq(stp, WRITEWAIT, (off_t) 0, fmode, &done)) || done) {
<                       splx(s);
<                       return (error);
```

© COPYRIGHT 1994 AMDAHL CORPORATION

```
<               }
<       }
<       splx(s);
<
<       iov.iov_base = mdata->buf;
<       iov.iov_len = mdata->len;
<       uio.uio_iov = &iov;
<       uio.uio_iovcnt = 1;
<       uio.uio_offset = 0;
<       uio.uio_segflg = UIO_USERSPACE;
<       uio.uio_fmode = 0;
<       uio.uio_resid = iov.iov_len;
<       if ((error = strmakemsg(mctl, mdata->len, &uio, stp, (long)flag, &mp)) || !mp)
<               return (error);
<       mp->b_band = pri;
<
<       /*
<        * Put message downstream.
<        */
<       (*stp->sd_wrq->q_next->q_qinfo->qi_putp)(stp->sd_wrq->q_next, mp);
<       if (qready())
<               runqueues();
<       return (0);
---
>       splx(s);
3668,3825d586
< /*
<  * Determines whether the necessary conditions are set on a stream
<  * for it to be readable, writeable, or have exceptions.
<  */
< int
< strpoll(stp, events, anyyet, reventsp, phpp)
<       register struct stdata *stp;
<       short events;
<       int anyyet;
<       short *reventsp;
<       struct pollhead **phpp;
< {
<       register short retevents = 0;
<       register s;
<       register mblk_t *mp;
<       qband_t *qbp;
<
<       if (stp->sd_flag & STPLEX) {
<               *reventsp = POLLNVAL;
```

© COPYRIGHT 1994 AMDAHL CORPORATION

```
<               return (0);
<       }
<       s = splstr();
<
<       if (stp->sd_flag & STRDERR) {
<               if ((events == 0) ||
<                   (events & (POLLIN|POLLPRI|POLLRDNORM|POLLRDBAND))) {
<                       splx(s);
<                       *reventsp = POLLERR;
<                       return(0);
<               }
<       }
<       if (stp->sd_flag & STWRERR) {
<               if ((events == 0) || (events & (POLLOUT|POLLWRBAND))) {
<                       splx(s);
<                       *reventsp = POLLERR;
<                       return (0);
<               }
<       }
<
<       if (stp->sd_flag & STRHUP) {
<               retevents |= POLLHUP;
<       } else {
<               register queue_t *tq;
<
<               tq = stp->sd_wrq->q_next;
<               while (tq->q_next && !tq->q_qinfo->qi_srvp)
<                       tq = tq->q_next;
<               if (events & POLLWRNORM) {
<                       if (tq->q_flag & QFULL)
<                               /* ensure backq svc procedure runs */
<                               tq->q_flag |= QWANTW;
<                       else
<                               retevents |= POLLOUT;
<               }
<               if (events & POLLWRBAND) {
<                       qbp = tq->q_bandp;
<                       if (qbp) {
<                               while (qbp) {
<                                       if (qbp->qb_flag & QB_FULL)
<                                               qbp->qb_flag |= QB_WANTW;
<                                       else
<                                               retevents |= POLLWRBAND;
<                                       qbp = qbp->qb_next;
<                               }
```

© COPYRIGHT 1994 AMDAHL CORPORATION

```
<                       } else {
<                               retevents |= POLLWRBAND;
<                       }
<               }
<       }
<
<       mp = RD(stp->sd_wrq)->q_first;
<       if (!(stp->sd_flag & STRPRI)) {
<               while (mp) {
<                       if ((events & POLLRDNORM) && (mp->b_band == 0))
<                               retevents |= POLLRDNORM;
<                       if ((events & POLLRDBAND) && (mp->b_band != 0))
<                               retevents |= POLLRDBAND;
<                       if (events & POLLIN)
<                               retevents |= POLLIN;
<
<                       /*
<                        * MSGNOGET is really only to make poll return
<                        * the intended events when the module is really
<                        * holding onto the data.  Yeah, it's a hack and
<                        * we need a better solution.
<                        */
<                       if (mp->b_flag & MSGNOGET)
<                               mp = mp->b_next;
<                       else
<                               break;
<               }
<       } else {
<               ASSERT(mp != NULL);
<               if (events & POLLPRI)
<                       retevents |= POLLPRI;
<       }
<       *reventsp = retevents;
<       if (retevents) {
<               splx(s);
<               return (0);
<       }
<
<       /*
<        * If poll() has not found any events yet, set up event cell
<        * to wake up the poll if a requested event occurs on this
<        * stream.  Check for collisions with outstanding poll requests.
<        */
<       if (!anyyet) {
<               *phpp = &stp->sd_pollist;
```

© COPYRIGHT 1994 AMDAHL CORPORATION

```
<       }
<       splx(s);
<       return (0);
< }
<
< STATIC int
< strsink(q, bp)
<       register queue_t *q;
<       register mblk_t *bp;
< {
<       struct copyresp *resp;
<
<       switch (bp->b_datap->db_type) {
<       case M_FLUSH:
<               if ((*bp->b_rptr & FLUSHW) && !(bp->b_flag & MSGNOLOOP)) {
<                       *bp->b_rptr &= ~FLUSHR;
<                       bp->b_flag |= MSGNOLOOP;
<                       qreply(q, bp);
<               } else {
<                       freemsg(bp);
<               }
<               break;
<
<       case M_COPYIN:
<       case M_COPYOUT:
<               if (bp->b_cont) {
<                       freemsg(bp->b_cont);
<                       bp->b_cont = NULL;
<               }
<               bp->b_datap->db_type = M_IOCDATA;
<               resp = (struct copyresp *)bp->b_rptr;
<               resp->cp_rval = (caddr_t)1;   /* failure */
<               qreply(q, bp);
<               break;
<
<       case M_IOCTL:
<               if (bp->b_cont) {
<                       freemsg(bp->b_cont);
<                       bp->b_cont = NULL;
<               }
<               bp->b_datap->db_type = M_IOCNAK;
<               qreply(q, bp);
<               break;
<
<       default:
```

© COPYRIGHT 1994 AMDAHL CORPORATION

```
<		freemsg(bp);
<		break;
<	}
< }
```

© COPYRIGHT 1994 AMDAHL CORPORATION

```
0a1,11
> #ident "%W% %G% %U% %n%"
>
> /* File: slp.c - last edit:
>  * helge     Tue May  4 14:39:31 1993
>  *
>  * Copyright (c) 1991 by Amdahl Corporation. All rights reserved.
>  * Copyright (c) 1992 by Amdahl Corporation. All rights reserved.
>
>  * Copyright (c) 1993 by Amdahl Corporation. All rights reserved.
>  */
>
10c21,25
< #ident       "@(#)uts-comm:proc/slp.c       1.7"
---
> #include <sys/cmn_err.h>
> #include <sys/debug.h>
> #include <sys/param.h>
> #include <sys/proc.h>
> #include <sys/types.h>
12,32c27,28
< #include <util/types.h>
< #include <util/param.h>
< #include <util/sysmacros.h>
< #include <proc/signal.h>
< #include <proc/proc.h>
< #include <proc/user.h>
< #include <svc/systm.h>
< #include <fs/procfs/procfs.h>
< #include <util/debug.h>
< #include <util/inline.h>
< #include <util/cmn_err.h>
< #include <proc/disp.h>
< #include <proc/class.h>
< #ifdef GEM
< #include <svc/evsys.h>
< #endif /* GEM */
< #include <proc/cred.h>
< #include <svc/errno.h>
< #include <util/psw.h>
< #include <acc/mac/mac.h>
< #include <acc/mac/covert.h>
---
> #include <spl.h>
> #include "app_param.h"
```

© COPYRIGHT 1994 AMDAHL CORPORATION

```
33a30,32
> #define STATIC
>
>
51c50
< } sleepq[NSLEEPQ];
---
> }      sleepq[NSLEEPQ] = {
53,58c52,53
< #ifdef KPERF
< /*
<  * This is used to hold the addr of each process being awaken up
<  * for that chan so they will be written to the buffer at the end
<  * of wakeprocs call.
<  */
---
>       NULL
> };
60,64d54
< STATIC caddr_t     wpp[1024];
< #endif /* KPERF */
<
< void           unsleep(), wakeprocs(), setrun();
<
67,74c57,59
<  * on chan. The disp argument determines whether
<  * the sleep can be interrupted by a signal. If
<  * disp & PMASK <= PZERO the SNWAKE bit in p_flag
<  * is set and a signal cannot disturb the sleep;
<  * if disp & PMASK > PZERO signals will be processed.
<  * Callers of this routine must be prepared for
<  * premature return, and check that the reason for
<  * sleeping has gone away.
---
>  * on chan. The disp argument determines whether a a task can be woken up or
>  * not ((disp & PMASK) > PZERO means it can). Signals are always caught, i.e.
>  * sleep() always returns with either 0 or 1 as return value.
77,78c62
< int
< sleep(chan, disp)
---
> int sleep(chan, disp)
82,85c66,71
<       register proc_t            *pp = u.u_procp;
<       register struct sleepq     *sqp;
```

© COPYRIGHT 1994 AMDAHL CORPORATION

```
<       register int            s;
<       int                     why;
---
>       register proc_t *pp;
>       register struct sleepq *sqp;
>       volatile short s;
>       int why;
>       int err;
>       register int sig;
87,92c73
< #ifdef KPERF
<       if (kpftraceflg) {
<               RETADDR_TO_KPC
<               kperf_write(KPT_SLEEP, Kpc, curproc);
<       }
< #endif /* KPERF */
---
>       s = splstr();
94,100d74
<       s = splhi();
<       if (panicstr) {
<               (void) spl0();
<               splx(s);
<               return 0;
<       }
<
103a78
> #ifdef DEBUG
105a81
> #endif
109c85,97
<       pp->p_stat = SSLEEP;
---
>       pp = get_procp();
>       ASSERT(pp != NULL && pp != (proc_t *) - 1);
>
>       if ((disp & PMASK) > PZERO) {
>               if (pp->p_int) {
>                       /* Interrupt pending */
>                       pp->p_int = 0;
>                       splx(s);
>                       return 1;
>               }
>               pp->p_stat = SSLEEP;
>       } else
```

© COPYRIGHT 1994 AMDAHL CORPORATION

```
>               pp->p_stat = SSLPNOSIG;
120,216c108,119
<       if ((disp & PMASK) > PZERO) {
<               pp->p_flag &= ~(SNWAKE|SNOSTOP);
<
<               /*
<                * If it's not safe to stop here the caller will have set
<                * PNOSTOP in "disp"; in this case make sure that we won't
<                * stop when issig() is called.
<                */
<               if (disp & PNOSTOP) {
<                       pp->p_flag |= SNOSTOP;
<                       why = JUSTLOOKING;
<               } else
<                       why = FORREAL;
<               pp->p_flag |= SASLEEP;
<               u.u_sysabort = 0;
< #ifdef GEM
<               if (ISSIG(pp, why) || u.u_sysabort || EV_ISTRAP(pp)) {
< #else
<               if (ISSIG(pp, why) || u.u_sysabort) {
< #endif /* GEM */
<                       /*
<                        * Signal pending or debugger aborted the syscall.
<                        * Take process off sleep queue if still there.
<                        */
<                       u.u_sysabort = 0;
<                       if (pp->p_stat == SSLEEP) {
<                               unsleep(pp);
<                               pp->p_stat = SONPROC;
<                       }
<                       goto psig;
<               }
<
<               /*
<                * We may have stopped in issig(); make sure we're still
<                * on the sleep queue.
<                */
<               if (pp->p_wchan == 0)
<                       goto out;
<               ASSERT(pp->p_stat == SSLEEP);
<               if (runin != 0) {
<                       runin = 0;
<                       wakeprocs((caddr_t)&runin, PRMPT);
<               }
```

© COPYRIGHT 1994 AMDAHL CORPORATION

```
<               pp->p_flag &= ~SASLEEP;
<
<               /*
<                * Call class specific function to do whatever it deems
<                * appropriate before we give up the processor.
<                */
<               CL_SLEEP(pp, pp->p_clproc, chan, disp);
<
<               /*
<                * A debugger may set u_sysabort while we are asleep.
<                * If it is set when we wake up, abort the syscall.
<                * We may also stop in issig(); check on return as well.
<                */
<               swtch();
<               pp->p_flag |= SASLEEP;
< #ifdef GEM
<               if (u.u_sysabort || ISSIG(pp, why) || u.u_sysabort
<                 || EV_ISTRAP(pp)) {
< #else
<               if (u.u_sysabort || ISSIG(pp, why) || u.u_sysabort) {
< #endif /* GEM */
<                       u.u_sysabort = 0;
<                       goto psig;
<               }
<       } else {
<               pp->p_flag |= SNWAKE;
<
<               CL_SLEEP(pp, pp->p_clproc, chan, disp);
<
<               swtch();
<       }
< out:
<       pp->p_flag &= ~(SNWAKE|SNOSTOP|SASLEEP);
<       if (pp->p_trace)        /* hook for /proc deadlock prevention */
<               prawake(pp);
<       splx(s);
<       return 0;
<
<       /*
<        * If priority was low (>PZERO) and there has been a signal,
<        * then if PCATCH is set return 1, otherwise do a non-local
<        * jump to the qsav location.
<        */
< psig:
<       pp->p_flag &= ~(SNOSTOP|SASLEEP);
```

© COPYRIGHT 1994 AMDAHL CORPORATION

```
<       if (pp->p_trace)        /* hook for /proc deadlock prevention */
<               prawake(pp);
<       (void) splx(s);
<       if (disp & PCATCH)
<               return 1;
<
<       longjmp(&u.u_qsav);
<
<       /* NOTREACHED */
---
>       SCHED_PROC;         /* Make next ready process runnable */
>       if (run_pp == NULL) {
>               NULL_TASK_APPL /* Contains possibly application specific polling
>                                * and then suspends this task, if it did not get reactivated
>                                */
>       } else
>               sc_tsuspend(0, 0, &err); /* Sleep */
>       fsplx(s);        /* Restore processor level */
>       /* Woke up */
>       sig = pp->p_int;        /* Get signal */
>       pp->p_int = 0;
>       return sig;     /* Return 0 if normal wakeup, 1 if process was interrupted */
223,224c126
< void
< unsleep(pp)
---
> void unsleep(pp)
237d138
<               ASSERT(sqp->sq_last == NULL || sqp->sq_last->p_link == NULL);
256,266c157
<  * Wake up all processes sleeping on chan. Note that a process on a
<  * sleep queue may be either in state SSLEEP or in state SSTOP; if it
<  * was stopped we remove it from its sleep queue but we don't set it
<  * running here. The preemptflg indicates whether the caller is
<  * requesting a preemptive or non-preemptive wakeup. Preemptive
<  * wakeups are the norm. Non-preemptive wakeups should only be used
<  * in situations where is is critical to limit the context switching
<  * between cooperating procsses (e.g.readers and writers on a pipe).
<  * Also, non-preemptive wakups may not be supported by all scheduling
<  * classes (the class may force the preemption regardless of the value
<  * of preemptflg).
---
>  * Wake up all processes sleeping on chan. Second argument is ignored.
268,269c159
< void
```

© COPYRIGHT 1994 AMDAHL CORPORATION

```
< wakeprocs(chan, preemptflg)
---
> void wakeprocs(chan, preemptflg)
277,279c167
<       int                     runsched = 0;
<       register int            s;
<       psw_t                   psw;
---
>       register int s;
281,289c169
< #ifdef KPERF
<       int                     wppcount = 0;
<       int                     index;
<       if (kpftraceflg) {
<               RETADDR_TO_KPC
<       }
< #endif /* KPERF */
<
<       s = splhi();
---
>       s = splstr();
293c173
<               ASSERT(pp->p_stat == SSLEEP || pp->p_stat == SSTOP);
---
>               ASSERT(pp->p_stat & SSLEEP);
295,302c175
< #ifdef KPERF
<                       if (kpftraceflg && outbuf == 0) {
<                               if(wppcount < 1024) {
<                                       wpp[wppcount]= (caddr_t )pp;
<                                       wppcount++;
<                               }
<                       }
< #endif /* KPERF */
---
>                       int err;
304,313c177,179
<                       /* bypass CC event from interrupt level */
<                       movpsw(psw);
<                       if (!BASEPRI(psw)
<                       &&  MAC_ACCESS(MACEQUAL, u.u_cred->cr_lid,
<                                               pp->p_cred->cr_lid))
<                               cc_limiter(CC_SPEC_WAKEUP, u.u_cred);
<
<                       /*
```

© COPYRIGHT 1994 AMDAHL CORPORATION

```
<                        * Take off sleep queue, put on dispatcher queue
<                        * if not SSTOP.
---
>                       /*
>                        * Take off sleep queue, put on dispatcher queue if
>                        * not SSTOP.
317,345c183,184
<                       if (pp->p_stat == SSLEEP) {
<                               pp->p_stat = SRUN;
<                               if (preemptflg == NOPRMPT)
<                                       npwakecnt++;
<
<                               /*
<                                * Call class specific wakeup function.
<                                * Although we pass the preemptflg the
<                                * class specific code we call here may
<                                * choose to ignore requests for
<                                * non-preemptive wakeups in accordance
<                                * with its particular scheduling policy.
<                                */
<                               CL_WAKEUP(pp, pp->p_clproc, preemptflg);
<
<                               /*
<                                * Make arrangements for swapin or
<                                * preemption if necessary.
<                                */
<                               if ((pp->p_flag & SLOAD) == 0) {
<                                       /*
<                                        * We must not call setrun here!
<                                        */
<                                       if (runout > 0)
<                                               runsched = 1;
<                               } else if (pp->p_pri > curpri &&
<                                   preemptflg != NOPRMPT)
<                                       runrun = 1;
<                       }
---
>                       pp->p_stat = SRUN;
>                       ACTIVATE_PROC(pp);        /* Wake up */
352,354c191,192
<       if (runsched) {
<               runout = 0;
<               setrun(proc_sched);
---
>       if (run_pp == NULL) {
```

© COPYRIGHT 1994 AMDAHL CORPORATION

```
>               SCHED_PROC;
356,366d193
< #ifdef KPERF
<       if (kpftraceflg && outbuf == 0) {
<               /*
<                * write a record for each process awaken up.
<                */
<               for (index=0;index < wppcount; index++) {
<                       kperf_write(KPT_WAKEUP, Kpc, wpp[index]);
<               }
<       }
< #endif /* KPERF */
<
370a198,203
> void wakeup(chan)
>       register caddr_t chan;
> {
>       wakeprocs(chan, 0);
> }
>
372c205
<  * Set the process running; arrange for it to be swapped in if necessary.
---
>  * setrun - Set a process running.
374,375c207
< void
< setrun(pp)
---
> void setrun(pp)
380,381c212,213
<       s = splhi();
<       if (pp->p_stat == SSLEEP || pp->p_stat == SSTOP) {
---
>       s = splstr();
>       if (pp->p_stat & SSLEEP) {
387,393d218
<       } else if (pp->p_stat == SRUN) {
<
<               /*
<                * Already on dispatcher queue.
<                */
<               splx(s);
<               return;
395,432d219
<
```

© COPYRIGHT 1994 AMDAHL CORPORATION

```
<       if (pp->p_stat == SSTOP) {
<
<               /*
<                * Both ptrace() or the sending of SIGCONT (SXSTART) and
<                * /proc (SPSTART) must have requested that the process be run.
<                * Just calling setrun() is not sufficient to set a stopped
<                * process running.  SXSTART is always set if the process is
<                * not ptrace()d or stopped by a jobcontrol stop signal.
<                * SPSTART is always set if /proc is not controlling it.
<                * The process won't be stopped unless one of ptrace() or
<                * receipt of a jobcontrol stop signal or /proc did it.
<                *
<                * These flags must be set before calling setrun(p).
<                * They can't be passed as arguments because the streams
<                * code calls setrun() indirectly and the mechanism for
<                * doing so admits only one argument.
<                */
<               if ((pp->p_flag & (SXSTART|SPSTART)) != (SXSTART|SPSTART)) {
<                       /*
<                        * Wake up ptrace()d process's parent if /proc issued
<                        * the run request.  It may be sleeping in ptrace().
<                        */
<                       if ((pp->p_flag & SPSTART)
<                         && pp->p_whystop == PR_SIGNALLED)
<                               wakeprocs((caddr_t)pp->p_parent, PRMPT);
<                       splx(s);
<                       return;
<               }
<               /*
<                * Process is no longer stopped.
<                * Make sure wait(2) will not see it until it stops again.
<                */
<               pp->p_wcode = 0;
<               pp->p_wdata = 0;
<       }
<
<       ASSERT(pp->p_wchan == 0);
434,435c221,223
<       pp->p_whystop = 0;
<       pp->p_whatstop = 0;
---
>       ACTIVATE_PROC(pp);        /* Wake up */
>       splx(s);
> }
437,440d224
```

© COPYRIGHT 1994 AMDAHL CORPORATION

```
<	/*
<	 * Let the class put the process on the dispatcher queue.
<	 */
<	CL_SETRUN(pp, pp->p_clproc);
442,451c226,230
<	/*
<	 * Make arrangements for swapin or preemption if necessary.
<	 */
<	if ((pp->p_flag & SLOAD) == 0) {
<		if (runout > 0) {
<			runout = 0;
<			setrun(proc_sched);
<		}
<	} else if (pp->p_pri > curpri)
<		runrun = 1;
---
> /*
>  * signal_proc - If task is sleeping and allows signals, wake it up, otherwise
>  *		only set the interrupt flag in the proc structure.
>  *		NOTE: Interrupts have to be disabled when calling this routine.
>  */
453c232,241
<	splx(s);
---
> void signal_proc(pp)
>	register proc_t *pp;
> {
>	pp->p_int = 1;
>
>	if (pp->p_stat == SSLEEP) {
>		unsleep(pp);
>		pp->p_stat = SRUN;
>		ACTIVATE_PROC(pp);		/* Wake up */
>	}
455a244,248
> /*
>  * reschedule - Check whether another task is ready, and reschedule then.
>  * This function contains shortened versions of the ACTIVATE_PROC and SCHED_PROC
>  * macros.
>  */
457,459c250
< void
< wakeup(chan)
< register caddr_t	chan;
---
```

© COPYRIGHT 1994 AMDAHL CORPORATION

```
> void reschedule()
461c252,267
<       wakeprocs(chan, PRMPT);
---
>       volatile short s;
>
>       if (preadyq != NULL) {
>               int err;
>               register proc_t *current_pp = run_pp;
>
>               s = splstr();
>               preadyq_last->p_link = current_pp;
>               preadyq_last = current_pp;
>               current_pp->p_link = NULL;
>               run_pp = preadyq;
>               preadyq = preadyq->p_link;
>               fsplx(s);
>               sc_tresume(run_pp->p_tid, 0, &err);
>               sc_tsuspend(0, 0, &err); /* Sleep */
>       }
```

© COPYRIGHT 1994 AMDAHL CORPORATION

```
1,2c1,10
< /*    Copyright (c) 1990, 1991 UNIX System Laboratories, Inc.    */
< /*    Copyright (c) 1984, 1986, 1987, 1988, 1989, 1990 AT&T    */
---
> #ident "%W% %G% %U% %n%"
> /* %N% */
> /* File: streamio.c - last edit:
>  * helge     Thu Mar  4 10:35:37 1993
>
>  * Copyright (c) 1992 by Amdahl Corporation. All rights reserved.
>  * Copyright (c) 1993 by Amdahl Corporation. All rights reserved.
>  */
>
> /*    Copyright (c) 1984, 1986, 1987, 1988, 1989 AT&T    */
5,6c13
< /*    THIS IS UNPUBLISHED PROPRIETARY SOURCE CODE OF    */
< /*    UNIX System Laboratories, Inc.                    */
---
> /*    THIS IS UNPUBLISHED PROPRIETARY SOURCE CODE OF AT&T    */
10c17
< #ident      "@(#)uts-3b2:io/streamio.c      1.30"
---
> #ident      "@(#)kernel:os/streamio.c      1.87"
12,46c19,34
< #include <acc/audit/audit.h>
< #include <acc/dac/acl.h>
< #include <acc/mac/cca.h>
< #include <acc/mac/mac.h>
< #include <acc/priv/privilege.h>
< #include <fs/file.h>
< #include <fs/filio.h>
< #include <fs/ioccom.h>
< #include <fs/vnode.h>
< #include <io/conf.h>
< #include <io/poll.h>
< #include <io/sad/sad.h>
< #include <io/stream.h>
< #include <io/stropts.h>
< #include <io/strsubr.h>
< #include <io/termio.h>
< #include <io/termios.h>
< #include <io/ttold.h>
< #include <io/uio.h>
< #include <io/xt/jioctl.h>
< #include <mem/kmem.h>
```

© COPYRIGHT 1994 AMDAHL CORPORATION

```
< #include <proc/cred.h>
< #include <proc/proc.h>
< #include <proc/session.h>
< #include <proc/signal.h>
< #include <proc/user.h>
< #include <svc/errno.h>
< #include <svc/secsys.h>
< #include <svc/systm.h>
< #include <util/cmn_err.h>
< #include <util/debug.h>
< #include <util/inline.h>
< #include <util/param.h>
< #include <util/sysmacros.h>
< #include <util/types.h>
---
> #include "sys/cmn_err.h"
> #include "sys/cred.h"
> #include "sys/debug.h"
> #include "sys/errno.h"
> #include "sys/file.h"
> #include "sys/param.h"
> #include "sys/proc.h"
> #include "sys/sad.h"
> #include "sys/stream.h"
> #include "sys/stropts.h"
> #include "sys/strstat.h"
> #include "sys/strsubr.h"
> #include "sys/sysmacros.h"
> #include "sys/termios.h"
> #include "sys/vnode.h"
> #include "spl.h"
48,52d35
< #ifdef GEM
< #include <svc/events.h>
< #include <svc/evsys.h>
< #endif /* GEM */
<
58,64c41
< /*
<  * Qinit structure and Module_info structures
<  *      for stream head read and write queues
<  */
< static int strrput();
< int   strwsrv();
< STATIC int strsink();
```

© COPYRIGHT 1994 AMDAHL CORPORATION

```
<               if (stp->sd_flag & (STWOPEN|STRCLOSE)) {
<                       if (flag & (FNDELAY|FNONBLOCK)) {
---
>               s = splstr();
>               if (stp->sd_flag & (STWOPEN | STRCLOSE)) {
>                       splx(s);
>                       if (flag & (FNDELAY | FNONBLOCK)) {
131,132c89,90
<
<               if (stp->sd_flag & (STRDERR|STWRERR)) {
---
>               if (stp->sd_flag & (STRDERR | STWRERR)) {
>                       splx(s);
137c95,104
<               s = splstr();
---
>               /*
>                * If remote, make sure multiple opens are from the same
>                * remote id
>                */
>               if ((int) stp->sd_dsf_el != rem_id) {
>                       /* Different system try to open same stream */
>                       splx(s);
>                       error = EEXIST;
>                       goto ckreturn;
>               }
142,145c109,112
<                * Open all modules and devices down stream to notify
<                * that another user is streaming.  For modules, set the
<                * last argument to MODOPEN and do not pass any open flags.
<                * Ignore dummydev since this is not the first open.
---
>                * Open all modules and devices down stream to notify that
>                * another user is streaming.  For modules, set the last
>                * argument to MODOPEN and do not pass any open flags. Ignore
>                * dummydev since this is not the first open.
154d120
<                               extern void gen_setup_idinfo();
156,159c122,126
<                               gen_setup_idinfo(crp);
<
<                       /* check if dev is too large for old interface */
<                               if ((oldev = cmpdev(*devp)) == NODEV){
---
>                               /*
```

© COPYRIGHT 1994 AMDAHL CORPORATION

```
>                          * check if dev is too large for old
>                          * interface
>                          */
>                         if ((oldev = cmpdev(*devp)) == NODEV) {
163,166c130,132
<                         if ((*RD(qp)->q_qinfo->qi_qopen)(RD(qp), oldev,
<                             flag, (qp->q_next ? MODOPEN : 0)) ==
<                             OPENFAIL) {
<                                 if ((error = u.u_error) == 0) /* XXX */
---
>                         if ((*RD(qp)->q_qinfo->qi_qopen) (RD(qp), oldev, flag,
>                                     (qp->q_next ? MODOPEN : 0)) == OPENFAIL) {
>                                 if ((error = get_uerror()) == 0)
172,174c138,139
<                         if (error=((*RD(qp)->q_qinfo->qi_qopen)(RD(qp),
<                             &dummydev, flag, (qp->q_next ? MODOPEN : 0),
<                             crp)))
---
>                         if (error = ((*RD(qp)->q_qinfo->qi_qopen) (RD(qp), &dummydev,
>                                         flag, (qp->q_next ? MODOPEN : 0), crp)))
183a149
>
184a151
>
190,202c157,159
<         if (error) {
<                 if (vp->v_stream && vp->v_count == 1) {
<                         struct vnode *rvp;
<
<                         rvp = specfind(vp->v_rdev, vp->v_type);
<                         if (rvp) {
<                                 VN_RELE(rvp);
<                                 if (rvp->v_count == 1)
<                                         strclose(vp, flag, crp);
<                         }
<                 }
<         }
<         wakeprocs((caddr_t)stp, PRMPT);
---
>         if (error && vp->v_stream && vp->v_count == 1)
>                 strclose(vp, flag, crp);
>         wakeprocs((caddr_t) stp, PRMPT);
204c161
<     }
---
```

© COPYRIGHT 1994 AMDAHL CORPORATION

```
>       }
206,210c163,165
<       /*
<        * This vnode isn't streaming.  SPECFS already
<        * checked for multiple vnodes pointing to the
<        * same stream, so create a stream to the driver.
<        *
---
>       /*
>        * This vnode isn't streaming. Create a stream to the driver.
>        *
214c169
<       if (strthresh && (Strcount > strthresh) && pm_denied(u.u_cred, P_SYSOPS))
---
>       if (strthresh && (Strcount > strthresh) && !suser(crp))
221d175
<
228,230c182,183
<        * We could have slept in the above allocations.
<        * Check vp->v_stream again to make sure nobody
<        * came in and opened the stream before us.
---
>        * We could have slept in the above allocations. Check vp->v_stream
>        * again to make sure nobody came in and opened the stream before us.
231a185
>       s = splstr();
232a187
>               splx(s);
237,244d191
<
<         /*
<          * We don't know that the vnode is really at the level of
<          * the process, but it should be at the same level as the
<          * stream being created, and this MAC_ASSUME() ensures
<          * that the CCA tool figures this out.
<          */
<         MAC_ASSUME (vp, MAC_SAME);
249c196
<       s = splstr();
---
>       vp->v_stream = stp;
251,258d197
<       stp->sd_siglist = NULL;
<       stp->sd_pollist.ph_events = 0;
<       stp->sd_pollist.ph_list = NULL;
```

© COPYRIGHT 1994 AMDAHL CORPORATION

```
< #ifdef GEM
<       stp->sd_eventlist = NULL;
<       stp->sd_eventflags = 0;
< #endif /* GEM */
<       stp->sd_sigflags = 0;
260a200
>       stp->sd_dsf_el = (struct dsf_element *) rem_id;
262,263d201
<       stp->sd_sidp = NULL;
<       stp->sd_pgidp = NULL;
271,273c209,210
<       setq(qp, &strdata, &stwdata);
<       qp->q_ptr = WR(qp)->q_ptr = (caddr_t)stp;
<       vp->v_stream = stp;
---
>       setq(qp, sthead->st_rdinit, sthead->st_wrinit);
>       qp->q_ptr = WR(qp)->q_ptr = (caddr_t) stp;
275,279d211
<       if (vp->v_type == VFIFO) {
<               stp->sd_strtab = &fifoinfo;
<               goto opendone;
<       }
<
288c220,233
<       if (error = qattach(qp, devp, flag, CDEVSW, getmajor(*devp), crp))
---
>       if (error = qattach(qp, devp, flag, CDEVSW, getmajor(*devp), crp)) {
>
>               /*
>                * Check whether any messages are stored in the read queue,
>                * and free them.
>                */
>               register mblk_t *tmp, *mp = qp->q_first;
>
>               while (mp != NULL) {
>                       tmp = mp;
>                       mp = mp->b_next;
>                       freemsg(tmp);
>               }
>               qp->q_first = NULL;
289a235
>       }
347c293,312
<       wakeprocs((caddr_t)stp, PRMPT);
---
```

© COPYRIGHT 1994 AMDAHL CORPORATION

```
>       if (error == 0 && *devp != savedev) {
>               register struct vnode *nvp;
>
>               /* This was a clone open */
>               /* Create a new (temporary) vnode */
>               if ((nvp = enter_vnode(*devp, VTEMP)) == NULL || nvp->v_count > 0) {
>                       /* Allocation failed or node already in use */
>                       strclose(vp, flag, crp);
>                       freed++;
>                       error = ENOMEM;
>               } else {
>                       nvp->v_count = 1;
>                       nvp->v_stream = stp;
>                       stp->sd_vnode = nvp;
>                       stp->sd_strtab = cdevsw[getmajor(*devp)].d_str;
>                       vp->v_stream = NULL;
>                       vp->v_count--;
>               }
>       }
>       wakeprocs((caddr_t) stp, PRMPT);
357d321
<
369,370c333
< int
< strclose(vp, flag, crp)
---
> int strclose(vp, flag, crp)
379d341
<       extern void strtime();
417,426c379,380
<                       prev = q;
<               }
<       }
<       splx(s);
<
<       if (mp)  {
<               if (stp->sd_flag & (STRHUP|STWRERR))
<                       freemsg(mp);
<               else
<                       putnext(qp, mp);
---
>                       prev = q;
>               }
427a382,385
>       if (mp) {
```

© COPYRIGHT 1994 AMDAHL CORPORATION

```
---
> int strhold = 1;      /* switch for small message consolidation feature */
66,78d42
< STATIC struct module_info strm_info = { 0, "strrhead", 0, INFPSZ, STRHIGH, STRLOW };
< STATIC struct module_info stwm_info = { 0, "strwhead", 0, 0, 0, 0 };
< struct        qinit strdata = { strrput, NULL, NULL, NULL, NULL, &strm_info, NULL };
< struct        qinit stwdata = { NULL, strwsrv, NULL, NULL, NULL, &stwm_info, NULL };
< STATIC struct qinit deadrend = {
<       strsink, NULL, NULL, NULL, NULL, &strm_info, NULL
< };
< STATIC struct qinit deadwend = {
<       NULL, NULL, NULL, NULL, NULL, &stwm_info, NULL
< };
<
< extern struct streamtab fifoinfo;
<
80,89d43
<  * Tunable parameters set in kernel.cf and used only in this file.
<  */
< extern int    strmsgsz;       /* maximum stream message size */
< extern int    strctlsz;       /* maximum size of ctl part of message */
< extern long   strthresh;      /* Strcount threshold above which */
<                               /* some Streams operations will be stopped */
<
< STATIC int strhold = 1;       /* switch for small message consolidation feature */
<
< /*
92,93c46
< int
< stropen(vp, devp, flag, crp)
---
> int stropen(vp, devp, flag, crp, sthead, rem_id)
97a51,52
>       struct streamtab *sthead;
>       int rem_id;
102c57
<       dev_t dummydev;
---
>       dev_t dummydev, savedev;
106d60
<       extern vnode_t *specfind();
107a62,63
>       savedev = *devp;
>
120,121c76,79
```

© COPYRIGHT 1994 AMDAHL CORPORATION

```
>               if (stp->sd_flag & (STRHUP | STWRERR)) {
>                       do {
>                               register mblk_t *tmp_mp;
429,430c387,401
<       s = splstr();
<       stp->sd_flag &= ~(STRDERR|STWRERR);            /* help unlink succeed */
---
>                               tmp_mp = mp->b_next;
>                               freemsg(mp);
>                               mp = tmp_mp;
>                       } while (mp != NULL);
>               } else {
>                       do {
>                               register mblk_t *tmp_mp;
>
>                               tmp_mp = mp->b_next;
>                               putnext(qp, mp);
>                               mp = tmp_mp;
>                       } while (mp != NULL);
>               }
>       }
>       stp->sd_flag &= ~(STRDERR | STWRERR);          /* help unlink succeed */
440c411,412
<                       id = timeout(strtime, (caddr_t)stp, stp->sd_closetime);
---
>                       id = timeout(strtime, (caddr_t) stp, stp->sd_closetime);
>
457a430,435
>       /*
>        * If the write queue of the stream head is pointing to a read queue,
>        * null out the other write queue.
>        */
>       if (qp->q_next && !SAMESTR(qp))
>               WR(qp->q_next)->q_next = NULL;
460,463d437
<       for (mp = RD(qp)->q_first; mp; mp = mp->b_next) {
<               if (mp->b_datap->db_type == M_PASSFP)
<                       closef(((struct strrecvfd *)mp->b_rptr)->f.fp);
<       }
480a455,458
>       qp = RD(qp);
>       mp = qp->q_first;
>       qp->q_first = qp->q_last = NULL;
>       qp->q_count = 0;
482,501d459
```

© COPYRIGHT 1994 AMDAHL CORPORATION

```
<       /*
<        * If the write queue of the stream head is pointing to a
<        * read queue, we have a twisted stream. If the read queue
<        * is alive, convert the stream head queues into a dead end.
<        * If the read queue is dead, free the dead pair.
<        */
<       if (qp->q_next && !SAMESTR(qp)) {
<               if (qp->q_next->q_qinfo == &deadrend) {   /* half-closed pipe */
<                       freeq(qp->q_next);
<                       freeq(RD(qp));
<               } else if (qp->q_next == RD(qp)) {   /* fifo */
<                       freeq(RD(qp));
<               } else {                                    /* pipe */
<                       qp->q_qinfo = &deadwend;
<                       RD(qp)->q_qinfo = &deadrend;
<               }
<       } else {
<               freeq(RD(qp)); /* free stream head queue pair */
<       }
<
507,513d464
<       vp->v_stream = NULL;
<       stp->sd_flag &= ~STRCLOSE;
<       splx(s);
<       wakeprocs((caddr_t)stp, PRMPT);
<       shfree(stp);
<       return (0);
< }
515,583c466,467
< /*
<  * Clean up after a process when it closes a stream. This is called
<  * from closef for all closes, whereas strclose is called only for the
<  * last close on a stream. The pollist, siglist, and eventlist are
<  * scanned for entries for the current process, and these are removed.
<  */
< strclean(vp)
<       struct vnode *vp;
< {
<       register struct strevent *sep, *psep, *tsep;
<       register int s;
<       struct stdata *stp;
<       int update = 0;
<
<       stp = vp->v_stream;
<       psep = NULL;
```

© COPYRIGHT 1994 AMDAHL CORPORATION

```
<       s = splstr();
<       sep = stp->sd_siglist;
<       while (sep) {
<               if (sep->se_procp == u.u_procp) {
<                       tsep = sep->se_next;
<                       if (psep)
<                               psep->se_next = tsep;
<                       else
<                               stp->sd_siglist = tsep;
<                       sefree(sep);
<                       update = 1;
<                       sep = tsep;
<               } else {
<                       psep = sep;
<                       sep = sep->se_next;
<               }
<       }
<       if (update) {
<               stp->sd_sigflags = 0;
<               for (sep = stp->sd_siglist; sep; sep = sep->se_next)
<                       stp->sd_sigflags |= sep->se_events;
<               update = 0;
<       }
<       psep = NULL;
< #ifdef GEM
<       sep = stp->sd_eventlist;
<       while (sep) {
<               if (sep->se_pid == u.u_procp->p_pid) {
<
<                       /*
<                        * To do: check to see that
<                        * sep->se_hostid == hostid of process doing close.
<                        */
<                       tsep = sep->se_next;
<                       if (psep)
<                               psep->se_next = tsep;
<                       else
<                               stp->sd_eventlist = tsep;
<                       VN_RELE(sep->se_vp);
<                       sefree(sep);
<                       update = 1;
<                       sep = tsep;
<               } else {
<                       psep = sep;
<                       sep = sep->se_next;
```

© COPYRIGHT 1994 AMDAHL CORPORATION

```
<               }
<       }
<       if (update) {
<               stp->sd_eventflags = 0;
<               for (sep = stp->sd_eventlist; sep; sep = sep->se_next)
<                       stp->sd_eventflags |= sep->se_kmask;
<       }
< #endif /* GEM */
---
>       /* free stream head queue pair */
>       freeq(qp);
585d468
< }
587,632c470,471
< /*
<  * Read a stream according to the mode flags in sd_flag:
<  *
<  * (default mode)              - Byte stream, msg boundries are ignored
<  * RMSGDIS (msg discard)       - Read on msg boundries and throw away
<  *                               any data remaining in msg
<  * RMSGNODIS (msg non-discard) - Read on msg boundries and put back
<  *                               any remaining data on head of read queue
<  *
<  * Consume readable messages on the front of the queue until u.u_count
<  * is satisfied, the readable messages are exhausted, or a message
<  * boundary is reached in a message mode.  If no data was read and
<  * the stream was not opened with the NDELAY flag, block until data arrives.
<  * Otherwise return the data read and update the count.
<  *
<  * In default mode a 0 length message signifies end-of-file and terminates
<  * a read in progress.  The 0 length message is removed from the queue
<  * only if it is the only message read (no data is read).
<  *
<  * An attempt to read an M_PROTO or M_PCPROTO message results in an
<  * EBADMSG error return, unless either RDPROTDAT or RDPROTDIS are set.
<  * If RDPROTDAT is set, M_PROTO and M_PCPROTO messages are read as data.
<  * If RDPROTDIS is set, the M_PROTO and M_PCPROTO parts of the message
<  * are unlinked from and M_DATA blocks in the message, the protos are
<  * thrown away, and the data is read.
<  */
< /* ARGSUSED */
< int
< strread(vp, uiop, crp)
<       struct vnode *vp;
<       struct uio *uiop;
```

© COPYRIGHT 1994 AMDAHL CORPORATION

```
<       cred_t *crp;
< {
<       register s;
<       register struct stdata *stp;
<       register mblk_t *bp, *nbp;
<       int n;
<       int done = 0;
<       int error = 0;
<       char rflg;
<       short mark;
<       short delim;
<       unsigned char pri;
<
<       ASSERT(vp->v_stream);
<       stp = vp->v_stream;
---
>       while (mp) {
>               register mblk_t *tmp;
634,853c473,475
<       if (error = straccess(stp, JCREAD))
<               return (error);
<       if (stp->sd_flag & (STRDERR|STPLEX))
<               return ((stp->sd_flag & STPLEX) ? EINVAL : stp->sd_rerror);
<
<       /*
<        * Loop terminates when uiop->uio_resid == 0.
<        */
<       rflg = 0;
<       for (;;) {
<               s = splstr();
<               mark = 0;
<               delim = 0;
<               while (!(bp = getq(RD(stp->sd_wrq)))) {
<                       if (stp->sd_flag & STRHUP) {
<                               splx(s);
<                               return (error);
<                       }
<                       if (rflg && !(stp->sd_flag & STRDELIM)) {
<                               splx(s);
<                               return (error);
<                       }
<
<                       /*
<                        * if FIFO/pipe, don't sleep here. Sleep in the
<                        * fifo read routine.
```

© COPYRIGHT 1994 AMDAHL CORPORATION

```
<                        */
<                       if (vp->v_type == VFIFO) {
<                               splx(s);
<                               return (ESTRPIPE);
<                       }
<
<                       if ((error = strwaitq(stp, READWAIT, uiop->uio_resid,
<                         uiop->uio_fmode, &done)) || done) {
<                               if ((uiop->uio_fmode & FNDELAY) &&
<                                   (stp->sd_flag & OLDNDELAY) &&
<                                   (error == EAGAIN))
<                                       error = 0;
<                               splx(s);
<                               return (error);
<                       }
<               }
<               if (stp->sd_mark == bp) {
<                       if (rflg) {
<                               putbq(RD(stp->sd_wrq), bp);
<                               splx(s);
<                               return (error);
<                       }
<                       mark = 1;
<                       stp->sd_mark = NULL;
<               }
<               if ((stp->sd_flag & STRDELIM) && (bp->b_flag & MSGDELIM))
<                       delim = 1;
<               splx(s);
<
<               pri = bp->b_band;
<               if (qready())
<                       runqueues();
<
<               switch (bp->b_datap->db_type) {
<
<               case M_DATA:
< ismdata:
<                       if (msgdsize(bp) == 0) {
<                               if (mark || delim) {
<                                       freemsg(bp);
<                               } else if (rflg) {
<
<                                       /*
<                                        * If already read data put zero
<                                        * length message back on queue else
```

© COPYRIGHT 1994 AMDAHL CORPORATION

```
<                        * free msg and return 0.
<                        */
<                       bp->b_band = pri;
<                       putbq(RD(stp->sd_wrq), bp);
<               } else {
<                       freemsg(bp);
<               }
<               return (0);
<       }
<
<       rflg = 1;
<       while (bp && uiop->uio_resid) {
<               if (n = MIN(uiop->uio_resid, bp->b_wptr - bp->b_rptr))
<                       error = uiomove((char *)bp->b_rptr, n, UIO_READ, uiop);
<
<               if (error) {
<                       freemsg(bp);
<                       return (error);
<               }
<
<               bp->b_rptr += n;
<               while (bp && (bp->b_rptr >= bp->b_wptr)) {
<                       nbp = bp;
<                       bp = bp->b_cont;
<                       freeb(nbp);
<               }
<       }
<
<       /*
<        * The data may have been the leftover of a PCPROTO, so
<        * if none is left reset the STRPRI flag just in case.
<        */
<       if (bp) {
<               /*
<                * Have remaining data in message.
<                * Free msg if in discard mode.
<                */
<               if (stp->sd_flag & RMSGDIS) {
<                       freemsg(bp);
<                       s = splstr();
<                       stp->sd_flag &= ~STRPRI;
<                       splx(s);
<               } else {
<                       s = splstr();
<                       bp->b_band = pri;
```

© COPYRIGHT 1994 AMDAHL CORPORATION

```
<                               if (mark && !stp->sd_mark) {
<                                       stp->sd_mark = bp;
<                                       bp->b_flag |= MSGMARK;
<                               }
<                               if (delim)
<                                       bp->b_flag |= MSGDELIM;
<                               putbq(RD(stp->sd_wrq),bp);
<                               splx(s);
<                       }
<               } else {
<                       s = splstr();
<                       stp->sd_flag &= ~STRPRI;
<                       splx(s);
<               }
<
<               /*
<                * Check for signal messages at the front of the read
<                * queue and generate the signal(s) if appropriate.
<                * The only signal that can be on queue is M_SIG at
<                * this point.
<                */
<               while (((bp = RD(stp->sd_wrq)->q_first)) &&
<                       (bp->b_datap->db_type == M_SIG)) {
<                       bp = getq(RD(stp->sd_wrq));
<                       strsignal(stp, *bp->b_rptr, (long)bp->b_band);
<                       freemsg(bp);
<                       if (qready())
<                               runqueues();
<               }
<
<               /*
<                * Check for event messages at the front of the read
<                * queue and generate the event(s) if appropriate.
<                * The only event that can be on queue is M_EVENT at
<                * this point.
<                */
< #ifdef GEM
<               while (((bp = RD(stp->sd_wrq)->q_first)) &&
<                       (bp->b_datap->db_type == M_EVENT)) {
<                       bp = getq(RD(stp->sd_wrq));
<                       strdrpost(bp);
<                       freemsg(bp);
<                       if (qready())
<                               runqueues();
<               }
```

© COPYRIGHT 1994 AMDAHL CORPORATION

```
< #endif /* GEM */
<
<                   if ((uiop->uio_resid == 0) || mark || delim ||
<                       (stp->sd_flag & (RMSGDIS|RMSGNODIS)))
<                           return (error);
<                   continue;
<
<           case M_PROTO:
<           case M_PCPROTO:
<                   /*
<                    * Only data messages are readable.
<                    * Any others generate an error, unless
<                    * RDPROTDIS or RDPROTDAT is set.
<                    */
<                   if (stp->sd_flag & RDPROTDAT) {
<                           for (nbp = bp; nbp; nbp = bp->b_next)
<                                   nbp->b_datap->db_type = M_DATA;
<                           s = splstr();
<                           stp->sd_flag &= ~STRPRI;
<                           splx(s);
<                           goto ismdata;
<                   } else if (stp->sd_flag & RDPROTDIS) {
<                           while (bp &&
<                               ((bp->b_datap->db_type == M_PROTO) ||
<                               (bp->b_datap->db_type == M_PCPROTO))) {
<                                   nbp = unlinkb(bp);
<                                   freeb(bp);
<                                   bp = nbp;
<                           }
<                           s = splstr();
<                           stp->sd_flag &= ~STRPRI;
<                           splx(s);
<                           if (bp) {
<                                   bp->b_band = pri;
<                                   goto ismdata;
<                           } else {
<                                   break;
<                           }
<                   }
<                   /* fall thru */
<
<           case M_PASSFP:
<                   if ((bp->b_datap->db_type == M_PASSFP) &&
<                       (stp->sd_flag & RDPROTDIS)) {
<                           closef(((struct strrecvfd *)bp->b_rptr)->f.fp);
```

© COPYRIGHT 1994 AMDAHL CORPORATION

```
<                               freemsg(bp);
<                               break;
<                       }
<                       putbq(RD(stp->sd_wrq), bp);
<                       return (EBADMSG);
<
<               default:
<                       /*
<                        * Garbage on stream head read queue.
<                        */
<                       ASSERT(0);
<                       freemsg(bp);
<                       break;
<               }
---
>               tmp = mp->b_next;
>               freemsg(mp);
>               mp = tmp;
856,1753d477
<       /* NOTREACHED */
< }
<
< /*
<  * Stream read put procedure.  Called from downstream driver/module
<  * with messages for the stream head.  Data, protocol, and in-stream
<  * signal messages are placed on the queue, others are handled directly.
<  */
<
< static
< strrput(q, bp)
<       register queue_t *q;
<       register mblk_t *bp;
< {
<       register struct stdata *stp;
<       register struct iocblk *iocbp;
<       register int s;
<       struct stroptions *sop;
<       struct copyreq *reqp;
<       struct copyresp *resp;
<       unsigned char bpri;
<       qband_t *qbp;
<
<       stp = (struct stdata *)q->q_ptr;
<
<       ASSERT(!(stp->sd_flag & STPLEX));
```

© COPYRIGHT 1994 AMDAHL CORPORATION

```
<
<       switch (bp->b_datap->db_type) {
<
<       case M_DATA:
<       case M_PROTO:
<       case M_PCPROTO:
<       case M_PASSFP:
<               s = splstr();
<               if (bp->b_datap->db_type == M_PCPROTO) {
<                       /*
<                        * Only one priority protocol message is allowed at the
<                        * stream head at a time.
<                        */
<                       if (stp->sd_flag & STRPRI) {
<                               freemsg(bp);
<                               splx(s);
<                               return;
<                       }
<               }
<
<               /*
<                * Marking doesn't work well when messages
<                * are marked in more than one band.  We only
<                * remember the last message received, even if
<                * it is placed on the queue ahead of other
<                * marked messages.
<                */
<               if (bp->b_flag & MSGMARK)
<                       stp->sd_mark = bp;
<
<               /*
<                * Wake sleeping read/getmsg
<                */
<               if (stp->sd_flag & RSLEEP) {
<                       stp->sd_flag &= ~RSLEEP;
<                       if (stp->sd_vnode->v_type == VFIFO)
<                               wakeprocs((caddr_t)q, NOPRMPT); /*don't thrash*/
<                       else
<                               wakeprocs((caddr_t)q, PRMPT);
<               }
<
<               putq(q, bp);
<
<               if (bp->b_datap->db_type == M_PCPROTO) {
<                       stp->sd_flag |= STRPRI;
```

© COPYRIGHT 1994 AMDAHL CORPORATION

```
<                       if (stp->sd_sigflags & S_HIPRI)
<                               strsendsig(stp->sd_siglist, S_HIPRI, 0L);
<                       if (stp->sd_pollist.ph_events & POLLPRI)
<                               pollwakeup(&stp->sd_pollist, POLLPRI);
< #ifdef GEM
<                       if (stp->sd_eventflags & S_HIPRI)
<                               strevpost(stp, S_HIPRI, 0L);
< #endif /* GEM */
<               } else if (q->q_first == bp) {
<                       if (stp->sd_sigflags & S_INPUT)
<                               strsendsig(stp->sd_siglist, S_INPUT,
<                                   (long)bp->b_band);
<                       if (stp->sd_pollist.ph_events & POLLIN)
<                               pollwakeup(&stp->sd_pollist, POLLIN);
< #ifdef GEM
<                       if (stp->sd_eventflags & S_INPUT)
<                               strevpost(stp, S_INPUT, (long)bp->b_band);
< #endif /* GEM */
<                       if (bp->b_band == 0) {
<                           if (stp->sd_sigflags & S_RDNORM)
<                                   strsendsig(stp->sd_siglist, S_RDNORM, 0L);
<                           if (stp->sd_pollist.ph_events & POLLRDNORM)
<                                   pollwakeup(&stp->sd_pollist, POLLRDNORM);
< #ifdef GEM
<                           if (stp->sd_eventflags & S_RDNORM)
<                                   strevpost(stp, S_RDNORM, 0L);
< #endif /* GEM */
<                       } else {
<                           if (stp->sd_sigflags & S_RDBAND)
<                                   strsendsig(stp->sd_siglist, S_RDBAND,
<                                       (long)bp->b_band);
<                           if (stp->sd_pollist.ph_events & POLLRDBAND)
<                                   pollwakeup(&stp->sd_pollist, POLLRDBAND);
< #ifdef GEM
<                           if (stp->sd_eventflags & S_RDBAND)
<                                   strevpost(stp, S_RDBAND, (long)bp->b_band);
< #endif /* GEM */
<                       }
<               }
<
<               splx(s);
<               return;
<
<
<       case M_ERROR:
```

© COPYRIGHT 1994 AMDAHL CORPORATION

```
<			/*
<			 * An error has occured downstream, the errno is in the first
<			 * byte of the message.
<			 */
<			if ((bp->b_wptr - bp->b_rptr) == 2) {	/* New flavor */
<				unsigned char rw = 0;
<
<				s = splstr();
<				if (*bp->b_rptr != NOERROR) {	/* read error */
<					if (*bp->b_rptr != 0) {
<						stp->sd_flag |= STRDERR;
<						rw |= FLUSHR;
<					} else {
<						stp->sd_flag &= ~STRDERR;
<					}
<					stp->sd_rerror = *bp->b_rptr;
<				}
<				bp->b_rptr++;
<				if (*bp->b_rptr != NOERROR) {	/* write error */
<					if (*bp->b_rptr != 0) {
<						stp->sd_flag |= STWRERR;
<						rw |= FLUSHW;
<					} else {
<						stp->sd_flag &= ~STWRERR;
<					}
<					stp->sd_werror = *bp->b_rptr;
<				}
<				splx(s);
<				if (rw) {
<					wakeprocs((caddr_t)q, PRMPT); /* readers */
<					wakeprocs((caddr_t)WR(q), PRMPT); /* writers */
<					wakeprocs((caddr_t)stp, PRMPT);	/* ioctllers */
<
<					s = splstr();
<					if (stp->sd_sigflags & S_ERROR)
<						strsendsig(stp->sd_siglist, S_ERROR,
<						    ((rw & FLUSHR) ?
<						    (long)stp->sd_rerror :
<						    (long)stp->sd_werror));
<					pollwakeup(&stp->sd_pollist, POLLERR);
< #ifdef GEM
<					if (stp->sd_eventflags & S_ERROR)
<						strevpost(stp, S_ERROR, ((rw & FLUSHR) ?
<						    (long)stp->sd_rerror :
<						    (long)stp->sd_werror));
```

© COPYRIGHT 1994 AMDAHL CORPORATION

```
< #endif /* GEM */
<                               splx(s);
<                               freemsg(bp);
<                               (void) putctl1(WR(q)->q_next, M_FLUSH, rw);
<                               return;
<                       }
<               } else if (*bp->b_rptr != 0) {                  /* Old flavor */
<                       s = splstr();
<                       stp->sd_flag |= (STRDERR|STWRERR);
<                       stp->sd_rerror = *bp->b_rptr;
<                       stp->sd_werror = *bp->b_rptr;
<                       splx(s);
<                       wakeprocs((caddr_t)q, PRMPT); /* the readers */
<                       wakeprocs((caddr_t)WR(q), PRMPT); /* the writers */
<                       wakeprocs((caddr_t)stp, PRMPT); /* the ioctllers */
<
<                       s = splstr();
<                       if (stp->sd_sigflags & S_ERROR)
<                               strsendsig(stp->sd_siglist, S_ERROR,
<                                   (stp->sd_werror ? (long)stp->sd_werror :
<                                   (long)stp->sd_rerror));
<                       pollwakeup(&stp->sd_pollist, POLLERR);
< #ifdef GEM
<                       if (stp->sd_eventflags & S_ERROR)
<                               strevpost(stp, S_ERROR, (stp->sd_werror ?
<                               (long)stp->sd_werror : (long)stp->sd_rerror));
< #endif /* GEM */
<                       splx(s);
<                       freemsg(bp);
<                       (void) putctl1(WR(q)->q_next, M_FLUSH, FLUSHRW);
<                       return;
<               }
<               freemsg(bp);
<               return;
<
<       case M_HANGUP:
<
<               freemsg(bp);
<               s = splstr();
<               stp->sd_werror = ENXIO;
<               stp->sd_flag |= STRHUP;
<               splx(s);
<
<               /*
<                * send signal if controlling tty
```

© COPYRIGHT 1994 AMDAHL CORPORATION

```
<               */
<
<               if (stp->sd_sidp)
<                       prsignal(stp->sd_sidp, SIGHUP);
<
<               wakeprocs((caddr_t)q, PRMPT);           /* the readers */
<               wakeprocs((caddr_t)WR(q), PRMPT);  /* the writers */
<               wakeprocs((caddr_t)stp, PRMPT);         /* the ioctllers */
<
<               /*
<                * wake up read, write, and exception pollers and
<                * reset wakeup mechanism.
<                */
<
<               strhup(stp);
<               return;
<
<
<       case M_SIG:
<               /*
<                * Someone downstream wants to post a signal.  The
<                * signal to post is contained in the first byte of the
<                * message.  If the message would go on the front of
<                * the queue, send a signal to the process group
<                * (if not SIGPOLL) or to the siglist processes
<                * (SIGPOLL).  If something is already on the queue,
<                * just enqueue the message.
<                */
<               if (q->q_first) {
<                       putq(q, bp);
<                       return;
<               }
<               /* flow through */
<
<       case M_PCSIG:
<               /*
<                * Don't enqueue, just post the signal.
<                */
<               strsignal(stp, *bp->b_rptr, 0L);
<               freemsg(bp);
<               return;
< #ifdef GEM
<       case M_EVENT:
<
<               /*
```

© COPYRIGHT 1994 AMDAHL CORPORATION

```
<               * Someone downstream wants to post an event.
<               * If the message would go on the front of
<               * the queue, post the event.  If something is
<               * already on the queue, just enqueue the message.
<               */
<              if (q->q_first) {
<                      putq(q, bp);
<                      return;
<              }
<              /* flow through */
<
<      case M_PCEVENT:
<
<              /*
<               * Don't enqueue, just post the event.
<               */
<              strdrpost(bp);
<              freemsg(bp);
<              return;
< #endif /* GEM */
<
<      case M_FLUSH:
<              /*
<               * Flush queues.  The indication of which queues to flush
<               * is in the first byte of the message.  If the read queue
<               * is specified, then flush it.  If FLUSHBAND is set, just
<               * flush the band specified by the second byte of the message.
<               */
<          {
<              register mblk_t *mp;
<              register mblk_t *nmp;
<              mblk_t *last;
<              int backenable = 0;
<              int band;
<              queue_t *nq;
<              unsigned char pri, i;
<
<
<              s = splstr();
<              if (*bp->b_rptr & FLUSHR) {
<                  if (*bp->b_rptr & FLUSHBAND) {
<                      ASSERT((bp->b_wptr - bp->b_rptr) >= 2);
<                      pri = *(bp->b_rptr + 1);
<                      if (pri > q->q_nband)
<                          goto wrapflush;
```

© COPYRIGHT 1994 AMDAHL CORPORATION

```
<                    if (pri == 0) {
<                        mp = q->q_first;
<                        q->q_first = NULL;
<                        q->q_last = NULL;
<                        q->q_count = 0;
<                        for (qbp = q->q_bandp; qbp; qbp = qbp->qb_next) {
<                              qbp->qb_first = NULL;
<                              qbp->qb_last = NULL;
<                              qbp->qb_count = 0;
<                              qbp->qb_flag &= ~QB_FULL;
<                        }
<                        q->q_blocked = 0;
<                        q->q_flag &= ~QFULL;
<                        while (mp) {
<                              nmp = mp->b_next;
<                              if (mp->b_band == 0) {
<                                  if (mp->b_datap->db_type == M_PASSFP)
<                                        closef(((struct strrecvfd *)
<                                          mp->b_rptr)->f.fp);
<                                  freemsg(mp);
<                              } else {
<                                        putq(q, mp);
<                              }
<                              mp = nmp;
<                        }
<                        if ((q->q_flag & QWANTW) &&
<                          (q->q_count <= q->q_lowat)) {
<                              /* find nearest back queue with service proc */
<                              q->q_flag &= ~QWANTW;
<                              for (nq = backq(q); nq && !nq->q_qinfo->qi_srvp;
<                                nq = backq(nq))
<                                  ;
<                              if (nq) {
<                                  qenable(nq);
<                                  setqback(nq, 0);
<                              }
<                        }
<                    } else {          /* pri != 0 */
<                        band = pri;
<                        qbp = q->q_bandp;
<                        while (--band > 0)
<                              qbp = qbp->qb_next;
<                        mp = qbp->qb_first;
<                        if (mp == NULL)
<                              goto wrapflush;
```

© COPYRIGHT 1994 AMDAHL CORPORATION

```
<                       last = qbp->qb_last;
<                       if (mp == last)     /* only message in band */
<                           last = mp->b_next;
<                       while (mp != last) {
<                           nmp = mp->b_next;
<                           if (mp->b_band == pri) {
<                               if (mp->b_datap->db_type == M_PASSFP)
<                                   closef(((struct strrecvfd *)
<                                     mp->b_rptr)->f.fp);
<                               rmvq(q, mp);
<                               freemsg(mp);
<                           }
<                           mp = nmp;
<                       }
<                       if (mp && mp->b_band == pri) {
<                           if (mp->b_datap->db_type == M_PASSFP)
<                               closef(((struct strrecvfd *)
<                                 mp->b_rptr)->f.fp);
<                           rmvq(q, mp);
<                           freemsg(mp);
<                       }
<                   }
<               } else {     /* flush entire queue */
<                   mp = q->q_first;
<                   q->q_first = NULL;
<                   q->q_last = NULL;
<                   q->q_count = 0;
<                   stp->sd_flag &= ~STRPRI;
<                   for (qbp = q->q_bandp; qbp; qbp = qbp->qb_next) {
<                       qbp->qb_first = NULL;
<                       qbp->qb_last = NULL;
<                       qbp->qb_count = 0;
<                       qbp->qb_flag &= ~QB_FULL;
<                   }
<                   q->q_blocked = 0;
<                   q->q_flag &= ~QFULL;
<                   while (mp) {
<                       nmp = mp->b_next;
<                       if (mp->b_datap->db_type == M_PASSFP)
<                           closef(((struct strrecvfd *)mp->b_rptr)->f.fp);
<                       freemsg(mp);
<                       mp = nmp;
<                   }
<                   bzero((caddr_t)qbf, NBAND);
<                   bpri = 1;
```

© COPYRIGHT 1994 AMDAHL CORPORATION

```
<                       for (qbp = q->q_bandp; qbp; qbp = qbp->qb_next) {
<                           if ((qbp->qb_flag & QB_WANTW) &&
<                             (qbp->qb_count <= qbp->qb_lowat)) {
<                               qbp->qb_flag &= ~QB_WANTW;
<                               backenable = 1;
<                               qbf[bpri] = 1;
<                           }
<                           bpri++;
<                       }
<                       if ((q->q_flag & QWANTW) && (q->q_count <= q->q_lowat)) {
<                           q->q_flag &= ~QWANTW;
<                           backenable = 1;
<                           qbf[0] = 1;
<                       }
<
<                       /*
<                        * If any band can now be written to, and there is a
<                        * writer for that band, then backenable the closest
<                        * service procedure.
<                        */
<                       if (backenable) {
<                           /* find nearest back queue with service proc */
<                           for (nq = backq(q); nq && !nq->q_qinfo->qi_srvp;
<                             nq = backq(nq))
<                               ;
<                           if (nq) {
<                               qenable(nq);
<                               for (i = 0; i < bpri; i++)
<                                   if (qbf[i])
<                                       setqback(nq, i);
<                           }
<                       }
<                   }
<               }
< wrapflush:
<               splx(s);
<               if ((*bp->b_rptr & FLUSHW) && !(bp->b_flag & MSGNOLOOP)) {
<                       *bp->b_rptr &= ~FLUSHR;
<                       bp->b_flag |= MSGNOLOOP;
<                       qreply(q, bp);
<                       return;
<               }
<               freemsg(bp);
<               return;
<       }
```

© COPYRIGHT 1994 AMDAHL CORPORATION

```
<
<       case M_IOCACK:
<       case M_IOCNAK:
<               iocbp = (struct iocblk *)bp->b_rptr;
<               /*
<                * If not waiting for ACK or NAK then just free msg.
<                * If already have ACK or NAK for user then just free msg.
<                * If incorrect id sequence number then just free msg.
<                */
<               s = splstr();
<               if ((stp->sd_flag & IOCWAIT) == 0 || stp->sd_iocblk ||
<                   (stp->sd_iocid != iocbp->ioc_id)) {
<                       freemsg(bp);
<                       splx(s);
<                       return;
<               }
<
<               /*
<                * Assign ACK or NAK to user and wake up.
<                */
<               stp->sd_iocblk = bp;
<               splx(s);
<               wakeprocs((caddr_t)stp, PRMPT);
<               return;
<
<       case M_COPYIN:
<       case M_COPYOUT:
<               reqp = (struct copyreq *)bp->b_rptr;
<
<               /*
<                * If not waiting for ACK or NAK then just fail request.
<                * If already have ACK, NAK, or copy request, then just
<                * fail request.
<                * If incorrect id sequence number then just fail request.
<                */
<               s = splstr();
<               if ((stp->sd_flag & IOCWAIT) == 0 || stp->sd_iocblk ||
<                   (stp->sd_iocid != reqp->cq_id)) {
<                       if (bp->b_cont) {
<                               freemsg(bp->b_cont);
<                               bp->b_cont = NULL;
<                       }
<                       bp->b_datap->db_type = M_IOCDATA;
<                       resp = (struct copyresp *)bp->b_rptr;
<                       resp->cp_rval = (caddr_t)1;     /* failure */
```

© COPYRIGHT 1994 AMDAHL CORPORATION

```
<                       splx(s);
<                       (*stp->sd_wrq->q_next->q_qinfo->qi_putp)(stp->sd_wrq->q_next, bp);
<                       if (qready())
<                               runqueues();
<                       return;
<               }
<
<               /*
<                * Assign copy request to user and wake up.
<                */
<               stp->sd_iocblk = bp;
<               splx(s);
<               wakeprocs((caddr_t)stp, PRMPT);
<               return;
<
<       case M_SETOPTS:
<               /*
<                * Set stream head options (read option, write offset,
<                * min/max packet size, and/or high/low water marks for
<                * the read side only).
<                */
<
<               bpri = 0;
<               ASSERT((bp->b_wptr - bp->b_rptr) == sizeof(struct stroptions));
<               sop = (struct stroptions *)bp->b_rptr;
<               s = splstr();
<               if (sop->so_flags & SO_READOPT) {
<                       switch (sop->so_readopt & RMODEMASK) {
<                       case RNORM:
<                               stp->sd_flag &= ~(RMSGDIS | RMSGNODIS);
<                               break;
<
<                       case RMSGD:
<                               stp->sd_flag = ((stp->sd_flag & ~RMSGNODIS) |
<                                   RMSGDIS);
<                               break;
<
<                       case RMSGN:
<                               stp->sd_flag = ((stp->sd_flag & ~RMSGDIS) |
<                                   RMSGNODIS);
<                               break;
<                       }
<                       switch(sop->so_readopt & RPROTMASK) {
<                       case RPROTNORM:
<                               stp->sd_flag &= ~(RDPROTDAT | RDPROTDIS);
```

© COPYRIGHT 1994 AMDAHL CORPORATION

```
<                       break;
<
<               case RPROTDAT:
<                       stp->sd_flag = ((stp->sd_flag & ~RDPROTDIS) |
<                           RDPROTDAT);
<                       break;
<
<               case RPROTDIS:
<                       stp->sd_flag = ((stp->sd_flag & ~RDPROTDAT) |
<                           RDPROTDIS);
<                       break;
<               }
<       }
<
<       if (sop->so_flags & SO_WROFF)
<               stp->sd_wroff = sop->so_wroff;
<       if (sop->so_flags & SO_MINPSZ)
<               q->q_minpsz = sop->so_minpsz;
<       if (sop->so_flags & SO_MAXPSZ)
<               q->q_maxpsz = sop->so_maxpsz;
<       if (sop->so_flags & SO_HIWAT) {
<           if (sop->so_flags & SO_BAND) {
<               if (strqset(q, QHIWAT, sop->so_band, sop->so_hiwat))
<                       cmn_err(CE_WARN,
<                           "strrput: could not allocate qband\n");
<               else
<                       bpri = sop->so_band;
<           } else {
<               q->q_hiwat = sop->so_hiwat;
<           }
<       }
<       if (sop->so_flags & SO_LOWAT) {
<           if (sop->so_flags & SO_BAND) {
<               if (strqset(q, QLOWAT, sop->so_band, sop->so_lowat))
<                       cmn_err(CE_WARN,
<                           "strrput: could not allocate qband\n");
<               else
<                       bpri = sop->so_band;
<           } else {
<               q->q_lowat = sop->so_lowat;
<           }
<       }
<       if (sop->so_flags & SO_MREADON)
<               stp->sd_flag |= SNDMREAD;
<       if (sop->so_flags & SO_MREADOFF)
```

© COPYRIGHT 1994 AMDAHL CORPORATION

```
<                       stp->sd_flag &= ~SNDMREAD;
<               if (sop->so_flags & SO_NDELON)
<                       stp->sd_flag |= OLDNDELAY;
<               if (sop->so_flags & SO_NDELOFF)
<                       stp->sd_flag &= ~OLDNDELAY;
<               if (sop->so_flags & SO_ISTTY)
<                       stp->sd_flag |= STRISTTY;
<               if (sop->so_flags & SO_ISNTTY)
<                       stp->sd_flag &= ~STRISTTY;
<               if (sop->so_flags & SO_TOSTOP)
<                       stp->sd_flag |= STRTOSTOP;
<               if (sop->so_flags & SO_TONSTOP)
<                       stp->sd_flag &= ~STRTOSTOP;
<               if (sop->so_flags & SO_DELIM)
<                       stp->sd_flag |= STRDELIM;
< #ifndef _STYPES
<               if (sop->so_flags & SO_NODELIM)
<                       stp->sd_flag &= ~STRDELIM;
<               if (sop->so_flags & SO_STRHOLD)
<                       stp->sd_flag |= STRHOLD;
< #endif /* _STYPES */
<
<               freemsg(bp);
<
<               if (bpri == 0) {
<                       if ((q->q_count <= q->q_lowat) &&
<                           (q->q_flag & QWANTW)) {
<                               q->q_flag &= ~QWANTW;
<                               for (q = backq(q); q && !q->q_qinfo->qi_srvp;
<                                   q = backq(q))
<                                       ;
<                               if (q) {
<                                       qenable(q);
<                                       setqback(q, bpri);
<                               }
<                       }
<               } else {
<                       unsigned char i;
<
<                       qbp = q->q_bandp;
<                       for (i = 1; i < bpri; i++)
<                               qbp = qbp->qb_next;
<                       if ((qbp->qb_count <= qbp->qb_lowat) &&
<                           (qbp->qb_flag & QB_WANTW)) {
<                               qbp->qb_flag &= ~QB_WANTW;
```

© COPYRIGHT 1994 AMDAHL CORPORATION

```
<                               for (q = backq(q); q && !q->q_qinfo->qi_srvp;
<                                   q = backq(q))
<                                       ;
<                               if (q) {
<                                       qenable(q);
<                                       setqback(q, bpri);
<                               }
<                       }
<               }
<               splx(s);
<
<               return;
<
<       /*
<        * The following set of cases deal with situations where two stream
<        * heads are connected to each other (twisted streams).  These messages
<        * have no meaning at the stream head.
<        */
<       case M_BREAK:
<       case M_CTL:
<       case M_DELAY:
<       case M_START:
<       case M_STOP:
<       case M_IOCDATA:
<       case M_STARTI:
<       case M_STOPI:
<               freemsg(bp);
<               return;
<
<       case M_IOCTL:
<               /*
<                * Always NAK this condition
<                * (makes no sense)
<                */
<               bp->b_datap->db_type = M_IOCNAK;
<               qreply(q, bp);
<               return;
<
<       default:
<               ASSERT(0);
<               freemsg(bp);
<               return;
<       }
< }
<
```

© COPYRIGHT 1994 AMDAHL CORPORATION

```
< /*
<  * Write attempts to break the read request into messages conforming
<  * with the minimum and maximum packet sizes set downstream.
<  *
<  * Write will always attempt to get the largest buffer it can to satisfy the
<  * message size. If it can not, then it will try up to 2 classes down to try
<  * to satisfy the write. Write will not block if downstream queue is full and
<  * O_NDELAY is set, otherwise it will block waiting for the queue to get room.
<  *
<  * A write of zero bytes gets packaged into a zero length message and sent
<  * downstream like any other message.
<  *
<  * If buffers of the requested sizes are not available, the write will
<  * sleep until the buffers become available.
<  *
<  * Write (if specified) will supply a write offset in a message if it
<  * makes sense. This can be specified by downstream modules as part of
<  * a M_SETOPTS message.  Write will not supply the write offset if it
<  * cannot supply any data in a buffer.  In other words, write will never
<  * send down an empty packet due to a write offset.
<  */
< int
< strwrite(vp, uiop, crp)
<       struct vnode *vp;
<       struct uio *uiop;
<       cred_t *crp;
< {
<       register struct stdata *stp;
<       register struct queue *wqp;
<       register mblk_t *mp;
<       register int s;
<       long rmin, rmax;
<       long iosize;
<       char waitflag;
<       int tempmode;
<       int done = 0;
<       int error = 0;
<       int strmakemsg();
<
<       ASSERT(vp->v_stream);
<       stp = vp->v_stream;
<
<       if (error = straccess(stp, JCWRITE))
<               return (error);
<       if (stp->sd_flag & STPLEX)
```

© COPYRIGHT 1994 AMDAHL CORPORATION

```
<			return (EINVAL);
<		if (stp->sd_flag & (STWRERR|STRHUP)) {
<			if (stp->sd_flag & STRSIGPIPE)
<				psignal(u.u_procp, SIGPIPE);
<
<			/*
<			 * this is for POSIX compatibility
<			 */
<			return ((stp->sd_flag & STRHUP) ? EIO : stp->sd_werror);
<		}
<
<		/*
<		 * firewall - don't use too much memory
<		 */
<		if (strthresh && (Strcount > strthresh) && pm_denied(u.u_cred, P_SYSOPS))
<			return (ENOSR);
<
<		/*
<		 * Check the min/max packet size constraints. If min packet size
<		 * is non-zero, the write cannot be split into multiple messages
<		 * and still guarantee the size constraints.
<		 */
<		wqp = stp->sd_wrq;
<		rmin = wqp->q_next->q_minpsz;
<		rmax = wqp->q_next->q_maxpsz;
<		ASSERT((rmax >= 0) || (rmax == INFPSZ));
<		if (rmax == 0)
<			return (0);
<		if (strmsgsz != 0) {
<			if (rmax == INFPSZ)
<				rmax = strmsgsz;
<			else {
<				if (vp->v_type == VFIFO)
<					rmax = MIN(PIPE_BUF, rmax);
<				else	rmax = MIN(strmsgsz, rmax);
<			}
<		}
<		if (rmin > 0) {
<			if (uiop->uio_resid < rmin)
<				return (ERANGE);
<			if ((rmax != INFPSZ) && (uiop->uio_resid > rmax))
<				return (ERANGE);
<		}
<
<		/*
```

© COPYRIGHT 1994 AMDAHL CORPORATION

```
<        * Do until count satisfied or error.
<        */
<       waitflag = WRITEWAIT;
<       if (stp->sd_flag & OLDNDELAY)
<               tempmode = uiop->uio_fmode & ~FNDELAY;
<       else
<               tempmode = uiop->uio_fmode;
<
<       do {
<               register int size = uiop->uio_resid;
<               mblk_t *amp;   /* auto */
<
<               s = splstr();
<               while (!bcanput(wqp->q_next, 0)) {
<
<                       /*
<                        * if FIFO/pipe, don't sleep here. Sleep in the
<                        * fifo write routine.
<                        */
<                       if (vp->v_type == VFIFO) {
<                               splx(s);
<                               return (ESTRPIPE);
<                       }
<                       if ((error = strwaitq(stp, waitflag, (off_t)0,
<                           tempmode, &done)) || done) {
<                               splx(s);
<                               return (error);
<                       }
<               }
<
<               /* still at splstr */
<               if (mp = wqp->q_first) {
<                       int spaceleft;
<                       /*
<                        * Grab the previously held message "mp" and see
<                        * if there's room in it to hold this write's data.
<                        */
<                       spaceleft = mp->b_datap->db_lim - mp->b_wptr;
<                       if (size <= spaceleft) {
<                               if (error = uiomove(mp->b_wptr, size, UIO_WRITE, uiop)) {
<                                       splx(s);
<                                       return error;
<                               }
<                               mp->b_wptr += size;
<                               /*
```

© COPYRIGHT 1994 AMDAHL CORPORATION

```
<                        * If the buffer would hold yet another write
<                        * of the same size, return.  (wait a while)
<                        */
<                       if ((size<<1) <= spaceleft) {
<                               splx(s);
<                               return 0;
<                       }
<               }
<
<               wqp->q_first = NULL;
<               splx(s);
<       }
<       else {
<               splx(s);
<
<               /*
<                * Determine the size of the next message to be
<                * packaged.  May have to break write into several
<                * messages based on max packet size.
<                */
<               if (rmax == INFPSZ)
<                       iosize = uiop->uio_resid;
<               else    iosize = MIN(uiop->uio_resid, rmax);
<
<               if ((error = strmakemsg((struct strbuf *)NULL,
<                   iosize, uiop, stp, (long)0, &amp)) || !amp)
<                       return (error);
<               mp = amp;
<
<               /*
<                * When explicitly enabled (typically for TTYs), check to
<                * see if data might be coalesced for better performance.
<                *
<                * Policy:  Use the size of this write as predictor of the
<                * size of the next write.  If this msg buffer has space for
<                * another write of the same size, hold onto it for a while.
<                */
<               if (strhold && (stp->sd_flag & STRHOLD) &&
<                   size <= (mp->b_datap->db_lim - mp->b_wptr)) {
<
<                       splstr();
<                       wqp->q_first = mp;
<                       stp->sd_rtime = lbolt + STRSCANP;
<
<                       /*
```

© COPYRIGHT 1994 AMDAHL CORPORATION

```
<                               * Add queue to held-message list
<                               */
<                              if (!(wqp->q_flag & QHLIST)) {
<                                      wqp->q_flag |= QHLIST;
<
<                                      if (!scanqhead)
<                                              scanqhead = wqp;
<                                      else
<                                              scanqtail->q_link = wqp;
<
<                                      scanqtail = wqp;
<                                      wqp->q_link = NULL;
<
<                                      if (!strscanflag) {
<                                              strscanflag++;
<                                              timeout(strscan, 0, STRSCANP);
<                                      }
<                              }
<                              splx(s);
<                              return 0;
<                      }
<              }
<
<              /*
<               * Put block downstream.
<               */
<              wqp->q_first = NULL;
<              if ((uiop->uio_resid == 0) && (stp->sd_flag & STRDELIM))
<                      mp->b_flag |= MSGDELIM;
<              (*wqp->q_next->q_qinfo->qi_putp)
<                      (wqp->q_next, mp);
<              waitflag |= NOINTR;
<              if (qready())
<                      runqueues();
<
<      } while (uiop->uio_resid);
<
<      return 0;
< }
<
< /*
<  * Stream head write service routine.
<  * Its job is to wake up any sleeping writers when a queue
<  * downstream needs data (part of the flow control in putq and getq).
<  * It also must wake anyone sleeping on a poll().
```

© COPYRIGHT 1994 AMDAHL CORPORATION

```
<  * For stream head right below mux module, it must also invoke put procedure
<  * of next downstream module.
<  */
<
< strwsrv(q)
<       register queue_t *q;
< {
<       register struct stdata *stp;
<       register int s;
<       register queue_t *tq;
<       register qband_t *qbp;
<       register int i;
<       qband_t *myqbp;
<       int isevent;
<
<       stp = (struct stdata *)q->q_ptr;
<       ASSERT(!(stp->sd_flag & STPLEX));
1755,1831c479,480
<
<       if (stp->sd_flag & WSLEEP) {
<               stp->sd_flag &= ~WSLEEP;
<               if (stp->sd_vnode->v_type == VFIFO)
<                       wakeprocs((caddr_t)q, NOPRMPT); /*don't thrash*/
<               else
<                       wakeprocs((caddr_t)q, PRMPT);
<       }
<
<       if ((tq = q->q_next) == NULL) {
<
<               /*
<                * The other end of a stream pipe went away.
<                */
<               splx(s);
<               return;
<       }
<       while (tq->q_next && !tq->q_qinfo->qi_srvp)
<               tq = tq->q_next;
<
<       if (q->q_flag & QBACK) {
<               if (tq->q_flag & QFULL) {
<                       tq->q_flag |= QWANTW;
<               } else {
<                       if (stp->sd_sigflags & S_WRNORM)
<                               strsendsig(stp->sd_siglist, S_WRNORM, 0L);
<                       if (stp->sd_pollist.ph_events & POLLWRNORM)
```

© COPYRIGHT 1994 AMDAHL CORPORATION

```
<                       pollwakeup(&stp->sd_pollist, POLLWRNORM);
< #ifdef GEM
<                   if (stp->sd_eventflags & S_WRNORM)
<                       strevpost(stp, S_WRNORM, 0L);
< #endif /* GEM */
<           }
<       }
<
<       isevent = 0;
<       i = 1;
<       bzero((caddr_t)qbf, NBAND);
<       myqbp = q->q_bandp;
<       for (qbp = tq->q_bandp; qbp; qbp = qbp->qb_next) {
<           if (!myqbp)
<               break;
<           if (myqbp->qb_flag & QB_BACK) {
<               if (qbp->qb_flag & QB_FULL) {
<                   qbp->qb_flag |= QB_WANTW;
<               } else {
<                   isevent = 1;
<                   qbf[i] = 1;
<               }
<           }
<           myqbp = myqbp->qb_next;
<           i++;
<       }
<       while (myqbp) {
<           if (myqbp->qb_flag & QB_BACK) {
<               isevent = 1;
<               qbf[i] = 1;
<           }
<           myqbp = myqbp->qb_next;
<           i++;
<       }
<
<       if (isevent) {
<         for (i--; i; i--) {
<           if (qbf[i]) {
<               if (stp->sd_sigflags & S_WRBAND)
<                   strsendsig(stp->sd_siglist, S_WRBAND, (long)i);
<               if (stp->sd_pollist.ph_events & POLLWRBAND)
<                   pollwakeup(&stp->sd_pollist, POLLWRBAND);
< #ifdef GEM
<               if (stp->sd_eventflags & S_WRBAND)
<                   strevpost(stp, S_WRBAND, (long)i);
```

© COPYRIGHT 1994 AMDAHL CORPORATION

```
< #endif /* GEM */
<               }
<           }
<       }
<
---
>       vp->v_stream = NULL;
>       stp->sd_flag &= ~STRCLOSE;
1832a482,484
>       wakeprocs((caddr_t) stp, PRMPT);
>       shfree(stp);
>       return (0);
1835,1857d486
< /*
<  * ioctl for streams
<  */
< int
< strioctl(vp, cmd, arg, flag, copyflag, crp, rvalp)
<       struct vnode *vp;
<       int cmd;
<       int arg;
<       int flag;
<       int copyflag;
<       cred_t *crp;
<       int *rvalp;
< {
<       register struct stdata *stp;
<       register int s;
<       struct strioctl strioc;
<       struct uio uio;
<       struct iovec iov;
<       enum jcaccess access;
<       mblk_t *mp;
<       int error = 0;
<       int done = 0;
<       char *fmt = NULL;
1859,3615d487
<       ASSERT(vp->v_stream);
<       ASSERT(copyflag == U_TO_K || copyflag == K_TO_K);
<       stp = vp->v_stream;
<
<       /*
<        * if a message is being "held" awaiting possible consolidation,
<        * send it downstream before processing ioctl.
<        */
```

© COPYRIGHT 1994 AMDAHL CORPORATION

```
<	{
<		register queue_t *q = stp->sd_wrq;
<
<		s = splstr();
<		if (mp = q->q_first) {
<			q->q_first = NULL;
<
<			splx(s);
<			putnext(q, mp);
<		}
<		else	splx(s);
<	}
<
<	switch (cmd) {
<	case I_RECVFD:
<	case I_E_RECVFD:
<	case I_S_RECVFD:
<		access = JCREAD;
<		break;
<
<	case I_FDINSERT:
<	case I_SENDFD:
<	case TIOCSTI:
<		access = JCWRITE;
<		break;
<
<	case TCGETA:
<	case TCGETS:
<	case TIOCGETP:
<	case TIOCGPGRP:
<	case JWINSIZE:
<	case TIOCGSID:
<	case TIOCMGET:
<	case LDGETT:
<	case TIOCGETC:
<	case TIOCLGET:
<	case TIOCGLTC:
<	case TIOCGETD:
<	case TIOCGWINSZ:
<	case LDGMAP:
<	case I_CANPUT:
<	case I_NREAD:
<	case FIONREAD:
<	case FIORDCHK:
<	case I_FIND:
```

© COPYRIGHT 1994 AMDAHL CORPORATION

```
<       case I_LOOK:
<       case I_GRDOPT:
< #ifdef GEM
<       case I_GETEV:
< #endif /* GEM */
<       case I_GETSIG:
<       case I_PEEK:
<       case I_GWROPT:
<       case I_LIST:
<       case I_CKBAND:
<       case I_GETBAND:
<       case I_GETCLTIME:
<               access = JCGETP;
<               break;
<
<       default:
<               access = JCSETP;
<               break;
<       }
<
<
<       if (error = straccess(stp, access))
<               return (error);
<       if (stp->sd_flag & (STRDERR|STWRERR|STPLEX))
<               return ((stp->sd_flag & STPLEX) ? EINVAL :
<                   (stp->sd_werror ? stp->sd_werror : stp->sd_rerror));
<
<       switch (cmd) {
<
<       default:
<               if (((cmd & IOCTYPE) == LDIOC) ||
<                   ((cmd & IOCTYPE) == tIOC) ||
<                   ((cmd & IOCTYPE) == TIOC)) {
<
<                       /*
<                        * The ioctl is a tty ioctl - set up strioc buffer
<                        * and call strdoioctl() to do the work.
<                        */
<                       if (stp->sd_flag & STRHUP)
<                               return (ENXIO);
<                       strioc.ic_cmd = cmd;
<                       strioc.ic_timout = INFTIM;
<
<                       switch (cmd) {
<                       case TCXONC:
```

© COPYRIGHT 1994 AMDAHL CORPORATION

```
<                       case TCSBRK:
<                       case TCFLSH:
<                       case TCDSET:
<                               strioc.ic_len = sizeof(int);
<                               strioc.ic_dp = (char *)&arg;
<                               return (strdoioctl(stp, &strioc, NULL, K_TO_K,
<                                   STRINT, crp, rvalp));
<
<                       case TCSETA:
<                       case TCSETAW:
<                       case TCSETAF:
<                               strioc.ic_len = sizeof(struct termio);
<                               strioc.ic_dp = (char *)arg;
<                               return (strdoioctl(stp, &strioc, NULL,
<                                   copyflag, STRTERMIO, crp, rvalp));
<
<                       case TCSETS:
<                       case TCSETSW:
<                       case TCSETSF:
<                               strioc.ic_len = sizeof(struct termios);
<                               strioc.ic_dp = (char *)arg;
<                               return (strdoioctl(stp, &strioc, NULL,
<                                   copyflag, STRTERMIOS, crp, rvalp));
<
<                       case LDSETT:
<                               strioc.ic_len = sizeof(struct termcb);
<                               strioc.ic_dp = (char *)arg;
<                               return (strdoioctl(stp, &strioc, NULL,
<                                   copyflag, STRTERMCB, crp, rvalp));
<
<                       case TIOCSETP:
<                               strioc.ic_len = sizeof(struct sgttyb);
<                               strioc.ic_dp = (char *)arg;
<                               return (strdoioctl(stp, &strioc, NULL,
<                                   copyflag, STRSGTTYB, crp, rvalp));
<
<                       case TIOCSTI:
<                               if (pm_denied(crp, P_DACREAD)) {
<                                       if ((flag & FREAD) == 0)
<                                               return (EPERM);
<                                       if (stp->sd_sidp != u.u_procp->p_sessp->s_sidp)
<                                               return (EACCES);
<                               }
<                               strioc.ic_len = sizeof(char);
<                               strioc.ic_dp = (char *)arg;
```

© COPYRIGHT 1994 AMDAHL CORPORATION

```
<                               return (strdoioctl(stp, &strioc, NULL,
<                                   copyflag, "c", crp, rvalp));
<
<                       case TCGETA:
<                               fmt = STRTERMIO;
<
<                       case TCGETS:
<                               if (fmt == NULL)
<                                       fmt = STRTERMIOS;
<
<                       case LDGETT:
<                               if (fmt == NULL)
<                                       fmt = STRTERMCB;
<
<                       case TIOCGETP:
<                               if (fmt == NULL)
<                                       fmt = STRSGTTYB;
<                               strioc.ic_len = 0;
<                               strioc.ic_dp = (char *)arg;
<                               return (strdoioctl(stp, &strioc, NULL,
<                                   copyflag, fmt, crp, rvalp));
<                       }
<               }
<
<               /*
<                * Unknown cmd - send down request to support
<                * transparent ioctls.
<                */
<
<               strioc.ic_cmd = cmd;
<               strioc.ic_timout = INFTIM;
<               strioc.ic_len = TRANSPARENT;
<               strioc.ic_dp = (char *)&arg;
<               return (strdoioctl(stp, &strioc, NULL, copyflag, (char *)NULL,
<                   crp, rvalp));
<
<       case I_STR:
<               /*
<                * Stream ioctl.  Read in an strioctl buffer from the user
<                * along with any data specified and send it downstream.
<                * Strdoioctl will wait allow only one ioctl message at
<                * a time, and waits for the acknowledgement.
<                */
<
<               if (stp->sd_flag & STRHUP)
```

© COPYRIGHT 1994 AMDAHL CORPORATION

```
<                       return (ENXIO);
<               error = strcopyin((caddr_t)arg, (caddr_t)&strioc,
<                   sizeof(struct strioctl), STRIOCTL, copyflag);
<               if (error)
<                       return (error);
<               if ((strioc.ic_len < 0) || (strioc.ic_timout < -1))
<                       return (EINVAL);
<               error = strdoioctl(stp, &strioc, NULL, copyflag, (char *)NULL,
<                   crp, rvalp);
<               if (error == 0)
<                       error = strcopyout((caddr_t)&strioc, arg,
<                           sizeof(struct strioctl), STRIOCTL, copyflag);
<               return (error);
<
<       case I_NREAD:
<       case FIONREAD:
<               /*
<                * Return number of bytes of data in first message
<                * in queue in "arg" and return the number of messages
<                * in queue in return value.
<                */
<           {
<               int size = 0;
<               int count = 0;
<
<               s = splstr();
<               mp = RD(stp->sd_wrq)->q_first;
<               while (mp) {
<                       if (!(mp->b_flag & MSGNOGET))
<                               break;
<                       mp = mp->b_next;
<               }
<               if (mp)
<                       size = msgdsize(mp);
<               error = strcopyout(&size, (int *)arg, sizeof(size), STRINT,
<                   copyflag);
<               if (error || cmd == FIONREAD) {
<                       splx(s);
<                       return (error);
<               }
<               for (; mp; mp = mp->b_next)
<                       if (!(mp->b_flag & MSGNOGET))
<                               count++;
<               *rvalp = count;
<               splx(s);
```

© COPYRIGHT 1994 AMDAHL CORPORATION

```
<               return (error);
<           }
<       case FIORDCHK:
<               /*
<                * FIORDCHK does not use arg value (like FIONREAD),
<               * instead a count is returned. I_NREAD value may
<                * not be accurate but safe. The real thing to do is
<                * to add the msgdsizes of all data  messages until
<                * a non-data message.
<                */
<           {
<               int size = 0;
<
<               s = splstr();
<               mp = RD(stp->sd_wrq)->q_first;
<               while (mp) {
<                       if (!(mp->b_flag & MSGNOGET))
<                               break;
<                       mp = mp->b_next;
<               }
<               if (mp)
<                       size = msgdsize(mp);
<               *rvalp = size;
<               splx(s);
<               return (0);
<           }
<
<       case I_FIND:
<               /*
<                * Get module name.
<                */
<           {
<               char mname[FMNAMESZ+1];
<               queue_t *q;
<               int i;
<
<               error = strcopyin((caddr_t)arg, mname, FMNAMESZ+1, STRNAME,
<                   copyflag);
<               if (error)
<                       return (error);
<
<               /*
<                * Find module in fmodsw.
<                */
<               if ((i = findmod(mname)) < 0)
```

© COPYRIGHT 1994 AMDAHL CORPORATION

```
<                               return (EINVAL);
<
<                       *rvalp = 0;
<
<                       /* Look downstream to see if module is there. */
<                       for (q = stp->sd_wrq->q_next; q &&
<                           (fmodsw[i].f_str->st_wrinit != q->q_qinfo); q = q->q_next)
<                               ;
<
<                       *rvalp =  (q ? 1 : 0);
<                       return (error);
<               }
<
<       case I_PUSH:
<               /*
<                * Push a module.
<                */
<
<               {
<                       register int i;
<                       register queue_t *q;
<                       register queue_t *tq;
<                       register qband_t *qbp;
<                       int idx;
<                       dev_t dummydev;
<                       o_pid_t *oldttyp;
<                       uchar_t *rqbf, *wqbf;
<                       int renab, wenab;
<                       int nrband, nwband;
<                       char mname[FMNAMESZ+1];
<
<                       if (stp->sd_flag & STRHUP)
<                               return (ENXIO);
<                       if (stp->sd_pushcnt >= nstrpush)
<                               return (EINVAL);
<
<                       /*
<                        * firewall - don't use too much memory
<                        */
<
<                       if (strthresh && (Strcount > strthresh) && pm_denied(u.u_cred, P_SYSOPS))
<                               return (ENOSR);
<
<                       /*
<                        * Get module name and look up in fmodsw.
```

© COPYRIGHT 1994 AMDAHL CORPORATION

```
<               */
<               error = strcopyin((caddr_t)arg, mname, FMNAMESZ+1, STRNAME,
<                   copyflag);
<               if (error)
<                       return (error);
<               if ((idx = findmod(mname)) < 0)
<                       return (EINVAL);
<
<               rqbf = kmem_zalloc(NBAND, KM_SLEEP);
<               wqbf = kmem_zalloc(NBAND, KM_SLEEP);
<               while (stp->sd_flag & STWOPEN) {
<                       if (flag & (FNDELAY|FNONBLOCK)) {
<                               kmem_free(rqbf, NBAND);
<                               kmem_free(wqbf, NBAND);
<                               return (EAGAIN);
<                       }
<                       if (sleep((caddr_t)stp, STOPRI|PCATCH)) {
<                               kmem_free(rqbf, NBAND);
<                               kmem_free(wqbf, NBAND);
<                               return (EINTR);
<                       }
<                       if (stp->sd_flag & (STRDERR|STWRERR|STRHUP|STPLEX)) {
<                               kmem_free(rqbf, NBAND);
<                               kmem_free(wqbf, NBAND);
<                               return ((stp->sd_flag & STPLEX) ? EINVAL :
<                                   (stp->sd_werror ? stp->sd_werror :
<                                   stp->sd_rerror));
<                       }
<               }
<               s = splstr();
<               stp->sd_flag |= STWOPEN;
<               oldttyp = u.u_ttyp;
<               q = RD(stp->sd_wrq);
<               renab = 0;
<               if (q->q_flag & QWANTW) {
<                       renab = 1;
<                       rqbf[0] = 1;
<               }
<               nrband = (int)q->q_nband;
<               for (i = 1, qbp = q->q_bandp; i <= nrband; i++) {
<                       if (qbp->qb_flag & QB_WANTW) {
<                               renab = 1;
<                               rqbf[i] = 1;
<                       }
<                       qbp = qbp->qb_next;
```

© COPYRIGHT 1994 AMDAHL CORPORATION

```
<           }
<           for (q = stp->sd_wrq->q_next; q && !q->q_qinfo->qi_srvp;
<              q = q->q_next)
<                 ;
<           wenab = 0;
<           nwband = 0;
<           if (q) {
<                   if (q->q_flag & QWANTW) {
<                           wenab = 1;
<                           wqbf[0] = 1;
<                   }
<                   nwband = (int)q->q_nband;
<                   for (i = 1, qbp = q->q_bandp; i <= nwband; i++) {
<                           if (qbp->qb_flag & QB_WANTW) {
<                                   wenab = 1;
<                                   wqbf[i] = 1;
<                           }
<                           qbp = qbp->qb_next;
<                   }
<           }
<           splx(s);
<
<           /*
<            * Push new module and call its open routine
<            * via qattach(). Modules don't change device
<            * numbers, so just ignore dummydev here.
<            */
<           dummydev = vp->v_rdev;
<           if ((error = qattach(RD(stp->sd_wrq), &dummydev, 0, FMODSW, idx, crp)) == 0)
{
<
<                   stp->sd_pushcnt++;
<                   if (vp->v_type == VCHR) { /* sorry, no pipes allowed */
<                           if ((oldttyp == NULL) && (u.u_ttyp != NULL)) {
<
<                                   /*
<                                    * pre SVR4 driver has allocated the
<                                    * stream as a controlling terminal -
<                                    * check against SVR4 criteria and
<                                    * deallocate it if it fails
<                                    */
<                                   if (!strctty(u.u_procp, stp)) {
<                                           *u.u_ttyp = 0;
<                                           u.u_ttyp = NULL;
<                                   }
```

© COPYRIGHT 1994 AMDAHL CORPORATION

```
<                       } else if (stp->sd_flag & STRISTTY) {
<
<                               /*
<                                * this is a post SVR4 tty driver -
<                                * try to allocate it as a
<                                * controlling terminal
<                                */
<                               (void) strctty(u.u_procp, stp);
<                       }
<               }
<       } else {
<               s = splstr();
<               tq = RD(stp->sd_wrq);
<               for (q = backq(tq); q && !q->q_qinfo->qi_srvp;
<                   q = backq(q))
<                       ;
<               if (q) {
<                       done = 0;
<                       if (rqbf[0] && !(tq->q_flag & QWANTW))
<                               done = 1;
<                       else
<                               rqbf[0] = 0;
<                       qbp = tq->q_bandp;
<                       for (i = 1; i <= nrband; i++) {
<                               if (rqbf[i] && !(qbp->qb_flag&QB_WANTW))
<                                       done = 1;
<                               else
<                                       rqbf[i] = 0;
<                               qbp = qbp->qb_next;
<                       }
<                       if (done) {
<                               qenable(q);
<                               for (i = 0; i <= nrband; i++) {
<                                       if (rqbf[i])
<                                               setqback(q, i);
<                               }
<                       }
<               }
<               for (q = stp->sd_wrq->q_next; q && !q->q_qinfo->qi_srvp;
<                   q = q->q_next)
<                       ;
<               if (q) {
<                       done = 0;
<                       if (wqbf[0] && !(q->q_flag & QWANTW))
<                               done = 1;
```

© COPYRIGHT 1994 AMDAHL CORPORATION

```
<                       else
<                               wqbf[0] = 0;
<                       qbp = q->q_bandp;
<                       for (i = 1; i <= nwband; i++) {
<                               if (wqbf[i] && !(qbp->qb_flag&QB_WANTW))
<                                       done = 1;
<                               else
<                                       wqbf[i] = 0;
<                               qbp = qbp->qb_next;
<                       }
<                       if (done) {
<                               qenable(stp->sd_wrq);
<                               for (i = 0; i <= nwband; i++) {
<                                       if (wqbf[i])
<                                           setqback(stp->sd_wrq, i);
<                               }
<                       }
<               }
<               goto pushdone;
<       }
<
<       /*
<        * If flow control is on, don't break it - enable
<        * first back queue with svc procedure.
<        */
<       s = splstr();
<       q = RD(stp->sd_wrq->q_next);
<       if (q->q_qinfo->qi_srvp) {
<               for (q = backq(q); q && !q->q_qinfo->qi_srvp;
<                   q = backq(q))
<                       ;
<               if (q && renab) {
<                       qenable(q);
<                       for (i = 0; i <= nrband; i++) {
<                               if (rqbf[i])
<                                       setqback(q, i);
<                       }
<               }
<       }
<       q = stp->sd_wrq->q_next;
<       if (q->q_qinfo->qi_srvp) {
<               if (wenab) {
<                       qenable(stp->sd_wrq);
<                       for (i = 0; i <= nwband; i++) {
<                               if (wqbf[i])
```

© COPYRIGHT 1994 AMDAHL CORPORATION

```
<                                       setqback(stp->sd_wrq, i);
<                               }
<                       }
<               }
< pushdone:
<               stp->sd_flag &= ~STWOPEN;
<               splx(s);
<               kmem_free((caddr_t)rqbf, NBAND);
<               kmem_free((caddr_t)wqbf, NBAND);
<               wakeprocs((caddr_t)stp, PRMPT);
<               return (error);
<       }
<
<   case I_POP:
<               /*
<                * Pop module (if module exists).
<                */
<               if (stp->sd_flag&STRHUP)
<                       return (ENXIO);
<               if (!stp->sd_wrq->q_next)      /* for broken pipes */
<                       return (EINVAL);
<               if (stp->sd_wrq->q_next->q_next &&
<                   !(stp->sd_wrq->q_next->q_flag & QREADR)) {
<                       qdetach(RD(stp->sd_wrq->q_next), 1, flag, crp);
<                       stp->sd_pushcnt--;
<                       return (0);
<               }
<               return (EINVAL);
<
<   case I_LOOK:
<               /*
<                * Get name of first module downstream.
<                * If no module, return an error.
<                */
<       {
<               int i;
<
<               for (i = 0; i < fmodcnt; i++)
<                       if (fmodsw[i].f_str->st_wrinit == stp->sd_wrq->q_next->q_qinfo) {
<                               error = strcopyout(fmodsw[i].f_name,
<                                   (char *)arg, FMNAMESZ+1, STRNAME, copyflag);
<                               return (error);
<                       }
<               return (EINVAL);
<       }
```

© COPYRIGHT 1994 AMDAHL CORPORATION

```
<
<       case I_LINK:
<       case I_PLINK:
<               /*
<                * Link a multiplexor.
<                */
<           {
<               struct file *fpdown;
<               struct linkinfo *linkp, *alloclink();
<               struct stdata *stpdown;
<               queue_t *rq;
<
<               /*
<                * Test for invalid upper stream
<                */
<               if (stp->sd_flag & STRHUP)
<                       return (ENXIO);
<               if (vp->v_type == VFIFO)
<                       return (EINVAL);
<               if (!stp->sd_strtab->st_muxwinit)
<                       return (EINVAL);
<               if (error = getf(arg, &fpdown))
<                       return (error);
<
<               /*
<                * Test for invalid lower stream.
<                */
<               if (((stpdown = fpdown->f_vnode->v_stream) == NULL) ||
<                   (stpdown == stp) || (stpdown->sd_flag &
<                   (STPLEX|STRHUP|STRDERR|STWRERR|IOCWAIT)) ||
<                   linkcycle(stp, stpdown))
<                       return (EINVAL);
<               if (cmd == I_PLINK)
<                       rq = NULL;
<               else
<                       rq = getendq(stp->sd_wrq);
<               if (!(linkp = alloclink(rq, stpdown->sd_wrq, fpdown)))
<                       return (EAGAIN);
<               strioc.ic_cmd = cmd;
<               strioc.ic_timout = 0;
<               strioc.ic_len = sizeof(struct linkblk);
<               strioc.ic_dp = (char *)&linkp->li_lblk;
<
<               /* Set up queues for link */
<               rq = RD(stpdown->sd_wrq);
```

© COPYRIGHT 1994 AMDAHL CORPORATION

```
<               setq(rq, stp->sd_strtab->st_muxrinit, stp->sd_strtab->st_muxwinit);
<               rq->q_ptr = WR(rq)->q_ptr = NULL;
<               rq->q_flag |= QWANTR;
<               WR(rq)->q_flag |= QWANTR;
<
<               if (error = strdoioctl(stp, &strioc, NULL, K_TO_K, STRLINK, crp, rvalp)) {
<                       lbfree(linkp);
<                       setq(rq, &strdata, &stwdata);
<                       rq->q_ptr = WR(rq)->q_ptr = (caddr_t)stpdown;
<                       return (error);
<               }
<               s = splstr();
<               stpdown->sd_flag |= STPLEX;
<               fpdown->f_count++;
<               if (error = mux_addedge(stp, stpdown, linkp->li_lblk.l_index)) {
<                       int type;
<                       if (cmd == I_LINK) {
<                               type = LINKIOCTL|LINKNORMAL;
<                               strioc.ic_cmd = I_UNLINK;
<                       } else {        /* I_PLINK */
<                               type = LINKIOCTL|LINKPERSIST;
<                               strioc.ic_cmd = I_PUNLINK;
<                       }
<                       splx(s);
<                       (void) munlink(stp, linkp, type, crp, rvalp);
<                       return (error);
<               }
<               splx(s);
<               /*
<                * Wake up any other processes that may have been
<                * waiting on the lower stream.  These will all
<                * error out.
<                */
<               wakeprocs((caddr_t)rq, PRMPT);
<               wakeprocs((caddr_t)WR(rq), PRMPT);
<               wakeprocs((caddr_t)stpdown, PRMPT);
<               *rvalp = linkp->li_lblk.l_index;
<               return (0);
<       }
<
<       case I_UNLINK:
<       case I_PUNLINK:
<               /*
<                * Unlink a multiplexor.
<                * If arg is -1, unlink all links for which this is the
```

© COPYRIGHT 1994 AMDAHL CORPORATION

```
<		 * controlling stream.  Otherwise, arg is a index number
<		 * for a link to be removed.
<		 */
<	{
<		struct linkinfo *linkp;
<		int type;
<
<		if (vp->v_type == VFIFO)
<			return (EINVAL);
<		if (cmd == I_UNLINK)
<			type = LINKIOCTL|LINKNORMAL;
<		else	/* I_PUNLINK */
<			type = LINKIOCTL|LINKPERSIST;
<		if (arg == 0)
<			return (EINVAL);
<		if (arg == MUXID_ALL)
<			error = munlinkall(stp, type, crp, rvalp);
<		else {
<			if (!(linkp = findlinks(stp, arg, type))) {
<				/* invalid user supplied index number */
<				return (EINVAL);
<			}
<			error = munlink(stp, linkp, type, crp, rvalp);
<		}
<		return (error);
<	}
<
<	case I_FLUSH:
<		/*
<		 * send a flush message downstream
<		 * flush message can indicate
<		 * FLUSHR - flush read queue
<		 * FLUSHW - flush write queue
<		 * FLUSHRW - flush read/write queue
<		 */
<		if (stp->sd_flag & STRHUP)
<			return (ENXIO);
<		if (arg & ~FLUSHRW)
<			return (EINVAL);
<		while (!putctl1(stp->sd_wrq->q_next, M_FLUSH, arg))
<			if (error = strwaitbuf(1, BPRI_HI))
<				return (error);
<
<		if (qready())
<			runqueues();
```

© COPYRIGHT 1994 AMDAHL CORPORATION

```
<               return (0);
<
<       case I_FLUSHBAND:
<           {
<               struct bandinfo binfo;
<
<               error = strcopyin((caddr_t)arg, (caddr_t)&binfo, sizeof(struct
<                   bandinfo), STRBANDINFO, copyflag);
<               if (error)
<                       return (error);
<               if (stp->sd_flag & STRHUP)
<                       return (ENXIO);
<               if (binfo.bi_flag & ~FLUSHRW)
<                       return (EINVAL);
<               while (!(mp = allocb(2, BPRI_HI))) {
<                       if (error = strwaitbuf(2, BPRI_HI))
<                               return (error);
<               }
<               mp->b_datap->db_type = M_FLUSH;
<               *mp->b_wptr++ = binfo.bi_flag | FLUSHBAND;
<               *mp->b_wptr++ = binfo.bi_pri;
<               putnext(stp->sd_wrq, mp);
<               if (qready())
<                       runqueues();
<               return (0);
<           }
<
<       case I_SRDOPT:
<               /*
<                * Set read options
<                *
<                * RNORM - default stream mode
<                * RMSGN - message no discard
<                * RMSGD - message discard
<                * RPROTNORM - fail read with EBADMSG for M_[PC]PROTOs
<                * RPROTDAT - convert M_[PC]PROTOs to M_DATAs
<                * RPROTDIS - discard M_[PC]PROTOs and retain M_DATAs
<                */
<               if (arg & ~(RMODEMASK | RPROTMASK))
<                       return (EINVAL);
<
<               s = splstr();
<               switch (arg & RMODEMASK) {
<               case RNORM:
<                       stp->sd_flag &= ~(RMSGDIS | RMSGNODIS);
```

© COPYRIGHT 1994 AMDAHL CORPORATION

```
<                       break;
<               case RMSGD:
<                       stp->sd_flag = (stp->sd_flag & ~RMSGNODIS) | RMSGDIS;
<                       break;
<               case RMSGN:
<                       stp->sd_flag = (stp->sd_flag & ~RMSGDIS) | RMSGNODIS;
<                       break;
<               }
<
<               switch(arg & RPROTMASK) {
<               case RPROTNORM:
<                       stp->sd_flag &= ~(RDPROTDAT | RDPROTDIS);
<                       break;
<
<               case RPROTDAT:
<                       stp->sd_flag = ((stp->sd_flag & ~RDPROTDIS) |
<                           RDPROTDAT);
<                       break;
<
<               case RPROTDIS:
<                       stp->sd_flag = ((stp->sd_flag & ~RDPROTDAT) |
<                           RDPROTDIS);
<                       break;
<               }
<               splx(s);
<               return (0);
<
<       case I_GRDOPT:
<               /*
<                * Get read option and return the value
<                * to spot pointed to by arg
<                */
<           {
<               int rdopt;
<
<               rdopt = ((stp->sd_flag & RMSGDIS) ? RMSGD :
<                       ((stp->sd_flag & RMSGNODIS) ? RMSGN : RNORM));
<               rdopt |= ((stp->sd_flag & RDPROTDAT) ? RPROTDAT :
<                       ((stp->sd_flag & RDPROTDIS) ? RPROTDIS : RPROTNORM));
<
<               error = strcopyout(&rdopt, (int *)arg, sizeof(rdopt), STRINT,
<                   copyflag);
<               return (error);
<           }
< #ifdef GEM
```

© COPYRIGHT 1994 AMDAHL CORPORATION

```
<       case I_SETEV:
<           {
<               register struct strevent *osep, *sep, *psep;
<               str_sev_t strsev;
<               vnode_t *evp;
<
<               error = strcopyin((caddr_t)arg, &strsev, sizeof(str_sev_t),
<                   STRSEV, copyflag);
<               if (error)
<                       return (error);
<               psep = NULL;
<               if (strsev.se_ecb.ecb_eqd == EQ_NOQUEUE) { /* remove entries */
<                       error = EINVAL;
<                       s = splstr();
<                       sep = stp->sd_eventlist;
<                       while (sep) {
<                               if ((sep->se_pid == u.u_procp->p_pid) &&
<                                   (sep->se_kband == strsev.se_band) &&
<                                   (sep->se_kecb.ecb_eid == strsev.se_ecb.ecb_eid) &&
<                                   (sep->se_kmask & strsev.se_mask)) {
<                                       error = 0;
<                                       sep->se_kmask &= ~strsev.se_mask;
<                                       if (sep->se_kmask) {
<                                               psep = sep;
<                                               sep = sep->se_next;
<                                               continue;
<                                       }
<                                       VN_RELE(sep->se_vp);
<                                       osep = sep;
<                                       if (psep)
<                                               psep->se_next = sep->se_next;
<                                       else
<                                               stp->sd_eventlist = sep->se_next;
<                                       sep = sep->se_next;
<                                       sefree(osep);
<                               } else {
<                                       psep = sep;
<                                       sep = sep->se_next;
<                               }
<                       }
<                       if (error == 0) {       /* recalculate eventflags */
<                               stp->sd_eventflags = 0;
<                               for (sep = stp->sd_eventlist; sep; sep = sep->se_next)
<                                       stp->sd_eventflags |= sep->se_kmask;
<                       }
```

690

© COPYRIGHT 1994 AMDAHL CORPORATION

```
<                       splx(s);
<                       return (error);
<               }
<
<               /*
<                * Add an entry to sd_eventlist.
<                */
<               if (arg & ~(S_INPUT|S_OUTPUT|S_HIPRI|S_MSG|S_HANGUP|S_ERROR)) {
<                       return (EINVAL);
<               }
<               if (error = ev_eqdtovp(strsev.se_ecb.ecb_eqd, 0, &evp, NULL)) {
<                       return (error);
<               }
<               VN_HOLD(evp);
<               s = splstr();
<               for (sep = stp->sd_eventlist; sep; psep = sep, sep = sep->se_next)
<                       if ((sep->se_pid == u.u_procp->p_pid) &&
<                           (sep->se_uid == crp->cr_uid) &&
<                           (sep->se_kband == strsev.se_band) &&
<                           (sep->se_vp == evp) &&
<                           (sep->se_kecb.ecb_eid == strsev.se_ecb.ecb_eid) &&
<                           (sep->se_kecb.ecb_evpri == strsev.se_ecb.ecb_evpri))
<                               break;
<               if (!sep) {
<                       if (!(sep = sealloc(SE_SLEEP))) {
<                               splx(s);
<                               VN_RELE(evp);
<                               return (EAGAIN);
<                       }
<                       if (psep)
<                               psep->se_next = sep;
<                       else
<                               stp->sd_eventlist = sep;
<                       sep->se_vp = evp;
<                       sep->se_kecb = strsev.se_ecb;
<                       sep->se_pid = u.u_procp->p_pid;
<                       sep->se_hostid = P_MYHOSTID;
<                       sep->se_uid = crp->cr_uid;
<                       sep->se_kmask = strsev.se_mask;
<                       sep->se_kband = strsev.se_band;
<               } else {
<                       sep->se_kmask |= strsev.se_mask;
<               }
<               stp->sd_eventflags |= strsev.se_mask;
<               splx(s);
```

© COPYRIGHT 1994 AMDAHL CORPORATION

```
<               return (0);
<           }
<
<       case I_GETEV:
<           {
<               register struct strevent *sep;
<               str_gev_t strgev;
<               str_gev_t *strgevp;
<               str_sev_t strsev;
<               str_sev_t *strsevp;
<               vnode_t *evp;
<               int i;
<               register pid_t pid = u.u_procp->p_pid;
<
<               if (arg == NULL) {
<
<                       /*
<                        * Return number of events being posted.
<                        */
<                       i = 0;
<                       for (sep = stp->sd_eventlist; sep; sep = sep->se_next)
<                               i++;
<                       *rvalp = i;
<                       return (0);
<               }
<
<               /*
<                * Find out what the user wants.
<                */
<               error = strcopyin((caddr_t)arg, &strgev, sizeof(str_gev_t),
<                   STRGEV, copyflag);
<               if (error)
<                       return (error);
<               if (strgev.ge_flags & ~(GEF_PROC))
<                       return (EINVAL);
<               i = strgev.ge_ses;
<               strsevp = strgev.ge_sep;
<               s = splstr();
<               for (sep = stp->sd_eventlist; sep; sep = sep->se_next) {
<                       if (i == 0)
<                               break;
<
<                       /*
<                        * To do: check hostid of process too.
<                        */
```

© COPYRIGHT 1994 AMDAHL CORPORATION

```
<			if ((strgev.ge_flags & GEF_PROC) && (sep->se_pid != pid))
<				continue;
<			if (sep->se_pid == pid) {
<
<				/*
<				 * To do: check to see that
<				 * sep->se_hostid == hostid of curproc.
<				 */
<				if (ev_eqdtovp(sep->se_kecb.ecb_eqd, 0, &evp, NULL))
<					strsev.se_ecb.ecb_eqd = EQ_NOQUEUE;
<				else if (sep->se_vp != evp)
<					strsev.se_ecb.ecb_eqd = EQ_NOQUEUE;
<				else
<					strsev.se_ecb.ecb_eqd = sep->se_kecb.ecb_eqd;
<			} else
<				strsev.se_ecb.ecb_eqd = EQ_NOQUEUE;
<			strsev.se_ecb.ecb_flags = sep->se_kecb.ecb_flags;
<			strsev.se_ecb.ecb_eid = sep->se_kecb.ecb_eid;
<			strsev.se_ecb.ecb_evpri = sep->se_kecb.ecb_evpri;
<			strsev.se_mask = sep->se_kmask;
<			strsev.se_band = sep->se_kband;
<			error = strcopyout((caddr_t)&strsev, (caddr_t)strsevp,
<			    sizeof(str_sev_t), STRSEV, copyflag);
<			if (error) {
<				splx(s);
<				return (error);
<			}
<			i--;
<			strsevp++;
<		}
<		if ((i == 0) && (sep != NULL)) {
<			if (strgev.ge_flags & GEF_PROC) {
<				while (sep) {
<
<					/*
<					 * To do: check hostid too.
<					 */
<					if (sep->se_pid == pid) {
<						strgev.ge_flags |= GEF_MORE;
<						break;
<					}
<					sep = sep->se_next;
<				}
<			} else {
<				strgev.ge_flags |= GEF_MORE;
```

© COPYRIGHT 1994 AMDAHL CORPORATION

```
<                       }
<               }
<               splx(s);
<               if (strgev.ge_flags & GEF_MORE) {
<                       error = strcopyout((caddr_t)&strgev, (caddr_t)arg,
<                           sizeof(str_gev_t), STRGEV, copyflag);
<                       if (error)
<                               return (error);
<               }
<               *rvalp = strgev.ge_ses - i;
<               return (0);
<           }
<
<       case I_STREV:
<       case I_UNSTREV:
<           {
<               struct str_event stev;
<               struct str_evmsg *ep;
<               mblk_t *bp;
<
<               if (stp->sd_flag & STRHUP)
<                       return (ENXIO);
<               error = strcopyin((caddr_t)arg, (caddr_t)&stev,
<                   sizeof(struct strevent), STREVENT, copyflag);
<               if (error)
<                       return (error);
<               while ((bp = allocb(sizeof(struct str_evmsg), 0)) == NULL)
<                       if (error = strwaitbuf(sizeof(struct str_evmsg), 0))
<                               return (error);
<               ep = (struct str_evmsg *)bp->b_rptr;
<               ep->sv_event = stev.ste_event;
<               if ((cmd == I_UNSTREV) && (stev.ste_ecb.ecb_eqd == EQ_NOQUEUE))
<                       ep->sv_vp = NULL;
<               else if (error = ev_eqdtovp(stev.ste_ecb.ecb_eqd, 0,
<                   &ep->sv_vp, NULL)) {
<                       freeb(bp);
<                       return (error);
<               }
<               ep->sv_eid = stev.ste_ecb.ecb_eid;
<               ep->sv_evpri = stev.ste_ecb.ecb_evpri;
<               ep->sv_flags = stev.ste_evflags;
<               ep->sv_uid = crp->cr_uid;
<               ep->sv_pid = u.u_procp->p_pid;
<               ep->sv_hostid = 0; /* To do: set to hostid of curproc */
<               bp->b_wptr += sizeof(struct str_evmsg);
```

© COPYRIGHT 1994 AMDAHL CORPORATION

```
<               strioc.ic_cmd = cmd;
<               strioc.ic_timout = INFTIM;
<               strioc.ic_dp = stev.ste_buf.buf;
<               if (stev.ste_buf.buf != NULL)
<                       strioc.ic_len = stev.ste_buf.len;
<               else
<                       strioc.ic_len = 0;
<               return (strdoioctl(stp, &strioc, bp, copyflag, (char *)NULL, crp, rvalp));
<       }
<
< #endif /* GEM */
<       case I_SETSIG:
<               /*
<                * Register the calling proc to receive the SIGPOLL
<                * signal based on the events given in arg.  If
<                * arg is zero, remove the proc from register list.
<                */
<       {
<               struct strevent *sep, *psep;
<
<               psep = NULL;
<               s = splstr();
<               for (sep = stp->sd_siglist; sep && (sep->se_procp !=
<                   u.u_procp); psep = sep, sep = sep->se_next)
<                       ;
<
<               if (arg) {
<                       if (arg & ~(S_INPUT|S_HIPRI|S_MSG|S_HANGUP|S_ERROR|
<                          S_RDNORM|S_WRNORM|S_RDBAND|S_WRBAND|S_BANDURG)) {
<                               splx(s);
<                               return (EINVAL);
<                       }
<                       if ((arg & S_BANDURG) && !(arg & S_RDBAND)) {
<                               splx(s);
<                               return (EINVAL);
<                       }
<
<                       /*
<                        * If proc not already registered, add it
<                        * to list.
<                        */
<                       if (!sep) {
<                               if (!(sep = sealloc(SE_SLEEP))) {
<                                       splx(s);
<                                       return (EAGAIN);
```

© COPYRIGHT 1994 AMDAHL CORPORATION

```
<                               }
<                               if (psep)
<                                       psep->se_next = sep;
<                               else
<                                       stp->sd_siglist = sep;
<                               sep->se_procp = u.u_procp;
<                       }
<
<                       /*
<                        * Set events.
<                        */
<                       sep->se_events = arg;
<               } else {
<
<                       /*
<                        * Remove proc from register list.
<                        */
<                       if (sep) {
<                               if (psep)
<                                       psep->se_next = sep->se_next;
<                               else
<                                       stp->sd_siglist = sep->se_next;
<                               sefree(sep);
<                       } else {
<                               splx(s);
<                               return (EINVAL);
<                       }
<               }
<
<               /*
<                * Recalculate OR of sig events.
<                */
<               stp->sd_sigflags = 0;
<               for (sep = stp->sd_siglist; sep; sep = sep->se_next)
<                       stp->sd_sigflags |= sep->se_events;
<               splx(s);
<               return (0);
<       }
<
<   case I_GETSIG:
<               /*
<                * Return (in arg) the current registration of events
<                * for which the calling proc is to be signalled.
<                */
<       {
```

© COPYRIGHT 1994 AMDAHL CORPORATION

```
<               struct strevent *sep;
<
<               s = splstr();
<               for (sep = stp->sd_siglist; sep; sep = sep->se_next)
<                       if (sep->se_procp == u.u_procp) {
<                               error = strcopyout((caddr_t)&sep->se_events,
<                                   (int *)arg, sizeof(int), STRINT, copyflag);
<                               splx(s);
<                               return (error);
<                       }
<               splx(s);
<               return (EINVAL);
<           }
<
<       case I_PEEK:
<           {
<               struct strpeek strpeek;
<               int n;
<
<               error = strcopyin((caddr_t)arg, (caddr_t)&strpeek,
<                 sizeof(strpeek), STRPEEK, copyflag);
<               if (error)
<                       return (error);
<
<               s = splstr();
<               mp = RD(stp->sd_wrq)->q_first;
<               while (mp) {
<                       if (!(mp->b_flag & MSGNOGET))
<                               break;
<                       mp = mp->b_next;
<               }
<               splx(s);
<               if (!mp || ((strpeek.flags & RS_HIPRI) &&
<                   queclass(mp) == QNORM)) {
<                       *rvalp = 0;
<                       return (0);
<               }
<
<               if (mp->b_datap->db_type == M_PASSFP)
<                       return (EBADMSG);
<
<               if (mp->b_datap->db_type == M_PCPROTO)
<                       strpeek.flags = RS_HIPRI;
<               else
<                       strpeek.flags = 0;
```

© COPYRIGHT 1994 AMDAHL CORPORATION

```
<
<               /*
<                * First process PROTO blocks, if any.
<                */
<               iov.iov_base = strpeek.ctlbuf.buf;
<               iov.iov_len = strpeek.ctlbuf.maxlen;
<               uio.uio_iov = &iov;
<               uio.uio_iovcnt = 1;
<               uio.uio_offset = 0;
<               uio.uio_segflg = (copyflag == U_TO_K) ? UIO_USERSPACE :
<                   UIO_SYSSPACE;
<               uio.uio_fmode = 0;
<               uio.uio_resid = iov.iov_len;
<               while (mp && mp->b_datap->db_type != M_DATA && uio.uio_resid >= 0) {
<                       if ((n = MIN(uio.uio_resid, mp->b_wptr - mp->b_rptr)) && .
<                           (error = uiomove((caddr_t)mp->b_rptr, n, UIO_READ, &uio)))
<                               return (error);
<                       mp = mp->b_cont;
<               }
<               strpeek.ctlbuf.len = strpeek.ctlbuf.maxlen - uio.uio_resid;
<
<               /*
<                * Now process DATA blocks, if any.
<                */
<               while (mp && mp->b_datap->db_type != M_DATA)
<                       mp = mp->b_cont;
<               iov.iov_base = strpeek.databuf.buf;
<               iov.iov_len = strpeek.databuf.maxlen;
<               uio.uio_iovcnt = 1;
<               uio.uio_resid = iov.iov_len;
<               while (mp && uio.uio_resid >= 0) {
<                       if ((n = MIN(uio.uio_resid, mp->b_wptr - mp->b_rptr)) &&
<                           (error = uiomove((char *)mp->b_rptr, n, UIO_READ, &uio)))
<                               return (error);
<                       mp = mp->b_cont;
<               }
<
<               strpeek.databuf.len = strpeek.databuf.maxlen - uio.uio_resid;
<               error = strcopyout((caddr_t)&strpeek, (caddr_t)arg,
<                   sizeof(strpeek), STRPEEK, copyflag);
<               if (error)
<                       return (error);
<               *rvalp = 1;
<               return 0;
<       }
```

© COPYRIGHT 1994 AMDAHL CORPORATION

```
<
<       case I_FDINSERT:
<           {
<                   struct strfdinsert strfdinsert;
<                   struct file *resftp;
<                   struct stdata *resstp;
<                   queue_t *q;
<                   register long msgsize;
<                   long rmin, rmax;
<                   int strmakemsg();
<
<                   if (stp->sd_flag & STRHUP)
<                           return (ENXIO);
<                   if (stp->sd_flag & (STRDERR|STWRERR|STPLEX))
<                           return ((stp->sd_flag & STPLEX) ? EINVAL :
<                               (stp->sd_werror ? stp->sd_werror : stp->sd_rerror));
<                   error = strcopyin((caddr_t)arg, (caddr_t)&strfdinsert,
<                       sizeof(strfdinsert), STRFDINSERT, copyflag);
<                   if (error)
<                           return (error);
<                   if (strfdinsert.offset < 0 ||
<                     (strfdinsert.offset % sizeof(queue_t *)) != 0)
<                           return (EINVAL);
<                   if (getf(strfdinsert.fildes, &resftp) ||
<                     ((resstp = resftp->f_vnode->v_stream) == NULL))
<                           return (EINVAL);
<
<                   if (resstp->sd_flag & (STRDERR|STWRERR|STRHUP|STPLEX))
<                           return ((resstp->sd_flag & STPLEX) ? EINVAL :
<                               (resstp->sd_werror ? resstp->sd_werror :
<                               resstp->sd_rerror));
<
<                   /* get read queue of stream terminus */
<                   for (q = resstp->sd_wrq->q_next; q->q_next; q = q->q_next)
<                           ;
<                   q = RD(q);
<
<                   if (strfdinsert.ctlbuf.len < strfdinsert.offset + sizeof(queue_t *))
<                           return (EINVAL);
<
<                   /*
<                    * Check for legal flag value.
<                    */
<                   if (strfdinsert.flags & ~RS_HIPRI)
<                           return (EINVAL);
```

© COPYRIGHT 1994 AMDAHL CORPORATION

```
<
<		/*
<		 * Make sure ctl and data sizes together fall within
<		 * the limits of the max and min receive packet sizes
<		 * and do not exceed system limit.  A negative data
<		 * length means that no data part is to be sent.
<		 */
<		rmin = stp->sd_wrq->q_next->q_minpsz;
<		rmax = stp->sd_wrq->q_next->q_maxpsz;
<		ASSERT((rmax >= 0) || (rmax == INFPSZ));
<		if (rmax == 0)
<			return (ERANGE);
<		if (strmsgsz != 0) {
<			if (rmax == INFPSZ)
<				rmax = strmsgsz;
<			else
<				rmax = MIN(strmsgsz, rmax);
<		}
<		if ((msgsize = strfdinsert.databuf.len) < 0)
<			msgsize = 0;
<		if ((msgsize < rmin) ||
<		    ((msgsize > rmax) && (rmax != INFPSZ)) ||
<		    (strfdinsert.ctlbuf.len > strctlsz))
<			return (ERANGE);
<
<		s = splstr();
<		while (!(strfdinsert.flags & RS_HIPRI) &&
<		    !bcanput(stp->sd_wrq->q_next, 0)) {
<			if ((error = strwaitq(stp, WRITEWAIT, (off_t)0,
<			    flag, &done)) || done) {
<				splx(s);
<				return (error);
<			}
<		}
<		splx(s);
<
<		iov.iov_base = strfdinsert.databuf.buf;
<		iov.iov_len = strfdinsert.databuf.len;
<		uio.uio_iov = &iov;
<		uio.uio_iovcnt = 1;
<		uio.uio_offset = 0;
<		uio.uio_segflg = (copyflag == U_TO_K) ? UIO_USERSPACE :
<		    UIO_SYSSPACE;
<		uio.uio_fmode = 0;
<		uio.uio_resid = iov.iov_len;
```

© COPYRIGHT 1994 AMDAHL CORPORATION

```
<               if ((error = strmakemsg(&strfdinsert.ctlbuf,
<                   strfdinsert.databuf.len, &uio, stp,
<                   strfdinsert.flags, &mp)) || !mp)
<                       return (error);
<
<               /*
<                * Place pointer to queue 'offset' bytes from the
<                * start of the control portion of the message.
<                */
<
<               *((queue_t **)(mp->b_rptr + strfdinsert.offset)) = q;
<
<               /*
<                * Put message downstream.
<                */
<               (*stp->sd_wrq->q_next->q_qinfo->qi_putp)(stp->sd_wrq->q_next, mp);
<               if (qready())
<                       runqueues();
<               return (error);
<           }
<
<       case I_SENDFD:
<           {
<               register queue_t *qp;
<               register struct adt_strrecvfd *adtstr;
<               register struct strrecvfd *srf;
<               register struct adtrecvfd *arf;
<               struct file *fp;
<
<               if (stp->sd_flag & STRHUP)
<                       return (ENXIO);
<
<               for (qp = stp->sd_wrq; qp->q_next; qp = qp->q_next)
<                       ;
<               if (qp->q_qinfo != &strdata)
<                       return (EINVAL);
<               if (error = getf(arg, &fp))
<                       return (error);
<               if ((qp->q_flag & QFULL) ||
<                   !(mp = allocb(sizeof(struct adt_strrecvfd), BPRI_MED)))
<                       return (EAGAIN);
<               adtstr = (struct adt_strrecvfd *)mp->b_rptr;
<               srf = (struct strrecvfd *)&adtstr->adt_strrecvfd;
<               arf = (struct adtrecvfd *)&adtstr->adt_adtrecvfd;
<               mp->b_wptr += sizeof(struct adt_strrecvfd);
```

© COPYRIGHT 1994 AMDAHL CORPORATION

```
<               mp->b_datap->db_type = M_PASSFP;
<               srf->f.fp = fp;
<               srf->uid = u.u_cred->cr_uid;
<               srf->gid = u.u_cred->cr_gid;
<               arf->adtrfd_sendpid = u.u_procp->p_pidp->pid_id;
<               arf->adtrfd_sendfd = arg;
<               fp->f_count++;
<               strrput(qp, mp);
<               return (0);
<       }
<
<   case I_RECVFD:
<   case I_E_RECVFD:
<   case I_S_RECVFD:
<       {
<               register struct adt_strrecvfd *adtstr;
<               register struct strrecvfd *srf;
<               register struct adtrecvfd *arf;
<               int vmode;
<               int i, fd;
<               struct cred *rcv_crp;
<               struct file *fp;
<               union {
<                       struct e_strrecvfd estrfd; /* EFT data structure */
<                       struct o_strrecvfd ostrfd; /* non-EFT data structure -
<                                                   * SVR3 compatibility mode.
<                                                   */
<               } str;
<
<               s = splstr();
<               while (!(mp = getq(RD(stp->sd_wrq)))) {
<                       if (stp->sd_flag & STRHUP) {
<                               splx(s);
<                               return (ENXIO);
<                       }
<                       if ((error = strwaitq(stp, GETWAIT, (off_t) 0,
<                           flag, &done)) || done) {
<                               splx(s);
<                               return (error);
<                       }
<               }
<               if (mp->b_datap->db_type != M_PASSFP) {
<                       putbq(RD(stp->sd_wrq), mp);
<                       splx(s);
<                       return (EBADMSG);
```

© COPYRIGHT 1994 AMDAHL CORPORATION

```
<           }
<           splx(s);
<           adtstr = (struct adt_strrecvfd *)mp->b_rptr;
<           srf = (struct strrecvfd *)&adtstr->adt_strrecvfd;
<           arf = (struct adtrecvfd *)&adtstr->adt_adtrecvfd;
<
<           /*
<            * make sure the process receiving this file
<            * descriptor has the appropriate domination and/or
<            * privileges to use this file descriptor.
<            */
<           fp = srf->f.fp;
<           /*
<            * if type is VFIFO then check for MAC_WRITE regardless
<            * of flag value.
<            */
<           if (fp->f_vnode->v_type == VFIFO)
<                 vmode = VWRITE;
<           else
<                 vmode = (fp->f_flag & (FWRITE|FTRUNC)) ? VWRITE : VREAD;
<
<           if (error = MAC_VACCESS(fp->f_vnode, vmode, crp)) {
<                   putbq(RD(stp->sd_wrq), mp);
<                   return (error);
<           }
<
<           /*
<            * If sender of the file was not its owner, the receiver must
<            * pass DAC on the file to be received. For compatability,
<            * the check is only performed if MAC is installed.
<            */
<           if (mac_installed) {
<                   vattr_t va;
<
<                   /*
<                    * Using files open time credentials instead of the
<                    * receivers credentials to get the file attributes
<                    * because the VOP_GETATTR is on be-half of the kernel
<                    * and not the user attempting to receive the file.
<                    */
<                   if (error = VOP_GETATTR(fp->f_vnode, &va, 0,
<                       fp->f_cred)) {
<                         putbq(RD(stp->sd_wrq), mp);
<                         return (error);
<                   }
```

© COPYRIGHT 1994 AMDAHL CORPORATION

```
<                       if (srf->uid != va.va_uid) {
<                               if (error = VOP_ACCESS(fp->f_vnode,
<                                   vmode, DAC_ACC, u.u_cred)) {
<                                       putbq(RD(stp->sd_wrq), mp);
<                                       return (error);
<                               }
<                       }
<               }
<               if (error = ufalloc(0, &fd)) {
<                       putbq(RD(stp->sd_wrq), mp);
<                       return (error);
<               }
<               setf(fd, fp);
<               if (cmd == I_S_RECVFD)
<                       rcv_crp = fp->f_cred;
<               srf->f.fd = fd;
<
<               if (cmd == I_RECVFD) {
<                       /* check to see if uid/gid values are too large. */
<
<                       if (srf->uid > USHRT_MAX || srf->gid > USHRT_MAX) {
<                               srf->f.fp = fp;
<                               putbq(RD(stp->sd_wrq), mp);
<                               setf(fd, NULLFP);
<                               return (EOVERFLOW);
<                       }
<                       str.ostrfd.f.fd = srf->f.fd;
<                       str.ostrfd.uid = (o_uid_t) srf->uid;
<                       str.ostrfd.gid = (o_gid_t) srf->gid;
<                       for(i = 0; i < 8; i++)
<                               str.ostrfd.fill[i] = 0;         /* zero pad */
<
<                       if (error = strcopyout((caddr_t)&str.ostrfd,
<                           (caddr_t)arg, sizeof(struct o_strrecvfd),
<                           O_STRRECVFD, copyflag)) {
<                               srf->f.fp = fp;
<                               putbq(RD(stp->sd_wrq), mp);
<                               setf(fd, NULLFP);
<                               return (error);
<                       }
<               } else if (cmd == I_S_RECVFD) {
<                       struct s_strrecvfd *sstrfd = (struct s_strrecvfd *)NULL;
<                       static size_t sstrfdsize = 0;
<
<                       if (sstrfdsize == 0)
```

© COPYRIGHT 1994 AMDAHL CORPORATION

```
<                       sstrfdsize = sizeof(struct s_strrecvfd) +
<                           crgetsize() - sizeof(struct sub_attr);
<               if ((sstrfd = (struct s_strrecvfd *)
<                   kmem_alloc(sstrfdsize, KM_SLEEP)) == NULL) {
<                       srf->f.fp = fp;
<                       putbq(RD(stp->sd_wrq), mp);
<                       setf(fd, NULLFP);
<                       return (ENOMEM);
<               }
<
<               sstrfd->fd = srf->f.fd;
<               sstrfd->uid = (uid_t)srf->uid;
<               sstrfd->gid = (gid_t)srf->gid;
<               bcopy((caddr_t)rcv_crp, (caddr_t)&sstrfd->s_attrs,
<                   crgetsize());
<
<               if (error = strcopyout((caddr_t)sstrfd, (caddr_t)arg,
<                   sstrfdsize, S_STRRECVFD, copyflag)) {
<                       srf->f.fp = fp;
<                       putbq(RD(stp->sd_wrq), mp);
<                       setf(fd, NULLFP);
<                   kmem_free(sstrfd, sstrfdsize);
<                       return (error);
<               }
<               kmem_free(sstrfd, sstrfdsize);
<       } else {                /* I_E_RECVFD */
<               str.estrfd.f.fd = srf->f.fd;
<               str.estrfd.uid = (uid_t)srf->uid;
<               str.estrfd.gid = (gid_t)srf->gid;
<               for(i = 0; i < 8; i++)
<                       str.estrfd.fill[i] = 0;         /* zero pad */
<
<               if (error = strcopyout((caddr_t)&str.estrfd,
<                   (caddr_t)arg, sizeof(struct e_strrecvfd),
<                   STRRECVFD, copyflag)) {
<                       srf->f.fp = fp;
<                       putbq(RD(stp->sd_wrq), mp);
<                       setf(fd, NULLFP);
<                       return (error);
<               }
<       }
<       /* Get audit information needed from receiver and dump and
<        * audit record
<        */
<       if (audit_on) {
```

© COPYRIGHT 1994 AMDAHL CORPORATION

```
<                       arf->adtrfd_recvpid = u.u_procp->p_pidp->pid_id;
<                       arf->adtrfd_recvfd = fd;
<                       adt_recvfd(arf);
<               }
<
<               freemsg(mp);
<               return (0);
<       }
<
<   case I_SWROPT:
<               /*
<                * Set/clear the write options. arg is a bit
<                * mask with any of the following bits set...
<                *      SNDZERO - send zero length message
<                *      SNDPIPE - send sigpipe to process if
<                *              sd_werror is set and process is
<                *              doing a write or putmsg.
<                * The new stream head write options should reflect
<                * what is in arg.
<                */
<               if (arg & ~(SNDZERO|SNDPIPE))
<                       return (EINVAL);
<
<               s = splstr();
<               stp->sd_flag &= ~(STRSNDZERO|STRSIGPIPE);
<               if (arg & SNDZERO)
<                       stp->sd_flag |= STRSNDZERO;
<               if (arg & SNDPIPE)
<                       stp->sd_flag |= STRSIGPIPE;
<               splx(s);
<               return (0);
<
<   case I_GWROPT:
<       {
<               int wropt = 0;
<
<               if (stp->sd_flag & STRSNDZERO)
<                       wropt |= SNDZERO;
<               if (stp->sd_flag & STRSIGPIPE)
<                       wropt |= SNDPIPE;
<               error = strcopyout(&wropt, (int *)arg, sizeof(wropt), STRINT,
<                   copyflag);
<               return (error);
<       }
<
```

© COPYRIGHT 1994 AMDAHL CORPORATION

```
<       case I_LIST:
<               /*
<                * Returns all the modules found on this stream,
<                * upto the driver. If argument is NULL, return the
<                * number of modules (including driver). If argument
<                * is not NULL, copy the names into the structure
<                * provided.
<                */
<
<           {
<               queue_t *q;
<               int num_modules, space_allocated;
<               struct str_list strlist;
<
<               if (arg == NULL) { /* Return number of modules plus driver */
<                       q = stp->sd_wrq;
<                       *rvalp = stp->sd_pushcnt + 1;
<               } else {
<                       error = strcopyin((caddr_t)arg, (caddr_t)&strlist,
<                           sizeof(struct str_list), STRLIST, copyflag);
<                       if (error)
<                               return (error);
<                       if ((space_allocated = strlist.sl_nmods) <= 0)
<                               return (EINVAL);
<                       q = stp->sd_wrq;
<                       num_modules = 0;
<                       while (SAMESTR(q) && (space_allocated != 0)) {
<                               error = strcopyout(
<                                   q->q_next->q_qinfo->qi_minfo->mi_idname,
<                                   (struct str_list *)strlist.sl_modlist,
<                                   (FMNAMESZ + 1), STRNAME, copyflag);
<                               if (error)
<                                       return (error);
<                               q = q->q_next;
<                               space_allocated--;
<                               num_modules++;
<                               strlist.sl_modlist++;
<                       }
<                       if (SAMESTR(q))  /* Space ran out */
<                               return (ENOSPC);
<                       error = strcopyout((caddr_t) &num_modules, (int *)arg,
<                           sizeof(int), STRINT, copyflag);
<               }
<               return (error);
<           }
```

© COPYRIGHT 1994 AMDAHL CORPORATION

```
<
<       case I_CKBAND:
<           {
<               queue_t *q = RD(stp->sd_wrq);
<               qband_t *qbp;
<
<               /*
<                * Ignores MSGNOGET.
<                */
<               if ((arg < 0) || (arg >= NBAND))
<                       return (EINVAL);
<               if (arg > (int)q->q_nband) {
<                       *rvalp = 0;
<               } else {
<                       if (arg == 0) {
<                               if (q->q_first)
<                                       *rvalp = 1;
<                               else
<                                       *rvalp = 0;
<                       } else {
<                               qbp = q->q_bandp;
<                               while (--arg > 0)
<                                       qbp = qbp->qb_next;
<                               if (qbp->qb_first)
<                                       *rvalp = 1;
<                               else
<                                       *rvalp = 0;
<                       }
<               }
<               return (0);
<           }
<
<       case I_GETBAND:
<           {
<               int intpri;
<
<               /*
<                * Ignores MSGNOGET.
<                */
<               mp = RD(stp->sd_wrq)->q_first;
<               if (!mp)
<                       return (ENODATA);
<               intpri = (int)mp->b_band;
<               error = strcopyout((caddr_t)&intpri, (caddr_t)arg, sizeof(int),
<                   STRINT, copyflag);
```

© COPYRIGHT 1994 AMDAHL CORPORATION

```
<               return (error);
<           }
<
<       case I_ATMARK:
<           {
<               queue_t *q = RD(stp->sd_wrq);
<
<               if (arg & ~(ANYMARK|LASTMARK))
<                       return (EINVAL);
<               s = splstr();
<               mp = q->q_first;
<
<               /*
<                * Hack for sockets compatibility. We need to
<                * ignore any messages at the stream head that
<                * are marked MSGNOGET and are not marked MSGMARK.
<                */
<               while (mp && ((mp->b_flag & (MSGNOGET|MSGMARK)) == MSGNOGET))
<                       mp = mp->b_next;
<
<               if (!mp)
<                       *rvalp = 0;
<               else if ((arg == ANYMARK) && (mp->b_flag & MSGMARK))
<                       *rvalp = 1;
<               else if ((arg == LASTMARK) && (mp == stp->sd_mark))
<                       *rvalp = 1;
<               else
<                       *rvalp = 0;
<               splx(s);
<               return (0);
<           }
<
<       case I_CANPUT:
<           {
<               char band;
<
<               if ((arg < 0) || (arg >= NBAND))
<                       return (EINVAL);
<               band = (char)arg;
<               *rvalp = bcanput(stp->sd_wrq->q_next, band);
<               return (0);
<           }
<
<       case I_SETCLTIME:
<           {
```

© COPYRIGHT 1994 AMDAHL CORPORATION

```
<               long closetime;
<
<               error = strcopyin((caddr_t)arg, (caddr_t)&closetime,
<                   sizeof(long), STRLONG, copyflag);
<               if (error)
<                       return (error);
<               if (closetime < 0)
<                       return (EINVAL);
<
<               /*
<                * Convert between milliseconds and clock ticks.
<                */
<               stp->sd_closetime = ((closetime / 1000) * HZ) +
<                   ((((closetime % 1000) * HZ) + 999) / 1000);
<               return (0);
<           }
<
<       case I_GETCLTIME:
<           {
<               long closetime;
<
<               /*
<                * Convert between clock ticks and milliseconds.
<                */
<               closetime = ((stp->sd_closetime / HZ) * 1000) +
<                   (((stp->sd_closetime % HZ) * 1000) / HZ);
<               error = strcopyout((caddr_t)&closetime, (caddr_t)arg,
<                   sizeof(long), STRLONG, copyflag);
<               return (error);
<           }
<
<       case TIOCSSID:
<       {
<               pid_t sid;
<
<               if (stp->sd_sidp != u.u_procp->p_sessp->s_sidp)
<                       return ENOTTY;
<               if (error = strcopyin(arg, (caddr_t)&sid, sizeof(pid_t),
<                   STRPIDT, copyflag))
<                       return error;
<               return realloctty(u.u_procp, sid);
<       }
<
<       case TIOCGSID:
<               if (stp->sd_sidp == NULL)
```

© COPYRIGHT 1994 AMDAHL CORPORATION

```
<                       return ENOTTY;
<               return strcopyout((caddr_t)&stp->sd_sidp->pid_id,
<                 arg, sizeof(pid_t), STRPIDT, copyflag);
<
<       case TIOCSPGRP:
<       {
<               pid_t pgrp;
<               proc_t *q, *pgfind();
<
<
<               if (stp->sd_sidp != u.u_procp->p_sessp->s_sidp)
<                       return ENOTTY;
<               if (error = strcopyin(arg, (caddr_t)&pgrp, sizeof(pid_t),
<                   STRPIDT, copyflag))
<                       return (error);
<               if (pgrp == stp->sd_pgidp->pid_id)
<                       return 0;
<               if (pgrp <= 0 || pgrp >= MAXPID)
<                       return EINVAL;
<               if ((q = pgfind(pgrp)) == NULL
<                 || q->p_sessp != u.u_procp->p_sessp)
<                       return EPERM;
<               PID_RELE(stp->sd_pgidp);
<               stp->sd_pgidp = q->p_pgidp;
<               PID_HOLD(stp->sd_pgidp);
<               return 0;
<       }
<
<       case TIOCGPGRP:
<               if (stp->sd_sidp == NULL)
<                       return ENOTTY;
<               return strcopyout((caddr_t)&stp->sd_pgidp->pid_id,
<                 arg, sizeof(pid_t), STRPIDT, copyflag);
<
<       case FIONBIO:
<       case FIOASYNC:
<               return (0);     /* handled by the upper layer */
<       }
< }
<
3619,3620c491
< int
< strdoioctl(stp, strioc, ebp, copyflag, fmtp, crp, rvalp)
---
> int strdoioctl(stp, strioc, ebp, fmtp, crp, rvalp)
```

© COPYRIGHT 1994 AMDAHL CORPORATION

```
3624d494
<       int copyflag;
3646d515
<
3648c517
<           ((strmsgsz > 0) && (strioc->ic_len > strmsgsz))) {
---
>             ((strmsgsz > 0) && (strioc->ic_len > strmsgsz))) {
3653,3654c522
<
<       while (!(bp = allocb(max(sizeof(struct iocblk), sizeof(struct copyreq)), BPRI_HI)))
---
>       while (!(bp = allocb(max(sizeof(struct iocblk), sizeof(struct copyreq)), BPRI_HI)))
3660,3661c528
<
<       iocbp = (struct iocblk *)bp->b_wptr;
---
>       iocbp = (struct iocblk *) bp->b_wptr;
3664c531
<       crhold(crp);
---
>
3670a538
>
3680,3684c548
<               if (transparent)
<                       id = K_TO_K;
<               else
<                       id = copyflag;
<               if (error = putiocd(bp, ebp, strioc->ic_dp, id, SE_NOSLP, fmtp)) {
---
>               if (error = putiocd(bp, ebp, strioc->ic_dp, SE_NOSLP, fmtp)) {
3688d551
<                       crfree(crp);
3693,3695c556,558
<                * We could have slept copying in user pages.
<                * Recheck the stream head state (the other end
<                * of a pipe could have gone away).
---
>                * We could have slept copying in user pages. Recheck the
>                * stream head state (the other end of a pipe could have gone
>                * away).
3697c560
<               if (stp->sd_flag & (STRHUP|STRDERR|STWRERR|STPLEX)) {
---
```

© COPYRIGHT 1994 AMDAHL CORPORATION

```
>               if (stp->sd_flag & (STRHUP | STRDERR | STWRERR | STPLEX)) {
3699c562
<                       (stp->sd_werror ? stp->sd_werror : stp->sd_rerror));
---
>                       (stp->sd_werror ? stp->sd_werror : stp->sd_rerror));
3701d563
<                   crfree(crp);
3712,3717c574,578
<        * Block for up to STRTIMOUT sec if there is a outstanding
<        * ioctl for this stream already pending.  All processes
<        * sleeping here will be awakened as a result of an ACK
<        * or NAK being received for the outstanding ioctl, or
<        * as a result of the timer expiring on the outstanding
<        * ioctl (a failure), or as a result of any waiting
---
>        * Block for up to STRTIMOUT sec if there is a outstanding ioctl for
>        * this stream already pending.  All processes sleeping here will be
>        * awakened as a result of an ACK or NAK being received for the
>        * outstanding ioctl, or as a result of the timer expiring on the
>        * outstanding ioctl (a failure), or as a result of any waiting
3734d594
<                   crfree(crp);
3746d605
<                   crfree(crp);
3788a648
>
3802,3803c662
<                   wakeprocs((caddr_t)&(stp->sd_iocwait), PRMPT);
<                   crfree(crp);
---
>                   wakeprocs((caddr_t) & (stp->sd_iocwait), PRMPT);
3811a670
>
3839,3840c698
<                   wakeprocs((caddr_t)&(stp->sd_iocwait), PRMPT);
<                   crfree(crp);
---
>                   wakeprocs((caddr_t) & (stp->sd_iocwait), PRMPT);
3863a722
>
3888,3892c747,750
<                       strioc->ic_cmd == TCGETS ||
<                       strioc->ic_cmd == TIOCGETP ||
<                       strioc->ic_cmd == LDGETT) {
<                           if (error = getiocd(bp, strioc->ic_dp,
```

© COPYRIGHT 1994 AMDAHL CORPORATION

```
<                                   copyflag, fmtp))
---
>                               strioc->ic_cmd == TCGETS ||
>                               strioc->ic_cmd == TIOCGETP ||
>                               strioc->ic_cmd == LDGETT) {
>                                   if (error = getiocd(bp, strioc->ic_dp, fmtp))
3894,3895c752
<                           } else if (error = getiocd(bp, strioc->ic_dp,
<                               copyflag, (char *)NULL)) {
---
>                           } else if (error = getiocd(bp, strioc->ic_dp, (char *) NULL)) {
3907a765
>
3919a778
>
3930,3931c789,790
<                           error = putiocd(bp, NULL, strioc->ic_dp, copyflag, SE_SLEEP,
<                               (fmtbp ? (char *)fmtbp->b_rptr : (char *)NULL));
---
>                           error = putiocd(bp, NULL, strioc->ic_dp, SE_SLEEP,
>                                 (fmtbp ? (char *) fmtbp->b_rptr : (char *) NULL));
3937,3938c796,797
<                           error = putiocd(bp, NULL, reqp->cq_addr, copyflag, SE_SLEEP,
<                               (fmtbp ? (char *)fmtbp->b_rptr : (char *) NULL));
---
>                           error = putiocd(bp, NULL, reqp->cq_addr, SE_SLEEP,
>                                 (fmtbp ? (char *) fmtbp->b_rptr : (char *) NULL));
3943,3944c802
<                           error = putiocd(bp, NULL, reqp->cq_addr, copyflag,
<                               SE_SLEEP, (char *)NULL);
---
>                           error = putiocd(bp, NULL, reqp->cq_addr, SE_SLEEP, (char *) NULL);
3950d807
<
3963d819
<                           crfree(crp);
3966d821
<
3969a825
>
3987,3988c843,844
<                           error = getiocd(bp, taddr, copyflag,
<                               (fmtbp ? (char *)fmtbp->b_rptr : (char *)NULL));
---
>                           error = getiocd(bp, taddr,
```

© COPYRIGHT 1994 AMDAHL CORPORATION

```
>                       (fmtbp ? (char *) fmtbp->b_rptr : (char *) NULL));
3993c849
<                   error = getiocd(bp, taddr, copyflag, (char *)NULL);
---
>                   error = getiocd(bp, taddr, (char *) NULL);
4003c859,860
<           (*stp->sd_wrq->q_next->q_qinfo->qi_putp)(stp->sd_wrq->q_next, bp);
---
>           (*stp->sd_wrq->q_next->q_qinfo->qi_putp) (stp->sd_wrq->q_next, bp);
>
4010d866
<                   crfree(crp);
4021d876
<       crfree(crp);
4023,4596d877
< }
<
< /*
<  * Get the next message from the read queue.  If the message is
<  * priority, STRPRI will have been set by strrput().  This flag
<  * should be reset only when the entire message at the front of the
<  * queue as been consumed.
<  */
< int
< strgetmsg(vp, mctl, mdata, prip, flagsp, fmode, rvp)
<       register struct vnode *vp;
<       register struct strbuf *mctl;
<       register struct strbuf *mdata;
<       unsigned char *prip;
<       int *flagsp;
<       int fmode;
<       rval_t *rvp;
< {
<       register s;
<       register struct stdata *stp;
<       register mblk_t *bp, *nbp;
<       mblk_t *savemp = NULL;
<       mblk_t *savemptail = NULL;
<       int n, bcnt;
<       int done = 0;
<       int flg = 0;
<       int more = 0;
<       int error = 0;
<       char *ubuf;
<       int mark;
```

© COPYRIGHT 1994 AMDAHL CORPORATION

```
<       unsigned char pri;
<       queue_t *q;
<
<       ASSERT(vp->v_stream);
<       stp = vp->v_stream;
<       q = RD(stp->sd_wrq);
<       rvp->r_val1 = 0;.
<
<       if (error = straccess(stp, JCREAD))
<               return (error);
<       if (stp->sd_flag & (STRDERR|STPLEX))
<               return ((stp->sd_flag & STPLEX) ? EINVAL : stp->sd_rerror);
<
<       switch (*flagsp) {
<       case MSG_HIPRI:
<               if (*prip != 0)
<                       return (EINVAL);
<               break;
<
<       case MSG_ANY:
<       case MSG_BAND:
<               break;
<
<       default:
<               return (EINVAL);
<       }
<
<       s = splstr();
<       mark = 0;
<       while (((*flagsp & MSG_HIPRI) && !(stp->sd_flag & STRPRI)) ||
<           ((*flagsp & MSG_BAND) && (!q->q_first ||
<           ((q->q_first->b_band < *prip) && !(stp->sd_flag & STRPRI)))) ||
<           !(bp = getq(q))) {
<               /*
<                * If STRHUP, return 0 length control and data.
<                */
<               if (stp->sd_flag & STRHUP) {
<                       mctl->len = mdata->len = 0;
<                       *flagsp = flg;
<                       splx(s);
<                       return (error);
<               }
<               if ((error = strwaitq(stp, GETWAIT, (off_t)0, fmode, &done)) || done) {
<                       splx(s);
<                       return (error);
```

© COPYRIGHT 1994 AMDAHL CORPORATION

```
<               }
<       }
<       if (bp == stp->sd_mark) {
<               mark = 1;
<               stp->sd_mark = NULL;
<       }
<       splx(s);
<
<       if (bp->b_datap->db_type == M_PASSFP) {
<               s = splstr();
<               if (mark && !stp->sd_mark)
<                       stp->sd_mark = bp;
<               putbq(q, bp);
<               splx(s);
<               return (EBADMSG);
<       }
<
<       pri = bp->b_band;
<       if (qready())
<               runqueues();
<
<       /*
<        * Set HIPRI flag if message is priority.
<        */
<       if (stp->sd_flag & STRPRI)
<               flg = MSG_HIPRI;
<       else
<               flg = MSG_BAND;
<
<       /*
<        * First process PROTO or PCPROTO blocks, if any.
<        */
<       if (mctl->maxlen >= 0 && bp && bp->b_datap->db_type != M_DATA) {
<               bcnt = mctl->maxlen;
<               ubuf = mctl->buf;
<               while (bp && bp->b_datap->db_type != M_DATA && bcnt >= 0) {
<                       if ((n = MIN(bcnt, bp->b_wptr - bp->b_rptr)) &&
<                           copyout((caddr_t)bp->b_rptr, ubuf, n)) {
<                               error = EFAULT;
<                               s = splstr();
<                               stp->sd_flag &= ~STRPRI;
<                               splx(s);
<                               more = 0;
<                               freemsg(bp);
<                               goto getmout;
```

© COPYRIGHT 1994 AMDAHL CORPORATION

```
<                       }
<                       ubuf += n;
<                       bp->b_rptr += n;
<                       if (bp->b_rptr >= bp->b_wptr) {
<                               nbp = bp;
<                               bp = bp->b_cont;
<                               freeb(nbp);
<                       }
<                       if ((bcnt -= n) <= 0)
<                               break;
<               }
<               mctl->len = mctl->maxlen - bcnt;
<       } else
<               mctl->len = -1;
<
<
<       if (bp && bp->b_datap->db_type != M_DATA) {
<               /*
<                * More PROTO blocks in msg.
<                */
<               more |= MORECTL;
<               savemp = bp;
<               while (bp && bp->b_datap->db_type != M_DATA) {
<                       savemptail = bp;
<                       bp = bp->b_cont;
<               }
<               savemptail->b_cont = NULL;
<       }
<
<       /*
<        * Now process DATA blocks, if any.
<        */
<       if (mdata->maxlen >= 0 && bp) {
<               bcnt = mdata->maxlen;
<               ubuf = mdata->buf;
<               while (bp && bcnt >= 0) {
<                       if ((n = MIN(bcnt, bp->b_wptr - bp->b_rptr)) &&
<                           copyout((caddr_t)bp->b_rptr, ubuf, n)) {
<                               error = EFAULT;
<                               s = splstr();
<                               stp->sd_flag &= ~STRPRI;
<                               splx(s);
<                               more = 0;
<                               freemsg(bp);
<                               goto getmout;
```

© COPYRIGHT 1994 AMDAHL CORPORATION

```
<                       }
<                       ubuf += n;
<                       bp->b_rptr += n;
<                       if (bp->b_rptr >= bp->b_wptr) {
<                               nbp = bp;
<                               bp = bp->b_cont;
<                               freeb(nbp);
<                       }
<                       if ((bcnt -= n) <= 0)
<                               break;
<               }
<               mdata->len = mdata->maxlen - bcnt;
<       } else
<               mdata->len = -1;
<
<       if (bp) {                       /* more data blocks in msg */
<               more |= MOREDATA;
<               if (savemp)
<                       savemptail->b_cont = bp;
<               else
<                       savemp = bp;
<       }
<
<       s = splstr();
<       if (savemp) {
<               savemp->b_band = pri;
<               if (mark && !stp->sd_mark) {
<                       savemp->b_flag |= MSGMARK;
<                       stp->sd_mark = savemp;
<               }
<               putbq(q, savemp);
<       } else {
<               stp->sd_flag &= ~STRPRI;
<       }
<       splx(s);
<
<       *flagsp = flg;
<       *prip = pri;
<
<       /*
<        * Getmsg cleanup processing - if the state of the queue has changed
<        * some signals may need to be sent and/or poll awakened.
<        */
< getmout:
<       while ((bp = q->q_first) && (bp->b_datap->db_type == M_SIG)) {
```

© COPYRIGHT 1994 AMDAHL CORPORATION

```
<               bp = getq(q);
<               strsignal(stp, *bp->b_rptr, (long)bp->b_band);
<               freemsg(bp);
<               if (qready())
<                       runqueues();
<       }
<
<
<       /*
<        * Check for event messages at the front of the read
<        * queue and generate the event(s) if appropriate.
<        * The only event that can be on queue is M_EVENT at
<        * this point.
<        */
< #ifdef GEM
<       while ((bp = q->q_first) &&
<               (bp->b_datap->db_type == M_EVENT)) {
<               bp = getq(q);
<               strdrpost(bp);
<               freemsg(bp);
<               if (qready())
<                       runqueues();
<       }
< #endif /* GEM */
<
<       /*
<        * If we have just received a high priority message and a
<        * regular message is now at the front of the queue, send
<        * signals in S_INPUT processes and wake up processes polling
<        * on POLLIN.
<        */
<       if ((bp = q->q_first) && !(stp->sd_flag & STRPRI)) {
<           if (flg & MSG_HIPRI) {
<               s = splstr();
<               if (stp->sd_sigflags & S_INPUT)
<                       strsendsig(stp->sd_siglist, S_INPUT, (long)bp->b_band);
<               if (stp->sd_pollist.ph_events & POLLIN)
<                       pollwakeup(&stp->sd_pollist, POLLIN);
< #ifdef GEM
<               if (stp->sd_eventflags & S_INPUT)
<                       strevpost(stp, S_INPUT, (long)bp->b_band);
< #endif /* GEM */
<
<               if (bp->b_band == 0) {
<                   if (stp->sd_sigflags & S_RDNORM)
```

© COPYRIGHT 1994 AMDAHL CORPORATION

```
<                       strsendsig(stp->sd_siglist, S_RDNORM, 0L);
<               if (stp->sd_pollist.ph_events & POLLRDNORM)
<                       pollwakeup(&stp->sd_pollist, POLLRDNORM);
< #ifdef GEM
<               if (stp->sd_eventflags & S_RDNORM)
<                       strevpost(stp, S_RDNORM, 0L);
< #endif /* GEM */
<           } else {
<               if (stp->sd_sigflags & S_RDBAND)
<                       strsendsig(stp->sd_siglist, S_RDBAND,
<                           (long)bp->b_band);
<               if (stp->sd_pollist.ph_events & POLLRDBAND)
<                       pollwakeup(&stp->sd_pollist, POLLRDBAND);
< #ifdef GEM
<               if (stp->sd_eventflags & S_RDBAND)
<                       strevpost(stp, S_RDBAND, (long)bp->b_band);
< #endif /* GEM */
<           }
<           splx(s);
<       } else {
<           if (pri != bp->b_band) {
<               s = splstr();
<               if (bp->b_band == 0) {
<                   if (stp->sd_sigflags & S_RDNORM)
<                           strsendsig(stp->sd_siglist, S_RDNORM, 0L);
<                   if (stp->sd_pollist.ph_events & POLLRDNORM)
<                           pollwakeup(&stp->sd_pollist, POLLRDNORM);
< #ifdef GEM
<                   if (stp->sd_eventflags & S_RDNORM)
<                           strevpost(stp, S_RDNORM, 0L);
< #endif /* GEM */
<               } else {
<                   if (stp->sd_sigflags & S_RDBAND)
<                           strsendsig(stp->sd_siglist, S_RDBAND,
<                               (long)bp->b_band);
<                   if (stp->sd_pollist.ph_events & POLLRDBAND)
<                           pollwakeup(&stp->sd_pollist, POLLRDBAND);
< #ifdef GEM
<                   if (stp->sd_eventflags & S_RDBAND)
<                           strevpost(stp, S_RDBAND, (long)bp->b_band);
< #endif /* GEM */
<               }
<               splx(s);
<           }
<       }
```

© COPYRIGHT 1994 AMDAHL CORPORATION

```
<       }
<       rvp->r_val1 = more;
<       return (error);
< }
<
< /*
<  * Put a message downstream.
<  */
< int
< strputmsg(vp, mctl, mdata, pri, flag, fmode)
<       register struct vnode *vp;
<       register struct strbuf *mctl;
<       register struct strbuf *mdata;
<       unsigned char pri;
<       register flag;
<       int fmode;
< {
<       register struct stdata *stp;
<       mblk_t *mp;
<       register s;
<       register long msgsize;
<       long rmin, rmax;
<       int error, done;
<       struct uio uio;
<       struct iovec iov;
<       int strmakemsg();
<
<       ASSERT(vp->v_stream);
<       stp = vp->v_stream;
<
<       if (error = straccess(stp, JCWRITE))
<               return (error);
<       if (stp->sd_flag & STPLEX)
<               return (EINVAL);
<       if (stp->sd_flag & (STRHUP|STWRERR)) {
<               if (stp->sd_flag & STRSIGPIPE)
<                       psignal(u.u_procp, SIGPIPE);
<               return(stp->sd_werror);
<       }
<
<       /*
<        * firewall - don't use too much memory
<        */
<
<       if (strthresh && (Strcount > strthresh) && pm_denied(u.u_cred, P_SYSOPS))
```

© COPYRIGHT 1994 AMDAHL CORPORATION

```
<               return (ENOSR);
<
<       /*
<        * Check for legal flag value.
<        */
<       switch (flag) {
<       case MSG_HIPRI:
<               if ((mctl->len < 0) || (pri != 0))
<                       return (EINVAL);
<               break;
<       case MSG_BAND:
<               break;
<
<       default:
<               return (EINVAL);
<       }
<
<       /*
<        * Make sure ctl and data sizes together fall within the
<        * limits of the max and min receive packet sizes and do
<        * not exceed system limit.
<        */
<       rmin = stp->sd_wrq->q_next->q_minpsz;
<       rmax = stp->sd_wrq->q_next->q_maxpsz;
<       ASSERT((rmax >= 0) || (rmax == INFPSZ));
<       if (rmax == 0)
<               return (ERANGE);
<       if (strmsgsz != 0) {
<               if (rmax == INFPSZ)
<                       rmax = strmsgsz;
<               else
<                       rmax = MIN(strmsgsz, rmax);
<       }
<       if ((msgsize = mdata->len) < 0) {
<               msgsize = 0;
<               rmin = 0;       /* no range check for NULL data part */
<       }
<       if ((msgsize < rmin) ||
<           ((msgsize > rmax) && (rmax != INFPSZ)) ||
<           (mctl->len > strctlsz))
<               return (ERANGE);
<
<       s = splstr();
<       while (!(flag & MSG_HIPRI) && !bcanput(stp->sd_wrq->q_next, pri)) {
<               if ((error = strwaitq(stp, WRITEWAIT, (off_t) 0, fmode, &done)) || done) {
```

© COPYRIGHT 1994 AMDAHL CORPORATION

```
<                       splx(s);
<                       return (error);
<               }
<       }
<       splx(s);
<
<       iov.iov_base = mdata->buf;
<       iov.iov_len = mdata->len;
<       uio.uio_iov = &iov;
<       uio.uio_iovcnt = 1;
<       uio.uio_offset = 0;
<       uio.uio_segflg = UIO_USERSPACE;
<       uio.uio_fmode = 0;
<       uio.uio_resid = iov.iov_len;
<       if ((error = strmakemsg(mctl, mdata->len, &uio, stp, (long)flag, &mp)) || !mp)
<               return (error);
<       mp->b_band = pri;
<
<       /*
<        * Put message downstream.
<        */
<       (*stp->sd_wrq->q_next->q_qinfo->qi_putp)(stp->sd_wrq->q_next, mp);
<       if (qready())
<               runqueues();
<       return (0);
< }
<
< /*
<  * Determines whether the necessary conditions are set on a stream
<  * for it to be readable, writeable, or have exceptions.
<  */
< int
< strpoll(stp, events, anyyet, reventsp, phpp)
<       register struct stdata *stp;
<       short events;
<       int anyyet;
<       short *reventsp;
<       struct pollhead **phpp;
< {
<       register short retevents = 0;
<       register s;
<       register mblk_t *mp;
<       qband_t *qbp;
<
<       if (stp->sd_flag & STPLEX) {
```

© COPYRIGHT 1994 AMDAHL CORPORATION

```
<               *reventsp = POLLNVAL;
<               return (0);
<       }
<       s = splstr();
<
<       if (stp->sd_flag & STRDERR) {
<               if ((events == 0) ||
<                   (events & (POLLIN|POLLPRI|POLLRDNORM|POLLRDBAND))) {
<                       splx(s);
<                       *reventsp = POLLERR;
<                       return(0);
<               }
<       }
<       if (stp->sd_flag & STWRERR) {
<               if ((events == 0) || (events & (POLLOUT|POLLWRBAND))) {
<                       splx(s);
<                       *reventsp = POLLERR;
<                       return (0);
<               }
<       }
<
<       if (stp->sd_flag & STRHUP) {
<               retevents |= POLLHUP;
<       } else {
<               register queue_t *tq;
<
<               tq = stp->sd_wrq->q_next;
<               while (tq->q_next && !tq->q_qinfo->qi_srvp)
<                       tq = tq->q_next;
<               if (events & POLLWRNORM) {
<                       if (tq->q_flag & QFULL)
<                               /* ensure backq svc procedure runs */
<                               tq->q_flag |= QWANTW;
<                       else
<                               retevents |= POLLOUT;
<               }
<               if (events & POLLWRBAND) {
<                       qbp = tq->q_bandp;
<                       if (qbp) {
<                               while (qbp) {
<                                       if (qbp->qb_flag & QB_FULL)
<                                               qbp->qb_flag |= QB_WANTW;
<                                       else
<                                               retevents |= POLLWRBAND;
<                                       qbp = qbp->qb_next;
```

© COPYRIGHT 1994 AMDAHL CORPORATION

```
<                       }
<               } else {
<                       retevents |= POLLWRBAND;
<               }
<       }
< }
<
< mp = RD(stp->sd_wrq)->q_first;
< if (!(stp->sd_flag & STRPRI)) {
<       while (mp) {
<               if ((events & POLLRDNORM) && (mp->b_band == 0))
<                       retevents |= POLLRDNORM;
<               if ((events & POLLRDBAND) && (mp->b_band != 0))
<                       retevents |= POLLRDBAND;
<               if (events & POLLIN)
<                       retevents |= POLLIN;
<
<               /*
<                * MSGNOGET is really only to make poll return
<                * the intended events when the module is really
<                * holding onto the data.  Yeah, it's a hack and
<                * we need a better solution.
<                */
<               if (mp->b_flag & MSGNOGET)
<                       mp = mp->b_next;
<               else
<                       break;
<       }
< } else {
<       ASSERT(mp != NULL);
<       if (events & POLLPRI)
<               retevents |= POLLPRI;
< }
< *reventsp = retevents;
< if (retevents) {
<       splx(s);
<       return (0);
< }
<
< /*
<  * If poll() has not found any events yet, set up event cell
<  * to wake up the poll if a requested event occurs on this
<  * stream.  Check for collisions with outstanding poll requests.
<  */
< if (!anyyet) {
```

© COPYRIGHT 1994 AMDAHL CORPORATION

```
<               *phpp = &stp->sd_pollist;
<       }
<       splx(s);
<       return (0);
< }
<
< STATIC int
< strsink(q, bp)
<       register queue_t *q;
<       register mblk_t *bp;
< {
<       struct copyresp *resp;
<
<       switch (bp->b_datap->db_type) {
<       case M_FLUSH:
<               if ((*bp->b_rptr & FLUSHW) && !(bp->b_flag & MSGNOLOOP)) {
<                       *bp->b_rptr &= ~FLUSHR;
<                       bp->b_flag |= MSGNOLOOP;
<                       qreply(q, bp);
<               } else {
<                       freemsg(bp);
<               }
<               break;
<
<       case M_COPYIN:
<       case M_COPYOUT:
<               if (bp->b_cont) {
<                       freemsg(bp->b_cont);
<                       bp->b_cont = NULL;
<               }
<               bp->b_datap->db_type = M_IOCDATA;
<               resp = (struct copyresp *)bp->b_rptr;
<               resp->cp_rval = (caddr_t)1;   /* failure */
<               qreply(q, bp);
<               break;
<
<       case M_IOCTL:
<               if (bp->b_cont) {
<                       freemsg(bp->b_cont);
<                       bp->b_cont = NULL;
<               }
<               bp->b_datap->db_type = M_IOCNAK;
<               qreply(q, bp);
<               break;
<
```

© COPYRIGHT 1994 AMDAHL CORPORATION

```
<       default:
<               freemsg(bp);
<               break;
<       }
```

© COPYRIGHT 1994 AMDAHL CORPORATION

```
1,2c1,11
< /*    Copyright (c) 1990, 1991 UNIX System Laboratories, Inc.     */
< /*    Copyright (c) 1984, 1986, 1987, 1988, 1989, 1990 AT&T      */
---
> #ident "%W% %G% %U% %n%"
>
> /* File: strsubr.c - last edit:
>  * helge      Wed May 12 13:53:10 1993
>  *
>  * Copyright (c) 1991 by Amdahl Corporation. All rights reserved.
>  * Copyright (c) 1992 by Amdahl Corporation. All rights reserved.
>  * Copyright (c) 1993 by Amdahl Corporation. All rights reserved.
>  */
>
> /*    Copyright (c) 1984, 1986, 1987, 1988, 1989 AT&T    */
5,6c14
< /*    THIS IS UNPUBLISHED PROPRIETARY SOURCE CODE OF         */
< /*    UNIX System Laboratories, Inc.                         */
---
> /*    THIS IS UNPUBLISHED PROPRIETARY SOURCE CODE OF AT&T        */
10c18
< #ident        "@(#)uts-comm:io/strsubr.c      1.19"
---
> #ident        "@(#)kernel:os/strsubr.c        1.37"
12,40c20,36
< #include <util/types.h>
< #include <util/sysmacros.h>
< #include <util/param.h>
< #include <svc/errno.h>
< #include <proc/signal.h>
< #include <proc/proc.h>
< #include <proc/cred.h>
< #include <proc/user.h>
< #include <io/conf.h>
< #include <util/debug.h>
< #include <fs/vnode.h>
< #include <fs/file.h>
< #include <io/stream.h>
< #include <io/strsubr.h>
< #include <io/stropts.h>
< #include <io/strstat.h>
< #include <io/poll.h>
< #include <util/inline.h>
< #include <svc/systm.h>
< #include <io/uio.h>
```

© COPYRIGHT 1994 AMDAHL CORPORATION

```
< #include <util/cmn_err.h>
< #include <acc/mac/mac.h>          /* for mac_installed */
< #ifdef GEM
< #include <svc/events.h>
< #include <svc/evsys.h>
< #endif /* GEM */
< #include <proc/session.h>
< #include <mem/kmem.h>
< #include <proc/siginfo.h>
---
> #include <vrtxil.h>
> #include "sys/callo.h"
> #include "sys/clock.h"
> #include "sys/cmn_err.h"
> #include "sys/debug.h"
> #include "sys/errno.h"
> #include "sys/file.h"
> #include "sys/kmem.h"
> #include "sys/proc.h"
> #include "sys/sad.h"
> #include "sys/stropts.h"
> #include "sys/strstat.h"
> #include "sys/strsubr.h"
> #include "sys/sysmacros.h"
> #include "sys/types.h"
> #include "sys/var.h"
> #include "spl.h"
42c38
< /* KPERF is for kernel perf. measurment tools */
---
> #include "app_param.h"
44,46c40
< #ifdef KPERF
< #include <proc/disp.h>
< #endif /* KPERF */
---
> #define STATIC
52c46
<  * or drivers.  Compatibility will not be guaranteed.
---
>  * or drivers.  Compatibility will not be guaranteed.
55,57d48
< #define ncopyin(A, B, C, D)       copyin(A, B, C)          /* temporary */
< #define ncopyout(A, B, C, D)      copyout(A, B, C)     /* temporary */
<
```

© COPYRIGHT 1994 AMDAHL CORPORATION

```
61c52
< STATIC int lnk_id;
---
> volatile static int lnk_id = 0;
66,76c57,67
< char qrunflag;                    /* set iff queues are enabled */
< char queueflag;                   /* set iff inside queuerun() */
< struct queue *qhead;              /* head of queues to run */
< struct queue *qtail;         /*  last queue */
< struct queue *scanqhead;     /* list for msg consolidation feature */
< struct queue *scanqtail;     /*  last queue */
< char strbcwait;                   /* bufcall functions waiting */
< char strbcflag;                   /* bufcall functions ready to go */
< struct bclist strbcalls;     /* list of waiting bufcalls */
< unsigned char qbf[NBAND];         /* band flushing backenable flags */
< int strscanflag;             /* true when strscan timeout is pending */
---
> volatile char qrunflag;      /* set iff queues are enabled */
> volatile char queueflag;     /* set iff inside queuerun() */
> struct queue *qhead = NULL;       /* head of queues to run */
> struct queue *qtail = NULL;       /* last queue */
> struct queue *scanqhead = NULL; /* list for msg consolidation feature */
> struct queue *scanqtail = NULL;  /* last queue */
> char strbcwait = 0;          /* bufcall functions waiting */
> char strbcflag = 0; /* bufcall functions ready to go */
> struct bclist strbcalls = {NULL};  /* list of waiting bufcalls */
> unsigned char qbf[NBAND] = {0};         /* band flushing backenable flags */
> int volatile strscanflag = 0;         /* true when strscan timeout is pending */
88,93c79
< STATIC struct seinfo Secache[SECACHE];        /* emergency cache of seinfo's           */
<                                   /* in case memory runs out      */
< STATIC struct seinfo *secachep;         /* cache list head              */
< struct strinfo Strinfo[NDYNAMIC];       /* dynamic resource info        */
< long Strcount;                          /* count of streams resources   */
<                                   /* in bytes                     */
---
> static struct seinfo Secache[SECACHE];  /* emergency cache of seinfo's          */
95c81,84
< extern ulong kmem_avail();
---
>  /* in case memory runs out          */
> static struct seinfo *secachep = NULL;  /* cache list head              */
> struct strinfo Strinfo[NDYNAMIC];       /* dynamic resource info        */
> volatile long Strcount = 0;  /* count of streams resources in bytes */
97,103c86
```

© COPYRIGHT 1994 AMDAHL CORPORATION

```
< static void adjfmtp();
< static void freeband();
< static int str2num();
< static void strgiveback();
< static void strqbuf();
< static void strunbcall();
< static void mux_rmvedge();
---
> /* Global variables */
104a88,99
> struct callo callout[CALLOUT_TBL_SIZE];
>
> /* Static functions */
>
> STATIC void adjfmtp();
> STATIC void freeband();
> STATIC int str2num();
> STATIC void strgiveback();
> STATIC void strqbuf();
> STATIC void strunbcall();
> STATIC void mux_rmvedge();
>
110,111c105
< void
< strinit()
---
> void strinit()
116a111,116
>
>       bzero((char *) &strst, sizeof(struct strstat));
>       bzero((char *) Strinfo, NDYNAMIC * sizeof(struct strinfo));
>
>       /* Standard strinit() */
>
126,127c126,127
<        * set up seinfo cache (if memory runs out, we need a few of
<        * these so things have a chance to recover)
---
>        * set up seinfo cache (if memory runs out, we need a few of these so
>        * things have a chance to recover)
139,140c139,140
<          (struct mux_node *)kmem_alloc((sizeof(struct mux_node) * cdevcnt),
<          KM_NOSLEEP)) == NULL)
---
>                 (struct mux_node *) kmem_alloc((sizeof(struct mux_node) * cdevcnt),
```

© COPYRIGHT 1994 AMDAHL CORPORATION

```
>                       KM_NOSLEEP)) == NULL)
150a151
>       queueflag = qrunflag = 0;       /* Clear all flags */
152d152
<       return;
155d154
<
160,161c159
< static void
< strgiveback()
---
> STATIC void strgiveback()
202,203d199
<
<
205,332d200
<  * Send SIGPOLL signal to all processes registered on the given signal
<  * list that want a signal for the specified event.  Always called at
<  * splstr().
<  */
< void
< strsendsig(siglist, event, data)
<       register struct strevent *siglist;
<       register event;
<       long data;
< {
<       struct strevent *sep;
<       k_siginfo_t info;
<
<       info.si_signo = SIGPOLL;
<       info.si_errno = 0;
<       for (sep = siglist; sep; sep = sep->se_next) {
<               if (sep->se_events & event) {
<                       switch (event) {
<                       case S_INPUT:
<                               info.si_code = POLL_IN;
<                               info.si_band = data;
<                               goto addq;
<
<                       case S_OUTPUT:
<                               info.si_code = POLL_OUT;
<                               info.si_band = data;
<                               goto addq;
<
<                       case S_HIPRI:
```

© COPYRIGHT 1994 AMDAHL CORPORATION

```
<                       info.si_code = POLL_PRI;
<                       info.si_band = 0;
<                       goto addq;
<
<               case S_MSG:
<                       info.si_code = POLL_MSG;
<                       info.si_band = data;
<                       goto addq;
<
<               case S_ERROR:
<                       info.si_code = POLL_ERR;
<                       info.si_band = 0;
<                       info.si_errno = (int)data;
<                       goto addq;
<
<               case S_HANGUP:
<                       info.si_code = POLL_HUP;
<                       info.si_band = 0;
< addq:
<                       sigaddq(sep->se_procp, &info, KM_NOSLEEP);
<
<               case S_RDBAND:
<                       if (sep->se_events & S_BANDURG) {
<                               psignal(sep->se_procp, SIGURG);
<                               break;
<                       }
<                       /* Fall through */
<
<               case S_RDNORM:
<               case S_WRBAND:
<                       psignal(sep->se_procp, SIGPOLL);
<                       break;
<
<               default:
<                       cmn_err(CE_PANIC,
<                           "strsendsig: unknown event %x\n", event);
<               }
<           }
<       }
< }
<
< /*
<  * Post the given ET_STREAM type event to the event queues
<  * on sd_eventlist.  The caller must splstr() before calling
<  * this routine.
```

© COPYRIGHT 1994 AMDAHL CORPORATION

```
<  */
< #ifdef GEM
< void
< strevpost(stp, event, data)
<       struct stdata *stp;
<       register int event;
<       long data;
< {
<       register struct strevent *sep;
<       extern ev_stream_post();
<
<       for (sep = stp->sd_eventlist; sep; sep = sep->se_next) {
<               if (sep->se_kmask & event) {
<                       if ((event & (S_INPUT|S_OUTPUT|S_MSG)) &&
<                           (sep->se_kband != (unchar)data))
<                               continue;
<                       (void) ev_stream_post(sep->se_vp, &sep->se_kecb,
<                           sep->se_pid, sep->se_hostid, sep->se_uid, event, data);
<               }
<       }
< }
<
< /*
<  * Post the given ET_DRIVER type event to the given event
<  * queue.  mp is an M_EVENT/M_PCEVENT message block pointer.
<  */
< void
< strdrpost(mp)
<       mblk_t *mp;
< {
<       evdr_t drev;
<       register struct str_evmsg *ep;
<
<       ASSERT((mp->b_datap->db_type  ==  M_EVENT)  ||  (mp->b_datap->db_type  =
M_PCEVENT));
<       ep = (struct str_evmsg *)mp->b_rptr;
<       drev.evdr_flags = ep->sv_flags;
<       drev.evdr_eid = ep->sv_eid;
<       drev.evdr_pri = ep->sv_evpri;
<       drev.evdr_hostid = ep->sv_hostid;
<       drev.evdr_pid = ep->sv_pid;
<       drev.evdr_uid = ep->sv_uid;
<       if (mp->b_cont) {
<               drev.evdr_flags &= ~EF_QUICKD;
<               drev.evdr_datasize = mp->b_cont->b_wptr - mp->b_cont->b_rptr;
```

© COPYRIGHT 1994 AMDAHL CORPORATION

```
<               drev.evdr_data = (char *)mp->b_cont->b_rptr;
<       } else {
<               drev.evdr_flags |= EF_QUICKD;
<               drev.evdr_datasize = EV_MAXQD;
<               drev.evdr_data = (char *)ep->sv_event;
<       }
<       ev_dr_post(ep->sv_vp, &drev);
< }
< #endif /* GEM */
< /*
339,340c207
< int
< qattach(qp, devp, flag, table, idx, crp)
---
> int qattach(qp, devp, flag, table, idx, crp)
386,389c253,255
<        * Open the attached module or driver.
<        * The open may sleep, but it must always return here.  Therefore
<        * all sleeps must set PCATCH or ignore all signals to avoid a
<        * longjmp if a signal arrives.
---
>        * Open the attached module or driver. The open may sleep, but it
>        * must always return here.  Therefore all sleeps must set PCATCH or
>        * ignore all signals to avoid a longjmp if a signal arrives.
392,396c258,259
<               extern void gen_setup_idinfo();
<
<               gen_setup_idinfo(crp);
<               if ((cmpdev(odev) == NODEV) || ((*rq->q_qinfo->qi_qopen)(rq,
<                   cmpdev(odev), flag, sflg) == OPENFAIL)) {
---
>               if ((cmpdev(odev) == NODEV) || ((*rq->q_qinfo->qi_qopen) (rq,
>                                   cmpdev(odev), flag, sflg) == OPENFAIL)) {
399c262
<                       if ((error = u.u_error) == 0)          /* XXX */
---
>                       if ((error = get_uerror()) == 0)
409,410c272
<               idx = getmajor(*devp);
<               if ((table == CDEVSW) && (idx != getmajor(odev))) {
---
>               if ((table == CDEVSW) && ((idx = getmajor(*devp)) != getmajor(odev))) {
431,432c293
< void
< qdetach(qp, clmode, flag, crp)
```

© COPYRIGHT 1994 AMDAHL CORPORATION

```
---
> void qdetach(qp, clmode, flag, crp)
447,450c308
<                       extern void gen_setup_idinfo();
<
<                       gen_setup_idinfo(crp);
<                       (*qp->q_qinfo->qi_qclose)(qp, flag);
---
>                       (*qp->q_qinfo->qi_qclose) (qp, flag);
476d333
<
490,491c347,348
< void
< strscan() {
---
> void strscan()
> {
500,501c357
< void
< strtime(stp)
---
> void strtime(stp)
519,520c375
< void
< str2time(stp)
---
> void str2time(stp)
538,539c393
< void
< str3time(stp)
---
> void str3time(stp)
552,553c406
< int
< putiocd(bp, ebp, arg, copymode, flag, fmt)
---
> int putiocd(bp, ebp, arg, flag, fmt)
557d409
<       int copymode;
571a424
>
587,592c440,441
<               error = strcopyin((char *)arg, tmp->b_wptr, n, fmt, copymode);
<               if (error) {
<                       freeb(tmp);
```

© COPYRIGHT 1994 AMDAHL CORPORATION

```
<                       return (error);
<               }
<               if (fmt && (count > MAXIOCBSZ) && (copymode == U_TO_K))
---
>               bcopy((char *) arg, tmp->b_wptr, n);
>               if (fmt && (count > MAXIOCBSZ))
616,617c465
< int
< getiocd(bp, arg, copymode, fmt)
---
> int getiocd(bp, arg, fmt)
620d467
<       int copymode;
624d470
<       int error;
636,639c482,483
<               error = strcopyout(bp->b_rptr, arg, n, fmt, copymode);
<               if (error)
<                       return (error);
<               if (fmt && bp->b_cont && (copymode == U_TO_K))
---
>               bcopy(bp->b_rptr, arg, n);
>               if (fmt && bp->b_cont)
653,654c497
< struct linkinfo *
< alloclink(qup, qdown, fpdown)
---
> struct linkinfo *alloclink(qup, qdown, vpdown)
656c499
<       file_t *fpdown;
---
>       struct vnode *vpdown;
660d502
<       ulong rand;
672,678c514,515
<        * Assign link id, being careful to watch out
<        * for wrap-around leading to id clashes.  Unlike
<        * ioctl ids, link ids can be long-lived.
<        * If we're concerned about covert channels, start the id search
<        * at a random place rather than where the previous search stopped.
<        * If the random() routine is stubbed out, it will return 0,
<        * in which case we want to revert to the sequential method.
---
>        * Assign link id, being careful to watch out for wrap-around leading
>        * to id clashes.  Unlike ioctl ids, link ids can be long-lived.
```

© COPYRIGHT 1994 AMDAHL CORPORATION

```
680,682d516
<	if (mac_installed && (rand = random((ulong)INT_MAX)) != 0)
<		lnk_id = (int)rand;
<
687c521,522
<		for (lp = (struct linkinfo *)Strinfo[DYN_LINKBLK].sd_head; lp; lp = lp->li_next)
---
>		for (lp = (struct linkinfo *) Strinfo[DYN_LINKBLK].sd_head; lp;
>		    lp = lp->li_next)
692c527
<	linkp->li_fpdown = fpdown;
---
>	linkp->li_vpdown = vpdown;
708,709c543
< void
< lbfree(linkp)
---
> void lbfree(linkp)
719,720c553
<	}
<	else {
---
>	} else {
738,739c571
< int
< linkcycle(upstp, lostp)
---
> int linkcycle(upstp, lostp)
748,753d579
<	/*
<	 * if the lower stream is a pipe/FIFO, return, since link
<	 * cycles can not happen on pipes/FIFOs
<	 */
<	if (lostp->sd_vnode->v_type == VFIFO)
<		return(0);
765a592
>			MUX_VISIT(np);
767d593
<				MUX_VISIT(np);
773d598
<			MUX_VISIT(np);
795,796c620
< struct linkinfo *
< findlinks(stp, index, type)
---
```

© COPYRIGHT 1994 AMDAHL CORPORATION

```
> struct linkinfo *findlinks(stp, index, type)
815c639
<               mnp = &mux_nodes[getmajor(stp->sd_vnode->v_rdev)];
---
>               mnp = &mux_nodes[getmajor(stp->sd_vnode->dev)];
837,838c661
< queue_t *
< getendq(q)
---
> queue_t *getendq(q)
849c672
<  * link, fpdown is the file pointer for the lower stream, and
---
>  * link, and
852,853c675
< int
< munlink(stp, linkp, flag, crp, rvalp)
---
> int munlink(stp, linkp, flag, crp, rvalp)
864a687
>       struct linkblk prv_linkblk;
872,874d694
<       strioc.ic_dp = (char *)&linkp->li_lblk;
<
<       error = strdoioctl(stp, &strioc, NULL, K_TO_K, STRLINK, crp, rvalp);
877,879c697,698
<        * If there was an error and this is not called via strclose,
<        * return to the user.  Otherwise, pretend there was no error
<        * and close the link.
---
>        * Check whether the link was initiated by a remote host. If yes, use
>        * remote id for unlink ioctl (DSF modification).
880a700,713
>       if (linkp->li_lblk.l_rem_linkid) {
>               bcopy((char *) linkp, (char *) &prv_linkblk, sizeof(struct linkblk));
>               prv_linkblk.l_index = linkp->li_lblk.l_rem_linkid;
>               strioc.ic_dp = (char *) &prv_linkblk;
>       } else
>               strioc.ic_dp = (char *) &linkp->li_lblk;
>
>       error = strdoioctl(stp, &strioc, NULL, STRLINK, crp, rvalp);
>
>       /*
>        * If there was an error and this is not called via strclose, return
>        * to the user.  Otherwise, pretend there was no error and close the
```

© COPYRIGHT 1994 AMDAHL CORPORATION

```
>        * link.
>        */
885c718,719
<                       stp->sd_flag &= ~(STRDERR|STWRERR); /* allows strdoioctl() to work */
---
>                       stp->sd_flag &= ~(STRDERR | STWRERR);      /* allows strdoioctl()
>                                                                   * to work */
890,891c724
<
<       stpdown = linkp->li_fpdown->f_vnode->v_stream;
---
>       stpdown = linkp->li_vpdown->v_stream;
897,899c730,733
<       setq(rq, &strdata, &stwdata);
<       rq->q_ptr = WR(rq)->q_ptr = (caddr_t)stpdown;
<       closef(linkp->li_fpdown);
---
>       setq(rq, linkp->li_vpdown->strhinfo->st_rdinit,
>            linkp->li_vpdown->strhinfo->st_wrinit);
>       rq->q_ptr = WR(rq)->q_ptr = (caddr_t) stpdown;
>       closevp(linkp->li_vpdown, crp);
908,909c742
< int
< munlinkall(stp, flag, crp, rvalp)
---
> int munlinkall(stp, flag, crp, rvalp)
931,932c764
< int
< mux_addedge(upstp, lostp, muxid)
---
> int mux_addedge(upstp, lostp, muxid)
942,943c774,775
<       upmaj = getmajor(upstp->sd_vnode->v_rdev);
<       lomaj = getmajor(lostp->sd_vnode->v_rdev);
---
>       upmaj = getmajor(upstp->sd_vnode->dev);
>       lomaj = getmajor(lostp->sd_vnode->dev);
971,972c803
< static void
< mux_rmvedge(upstp, muxid)
---
> STATIC void mux_rmvedge(upstp, muxid)
981c812
<       upmaj = getmajor(upstp->sd_vnode->v_rdev);
---
```

© COPYRIGHT 1994 AMDAHL CORPORATION

```
>       upmaj = getmajor(upstp->sd_vnode->dev);
1004,1005c835
< void
< setq(rq, rinit, winit)
---
> void setq(rq, rinit, winit)
1030,1031c860
< int
< strmakemsg(mctl, count, uiop, stp, flag, mpp)
---
> int strmakemsg(mctl, count, buff, stp, flag, mpp)
1034c863
<       struct uio *uiop;
---
>       char *buff;
1042c871
<       int pri;
---
>       int pri = BPRI_MED;
1044,1045c873
<       int wroff = (int)stp->sd_wroff;
<       int offlg = 0;
---
>       int wroff = (int) stp->sd_wroff;
1046a875
>       int mode = stp->sd_vnode->flag;
1049,1052c878,883
<       if (flag & RS_HIPRI)
<               pri = BPRI_MED;
<       else
<               pri = BPRI_LO;
---
> /*  Priorities are ignored in SVR4 */
> /*  if (flag & RS_HIPRI)
>  *   pri = BPRI_MED;
>  *  else
>  *   pri = BPRI_LO;
>  */
1080c911
<                       if (uiop->uio_fmode  & (FNDELAY|FNONBLOCK))
---
>                       if (mode & (FNDELAY | FNONBLOCK))
1087,1090c918
<               if (copyin(base, (caddr_t) bp->b_wptr, ctlcount)) {
<                       freeb(bp);
```

© COPYRIGHT 1994 AMDAHL CORPORATION

```
<                       return (EFAULT);
<               }
---
>               bcopy(base, (caddr_t) bp->b_wptr, ctlcount);
1092,1102d919
<               /*
<                * We could have slept copying in user pages.
<                * Recheck the stream head state (the other end
<                * of a pipe could have gone away).
<                */
<               if (stp->sd_flag & (STRHUP|STWRERR|STPLEX)) {
<                       error = ((stp->sd_flag & STPLEX) ? EINVAL :
<                           stp->sd_werror);
<                       freeb(bp);
<                       return (error);
<               }
1113c930
<               size = count + (offlg ? 0 : wroff);
---
>               size = count + wroff;
1115c932
<                       if (uiop->uio_fmode  & (FNDELAY|FNONBLOCK))
---
>                       if (mode & (FNDELAY | FNONBLOCK))
1122,1145c939
<               if (wroff && !offlg++ &&
<                   (wroff < bp->b_datap->db_lim - bp->b_wptr)) {
<                       bp->b_rptr += wroff;
<                       bp->b_wptr += wroff;
<               }
<               if ((size = MIN(count, bp->b_datap->db_lim - bp->b_wptr)) &&
<                   (error = uiomove((caddr_t)bp->b_wptr, size, UIO_WRITE, uiop))) {
<                       freeb(bp);
<                       freemsg(mp);
<                       return (error);
<               }
<
<               /*
<                * We could have slept copying in user pages.
<                * Recheck the stream head state (the other end
<                * of a pipe could have gone away).
<                */
<               if (stp->sd_flag & (STRHUP|STWRERR|STPLEX)) {
<                       error = ((stp->sd_flag & STPLEX) ? EINVAL :
<                           stp->sd_werror);
```

© COPYRIGHT 1994 AMDAHL CORPORATION

```
<                       freeb(bp);
<                       freemsg(mp);
<                       return (error);
<               }
---
>               bp->b_rptr += wroff;
1147c941,942
<               count -= size;
---
>               bcopy(buff, bp->b_rptr, count);
>
1162,1163c957
< int
< strwaitbuf(size, pri)
---
> int strwaitbuf(size, pri)
1167a962
>       register proc_t *pp;
1168a964,965
>       if ((pp = get_procp()) == NULL)
>               return EINVAL;
1170c967
<       if (!bufcall(size, pri, setrun, u.u_procp)) {
---
>       if (!bufcall(size, pri, setrun, (long) pp)) {
1174,1175c971,972
<       if (sleep((caddr_t)&(u.u_procp->p_flag), STOPRI|PCATCH)) {
<               strunbcall(size, u.u_procp);
---
>       if (sleep((caddr_t) & (pp->p_stat), STOPRI | PCATCH)) {
>               strunbcall(size, pp);
1179c976
<       strunbcall(size, u.u_procp);
---
>       strunbcall(size, pp);
1188,1189c985
< static void
< strunbcall(size, p)
---
> STATIC void strunbcall(size, p)
1220a1017
>  * It is always called at splstr().
1222,1223c1019
< int
< strwaitq(stp, flag, count, fmode, done)
```

© COPYRIGHT 1994 AMDAHL CORPORATION

```
---
> int strwaitq(stp, flag, count, fmode, done)
1230d1025
<       register int s;
1244d1038
<
1258d1051
<                               s = splstr();
1260c1053
<                                   stp);
---
>                                     (long) stp);
1262d1054
<                                       splx(s);
1283a1074
>
1289,1290c1080
<                       if (qready())
<                               runqueues();
---
>
1312,1313c1102
<
<       s = splstr();
---
>
1317d1105
<               splx(s);
1324d1111
<       splx(s);
1334,1335c1121
< static int
< str2num(str)                  /* string to number, updating pointer */
---
> STATIC int str2num(str)       /* string to number, updating pointer */
1349,1350c1135
< static void
< adjfmtp(str, bp, bytes)
---
> STATIC void adjfmtp(str, bp, bytes)
1380,1381c1165
<                               while (*addr++)
<                                       ;
---
>                               while (*addr++);
```

© COPYRIGHT 1994 AMDAHL CORPORATION

```
1393,1394c1177
< static void
< strqbuf(stp)
---
> STATIC void strqbuf(stp)
1398c1181
<
---
>
1408,1471d1190
<  * Perform job control discipline access checks.
<  * Return 0 for success and the errno for failure.
<  */
<
< #define cantsend(pp,sig) \
<       (sigismember(&pp->p_ignore,sig) || sigismember(&pp->p_hold,sig))
<
< int
< straccess(stp, mode)
<       struct stdata *stp;
<       enum jcaccess mode;
< {
<       register proc_t *pp;
<       register sess_t *sp;
<
<       pp = u.u_procp;
<       sp = pp->p_sessp;
<
<       for (;;) {
<
<               /*
<                * if this is not the calling process's controlling terminal
<                * or this is a FIFO or the calling process is
<                * already in the foreground then allow access
<                */
<
<               if (sp->s_dev != stp->sd_vnode->v_rdev
<                 || stp->sd_vnode->v_type == VFIFO
<                 || pp->p_pgidp == stp->sd_pgidp)
<                       return 0;
<
<               /*
<                * check to see if controlling terminal has been deallocated
<                */
<
```

© COPYRIGHT 1994 AMDAHL CORPORATION

```
<               if (sp->s_vp == NULL) {
<                       if (cantsend(pp,SIGHUP))
<                               return EIO;
<                       pgsignal(pp->p_pgidp, SIGHUP);
<               }
<
<               else if (mode == JCGETP)
<                       return 0;
<
<               else if (mode == JCREAD) {
<                       if (cantsend(pp,SIGTTIN) || pp->p_detached)
<                               return EIO;
<                       pgsignal(pp->p_pgidp,SIGTTIN);
<               }
<
<               else {  /* mode == JCWRITE or JCSETP */
<                       if (mode == JCWRITE && !(stp->sd_flag & STRTOSTOP)
<                         || cantsend(pp,SIGTTOU))
<                               return 0;
<                       if (pp->p_detached)
<                               return EIO;
<                       pgsignal(pp->p_pgidp, SIGTTOU);
<               }
<
<               (void) sleep((caddr_t)&lbolt, STIPRI);
<       }
< }
<
< /*
1476,1477c1195
< int
< xmsgsize(mp, fromhead)
---
> int xmsgsize(mp, fromhead)
1499,1500c1217
<               for (bp = mp; bp->b_cont; bp = bp->b_cont)
<                       ;
---
>               for (bp = mp; bp->b_cont; bp = bp->b_cont);
1506,1507c1223
<                       for (bp = mp; bp->b_cont != endbp; bp = bp->b_cont)
<                               ;
---
>                       for (bp = mp; bp->b_cont != endbp; bp = bp->b_cont);
1522,1523c1238
```

© COPYRIGHT 1994 AMDAHL CORPORATION

```
< struct stdata *
< shalloc(qp)
---
> struct stdata *shalloc(qp)
1553,1554c1268
< void
< shfree(stp)
---
> void shfree(stp)
1566,1567c1280
<       }
<       else {
---
>       } else {
1581,1582d1293
<
<
1588,1589c1299
< struct msgb *
< xmsgalloc()
---
> struct msgb *xmsgalloc()
1606,1608d1315
<
<
<
1614,1615c1321
< struct mdbblock *
< xmdballoc()
---
> struct mdbblock *xmdballoc()
1624d1329
<
1636,1637c1341
< queue_t *
< allocq()
---
> queue_t *allocq()
1702,1703c1410
< void
< freeq(qp)
---
> void freeq(qp)
1729,1730c1436
<       }
```

© COPYRIGHT 1994 AMDAHL CORPORATION

```
<       else {
---
>       } else {
1747,1748c1453
< qband_t *
< allocband()
---
> qband_t *allocband()
1772,1773c1477
< static void
< freeband(qbp)
---
> STATIC void freeband(qbp)
1785,1786c1489
<       }
<       else {
---
>       } else {
1801,1802c1504
< struct strevent *
< sealloc(slpflag)
---
> struct strevent *sealloc(slpflag)
1815,1816c1517
<       }
<       else if (sep = (struct seinfo *) kmem_zalloc(sizeof(struct seinfo), slpflag)) {
---
>       } else if (sep = (struct seinfo *) kmem_zalloc(sizeof(struct seinfo), slpflag)) {
1819,1820c1520
<       }
<       else {
---
>       } else {
1851,1852c1551
< void
< sefree(sep)
---
> void sefree(sep)
1864,1865c1563
<       }
<       else {
---
>       } else {
1874,1875c1572
<       }
```

© COPYRIGHT 1994 AMDAHL CORPORATION

```
<       else {
---
>       } else {
1895,1896c1592
< void
< queuerun()
---
> void queuerun()
1918,1919c1614,1615
<                       } else  {
<                               spl1();
---
>                       } else {
>                               spl0();
1937a1634
>
1951,1952c1648,1649
<                               }
<                               else {
---
>                               } else {
>
1965a1663
>
1980c1677
<                               spl1();
---
>                               spl0();
2007d1704
<
2013,2032d1709
<  * Function to kick off queue scheduling for those system calls
<  * that cause queues to be enabled (read, recv, write, send, ioctl).
<  */
< void
< runqueues()
< {
<       register s;
<
<       s = splhi();
<       if (qrunflag && !queueflag) {
<               queueflag = 1;
<               splx(s);
<               queuerun();
<               queueflag = 0;
```

© COPYRIGHT 1994 AMDAHL CORPORATION

```
<               return;
<       }
<       splx(s);
< }
<
< /*
2038,2039c1715
< int
< findmod(name)
---
> int findmod(name)
2059,2060c1735
< void
< setqback(q, pri)
---
> void setqback(q, pri)
2076c1751
<                                       "setqback: can't allocate qband\n");
---
>                                        "setqback: can't allocate qband\n");
2095,2103d1769
< int
< strcopyin(from, to, len, fmt, copyflag)
<       caddr_t from;
<       caddr_t to;
<       unsigned int len;
<       char *fmt;
<       int copyflag;
< {
<       int error = 0;
2105,2199d1770
<       if (copyflag == U_TO_K) {
<               if (ncopyin(from, to, len, fmt))
<                       return (EFAULT);
<       } else {
<               ASSERT(copyflag == K_TO_K);
<               bcopy(from, to, len);
<       }
<       return (0);
< }
<
< int
< strcopyout(from, to, len, fmt, copyflag)
<       caddr_t from;
<       caddr_t to;
```

© COPYRIGHT 1994 AMDAHL CORPORATION

```
<       unsigned int len;
<       char *fmt;
<       int copyflag;
< {
<       int error = 0;
<
<       if (copyflag == U_TO_K) {
<               if (ncopyout(from, to, len, fmt))
<                       return (EFAULT);
<       } else {
<               ASSERT(copyflag == K_TO_K);
<               bcopy(from, to, len);
<       }
<       return (0);
< }
<
< void
< strsignal(stp, sig, band)
<       struct stdata *stp;
<       int sig;
<       long band;
< {
<       register int s;
<
<       switch (sig) {
<       case SIGPOLL:
<               s = splstr();
<               if (stp->sd_sigflags & S_MSG)
<                       strsendsig(stp->sd_siglist, S_MSG, band);
< #ifdef GEM
<               if (stp->sd_eventflags & S_MSG)
<                       strevpost(stp, S_MSG, band);
< #endif /* GEM */
<               splx(s);
<               break;
<
<       default:
<               if (stp->sd_pgidp)
<                       pgsignal(stp->sd_pgidp, sig);
<               break;
<       }
< }
<
< strhup(stp)
<       struct stdata *stp;
```

© COPYRIGHT 1994 AMDAHL CORPORATION

```
< {
<       int s;
<
<       s = splstr();
<       if (stp->sd_sigflags & S_HANGUP)
<               strsendsig(stp->sd_siglist, S_HANGUP, 0L);
<       pollwakeup(&stp->sd_pollist, POLLHUP);
< #ifdef GEM
<       if (stp->sd_eventflags & S_HANGUP)
<               strevpost(stp, S_HANGUP, 0L);
< #endif /* GEM */
<       splx(s);
< }
<
< strallocctty(sp, stp)
<       register sess_t *sp;
<       register struct stdata *stp;
< {
<       stp->sd_sidp = sp->s_sidp;
<       stp->sd_pgidp = sp->s_sidp;
<       PID_HOLD(stp->sd_pgidp);
<       PID_HOLD(stp->sd_sidp);
< }
<
< strfreectty(stp)
<       register struct stdata *stp;
< {
<       pgsignal(stp->sd_pgidp, SIGHUP);
<       PID_RELE(stp->sd_pgidp);
<       PID_RELE(stp->sd_sidp);
<       stp->sd_pgidp = NULL;
<       stp->sd_sidp = NULL;
<       if (! (stp->sd_flag & STRHUP) )
<               strhup(stp);
< }
<
2203,2204c1774
< void
< strpunlink(crp)
---
> void strpunlink(crp)
2208c1778
<       struct shinfo  *shp;
---
>       struct shinfo *shp;
```

© COPYRIGHT 1994 AMDAHL CORPORATION

```
2209a1780
>
2211,2213c1782,1783
<        * for each allocated stream head, call munlinkall()
<        * with flag of LINKPERSIST to unlink any/all persistant
<        * links for the device.
---
>        * for each allocated stream head, call munlinkall() with flag of
>        * LINKPERSIST to unlink any/all persistant links for the device.
2217,2218c1787
<       while(shp)
<       {
---
>       while (shp) {
2225,2228c1794,1799
< int
< strctty(pp, stp)
<       register proc_t *pp;
<       register struct stdata *stp;
---
>
> /*
>  * Task to process STREAMS queues
>  */
>
> void streams_task()
2230,2232c1801
<       register int s;
<       register sess_t *sp = pp->p_sessp;
<       extern vnode_t *makectty();
---
>       volatile short s;
2234,2242c1803,1828
<       if ((stp->sd_flag & (STRHUP|STRDERR|STWRERR|STPLEX)) == 0
<         && stp->sd_sidp == NULL              /* not allocated as ctty */
<         && sp->s_sidp == pp->p_pidp          /* session leader */
<         && sp->s_vp == NULL) {               /* without ctty */
<               ASSERT(stp->sd_pgidp == NULL);
<               allocctty(pp, makectty(stp->sd_vnode));
<               strallocctty(sp, stp);
<               s = splstr();
<               stp->sd_flag |= STRISTTY;  /* just to be sure */
---
>       rts_strace();
>       s = splstr();
```

© COPYRIGHT 1994 AMDAHL CORPORATION

```
>       for (;;) {
>               if (qrunflag) {
>                       queueflag = 1;
>                       fsplx(s);
>                       queuerun();
>                       (void) splhi();
>                       queueflag = 0;
>                       APPL_POLL
>               } else
>                       sleep((caddr_t)&qrunflag, 0);
>       }
> }
>
> /*
>  * runqueues - Check whether STREAMS queues should be run
>  */
>
> void runqueues()
> {
>       register s;
>
>       s = splhi();
>       if (qrunflag && !queueflag) {
>               queueflag = 1;
2244c1830,1833
<               return (1);
---
>               queuerun();
>               (void) splhi();
>               queueflag = 0;
>               APPL_POLL
2246c1835
<       return (0);
---
>       splx(s);
```

© COPYRIGHT 1994 AMDAHL CORPORATION

```
22,26d27
< /* codes for where output should go */
<
< #define     PRW_BUF          0x01   /* output to putbuf */
< #define     PRW_CONS    0x02   /* output to console */
<
29,30d29
< extern char *panicstr;             /* panic string pointer */
```

© COPYRIGHT 1994 AMDAHL CORPORATION

```
13c22,24
< #ident	"@(#)uts-3b2:io/conf.h	1.4"
---
> #include <sys/stream.h>
> #include <sys/types.h>
> #include <sys/devlist.h>
16,17c27
<  * Declaration of block device switch. Each entry (row) is
<  * the only link between the main unix code and the driver.
---
>  * Character device switch.
19,28d28
< struct bdevsw {
<	int	(*d_open)();
<	int	(*d_close)();
<	int	(*d_strategy)();
<	int	(*d_print)();
<	int	(*d_size)();
<	int	(*d_xpoll)();
<	int	(*d_xhalt)();
<	int	*d_flag;
< };
30c30
< extern struct bdevsw bdevsw[];
---
> #define DRIVER_NAME_LENGTH 12
32,34d31
< /*
<  * Character device switch.
<  */
36,48c33,39
<	int	(*d_open)();
<	int	(*d_close)();
<	int	(*d_read)();
<	int	(*d_write)();
<	int	(*d_ioctl)();
<	int	(*d_mmap)();
<	int	(*d_segmap)();
<	int	(*d_poll)();
<	int	(*d_xpoll)();
<	int	(*d_xhalt)();
<	struct tty *d_ttys;
<	struct streamtab *d_str;
<	int	*d_flag;
---
```

© COPYRIGHT 1994 AMDAHL CORPORATION

```
>     char driver_name[DRIVER_NAME_LENGTH];
>     struct streamtab *d_str;
>     int *d_flag;
>     void (*drvinit)(); /* Driver init routine called at initialization */
>     int (*drvstart)(); /* Driver start routine called at initialization after
>                         * after init routines have been executed.
>                         */
62,66d52
<  * Added for UFS.
<  */
< #define D_SEEKNEG      0x04   /* negative seek offsets are OK */
< #define D_TAPE         0x08   /* magtape device (no bdwrite when cooked) */
< /*
74,75c60,61
< #define D_NOSPECMACDATA    0x40   /* no MAC access check for data transfer */
<                                 /* and no inode access time change */
---
> #define D_NOSPECMACDATA    0x40   /* no MAC access check for data transfer */
>  /* and no inode access time change */
82,84c68,74
<       char    f_name[FMNAMESZ+1];
<       struct  streamtab *f_str;
<       int     *f_flag;        /* same as device flag */
---
>     char f_name[FMNAMESZ + 1];
>     struct streamtab *f_str;
>     int *f_flag;        /* same as device flag */
>     void (*modinit)();  /* Module init routine called at initialization */
>     int (*modstart)(); /* Module start routine, called after all driver start
>                         * routines have been called.
>                         */
88d77
< extern int    bdevcnt;
92,105c81
< /*
<  * Line discipline switch.
<  */
< struct linesw {
<       int     (*l_open)();
<       int     (*l_close)();
<       int     (*l_read)();
<       int     (*l_write)();
<       int     (*l_ioctl)();
<       int     (*l_input)();
<       int     (*l_output)();
```

© COPYRIGHT 1994 AMDAHL CORPORATION

```
<       int     (*l_mdmint)();
< };
< extern struct linesw linesw[];
---
> #ifdef __STDC__
107,116c83,86
< extern int    linecnt;
< /*
<  * Terminal switch
<  */
< struct termsw {
<       int     (*t_input)();
<       int     (*t_output)();
<       int     (*t_ioctl)();
< };
< extern struct termsw termsw[];
---
> extern int conf_major(char *name);
> extern dev_t get_dev(char *dev_name);
> extern int configure(struct devicelist *devicelist, int length);
> void init_conf(void);
118c88,95
< extern int    termcnt;
---
> #else
> extern int conf_major();
> extern dev_t get_dev();
> extern int configure();
> void init_conf();
>
> #endif /* __STDC__ */
```

© COPYRIGHT 1994 AMDAHL CORPORATION

```
0a1,6
> /* File: cred.h - last edit:
>  * helge     Tue Jan  7 15:09:25 1992
>  *
>  * Copyright (c) 1991 by Amdahl Corporation. All rights reserved.
>  */
>
43c49
< #ifdef _KERNEL
---
> #include <sys/types.h>     /* REQUIRED */
45,50d50
< #ifndef _UTIL_TYPES_H
< #include <util/types.h>     /* REQUIRED */
< #endif
<
< #endif /* _KERNEL */
<
72c72
< #define CR_MLDREAL 0x00000001 /* indicates proc is in "real" MLD mode */
---
> #define CR_MLDREAL 0x00000001 /* indicates proc is in "real" MLD mode */
74c74
< #ifdef _KERNEL
---
>
76,77d75
< #define      crhold(cr)       (cr)->cr_ref++
<
82,88d79
< extern void cred_init(void);
< extern void crfree(cred_t *);
< extern cred_t *crget(void);
< extern cred_t *crcopy(cred_t *);
< extern cred_t *crdup(cred_t *);
< extern cred_t *crgetcred(void);
< extern size_t crgetsize(void);
90,91c81
< extern int groupmember(gid_t, cred_t *);
< extern int hasprocperm(cred_t *, cred_t *);
---
> extern int suser(cred_t *);
95,101d84
< extern void cred_init();
< extern void crfree();
```

© COPYRIGHT 1994 AMDAHL CORPORATION

```
< extern cred_t *crget();
< extern cred_t *crcopy();
< extern cred_t *crdup();
< extern cred_t *crgetcred();
< extern size_t crgetsize();
103,104c86
< extern int groupmember();
< extern int hasprocperm();
---
> extern int suser();
106d87
<
109,110d89
<
< #endif
```

© COPYRIGHT 1994 AMDAHL CORPORATION

```
1,3c1,5
< /*   Copyright (c) 1990 UNIX System Laboratories, Inc.   */
< /*   Copyright (c) 1984, 1986, 1987, 1988, 1989, 1990 AT&T     */
< /*     All Rights Reserved           */
---
> /* File: ddi.h - last edit:
>  * helge     Thu Jan 23 11:42:31 1992
>  *
>  * Copyright (c) 1991 by Amdahl Corporation. All rights reserved.
>  */
5,8d6
< /*   THIS IS UNPUBLISHED PROPRIETARY SOURCE CODE OF        */
< /*   UNIX System Laboratories, Inc.                 */
< /*   The copyright notice above does not evidence any       */
< /*   actual or intended publication of such source code.     */
10,11c8,9
< #ifndef _IO_DDI_H          /* wrapper symbol for kernel use */
< #define _IO_DDI_H          /* subject to change without notice */
---
> #ifndef _SYS_DDI_H
> #define _SYS_DDI_H
13c11
< #ident       "@(#)uts-3b2:io/ddi.h  1.4"
---
> #include <sys/types.h>
15,53d12
< #ifdef _KERNEL
<
< #ifndef _UTIL_TYPES_H
< #include <util/types.h>     /* REQUIRED */
< #endif
<
< #ifdef DDI_OFF
< #include <proc/user.h>
< #include <io/mkdev.h>
< #include <svc/time.h>
< /* #include <svc/systm.h> */
< #include <util/sysmacros.h>
< #include <util/sysinfo.h>
< #endif
<
< #endif /* _KERNEL */
<
< /*
<  * ddi.h -- the flag and function definitions needed by DDI-conforming
```

© COPYRIGHT 1994 AMDAHL CORPORATION

```
<  * drivers.  This header file contains #undefs to undefine macros that
<  * drivers would otherwise pick up in order that function definitions
<  * may be used. Programmers should place the include of "sys/ddi.h"
<  * after any header files that define the macros #undef'ed or the code
<  * may compile incorrectly.
<  */
<
< /*
<  * define min() and max() as macros so that drivers will not pick up the
<  * min() and max() kernel functions since they do unsigned comparison only.
<  */
< #define min(a, b)    ((a) < (b) ? (a) : (b))
< #define max(a, b)    ((a) < (b) ? (b) : (a))
<
< /*
<  * The following macros designate a kernel parameter for drv_getparm
<  * and drv_setparm. Implementation-specific parameter defines should
<  * start at 100.
<  */
< #ifndef DDI_OFF
55,65c14,17
< #define      UPROCP        2
< #define      PPGRP         3
< #define      LBOLT         4
< #define      SYSRINT       5
< #define      SYSXINT       6
< #define      SYSMINT       7
< #define      SYSRAWC       8
< #define      SYSCANC       9
< #define      SYSOUTC       10
< #define      PPID   11
< #define      PSID   12
---
> #define      PPGRP         2
> #define      LBOLT         3
> #define      PPID   4
> #define      PSID   5
67,69c19
< extern int drv_getparm();
< extern int drv_setparm();
< #endif
---
> #ifdef __STDC__
71,73c21,26
< #ifndef NMAJORENTRY
```

© COPYRIGHT 1994 AMDAHL CORPORATION

```
< #define NMAJORENTRY   256
< #endif
---
> extern int drv_getparm(unsigned long parm, unsigned long *valuep);
> extern clock_t drv_usectohz(clock_t usec);
> extern void drv_usecwait(clock_t usec);
> extern void set_uerror(int);
> extern int get_uerror(void);
> extern int etoimajor(major_t);
75,76c28
< extern int drv_getevtoken();
< extern void drv_relevtoken();
---
> #else
78,79c30
< extern void drv_usecwait();
< extern clock_t drv_hztousec();
---
> extern int drv_getparm();
81,84c32,34
<
< /* convert internal to extern major number */
< extern int itoemajor();
< /* convert external to internal major number */
---
> extern void drv_usecwait();
> extern void set_uerror();
> extern in get_uerror();
87,88c37
< extern u_int hat_getkpfnum();
< extern u_int hat_getppfnum();
---
> #endif /* __STDC__ */
90,95c39
< /* The following declaration takes the place of an inline function
<  * defined in sys/inline.h .
<  */
< #ifndef DDI_OFF
< extern paddr_t kvtophys();
< #endif
---
> #endif /* _SYS_DDI_H */
97,246d40
< #ifdef _KERNEL
<
```

© COPYRIGHT 1994 AMDAHL CORPORATION

```
< #ifndef _FS_BUF_H
< #include <fs/buf.h>        /* COMPATIBILITY */
< #endif
< #ifndef _IO_UIO_H
< #include <io/uio.h>        /* COMPATIBILITY */
< #endif
<
< #else
<
< #include     <sys/buf.h> /* COMPATIBILITY */
< #include     <sys/uio.h> /* COMPATIBILITY */
<
< #endif /* _KERNEL */
<
< #if defined(__STDC__)
< extern int physiock(void(*)(), struct buf*, dev_t, int, daddr_t, struct uio*);
< extern int drv_priv(struct cred *);
< #else
< extern int drv_priv();
< extern int physiock();
< #endif
<
< /* The following declarations take the place of macros in
<  * sysmacros.h The undefs are for any case where a driver includes
<  * sysmacros.h, even though DDI conforming drivers must not.
<  */
< #ifndef DDI_OFF
<
< #undef getemajor
< #undef geteminor
< #undef getmajor
< #undef getminor
< #undef makedevice
< #undef cmpdev
< #undef expdev
<
< extern major_t getemajor();
< extern minor_t geteminor();
< extern major_t getmajor();
< extern minor_t getminor();
< extern dev_t makedevice();
< extern dev_t cmpdev();
< extern dev_t expdev();
<
< /* The following macros from param.h are also being converted to
```

© COPYRIGHT 1994 AMDAHL CORPORATION

```
<  * functions and #undefs must be done here as well since param.h
<  * will be included by most if not every driver
<  */
<
< #undef btop
< #undef btopr
< #undef ptob
<
< extern unsigned long btop();
< extern unsigned long btopr();
< extern unsigned long ptob();
<
<
< /* Drivers must include map.h to pick up the structure definition */
< /* for the map structure and the declaration of the function malloc(). */
< /* Unfortunately, map.h also includes definitions of macros that */
< /* drivers should be calling as functions. The following #undefs allow */
< /* kernel code to use the macros while drivers call the functions */
<
< #undef mapinit
< #undef mapwant
<
< extern void mapinit();
< extern unsigned long mapwant();
< extern void setmapwant();
<
< /* when DKI changes are folded back in to DDI, the functions mapinit
<  * mapwant and setmapwant should be updated to be the following DKI
<  * functions:
<  */
<
< extern void rminit();
< extern unsigned long rmwant();
< extern void rmsetwant();
<
<
<
< /* STREAMS drivers and modules must include stream.h to pick up the */
< /* needed structure and flag definitions. As was the case with map.h, */
< /* macros used by both the kernel and drivers in times past now have */
< /* a macro definition for the kernel and a function definition for */
< /* drivers. The following #undefs allow drivers to include stream.h */
< /* but call the functions rather than macros. */
<
< #undef OTHERQ
```

© COPYRIGHT 1994 AMDAHL CORPORATION

```
< #undef RD
< #undef WR
< #undef datamsg
< #undef putnext
< #undef splstr
<
< extern struct queue *OTHERQ();    /* stream.h */
< extern struct queue *RD();
< extern struct queue *WR();
< extern int datamsg();
< extern int putnext();
< extern int splstr();
< extern void freerbuf();
<
< #else         /* DDI_OFF */
<
< extern clock_t lbolt;                     /* time in HZ since last boot */
< #define drv_hztousec          drv_fast_hztousec
< #define drv_usectohz          drv_fast_usectohz
<
< #define UPROCP    (u.u_procp)
< #define PPGRP     (u.u_procp->p_pgrp)
< #define LBOLT     (lbolt)
< #define TIME      (hrestime.tv_sec)
< #define PPID      (u.u_procp->p_pid)
< #define PSID      (u.u_procp->p_sessp->s_sid)
< #define drv_getparm(parm, valuep)  ((*(valuep)=(unsigned long)(parm)) , 0)
<
< #define SYSRINT   sysinfo.rcvint
< #define SYSXINT   sysinfo.xmtint
< #define SYSMINT   sysinfo.mdmint
< #define SYSRAWC   sysinfo.rawch
< #define SYSCANC   sysinfo.canch
< #define SYSOUTC   sysinfo.outch
< static int ddi_oldpri;          /* we only need one, once set, we can't sleep */
< #define drv_setparm(parm, value) (                            \
<               ddi_oldpri = splhi(),                           \
<               ((parm) += (value)),                            \
<               splx(ddi_oldpri),                               \
<               0 )
< #define rmsetwant   setmapwant
< #define setmapwant(mp)      (                                          \
<       oldpri = splhi(),                                       \
<       mp[0].m_addr++,                                                  \
<       splx(oldpri)      )
```

© COPYRIGHT 1994 AMDAHL CORPORATION

```
<
< #define freerbuf(bp)          (kmem_free( (void *)bp, sizeof(struct buf)))
<
< #endif        /* DDI_OFF */
<
< /* declarations of functions for allocating and deallocating the space */
< /* for a buffer header (just a header, not the associated buffer) */
<
< extern struct buf *getrbuf();
<
< /* end of ddi.h */
<
< #endif        /* _IO_DDI_H */
```

© COPYRIGHT 1994 AMDAHL CORPORATION

```
0a1,6
> /* File: termios.h - last edit:
>  * helge     Thu Aug 29 12:02:24 1991
>  *
>  * Copyright (c) 1991 by Amdahl Corporation. All rights reserved.
>  */
>
10,11c16,17
< #ifndef _IO_TERMIOS_H  /* wrapper symbol for kernel use */
< #define _IO_TERMIOS_H  /* subject to change without notice */
---
> #ifndef _SYS_TERMIOS_H
> #define _SYS_TERMIOS_H
12a19,20
> /* Shortened version */
>
15d22
< #ifdef _KERNEL
17,42d23
< #if !defined(_POSIX_SOURCE) && !defined(_IO_TTYDEV_H)
< #include <io/ttydev.h> /* COMPATIBILITY */
< #endif /* !defined(_POSIX_SOURCE) */
<
< #ifndef _UTIL_TYPES_H
< #include <util/types.h>    /* COMPATIBILITY */
< #endif
<
< #else
<
< #if !defined(_POSIX_SOURCE)
< #include <sys/ttydev.h> /* COMPATIBILITY */
< #endif /* !defined(_POSIX_SOURCE) */
<
< #include <sys/types.h> /* COMPATIBILITY */
<
< #endif /* _KERNEL */
<
< #ifndef _POSIX_VDISABLE
< #define _POSIX_VDISABLE 0 /* Disable special character functions */
< #endif
<
< #if !defined(_POSIX_SOURCE)
< #define      CTRL(c)      ((c)&037)
< #define IBSHIFT 16
<
```

© COPYRIGHT 1994 AMDAHL CORPORATION

```
45d25
< #endif /* !defined(_POSIX_SOURCE) */
56d35
< typedef unsigned long speed_t;
69,284d47
< /*
<  * POSIX termios functions
<  * These functions get mapped into ioctls.
<  */
<
< #ifndef _KERNEL
<
< #if defined(__STDC__)
<
< extern speed_t cfgetospeed (const struct termios *);
< extern int cfsetospeed (struct termios *, speed_t);
< extern speed_t cfgetispeed (const struct termios *);
< extern int cfsetispeed (struct termios *, speed_t);
< extern int tcgetattr (int, struct termios *);
< extern int tcsetattr (int, int, const struct termios *);
< extern int tcsendbreak (int, int);
< extern int tcdrain (int);
< extern int tcflush (int, int);
< extern int tcflow (int, int);
<
< #else
<
< extern speed_t cfgetospeed ();
< extern int cfsetospeed ();
< extern speed_t cfgetispeed ();
< extern int cfsetispeed ();
< extern int tcgetattr ();
< extern int tcsetattr ();
< extern int tcsendbreak ();
< extern int tcdrain ();
< extern int tcflush ();
< extern int tcflow ();
<
< #endif /* __STDC__ */
<
< #if !defined(_POSIX_SOURCE)
<
< #if defined(__STDC__)
< extern pid_t tcgetsid (int);
< #else
```

© COPYRIGHT 1994 AMDAHL CORPORATION

```
< extern pid_t tcgetsid ();
< #endif /* __STDC__ */
<
< #endif /* !defined(_POSIX_SOURCE) */
<
< #endif
<
< /* control characters */
< #define     VINTR       0
< #define     VQUIT       1
< #define     VERASE      2
< #define     VKILL       3
< #define     VEOF  4
< #define     VEOL  5
< #if !defined(_POSIX_SOURCE)
< #define     VEOL2       6
< #endif /* !defined(_POSIX_SOURCE) */
< #define     VMIN  4
< #define     VTIME       5
< #if !defined(_POSIX_SOURCE)
< #define     VSWTCH      7
< #endif /* !defined(_POSIX_SOURCE) */
< #define     VSTART            8
< #define     VSTOP             9
< #define     VSUSP             10
< #if !defined(_POSIX_SOURCE)
< #define     VDSUSP            11
< #define     VREPRINT    12
< #define     VDISCARD    13
< #define     VWERASE           14
< #define     VLNEXT            15
< /* 16 thru 19 reserved for future use */
<
< /*
<  * control characters form Xenix termio.h
<  */
< #define     VCEOF       NCC         /* RESERVED true EOF char (V7 compatability) */
< #define     VCEOL       (NCC + 1)   /* RESERVED true EOL char */
<
< #define     CNUL 0
< #define     CDEL 0377
<
< /* S5 default control chars */
< #define     CESC  '\\'
< #define     CINTR       0177  /* DEL */
```

© COPYRIGHT 1994 AMDAHL CORPORATION

```
< #define	CQUIT		034	/* FS, cntl | */
< #define	CERASE		'#'
< #define	CKILL		'@'
< #define CEOT	04
< #define CEOL	0
< #define CEOL2	0
< #define	CEOF 04		/* cntl d */
< #define	CSTART		021	/* cntl q */
< #define	CSTOP		023	/* cntl s */
< #define	CSWTCH		032	/* cntl z */
< #define	CNSWTCH		0
< #define	CSUSP		CTRL('z')
< #define	CDSUSP		CTRL('y')
< #define	CRPRNT		CTRL('r')
< #define	CFLUSH		CTRL('o')
< #define	CWERASE		CTRL('w')
< #define	CLNEXT		CTRL('v')
< #endif /* !defined(_POSIX_SOURCE) */
<
<
< /* input modes */
< #define	IGNBRK		0000001
< #define	BRKINT		0000002
< #define	IGNPAR		0000004
< #define	PARMRK		0000010
< #define	INPCK		0000020
< #define	ISTRIP		0000040
< #define	INLCR		0000100
< #define	IGNCR		0000200
< #define	ICRNL		0000400
< #if !defined(_POSIX_SOURCE) || defined(_XOPEN_SOURCE)
< #define	IUCLC		0001000
< #endif /* !defined(_POSIX_SOURCE) || defined(_XOPEN_SOURCE) */
< #define	IXON	0002000
< #if !defined(_POSIX_SOURCE) || defined(_XOPEN_SOURCE)
< #define	IXANY		0004000
< #endif /* !defined(_POSIX_SOURCE) || defined(_XOPEN_SOURCE) */
< #define	IXOFF		0010000
< #if !defined(_POSIX_SOURCE)
< #define IMAXBEL 0020000
< #define DOSMODE		0100000 /* for 386 compatibility */
< #endif /* !defined(_POSIX_SOURCE) */
<
< /* output modes */
< #define	OPOST		0000001
```

© COPYRIGHT 1994 AMDAHL CORPORATION

```
< #if !defined(_POSIX_SOURCE) || defined(_XOPEN_SOURCE)
< #define	OLCUC	0000002
< #define	ONLCR	0000004
< #define	OCRNL	0000010
< #define	ONOCR	0000020
< #define	ONLRET	0000040
< #define	OFILL 0000100
< #define	OFDEL	0000200
< #define	NLDLY	0000400
< #define	NL0	0
< #define	NL1	0000400
< #define	CRDLY	0003000
< #define	CR0	0
< #define	CR1	0001000
< #define	CR2	0002000
< #define	CR3	0003000
< #define	TABDLY	0014000
< #define	TAB0	0
< #define	TAB1	0004000
< #define	TAB2	0010000
< #define	TAB3	0014000
< #endif /* !defined(_POSIX_SOURCE) || defined(_XOPEN_SOURCE) */
< #if !defined(_POSIX_SOURCE)
< #define XTABS	0014000
< #endif /* !defined(_POSIX_SOURCE) */
< #if !defined(_POSIX_SOURCE) || defined(_XOPEN_SOURCE)
< #define	BSDLY	0020000
< #define	BS0	0
< #define	BS1	0020000
< #define	VTDLY	0040000
< #define	VT0	0
< #define	VT1	0040000
< #define	FFDLY	0100000
< #define	FF0	0
< #define	FF1	0100000
< #endif /* !defined(_POSIX_SOURCE) || defined(_XOPEN_SOURCE) */
< #if !defined(_POSIX_SOURCE)
< #define PAGEOUT 0200000
< #define WRAP	0400000
<
< /* control modes */
< #define	CBAUD	0000017
< #endif /* !defined(_POSIX_SOURCE) */
< #define	CSIZE 0000060
< #define	CS5	0
```

© COPYRIGHT 1994 AMDAHL CORPORATION

```
< #define	CS6	0000020
< #define	CS7	0000040
< #define	CS8	0000060
< #define	CSTOPB	0000100
< #define	CREAD	0000200
< #define	PARENB	0000400
< #define	PARODD	0001000
< #define	HUPCL	0002000
< #define	CLOCAL	0004000
< #if !defined(_POSIX_SOURCE)
< #define RCV1EN	0010000
< #define	XMT1EN	0020000
< #define	LOBLK	0040000
< #define	XCLUDE	0100000		/* *V7* exclusive use coming fron XENIX */
< #define CIBAUD	03600000
< #define PAREXT	04000000
< #endif /* !defined(_POSIX_SOURCE) */
<
< /* line discipline 0 modes */
< #define	ISIG	0000001
< #define	ICANON	0000002
< #if !defined(_POSIX_SOURCE) || defined(_XOPEN_SOURCE)
< #define	XCASE	0000004
< #endif /* !defined(_POSIX_SOURCE) || defined(_XOPEN_SOURCE) */
< #define	ECHO	0000010
< #define	ECHOE	0000020
< #define	ECHOK	0000040
< #define	ECHONL	0000100
< #define	NOFLSH	0000200
< #define	TOSTOP	0000400
< #if !defined(_POSIX_SOURCE)
< #define	ECHOCTL	0001000
< #define	ECHOPRT	0002000
< #define	ECHOKE	0004000
< #define	DEFECHO	0010000
< #define	FLUSHO	0020000
< #define	PENDIN	0040000
< #endif /* !defined(_POSIX_SOURCE) */
< #define	IEXTEN	0100000	/* POSIX flag - enable POSIX extensions */
<
< #if !defined(_POSIX_SOURCE)
295,300d57
< /* Slots reserved for 386/XENIX compatibility - keyboard control */
<
< #define TIOCKBON	(TIOC|8)
```

© COPYRIGHT 1994 AMDAHL CORPORATION

```
< #define TIOCKBOF        (TIOC|9)
< #define KBENABLED       (TIOC|10)
<
306d62
< #define     RTS_TOG     (TIOC|33)     /* 386 - "RTS" toggle define 8A1 protocol */
308,311d63
< #define TIOCGWINSZ (TIOC|104)
< #define TIOCSWINSZ (TIOC|103)
<
<
316c68
< #endif /* !defined(_POSIX_SOURCE) */
---
>
318d69
< #if !defined(_POSIX_SOURCE)
320d70
< #endif /* !defined(_POSIX_SOURCE) */
322d71
< #if !defined(_POSIX_SOURCE)
324d72
< #endif /* !defined(_POSIX_SOURCE) */
340d87
< #if !defined(_POSIX_SOURCE)
342d88
< #endif /* !defined(_POSIX_SOURCE) */
344,350d89
<
< /* Slots for 386/XENIX compatibility */
< /* BSD includes these ioctls in ttold.h */
<
< #ifndef _IO_TTOLD_H
<
< #if !defined(_POSIX_SOURCE)
362,366d100
< /*
<  * BSD ioctls that are not the same as XENIX are included here.
<  * There are also some relevant ioctls from SUN/BSD sys/ttycom.h
<  * BSD pty ioctls like TIOCPKT are not supported in SVR4.
<  */
368,421d101
< #define     TIOCLBIS    (tIOC|127)    /* bis local mode bits */
< #define     TIOCLBIC    (tIOC|126)    /* bic local mode bits */
< #define     TIOCLSET    (tIOC|125)    /* set entire local mode word */
< #define     TIOCLGET    (tIOC|124)    /* get local modes */
```

© COPYRIGHT 1994 AMDAHL CORPORATION

```
< #define     TIOCSBRK    (tIOC|123)   /* set break bit */
< #define     TIOCCBRK    (tIOC|122)   /* clear break bit */
< #define     TIOCSDTR    (tIOC|121)   /* set data terminal ready */
< #define     TIOCCDTR    (tIOC|120)   /* clear data terminal ready */
< #define     TIOCSLTC    (tIOC|117)   /* set local special chars */
< #define     TIOCGLTC    (tIOC|116)   /* get local special chars */
< #define     TIOCOUTQ    (tIOC|115)   /* driver output queue size */
< #define     TIOCNOTTY   (tIOC|113)   /* void tty association */
< #define     TIOCSTOP    (tIOC|111)   /* stop output, like ^S */
< #define     TIOCSTART   (tIOC|110)   /* start output, like ^Q */
< #endif /* !defined(_POSIX_SOURCE) */
<
< #endif /* end _IO_TTOLD_H */
<
< /* POSIX job control ioctls */
<
< #if !defined(_POSIX_SOURCE)
< #define     TIOCGPGRP   (tIOC|20)    /* get pgrp of tty */
< #define     TIOCSPGRP   (tIOC|21)    /* set pgrp of tty */
< #define     TIOCGSID    (tIOC|22)    /* get session id on ctty*/
< #define     TIOCSSID    (tIOC|24)    /* set session id on ctty*/
<
< /* Miscellanous */
< #define     TIOCSTI               (tIOC|23)    /* simulate terminal input */
<
< /* Modem control */
< #define     TIOCMSET    (tIOC|26)    /* set all modem bits */
< #define     TIOCMBIS    (tIOC|27)    /* bis modem bits */
< #define     TIOCMBIC    (tIOC|28)    /* bic modem bits */
< #define     TIOCMGET    (tIOC|29)    /* get all modem bits */
< #define           TIOCM_LE    0001         /* line enable */
< #define           TIOCM_DTR   0002         /* data terminal ready */
< #define           TIOCM_RTS   0004         /* request to send */
< #define           TIOCM_ST    0010         /* secondary transmit */
< #define           TIOCM_SR    0020         /* secondary receive */
< #define           TIOCM_CTS   0040         /* clear to send */
< #define           TIOCM_CAR   0100         /* carrier detect */
< #define           TIOCM_CD    TIOCM_CAR
< #define           TIOCM_RNG   0200         /* ring */
< #define           TIOCM_RI    TIOCM_RNG
< #define           TIOCM_DSR   0400         /* data set ready */
<
< /* pseudo-tty */
<
< #define     TIOCREMOTE            (tIOC|30)    /* remote input editing */
```

© COPYRIGHT 1994 AMDAHL CORPORATION

```
< #define TIOCSIGNAL      (tIOC|31)       /* pty: send signal to slave */
<
<
< /* Some more 386 xenix stuff */
<
430c110,111
< /* Slots for 386 compatibility */
---
> /* Miscellanous */
> #define       TIOCSTI              (tIOC|23)       /* simulate terminal input */
432,435d112
< #define       LDSMAP               (LDIOC|10)
< #define       LDGMAP               (LDIOC|11)
< #define       LDNMAP               (LDIOC|12)
<
437,444d113
<  * These are retained for 386/XENIX compatibility.
<  */
<
< #define       DIOC  ('d'<<8)
< #define DIOCGETP       (DIOC|8)            /* V7 */
< #define DIOCSETP       (DIOC|9)            /* V7 */
<
< /*
449d117
< #endif /* !defined(_POSIX_SOURCE) */
451,487c119
< /*
<  * Speeds
<  */
< #define B0  0
< #define B50        1
< #define B75        2
< #define B110       3
< #define B134       4
< #define B150       5
< #define B200       6
< #define B300       7
< #define B600       8
< #define B1200      9
< #define       B1800 10
< #define B2400      11
< #define B4800      12
< #define B9600      13
< #define B19200     14
```

© COPYRIGHT 1994 AMDAHL CORPORATION

```
< #define B38400       15
<
< #ifndef _IO_TTOLD_H
< #ifndef _IO_PTEM_H
<
< #if !defined(_POSIX_SOURCE)
< /* Windowing structure to support JWINSIZE/TIOCSWINSZ/TIOCGWINSZ */
< struct winsize {
<       unsigned short ws_row;      /* rows, in characters*/
<       unsigned short ws_col;      /* columns, in character */
<       unsigned short ws_xpixel;   /* horizontal size, pixels */
<       unsigned short ws_ypixel;   /* vertical size, pixels */
< };
< #endif /* !defined(_POSIX_SOURCE) */
<
< #endif /* end _IO_PTEM_H */
< #endif /* end _IO_TTOLD_H */
<
< #endif       /* _IO_TERMIOS_H */
---
> #endif       /* _SYS_TERMIOS_H */
```

© COPYRIGHT 1994 AMDAHL CORPORATION

```
0a1,6
> /* File: file.h - last edit:
>  * helge     Fri Aug 30 16:29:39 1991
>  *
>  * Copyright (c) 1991 by Amdahl Corporation. All rights reserved.
>  */
>
10,11c16,17
< #ifndef _FS_FILE_H          /* wrapper symbol for kernel use */
< #define _FS_FILE_H          /* subject to change without notice */
---
> #ifndef _SYS_FILE_H
> #define _SYS_FILE_H
15d20
< #ifdef _KERNEL
17,19c22
< #ifndef _UTIL_TYPES_H
< #include <util/types.h>     /* REQUIRED */
< #endif
---
> #include <sys/types.h>      /* REQUIRED */
21,42d23
< #endif /* _KERNEL */
<
< /*
<  * One file structure is allocated for each open/creat/pipe call.
<  * Main use is to hold the read/write pointer associated with
<  * each open file.
<  */
< typedef struct file {
<       struct file  *f_next;          /* pointer to next entry */
<       struct file  *f_prev;          /* pointer to previous entry */
<       ushort  f_flag;
<       cnt_t   f_count;               /* reference count */
<       struct vnode *f_vnode;                 /* pointer to vnode structure */
<       off_t   f_offset;              /* read/write character pointer */
<       struct  cred *f_cred;          /* credentials of user who opened it */
<       struct  aioreq *f_aiof;        /* aio file list forward link     */
<       struct  aioreq *f_aiob;                /* aio file list backward link     */
< /* #ifdef MERGE */
<       struct  file *f_slnk;          /* XENIX semaphore queue */
< /* #endif MERGE */
< } file_t;
<
63,71c44
```

© COPYRIGHT 1994 AMDAHL CORPORATION

```
< /*
<  * This mode is a kludge to allow pre-SVR4 RFS servers to survive opens
<  * of namefs-mounted files.  The SVR4 implmentation of the old protocol
<  * expects a lookup to precede every open, but namefs departs from that
<  * model.  We provide the mode to allow the client to detect and fail
<  * the open, thereby protecting server reference counts.  This mode
<  * will disappear when support for the old RFS protocol is dropped.
<  */
< #define FNMFS            0x2000
---
> #ifdef __STDC__
73,74c46,50
< /* file descriptor flags */
< #define FCLOSEXEC        001     /* close on exec */
---
> extern int close(int fd);
> extern int get_fd(struct stdata *stp);
> extern int open(char *path, int oflag);
> extern int read(int fd, char *buff, int bytes);
> extern int write(int fd, char *buff, unsigned int len);
76,102d51
< /* miscellaneous defines */
<
< #define NULLFP ((struct file *)0)
<
< #ifndef L_SET
< #define      L_SET 0         /* for lseek */
< #endif /* L_SET */
<
< /*
<  * Routines dealing with user per-open file flags and
<  * user open files.
<  */
<
< #if defined(__STDC__)
< extern int getf(int, file_t **);
< extern void closeall(int);
< extern int closef(file_t *);
< extern int ufalloc(int, int *);
< extern int falloc(struct vnode *, int, file_t **, int *);
< extern void finit(void);
< extern void unfalloc(file_t *);
< extern void setf(int, file_t *);
< extern char getpof(int);
< extern void setpof(int, char);
```

© COPYRIGHT 1994 AMDAHL CORPORATION

```
< extern int filesearch(struct vnode *);
< extern int fassign(struct vnode **, int, int*);
<
105,116c54,58
< extern int getf();
< extern void closeall();
< extern int closef();
< extern int ufalloc();
< extern int falloc();
< extern void finit();
< extern void unfalloc();
< extern void setf();
< extern char getpof();
< extern void setpof();
< extern int filesearch();
< extern int fassign();
---
> extern int close();
> extern int get_fd();
> extern int open();
> extern int read();
> extern int write();
118c60
< #endif        /* __STDC__ */
---
> #endif /* __STDC__ */
120c62
< #endif        /* _FS_FILE_H */
---
> #endif        /* _SYS_FILE_H */
```

© COPYRIGHT 1994 AMDAHL CORPORATION

```
0a1,6
> /* File: kmem.h - last edit:
>  * helge     Mon Aug 19 11:50:14 1991
>  *
>  * Copyright (c) 1991 by Amdahl Corporation. All rights reserved.
>  */
>
10a17,18
> #include <sys/types.h>
>
25a34,37
> #define KMEM_NCLASS 3          /* # of KMEM request classes     */
> #define KMEM_SMALL  0          /* small KMEM request index      */
> #define KMEM_LARGE  1          /* large KMEM request index      */
> #define KMEM_OSIZE  2          /* outsize KMEM request index    */
26a39,44
> struct kmeminfo {
>       ulong   km_mem[KMEM_NCLASS];  /* amount of memory owned by KMEM  */
>       ulong   km_alloc[KMEM_NCLASS]; /* amount of memory allocated     */
>       ulong   km_fail[KMEM_NCLASS];  /* # of failed requests           */
> };
>
37a56,58
> extern void kmem_freepool(void);
> extern ulong kmem_avail(void);
> extern int init_str_mem(char *kmem_heap_begin, unsigned long size);
47a69,71
> extern void kmem_freepool();
> extern ulong kmem_avail();
> extern int init_str_mem();
```

© COPYRIGHT 1994 AMDAHL CORPORATION

```
0a1,8
> #ident "%W% %G% %U% %n%"
>
> /* File: log.h - last edit:
>  * helge     Tue Jan 28 16:49:56 1992
>  *
>  * Copyright (c) 1991 by Amdahl Corporation. All rights reserved.
>  */
>
13d20
< #ident     "@(#)uts-3b2:io/log/log.h     1.5"
18c25
< #ifdef _KERNEL
---
> #include <sys/stream.h>  /* REQUIRED */
20,25d26
< #ifndef _IO_STREAM_H
< #include <io/stream.h>    /* REQUIRED */
< #endif
<
< #endif /* _KERNEL */
<
52c53
< #define LOG_NAME       "LOG"
---
> #define LOG_NAME       "log"
55c56
< #define LOG_HIWAT      4096
---
> #define LOG_HIWAT      16384
80,96d80
<  * logstrcpy(dp, sp) copies string sp to dp.
<  */
<
< #ifdef u3b2
< asm        char *
< logstrcpy(dp, sp)
< {
< %    mem dp, sp;
<
<      MOVW dp,%r1
<      MOVW sp,%r0
<      STRCPY
<      MOVW %r1,dp
<      MOVW %r0,sp
```

© COPYRIGHT 1994 AMDAHL CORPORATION

```
< }
< #else          /* !u3b2 */
< /*
101d84
< #endif
```

© COPYRIGHT 1994 AMDAHL CORPORATION

```
0a1,6
> /* File: param.h - last edit:
>  * helge     Wed Jan 22 20:23:43 1992
>  *
>  * Copyright (c) 1991 by Amdahl Corporation. All rights reserved.
>  */
>
33,34c39
< #ifndef _UTIL_PARAM_H /* wrapper symbol for kernel use */
< #define _UTIL_PARAM_H           /* subject to change without notice */
---
> #ifndef _SYS_PARAM_H
39c44
< #ifdef _KERNEL
---
> #include <sys/types.h>     /* COMPATIBILITY */
41,43d45
< #ifndef _UTIL_TYPES_H
< #include <util/types.h> /* COMPATIBILITY */
< #endif
45,51d46
< #else
<
< #include <sys/types.h> /* COMPATIBILITY */
<
< #endif /* _KERNEL */
<
<
98,121d92
<  * The following defines apply to the kernel virtual address space.
<  */
<
< /*
<  * The size of the kernel segment table in pages.  The starting address
<  * comes from the vuifile (for COFF compilation) or mapfile (for ELF).
<  * Changes in the vuifile or mapfile may require corresponding changes
<  * to NS*SDE.
<  */
< #define      SYSSEGSZ 1024
<
< #define      NS0SDE         0x180  /* number of kernel segments in section 0. */
< #define      NS1SDE         0xC0   /* number of kernel segments in section 1. */
< #define      NS2SDE         0x0    /* number of kernel segments in section 2. */
< #define      NS3SDE         0x1    /* number of kernel segments in section 3. */
<
```

© COPYRIGHT 1994 AMDAHL CORPORATION

```
< /*
<  * To avoid prefetch errors at the end of a region, it must
<  * be padded with the following number of bytes.
<  */
<
< #define      PREFETCH     12
<
< /*
146d116
< #define NBPS         0x20000              /* Number of bytes per segment */
148,151d117
< #define      NCPS  64              /* Number of clicks per segment */
< #define      CPSSHIFT      6       /* LOG2(NCPS) if exact */
< #define      NBPC  2048            /* Number of bytes per click */
< #define      BPCSHIFT      11      /* LOG2(NBPC) if exact */
153,157d118
< #define      CMASK         0              /* default mask for file creation */
< #define      CDLIMIT       (1L<<11)       /* default max write address */
< #define      NBPSCTR              512     /* Bytes per disk sector.       */
< #define      UBSIZE               512     /* unix block size.             */
< #define SCTRSHFT           9       /* Shift for BPSECT.        */
159,162d119
< #define      UMODE         3              /* current Xlevel == user */
< #define      USERMODE(psw)        ((psw).CM == UMODE)
< #define      BASEPRI(psw)         ((psw).IPL > 8)
<
168,175d124
< /*
<  *  Interrupt stack size in STKENT units
<  */
< #define QSTKSZ    1000
< #define ISTKSZ    1000
<
< #define      MAXSUSE     255
<
198,209c147
< /*
<  * The following are defined to be the same as
<  * defined in /usr/include/limits.h.  They are
<  * needed for pipe and FIFO compatibility.
<  */
< #ifndef PIPE_BUF  /* max # bytes atomic in write to a pipe */
< #ifdef u3b15
< #define PIPE_BUF  4096
< #else
```

© COPYRIGHT 1994 AMDAHL CORPORATION

```
< #define PIPE_BUF  5120
< #endif        /* u3b15 */
< #endif        /* PIPE_BUF */
---
> #define NBBY         8          /* number of bits per byte */
211,256c149,151
< #ifndef PIPE_MAX               /* max # bytes written to a pipe in a write */
< #ifdef u3b15
< #define PIPE_MAX               4096
< #else
< #define PIPE_MAX               5120
< #endif        /* u3b15 */
< #endif        /* PIPE_MAX */
<
< #define NBBY         8                          /* number of bits per byte */
<
< /*
<  * File system parameters and macros.
<  *
<  * The file system is made out of blocks of at most MAXBSIZE units,
<  * with smaller units (fragments) only in the last direct block.
<  * MAXBSIZE primarily determines the size of buffers in the buffer
<  * pool. It may be made larger without any effect on existing
<  * file systems; however making it smaller make make some file
<  * systems unmountable.
<  *
<  * Note that the blocked devices are assumed to have DEV_BSIZE
<  * "sectors" and that fragments must be some multiple of this size.
<  */
< #define      MAXBSIZE   8192
< #define      DEV_BSIZE  512
< #define      DEV_BSHIFT 9               /* log2(DEV_BSIZE) */
< #define      MAXFRAG    8
<
< #define      btodb(bytes)               /* calculates (bytes / DEV_BSIZE) */ \
<      ((unsigned)(bytes) >> DEV_BSHIFT)
< #define      dbtob(db)                  /* calculates (db * DEV_BSIZE) */ \
<      ((unsigned)(db) << DEV_BSHIFT)
<
< /*
<  * MMU_PAGES* describes the physical page size used by the mapping hardware.
<  * PAGES* describes the logical page size used by the system.
<  */
<
< #define      MMU_PAGESIZE      0x800          /* 2048 bytes */
```

© COPYRIGHT 1994 AMDAHL CORPORATION

```
< #define       MMU_PAGESHIFT    11              /* log2(MMU_PAGESIZE) */
< #define       MMU_PAGEOFFSET (MMU_PAGESIZE-1)/* Mask of address bits in page */
< #define       MMU_PAGEMASK     (~MMU_PAGEOFFSET)
<
< #define       PAGESIZE    0x800          /* All of the above, for logical */
< #define       PAGESHIFT   11
< #define       PAGEOFFSET         (PAGESIZE - 1)
---
> #define       PAGESIZE    0x1000                 /* 4096 bytes */
> #define       PAGESHIFT   12               /* log2(PAGESIZE) */
> #define       PAGEOFFSET         (PAGESIZE - 1)  /* Mask of address bits in page */
258,262d152
<
< #ifndef NODEV
< #define NODEV     (dev_t)(-1)
< #endif
<
264,274d153
<  * Some random macros for units conversion.
<  */
<
< /*
<  * MMU pages to bytes, and back (with and without rounding)
<  */
< #define       mmu_ptob(x)   ((x) << MMU_PAGESHIFT)
< #define       mmu_btop(x)   (((unsigned)(x)) >> MMU_PAGESHIFT)
< #define       mmu_btopr(x)  ((((unsigned)(x) + MMU_PAGEOFFSET) >> MMU_PAGESHIFT))
<
< /*
281c160,162
< #define shm_alignment       stob(1)          /* segment size */
---
> #ifndef NODEV
> #define NODEV     (dev_t)(-1)
> #endif
282a164
> #define PRMPT 0 /* Ignored parameter value for wakeprocs() */
284c166,175
< #endif        /* _UTIL_PARAM_H */
---
> /* Processor level macros */
> /* Because no VRTX calls are allowed at level 7, splstr is set to 6 */
> /* Be careful with interrupts that run at level 7 */
> /* For debugging splhi has to be level 6, could be level 7 otherwise as no
>  * VRTX calls occur in those regions for extra protection.
```

© COPYRIGHT 1994 AMDAHL CORPORATION

```
>  */
> #define splhi spl6
> #define splstr spl6
>
> #endif        /* _SYS_PARAM_H */
```

© COPYRIGHT 1994 AMDAHL CORPORATION

```
/* File: secsys.h - last edit:
 * helge        Thu Aug 15 14:25:48 1991
 *
 * Copyright (c) 1991 by Amdahl Corporation. All rights reserved.
 */

/*      Copyright (c) 1990 UNIX System Laboratories, Inc.   */
/*      Copyright (c) 1984, 1986, 1987, 1988, 1989, 1990 AT&T     */
/*        All Rights Reserved          */

/*      THIS IS UNPUBLISHED PROPRIETARY SOURCE CODE OF        */
/*      UNIX System Laboratories, Inc.                 */
/*      The copyright notice above does not evidence any       */
/*      actual or intended publication of such source code.    */

#ifndef _SYS_SECSYS_H       /* wrapper symbol for kernel use */
#define _SYS_SECSYS_H       /* subject to change without notice */

#ident  "@(#)uts-comm:svc/secsys.h    1.6"

#include <sys/types.h>

/*
 * Commands for secsys system call.
 */

#define         ES_MACOPENLID   1       /* open LID file for kernel use */
#define         ES_MACSYSLID    2       /* assign LID to system processes */
#define         ES_MACROOTLID   3       /* assign LID to root fs root vnode */
#define         ES_PRVINFO 4    /* Get the privilege mechanism information */
#define         ES_PRVSETCNT    5       /* Get the privilege mechanism set count */
#define         ES_PRVSETS 6    /* Get the privilege mechanism sets */
#define         ES_MACADTLID    7       /* assign LID to audit daemon */
#define         ES_PRVID        8       /* Get the privileged ID number */


/*
 * Commands for secsys system call.
 */

#define         SA_EXEC                 001     /* execute access */
#define         SA_WRITE        002     /* write access */
#define         SA_READ                 004     /* read access */
#define         SA_SUBSIZE  010     /* get sub_attr size */
```

700

© COPYRIGHT 1994 AMDAHL CORPORATION

```
/*
 * Following is the attributes structure for an
 * object used by the secadvise() call.
 */

struct obj_attr {
    uid_t uid;
    gid_t gid;
    mode_t mode;
    level_t lid;
    char filler[8];
};

#endif  /* _SVC_SECSYS_H */
```

© COPYRIGHT 1994 AMDAHL CORPORATION

```
0a1,6
> /* File: signal.h - last edit:
>  * helge     Wed Jan 22 20:16:37 1992
>  *
>  * Copyright (c) 1991 by Amdahl Corporation. All rights reserved.
>  */
>
50,171d55
< #define     SIG_DFL       (void(*)())0
<
< #if defined(lint)
< #define SIG_ERR (void(*)())0
< #define      SIG_IGN       (void (*)())0
< #define SIG_HOLD (void(*)())0
< #else
< #define SIG_ERR    (void(*)())-1
< #define      SIG_IGN       (void (*)())1
< #define SIG_HOLD (void(*)())2
< #endif
<
< #define SIG_BLOCK        1
< #define SIG_UNBLOCK      2
< #define SIG_SETMASK      3
<
< #define SIGNO_MASK       0xFF
< #define SIGDEFER         0x100
< #define SIGHOLD          0x200
< #define SIGRELSE 0x400
< #define SIGIGNORE        0x800
< #define SIGPAUSE 0x1000
<
< #if (__STDC__ - 0 == 0) || defined(_POSIX_SOURCE)
< typedef struct {               /* signal set type */
<       unsigned long   sigbits[4];
< } sigset_t;
<
< struct sigaction {
<       int sa_flags;
<       void (*sa_handler)();
<       sigset_t sa_mask;
<       int sa_resv[2];
< };
<
< /* these are only valid for SIGCLD */
< #define SA_NOCLDSTOP  0x00020000     /* don't send job control SIGCLD's */
```

© COPYRIGHT 1994 AMDAHL CORPORATION

```
< #endif
<
< #if (__STDC__ - 0 == 0) && !defined(_POSIX_SOURCE)
<                       /* non-comformant ANSI compilation */
<
< /* definitions for the sa_flags field */
< #define SA_ONSTACK     0x00000001
< #define SA_RESETHAND   0x00000002
< #define SA_RESTART     0x00000004
< #define SA_SIGINFO     0x00000008
< #define SA_NODEFER     0x00000010
<
< /* these are only valid for SIGCLD */
< #define SA_NOCLDWAIT  0x00010000     /* don't save zombie children    */
<
< #define NSIG         32       /* valid signals range from 1 to NSIG-1 */
< #define MAXSIG   32       /* size of u_signal[], NSIG-1 <= MAXSIG */
<
< #define S_SIGNAL 1
< #define S_SIGSET  2
< #define S_SIGACTION     3
< #define S_NONE          4
<
< #define MINSIGSTKSZ     512
< #define SIGSTKSZ 8192
<
< #define SS_ONSTACK      0x00000001
< #define SS_DISABLE      0x00000002
<
< struct sigaltstack {
<       char    *ss_sp;
<       int     ss_size;
<       int     ss_flags;
< };
<
< typedef struct sigaltstack stack_t;
<
< #endif
<
< #ifdef _KERNEL
<
< extern k_sigset_t
<
<       fillset,           /* valid signals, guaranteed contiguous */
<       holdvfork,                  /* held while doing vfork */
```

© COPYRIGHT 1994 AMDAHL CORPORATION

```
<       cantmask,           /* cannot be caught or ignored */
<       cantreset,          /* cannot be reset after catching */
<       ignoredefault,      /* ignored by default */
<       stopdefault,        /* stop by default */
<       coredefault;        /* dumps core by default */
<
< #define    sigmask(n)           ((unsigned long)1 << ((n) - 1))
<
< #define sigemptyset(s)          (*(s) = 0)
< #define sigfillset(s)       (*(s) = fillset)
< #define sigaddset(s,n)          (*(s) |= sigmask(n))
< #define sigdelset(s,n)          (*(s) &= ~sigmask(n))
< #define    sigismember(s,n)     (sigmask(n) & *(s))
< #if !defined(_POSIX_SOURCE)
< #define sigisempty(s)           (*(s) == 0)
< #define sigorset(s1,s2)         (*(s1) |= *(s2))
< #define    sigandset(s1,s2)     (*(s1) &= *(s2))
< #define    sigdiffset(s1,s2)    (*(s1) &= ~(*(s2)))
< #define sigutok(us,ks)          (*(ks) = (us)->sigbits[0])
< #define sigktou(ks,us)          ((us)->sigbits[0] = *(ks),       \
<                           (us)->sigbits[1] = 0, \
<                           (us)->sigbits[2] = 0, \
<                           (us)->sigbits[3] = 0)
<
< #endif /* !defined(_POSIX_SOURCE) */
< typedef struct {
<       int     sig;
<       int     perm;
<       int     checkperm;
< } sigsend_t;
<
< #if !defined(_POSIX_SOURCE)
< #if defined(__STDC__)
< extern void setsigact(int, void (*)(), k_sigset_t, int);
< #else
< extern void setsigact();
< #endif     /* __STDC__ */
< #endif /* !defined(_POSIX_SOURCE) */
<
< #endif /* _KERNEL */
```

© COPYRIGHT 1994 AMDAHL CORPORATION

```
1,2c1,11
< /*  Copyright (c) 1990, 1991 UNIX System Laboratories, Inc.   */
< /*  Copyright (c) 1984, 1986, 1987, 1988, 1989, 1990 AT&T     */
---
> #ident "%W% %G% %U% %n%"
> /* %N% */
> /* File: stream.h - last edit:
>  * helge    Wed Mar 10 13:39:24 1993
>  *
>  * Copyright (c) 1993 by Amdahl Corporation. All rights reserved.
>  * Copyright (c) 1992 by Amdahl Corporation. All rights reserved.
>  * Copyright (c) 1991 by Amdahl Corporation. All rights reserved.
>  */
>
> /*  Copyright (c) 1984, 1986, 1987, 1988, 1989 AT&T   */
5,6c14
< /*  THIS IS UNPUBLISHED PROPRIETARY SOURCE CODE OF        */
< /*  UNIX System Laboratories, Inc.                        */
---
> /*  THIS IS UNPUBLISHED PROPRIETARY SOURCE CODE OF AT&T       */
15,37d22
< #ifdef _KERNEL
<
< #ifndef _UTIL_TYPES_H
< #include <util/types.h>    /* REQUIRED */
< #endif
<
< #ifndef _PROC_CRED_H
< #include <proc/cred.h>     /* REQUIRED */
< #endif
<
< #ifndef _FS_VNODE_H
< #include <fs/vnode.h>      /* REQUIRED */
< #endif
<
< #ifndef _IO_POLL_H
< #include <io/poll.h>       /* COMPATIBILITY */
< #endif
<
< #ifndef _IO_STRMDEP_H
< #include <io/strmdep.h>    /* COMPATIBILITY */
< #endif
<
< #else
41,44c26,27
```

© COPYRIGHT 1994 AMDAHL CORPORATION

```
< #include <sys/vnode.h> /* COMPATIBILITY */
< #include <sys/poll.h> /* COMPATIBILITY */
< #include <sys/strmdep.h> /* COMPATIBILITY */
< #include <sys/cred.h> /* COMPATIBILITY */
---
> #include <sys/cred.h>
> #include <sys/types.h>
46,47d28
< #endif /* _KERNEL */
<
240,244c220,225
<       queue_t *l_qtop;        /* lowest level write queue of upper stream */
<                               /* (set to NULL for persistent links) */
<       queue_t *l_qbot;        /* highest level write queue of lower stream */
<       int     l_index;        /* index for lower stream. */
<       long    l_pad[5];       /* reserved for future use */
---
>     queue_t *l_qtop;          /* lowest level write queue of upper stream */
>     /* (set to NULL for persistent links) */
>     queue_t *l_qbot;          /* highest level write queue of lower stream */
>     int l_index;      /* index for lower stream. */
>     long l_pad[4];    /* reserved for future use */
>     long l_rem_linkid; /* Added for DSF functionality */
542a515
>       unsigned char pad[3];
572,589d545
<  * Structure for M_EVENT and M_PCEVENT messages.  This is sent upstream
<  * by a module or driver to have the stream head generate a call to the
<  * General Events subsystem.  It is also contained in the first M_DATA
<  * block of an M_IOCTL message for the I_STREV and I_UNSTREV ioctls.
<  */
< struct str_evmsg {
<       long            sv_event;       /* the event (module-specific) */
<       vnode_t                 *sv_vp;                 /* vnode pointer of event queue */
<       long            sv_eid;         /* same as ev_eid */
<       long            sv_evpri;       /* same as ev_pri */
<       long            sv_flags;       /* same as ev_flags */
<       uid_t           sv_uid;         /* user id of posting process */
<       pid_t           sv_pid;         /* process id of posting process */
<       hostid_t        sv_hostid;      /* host id of posting process */
<       long            sv_pad[4];      /* reserved for future use */
< };
<
< /*
638,639c594,595
```

© COPYRIGHT 1994 AMDAHL CORPORATION

```
< #define STRHIGH 5120
< #define STRLOW   1024
---
> #define STRHIGH 2048
> #define STRLOW   512
656,660d611
< /*
<  * Definition of spl function needed to provide critical region protection
<  * for streams drivers and modules.
<  */
< #define splstr() spltty()
703a655,705
>
> #ifdef __STDC__
>
> /* init.c */
> extern void init_str_support(char *dynmem_beg, unsigned int dynmem_size);
>
> /* stream.c */
> extern mblk_t *allocb(int size, uint pri);
> extern mblk_t *esballoc(unsigned char *base, int size, int pri, frtn_t *fr_rtn);
> extern int esbbcall(int pri, void (*func) (), long arg);
> extern int testb(int size, uint pri);
> extern int bufcall(uint size, int pri, void (*func) (), long arg);
> extern void unbufcall(int id);
> extern void freeb(struct msgb *bp);
> extern void freemsg(mblk_t *bp);
> extern mblk_t *dupb(mblk_t *bp);
> extern mblk_t *dupmsg(mblk_t *bp);
> extern mblk_t *copyb(mblk_t *bp);
> extern mblk_t *copymsg(mblk_t *bp);
> extern void linkb(mblk_t *mp, mblk_t *bp);
> extern mblk_t *unlinkb(mblk_t *bp);
> extern mblk_t *rmvb(mblk_t *mp, mblk_t *bp);
> extern int pullupmsg(struct msgb *mp, int len);
> extern int adjmsg(mblk_t *mp, int len);
> extern int msgdsize(mblk_t *bp);
> extern mblk_t *getq(queue_t *q);
> extern void rmvq(queue_t *q, mblk_t *mp);
> extern void flushq(queue_t *q, int flag);
> extern void flushband(queue_t *q, char pri, int flag);
> extern int canput(queue_t *q);
> extern int bcanput(queue_t *q, unsigned char pri);
> extern int putq(queue_t *q, mblk_t *bp);
> extern int putbq(queue_t *q, mblk_t *bp);
```

© COPYRIGHT 1994 AMDAHL CORPORATION

```
> extern int insq(queue_t *q, mblk_t *emp, mblk_t *mp);
> extern int putctl(queue_t *q, int type);
> extern int putctl1(queue_t *q, int type, int param);
> extern queue_t *backq(queue_t *q);
> extern void qreply(queue_t *q, mblk_t *bp);
> extern void qenable(queue_t *q);
> extern int qsize(queue_t *qp);
> extern void noenable(queue_t *q);
> extern void enableok(queue_t *q);
> extern ushort getmid(char *name);
> extern int (*getadmin(ushort mid)) ();
> extern int strqset(queue_t *q, qfields_t what, unsigned char pri, long val);
> extern int strqget(queue_t *q, qfields_t what, unsigned char pri, long *valp);
>
> #else
>
> extern void init_str_support(); /* init.c */
>
708a711
> extern void unbufcall();
741d743
< extern void unbufcall();
742a745,746
> #endif /* __STDC__ */
>
746,747c750,755
< extern int nstrpush;               /* maxmimum number of pushes allowed */
< extern struct strstat strst;       /* STREAMS statistics structure */
---
> extern volatile int nstrpush; /* maxmimum number of pushes allowed */
> extern volatile int strmsgsz;          /* maximum stream message size */
> extern volatile int strctlsz;  /* maximum size of ctl part of message */
> extern volatile long strthresh;        /* Strcount threshold above which */
>                        /* some Streams operations will be stopped */
> extern struct strstat strst;   /* STREAMS statistics structure */
```

© COPYRIGHT 1994 AMDAHL CORPORATION

```
0a1,6
> /* File: strlog.h - last edit:
>  * helge     Mon Feb 10 15:15:46 1992
>  *
>  * Copyright (c) 1991 by Amdahl Corporation. All rights reserved.
>  */
>
18,21c24,25
< #ifdef _KERNEL
<
< #ifndef _UTIL_TYPES_H
< #include <util/types.h>     /* REQUIRED */
---
> #ifndef _SYS_TYPES_H
> #include <sys/types.h>      /* REQUIRED */
24,25d27
< #endif /* _KERNEL */
<
72c74
< #define NLOGARGS        3
---
> #define NLOGARGS        4
74d75
< #ifdef _KERNEL
81d81
< #endif
83c83
```

© COPYRIGHT 1994 AMDAHL CORPORATION

```
1c1,7
< /*   Copyright (c) 1990, 1991 UNIX System Laboratories, Inc.     */
---
> /* File: stropts.h - last edit:
>  * helge     Fri Aug 16 19:15:55 1991
>  *
>  * Copyright (c) 1991 by Amdahl Corporation. All rights reserved.
>  */
>
> /*   Copyright (c) 1990 UNIX System Laboratories, Inc.    */
10,11c16
< #ifndef _IO_STROPTS_H   /* wrapper symbol for kernel use */
< #define _IO_STROPTS_H   /* subject to change without notice */
---
> #ifndef _SYS_STROPTS_H
16,35d20
< #ifdef _KERNEL
<
< #ifndef _UTIL_TYPES_H
< #include <util/types.h>     /* REQUIRED */
< #endif
<
< #ifndef _SVC_EVECB_H
< #include <svc/evecb.h>     /* REQUIRED */
< #endif
<
< #ifndef _IO_CONF_H
< #include <io/conf.h>       /* REQUIRED */
< #endif
<
< #ifndef       _SVC_SECSYS_H
< #include <svc/secsys.h>   /* REQUIRED */
< #endif
<
< #else
<
39,42c24
< #include <sys/types.h> /* COMPATIBILITY */
< #include <sys/evecb.h>     /* COMPATIBILITY */
< /* For FMNAMESZ define */
< #include <sys/conf.h>      /* COMPATIBILITY */
---
> #include <sys/conf.h>      /* COMPATIBILITY */
44a27,28
> #include <sys/types.h>
```

770

© COPYRIGHT 1994 AMDAHL CORPORATION

```
> /* For FMNAMESZ define */
46,47d29
< #endif /* _KERNEL */
<
174d155
< #if defined(_KERNEL)
179,188d159
< #elif !defined(_STYPES)    /* user level definition */
<
< #define I_RECVFD          (STR|016)      /* maps to kernel I_E_RECVFD */
<
< #else
<
< #define I_RECVFD          (STR|022)      /* non-EFT definition */
<
< #endif /* defined(_KERNEL) */
<
253,255d225
< /*
<  * Receive file descriptor structure
<  */
257,327d226
< #if defined(_KERNEL)
<
< struct o_strrecvfd {  /* SVR3 syscall structure */
<       union {
<               struct file *fp;
<               int fd;
<       } f;
<       o_uid_t uid;              /* always ushort */
<       o_gid_t gid;
<       char fill[8];
< };
<
< /* Although EFT is enabled in the kernel we kept the following definition
< ** to support an EFT application on a 4.0 non-EFT system.
< */
<
< struct e_strrecvfd {  /* SVR4 expanded syscall interface structure */
<       union {
<               struct file *fp;
<               int fd;
<       } f;
<       uid_t uid;                /* always long */
<       gid_t gid;
```

© COPYRIGHT 1994 AMDAHL CORPORATION

```
<       char fill[8];
< };
<
< struct strrecvfd {    /* Kernel structure dependent on EFT definition */
<       union {
<               struct file *fp;
<               int fd;
<       } f;
< #if !defined(_STYPES)
<       uid_t uid;
<       gid_t gid;
< #else
<       o_uid_t uid;
<       o_gid_t gid;
< #endif
<       char fill[8];
< };
<
< /* Information that needs to be audited for Receive File Descriptor
< */
< struct adtrecvfd {
<       pid_t   adtrfd_sendpid;                 /* Sender's process id */
<       int     adtrfd_sendfd;          /* Sender's file descriptor number of
<                                       ** the file to be received
<                                       */
<       pid_t   adtrfd_recvpid;                 /* Receiver's process id */
<       int     adtrfd_recvfd;          /* Receiver's file descriptor number of
<                                       ** the file being received
<                                       */
< };
< /* Auditing version of the Receive File Descriptor structure
< */
< struct adt_strrecvfd {
<       struct  strrecvfd       adt_strrecvfd;
<       struct  adtrecvfd       adt_adtrecvfd;
< };
<
< #elif !defined(_STYPES)       /* EFT user definition */
<
< struct strrecvfd {
<       int fd;
<       uid_t uid;
<       gid_t gid;
<       char fill[8];
< };
```

© COPYRIGHT 1994 AMDAHL CORPORATION

```
<
< #else
<
329,348d227
<  * User compatibility mode. EOVERFLOW returned
<  * when uid/gid exceeds ushort limit.
<  */
< struct strrecvfd {
<       int fd;
<       o_uid_t uid;
<       o_gid_t gid;
<       char fill[8];
< };
<
< #endif        /* defined(_KERNEL) */
<
< struct s_strrecvfd {
<       int fd;
<       uid_t uid;
<       gid_t gid;
<       struct sub_attr s_attrs;
< };
<
< /*
360,371d238
< /*
<  * For I_STREV and I_UNSTREV ioctls: requesting
<  * ET_DRIVER-type events from STREAMS modules and
<  * drivers.
<  */
< #ifdef GEM
< struct str_event {
<       long            ste_event;      /* the event (module-specific) */
<       ecb_t           ste_ecb;        /* event control block */
<       long            ste_evflags;    /* same as ev_flags */
<       struct strbuf   ste_buf;        /* module-specific data */
< };
374,407d240
<  * For I_SETEV ioctls: requesting ET_STREAM-type
<  * events from the stream head.
<  */
< typedef struct str_sev {
<       int     se_mask;        /* generate events for above S_XXX conditions */
<       ecb_t   se_ecb;                 /* the event control block */
<       unchar  se_band;        /* band requested (ignored if does not apply) */
```

© COPYRIGHT 1994 AMDAHL CORPORATION

```
< } str_sev_t;
<
< /*
<  * For I_GETEV ioctls: retrieve the events for
<  * which stream head is generating events.
<  */
< typedef struct str_gev {
<       int             ge_flags;       /* see below */
<       str_sev_t       *ge_sep;        /* ptr to array of str_sev structs */
<       int             ge_ses;                 /* number of elements in ge_sep array */
< } str_gev_t;
<
<
< /*
<  * Flags for ge_flags field.
<  */
< #define       GEF_PROC        0x0001          /* Get information only about   */
<                               /* this process' requests.      */
<                               /* Otherwise, all I_SETEV's for         */
<                               /* the stream head will be      */
<                               /* returned.                    */
< #define       GEF_MORE        0x0002          /* Set on return if there were  */
<                               /* more I_SETEVs to return than         */
<                               /* would fit into the ge_sep    */
<                               /* array the caller provided.   */
< #endif /* GEM */
< /*
416c249
< #endif        /* _IO_STROPTS_H */
---
> #endif        /* _SYS_STROPTS_H */
```

© COPYRIGHT 1994 AMDAHL CORPORATION

```
1,2c1,10
< /*   Copyright (c) 1990, 1991 UNIX System Laboratories, Inc.      */
< /*   Copyright (c) 1984, 1986, 1987, 1988, 1989, 1990 AT&T        */
---
> #ident "%W% %G% %U% %n%"
> /* %N% */
> /* File: strsubr.h - last edit:
>  * helge     Fri Apr  2 20:10:53 1993
>  *
>  * Copyright (c) 1993 by Amdahl Corporation. All rights reserved.
>  * Copyright (c) 1991 by Amdahl Corporation. All rights reserved.
>  */
>
> /*   Copyright (c) 1984, 1986, 1987, 1988, 1989 AT&T    */
5,6c13
< /*   THIS IS UNPUBLISHED PROPRIETARY SOURCE CODE OF        */
< /*   UNIX System Laboratories, Inc.                        */
---
> /*   THIS IS UNPUBLISHED PROPRIETARY SOURCE CODE OF AT&T        */
10,11c17,18
< #ifndef _IO_STRSUBR_H   /* wrapper symbol for kernel use */
< #define _IO_STRSUBR_H   /* subject to change without notice */
---
> #ifndef _SYS_STRSUBR_H
> #define _SYS_STRSUBR_H
13c20
< #ident        "@(#)uts-3b2:io/strsubr.h       1.8"
---
> #ident        "@(#)head.sys:sys/strsubr.h     1.17"
21a29,31
> #include <sys/dsf_obj.h>
> #include <sys/vnode.h>
> #include <sys/stropts.h>
23,51d32
< #ifdef _KERNEL
<
< #ifndef _UTIL_TYPES_H
< #include <util/types.h>     /* REQUIRED */
< #endif
<
< #ifndef _FS_VNODE_H
< #include <fs/vnode.h>       /* REQUIRED */
< #endif
<
< #ifndef _IO_POLL_H
```

© COPYRIGHT 1994 AMDAHL CORPORATION

```
< #include <io/poll.h>       /* REQUIRED */
< #endif
<
< #ifndef _IO_STREAM_H
< #include <io/stream.h>     /* REQUIRED */
< #endif
<
< #ifndef _SVC_EVECB_H
< #include <svc/evecb.h>     /* REQUIRED */
< #endif
<
< #else
<
< #include <sys/vnode.h> /* COMPATIBILITY */
< #include <sys/evecb.h> /* COMPATIBILITY */
<
< #endif /* _KERNEL */
<
56,78c37,52
<       struct queue *sd_wrq;             /* write queue */
<       struct msgb *sd_iocblk;                   /* return block for ioctl */
<       struct vnode *sd_vnode;                   /* pointer to associated vnode */
<       struct streamtab *sd_strtab;      /* pointer to streamtab for stream */
<       long sd_flag;                     /* state/flags */
<       long sd_iocid;                    /* ioctl id */
<       ushort sd_iocwait;                /* count of procs waiting to do ioctl */
<       struct pid *sd_sidp;              /* controlling session info */
<       struct pid *sd_pgidp;             /* controlling process group info */
<       ushort sd_wroff;                  /* write offset */
<       int sd_rerror;                    /* read error to set u.u_error */
<       int sd_werror;                    /* write error to set u.u_error */
<       int sd_pushcnt;                           /* number of pushes done on stream */
<       int sd_sigflags;                  /* logical OR of all siglist events */
<       struct strevent *sd_siglist;      /* pid linked list to rcv SIGPOLL sig */
< #ifdef GEM
<       int sd_eventflags;                /* logical OR of all eventlist events */
<       struct strevent *sd_eventlist;    /* linked list to rcv general events */
< #endif /* GEM */
<       struct pollhead sd_pollist;       /* list of all pollers to wake up */
<       struct msgb *sd_mark;             /* "marked" message on read queue */
<       int sd_closetime;                 /* time to wait to drain q in close */
<       clock_t sd_rtime;                 /* time to release held message */
---
>      struct queue *sd_wrq;    /* write queue */
>      struct msgb *sd_iocblk;  /* return block for ioctl */
```

© COPYRIGHT 1994 AMDAHL CORPORATION

```
>     struct vnode *sd_vnode; /* pointer to associated vnode */
>     struct streamtab *sd_strtab;      /* pointer to streamtab for stream */
>     long sd_flag;     /* state/flags */
>     long sd_iocid;    /* ioctl id */
>     ushort sd_iocwait;        /* count of procs waiting to do ioctl */
>     ushort sd_wroff;          /* write offset */
>     int sd_rerror;    /* read error to set u.u_error */
>     int sd_werror;    /* write error to set u.u_error */
>     int sd_pushcnt;   /* number of pushes done on stream */
>     struct msgb *sd_mark;   /* "marked" message on read queue */
>     int sd_closetime;         /* time to wait to drain q in close */
>     clock_t sd_rtime;         /* time to release held message */
>  /* The following field is only used, if part of a distributed stream */
>     struct dsf_element *sd_dsf_el;
113a88,91
> /* Added for DSF */
> #define STRNOTOP          0x80000000    /* Stream is being closed because the
>                                          * remote partner has gone away.
>                                          */
114a93
>
122,144c101,121
<       union {
<               struct {
<                       struct proc     *procp;
<                       long            events;
<               } e;    /* stream event */
<               struct {
<                       void (*func)();
<                       long arg;
<                       int size;
<               } b;    /* bufcall event */
< #ifdef GEM
<               struct {
<                       vnode_t                 *vp;
<                       ecb_t           ecb;
<                       pid_t           pid;
<                       hostid_t        hostid;
<                       uid_t           uid;
<                       long            mask;
<                       unchar          band;
<               } g;    /* general events mechanism */
< #endif /* GEM */
<       } x;
<       struct strevent *se_next;
```

© COPYRIGHT 1994 AMDAHL CORPORATION

```
---
>     union {
>       struct {
>           struct proc *procp;
>           long events;
>       }       e;            /* stream event */
>       struct {
>           void (*func) ();
>           long arg;
>           int size;
>       }       b;            /* bufcall event */
>       struct {
>          /* vnode_t *vp;*/
>           /* ecb_t ecb;*/
>           pid_t pid;
>           hostid_t hostid;
>           uid_t uid;
>           long mask;
>           unchar band;
>       }       g;            /* general events mechanism */
>     }    x;
>     struct strevent *se_next;
152d128
< #ifdef GEM
154c130
< #define se_kecb                x.g.ecb                  /* name collision with struct str_sev */
---
> #define se_kecb                x.g.ecb         /* name collision with struct str_sev */
160d135
< #endif /* GEM */
437,438c416,422
< extern       char              qrunflag;       /* set iff queues are enabled */
< #define setqsched()    qrunflag = 1            /* set up queue scheduler */
---
> extern       volatile char              qrunflag;       /* set iff queues are enabled */
> #define setqsched()    { \
>                                        if (qrunflag == 0) { \
>                                                qrunflag = 1;  /* set up queue scheduler */ \
>                                                wakeup((caddr_t)&qrunflag); \
>                                        } \
>                                        }
449,453d432
< /*
<  * qinit structures for stream head read and write queues.
<  */
```

© COPYRIGHT 1994 AMDAHL CORPORATION

```
< extern struct qinit   strdata;
< extern struct qinit   stwdata;
464c443
< extern int            strscanflag;    /* strscan timeout pending */
---
> extern volatile int           strscanflag;    /* strscan timeout pending */
467,469c446,447
< extern struct strinfo Strinfo[];      /* dynamic resource info */
< extern long           Strcount;       /* count of streams resources */
< extern unsigned char          qbf[];          /* band flushing backenable flags */
---
> extern struct strinfo Strinfo[NDYNAMIC]; /* dynamic resource info */
> extern volatile long          Strcount;       /* count of streams resources */
470a449,451
> extern unsigned char          qbf[NBAND];  /* band flushing backenable flags */
> extern struct streamtab rem_strhinfo;  /* Remote stream head */
>
474,476c455,503
< extern void strsendsig();
< extern void strevpost();
< extern void strdrpost();
---
> #ifdef __STDC__
> extern int qattach(queue_t *qp, dev_t *devp, int flag, int table, int idx,
>       cred_t *crp);
> extern void qdetach(queue_t *qp, int clmode, int flag, cred_t *crp);
> extern void strscan(void);
> extern void strtime(struct stdata *stp);
> extern void str2time(struct stdata *stp);
> extern void str3time(struct stdata *stp);
> extern int putiocd(mblk_t *bp, mblk_t *ebp, caddr_t arg, int flag, char *fmt);
> extern int getiocd(mblk_t *bp, caddr_t arg, char *fmt);
> extern struct linkinfo *alloclink(queue_t *qup, queue_t *qdown,
>       struct vnode *vpdown);
> extern void lbfree(struct linkinfo *linkp);
> extern int linkcycle(stdata_t *upstp, stdata_t *lostp);
> extern struct linkinfo *findlinks(stdata_t *stp, int index, int type);
> extern queue_t *getendq(queue_t *q);
> extern int munlink(struct stdata *stp, struct linkinfo *linkp, int flag,
>       cred_t *crp, int *rvalp);
> extern int munlinkall(struct stdata *stp, int flag, cred_t *crp, int *rvalp);
> extern int mux_addedge(stdata_t *upstp, stdata_t *lostp, int muxid);
> extern void setq(queue_t *rq, struct qinit *rinit, struct qinit *winit);
> extern int strmakemsg(struct strbuf *mctl, int count, char *buff,
>       struct stdata *stp, long flag, mblk_t **mpp);
```

© COPYRIGHT 1994 AMDAHL CORPORATION

```
> extern int strwaitbuf(int size, int pri);
> extern int strwaitq(struct stdata *stp, int flag, off_t count, int fmode, int *done);
> extern int xmsgsize(mblk_t *mp, int fromhead);
> extern struct stdata *shalloc(queue_t *qp);
> extern void shfree(struct stdata *stp);
> extern mblk_t *xmsgalloc(void);
> extern struct mdbblock *xmdballoc(void);
> extern queue_t *allocq(void);
> extern void freeq(queue_t *qp);
> extern qband_t *allocband(void);
> extern struct strevent *sealloc(int slpflag);
> extern void sefree(struct strevent *sep);
> extern void queuerun(void);
> extern int findmod(char *name);
> extern void setqback(queue_t *q, unsigned char pri);
> extern void strpunlink(struct cred *crp);
> extern void streams_task(void);
> extern void runqueues(void);
>
> extern int stropen(struct vnode *vp, dev_t *devp, int flag, cred_t *crp,
>       struct streamtab *sthead, int rem_id);
> extern int strclose(struct vnode *vp, int flag, cred_t *crp);
> extern int strdoioctl(struct stdata *stp, struct strioctl *strioc, mblk_t *ebp,
>       char *fmtp, cred_t *crp, int *rvalp);
>
> #else
497d523
< extern int straccess();
512,514d537
< extern int strcopyin();
< extern int strcopyout();
< extern void strsignal();
517c540,546
< #endif        /* _IO_STRSUBR_H */
---
> extern int stropen();
> extern int strclose();
> extern int strdoioctl();
>
> #endif /* __STDC__ */
> #endif        /* _SYS_STRSUBR_H */
>
```

© COPYRIGHT 1994 AMDAHL CORPORATION

```
0a1,6
> /* File: sysmacros.h - last edit:
>  * helge    Mon Aug 26 15:17:28 1991
>  *
>  * Copyright (c) 1991 by Amdahl Corporation. All rights reserved.
>  */
>
15c21
< #ifdef _KERNEL
---
> #include <sys/param.h>   /* COMPATIBILITY */
17,79d22
< #ifndef _UTIL_PARAM_H
< #include <util/param.h> /* COMPATIBILITY */
< #endif
<
< #else
<
< #include <sys/param.h> /* COMPATIBILITY */
<
< #endif /* _KERNEL */
<
< /*
<  * Some macros for units conversion
<  */
<
< /* Core clicks to segments and vice versa */
<
< #define ctos(x)         (((x) + (NCPS-1)) >> CPSSHIFT)
< #define    ctost(x)     ((x) >> CPSSHIFT)
< #define    stoc(x)      ((x) * NCPS)
<
< /* byte address to segment and vice versa */
< #define sgnum(x)   (((unsigned)(x) >> 17) & 0x1fff)
< #define stob(x)        ((((unsigned)(x)) & 0x1fff) << 17)
< #define    btos(x)      ((unsigned)(x) >> 17)
< #define secnum(x)  ((unsigned)(x) >> 30)
<
< /* Core clicks to immu max offset and vice versa */
< #define ctomo(x)    ((x) * 256 -1)
< #define motoc(x)    ((((x)+1)*8) >> BPCSHIFT)
< #define motob(x)    (8*((x)+1)-1)
<
< /*
<  * Disk blocks (sectors) and bytes.
```

© COPYRIGHT 1994 AMDAHL CORPORATION

```
<  */
< #define    dtob(DD)     ((DD) << SCTRSHFT)
< #define    btod(BB)     (((BB) + NBPSCTR - 1) >> SCTRSHFT)
< #define    btodt(BB)    ((BB) >> SCTRSHFT)
<
< /*
<  * Disk blocks (sectors) and pages.
<  */
< #define NDPP              4       /* Number of disk blocks per page */
< #define DPPSHFT           2       /* Shift for disk blocks per page. */
< #define    ptod(PP)     ((PP) << DPPSHFT)
< #define    dtop(DD)     (((DD) + NDPP - 1) >> DPPSHFT)
< #define dtopt(DD)  ((DD) >> DPPSHFT)
<
< /* clicks to bytes */
< #ifdef BPCSHIFT
< #define    ctob(x) ((x)<<BPCSHIFT)
< #else
< #define    ctob(x) ((x)*NBPC)
< #endif
<
< /* bytes to clicks */
< #ifdef BPCSHIFT
< #define    btoc(x) (((unsigned)(x)+(NBPC-1))>>BPCSHIFT)
< #define    btoct(x)     ((unsigned)(x)>>BPCSHIFT)
< #else
< #define    btoc(x) (((unsigned)(x)+(NBPC-1))/NBPC)
< #define    btoct(x)     ((unsigned)(x)/NBPC)
< #endif
<
104,107c47,48
< #define L_MAXMAJ        0xff    /* Although 14 bits are reserved,
<                         ** the 3b2 major number is restricted
<                         ** to 8 bits.
<                         */
---
> #define L_MAXMAJ        0xff    /* Although 14 bits are reserved, * the 3b2
>                          * major number is restricted * to 8 bits. */
109,112c50,52
< #define L_MAXMIN        0x3ffff /* MAX minor for 3b2 software drivers.
<                         ** For 3b2 hardware devices the minor is
<                         ** restricted to 256 (0-255)
<                         */
---
> #define L_MAXMIN        0x3ffff /* MAX minor for 3b2 software drivers. * For
```

© COPYRIGHT 1994 AMDAHL CORPORATION

```
>                       * 3b2 hardware devices the minor is *
>                       * restricted to 256 (0-255) */
114c54,55
< #ifdef _KERNEL
---
> /* major part of a device external from the kernel (same as emajor below) */
> #define      major(x)      (int)(((unsigned)(x)>>O_BITSMINOR)&O_MAXMAJ)
116,122d56
< /* major part of a device internal to the kernel */
< #define NMAJORENTRY  256    /* Number of entries in major/minor array */
<
< extern char MAJOR[NMAJORENTRY];
< #define      major(x)      (int)(MAJOR[(unsigned)((x)>>O_BITSMINOR) & O_MAXMAJ])
< #define      bmajor(x)     (int)(MAJOR[(unsigned)((x)>>O_BITSMINOR) & O_MAXMAJ])
<
125c59
< #define      getmajor(x)   (int)(MAJOR[(unsigned)((x)>>L_BITSMINOR) & L_MAXMAJ])
---
> #define      getmajor(x)   (int)((unsigned)((x)>>L_BITSMINOR) & L_MAXMAJ)
127,129c61,62
< /* minor part of a device internal to the kernel */
< extern char MINOR[256];
< #define      minor(x)
(int)(MINOR[(unsigned)((x)>>O_BITSMINOR)&O_MAXMAJ]+((x)&O_MAXMIN))
---
> /* minor part of a device external from the kernel  (same as eminor below)*/
> #define      minor(x)      (int)((x)&O_MAXMIN)
133c66
< #define      getminor(x)
(int)(MINOR[(unsigned)((x)>>L_BITSMINOR)&L_MAXMAJ]+((x)&L_MAXMIN))
---
> #define      getminor(x)   (int)((x)&L_MAXMIN)
135,145d67
< #else
<
< /* major part of a device external from the kernel (same as emajor below) */
< #define      major(x)      (int)(((unsigned)x>>O_BITSMINOR)&O_MAXMAJ)
<
<
< /* minor part of a device external from the kernel  (same as eminor below)*/
< #define      minor(x)      (int)(x&O_MAXMIN)
<
< #endif       /* _KERNEL */
<
205a130,135
```

© COPYRIGHT 1994 AMDAHL CORPORATION

```
> #ifdef MC68000
> #define     SALIGN(p)          (char *)(((int)p+1) & ~1)
> #define     IALIGN(p)          (char *)(((int)p+1) & ~1)
> #define     LALIGN(p)          (char *)(((int)p+1) & ~1)
> #endif
>
```

© COPYRIGHT 1994 AMDAHL CORPORATION

```
0a1,6
> /* File: ttold.h - last edit:
>  * helge      Thu Aug 29 11:57:46 1991
>  *
>  * Copyright (c) 1991 by Amdahl Corporation. All rights reserved.
>  */
>
10,11c16
< #ifndef _IO_TTOLD_H       /* wrapper symbol for kernel use */
< #define _IO_TTOLD_H       /* subject to change without notice */
---
> #ifndef _SYS_TTOLD_H
39,43d43
< #ifndef _SGTTY_H
< /*
<  * Structure for TIOCGETP and TIOCSETP ioctls.
<  */
<
63d62
< #endif /* _SGTTY_H */
65,247c64
< /*
<  * 4.3BSD/XENIX tty ioctl commands that are either:
<  *  1) deprecated
<  *  2) not implemented (and never were implemented)
<  *  3) implemented on top of new-style "ioctl"s.
<  */
<
< /*
<  * These ioctls are also defined in termios.h.
<  * because XENIX expects to see them in termio.h
<  */
<
< #ifndef tIOC
< #define       tIOC    ('t'<<8)
< #endif
<
< #ifndef _IO_TERMIOS_H
< /* defined in termios.h also so that all the ioctl codes are visible*/
<
< #define TIOCGETD          (tIOC|0)
< #define TIOCSETD          (tIOC|1)
< #ifndef _SGTTY_H
< #define TIOCHPCL          (tIOC|2)
< #define TIOCGETP          (tIOC|8)
```

© COPYRIGHT 1994 AMDAHL CORPORATION

```
< #define TIOCSETP        (tIOC|9)
< #endif /* _SGTTY_H */
< #define TIOCSETN        (tIOC|10)
< #ifndef _SGTTY_H
< #define TIOCEXCL        (tIOC|13)
< #define TIOCNXCL        (tIOC|14)
< #endif /* _SGTTY_H */
< #define TIOCFLUSH       (tIOC|16)
< #define TIOCSETC        (tIOC|17)
< #define TIOCGETC        (tIOC|18)
<
< /* BSD ioctls that are not the same as XENIX */
< #define    TIOCLBIS    (tIOC|127)   /* bis local mode bits */
< #define    TIOCLBIC    (tIOC|126)   /* bic local mode bits */
< #define    TIOCLSET    (tIOC|125)   /* set entire local mode word */
< #define    TIOCLGET    (tIOC|124)   /* get local modes */
< #define    TIOCSBRK    (tIOC|123)   /* set break bit */
< #define    TIOCCBRK    (tIOC|122)   /* clear break bit */
< #define    TIOCSDTR    (tIOC|121)   /* set data terminal ready */
< #define    TIOCCDTR    (tIOC|120)   /* clear data terminal ready */
< #define    TIOCSLTC    (tIOC|117)   /* set local special chars */
< #define    TIOCGLTC    (tIOC|116)   /* get local special chars */
< #define    TIOCOUTQ    (tIOC|115)   /* driver output queue size */
< #define    TIOCNOTTY   (tIOC|113)   /* void tty association */
< #define    TIOCSTOP    (tIOC|111)   /* stop output, like ^S */
< #define    TIOCSTART   (tIOC|110)   /* start output, like ^Q */
<
< #define    TIOCREMOTE       (tIOC|30)     /* remote input editing */
<
< /* windowing ioctls and structure also defined in termios.h */
<
< #define    TIOC  ('T'<<8)
<
< #define TIOCGWINSZ (TIOC|104)
< #define TIOCSWINSZ (TIOC|103)
<
< #ifndef _IO_PTEM_H
< /* Windowing structure to support TIOCSWINSZ/TIOCGWINSZ */
< struct winsize {
<       unsigned short ws_row;      /* rows, in characters*/
<       unsigned short ws_col;      /* columns, in character */
<       unsigned short ws_xpixel;   /* horizontal size, pixels */
<       unsigned short ws_ypixel;   /* vertical size, pixels */
< };
<
```

© COPYRIGHT 1994 AMDAHL CORPORATION

```
<
< #endif /* end _IO_PTEM_H */
< #endif /* end _IO_TERMIOS_H */
<
< /* Old SVR3.0 flags - should be removed if there is no problem */
< /* note they are commented out */
<
< #if 0
<
< #define     O_HUPCL     01
< #define     O_XTABS     02
< #define     O_LCASE     04   /* simulate lower case */
< #define     O_ECHO      010  /* echo input */
< #define     O_CRMOD     020  /* map \r to \r\n on output */
< #define     O_RAW       040  /* no i/o processing */
< #define     O_ODDP      0100 /* get/send odd parity */
< #define     O_EVENP     0200 /* get/send even parity */
< #define     O_NLDELAY 001400          /* \n delay */
< #define     O_NL1       000400
< #define     O_NL2       001000
< #define     O_TBDELAY 002000          /* horizontal tab delay */
< #define     O_NOAL      004000
< #define     O_CRDELAY 030000          /* \r delay */
< #define     O_CR1       010000
< #define     O_CR2       020000
< #define     O_VTDELAY 040000          /* vertical tab delay */
< #define     O_BSDELAY 0100000 /* \b delay */
<
< #endif
<
< /* 4.3 BSD additions. These are new codes  and some of the
<  * flags that were there in SVR3.2 ttold.h have been given
<  * new codes. Otherwise they will not fit in a word.
<  */
<
< #define          O_TANDEM   0x00000001     /* send stopc on out q full */
< #define          O_CBREAK   0x00000002     /* half-cooked mode */
< #define          O_LCASE            0x00000004     /* simulate lower case */
< #define          O_ECHO             0x00000008     /* echo input */
< #define          O_CRMOD            0x00000010     /* map \r to \r\n on output */
< #define          O_RAW              0x00000020     /* no i/o processing */
< #define          O_ODDP             0x00000040     /* get/send odd parity */
< #define          O_EVENP            0x00000080     /* get/send even parity */
< #define          O_ANYP             0x000000c0     /* get any parity/send none */
< #define          O_NLDELAY 0x00000300     /* \n delay */
```

© COPYRIGHT 1994 AMDAHL CORPORATION

```
< #define            O_NL0       0x00000000
< #define            O_NL1       0x00000100    /* tty 37 */
< #define            O_NL2       0x00000200    /* vt05 */
< #define            O_NL3       0x00000300
< #define        O_TBDELAY  0x00000c00    /* horizontal tab delay */
< #define            O_TAB0      0x00000000
< #define            O_TAB1      0x00000400    /* tty 37 */
< #define            O_TAB2      0x00000800
< #define        O_XTABS         0x00000c00    /* expand tabs on output */
< #define        O_CRDELAY  0x00003000    /* \r delay */
< #define            O_CR0       0x00000000
< #define            O_CR1       0x00001000    /* tn 300 */
< #define            O_CR2       0x00002000    /* tty 37 */
< #define            O_CR3       0x00003000    /* concept 100 */
< #define        O_VTDELAY  0x00004000    /* vertical tab delay */
< #define            O_FF0 0x00000000
< #define            O_FF1 0x00004000    /* tty 37 */
< #define        O_BSDELAY  0x00008000    /* \b delay */
< #define            O_BS0 0x00000000
< #define            O_BS1 0x00008000
< #define    O_ALLDELAY
(O_NLDELAY|O_TBDELAY|O_CRDELAY|O_VTDELAY|O_BSDELAY)
< #define        O_CRTBS          0x00010000    /* do backspacing for crt */
< #define        O_PRTERA    0x00020000    /* \ ... / erase */
< #define        O_CRTERA    0x00040000    /* " \b " to wipe out char */
< #define        O_TILDE          0x00080000    /* hazeltine tilde kludge */
< #define        O_MDMBUF    0x00100000    /* start/stop output on carrier intr */
< #define        O_LITOUT    0x00200000    /* literal output */
< #define        O_TOSTOP    0x00400000    /* SIGSTOP on background output */
< #define        O_FLUSHO    0x00800000    /* flush output to terminal */
< #define        O_NOHANG    0x01000000    /* no SIGHUP on carrier drop */
< #define        O_L001000   0x02000000
< #define        O_CRTKIL    0x04000000    /* kill line with " \b " */
< #define        O_PASS8          0x08000000
< #define        O_CTLECH    0x10000000    /* echo control chars as ^X */
< #define        O_PENDIN    0x20000000    /* tp->t_rawq needs reread */
< #define        O_DECCTQ    0x40000000    /* only ^Q starts after ^S */
< #define        O_NOFLSH    0x80000000    /* no output flush on signal */
<
< /* more BSD flags */
< #define        LCRTBS           (O_CRTBS>>16)
< #define        LPRTERA          (O_PRTERA>>16)
< #define        LCRTERA          (O_CRTERA>>16)
< #define        LTILDE           (O_TILDE>>16)
< #define        LMDMBUF          (O_MDMBUF>>16)
```

© COPYRIGHT 1994 AMDAHL CORPORATION

```
< #define        LLITOUT        (O_LITOUT>>16)
< #define        LTOSTOP        (O_TOSTOP>>16)
< #define        LFLUSHO        (O_FLUSHO>>16)
< #define        LNOHANG        (O_NOHANG>>16)
< #define        LCRTKIL        (O_CRTKIL>>16)
< #define        LPASS8         (O_PASS8>>16)
< #define        LCTLECH        (O_CTLECH>>16)
< #define        LPENDIN        (O_PENDIN>>16)
< #define        LDECCTQ        (O_DECCTQ>>16)
< #define        LNOFLSH        (O_NOFLSH>>16)
<
<
< #define        NOPOST         0x00000001    /* no processing on output (LITOUT with
7 bits + parity) */
< #define        NOISIG         0x00000002    /* disable all signal-generating characters
*/
< #define        STOPB          0x00000004    /* two stop bits */
<
< #define   OTTYDISC    0          /* old, v7 std tty driver */
< #define   NETLDISC    1          /* line discip for berk net */
< #define   NTTYDISC    2          /* new tty discipline */
< #define   TABLDISC    3          /* hitachi tablet discipline */
< #define   NTABLDISC   4          /* gtco tablet discipline */
< #define   MOUSELDISC       5          /* mouse discipline */
< #define   KBDLDISC    6          /* up/down keyboard trans (console) */
<
< #endif    /* _IO_TTOLD_H */
---
> #endif    /* _SYS_TTOLD_H */
```

© COPYRIGHT 1994 AMDAHL CORPORATION

```
1,3c1,5
< /*   Copyright (c) 1990, 1991 UNIX System Laboratories, Inc.       */
< /*   Copyright (c) 1984, 1986, 1987, 1988, 1989, 1990 AT&T         */
< /*     All Rights Reserved              */
---
> /* File: var.h - last edit:
>  * helge      Wed Aug 14 18:40:11 1991
>  *
>  * Copyright (c) 1991 by Amdahl Corporation. All rights reserved.
>  */
5,8d6
< /*   THIS IS UNPUBLISHED PROPRIETARY SOURCE CODE OF          */
< /*   UNIX System Laboratories, Inc.                     */
< /*   The copyright notice above does not evidence any        */
< /*   actual or intended publication of such source code.     */
13,14d10
< #ident      "@(#)uts-3b2:util/var.h       1.3"
<
18,46d13
< struct var {
<       int     v_buf;          /* Nbr of I/O buffers.              */
<       int     v_call;         /* Nbr of callout (timeout) entries.   */
<       int     v_proc;                 /* Max nbr of processes system wide   */
<       int     v_filler;       /* (unused)                         */
<       int     v_filler2;      /* (unused)                         */
<       int     v_maxsyspri;    /* Max global pri used by sys class.   */
<       int     v_clist;        /* Nbr of clists allocated.         */
<       int     v_maxup;        /* Max number of processes per user. */
<       int     v_hbuf;                 /* Nbr of hash buffers to allocate.   */
<       int     v_hmask;        /* Hash mask for buffers.           */
<       int     v_pbuf;                 /* Nbr of physical I/O buffers.             */
<       int     v_sptmap;       /* Size of system virtual space     */
<                               /* allocation map.                  */
<       int     v_maxpmem;      /* The maximum physical memory to use.   */
<                               /* If v_maxpmem == 0, then use all   */
<                               /* available physical memory.       */
<                               /* Otherwise, value is amount of mem to    */
<                               /* use specified in pages.          */
<       int     v_autoup;       /* The age a delayed-write buffer must     */
<                               /* be in seconds before bdflush will   */
<                               /* write it out.              */
<       int     v_bufhwm;       /* high-water-mark of buffer cache     */
<                               /* memory usage, in units of K Bytes   */
< /* #ifdef MERGE */
<       int     v_xsdsegs;      /* Number of XENIX shared data segs */
```

© COPYRIGHT 1994 AMDAHL CORPORATION

```
<       int     v_xsdslots;         /* Number of slots in xsdtab[] per segment */
< /* #endif MERGE */
< };
48c15
< extern struct var v;
---
> #define CALLOUT_TBL_SIZE 1024
```

© COPYRIGHT 1994 AMDAHL CORPORATION

```
/* File: adm55.h - last edit:
 * helge      Thu Mar 12 09:27:04 1992
 * lyatin     Tue Jan 21 11:31:14 1992
 *
 * Copyright (c) 1991 by Amdahl Corporation. All rights reserved.
 */

#ifndef _SYS_ADM55_H_
#define _SYS_ADM55_H_

#if _UTS
#include <io/stream.h>
#else
#include <sys/stream.h>
#endif

#define DEVLOOP "/dev/adm55"

struct loop {
    queue_t *qptr; /* back pointer to write queue */
    queue_t *oqptr; /* pointer to connected read queue */
};

#define LOOP_SET (('1'<<8)|1)

extern struct loop loop_loop[];
extern int loop_cnt;

#endif /* _SYS_ADM55_H_ */
```

© COPYRIGHT 1994 AMDAHL CORPORATION

```
#ident "%W% %G% %U% %n%"
/* File: agent.h - last edit:
 * helge        Mon Mar 29 11:27:41 1993
 *
 * Copyright (c) 1993 by Amdahl Corporation. All rights reserved.
 * Copyright (c) 1992 by Amdahl Corporation. All rights reserved.
 * Copyright (c) 1991 by Amdahl Corporation. All rights reserved.
 */

#ifndef _SYS_AGENT_H
#define _SYS_AGENT_H

#include <sys/dsf.h>
#include <sys/dsf_obj.h>
#include <sys/proc.h>

struct proc_req {
    struct dsf_chan_obj *dsf_chan_obj_ptr; /* dsf channel object */
    int dest_id;
    int src_id;
    struct proc_req *next_req; /* To make a list of proc_req */
    int int_sig; /* If 1, an R_INTERRUPT signal was received */
    union dsf_admin_msg dsf_admin_msg;
};

extern struct proc_req *delayed_proc_req;

#ifdef __STDC__
extern struct proc_req *alloc_proc_req(void);
extern void free_proc_req(struct proc_req *proc_req);
extern proc_t *find_agent(int src_id, int dest_id);
extern void stop_opening_strs(struct dsf_chan_obj *dsf_chan_obj_ptr);
extern void submit_proc_req(struct proc_req *p_req_ptr);
#else
extern struct proc_req *alloc_proc_req();
extern void free_proc_req();
extern proc_t *find_agent();
extern void stop_opening_strs();
extern void submit_proc_req();
#endif

#endif /* _SYS_AGENT_H */
```

© COPYRIGHT 1994 AMDAHL CORPORATION

```
#ident "%W% %G% %U% %n%"
/* %N% */

/* File: clock.h - last edit:
 * helge        Tue Mar 16 15:07:16 1993
 *
 * Copyright (c) 1993 by Amdahl Corporation. All rights reserved.
 * Copyright (c) 1992 by Amdahl Corporation. All rights reserved.
 * Copyright (c) 1991 by Amdahl Corporation. All rights reserved.
 */

#ifndef _SYS_CLOCK_H
#define _SYS_CLOCK_H

#include <sys/types.h>

extern volatile clock_t lbolt;          /* time in HZ since last boot */
extern clock_t boot_time;       /* Boot time in seconds after 1-1-1970 */
extern long adjust_rtime; /* When resetting clock this could be negative */

#ifndef RTSOURCE
#define clock sys_timer_handler
#endif

#ifdef __STDC__

extern int clock(void);
extern int timeout(void (*fun) (), caddr_t arg, long tim);
extern int ttimeout(void (*fun) (), caddr_t arg, long tim);
extern int untimeout(int id);
extern void delay(long ticks);

#endif /* __STDC__ */

#endif /* _SYS_CLOCK_H */
```

© COPYRIGHT 1994 AMDAHL CORPORATION

```
/* File: devlist.h - last edit:
 * helge        Wed Mar 11 19:10:48 1992
 *
 * Copyright (c) 1991 by Amdahl Corporation. All rights reserved.
 */

/*
 * Configured devices for a given installation.
 * Each entry consists of the basename of the device followed by a directive.
 * A directive has the form "n [- m] [f]", where n is -1 or a non-negative
 * integer, m (if present) is a non-negative integer, and if 'f' is
 * present an fnode gets created as well (otherwise only a vnode gets created).
 * If n == -1, than a name is interpreted as a clone device.
 * Otherwise a new name is created for the fnode consisting of the basename
 * followed by the minor device number.
 * For example:
 * "tcp", "-1 f" would configure tcp as a clone device. tcp would be entered
 * into the fnode table with the major number of the clone device and as
 * minor number tcp's major number would be used.
 * "enet", "0 - 3 f" would configure enet as as non-clone device with the
 * minor device numbers 0 to 3 and enter the names enet0 to enet3 into the
 * fnode table.
 */

struct devicelist {
    char *dev_name; /* Base name of device */
    char *directive; /* Clone or non-clone and minor device number range */
};

extern struct devicelist devicelist[];
extern int devlist_size;
```

© COPYRIGHT 1994 AMDAHL CORPORATION

```
#ident "%W% %G% %U% %n%"

/* File: dsf.h - last edit:
 * helge        Mon Dec  7 11:46:12 1992
 *
 * Copyright (c) 1992 by Amdahl Corporation. All rights reserved.
 */


#ifndef _SYS_DSF_H
#define _SYS_DSF_H

#ifdef _KERNEL
#include <util/param.h>
#include <io/stream.h>
#include <util/types.h>
#else
#include "sys/param.h"
#include "sys/stream.h"
#include "sys/types.h"
#endif

/*
 * Open request sent by side that actively opens DSF channel.
 */

#define MAX_ID_LEN 64

struct dsf_open_req {
    u_char conv_flags[4]; /* Data representation */
    uint version;        /* DSF version number */
    char id[MAX_ID_LEN]; /* Unique channel identifier id */
};

/*
 * The response to an open request
 */

struct dsf_open_resp {
    u_char conv_flags[4]; /* Data representation */
    uint version;        /* DSF version number */
    ushort open_strms;   /* Number of existing streams on this channel */
    u_char error_code;    /* Error code */
    u_char pad;           /* Make it a multiple of 4 bytes */
```

© COPYRIGHT 1994 AMDAHL CORPORATION

```
};

#define DSF_VERSION 0 /* No data representation conversion support */

/* Values for error code */

#define DSF_OPEN_OK 0
#define DSF_VERSION_MISMATCH 1
#define DSF_DATAREP_MISMATCH 2

#define DSF_NORMAL_PRI   0 /* For normal messages */
#define DSF_BAND_PRI       1 /* Priority messages */
#define DSF_HI_PRI   2 /* High priority messages */

#define DSF_PRIO_NUM (DSF_HI_PRI + 1)

/*
 * DSF Admin message types.
 */

#define R_OPEN_REQ          1
#define R_OPEN_RESP         2
#define R_CLOSE_REQ         3
#define R_CLOSE_RESP        4
#define R_PUSH_REQ          5
#define R_PUSH_RESP         6
#define R_POP_REQ   7
#define R_POP_RESP  8
#define R_LINK_REQ 9
#define R_LINK_RESP          10
#define R_UNLINK_REQ         11
#define R_UNLINK_RESP        12
#define R_ACK_MSG  13
#define R_NAK_MSG       14
#define R_NO_PARTNER      15
#define DSF_CHAN_CLOSE_REQ      16
#define DSF_CHAN_CLOSE_RESP     17
#define DSF_RECONN_REQ 18
#define DSF_RECONN_RESP 19
#define R_INTERRUPT         20
#define DSF_KEEPALIVE_REQ        21
#define DSF_KEEPALIVE_RESP       22
#define R_SET_PRIO  23

/* DSF version of cred struct. Credentials could have different sizes on
```

© COPYRIGHT 1994 AMDAHL CORPORATION

```
* different systems. This definition assumes the maximum size.
* To be compatible with SVR3.2 systems, the element types have been
* converted to their base types.
*/

struct dsf_cred {
    ushort cr_ref;          /* reference count */
    ushort cr_ngroups;      /* number of groups in cr_groups */
    long cr_uid;            /* effective user id */
    long cr_gid;            /* effective group id */
    long cr_ruid;           /* real user id */
    long cr_rgid;           /* real group id */
    long cr_suid;           /* "saved" user id (from exec) */
    long cr_sgid;           /* "saved" group id (from exec) */
    unsigned long cr_wkgpriv;   /* working privilege vector */
    unsigned long cr_maxpriv;   /* maximum privilege vector */
    unsigned long cr_lid;       /* Level IDentifier (MAC) */
    unsigned long cr_cmwlid;    /* Level IDentifier (MAC) CMW */
    unsigned long cr_flags;     /* Add'l cred flags (see below) */
    long cr_groups[32];         /* supplementary group list */
};

#define DRV_NAME_LENGTH 12

struct r_open_req {
    int type; /* R_OPEN_REQ */
    struct dsf_cred user_cred;
    int orig_window_size;
    char dev_name[DRV_NAME_LENGTH];
    int minor_dev;
    int flag;
    int sflag;
};

struct user_ctxt_msg {
    int type;
    struct dsf_cred user_cred;
};

struct r_open_resp {
    int type; /* R_OPEN_RESP */
    int lower_window_size;
    int uerror;
    int minor_dev; /* Returned minor device number */
};
```

© COPYRIGHT 1994 AMDAHL CORPORATION

```
struct r_close_req {
   int type; /* R_CLOSE_REQ */
   struct dsf_cred user_cred;
};

struct r_cmd_resp {
   int type;
   int uerror;
};

struct r_push_req {
   int type; /* R_PUSH_REQ */
   struct dsf_cred user_cred;
   char mod_name[DRV_NAME_LENGTH];
};

struct r_pop_req {
   int type; /* R_POP_REQ */
   struct dsf_cred user_cred;
};

struct r_link_req {
   int type; /* R_LINK_REQ */
   struct dsf_cred user_cred;
   int cmd; /* I_LINK or I_PLINK */
   int lower_fd;
   int upper_linkid;
};

struct r_link_resp {
   int type;
   int uerror;
   int upper_linkid;
   int lower_linkid;
};

struct r_unlink_req {
   int type; /* R_UNLINK_REQ */
   struct dsf_cred user_cred;
   int cmd; /* I_LINK or I_PLINK */
   int upper_linkid;
   int lower_linkid;
};

struct r_unlink_resp {
```

© COPYRIGHT 1994 AMDAHL CORPORATION

```
    int type; /* R_UNLINK_RESP */
    int uerror;
    int upper_linkid;
};

struct r_ack_msg {
    int type; /* R_ACK_MSG */
    int priority; /* Priority queue this ACK refers to */
    uint ack_seq; /* Last seq number received plus one */
    int window_size; /* Window accepted beyond ack_seq */
};

struct r_nak_msg {
    int type; /* R_NAK_MSG */
    int priority; /* Priority of queue this NAK refers to */
    uint nak_seq; /* Seq number of message to be retransmitted */
    int window_size; /* Window accepted beyond acked message */
};
struct r_no_partner {
    int type; /* R_NO_PARTNER */
    int src_id; /* Id of stream whose remote partner has been lost */
    int dest_id; /* No longer existing or matching dest_id */
};

struct dsf_close_msg {
    int type; /* DSF_CHAN_CLOSE_REQ or DSF_CHAN_CLOSE_RESP */
};

struct strm_assoc {
    int loc_id; /* Id of local stream */
    int rem_id; /* Id of remote partner */
    uint last_seq_rec[DSF_PRIO_NUM]; /* Sequence numbers of last message received for each priority
*/
    int window; /* Current window size */
};

#define ASSOC_LIST_LEN 64

struct dsf_reconn_req {
    int type; /* DSF_RECONN_REQ */
    int str_num; /* Number of stream pairs in following array */
    struct strm_assoc assoc_list[ASSOC_LIST_LEN];
};

struct dsf_reconn_resp {
```

© COPYRIGHT 1994 AMDAHL CORPORATION

```
    int type; /* DSF_RECONN_RESP */
    int str_num; /* Number of stream ids in the following array */
    int no_partner_list[ASSOC_LIST_LEN]; /* Ids of streams without partner */
};

struct r_interrupt {
    int type; /* R_INTERRUPT */
};

#define KEEPALIVE_INTERVAL (7*HZ)

struct dsf_keepalive {
    int type; /* DSF_KEEPALIVE_REQ or DSF_KEEPALIVE_RESP */
};

struct r_set_prio {
    int type; /* R_SET_PRIO */
};

union dsf_admin_msg {
    int type;
    struct user_ctxt_msg user_ctxt_msg;
    struct r_open_req r_open_req;
    struct r_cmd_resp r_cmd_resp;
    struct r_open_resp r_open_resp;
    struct r_close_req r_close_req;
    struct r_push_req r_push_req;
    struct r_pop_req r_pop_req;
    struct r_link_req r_link_req;
    struct r_link_resp r_link_resp;
    struct r_unlink_req r_unlink_req;
    struct r_unlink_resp r_unlink_resp;
    struct r_ack_msg r_ack_msg;
    struct r_nak_msg r_nak_msg;
    struct r_no_partner r_no_partner;
    struct dsf_close_msg dsf_close_msg; /* Used for both request and response */
    struct dsf_reconn_req dsf_reconn_req;
    struct dsf_reconn_resp dsf_reconn_resp;
    struct r_interrupt r_interrupt;
    struct dsf_keepalive dsf_keepalive;
    struct r_set_prio r_set_prio;
};

/*
 * Buffer for STREAMS message
```

© COPYRIGHT 1994 AMDAHL CORPORATION

```
 */

#define MSGFRAG 0x8000 /* If set in 'flag' more message fragments will come
                        * before complete message can be passed upstream.
                        * This is only used for messages of normal priority.
                        */

struct msg_buff {
    int length; /* Length of data part of message */
    ushort offset; /* db_base - b_rptr */
    ushort cont; /* If 1, there is another part following */
    unsigned short flag;
    u_char band; /* Priority */
    u_char type; /* Message type */
    int dataoffset; /* Offset of data from beginning of this structure */
};

/*
 * Outer frame for dsf message
 */

#define DSF_DATA    0 /* Frame contains STREAMS message */
#define DSF_ADMIN   1 /* Frame contains admin message */

#define BEGIN_FRAGMENT 0x80 /* Flag in fragm to indicate the first fragment */

struct dsf_msg_header {
    u_char type;        /* DSF_DATA or DSF_ADMIN */
    u_char priority;    /* priority of message */
    u_char ack_req;     /* Ack this message */
    u_char fragm;       /* Id of fragment, if 0 this msg is not fragmented */
    uint len;     /* Length of message including header */
    int dest_id;
    int src_id;
    uint seq;  /* Sequence number */
};

/*
 * dsf message - It consists of a header in case of an admin message, a
 *               body. In case of a data message the body consists of a
 *               sequence of msg_buff headers (one for each message block)
 *               and then the data of the messages themselves.
 */

struct dsf_msg {
```

© COPYRIGHT 1994 AMDAHL CORPORATION

```
    struct dsf_msg_header header;
    union {
        struct msg_buff data_msg;
        union dsf_admin_msg admin_msg;
    } body;
};

/*
 * Flow control information of the sending side
 */

/* States */

#define FLOWING 0 /* Window is open */
#define BLOCKED 1 /* Window closed */
#define NO_MEM  2 /* No memory */

struct xmit_info {
    uint cur_seq; /* Next sequence number to be sent */
    uint acked; /* Sequence number that was acked + 1 */
    mblk_t *fragp; /* Pointer to partially created fragments */
    mblk_t *xmit_msg; /* List of sent but not acked messages */
    mblk_t **last_msg; /* Points to address where to append new message */
    mblk_t *to_send_list; /* Points to list of messages that are ready to
                           * be sent but could not because dupb() failed.
                           */
};

struct send_queue_info {
    u_char state;
    short n_send_list; /* Number of to_send_lists != NULL */
    int cur_window; /* Number of bytes that can still be sent */
    int non_acked_bytes; /* Number of bytes not acked */
    struct xmit_info xmit_info[DSF_PRIO_NUM]; /* Xmit info for all priorities */
};

/*
 * Flow control information of the receiving queue
 */

struct rcv_info {
    uint rec_seq; /* Last sequence number received + 1 */
    uint ack_seq; /* Last sequence number acked + 1 */
    uint nak_seq; /* A NAK with nak_seq has been sent */
    mblk_t *rcv_frags; /* Message fragments received for this priority */
```

© COPYRIGHT 1994 AMDAHL CORPORATION

```
};

struct rec_queue_info {
   struct rcv_info rcv_info[DSF_PRIO_NUM]; /* Recv info for each priority */
   int ack_nak_bid; /* If != 0, an ACK or NAK is scheduled to be sent */
   int comm_win; /* Communicated window */
   int avail_win; /* Available window */
   int max_win; /* Maximum window for this stream */
};

struct r_queue_info {
   int remote_queue_id;
   struct send_queue_info send_info;
   struct rec_queue_info rec_info;
};

#endif /* _SYS_DSF_H */
```

© COPYRIGHT 1994 AMDAHL CORPORATION

```
#ident "%W% %G% %U% %n%"

/* File: dsf_obj.h - last edit:
 * helge        Fri Apr  9 15:12:56 1993
 *
 * Copyright (c) 1993 by Amdahl Corporation. All rights reserved.
 * Copyright (c) 1992 by Amdahl Corporation. All rights reserved.
 * Copyright (c) 1991 by Amdahl Corporation. All rights reserved.
 */

/*
 * This file contains the definitions for dsf channel object
 * that is used for communication between STREAMS components on
 * different systems.
 * Its purpose is to hide the various media used like VME bus, IBM channel,
 * or a tranport protocol.
 */

#ifndef _DSF_OBJ_H_
#define _DSF_OBJ_H_

#include <sys/dsf.h>
#include <sys/stream.h>
#include <bio.h>

#define DSF_UP 0
#define DSF_OPENING 1
#define DSF_CLOSING 2
#define DSF_DOWN 3
#define DSF_RESET 4 /* Media is being restarted causing an open to fail */
#define DSF_DEAD 5 /* Object does not longer exist, will be deallocated once
                    * str_list is empty.
                    */

struct dsf_stats {
    int n_opn_strms; /* Number of open streams */
    int n_nacks; /* Number of NAKs received */
    int seq_errors; /* Sequence number errors */
    int dup_errs; /* Number of times dupb() failed */
    int alloc_errs; /* Number of times receive buffers allocation failed */
    int rcv_refused; /* # of times receive was refused due to received_stopped */
    int inv_ids; /* Number of times invalid ids received */
    int last_msg_time; /* lbolt value of last msg received */
    int missed_keepalive; /* Set to one when no response came from remote */
    int msg_rcv; /* Number of messages received */
```

© COPYRIGHT 1994 AMDAHL CORPORATION

```
    int bytes_rcv; /* Number of bytes received */
    int msg_sent; /* Number of messages sent */
    int bytes_sent /* Number of bytes sent */
};

struct dsf_io_state {
    int part_id; /* Memory partition id */
    void *m_desc; /* Medium descriptor */
    int max_msg_size; /* Maximum message accepted by medium */
    mblk_t *first_msg;
    mblk_t *last_msg;
    mblk_t *last_band_msg;
};

#define DSF_THRU 0 /* Favor throughput for performance */
#define DSF_RESP 1 /* Favor response time for performance */

#define DSF_ACTIVE_OPEN  1
#define DSF_PASSIVE_OPEN 2

#define MAX_ADDR_LEN 60

struct dsf_open_parm {
    int mode; /* DSF_ACTIVE_OPEN or DSF_PASSIVE_OPEN */
    char address[MAX_ADDR_LEN]; /* Address of remote if active open, or
                                 * local address, if passive open.
                                 * Can be empty string.
                                 */
};

struct dsf_chan_obj {
    short status_flag; /* DSF_UP, DSF_OPENING, DSF_CLOSING, DSF_DOWN,
                        * or DSF_DEAD.
                        */
    short perf_flag; /* DSF_RESP or DSF_THRU */
    uint open_retry_time; /* Number of seconds between two open tries */
    int conv_flags; /* Data conversion flags, used if the data representation
                     * is different on each of the systems involved.
                     */
    char id[MAX_ID_LEN]; /* Id of instance. Used for reconnection */
    int (*open_fct)(struct dsf_open_parm *open_args, struct dsf_chan_obj
          *dsf_chan_obj_ptr);
    int (*read_fct)(void *m_desc, struct bio_buff **buff_ptr_ptr);
    int (*write_fct)(void *m_desc, mblk_t *mp, mblk_t **ret_mp);
                                /* The function sends STREAMS messages up
```

© COPYRIGHT 1994 AMDAHL CORPORATION

```
                                 * It returns 0 when successful and -1,
                                 * in case of a fatal error. ret_mp contains
                                 * the messages that could not be sent.
                                 */
  int (*close_fct)(void *m_desc, int sleep_flg); /* Closes a dsf channel */
  struct dsf_element *str_list; /* List of STREAMS using this channel */
  struct dsf_io_state io_state;
  struct dsf_stats dsf_stats;
};


struct dsf_chan_assoc {
  int tid;
  struct dsf_chan_obj *dsf_chan_obj_ptr;
  int dsf_chan_obj_type; /* Index into dsfchosw[] */
  struct dsf_open_parm dsf_open_parm; /* Parameters used for open */
};

#define MAX_DSF_CHANS 20
extern struct dsf_chan_assoc *dsf_chan_obj_tbl[];

/*
 * Struct for configuration table of dsf channel objects.
 */

#define MEDIA_NAMELENGTH 12

struct dsfchosw {
  char media_name[MEDIA_NAMELENGTH];
  struct dsf_chan_obj *template_obj; /* Contains the media dependent values */
};

extern struct dsfchosw dsfchosw[];
extern int dsfchocnt;

/* Tasks priorities (currently not used) */

#define DSF_VERSION 0  /* No support for data conversion */

/*
 * Struct that keeps track of the information needed to bind remote streams.
 */

#define DSF_BOTTOM 0 /* The stream component is on the device end */
#define DSF_TOP 1 /* The stream component is at the user end */
```

© COPYRIGHT 1994 AMDAHL CORPORATION

```
struct dsf_element {
   ushort dsf_type; /* DSF_TOP or DSF_BOTTOM */
   ushort priority; /* DSF_NORMAL or DSF_BAND_PRI */
   caddr_t dsf_str; /* Points to a data structure of type struct stdata in
                     * case dsf_type == DSF_BOTTOM, and of type queue_t in
                     * case dsf_type == DSF_TOP.
                     */
   queue_t *dsf_wrq; /* Write queue */
   struct dsf_chan_obj *dsf_chan_obj_ptr; /* DSF channel it is built on */
   struct dsf_element *dsf_next_el; /* Pointer to next stream in a list */
   struct dsf_element *dsf_prev_el; /* Pointer to prev stream in a list */
   mblk_t *dsf_rhipri_ml; /* List of high priority messages that could not be
                     * processed. To avoid eternal loop they cannot be
                     * put back on the read queue.
                     */
   struct r_queue_info dsf_rinfo; /* This is the flow control info. */
   int dsf_bid; /* bufcall() id, in case a bufcall is outstanding */
   int dsf_hbid; /* bufcall() id for failed msg header allocation */
   uint ioc_id; /* ioctl id of message with full credentials */
   mblk_t *ioc_cr;      /* message block with full credentials */
};

#ifdef __STDC__

extern int dsf_channel_open(char *media, int mode, char *address);
extern void dsf_delete_channel(int tid);
extern int dsf_channel_close(char *media, char *address);
extern int dsf_channel_reset(char *media, char *address);
extern int build_msg(struct msg_buff *buff_ptr, mblk_t **mpp);
extern void send_ack(struct dsf_element *dsfep, int priority);
extern void send_nak(struct dsf_element *dsfep, int priority);
extern void send_keepalive(struct dsf_chan_obj *dsf_chan_obj_ptr,
     int msg_type);
extern void send_set_prio(struct dsf_element *dsfep);
extern void transport_err(struct dsf_chan_obj *dsf_chan_obj_ptr);
extern void enter_dsf_id(int id);
extern void delete_dsf_id(int id);
extern int valid_dsf_id(int id);
extern void restart_queue(struct dsf_element *dsfep);
extern void free_mp_list(mblk_t *mp);
extern void append_mp(mblk_t **mlp, mblk_t *mp);
extern void write_admin_msg(struct dsf_element *dsfep, mblk_t *admin_msg);
extern void dsf_dup_bufcall(struct dsf_element *dsfep);
extern mblk_t *allocb_sleep(unsigned int size);
extern void dsf_alloc_error(struct dsf_element *dsfep,
```

© COPYRIGHT 1994 AMDAHL CORPORATION

```
     struct dsf_msg *cur_msg_ptr);
extern int rcv_fragment(struct dsf_element *dsfep, struct bio_buff *buff_ptr,
          struct dsf_msg *cur_msg_ptr, mblk_t **mpp);
extern void free_frags(struct dsf_chan_obj *dsf_chan_obj_ptr,
     struct rcv_info *rcv_infop);
extern void free_xfrags(struct xmit_info *xmit_infop);
extern int m_read_msg(struct dsf_chan_obj *dsf_chan_obj_ptr,
     struct bio_buff **buff_ptr_ptr);
extern int m_write_msg(struct dsf_chan_obj *dsf_chan_obj_ptr, mblk_t *mp,
     int prio, int len);
extern void m_cont_write(struct dsf_chan_obj *dsf_chan_obj_ptr);
extern int m_append_eom(caddr_t end_marker, int space_left);
extern int m_log_wrt_fct(struct dsf_io_state *io_statep, char **buf_ptr_ptr,
     int *rem_len_ptr);
extern int m_close(struct dsf_chan_obj *dsf_chan_obj_ptr, int sleep_flg);

#else

extern int dsf_channel_open();
extern void dsf_delete_channel();
extern int dsf_channel_close();
extern int dsf_channel_reset();
extern int build_msg();
extern int build_msg_buff();
extern int send_ack();
extern int send_nak();
extern void send_keepalive();
extern void send_set_prio();
extern void transport_err();
extern void enter_dsf_id();
extern void delete_dsf_id();
extern int valid_dsf_id();
extern void restart_queue();
extern void free_mp_list();
extern void append_mp();
extern void write_admin_msg();
extern void dsf_dup_bufcall();
extern mblk_t *allocb_sleep();
extern void dsf_alloc_error();
extern int rcv_fragment();
extern void free_frags();
extern void free_xfrags();
extern int m_read_msg();
extern int m_write_msg();
extern void m_cont_write();
```

© COPYRIGHT 1994 AMDAHL CORPORATION

```
extern int m_append_eom();
extern int m_log_wrt_fct();
extern int m_close();

#endif

#endif /* _DSF_OBJ_H_ */
```

© COPYRIGHT 1994 AMDAHL CORPORATION

```
#ident "%W% %G% %U% %n%"
/* %N% */
/* File: lstream.h - last edit:
 * helge        Tue Mar  9 13:25:34 1993
 *
 * Copyright (c) 1993 by Amdahl Corporation. All rights reserved.
 * Copyright (c) 1991 by Amdahl Corporation. All rights reserved.
 */

#ifndef _LSTREAM_H_
#define _LSTREAM_H_

#include <sys/cred.h>
#include <sys/privilege.h>
#include <sys/stream.h>
#include <sys/strsubr.h>
#include <sys/types.h>

struct file_desc {
    struct stdata *stp;
};

extern struct streamtab loc_strhinfo;
extern struct cred loc_cred;

#define MAX_FD 60 /* Maximum number of file descriptors */
extern struct file_desc lstr_fd[MAX_FD];

#endif /* _LSTREAM_H_ */
```

© COPYRIGHT 1994 AMDAHL CORPORATION

```
#ident "%W% %G% %U% %n%"

/* File: proc.h - last edit:
 * helge        Tue Apr  6 17:46:00 1993
 *
 * Copyright (c) 1993 by Amdahl Corporation. All rights reserved.
 * Copyright (c) 1992 by Amdahl Corporation. All rights reserved.
 * Copyright (c) 1991 by Amdahl Corporation. All rights reserved.
 */

#ifndef _SYS_PROC_H
#define _SYS_PROC_H

#include <sys/cred.h>
#include <sys/types.h>
#include <compiler.h>
#include <vrtxvisi.h>

#define SIDLE 0         /* Process not active */
#define         SSLEEP       1       /* awaiting an event */
#define SSLPNOSIG 3 /* Sleeping, but signal will not interrupt */
#define         SRUN  6        /* ready or running */

/* WARNING: idump depends on the offsets of the first three fields and
 * that the table size (PROC_TBL_SIZE) is 32
 */
typedef struct proc {
        TCB *p_tcb; /* Pointer to tasks VRTX tcb */
        int p_tid;          /* Task id on board */
        struct proc *p_plink;    /* Points to next element in proc_tbl list */
        struct proc *p_link;     /* Points to next element in sleep list or
                                  * ready q */
        struct proc *p_ilink;    /* Points to next el in idle list (active
                                  * list) */
        short p_stat;     /* SIDLE, SSLEEP, SSLPNOSIG, SRUN */
        short p_int;      /* If 0, process has received an interrupt signal */
        void (*p_func) ();        /* Function to execute */
        int priority;     /* Process priority (not used currently) */
        struct cred *p_cred;     /* User information */
        int p_uerror;     /* Error code to be returned to user process */

        caddr_t p_param;         /* Task parameter */
        caddr_t p_wchan;         /* Channel process (task) is sleeping on */
}    proc_t;
```

© COPYRIGHT 1994 AMDAHL CORPORATION

```
#define PROC_TBL_SIZE 32
#define PT_HASH(x) (&proc_tbl[((int) (x)) & (PROC_TBL_SIZE - 1)])

extern proc_t *proc_tbl[PROC_TBL_SIZE];

extern proc_t *preadyq;         /* List of processes ready to run */
extern proc_t *preadyq_last;    /* Last process in ready queue */
extern proc_t *run_pp;          /* Currently running process */


#define NORM_PROC_PRIO 10       /* VRTX priority of all processes started by
                                 * ufork */

/* Activate a process (interrupts have to be disabled) */
/* Currently we have simple round robin */
#define ACTIVATE_PROC(pp) { \
        if (preadyq_last != NULL) { \
                if (pp->priority < 0) /* Check for admin task */ { \
                        pp->p_link = preadyq; \
                        preadyq = pp; \
                } else { \
                        preadyq_last->p_link = pp; \
                        preadyq_last = pp; \
                        pp->p_link = NULL; \
                } \
        } else { \
                preadyq = pp; \
                preadyq_last = pp; \
                pp->p_link = NULL; \
        } \
}

/* SCHED_PROC - give the CPU to the next one, current task gives up CPU */
/* Interrupts have to be disabled */
#define SCHED_PROC { \
    if ((run_pp = preadyq) != NULL) { \
        int err; \
        if ((preadyq = preadyq->p_link) == NULL) \
            preadyq_last = NULL; \
        sc_tresume(run_pp->p_tid, 0, &err); \
    } \
}

/* get_procp - Get pp of current task */
```

© COPYRIGHT 1994 AMDAHL CORPORATION

```
#define get_procp() run_pp

#ifdef __STDC__
extern proc_t *init_task_procp(void);
extern int get_proc_arg(caddr_t *);
extern proc_t *fork_utask(void (*) (), int, int, caddr_t);
extern void kill(int tid);
extern int sleep(caddr_t chan, int disp);
extern void unsleep(proc_t * pp);
extern void wakeprocs(caddr_t chan, int preemptflg);
extern void wakeup(caddr_t chan);
extern void setrun(proc_t *);
extern void signal_proc(proc_t *);
extern void reschedule(void);

#else
extern proc_t *init_task_procp();
extern int get_proc_arg();
extern void kill();
extern proc_t *fork_utask();
extern int sleep();
extern void unsleep();
extern void wakeprocs();
extern void wakeup();
extern void setrun();
extern void signal_proc();
extern void reschedule();

#endif

#endif /* _SYS_PROC_H */
```

© COPYRIGHT 1994 AMDAHL CORPORATION

```
/* File: vnode.h - last edit:
 * helge        Wed Dec 18 19:12:18 1991
 *
 * Copyright (c) 1991 by Amdahl Corporation. All rights reserved.
 */

/*      Copyright (c) 1990, 1991 UNIX System Laboratories, Inc.     */
/*      Copyright (c) 1984, 1986, 1987, 1988, 1989, 1990 AT&T       */
/*        All Rights Reserved      */

/*      THIS IS UNPUBLISHED PROPRIETARY SOURCE CODE OF        */
/*      UNIX System Laboratories, Inc.              */
/*      The copyright notice above does not evidence any       */
/*      actual or intended publication of such source code.    */

/*
                                                                  *
+++++++++++++++++++++++++++++++++++++++++++++++++++++++++++++++++++++
++++++++++
 *            PROPRIETARY NOTICE (Combined)
 *
 * This source code is unpublished proprietary information
 * constituting, or derived under license from AT&T's UNIX(r) System V.
 * In addition, portions of such source code were derived from Berkeley
 * 4.3 BSD under license from the Regents of the University of
 * California.
 *
 *
 *
 *            Copyright Notice
 *
 * Notice of copyright on this source code product does not indicate
 * publication.
 *
 *      (c) 1986,1987,1988,1989  Sun Microsystems, Inc
 *      (c) 1983,1984,1985,1986,1987,1988,1989  AT&T.
 *            All rights reserved.
 *
 */

#ifndef _SYS_VNODE_H
#define _SYS_VNODE_H

#include <sys/stream.h>
#include <sys/types.h>
```

© COPYRIGHT 1994 AMDAHL CORPORATION

```
#define VNODE_MARK 0xaaa0
#define VPERM VNODE_MARK /* Permanent vnode to remain even when file is closed */
#define VTEMP (VNODE_MARK|1) /* Temporary vnode (created for clone devices).
                    * Remove after closed.
                          */

typedef struct vnode {
    u_short v_count;     /* reference count */
    u_short v_type; /* VTEMP or VPERM */
    struct stdata *v_stream;      /* associated stream */
    int flag; /* Saved open flag */
    struct streamtab *strhinfo;
    dev_t dev;
    struct vnode *next_node; /* Link for free list or hash table */
} vnode_t;

/*
 * Public vnode manipulation functions.
 */

#ifdef __STDC__

extern int closevp(struct vnode *vp, struct cred *cred);
extern struct vnode *alloc_vnode(void);
extern void free_vnode(struct vnode *);
extern struct vnode *enter_vnode(dev_t, u_short);
extern struct vnode *find_vnode(dev_t dev);
extern void delete_vnode(struct vnode *vp);
extern void init_vnodes(void);

#else

extern int closevp();
extern struct vnode *alloc_vnode();
extern void free_vnode();
extern struct vnode *enter_vnode();
extern struct vnode *find_vnode();
extern void delete_vnode();
extern void init_vnodes();

#endif

/*
 * Generally useful macros.
 */
```

© COPYRIGHT 1994 AMDAHL CORPORATION

```
#define     NULLVP      ((struct vnode *)0)
#define     NULLVPP     ((struct vnode **)0)

#endif  /* _SYS_VNODE_H */
```

© COPYRIGHT 1994 AMDAHL CORPORATION

```
/* File: vrtx.h - last edit:
 * helge        Wed May 29 18:38:01 1991
 *
 * Copyright (c) 1991 by Amdahl Corporation. All rights reserved.
 */

#ifndef _VRTX_H
#define _VRTX_H

struct task_info {
    int tid;
    int pri;
    int status;
};

#endif /*_VRTX_H */
```

We claim:

1. In a computer system, a communication facility including a protocol stack formed of a plurality of stack layers where communication between layers is by messages conforming to a common framework, said stack having a stack top formed of a first set of said stack layers and a stack bottom formed of a second set of said stack layers, an application processor, including an application-processor operating system and an application program, for executing said protocol stack when not enabled for distributed processing and for executing said stack top with messages conforming to said common framework when enabled for distributed processing, an I/O processor, including an I/O-processor operating system, for executing said stack bottom with messages conforming to said common framework when enabled for distributed processing, distributed facility means for enabling said application processor and said I/O processor for distributed processing, said distributed facility means including a proxy layer in said stack top corresponding to a layer in said stack bottom for receiving messages in said stack top as a proxy for layers in said stack bottom and includes an application agent executing in said I/O processor representing said application program executing in said application processor, said distributed facility means connecting said application processor and said I/O processor for causing messages to said stack bottom to execute in said I/O processor when enabled for distributed processing and for causing messages to said stack top to execute in said application processor when enabled for distributed processing wherein said stack top and said stack bottom operate together when enabled for distributed processing to execute said stack conforming to the common framework.

2. The communication facility of claim 1 wherein said common framework is the STREAMS framework.

3. The communication facility of claim 1 wherein said distributed facility means includes a proxy layer in said stack top corresponding to a layer in said stack bottom for receiving messages in said stack top as a proxy for layers in said stack bottom.

4. The communication facility of claim 3 wherein said distributed facility means includes a communication link connected between said application processor and said I/O processor for communicating messages between said stack top executing in said application processor and said stack bottom executing in said I/O processor.

5. The communication facility of claim 4 wherein said communication link includes a communication protocol for communicating over said communication link and transform means for transforming messages to and from said communication protocol wherein messages are communicated over said communication link between said stack top executing in said application processor and said stack bottom executing in said I/O processor.

6. The communication facility of claim 1 wherein messages include data messages and administrative messages and said distributed facility means includes, a communication link connected between said application processor and said I/O processor, transfer means responsive to said proxy layer for sending data messages over said communication link from said stack top executing in said application processor to said stack bottom executing in said I/O processor.

7. The communication facility of claim 6 wherein said communication link includes a communication protocol for communicating messages over said communication link and transform means for transforming messages to and from said communication protocol.

8. The communication facility of claim 7 wherein said transfer means includes, means for transferring messages input from said stack top to said first proxy layer as top output messages to said stack bottom for execution by said stack bottom, means for transferring messages input from said stack bottom as output messages to said stack top for execution by said stack top.

* * * * *